US008010679B2

(12) United States Patent
Low et al.

(10) Patent No.: US 8,010,679 B2
(45) Date of Patent: Aug. 30, 2011

(54) METHODS AND SYSTEMS FOR PROVIDING ACCESS TO A COMPUTING ENVIRONMENT PROVIDED BY A VIRTUAL MACHINE EXECUTING IN A HYPERVISOR EXECUTING IN A TERMINAL SERVICES SESSION

(75) Inventors: Anthony Edward Low, St. Ives (AU); Richard Jason Croft, Wollstonecraft (AU); Richard James Mazzaferri, Mooney Mooney (AU); Paul Adam Ryman, Dural (AU); Nicholas Alexander Bissett, Leura (AU); Michael Wookey, Epping (AU); Donovan Ross Hackett, Epping (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 669 days.

(21) Appl. No.: 11/563,927

(22) Filed: Nov. 28, 2006

(65) Prior Publication Data
US 2007/0180448 A1 Aug. 2, 2007

Related U.S. Application Data

(60) Provisional application No. 60/761,674, filed on Jan. 24, 2006.

(51) Int. Cl.
*G06F 15/16* (2006.01)
(52) U.S. Cl. ........ 709/227; 709/217; 709/218; 709/219; 709/228
(58) Field of Classification Search .................. 703/205, 703/208, 213, 214, 218, 230; 709/217–219, 709/227, 228
See application file for complete search history.

(56) References Cited

U.S. PATENT DOCUMENTS

| 555,385 | A | * | 2/1896 | Linton ...................... 100/162 R |
| 4,564,903 | A | * | 1/1986 | Guyette et al. ................. 711/201 |
| 4,779,189 | A | | 10/1988 | Legvold et al. |
| 5,057,996 | A | | 10/1991 | Cutler et al. |
| 5,129,084 | A | | 7/1992 | Kelly, Jr. et al. |
| 5,175,852 | A | | 12/1992 | Johnson et al. |

(Continued)

FOREIGN PATENT DOCUMENTS
AU 3403602 5/2002
(Continued)

OTHER PUBLICATIONS

U.S. Appl. No. 11/559,635, filed Nov. 14, 2006.

(Continued)

*Primary Examiner* — Mohamed Wasel
(74) *Attorney, Agent, or Firm* — Foley and Lardner LLP; John D. Lanza

(57) ABSTRACT

A method for providing access to a computing environment includes the step of receiving, by a broker machine, a request from a client machine for access to a computing environment, the request including an identification of a user of the client machine. One of a plurality of virtual machines is identified by a session management component, the identified virtual machine providing the requested computing environment. One of a plurality of execution machines is identified, the identified execution machine providing a terminal services session in which a hypervisor executes to provide access to hardware resources required by the identified virtual machine. The hypervisor launches the identified virtual machine. A connection is established between the client machine and the identified virtual machine, via the terminal services session.

23 Claims, 99 Drawing Sheets

U.S. PATENT DOCUMENTS

| | | | |
|---|---|---|---|
| 5,187,790 A | 2/1993 | East et al. | |
| 5,202,971 A | 4/1993 | Henson et al. | |
| 5,249,290 A | 9/1993 | Heizer | |
| 5,297,283 A | 3/1994 | Kelly, Jr. et al. | |
| 5,321,841 A | 6/1994 | East et al. | |
| 5,341,478 A | 8/1994 | Travis, Jr. et al. | |
| 5,418,964 A | 5/1995 | Conner et al. | |
| 5,437,025 A | 7/1995 | Bale et al. | |
| 5,437,033 A * | 7/1995 | Inoue et al. | 714/10 |
| 5,461,608 A | 10/1995 | Yoshiyama | |
| 5,499,343 A | 3/1996 | Pettus | |
| 5,504,677 A | 4/1996 | Pollin | |
| 5,515,508 A | 5/1996 | Pettus et al. | |
| 5,553,242 A | 9/1996 | Russell et al. | |
| 5,555,385 A | 9/1996 | Osisek | |
| 5,555,414 A * | 9/1996 | Hough et al. | 710/261 |
| 5,557,346 A | 9/1996 | Lipner et al. | |
| 5,557,748 A | 9/1996 | Norris | |
| 5,557,765 A | 9/1996 | Lipner et al. | |
| 5,561,769 A | 10/1996 | Kumar et al. | |
| 5,586,312 A | 12/1996 | Johnson et al. | |
| 5,596,745 A | 1/1997 | Lai et al. | |
| 5,640,454 A | 6/1997 | Lipner et al. | |
| 5,701,484 A | 12/1997 | Artsy | |
| 5,706,437 A | 1/1998 | Kirchner et al. | |
| 5,727,249 A | 3/1998 | Pollin | |
| 5,729,734 A | 3/1998 | Parker et al. | |
| 5,734,865 A | 3/1998 | Yu | |
| 5,737,622 A | 4/1998 | Rogers et al. | |
| 5,745,573 A | 4/1998 | Lipner et al. | |
| 5,761,662 A | 6/1998 | Dasan | |
| 5,764,915 A | 6/1998 | Heimsoth et al. | |
| 5,794,207 A | 8/1998 | Walker et al. | |
| 5,802,306 A | 9/1998 | Hunt | |
| 5,826,027 A | 10/1998 | Pedersen et al. | |
| 5,828,840 A | 10/1998 | Cowan et al. | |
| 5,838,910 A | 11/1998 | Domenikos et al. | |
| 5,838,916 A | 11/1998 | Domenikos et al. | |
| 5,844,553 A | 12/1998 | Hao et al. | |
| 5,848,410 A | 12/1998 | Walls et al. | |
| 5,860,068 A | 1/1999 | Cook | |
| 5,884,046 A | 3/1999 | Antonov | |
| 5,938,733 A | 8/1999 | Heimsoth et al. | |
| 5,951,694 A | 9/1999 | Choquier et al. | |
| 5,956,403 A | 9/1999 | Lipner et al. | |
| 5,983,190 A | 11/1999 | Trower, II et al. | |
| 5,983,268 A | 11/1999 | Freivald et al. | |
| 5,991,406 A | 11/1999 | Lipner et al. | |
| 5,996,026 A * | 11/1999 | Onodera et al. | 710/3 |
| 5,999,179 A | 12/1999 | Kekic et al. | |
| 6,026,440 A | 2/2000 | Shrader et al. | |
| 6,061,349 A | 5/2000 | Coile et al. | |
| 6,088,515 A | 7/2000 | Muir et al. | |
| 6,108,712 A | 8/2000 | Hayes, Jr. | |
| 6,157,953 A | 12/2000 | Chang et al. | |
| 6,158,007 A | 12/2000 | Moreh et al. | |
| 6,161,126 A | 12/2000 | Wies et al. | |
| 6,199,753 B1 | 3/2001 | Tracy et al. | |
| 6,253,224 B1 * | 6/2001 | Brice et al. | 718/1 |
| 6,256,637 B1 | 7/2001 | Venkatesh et al. | |
| 6,272,556 B1 | 8/2001 | Gish | |
| 6,272,632 B1 | 8/2001 | Carman et al. | |
| 6,272,677 B1 | 8/2001 | Lam et al. | |
| 6,275,942 B1 | 8/2001 | Bernhard et al. | |
| 6,304,893 B1 | 10/2001 | Gish | |
| 6,324,177 B1 * | 11/2001 | Howes et al. | 370/389 |
| 6,339,595 B1 | 1/2002 | Rekhter et al. | |
| 6,370,570 B1 | 4/2002 | Muir et al. | |
| 6,370,687 B1 | 4/2002 | Shimura | |
| 6,437,803 B1 | 8/2002 | Panasyuk et al. | |
| 6,463,459 B1 | 10/2002 | Orr et al. | |
| 6,510,466 B1 | 1/2003 | Cox et al. | |
| 6,516,315 B1 | 2/2003 | Gupta | |
| 6,519,643 B1 | 2/2003 | Foulkes et al. | |
| 6,526,056 B1 | 2/2003 | Rekhter et al. | |
| 6,546,454 B1 | 4/2003 | Levy et al. | |
| 6,550,012 B1 | 4/2003 | Villa et al. | |
| 6,553,377 B1 | 4/2003 | Eschelbeck et al. | |
| 6,571,245 B2 | 5/2003 | Huang et al. | |
| 6,681,238 B1 * | 1/2004 | Brice et al. | 718/1 |
| 6,691,232 B1 | 2/2004 | Wood et al. | |
| 6,766,457 B1 | 7/2004 | Baisley | |
| 6,772,350 B1 | 8/2004 | Belani et al. | |
| 6,880,002 B2 | 4/2005 | Hirschfeld et al. | |
| 6,920,502 B2 | 7/2005 | Araujo et al. | |
| 6,966,060 B1 | 11/2005 | Young et al. | |
| 7,065,637 B1 | 6/2006 | Nanja | |
| 7,143,437 B2 | 11/2006 | Royer et al. | |
| 7,185,192 B1 | 2/2007 | Kahn | |
| 7,350,194 B1 | 3/2008 | Alpern | |
| 7,359,953 B2 | 4/2008 | Muir et al. | |
| 7,451,196 B1 | 11/2008 | de Vries et al. | |
| 7,533,189 B2 | 5/2009 | Mahajan et al. | |
| 7,546,353 B2 | 6/2009 | Hesselink et al. | |
| 7,546,372 B2 | 6/2009 | Allen et al. | |
| 7,577,722 B1 | 8/2009 | Khandekar et al. | |
| 7,594,018 B2 | 9/2009 | Pedersen | |
| 7,597,018 B2 | 10/2009 | Braun et al. | |
| 7,606,868 B1 | 10/2009 | Le et al. | |
| 2001/0032207 A1 * | 10/2001 | Hartley et al. | 707/102 |
| 2002/0035451 A1 | 3/2002 | Rothermel | |
| 2002/0049608 A1 | 4/2002 | Hartsell et al. | |
| 2002/0049841 A1 | 4/2002 | Johnson et al. | |
| 2002/0057295 A1 | 5/2002 | Panasyuk et al. | |
| 2002/0059274 A1 | 5/2002 | Hartsell et al. | |
| 2002/0065864 A1 | 5/2002 | Hartsell et al. | |
| 2002/0087668 A1 | 7/2002 | San Martin et al. | |
| 2002/0095400 A1 | 7/2002 | Johnson et al. | |
| 2002/0095584 A1 | 7/2002 | Royer et al. | |
| 2002/0103882 A1 | 8/2002 | Johnston et al. | |
| 2002/0103884 A1 | 8/2002 | Duursma et al. | |
| 2002/0105972 A1 | 8/2002 | Richter et al. | |
| 2002/0107903 A1 | 8/2002 | Richter et al. | |
| 2002/0107962 A1 | 8/2002 | Richter et al. | |
| 2002/0107971 A1 | 8/2002 | Bailey et al. | |
| 2002/0107989 A1 | 8/2002 | Johnson et al. | |
| 2002/0107990 A1 | 8/2002 | Johnson et al. | |
| 2002/0108059 A1 | 8/2002 | Canion et al. | |
| 2002/0116452 A1 | 8/2002 | Johnson et al. | |
| 2002/0133587 A1 | 9/2002 | Ensel et al. | |
| 2002/0133593 A1 | 9/2002 | Johnson et al. | |
| 2002/0156831 A1 | 10/2002 | Suorsa et al. | |
| 2002/0169887 A1 | 11/2002 | MeLampy et al. | |
| 2002/0174215 A1 | 11/2002 | Schaefer | |
| 2002/0174227 A1 | 11/2002 | Hartsell et al. | |
| 2002/0184618 A1 | 12/2002 | Bala et al. | |
| 2003/0014669 A1 | 1/2003 | Caceres et al. | |
| 2003/0051130 A1 | 3/2003 | MeLampy et al. | |
| 2003/0065676 A1 * | 4/2003 | Gbadegesin et al. | 707/104.1 |
| 2003/0074580 A1 | 4/2003 | Knouse et al. | |
| 2003/0101343 A1 | 5/2003 | Eaton et al. | |
| 2003/0105604 A1 | 6/2003 | Ash et al. | |
| 2003/0145222 A1 | 7/2003 | Gittler et al. | |
| 2003/0172138 A1 | 9/2003 | McCormack et al. | |
| 2003/0191971 A1 | 10/2003 | Klensin et al. | |
| 2003/0195950 A1 | 10/2003 | Huang et al. | |
| 2003/0217105 A1 | 11/2003 | Zircher et al. | |
| 2003/0217166 A1 | 11/2003 | Dal Canto et al. | |
| 2003/0233541 A1 | 12/2003 | Fowler et al. | |
| 2003/0236837 A1 | 12/2003 | Johnson et al. | |
| 2003/0236861 A1 | 12/2003 | Johnson et al. | |
| 2003/0236919 A1 | 12/2003 | Johnson et al. | |
| 2004/0031058 A1 | 2/2004 | Reisman | |
| 2004/0039594 A1 | 2/2004 | Narasimhan et al. | |
| 2004/0070608 A1 | 4/2004 | Saka | |
| 2004/0103310 A1 | 5/2004 | Sobel et al. | |
| 2004/0131042 A1 | 7/2004 | Lillie et al. | |
| 2004/0153606 A1 | 8/2004 | Schott | |
| 2004/0181476 A1 | 9/2004 | Smith et al. | |
| 2004/0181779 A1 | 9/2004 | Gorti | |
| 2004/0260953 A1 | 12/2004 | Jamieson et al. | |
| 2004/0268361 A1 | 12/2004 | Schaefer | |
| 2005/0003810 A1 | 1/2005 | Chu et al. | |
| 2005/0004942 A1 | 1/2005 | Madsen et al. | |
| 2005/0044089 A1 | 2/2005 | Wu et al. | |
| 2005/0044108 A1 | 2/2005 | Shah et al. | |
| 2005/0050053 A1 | 3/2005 | Thompson | |

| | | | |
|---|---|---|---|
| 2005/0063083 A1 | 3/2005 | Dart et al. | |
| 2005/0071652 A1 | 3/2005 | de Jong | |
| 2005/0125663 A1 | 6/2005 | Funk | |
| 2005/0125739 A1 | 6/2005 | Thompson et al. | |
| 2005/0160151 A1* | 7/2005 | Rawson, III | 709/213 |
| 2005/0165928 A1 | 7/2005 | Shu et al. | |
| 2005/0177635 A1 | 8/2005 | Schmidt et al. | |
| 2005/0193396 A1 | 9/2005 | Stafford-Fraser et al. | |
| 2005/0195835 A1 | 9/2005 | Savage et al. | |
| 2005/0198303 A1 | 9/2005 | Knauerhase et al. | |
| 2005/0246444 A1 | 11/2005 | Koehane et al. | |
| 2005/0246718 A1 | 11/2005 | Erlingsson et al. | |
| 2006/0008256 A1 | 1/2006 | Khedouri et al. | |
| 2006/0010433 A1 | 1/2006 | Neil | |
| 2006/0020937 A1 | 1/2006 | Schaefer | |
| 2006/0036570 A1 | 2/2006 | Schaefer et al. | |
| 2006/0041761 A1 | 2/2006 | Neumann et al. | |
| 2006/0130060 A1* | 6/2006 | Anderson et al. | 718/1 |
| 2006/0161970 A1 | 7/2006 | Hopen et al. | |
| 2006/0174115 A1 | 8/2006 | Rao et al. | |
| 2006/0179476 A1* | 8/2006 | Challener et al. | 726/4 |
| 2006/0200859 A1 | 9/2006 | England et al. | |
| 2006/0206931 A1 | 9/2006 | Dillaway et al. | |
| 2006/0221990 A1* | 10/2006 | Muller et al. | 370/412 |
| 2006/0256130 A1 | 11/2006 | Gonzalez | |
| 2007/0006226 A1 | 1/2007 | Hendel | |
| 2007/0018992 A1 | 1/2007 | Wong | |
| 2007/0074071 A1* | 3/2007 | Rothman et al. | 714/10 |
| 2007/0097130 A1 | 5/2007 | Margulis | |
| 2007/0107048 A1 | 5/2007 | Halls et al. | |
| 2007/0171921 A1 | 7/2007 | Wookey et al. | |
| 2007/0174410 A1 | 7/2007 | Croft et al. | |
| 2007/0174429 A1 | 7/2007 | Mazzaferri et al. | |
| 2007/0179955 A1 | 8/2007 | Croft et al. | |
| 2007/0180447 A1 | 8/2007 | Mazzaferri et al. | |
| 2007/0180448 A1* | 8/2007 | Low et al. | 718/1 |
| 2007/0180449 A1 | 8/2007 | Croft et al. | |
| 2007/0180450 A1 | 8/2007 | Croft et al. | |
| 2007/0180493 A1 | 8/2007 | Croft et al. | |
| 2007/0186212 A1* | 8/2007 | Mazzaferri et al. | 718/1 |
| 2007/0192329 A1 | 8/2007 | Croft et al. | |
| 2007/0198656 A1* | 8/2007 | Mazzaferri et al. | 709/218 |
| 2008/0212945 A1 | 9/2008 | Khedouri et al. | |
| 2008/0263407 A1* | 10/2008 | Yamamoto | 714/44 |
| 2009/0125974 A1* | 5/2009 | Zhang et al. | 726/1 |
| 2010/0011178 A1* | 1/2010 | Feathergill | 711/162 |

FOREIGN PATENT DOCUMENTS

| | | |
|---|---|---|
| CA | 2307008 | 10/2000 |
| CA | 2421609 | 3/2002 |
| EP | 0863453 | 9/1998 |
| EP | 0927921 | 7/1999 |
| EP | 1047239 | 10/2000 |
| EP | 1049306 | 11/2000 |
| EP | 1289225 | 3/2003 |
| EP | 1330705 | 7/2003 |
| EP | 1364296 | 11/2003 |
| EP | 1388812 | 2/2004 |
| JP | 2000307650 | 11/2000 |
| JP | 6332782 | 2/2004 |
| JP | 2004509539 | 3/2004 |
| WO | WO-99/60462 | 11/1999 |
| WO | WO-00/51290 | 8/2000 |
| WO | WO-00/62507 | 10/2000 |
| WO | WO-01/35717 | 5/2001 |
| WO | WO-0175632 | 10/2001 |
| WO | WO-02/23362 | 3/2002 |
| WO | WO-02/37267 | 5/2002 |
| WO | WO-02/39221 | 5/2002 |
| WO | WO-02/39260 | 5/2002 |
| WO | WO-02/39261 | 5/2002 |
| WO | WO-02/39262 | 5/2002 |
| WO | WO-02/39263 | 5/2002 |
| WO | WO-02/39264 | 5/2002 |
| WO | WO-02/39275 | 5/2002 |
| WO | WO-02/39276 | 5/2002 |
| WO | WO-02/39301 | 5/2002 |
| WO | WO-02/39666 | 5/2002 |
| WO | WO-02/39693 | 5/2002 |
| WO | WO-02/39695 | 5/2002 |
| WO | WO-02/41575 | 5/2002 |
| WO | WO-02/42922 | 5/2002 |
| WO | WO-02/43320 | 5/2002 |
| WO | WO-02/43364 | 5/2002 |
| WO | WO-02/46925 | 6/2002 |
| WO | WO-02/46944 | 6/2002 |
| WO | WO-02/46945 | 6/2002 |
| WO | WO-02/58349 | 7/2002 |
| WO | WO-02/069604 | 9/2002 |
| WO | WO-02/093369 | 11/2002 |
| WO | WO-02/103521 | 12/2002 |
| WO | WO-2004003879 | 1/2004 |
| WO | WO-2004006041 | 1/2004 |
| WO | WO-2004017601 | 2/2004 |
| WO | WO-2004049672 | 6/2004 |
| WO | WO-2004051964 | 6/2004 |
| WO | WO-2004066278 | 8/2004 |
| WO | WO-2004090672 | 10/2004 |
| WO | WO-2005024550 | 3/2005 |
| WO | WO-2005024567 | 3/2005 |
| WO | WO-2005024665 | 3/2005 |
| WO | WO-2005029313 | 3/2005 |
| WO | WO-2005029363 | 3/2005 |
| WO | WO-2005074232 | 8/2005 |
| WO | WO-2005084232 | 9/2005 |
| WO | WO-2006012533 | 2/2006 |
| WO | WO-2006017388 | 2/2006 |

OTHER PUBLICATIONS

U.S. Appl. No. 11/559,658, filed Nov. 14, 2006.
U.S. APpl. No. 11/552,315, filed Oct. 24, 2006.
U.S. Appl. No. 11/552,787, filed Oct. 25, 2006.
U.S. Appl. No. 11/563,958, filed Nov. 28, 2006.
U.S. Appl. No. 11/624,394, filed Jan. 18, 2007.
U.S. Appl. No. 11/624,395, filed Jan. 18, 2007.
U.S. Appl. No. 11/624,396, filed Jan. 18, 2007.
U.S. Appl. No. 11/563,932, filed Nov. 28, 2006.
U.S. Appl. No. 11/624,402, filed Jan. 18, 2007.
U.S. Appl. No. 11/624,403, filed Jan. 18, 2007.
Adaballa et al., "From Virtualized Resources to Virtualized Computing Grid: The In-VIGO System," *J. Future-Generation Computing System*, (2004) to appear.
Allison, Bridget et al., "File System Security: Secure Network Data Sharing for NT and UNIX," in Network Appliance, Inc. Tech Library pp. 16 pgs. Jan. 1, 1998.
Anonymous, "Health Canada Takes Its Network Pulse," *Communications News*, 48, Oct. 2001, available at http://www.findarticles.com/p/articles/mi_m0DUD/is_5_23/ai_86039142.
Anonymous, "Multiple Platforms Bring Multiple Challenges," *Communications News*, 56, Oct. 2001, available at http://www.findarticles.com/p/articles/mi_m0CMN/is_10_38/ai_79370488.
Anonymous, "Remote Access," *Secure Computing*, 47-60, Oct. 1997.
Antonoff, M., "Writing in a Spreadsheet," *Personal Computing*, 51-54, 1987.
Ao et al., "A Hierarchical Policy Specification Language, and Enforcement Mechanism, for Governing Digital Enterprises", *3rd IEEE International Workshop on Policies for Distributed Systems and Networks (Policy 2002)*, 38-49, IEEE CS Press, 2002, available at http://www.cs.rutgers.edu/~tdnguyen/pubs/ao-policy-2002.pdf.
Back et al., "Contracts, Games and Refinement," TUCS Technical Report No. 138, *Turku Centre for Computer Science*, Nov. 1-15, 1997.
Bala et at., "Dynamo: A Transparent Dynamic Optimization System," *Proc ACM SIGPLAN 2000 Conf. Programming Language Design and Implementation*, ACM Press, 2000, pp. 1-12.
Baraz et al., "IA-32 Execution Layer: A Two-Phase Dynamic Translator Designed to Support IA-32 Applications on Itanium-Based Systems," Proc. 36th Ann. IEEE/ACM Int'l Symp. Microarchitecture, *IEEE CS Press*, 2003, pp. 191-204.
Barham et al., "Xen and the Art of Virtualization," *Proc. 19th ACM Symp. Operating Systems Principles*, ACM Press, 2003, pp. 164-177.

Beers, C., "McAfee Shores Up Your Defenses," *Network Computing*, 38, Jun. 2003, *available at* http://www.networkcomputing.com/1412/1412sp3.html.

Biggins, "Sychron Rises from the Ashes to Try its Hand at Desktop Virtualization", Jan. 17, 2006 (available at http://www.the451group.com/mis/451_mis.php?sector_focus=10).

Bird, T., "Reduce the Threat from Computers," *Communications News*, 36, 38-39, Mar. 2005, 9 *available at* http://www.comnews.com/stories/articles/0305/0305reduce_threat.htm.

Borden et al, "Multiple Operating Systems on' One Processor Complex," *IBM Systems J.*, Jan. 1989, pp. 104-123.

Box, Essential .NET, vol. 1:The Common Language Runtime, Addison-Wesley, 2002.

Brekne, T., "Mobile Agents and (In-)Security," *Telektronikk*, 34-46, 2000.

Bressoud and Schneider, "Hyperyisor-Based Fault Tolerance," *Proc. 15th ACM Symp. Operating Systems Principles*, ACM Press, 1995, pp. 1-11.

Bugnion et al., "Disco: Running Commodity Operating Systems on Scalable Multiprocessors," *ACM/Trans. Computer Systems*, vol. 15, No. 4, 1997, pp. 412-447.

Burnett et al., "SLN116 Using a Virtual Infrastructure to Implement Hosted Desktop Solutions", VM World 2005, pp. 1-30, 2005.

Carvalho et al., "Supporting Flexible Data Feeds in Dynamic Sensor Grids Through Mobile Agents," Lecture Notes in Computer Science vol. 2535, *Proc. 6th International Conference on Mobile Agents (MA 2002)*, 171-185, Springer-Verlag, Germany, 2002.

Chandra et al., "The Collective: A Cache-Based Systems Management Architecture," *Proc. Symp. Network Systems Design and Implementation*, Usenix, 2005, to appear.

Cheng et al., "Adjusting the Autonomy of Collections of Agents in Multiagent Systems," Lecture Notes in Computer Science vol. 3501, 33-37, *Advances in Artificial Intelligence: Proc. 18th Conference of the Canadian Society for Computational Studies of Intelligence (Canadian AI 2005)*, Springer-Verlag, Germany, 2005.

Corradi et al., "Policy-Driven Management of Agent Systems," Lecture Notes in Computer Science vol. 1995, *Policies for Distributed Systems and Networks: Proc. International Workshop (Policy 2001)*, 214-229, Springer-Verlag, Germany, 2001.

Creasy, "The Origin of the VM/370 Time-Sharing System," IBM J. *Research and Development*, Sep. 1981, pp. 483-490.

Declaration of Non-Establishment of International Search Report, PCT/US2007/060895, mailed Sep. 21, 2007. 2 pages.

Declaration of Non-Establishment of International Search Report, PCT/US2007/060963, mailed May 30, 2007. 2 pages.

Dulay et al., "A Policy Deployment Model for the Ponder Language," *Proc. IEEE/IFIP. International Symposium on Integrated Network Management (IM 2001)*, 529-543, Seattle, Washington, USA, IEEE Press, 2001.

Dunlap et al., "ReVirt: Enabling Intrusion Analysis through Virtual-Machine Logging and Replay," *Proc. Sth Symp. Operating Systems Design and Implementation*, Vsenix, 2002, pp. 211-224.

England et al., "A Trusted Open Platform," *Computer*, Jul. 2003, pp. 55-62.

Enterprise Hosted Desktop, VM World2005, pp. 1-41, 2005.

Epema et al., "A Worldwide Flock of Condors: Load-sharing among Workstation Clusters," *J. Future-Generation Computer Systems*, vol. 12, No. 1, 1996, pp. 53-65.

Esposito, A. et al., "Integrating Concurrency Control and Distributed Data into Workflow Frameworks: An Actor Model Perspective," *2000 IEEE International Conference on Systems, Man, and Cybernetics*, vol. 3, 2110-2114, IEEE Press, 2000.

Feldman, M., "Enterprise Wrappers for Information Assurance," *Proc. DARPA Information Survivability Conference and Exposition* (DISCEX '03), IEEE Press, 2003.

Fellows, "Parallel Prices Virtualization at 50% less than VMWare, Microsoft", Oct. 24, 2005 (available at http://www.the451group.com/about/bio_detailphp?eid=113).

Figueiredo et al, "A Case for Grid Computing on Virtual Machines," *Proc. Int'l Conf. Distributed Computing Systems* (ICDCS 03), IEEE CS Press, 2003, pp. 550-559.

Figueiredo et al, "Resource Virtualization Renaissance," *Computer*, May, 2005 pp. 28-31.

Foster and Kesselman, *The Grid: Blueprint for a New Computing Infrastructure*, "Globus: A Toolkit-Based Grid Architecture," TMorgan Kaufmann, 1999, pp. 259-278.

Foster et al., "The Physiology of the Grid: An Open Grid Services Architectures for Distributed Systems Integration," Open Grid Service Infrastructure WG, Global Grid Forum, Jun. 2002 available at http://www.globus.org/research/papers/ogsa.pdf.

Fratto, M., "Hammering Out a Secure Framework," *Network Computing*, 79-80, 82, 84-87, 2000, *available at* http://www.networkcomputing.com/1101/1101f3.html.

Friedlander and Yates, "Desktop Virtualization is the Future of Corporate PC", pp. 1-11, 2006 (available at www.forrester.com).

Funk Software, "Funk Software's Endpoint Assurance Solution. The Secure Product Foundation for Endpoint Integrity," 2005, *available at*: http://www.juniper.net/welcome_funk.html.

Garfinkel and Rosenblum, "A Virtual Machine Introspection-Based Architecture for Intrusion Detection," *Proc. Network and Distributed Systems Security Symp.*, The Internet Society, 2003, pp. 191-206.

Garfinkel et al., "Terra: A Virtual Machine-Based Platform for Trusted Computing," *Proc. 19th ACM Symp. Operating Systems Principles*, ACM Press, 2003, pp. 193-206.

Goldberg, "Survey of Virtual Machine Research," *Computer*, Jun. 1974, pp. 34-45.

Graniero, P.A. et al., "Investigating the Role of Fuzzy Sets in a Spatial Modeling Framework," *Proc. 9th IFSA World Congress and 20th NAFIPS International Conference*, 2370-2375, IEEE Press 2001.

Guy III, E.T., "An Introduction to the CAD Framework Initiative," Electro 1992 Conference Record, 78-83, Massachusetts, May 1992.

Intel Corp., "Intel Virtualization Technology Specification for the IA-32 Architecture," (available at http://www.cs.utah.edu/classes/cs7940-010-rajeev/spr06/papers/vm.pdf).

Intel Corp., "Intel Virtualization Technology Specification for the Intel Itanium Architecture (VT-i);" (available at www.intel.com/cd/00/00/21/42/214273_214273.pdf <http://www.intel.com/cd/00/00/21/42/214273_214273.pdf>)

International Preliminary Report on Patentability, PCT/US2007/060895, mailed Aug. 7, 2008, Issued Jul. 29, 2008. 5 pages.

International Preliminary Report on Patentability, PCT/US2007/060963, mailed Aug. 7, 2008, Issued Jul. 29, 2008. 5 pages.

International Search Report from PCT/US05/028607, mailed Mar. 31, 2006.

International Search Report, PCT/US07/060963, mailed Jul. 24, 2008. 2 pages.

International Searching Authority, "International Search Report," PCT Application No. PCT/ US05/028605, mailed on Jan. 18, 2005, 7 pgs.

International Searching Authority, "Partial International Annexed to Invitation to Pay fees," PCT Application No. PCT/ US05/028607, mailed on Dec. 14, 2005, 7 pgs.

International Searching Authority, "Written Opinion," PCT Application No. PCT/ US05/028605, mailed on Jan. 18, 2006, 7 pgs.

International Searching Authority, International preliminary report on patentability to PCT/US05/028606, issued Apr. 3, 2007 (10 pages).

International Searching Authority, International Search Report related to PCT/US05/028606, mailed Feb. 24, 2006 (5 pages).

Jiang and Xu, "SODA: A Service-on-Demand Architecture for Application Service Hosting Utility Platforms," *Proc. 12th IEEE Int'l Symp. High-Performance Distributed Computing* (HPDC-12), IEEE CS Press, 2003, pp. 174-183.

Jiang and Xu, "Violin: Virtual Internetworking on Overlay Infrastructure," *Proc. 2nd Int'l Symp. Parallel and Distributed Processing and Applications*, LNCS 3358, Springer-Verlag, 2004, pp. 937-946.

Jin, H. et al., "A Distributed Dynamic µFirewall Architecture With Mobile Agents and KeyNote Trust Management System," Lecture Notes in Computer Science, vol. 2513, *Proc. 4th International Conference on Information and Communications Security*, (ICICS 2002), 13-24, Springer-Verlag, Germany, 2002.

Jun, M. etal., "Application of Mobile Scanning Agent in the Network Security," *J. of Systems Engineering and Electronics*, 15(3): 371-376, 2004.

Juniper Networks NetScreen-SA 5000 Series. Spec Sheet, Secure Access Appliances. Juniper Networks, Sunnyvale, CA, 4 pages.

Juniper Networks, "Juniper Networks Infranet Controllers Provide Unified Access Control for all Users throughout Your Network," (Oct. 2005), available at: http://www.juniper.net/products/ua/dsheet/100137.pdf.

Keromytis, A.D. et al., "Transparent Network Security Policy Enforcement," Proc. USENIX Technical Conference, 215-225, San Diego, CA, USA, 2000.

Kim, S.C. et al., "Study of Security Management System Based on Client/Server Model," 1403-1408, IEEE Press, 1999.

Klaiber, "The Technology Behind Crusoe Processors: Low-Power x86-Compatible Processors Implemented with Code Morphing Software," tech. brief, Transmeta Corp., 2000.

Klein, D., "Developing Applications with a UIMS," Proc. USENIX Applications Development Symposium, 37-56, 1994.

Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.

Kozuch and Satyanarayanan, "Internet Suspend/Resume," Proc. IEEE Workshop Mobile Computing Systems and Applications, IEEE Press, 2002, pp. 40-46.

Krief, F. et al., "An Intelligent Policy-Based Networking Environment for Dynamic Negotiation, Provisioning and Control of QoS," IFIP TC6/WG6.2 & WG6.7 Conference on Network Control and Engineering for QoS, Security and Mobility, (Net-Con 2002), 285-290, Kluwer Academic Publishers, 2002.

Krsul et al., "VMPlants: Providing and Managing Virtual Machine Execution Environments for Grid Computing," Proc. IEEE/A CM Supercomputing, IEEE CS Press, 2004, p. 7.

Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.

Law, K.L.E. et al., "Policy-Based Management With Active Networks," IFIP TC6/WG6.2 & WG6.7 Conference on Network Control and Engineering for QoS, Security and Mobility, (Net-Con 2002), 129-140, Kluwer Academic Publishers, 2002.

Law, K.L.E. et at., "UPM: Unified Policy-Based Network Management," Proc. SPIE, (ITCom 2001), vol. 4523, 326-337, Denver, CO, USA, 2001.

Lee, D.W. et al., "Managing Fault Tolerance Information in Multi-Agents Based Distributed Systems," Lecture Notes in Computer Science, vol. 2690, Intelligent Data Engineering and Automated Learning, (IDEAL 2003), 104-108, Springer-Verlag, Germany, 2003.

Lindholm and Yellin, The Java Virtual Machine Specification, 2nd ed., Addison-Wesley, 1999.

Madden, "Providing Desktops to Users: Centralized Virtual Machines or Terminal Server Desktops?", Oct. 24, 2005.

Maes, S. et al., "Identifiability of Causal Effects in a Multi-Agent Causal Model," IEEE/WIC International Conference on Intelligent Agent Technology, (IAT'03), 605, IEEE Press, 2003.

Magnusson, "The Virtual Test Lab," Embedded Computing, May 2005, pp. 95-97.

Mahler, R.P. et al. "Technologies for Unified Collection and Control of UCAVs," Proc. of SPIE vol. 4729, 90-101, 2002.

Matsuura, S. et al., "An Extension of ECA Architecture and its Application to HTML Document Browsing," IEEE International Conference on Systems, Man, and Cybernetics, vol. 1, 738-743, IEEE Press 1999.

Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.

McAfee System Protection Solutions, "Enforcing Endpoint Policies for Network Access Selecting the Right Solution for your Environment," 2005, available at: http://mcafee.com/us/local_content/white_papers/wp_mpe_securingyournetwork.pdf.

McAfee System Protection Solutions, "McAfee Policy Enforcer," 2005, available at: http://www.mcafee.com/us/local_content/datasheets/ds_policy_enforcer.pdf.

Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.

Microsoft Corp., "Microsoft Virtual Server 2005 Technical Overview," 2004, (available at http://downloadmicrosoft.com/download/5/5/3/55321426-cb43 -4672-9123-74ca3af6911/VS2005 Tech W P.doc.).

Molta, D., "Odyssey Makes Wireless LANs a Safe Trip," Networking Computing, 24, 26, 2002, available at <http://www.networkcomputing.com/1311/1311sp2.html>.

Montanari, R. et al., "Context-Based Security Management for Multi-Agent Systems," Proc. Second IEEE Symposium on Multi-Agent Security and Survivability (MAS&S 2005), IEEE Press, 2005.

Moving Toward the on Demand Enterprise, How Synchron Solutions Can Make it a Realitypages 1-5, 2005 (available at www.synchron.com).

Neuman et al., The Kerberos Network Authentication Service (V5), Internet draft, work in progress, Sep. 2004.

Non Final Office Action dated Jan. 22, 2009, pertaining to U.S. Appl. No. 11/552,315, 22 pages.

Non Final Office Action dated Jan. 5, 2009, pertaining to U.S. Appl. No. 11/624,394, 41 pages.

Non Final Office Action dated Oct. 29, 2008, pertaining to U.S. Appl. No. 11/624,402, 19 pages.

Non Final Office Action dated Oct. 7, 2008, pertaining to U.S. Appl. No. 11/272,598, 13 pages.

OnDemand Desktop Synopsis, Product Synopsis, p. 1 (available at www.synchron.com).

Optimizing your Server and Desktop Architecture, The Role of Blade Servers, pp. 1-3, 2005 (available at www.synchron.com).

Page, S.E., "Self Organization and Coordination," Computational Economics, vol. 18, 25-48, Kluwer Academic Publishers, 2001.

Palmer, D. et al., "Decentralized Cooperative Auction for Multiple Agent Task Allocation Using Synchronized Random Number Generators," Proc. IEEE/RSJ International Conference on Intelligent Robots and Systems, 1963-1968, IEEE Press, 2003.

Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.

Perkins et al., Route Optimization in Mobile IP, Internet draft, work in progress, Sep. 2001.

Peterson et al., "A Blueprint for Introducing Disruptive Technology into the Internet," Proc. ACM Workshop on Hot Topics in Networking (HotNets-I), ACM Press, 2003, pp. 59-64.

Popek and Goldberg, "Formal Requirements for Virtualizable Third-Generation Architectures," Comm. ACM, Jul. 1974, pp. 412-421.

Randic, M. et al, "Object by Value Transfer Mechanisms for Obligation Policy Enforcement Object Loading," Proc. 12th IEEE Mediterranean Electrotechnical Conference, (Melecon 2004), IEEE Press, 2004.

Rosenblum and Garfinkel, "Virtual Machine Monitors: Current Technology and Future Trends," Computer, May 2005, pp. 39-47.

Ruth et al., "Virtual Distributed Environments in a Shared Infastrcucture," Computer, May, 2005, pp. 63-69.

Simon et al., "A Cryptographic Protocol to Obtain Secure Communications in Extended Ethernet Environment," Proc. 17th Conf. on Local Computer Networks, 254-261, IEEE CS Press, 1992.

Sirbu, et al., "Distributed authentication in Kerberos using public key cryptograph," Proc. 1997 Symposium on Network and Distributed Systems Security (SNDSS'97), 134-141, IEEE CS Press, 1997.

Sites et al., "Binary Translation," Comm. ACM, Feb. 1993, pp. 69-81.

Smith and Nair, "The Architecture of Virtual Machines," Computer, May 2005, pp. 32-38.

Soltis, Inside the AS/400, Duke Press, 1996.

Sugerman et al., "Virtualizing I/O Devices on VMware Workstation's Hosted Virtual Machine Monitor," Proc. Usenix Ann. Technical Conf, Usenix, 2002, pp. 1-14.

Sun Microsystems, "Sun Enterprise 10000 Server: Dynamic System Domains," tech. white paper, 1999 (available at www.sun.com/datacenter/docs/domainswp.pdf).

Sun Mircrosystem White Paper, "Sun Ray Interoperability Brief," sun.com./sunray, Aug. 2003.

Sundararaj and Dinda, "Toward Virtual Networks for Virtual Machine Grid Computing," *Proc. 3rd Usenix Virtual Machine Technology Symp.*, Usenix, 2004, pp. 177-190.

Sundararaj et al., "Dynamic Topology Adaptation of Virtual Networks of Virtual Machines," *Proc. 7th Workshop Languages, Compilers, and Runtime Support for Scalable Systems*, 2004 (available at http://www.tlc2.uh.edu/lcr2004/Final_Proceedings/Sundararaj.pdf.).

Suri, N. et al., "DAML-Based Policy Enforcement for Semantic Data Transformation and Filtering in Multi-Agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.

Suri, N. et al., "Enforcement of Communications Policies in Software Agent Systems through Mobile Code," *Proc. 4th International Workshop on Policies for Distributed Systems and Networks*, (Policy'03), 247, IEEE Press, 2003.

Synchron Architecture, Technology White Paper, pp. 1-15, 2005 (available at www.synchron.com).

Synchron OnDemand Policy Manager, A Look Inside, A Technical White Paper, pp. 1-17, 2005 (available at www.synchron.com).

Synchron OnDemand Policy Manager, pp. 1-2 (available at www.synchron.com).

Takahaski, K. et al., "Integrating Heterogeneous and Distributed Information by Linking it to Structured Information as an 'Information Integration Directory'," J81-D-I(5): 443-450, 1998.

TCG Published, "TCG Trusted Network Connect TNC Architecture for Interoperability," 2005, *available at*: https://www.trustedcomputinggroup.org/groups/network/TNC_Architecture_v1_0_r4.pdf.

TCG Published, "TCG Trusted Network Connect TNC IF-IMC," 2005, *available at*: https://www.trustedcomputinggroup.org/groups/network/TNC_IFIMC_v1_0_r3.pdf.

TCG Published, "TCG Trusted Network Connect TNC IF-IMV," 2005, *available at*: https://www.trustedcomputinggroup.org/groups/network/TNC_IFIMV_v1_0_r3.pdf.

Thinstall and Citrix Partner to Deliver Virtualize Citrix Presentation Server C USB Drives, http://finanzen.net/news/news_detail.asp?NewsNr=378407.

Traut, "Building the Virtual PC," *Byte*, Nov. 1997, pp. 51-52 (available at http://www.byte.com/art/9711/sec4/art4.htm).

Trusted Computing Group, "Trusted Network Connect Open Standards for Integrity-Based Network Access Control," 2005, *available at*: https://www.trustedcomputinggroup.org/groups/network/Open_Standards_for_IntegrityBased_AccessControl.pdf.

Trusted Computing Group, "Trusted Network Connect to Ensure Endpoint Integrity," 2005, *available at*: https://www.trustedcomputinggroup.org/groups/network/TNC_NI-collateral_10_may_(2).pdf.

Turner, "Synchron onDemand Desktop Reduces Cost and Risk of Desktop Application Software Services", pp. 1-4 (available at www.summitstrat.com).

Uhlig, et al., "Intel Virtualization Technology," *Computer*, May 2005 pp. 48-56.

Uszok, A. et al., "KAoS Policy and Domain Services: Toward a Description-Logic Approach to Policy Representation, Deconfliction, and Enforcement," *Proc. 4th International Workshop on Policies for Distributed Systems and Networks*, (Policy'03), 93, IEEE Press, 2003.

VMare Inc., "VMWare Infastructure Architecture Overview," 14 pages, white paper V00014-20001205, 2004(available at www.vmware.com/pdf/vi_wp.pdf).

VMWARE Insures Improved Customer Service for Prudential, VMWARE, pp. 1-2 (available at www.vmware.com).

Waldspurger, "Memory Resource Management in VMware ESX Server," *Proc. Sth Symp. Operating Systems Design and Implementation*, Usenix, 2002, pp. 181-194.

Wang, D. et al., "Study oOn SOAP-Based Mobile Agent Techniques," Lecture Notes in Computer Science, vol. 2480, Proc. First International Conference on Engineering and Deployment of Cooperative Information Systems, 208-219, Springer-Verlag, Germany, 2002.

Whitaker et al., "Scale and Performance in the Denali Isolation Kernel," *Proc. Sth Symp. Operating Systems Design and Implementation*, Usenix, 2002, pp. 195-210.

Willeford, "IBM Announces Virtualized Hosted Client Infrastructure with VMware", pp. 1-2, Oct. 19, 2005.

Wittner, O. and Helvik, B.E., "Distributed Soft Policy Enforcement by Swarm Intelligence; Application to Loadsharing and Protection," *Ann. Telecommun.*, vol. 59, No. 1-2, 10-24, 2004.

Written Opinion from PCT/US05/028607, mailed Mar. 31, 2006.

Written Opinion of International Searching Authority, PCT/US07/060895, mailed Sep. 21, 2007. 4 pages.

Written Opinion of International Searching Authority, PCT/US07/060963, mailed Jul. 24, 2008. 6 pages.

Written Opinion of International Searching Authority, PCT/US07/060963, mailed May 30, 2007. 4 pages.

Xia, H. et al., "Using Secure Coprocessors to Protect Access to Enterprise Networks," *Lecture Notes in Computer Science*, vol. 3462, *Proc. International IFIP-TC6 Networking Conference*, (Networking 2005), Springer-Verlag, Germany, 2005, *available at* http://www.cs.pitt.edu/~jcb/papers/net2005.pdf.

Xu, Y. et al., "An Agent-Based Data Collection Architecture for Distributed Simulations," *Int'l J. of Modelling and Simulation*, 24(2), 55-64, 2004.

Yang, K. et al., "Service and Network Management Middleware for Cooperative Information Systems through Policies and Mobile Agents," Lecture Notes in Computer Science, vol. 2480, Proc. First International Conference on Engineering and Deployment of Cooperative Information Systems, 232-246, Springer-Verlag, Germany, 2002.

Yang, S., "Setting up a Secure Public Workstation," 153-162.

Yocom, B., et a/., "A First Look at Wireless Security Products," *Business Comm. Review*, 36-48, Oct. 2003.

Yu, Y. et al., "Quality of Service Policy Control in Virtual Private Networks," *Proc. of SPIE*, vol. 5282, 1055-1060, 2003.

Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.

Lin, et al "User-driven scheduling of interactinve virtual machines"-IEEE Computer Society, international conference on grid computing proceedings of the 5th IEEE/ACM international workshop on grid computing (GRID '04).

Sun Ray Interoperability Brief (Sun Microsystem White Paper, Aug. 2003).

Final Office Action on U.S. Appl. No. 11/559, 635 dated Jan. 28, 2010.

Final Office Action on U.S. Appl. No. 11/563,958 dated Mar. 18, 2010.

Final Office Action on U.S. Appl. No. 11/559,658 dated Dec. 29, 2009.

Final Office Action on U.S. Appl. No. 11/563,932 dated Nov. 17, 2009.

Final Office Action on U.S. Appl. No. 11/559,635 dated Dec. 8, 2010.

Final Office Action on U.S. Appl. No. 11/559,658 dated Sep. 14, 2010.

Final Office Action on U.S. Appl. No. 11/552,315 dated Nov. 27, 2009.

Final Office Action on U.S. Appl. No. 11/552,787 dated Mar. 17, 2010.

Final Office Action on U.S. Appl. No. 11/624,394 dated Apr. 13, 2010.

Final Office Action on U.S. Appl. No. 11/624,395 dated Sep. 9, 2010.

Final Office Action on U.S. Appl. No. 11/624,402 dated Apr. 20, 2009.

Final Office Action on U.S. Appl. No. 11/624,403 dated Aug. 30, 2010.

Non Final Office Action on U.S. Appl. No. 11/624,402 dated Oct. 29, 2008.

Non-Final Office Action on U.S. Appl. No. 11/624,395 dated Feb. 24, 2010.
Non-Final Office Action on U.S. Appl. No. 11/563,932 dated Apr. 13, 2009.
Non-Final Office Action on U.S. Appl. No. 11/559,635 dated May 18, 2009.
Non-Final Office Action on U.S. Appl. No. 11/559,635 dated May 27, 2010.
Non-Final Office Action on U.S. Appl. No. 11/559,658 dated Apr. 5, 2010.
Non-Final Office Action on U.S. Appl. No. 11/559,658 dated Apr. 30, 2009.
Non-Final Office Action on U.S. Appl. No. 11/552,787 dated Jul. 1, 2009.
Non-Final Office Action on U.S. Appl. No. 11/552,787 dated Jul. 8, 2010.
Non-Final Office Action on U.S. Appl. No. 11/563,958 dated Sep. 17, 2009.
Non-Final Office Action on U.S. Appl. No. 11/624,394 dated Oct. 30, 2009.
Non-Final Office Action on U.S. Appl. No. 11/624,395 dated May 1, 2009.
Non-Final Office Action on U.S. Appl. No. 11/624,396 dated Jan. 29, 2010.
Non-Final Office Action on U.S. Appl. No. 11/624,402 dated Mar. 11, 2010.
Non-Final Office Action on U.S. Appl. No. 11/624,403 dated Mar. 19, 2010.
Notice of Allowance on U.S. Appl. No. 11/624,394 dated Sep. 2, 2010.
Office Action on U.S. Appl. No. 11/552,315 dated Jan. 5, 2011.
Notice of Allowance on U.S. Appl. No. 11/624,396 dated Jul. 29, 2010.
Notice of Allowance on U.S. Appl. No. 11/624,402 dated Nov. 18, 2010.
Notice of Allowance on U.S. Appl. No. 11/624,402 dated Nov. 24, 2010.
Notice of Allowance on U.S. Appl. No. 11/624,402 dated Aug. 11, 2010.
Notice of Allowance on U.S. Appl. No. 11/624,402 dated Mar. 3, 2011.
Office Action on U.S. Appl. No. 11/552,315 dated Jun. 25, 2010.
Notice of Allowance on U.S. Appl. No. 11/624,396 Nov. 15, 2010.
Written Opinion for PCT/US05/028605, mailed on Jan. 18, 2006.

* cited by examiner

FIG.16B

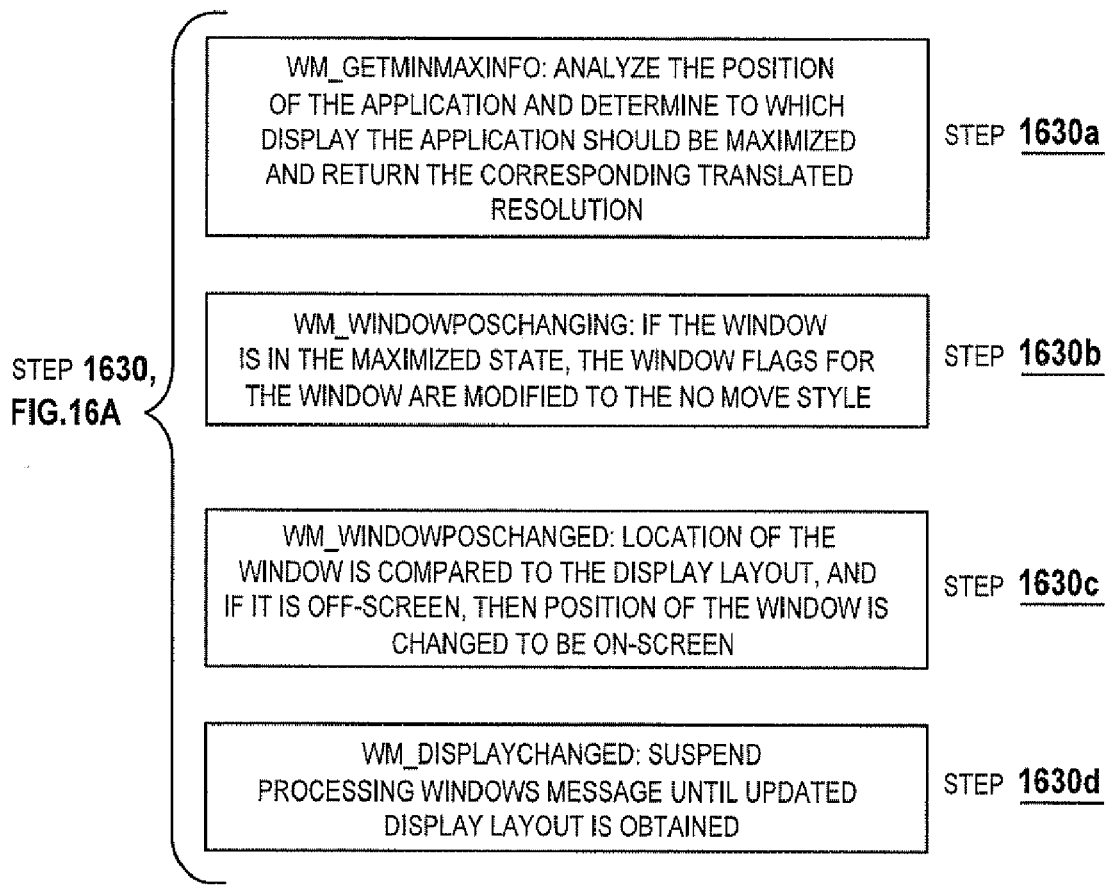

STEP 1630, FIG.16A:

- STEP 1630a — WM_GETMINMAXINFO: ANALYZE THE POSITION OF THE APPLICATION AND DETERMINE TO WHICH DISPLAY THE APPLICATION SHOULD BE MAXIMIZED AND RETURN THE CORRESPONDING TRANSLATED RESOLUTION
- STEP 1630b — WM_WINDOWPOSCHANGING: IF THE WINDOW IS IN THE MAXIMIZED STATE, THE WINDOW FLAGS FOR THE WINDOW ARE MODIFIED TO THE NO MOVE STYLE
- STEP 1630c — WM_WINDOWPOSCHANGED: LOCATION OF THE WINDOW IS COMPARED TO THE DISPLAY LAYOUT, AND IF IT IS OFF-SCREEN, THEN POSITION OF THE WINDOW IS CHANGED TO BE ON-SCREEN
- STEP 1630d — WM_DISPLAYCHANGED: SUSPEND PROCESSING WINDOWS MESSAGE UNTIL UPDATED DISPLAY LAYOUT IS OBTAINED

FIG.16C

FROM STEP 1615, FIGURE 16A

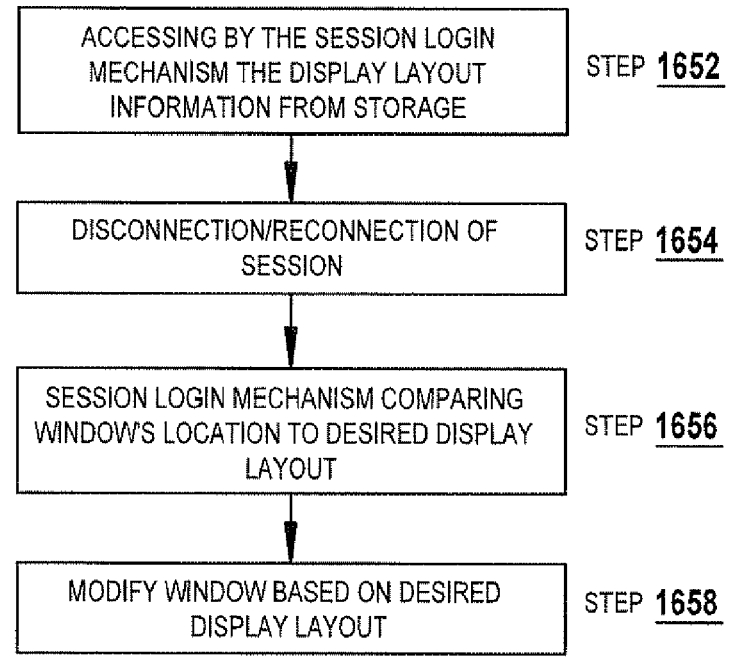

- STEP 1652 — ACCESSING BY THE SESSION LOGIN MECHANISM THE DISPLAY LAYOUT INFORMATION FROM STORAGE
- STEP 1654 — DISCONNECTION/RECONNECTION OF SESSION
- STEP 1656 — SESSION LOGIN MECHANISM COMPARING WINDOW'S LOCATION TO DESIRED DISPLAY LAYOUT
- STEP 1658 — MODIFY WINDOW BASED ON DESIRED DISPLAY LAYOUT

FIG.52

CLIENT MACHINE 10  COMMUNICATION CHANNEL 5004  MACHINE 30

---- BREAK IN FIRST COMMUNICATION SESSION ----

TRANSMIT FIRST KEY AND FIRST SID (STEP 5205)  →  (STEP 5200) FIRST KEY, FIRST SID  →  RETRIEVE ENCRYPTED AUTHENTICATION CREDENTIALS USING FIRST SID (STEP 5210)

↓

DECRYPT ENCRYPTED AUTHENTICATION CREDENTIALS- (STEP 5215)

↓

RE-AUTHENTICATE CLIENT USING AUTHENTICATION CREDENTIALS (STEP 5220)

↓

CREATE SECOND KEY- (STEP 5225)

↓

ENCRYPT NEW AUTHENTICATION CREDENTIALS WITH SECOND KEY- (STEP 5230)

↓

CREATE SECOND SID- (STEP 5235)

↓

STORE SECOND SID AND SECOND KEY- (STEP 5245)  ←  SECOND KEY, SECOND SID  ←  TRANSMIT SECOND KEY AND SECOND SID TO CLIENT- (STEP 5240)

↓

DELETE SECOND KEY- (STEP 5250)

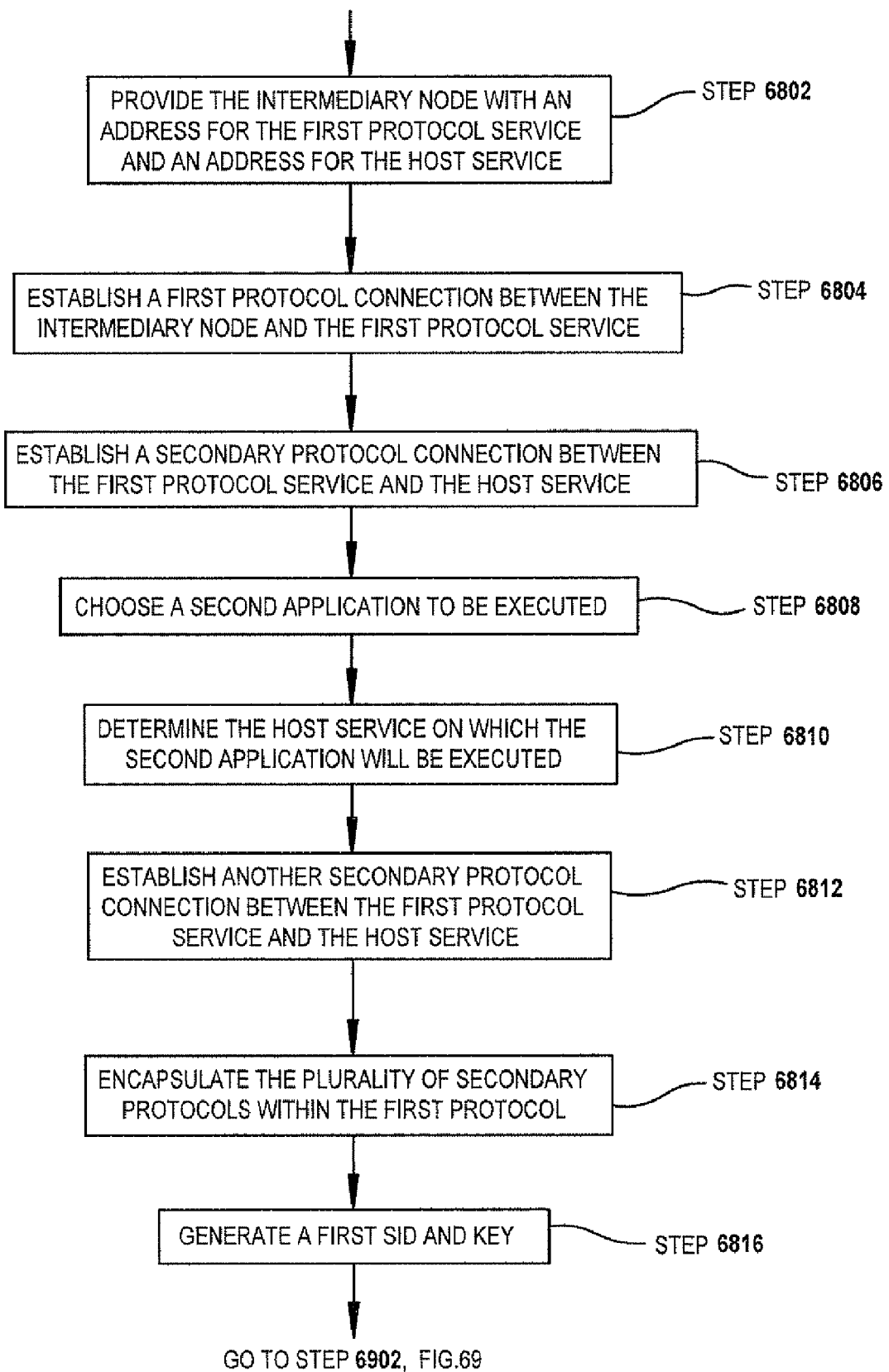

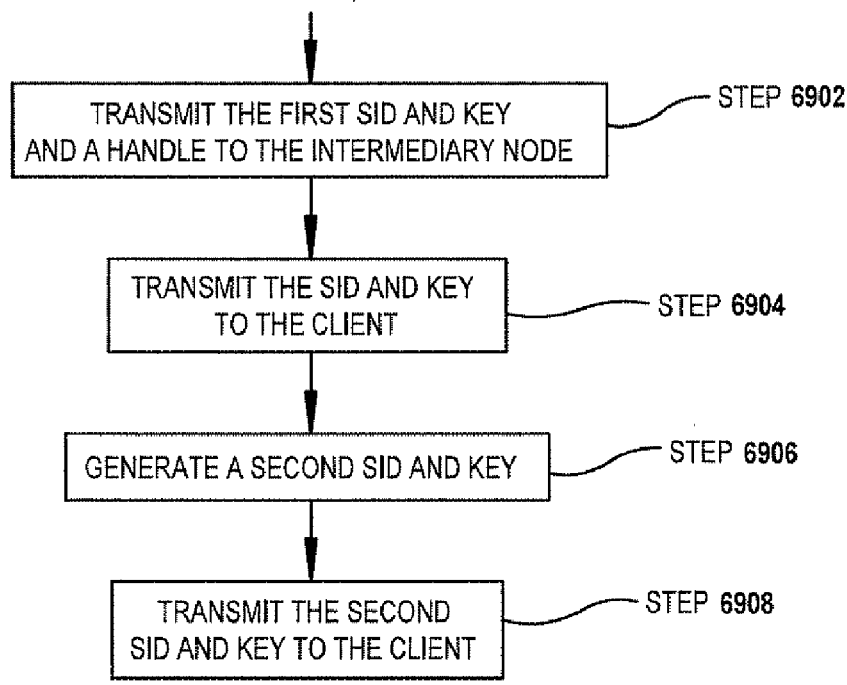
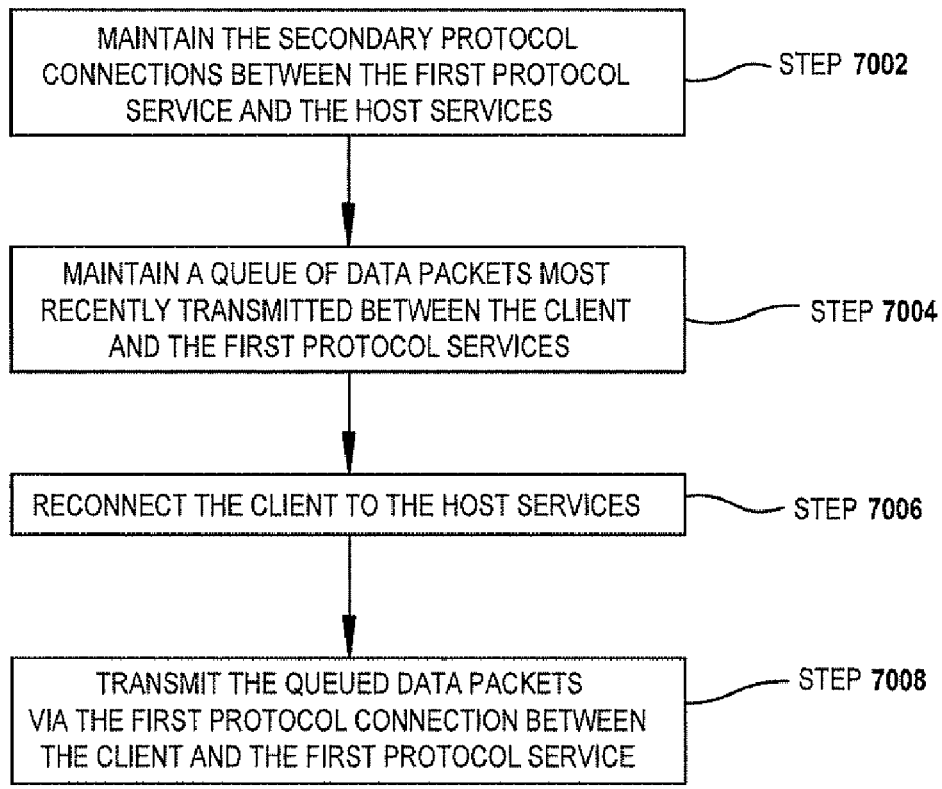

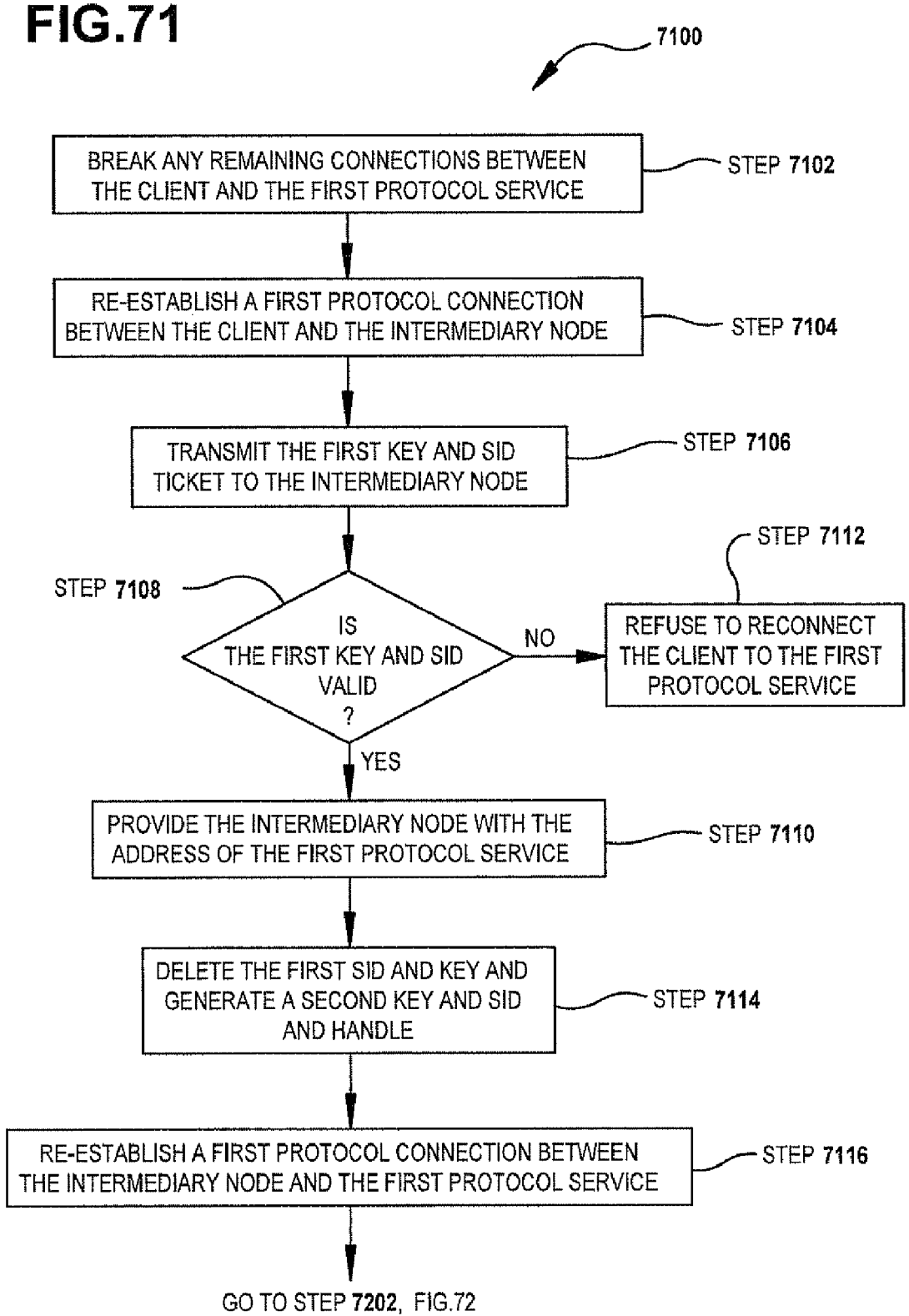

- 7610 — DETECT USE OF INPUT DEVICE
- 7620 — MARK DETECTION TIME
- 7630 — GENERATE MESSAGE
- 7640 — MARK TIME OF GENERATION COMPLETION
- 7650 — TRANSMIT MESSAGE
- 7660 — MARK TIME OF TRANSMISSION

- 7710 — RECEIVE GRAPHIC RESPONSE
- 7720 — MARK TIME OF RECEPTION
- 7730 — PROCESS GRAPHIC RESPONSE
- 7740 — MARK TIME OF COMPLETION OF PROCESSING
- 7750 — DETECT GRAPHIC RESPONSE ON DISPLAY
- 7760 — MARK TIME OF DETECTION

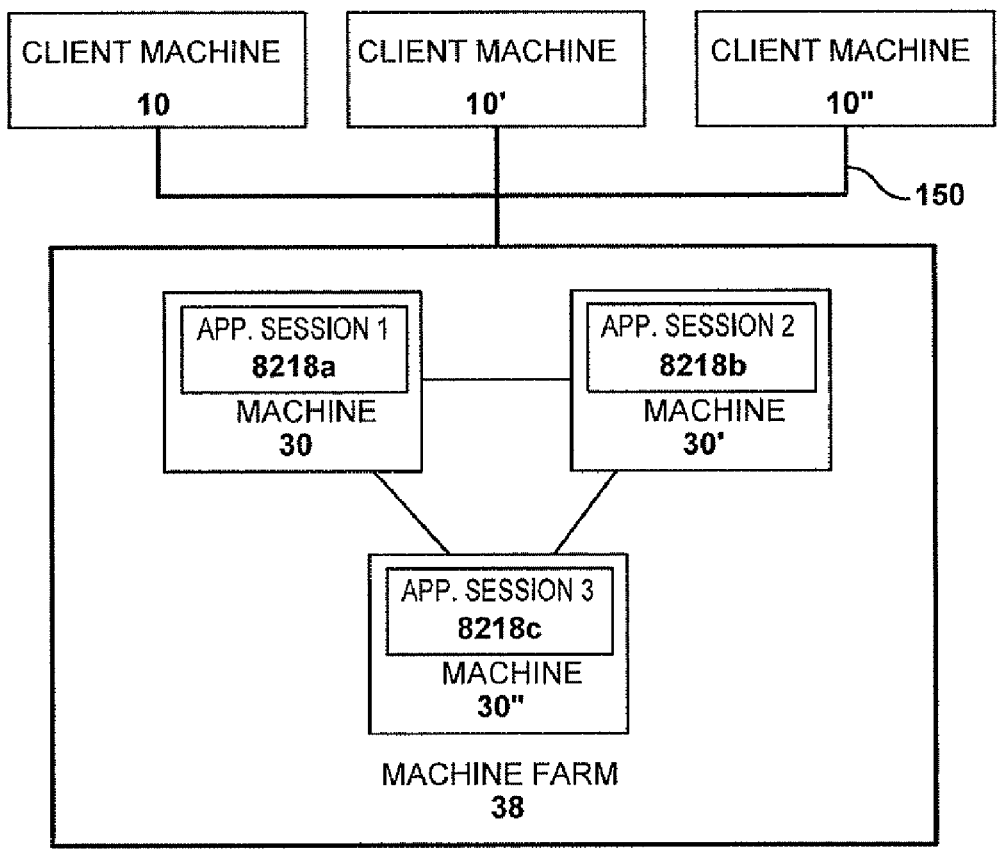

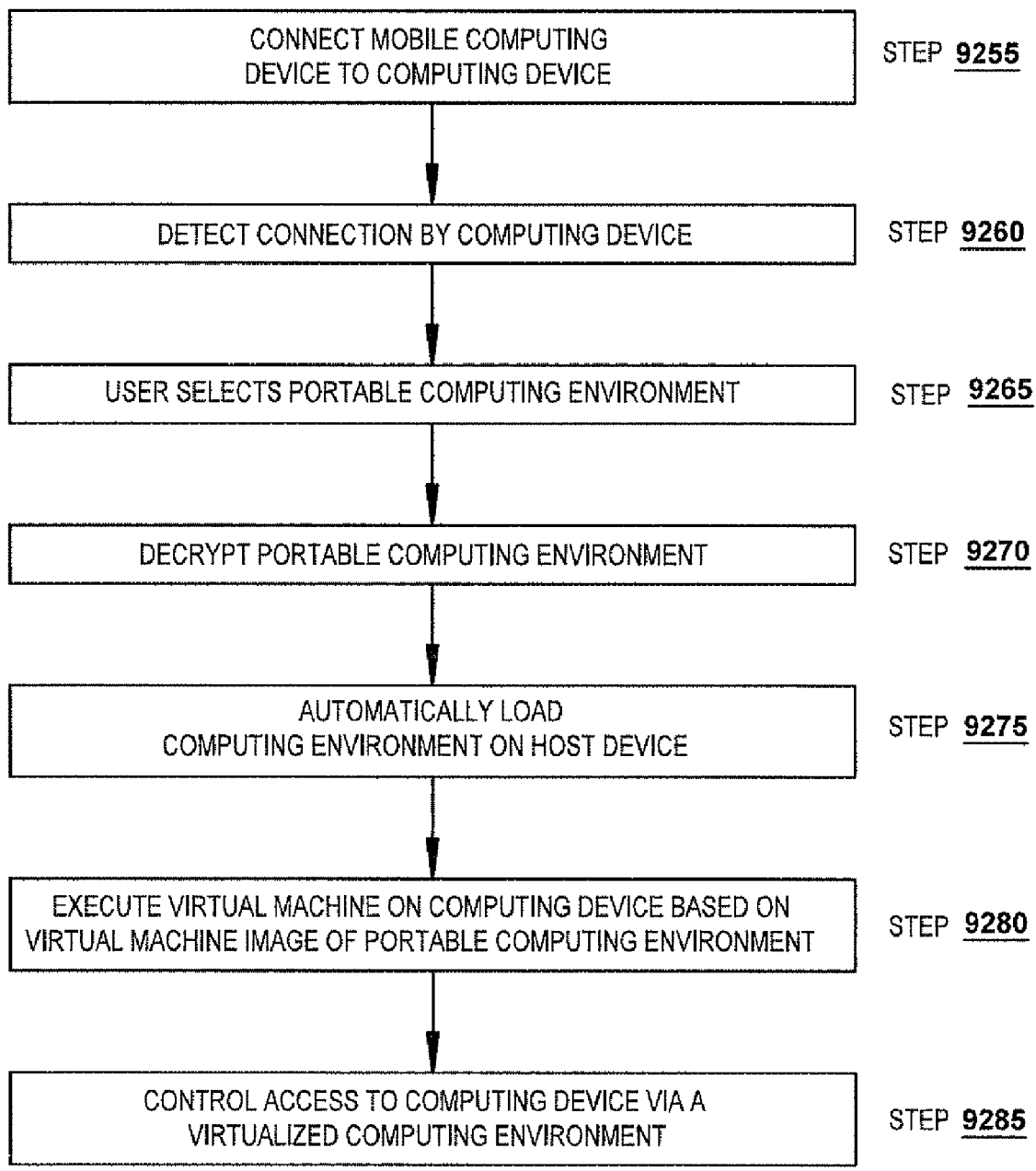

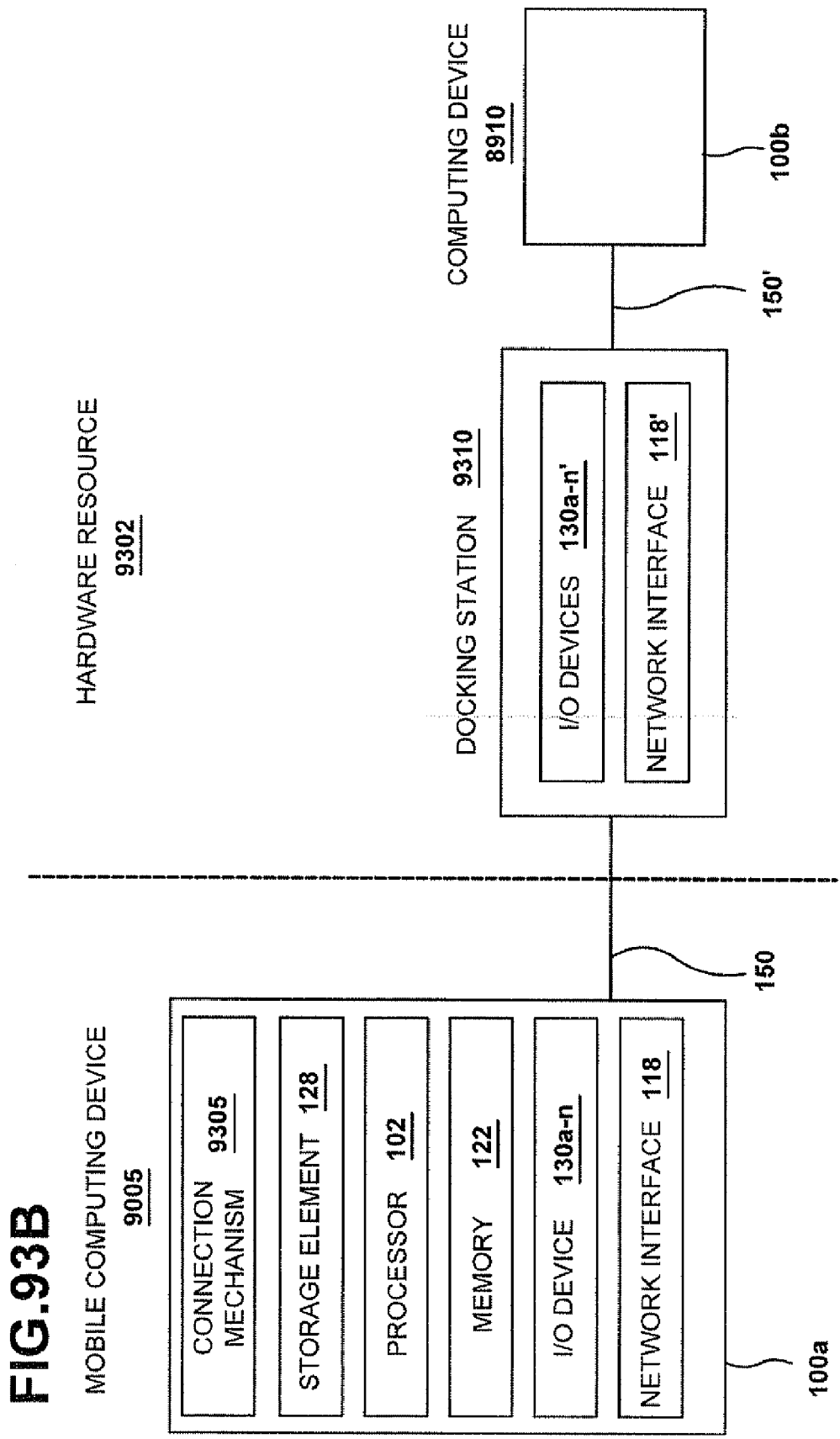

METHODS AND SYSTEMS FOR PROVIDING ACCESS TO A COMPUTING ENVIRONMENT PROVIDED BY A VIRTUAL MACHINE EXECUTING IN A HYPERVISOR EXECUTING IN A TERMINAL SERVICES SESSION

RELATED APPLICATIONS

The present application claims priority to U.S. Provisional Patent Application Ser. No. 60/761,674, entitled "Methods and Systems for Providing Access to a Computing Environment," filed Jan. 24, 2006, which is incorporated herein by reference.

FIELD OF THE INVENTION

The invention generally relates to providing access to computing environments. More particularly, the invention relates to methods and systems for establishing a connection between a client system and a virtual machine.

BACKGROUND INFORMATION

Desktop deployment strategies, such as personal desktop deployment or server-based computing deployment strategies, suffer from drawbacks. Conventional desktop PC deployment strategies create significant problems with management, upgrade cycles and support requirements that directly translate into a high total cost of ownership. Each desktop PC is installed on the user's desktop, and any hardware maintenance typically requires IT personnel to come to the user's desk. Additionally, PCs age rapidly and are usually replaced on a recurring basis as the hardware becomes dated and/or obsolete. Remote access and distributed, multi-office deployments may amplify these problems.

A server-based computing model solves many of the desktop PC deployment model problems, but at the expense of a less flexible environment. In typical server-based computing architectures, each server hosts a number of users and applications, meaning that one user or application may affect the performance perceived by other users served by the same server. The performance issue associated with thin clients may result in enterprises using server-based computing only for specific niche applications, such as remote access applications. The deployment strategy of combining the desktop PC and the thin client/server-based computing model is subject to these same limitations as each PC still needs to be managed, and the operating system and software may still need to be patched and updated. It would be desirable to provide a system having a lower total cost of ownership of traditional server-based computing systems while avoiding the performance degradation those systems can suffer.

SUMMARY OF THE INVENTION

In one aspect, problems of current desktop deployment strategies are addressed. An array of inexpensive physical machines may be partitioned into multiple virtual machines, creating a virtual PC for each user. The physical machines may be servers such as rack-mount servers, blade servers, or standalone servers. The physical machines may also be workstations or workstation blades or personal computers. A policy-based dynamic deployment system provisions the virtual machines and associates the virtual machine with an execution machine (i.e., a physical machine) and a user. Centralized hosting provides the manageability of server-based computing while the dedicated environment provides the flexibility and compatibility with applications that a desktop PC enables. However, the system has a much lower total cost of ownership—because the system is implemented in software, rather than being dependent on hardware, the system has a much lower total cost of ownership.

In another aspect, the hardware lifecycle may be extended by increasing the amount of hardware resources assigned to virtual machines as computational demands increase over time. Additionally, the use of virtualization eases the difficulty in dealing with multiple OS images.

In one embodiment, machines are configured to run multiple copies of one or more operating systems (e.g. different versions/releases of WINDOWS from Microsoft Corporation). Users transmit requests for access to computing resources to the deployment system, which may use a configuration policy to decide how (with what physical and/or virtual resources) and where (on which physical machine in the machine farm and on which virtual machine) to provide access to the requested computing resource. The virtual machine can be created on demand, and the requested software resource may be downloaded and installed in the virtual machine as required. Alternatively, the virtual machine may be pre-configured with a plurality of software and/or virtual hardware resources to provide a particular computing environment to the user. The user request is directed to the selected, configured virtual machine and a remote display connection is established between the virtual machine and a remote display client on the user's access device, which will be referred to generally as a "client machine." Devices such as CD-ROM drives, floppy drives, USB drives and other similar devices that are connected to the client machine are connected and remotely accessible to the virtual machine, thereby allowing the use of these devices in a manner similar to a standard desktop computer.

A deployment system may manage a pool of virtual machines (a machine farm) to which new virtual machines can be added on demand. Alternatively, a plurality of software modules, including a session management component and a virtual machine management component may provide management functionality. Executing virtual machines may be migrated from one physical machine to another, under control of the deployment system, to provide load balancing or to facilitate hardware maintenance. Inactive virtual machines may be suspended to free physical computing resources. Active virtual machines may be migrated from one physical machine to another to consolidate them onto a smaller number of physical machines to allow the unused physical machines to be shutdown to save power during off-peak periods or to free the physical resource to be reassigned for a different purpose e.g. process web requests. Suspended virtual machines may be resumed prior to users requiring access. This can be done manually or automatically via policies or preferences or through a learning process by monitoring a user's behavior over time.

Performance requirements of the requested resource may be considered when allocating computing resources to virtual machines. For example, a financial analysis package may require twice as many CPU resources as a generic productivity application, such as those included in MICROSOFT OFFICE, manufactured by Microsoft Corporation of Redmond, Wash. A virtual machine providing the financial analysis package may execute on a physical machine determined to have sufficient spare computational capacity, or existing virtual machines may be relocated to other available physical machines to ensure sufficient available capacity on a particular physical machine.

Each user is provided a separate virtual machine environment, which provides increased flexibility in that each user may run any version or configuration of an operating system independently of other users and also allows users to run potentially dangerous or destabilizing applications with little risk of affecting other users. This is particularly useful for developers/testers/information technology personnel who frequently need to reinstall and modify the operating system and run potentially destabilizing applications.

Since sharing computing resources and CPU scheduling occurs outside of the virtual machine environment, users can run computing-resource intensive resources with no risk of affecting other users. Virtual machines also provide increased security isolation between users. Because each user is running a separate copy of the OS, there is much less chance of security breaches and virus infections over the between-users boundaries than in the shared OS case.

A solution is also provided for problems that arise from a situation where, in a hardware-based system of machines, the hardware is mixed, whether due to an initial purchasing decision or due to the acquisition of different types of physical machines over time. Even if initially all of the hardware was uniform, purchasing additional hardware to replace failing modules and increasing the capacity typically leads to non-uniform hardware throughout a machine farm. Even if all hardware is purchased from the same vendor, it is likely that the hardware purchased later will use different chipsets and components, and will require different drivers. Non-uniform hardware has traditionally translated into the need to maintain multiple versions of the operating system images (which means higher costs) and limits flexibility of moving users between machines—because the operating system image may be incompatible—which also translates into higher cost. Virtual machines allow efficient use of the same operating system image even in a hardware farm that includes heterogeneous machines. The use of the same operating system image helps to significantly reduce the management cost.

Adding remote display capability (e.g. presentation layer protocols, such as ICA, RDP, or X11) to virtualization techniques allows virtualization to be used for interactive computing. Hosting multiple virtual machines on an execution machine allows better utilization of the available physical computing resources (e.g.: space, power, processing power, processing capacity, RAM, bandwidth, etc.) thereby lowering costs. The use of virtualization also allows hardware to be updated and maintained independently of OS version and specific device drivers hosted in the operating systems or virtual machines. Additionally, virtual machines enhance system security by isolating computing environments from each other.

In still another aspect, a method for providing access to a computing environment includes the step of receiving, by a broker machine, a request from a client machine for access to a computing environment, the request including an identification of a user of the client machine. One of a plurality of virtual machines is identified by a session management component, the identified virtual machine providing the requested computing environment. One of a plurality of execution machines is identified, the identified execution machine providing a terminal services session in which a hypervisor executes to provide access to hardware resources required by the identified virtual machine. The hypervisor launches the identified virtual machine. A connection is established between the client machine and the identified virtual machine via the terminal services session.

In one embodiment, the broker machine launches the session management component. In another embodiment, the broker machine launches the session management component in a terminal services session executing on the broker machine. In still another embodiment, one of the plurality of virtual machines is identified responsive to the received identification of the user of the client machine. In even still another embodiment, the one of the plurality of virtual machines is identified responsive to a request by the client for a type of virtual machine. In yet another embodiment, the one of the plurality of execution machines is identified responsive to a request by the client machine for a type of computing environment.

In one embodiment, the identified virtual machine is launched in the hypervisor. In another embodiment, a connection is established between the client machine and the identified virtual machine using a presentation layer protocol.

In yet another aspect, in a system providing access to a computing environment by a broker machine to a client machine, an execution machine executing a terminal services session executing in a hypervisor providing access to hardware resources required by the computing environment, an apparatus comprises an identification component, an execution component, and a management component. The identification component is in communication with a virtual machine management component and receives an identification of one of a plurality of virtual machines, the identified virtual machine provided in a hypervisor executing in a terminal services session and providing a requested computing environment. The execution component provisions the identified virtual machine. The management component establishes a connection between the client machine and the identified virtual machine via the terminal services session and manages the connection.

In one embodiment, a virtual machine service component executing in the hypervisor receives configuration information associated with the client machine. In another embodiment, the virtual machine service component executes in the identified virtual machine, the virtual machine service component in communication with the apparatus and receiving configuration information associated with the client machine. In still another embodiment, the identification component receives from the virtual machine management component an identification of one of a plurality of execution machines. In yet another embodiment, the identification component identifies one of a plurality of execution machines, the identification component launching the identified virtual machine into a hypervisor executing on the identified execution machine.

In one embodiment, the identification component receives an identification of one of a plurality of execution machines. In another embodiment, the identification component comprises a transceiver receiving an identification by a user of the client machine of a type of computing environment requested and transmits the identification of the type of computing environment requested to the virtual machine management component. In yet another embodiment, the management component establishes a connection between the client machine and the virtual machine, via a terminal services session using a presentation layer protocol.

BRIEF DESCRIPTION OF THE DRAWINGS

These and other aspects of this invention will be readily apparent from the detailed description below and the appended drawings, which are meant to illustrate and not to limit the invention, and in which:

FIG. 16B is a flow diagram depicting one embodiment of a process to modify a window message;

FIG. 16C is a flow diagram depicting one embodiment of the steps taken to associate a display layout with a client machine;

FIG. 52 is a flow diagram of the steps followed in an embodiment of the computer system of FIG. 50 to maintain authentication credentials during a second communication session following the termination of the first communication session of FIG. 53A in accordance with the invention;

FIGS. 67-69 are flow diagrams of a method for connecting a client to a plurality of host services according to an embodiment of the invention;

FIG. 70 is a flow diagram of a method for providing a client with a reliable connection to host services and for reconnecting the client to the host services according to an embodiment of the invention;

FIGS. 71-72 are flow diagrams of a method for reconnecting a client to host services according to an embodiment of the invention;

FIG. 82 is a schematic diagram depicting one embodiment of a client machine in communication with several remote machines;

FIG. 83 is a flow diagram depicting one embodiment of steps taken in a method to connect a user of a client machine to a computing environment;

FIG. 92B is a flow diagram depicting an embodiment of the steps taken in a method for establishing a computing environment on a computing device via a mobile computing device;

FIG. 93B is a block diagram depicting one embodiment of a docking station connecting a mobile computing device and a computing device;

DETAILED DESCRIPTION OF THE INVENTION

Figure 1:
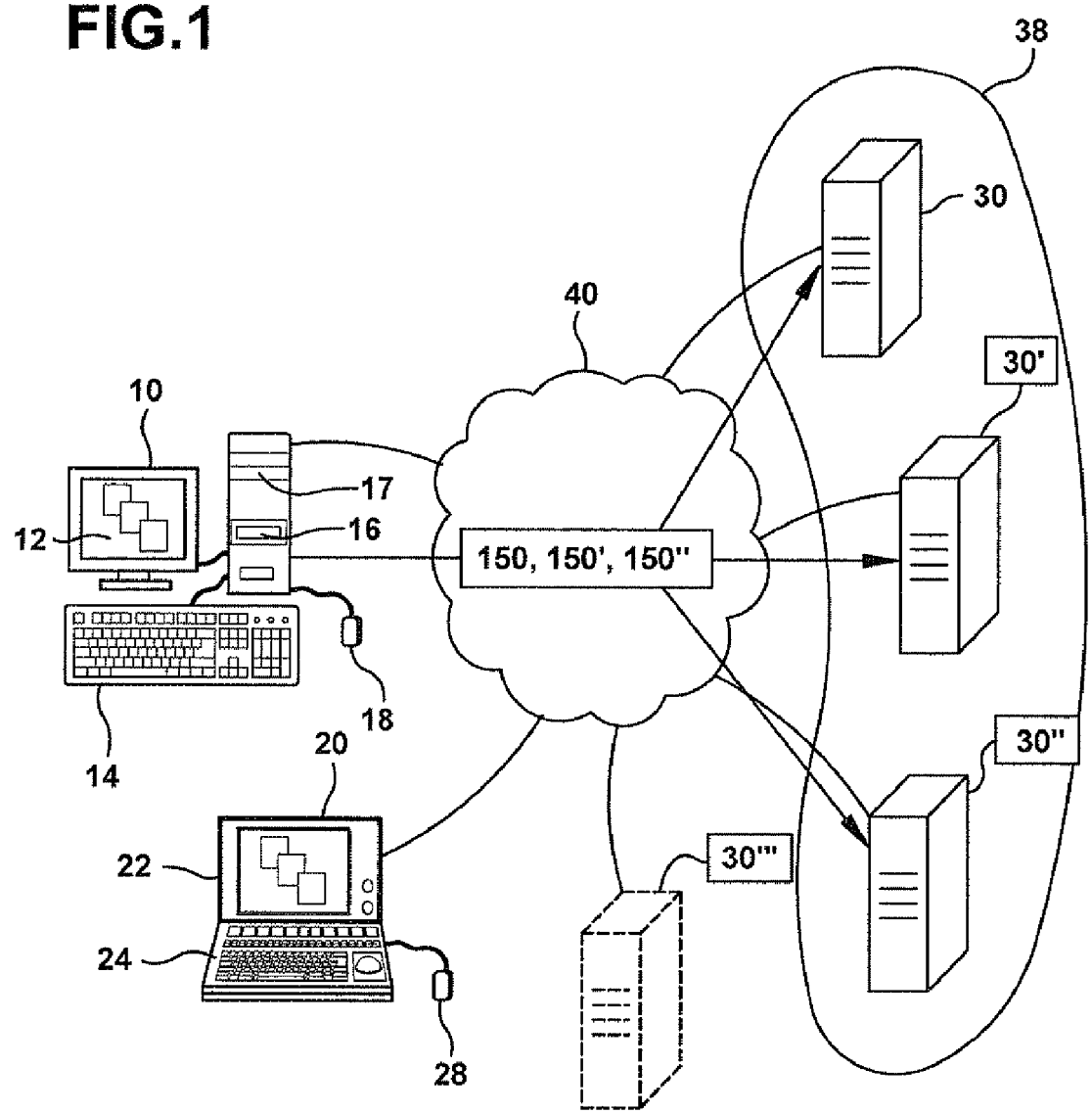
FIG. 1 is a block diagram of one embodiment of an environment in which a client machine accesses a computing resource provided by a remote machine.

Referring now to FIG. 1, a block diagram of one embodiment of an environment in which a client machine 10, 10' accesses a computing resource provided by a remote machine, 30, 30', 30", 30"' is shown.

A remote machine 30 such as remote machine 30, 30', 30", or 30"' (hereafter referred to generally as remote machine 30) accepts connections from a user of a client machine 10. Although only two client machines 10 and only four remote machines 30 are depicted in the embodiment shown in FIG. 1, it should be understood that the system may provide multiple ones of any or each of those components. For example, in one embodiment, the system may include multiple, logically-grouped remote machines 30, one or more of which is available to provide a client machine 10, 10' access to computing resources. In these embodiments, the logical group of remote machines may be referred to as a "server farm" or "machine farm," indicated in FIG. 1A as machine farm 38. In some of these embodiments, the remote machines 30 may be geographically dispersed. Thus, the group of remote machines 30 logically grouped as a machine farm 38 may be interconnected using a wide-area network (WAN) connection, metropolitan-area network (MAN) connection, a local area network (LAN) a storage-area network (SAN), or a public network such as the Internet. For example, a machine farm 38 may include remote machines 30 physically located in geographically diverse locations around the world, including different continents, regions of a continent, countries, regions of a country, states, regions of a state, cities, regions of a city, campuses, regions of a campus, or rooms. Data transmission speeds between remote machines 30 in the machine farm 38 can be increased if the remote machines 30 are connected using a local-area network (LAN) connection or some form of direct connection. A machine farm 38 may be administered as a single entity.

A centralized service may provide management for machine farm 38. In some embodiments, one or more remote machines 30 elect a particular remote machine 30 to provide management functionality for the farm. The elected remote machine 30 may be referred to as a management server, management node, or management process. The management node 30 may gather and store information about a plurality of remote machines 30, respond to requests for access to resources hosted by remote machines 30, and enable the establishment of connections between client machines 10 and remote machines 30. In other embodiments, an administrator designates one or more remote machines 30 to provide management functionality for machine farm 38.

Alternatively, management of the machine farm 38 may be de-centralized. In some embodiments, one or more remote machines 30 comprise components, subsystems and modules to support one or more management services for the machine farm 38. In one of these embodiments, one or more remote machines 30 provide functionality for management of dynamic data, including techniques for handling failover, data replication, and increasing the robustness of the machine farm 38. In another of these embodiments, one or more remote machines 30 include communications capabilities to enable the one or more remote machines 30 to interact with one another to share responsibility for management tasks. Each remote machine 30 may communicate with a persistent store and, in some embodiments, with a dynamic store.

Persistent store may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store for more than one machine farm 38. The persistent store maintains static data associated with each remote machine 30 in machine farm 38 and global data used by all remote machines 30 within the machine farm 38. In one embodiment, the persistent store may maintain the server data in a Lightweight Directory Access Protocol (LDAP) data model. In other embodiments, the persistent store stores server data in an ODBC-compliant database. For the purposes of this description, the term "static data" refers to data that do not change frequently, i.e., data that change only on an hourly, daily, or weekly basis, or data that never change.

The data stored by the persistent store may be replicated for reliability purposes physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

As described above, the remote machines 30 store "static" data, i.e., data that persist across client sessions, in the persistent store. Writing to the persistent store can take relatively long periods of time. To minimize accesses to the persistent store, the remote machines 30 may develop a logical, common database (i.e., the dynamic store) that is accessible by all of the remote machines 30 in the machine farm 38 for accessing and storing some types of data. The dynamic store may be physically implemented in the local memory of a single or multiple remote machines 30 in the machine farm 38. The local memory can be random access memory, disk, disk farm, a redundant array of independent disks (RAID), or any other memory device that allows data to be read and written.

In general, data stored in the dynamic store are data that are typically queried or changed frequently during runtime. Examples of such data (hereafter referred to as runtime data) are the current workload level for each of the remote machines 30 in the machine farm 38, the status of the remote machines 30 in the machine farm 38, client session data, the number of virtual machines supported by a remote machine 30, the identity of the operating systems supported by a remote machine 30, and licensing information.

In one embodiment, the dynamic store comprises one or more tables, each of which stores records of attribute-value pairs. Any number of tables may exist, but each table stores records of only one type. Tables are, in some embodiments identified by name. Thus, in this embodiment, two remote machines 30 that use the same name to open a table refer to the same logical table.

The dynamic store (i.e., the collection of all record tables) can be embodied in various ways. In one embodiment, the dynamic store is centralized; that is, all runtime data are stored in the memory of one remote machine 30 in the machine farm 38. That server operates in a manner similar to the management node described above, that is, all other remote machines 30 in the machine farm 38 communicate with the server acting as the centralized data store when seeking access to that runtime data. In another embodiment, each remote machine 30 in the machine farm 38 keeps a full copy of the dynamic store. Here, each remote machine 30 communicates with every other remote machine 30 to keep its copy of the dynamic store up to date.

In another embodiment, each remote machine 30 maintains its own runtime data and communicates with every other remote machine 30 when seeking to obtain runtime data from them. Thus, for example, a remote machine 30 attempting to find an application program requested by the client machine 10 may communicate directly with every other remote machine 30 in the machine farm 38 to find one or more servers hosting the requested application.

For machine farms 38 having a large number of remote machines 30, the network traffic produced by these embodiments can become heavy. One embodiment alleviates heavy network traffic by designating a subset of the remote machines 30 in a machine farm 38, typically two or more, as "collector points." Generally, a collector point is a server that collects run-time data. Each collector point stores runtime data collected from certain other remote machines 30 in the machine farm 38. Each remote machine 30 in the machine farm 38 is capable of operating as, and consequently is capable of being designated as, a collector point. In one embodiment, each collector point stores a copy of the entire dynamic store. In another embodiment, each collector point stores a portion of the dynamic store, i.e., it maintains runtime data of a particular data type. The type of data stored by a remote machine 30 may be predetermined according to one or more criteria. For example, remote machines 30 may store different types of data based on their boot order. Alternatively, the type of data stored by a remote machine 30 may be configured by an administrator using administration tool 140. In these embodiments, the dynamic store is distributed among two or more remote machines 30 in the machine farm 38.

Remote machines 30 not designated as collector points know the remote machines 30 in a machine farm 38 that are designated as collector points. A remote machine 30 not designated as a collector point communicates with a particular collector point when delivering and requesting runtime data. Consequently, collector points lighten network traffic because each remote machine 30 in the machine farm 38 communicates with a single collector point remote machine 30, rather than with every other remote machine 30, when seeking to access the runtime data.

The machine farm 38 can be heterogeneous, that is, one or more of the remote machines 30 can operate according to one type of operating system platform (e.g., WINDOWS NT, manufactured by Microsoft Corp. of Redmond, Wash.), while one or more of the other remote machines 30 can operate according to another type of operating system platform (e.g., Unix or Linux). Additionally, a heterogeneous machine farm 38 may include one or more remote machines 30 operating according to a type of operating system, while one or more other remote machines 30 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by XenSource, Inc., of Palo Alto; the VirtualServer or virtual PC hypervisors provided by Microsoft or others.

In some embodiments, a hypervisor executes on a machine executing an operating system. In one of these embodiments, a machine executing an operating system and a hypervisor may be said to have a host operating system (the operating system executing on the machine), and a guest operating system (an operating system executing within a computing resource partition provided by the hypervisor). In other embodiments, a hypervisor interacts directly with hardware on a machine, instead of executing on a host operating system. In one of these embodiments, the hypervisor may be said to be executing on "bare metal," referring to the hardware comprising the machine.

Remote machines 30 may be servers, file servers, application servers, appliances, network appliances, gateways, application gateways, gateway servers, virtualization servers, deployment servers, or firewalls. The remote machine 30 may be an SSL VPN server. The remote machine 30 may be an application acceleration appliance. For embodiments in which the remote machine 30 is an application acceleration appliance, the remote machine 30 may provide functionality including firewall functionality, application firewall functionality, or load balancing functionality. In some embodiments, the remote machine 30 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 30 comprises a remote authentication dial-in user service, referred to as a RADIUS server. In other embodiments, remote machines 30 may have the capacity to function as a master network information node monitoring resource usage of other machines in the farm 38. In still other embodiments, a remote machine 30 may provide an Active Directory. Remote machines 30 may be referred to as execution machines, intermediate machines, broker machines, intermediate broker machines, or worker machines.

In one embodiment, remote machines 30 in the machine farm 38 may be stored in high-density racking systems, along with associated storage systems, and located in an enterprise data center. In this embodiment, consolidating the machines in this way may improve system manageability, data security, the physical security of the system, and system performance by locating machines and high performance storage systems on localized high performance networks. Centralizing the machines and storage systems and coupling them with advanced system management tools allows more efficient use of machine resources.

The client machines 10 may also be referred to as endpoints, client nodes, clients, or local machines. In some embodiments, the client machines 10 have the capacity to function as both client machines seeking access to resources and as remote machines 30 providing access to remotely hosted resources for other client machines 10. In some embodiments, remote machines 30 may request access to remotely-hosted resources. In one of these embodiments, the remote machines 30 may be referred to as client machines 10.

In one embodiment, the client machine 10 communicates directly with one of the client machines 30 in a machine farm 38. In another embodiment, the client machine 10 executes an application to communicate with the remote machine 30 in a machine farm 38. In yet another embodiment, the client machine 10 communicates with one of the remote machines 30 via a gateway, such as an application gateway. In some embodiments, the client machine 10 communicates with the remote machine 30 in the machine farm 38 over a communications link 150. Over the communications link 150, the client machine 10 can, for example, request access to or execution of various resources provided by remote machines 30, such as applications, computing environments, virtual machines, or hypervisors hosted by or executing on the remote machines 30, 30', 30", and 30''' in the machine farm 38. The client machine 10, 10' receives for display output of the results of execution of the resource or output of interaction between the client machine 10 and the applications or computing environments provided by the remote machines 30. In another of these embodiments, over the communications link 150, the client machine 10 can receive the output of applications executing in one or more virtual machines on a remote machine 30, 30', 30", and 30''' in the machine farm 38.

The communications link 150 may be synchronous or asynchronous and may be a LAN connection, MAN connection, or a WAN connection. Additionally, communications link 150 may be a wireless link, such as an infrared channel or satellite band. The communications link 150 may use a transport layer protocol such as TCP/IP or any application layer protocol, such as the Hypertext Transfer Protocol (HTTP), Extensible Markup Language (XML), Independent Computing Architecture Protocol (ICA) manufactured by Citrix Systems, Inc. of Ft. Lauderdale, Fla., or the Remote Desktop Protocol manufactured by the Microsoft Corporation of Redmond, Wash. In one embodiment, the communications link 150 uses a Wi-Fi protocol. In still another embodiment, the communications link 150 uses a mobile internet protocol.

The communications link 150 may provide communications functionality through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), and wireless connections or any combination thereof. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the remote machine 30 and the client machine 10 communicate via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The computer system 100 may include a network interface comprising a built-in network adapter, network interface card, PCMCIA network card, card bus network adapter, wireless network adapter, USB network adapter, modem or any other device suitable for interfacing the computer system 100 to any type of network capable of communication and performing the operations described herein.

The computer system 100 may support installation devices, such as a floppy disk drive for receiving floppy disks such as 3.5-inch, 5.25-inch disks or ZIP disks, a CD-ROM drive, a CD-R/RW drive, a DVD-ROM drive, network interface card, tape drives of various formats, USB device, hard-drive or any other device suitable for installing software, programs, data or files, such as any software, or portion thereof.

The computer system 100 may also include a storage device of any type and form for storing an operating system and other related software, and for storing application software programs. In one embodiment, the storage device includes one or more hard disk drives or redundant arrays of independent disks. In other embodiments, the storage device comprises any type and form of portable storage medium or device, such as a compact flash card, a micro hard drive or pocket drive, embedded flash storage, or USB storage drive. Portable storage devices may be generally referred to by a variety of names, including but not limited to, finger drive, flash disk, flash drive, flash memory drive, jump drive, jump stick, keychain drive, keydrive, memory key, mobile drive, pen drive, thumb drive, thumb key, vault drive, USB drive, or USB stick. Optionally, any of the installation devices or mediums could also provide a storage medium or device.

In some embodiments, the client machine 10 includes a client agent which may be, for example, implemented as a software program and/or as a hardware device, such as, for example, an ASIC or an FPGA. An example of a client agent with a user interface is a Web Browser (e.g., INTERNET EXPLORER manufactured by Microsoft Corp. of Redmond, Wash. or SAFARI, manufactured by Apple Computer of Cupertino, Calif.). The client agent can use any type of protocol, such as a remote display protocol, and it can be, for example, an HTTP client agent, an FTP client agent, an Oscar client agent, a Telnet client agent, an Independent Computing Architecture (ICA) client agent manufactured by Citrix Systems, Inc. of Fort Lauderdale, Fla., or a Remote Desktop Protocol (RDP) client agent manufactured by Microsoft Corporation of Redmond, Wash. In some embodiments, the client agent is configured to connect to the remote machine 30. In other embodiments (not shown), the client machine 10 includes a plurality of client agents, each of which may communicate with a remote machine 30, respectively.

In many embodiments, the remote machines 30, and the client machines 10, are provided as computers or computer servers, of the sort manufactured by Apple Computer, Inc., of Cupertino, Calif., International Business Machines of White Plains, N.Y., Hewlett-Packard Corporation of Palo Alto, Calif. or the Dell Corporation of Round Rock, Tex. In some embodiments, the remote machines 30 may be blade servers, servers, workstation blades or personal computers executing hypervisors emulating hardware required for virtual machines providing access to computing environments. In these embodiments, a single physical machine may provide multiple computing environments.

Figure 1A:
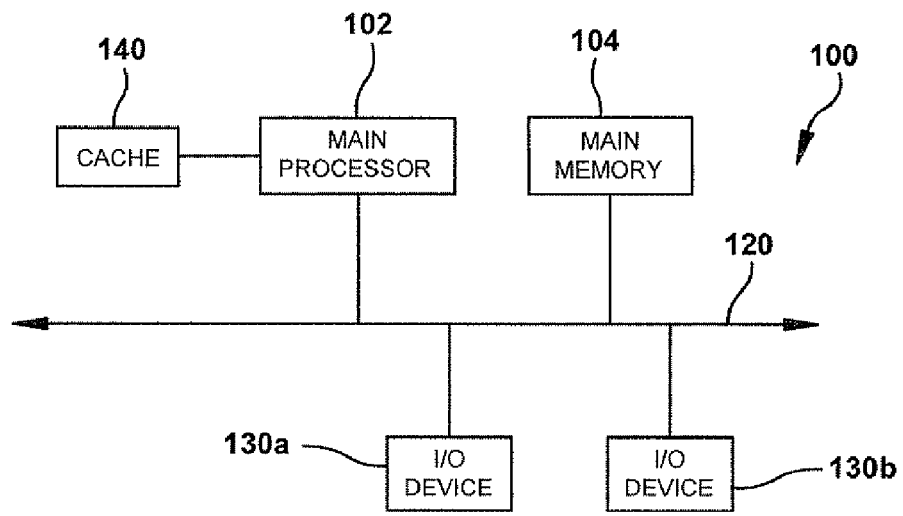
FIGS. 1A and 1B are block diagrams depicting embodiments of typical computers useful in embodiments with remote machines or client machines.
Figure 1B:
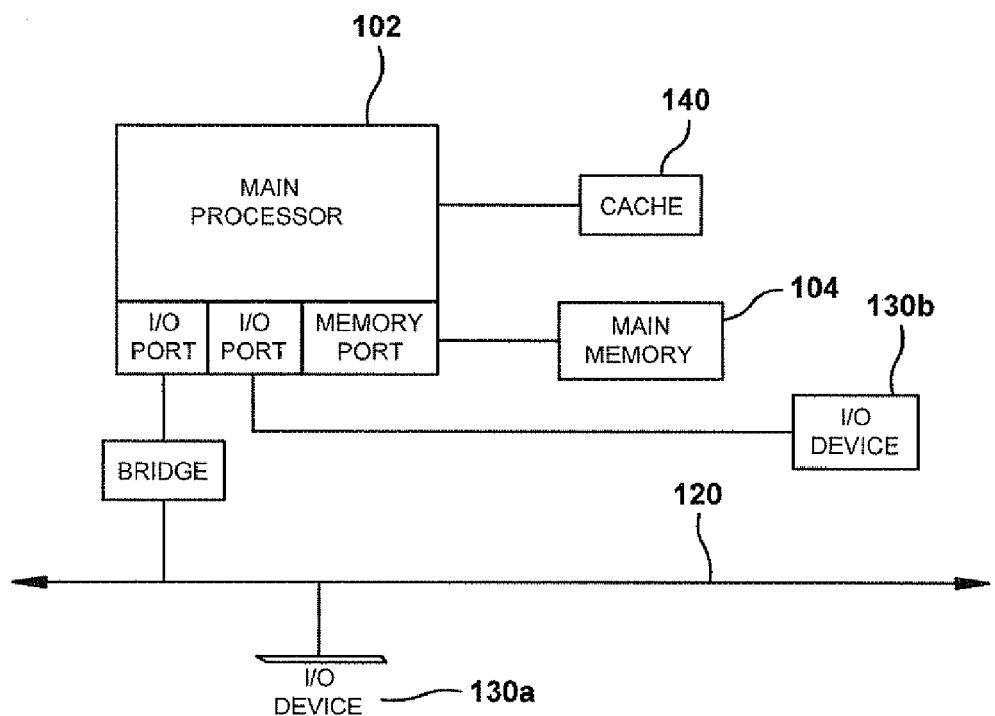

FIGS. 1A and 1B depict block diagrams of typical computer architectures useful in those embodiments as the remote machine 30, or the client machine 10. As shown in FIGS. 1A and 1B, each computer 100 includes a central processing unit 102, and a main memory unit 104. Each computer 100 may also include other optional elements, such as one or more input/output devices 130a-130n (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 1A, the processor 102 communicates with main memory 104 via a system bus 120 (described in more detail below). FIG. 1B depicts an embodiment of a computer system 100 in which the processor communicates directly with main memory 104 via a memory port. For example, in FIG. 1B, the main memory 104 may be DRDRAM.

FIG. 1A and FIG. 1B depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1A, the processor 102 communicates with various I/O devices 130 via a local system bus 120. Various buses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1B depicts an embodiment of a computer system 100 in which the main processor 102 communicates directly with I/O device 130b via HyperTransport, Rapid I/O, or InfiniBand. FIG. 1B also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, DVD-RW drive, DVD+RW drive, tape drives of various formats, and USB storage devices such as the USB Flash Drive line of devices manufactured by Twintech Industry, Inc. of Los Alamitos, Calif., and the iPod Shuffle line of devices manufactured by Apple Computer, Inc., of Cupertino, Calif.

In some embodiments, the client machine 10 may comprise or be connected to multiple display devices, which each may be of the same or different type and/or form. As such, any of the I/O devices 130a-130n may comprise a display device or any type and/or form of suitable hardware, software, or combination of hardware and software to support, enable or provide for the connection and use of multiple display devices by the client machine 10. For example, the client machine 10 may include any type and/or form of video adapter, video card, driver, and/or library to interface, communicate, connect or otherwise use the display devices. In one embodiment, a video adapter may comprise multiple connectors to interface to multiple display devices. In other embodiments, the client machine 10 may include multiple video adapters, with each video adapter connected to one or more of the display devices. In some embodiments, any portion of the operating system of the client machine 10 may be configured for using multiple displays. In other embodiments, one or more of the display devices may be provided by one or more other computing devices, such as remote machine 30 connected to the client machine 10, for example, via a network. These embodiments may include any type of software designed and constructed to use another computer's display device as a second display device for the client machine 10. One ordinarily skilled in the art will recognize and appreciate the various ways and embodiments that a client machine 10 may be configured to have multiple display devices.

In further embodiments, an I/O device 130 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 1A and FIG. 1B typically operate under the control of operating systems which control scheduling of tasks and access to system resources. In some embodiments, the computers operate under control of hypervisors, which represent virtualized views of physical hardware as one or more virtual machines. Operating systems may execute in these virtual machines to control the virtual machine in a manner analogous to the way a native operating system controls a physical machine. Typical operating systems include: the MICROSOFT WINDOWS family of operating systems, manufactured by Microsoft Corp. of Redmond, Wash.; the MacOS family of operating systems, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

The client machines 10 and 20 may be any personal computer (e.g., a Macintosh computer or a computer based on processors manufactured by Intel Corporation of Mountain View, Calif.), Windows-based terminal, Network Computer, wireless device, information appliance, RISC Power PC, X-device, workstation, mini computer, main frame computer, personal digital assistant, television set-top box, living room media center, gaming console, mobile gaming device, Net-PC's, thin client, or other computing device that has a windows-based desktop and sufficient persistent storage for executing a small, display presentation program. The display presentation program uses commands and data sent to it across communication channels to render a graphical display. Windows-oriented platforms supported by the client machines 10 and 20 can include, without limitation, WINDOWS 3.x, WINDOWS 95, WINDOWS 98, WINDOWS NT 3.51, WINDOWS NT 4.0, WINDOWS 2000, Windows 2003, WINDOWS CE, Windows XP, Windows Vista, MAC/OS, Java, Linux, and UNIX. The client machines 10 can include a visual display device (e.g., a computer monitor), a data entry device (e.g., a keyboard), persistent or volatile storage (e.g., computer memory) for storing downloaded application programs, a processor, and a mouse. Execution of a small, display presentation program allows the client machines 10 to participate in a distributed computer system model (i.e., a server-based computing model).

In other embodiments, the general-purpose computers of the sort depicted in FIG. 1A and FIG. 1B may have different processors, operating systems, and input devices consistent with the device and in accordance with embodiments further described herein. The computer system 100 can be any workstation, desktop computer, laptop or notebook computer, server, handheld computer, mobile telephone or other portable telecommunication device, media playing device, a gaming system, or any other type and/or form of computing, telecommunications or media device that is capable of communication and that has sufficient processor power and memory capacity to perform the operations described herein. For example, the computer system 100 may comprise a device of the iPod family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

For embodiments in which a client machine 10 is a mobile device, the device may be a JAVA-enabled cellular telephone, such as those manufactured by Motorola Corp. of Schaumburg, Ill., those manufactured by Kyocera of Kyoto, Japan, or those manufactured by Samsung Electronics Co., Ltd., of Seoul, Korea. In other embodiments in which the client machine 10 is mobile, it may be a personal digital assistant (PDA) operating under control of the PalmOS operating system, such as the devices manufactured by palmOne, Inc. of Milpitas, Calif. In further embodiments, the client machine 10 may be a personal digital assistant (PDA) operating under control of the PocketPC operating system, such as the iPAQ devices manufactured by Hewlett-Packard Corporation of Palo Alto, Calif., the devices manufactured by ViewSonic of Walnut, Calif., or the devices manufactured by Toshiba America, Inc. of New York, N.Y. In still other embodiments, the client machine 10 is a combination PDA/telephone device such as the Treo devices manufactured by palmOne, Inc. of Milpitas, Calif. In still further embodiments, the client machine 10 is a cellular telephone that operates under control of the PocketPC operating system, such as those manufactured by Motorola Corp.

In some embodiments, a client machine 10 communicates with a remote machine 30 to determine an enumeration of resources available to the client machine 10 or to a user of the client machine 10. Resources may include, without limitation, computing environments, applications, documents, and hardware resources. In another of these embodiments, the remote machine 30 provides the client machine 10 with address information associated with a remote machine 30' hosting a resource identified by the enumeration of resources. In still another of these embodiments, the client machine 10 communicates with the remote machine 30' to access the identified resource. In one embodiment, the client machine 10 executes a resource neighborhood application to communicate with the remote machines 30 and 30'. In some embodiments, each of the remote machines 30 provides the functionality required to identify and provide address information associated with a remote machine 30' hosting a requested resource.

Figure 2A:
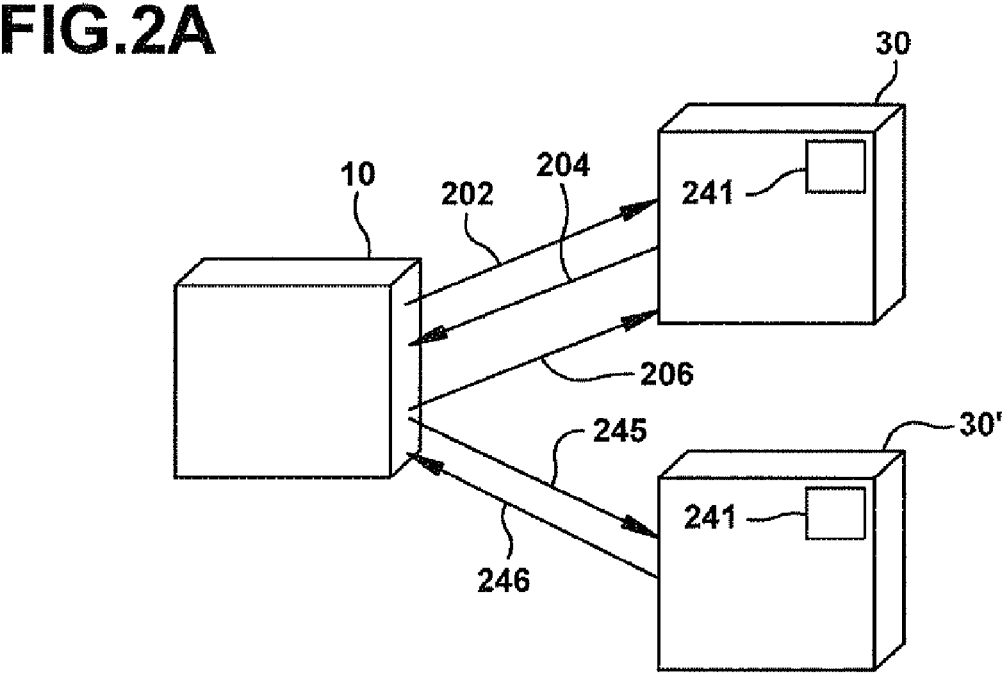
FIG. 2A is a block diagram of a system for providing access to a resource.

Referring now to FIG. 2A, a block diagram depicts one embodiment of a system for providing access to a resource. In brief overview, a request to enumerate computing resources is transmitted from a client machine 10 (step 202). In some embodiments, the request includes an identification of a user of the client machine 10. An enumeration of a plurality of resources available to the user of the requesting machine is provided by the remote machine (step 204). The client machine 10 transmits a request for access to a particular resource included in the enumeration (step 206).

Still referring to FIG. 2A, and in more detail, the transmitted request is a request for an enumeration of computing environments available to the client machine 10. In another embodiment, the request is a request for an enumeration of computing environments supporting a particular application requested for execution by the client machine 10. In still another embodiment, the request is a request for access to a computing environment supported by a particular plurality of hardware resources.

In some embodiments, information associated with the client machine 10 or with a user of the client machine 10 is received with the request. In one of these embodiments, credentials associated with the user, or with a user of the client machine 10, are received. In one embodiment, the remote machine 30 receives a request for an enumeration of available computing environments from the client machine 10 with the information associated with the client machine 10, 10' or the user of the client machine 10. In another embodiment, the remote machine 30 receives a transmission from a policy engine including the information. In still another embodiment, the remote machine 30 receives a transmission from a collection agent including the information. In yet another embodiment, the remote machine 30 comprises a component receiving requests and associated information.

In some embodiments, a remote machine 30 functioning as a web server receives communications from the client machine 10, 10'. In one of these embodiments, the web server forwards the communications to a remote machine 30'. In one of these embodiments, the web server forwards the communications to a service on the remote machine 30'. In another of these embodiments where communications from the client machine 10, 10' are routed to a remote machine 30' by the web server, the remote machine 30 may be selected responsive to an Internet Protocol (IP) address of the client machine 10.

In some embodiments, the user provides credentials to the remote machine 30 via a graphical user interface presented to the client machine 10, 10' by the remote machine 30. In other embodiments, a remote machine 30''' having the functionality of a web server provides the graphical user interface to the client machine 10. In still other embodiments, a collection agent transmitted to the client machine 10, 10' by the remote machine 30 gathers the credentials from the client machine 10.

In some embodiments, collected data regarding available resources is accessed. In some of these embodiments, collected data regarding computing environments is accessed. In some of these embodiments, the accessed data includes an indication of a virtual machine providing access to one of the computing environments. In one of these embodiments, the accessed data includes an indication of a location of the virtual machine. In other embodiments, the accessed data concerning computing environments includes an indication of a plurality of hardware resources required to support the computing environments. In still other embodiments, the accessed data concerning computing environments includes an indication of a user or type of user authorized to access the computing environments. In yet other embodiments, the accessed data is provided responsive to a request for identification of a computing environment providing access to an application program.

In some embodiments, the collected data is stored on a server, such as a remote machine 30. In other embodiments, the server is in communication with a database storing the collected data. In still other embodiments, the server collects the data from a plurality of machines 30 in a machine farm 38. In one of these embodiments, the data is received from at least one server responsive to a request for the information concerning the computing environments. In another of these embodiments, the server collects the data from a hypervisor executing on a machine 30' in the machine farm 38. In still another of these embodiments, the server collects the data from a management component residing in a guest operating system provided by a virtual machine launched into a hypervisor executing on a machine 30' in the machine farm 38.

In some embodiments, the data is collected by an intermediate, brokering machine. In one of these embodiments, the brokering machine maintains a database of a status of at least one computing environments and collects information from at least one machine providing access to at least one computing environments. In another of these embodiments, the brokering machine collects information from a virtual machine service component residing in a virtual machine providing the computing environments. In still another of these embodiments, the brokering machine collects information from a virtual machine providing management functionality for a virtual machine providing a computing environment. In yet another of these embodiments, the brokering machine collects information from a hypervisor on which an executing virtual machine provides a computing environment. In other embodiments, the brokering machine comprises a machine 30 including a brokering module.

In some embodiments, a determination is made for each available computing environment as to whether that computing environment is available to a user of the client system. In other embodiments, data is gathered about the client system and a data set is generated from the gathered information. In one of these embodiments, the accessed data is transmitted to the client system with an indication to the client system, made responsive to the generated data set, of each computing environment available to the client system. In another of these embodiments, the accessed data is transmitted to the client system indicating to the client system, responsive to the application of a policy to the generated data set, each computing environment available to the client system. In still another of these embodiments, the indication includes at least one method of access available to the user seeking access to the computing environment. In yet another of these embodiments, the indication includes at least one type of action associated with the computing environment which may be taken by, or on behalf of, the user of the client system.

An enumeration of a plurality of resources available to the client machine 10 is provided (step 204). In one embodiment, the enumeration is provided responsive to an application of a policy to received information associated with the user of the client machine 10 or the remote machine 30. In another embodiment, the enumeration is provided responsive to a request from the user for a particular type of computing environment. In still another embodiment, the enumeration is provided responsive to a request from the user for computing environments providing access to a type of application program. In yet another embodiment, the enumeration is provided responsive to a request from the user for computing environments supported by a specified plurality of hardware resources.

In some embodiments, an indication is transmitted to the client machine 10 of a plurality of computing environments available to a user of the client machine 10. In one of these embodiments, the indication is generated responsive to accessing collected data associated with the plurality of computing environments. In another of these embodiments, the accessed data is transmitted to the client machine 10 with an enumeration of computing environments available to the client machine 10. In some embodiments, a determination is made, for each stored computing environment, as to whether that computing environment is available to the client machine 10. In one embodiment, the collected information is transmitted to the client machine 10, the transmitted information displayable at the client machine 10 as icons in a graphical user interface window representing computing environments available to the client system. In another embodiment, the collected information is transmitted to the client machine 10, the transmitted information displayable at the client machine 10 as icons in a graphical user interface window representing computing environments unavailable to the client machine 10.

In some embodiments, an enumeration of available computing environments is presented to a user of the client machine 10. In other embodiments, an enumeration of applications is presented to a user of the client machine 10. In one of these embodiments, a physical machine provides access to an enumerated application. In another of these embodiments, a virtual machine provides access to an enumerated application. In still another of these embodiments, a virtual machine provides access to a computing environment from which a user of the client machine 10 may access the application. In still other embodiments, an enumeration of standard operating environments (such as a guest operating system pre-configured with a plurality of application programs) is provided to the user of the client machine 10.

In some embodiments, the enumeration of available resources includes an enumeration of a plurality of actions associated with a requested resource. In one of these embodiments, the enumeration of the plurality of actions enables the user to request execution of a computing environment. In another of these embodiments, the enumeration of the plurality of actions enables the user to request cloning of a computing environment. In still another of these embodiments, the enumeration of the plurality of actions enables the user to request shutdown of a computing environment. In yet another of these embodiments, the enumeration of the plurality of actions enables the user to request that a computing environment be rebooted. In some embodiments, the enumeration of the plurality of actions enables the user to request that a snapshot be taken of an existing state of a computing environment. In other embodiments, the enumeration of the plurality of actions enables the user to request that a previous snapshot of a computing environment be provided.

A request is transmitted for access to a particular resource (step 206). In one embodiment, a user of the client machine 10 requests a resource responsive to a received enumeration of available resources. In another embodiment, the user requests a resource independent of a received enumeration. In some embodiments, the user requests a resource by selecting a graphical representation of the resource presented on the client machine 10 by a client agent. In other embodiments, the user requests a resource by selecting a graphical or textual representation of the resource presented to the user on a web server or other remote machine 30'''.

In some embodiments, the user requests an action associated with a resource. In one of these embodiments, the user requests execution of the resource. In another of these embodiments, the user requests termination of the resource. In still another of these embodiments, the user requests transmission of the resource, including transmission across an application streaming session. In yet another of these embodiments, the user requests that a resource be shutdown. In other embodiments, a request to execute an application is received from the client machine 10, the requested application requiring one of the computing environments. In still other embodiments, a request to access a file is received from the client machine 10, the requested file requiring execution within one of the computing environments.

Still referring to FIG. 2A, a remote machine 30 launches the Resource Neighborhood (RN) application and presents results of the RN application to the client machine 10. The remote machine 30 can launch the RN application 241 in response to a request 202 by the client machine 10 for an enumeration of available resources. The remote machine 30 provides an enumeration of available resources to the client machine 10 (step 204). The client machine 10 and remote machine 30' establish a connection (arrows 245 and 246). By this connection, the remote machine 30' can transfer the executable code of the particular application to the client machine 10, when the client machine 10 and remote machine 30' are operating according to the client-based computing model. Alternatively, the remote machine 30' can execute the particular application and transfer the graphical user interface to the client machine 10, when the client machine 10 and remote machine 30' are operating according to the server-based computing model. In some embodiments the remote machine 30' can execute the Resource Neighborhood application 241 and push the results back to the client machine 10 so that when the client machine 10 requests the Resource Neighborhood application, the Resource Neighborhood results are already available at the client machine 10.

Figure 2B:
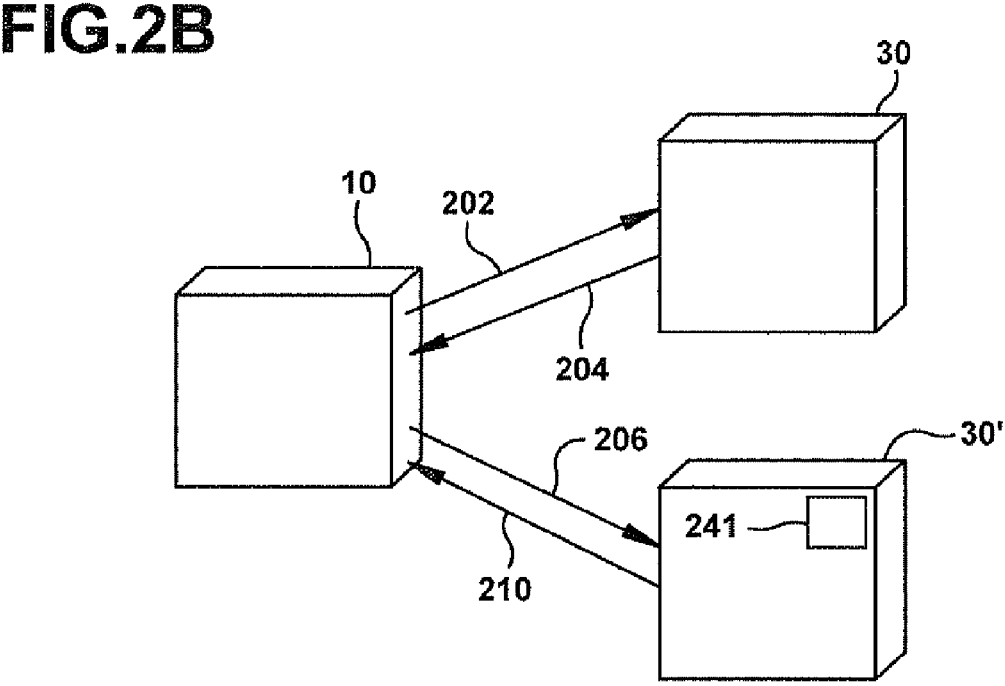
FIG. 2B is a block diagram of one embodiment of a system in which a client machine can initiate execution of an application program for determining the resource neighborhood of that client machine.

FIG. 2B shows another embodiment of a system in which the client machine 10 initiates execution of the Resource Neighborhood application 241 and a remote machine 30 presents the results of the RN application 241 to the client machine 10. The client machine 10 launches the Resource Neighborhood application (e.g., by clicking on a Resource Neighborhood icon representing the application 241). In response, the client machine 10 directs a request 202 for the Resource Neighborhood application to the remote machine 30. The remote machine 30 can execute the Resource Neighborhood application 241, if the application is on the remote machine 30, and return the results to the client machine 10. Alternatively, the remote machine 30 can indicate (arrow 204) to the client machine 10 that the Resource Neighborhood application 241 is available on another remote machine, in this example remote machine 30'. The client machine 10 and remote machine 30' establish a connection (arrows 206 and 210) by which the client machine 10 requests execution of the Resource Neighborhood application 241. The remote machine 30' can execute the application 241 and transfer the results (i.e., the graphical user interface any audio output etc.) to the client machine 10.

Figure 2C:
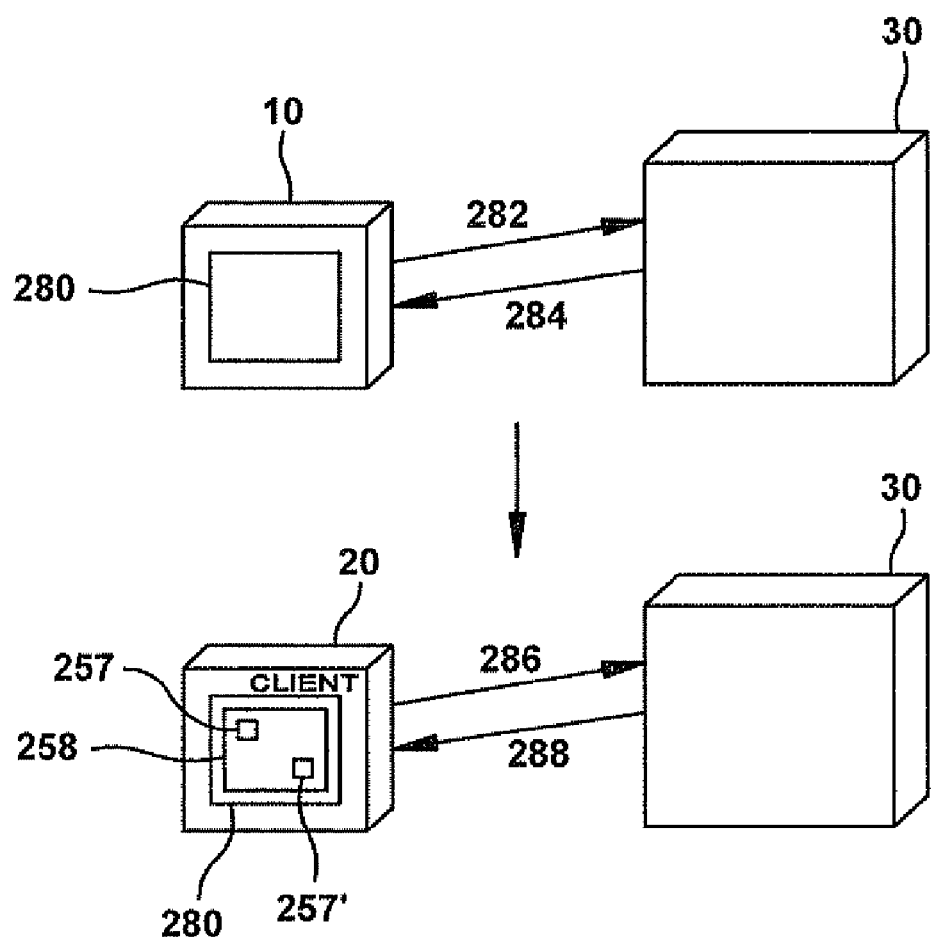
FIG. 2C is a block diagram of an embodiment in which a client machine uses a web browser application to determine its resource neighborhood.

FIG. 2C shows another embodiment of a system in which a client machine 10 initiates execution of the Resource Neighborhood application 241, in this example via the World Wide Web. A client machine 10 executes a web browser application 280, such as NETSCAPE NAVIGATOR, manufactured by Netscape Communications, Inc. of Mountain View, Calif., INTERNET EXPLORER, manufactured by Microsoft Corporation of Redmond, Wash., or SAFARI, manufactured by Apple Computer of Cupertino, Calif.

The client machine 10, via the web browser 280, transmits a request 282 to access a Uniform Resource Locator (URL) address corresponding to an HTML page residing on remote machine 10. In some embodiments, the first HTML page returned 284 to the client machine 10 by the remote machine 30 is an authentication page that seeks to identify the client machine 10 or the user of the client machine 10.

The authentication page allows the client machine 10 to transmit user credentials, via the web browser 280, to the remote machine 30 for authentication. Transmitted user credentials are verified either by the remote machine 30 or by another remote machine 30 in the farm 38. This allows a security domain to be projected onto the remote machine 30. For example, if the remote machine 30 runs the WINDOWS NT operating system, manufactured by Microsoft Corporation of Redmond, Wash., and the authenticating machine runs the UNIX operating system, the UNIX security domain may be said to have been projected onto the remote machine 30. User credentials may be transmitted "in the clear," or they may be encrypted. For example, user credentials may be transmitted via a Secure Socket Layer (SSL) connection, which encrypts data using algorithms such as the RC4 algorithm, manufactured by RSA Security Inc. of Bedford, Mass.

In some embodiments, an access control decision is made based on received information about the user resources available to the user of the client system are identified responsive to the access control decision. In other embodiments, a policy is applied to the received information about the user. The remote machine 30 may verify the user credentials received from the client machine 10. Alternatively, the remote machine 30 may pass the user credentials to another remote machine for authentication. In this embodiment, the authenticating server may be in a different domain from the remote machine 30. Authenticated user credentials of the client machine 10 may be stored at the client machine 10 in a per-session cookie, in fields that are not displayed by the web browser 280, or in any other manner common in maintenance of web pages. In some embodiments, a machine farm 38 with which the remote machine 30 is associated may allow guest users, i.e., users that do not have assigned user credentials, to access resources hosted by the farm 38. In these embodiments, the authentication page may provide a mechanism for allowing a client machine 10 to identify that it is a guest user, such as a button or menu selection. In other of these embodiments, the remote machine 30 may omit the authentication page entirely.

Still referring to FIG. 2C, once the client machine 10 is authenticated by the remote machine 30, the remote machine prepares and transmits to the client machine 10 an HTML page 288 that includes a Resource Neighborhood window 258 in which appears graphical icons 257, 257' representing resources to which the client machine 10 has access. A user of client machine 10 requests access to a resource represented by icon 257 by clicking that icon 257.

Figure 3A:
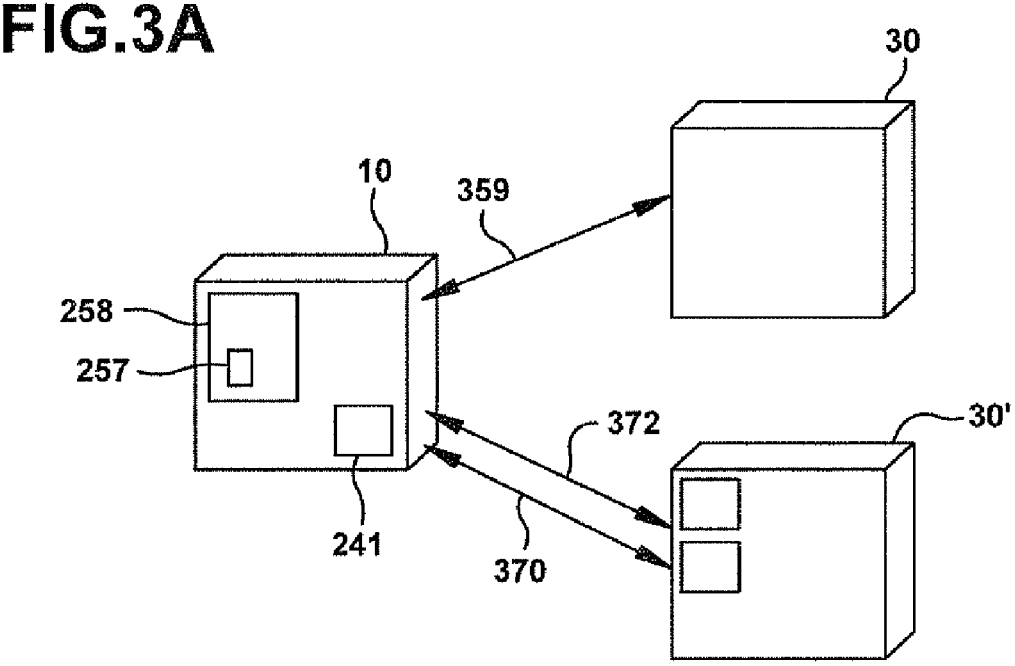
FIGS. 3A, 3B, and 3C are block diagrams of embodiments of systems of communication among a client machine and multiple remote machines.

FIG. 3A shows one embodiment of a process of communication among the client machine 10 and multiple remote machines 30, 30'. In the embodiment shown in FIG. 3A, the client machine 10 has an active connection 372 with the remote machine 30'. The client machine 10 and remote machine 30' can use the active connection 372 to exchange information regarding the status or execution of a first resource. User credentials may be stored at the client machine 10. Such storage of the user credentials can be in cache memory or in persistent storage.

In this embodiment, the Resource Neighborhood application (not shown on FIG. 3A) runs on the client machine 10. The client machine display has a Resource Neighborhood window 258 in which appears a graphical icon 257 representing a second resource. A user of the client machine 10 can access the second resource by double-clicking the icon 257 with the mouse. The request passes to the remote machine 30 via connection 359. The remote machine 30 indicates to the client machine 10 via connection 359 that the sought-after resource is available on remote machine 30'. The client machine 10 signals the remote machine 30' to establish a second connection 370. The remote machine 30' requests the user credentials from the client machine 10 to authenticate access to the second resource. Upon a successful authentication, the client machine 10 and remote machine 30' establish the second connection 370 and exchange information regarding status of or execution of the second resource. In some embodiments, the remote machine does not request user credentials to establish the second connection 370. In these embodiments, the remote machine 30' may use the credentials supplied by the user of client machine 10 to establish the connection 372 to also establish the second connection 370. Accordingly, the client machine 10 and the remote machine 30' communicate with each other over multiple connections.

Figure 3B:
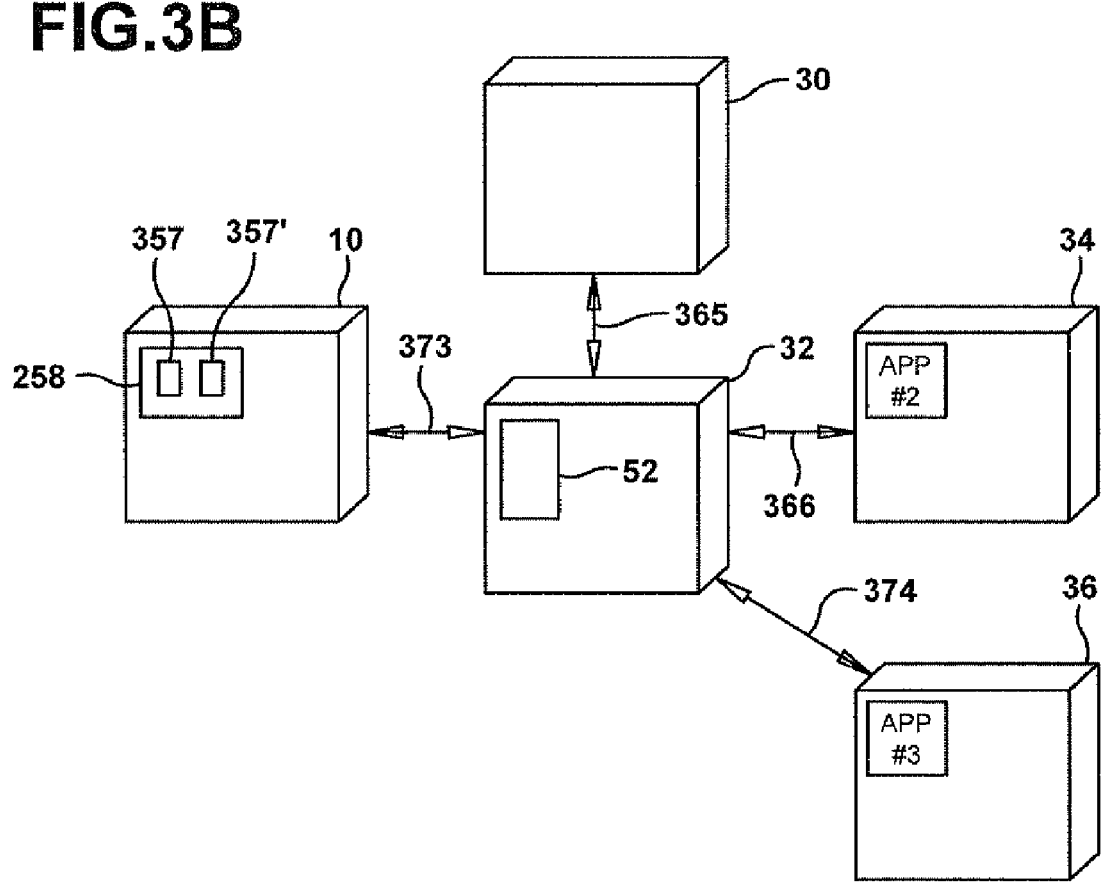

FIG. 3B shows one embodiment of a system of communication among the client machine 10, master remote machine 30, and servers 32, 34, and 36. The client machine 10 has an active connection 373 with the remote machine 32. The client machine 10 and remote machine 32 can use the active connection 373 to exchange information regarding the status of or execution of a first resource. User credentials may be stored at the remote machine 32 in cache memory or in persistent storage.

In this embodiment, the Resource Neighborhood application runs on the remote machine 32. The remote machine 32 includes software providing a server-based client engine 62, enabling the remote machine 32 to operate in the capacity of the client machine 10. The client machine 10 display has a Resource Neighborhood window 258 in which appear graphical icons 357, 357' representing a second resource and a third resource, respectively. A user of the client machine 10 can access the second resource by double-clicking the icon 357. The request to launch the second resource passes to the remote machine 32 via active connection 373, and the remote machine 32 forwards the request to the master remote machine 30 (arrow 365).

The master remote machine 30 indicates (arrow 365) to the remote machine 32 that the sought-after resource is available on server 34. The remote machine 32 contacts the server 34 to establish a connection 366. To authenticate access to the application, the server 34 obtains the user credentials of the client machine 10 from the remote machine 32. The remote machine 32 and server 34 establish the connection (arrow 366) by which the remote machine 32 requests access to the second resource and the server 34 returns the results to the remote machine 32. The remote machine 32 forwards the results to the client machine 10, where the results are displayed. Accordingly, the information exchanged between the client machine 10 and the server 34 "passes through" the remote machine 32.

Similarly, the client machine 10 can launch the third resource by double-clicking the icon 357'. The request to launch the third resource passes to the remote machine 32. The remote machine 32 forwards the request to the master remote machine 30. In this example, the master remote machine 30 indicates that the server 36 can be used to access the third resource.

The remote machine 32 and the server 36 establish a connection (arrow 374) by which the remote machine 32 requests access to the third resource, and the server 36 returns the results to the remote machine 32. To permit access to the third resource, the server 36 can authenticate the user credentials of the user of the client machine 10, which are obtained from the remote machine 32. The remote machine 32 forwards the results to the client machine 10 where the results are displayed. Accordingly, the results of accessing the third resource pass between the client machine 10 and the server 36 through the remote machine 32.

Figure 3C:
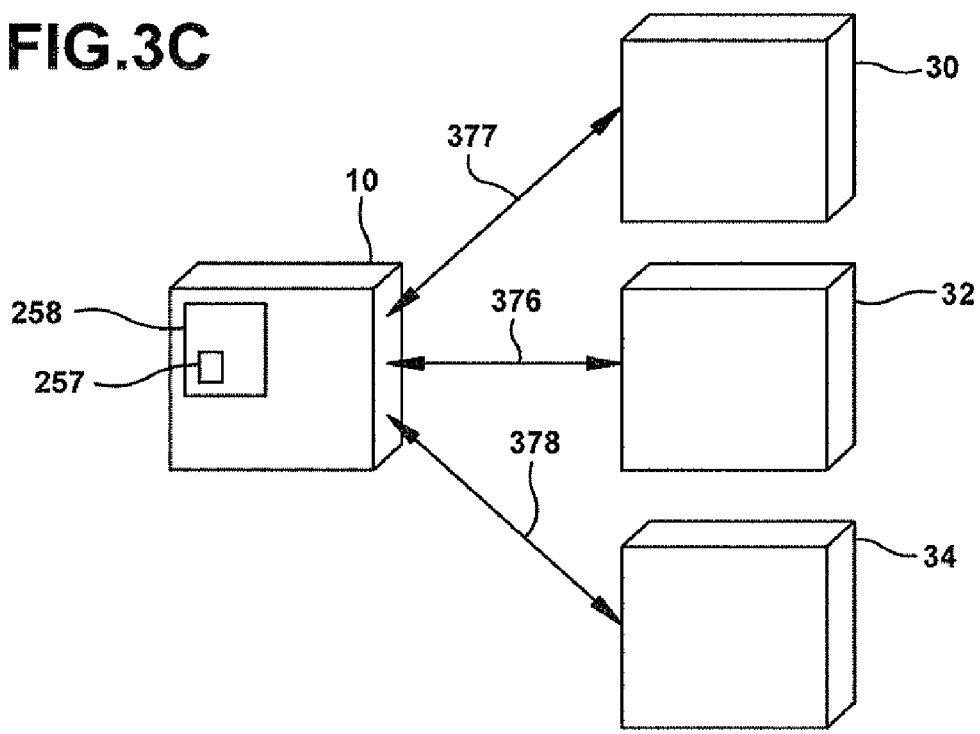

FIG. 3C shows another embodiment of a system of communication among the client machine 10, a master remote machine 30, and servers 32 and 34. The client machine 10 has an active connection 376 with server 32. The client machine 10 and server 32 can use the active connection 376 to exchange information regarding the access to a first resource. The client machine 10 can store user credentials in cache memory or in persistent storage.

In this embodiment, the Resource Neighborhood application runs on the server 32. The client machine 10 display has a Resource Neighborhood window 258 in which appears a graphical icon 257 representing a second resource. A user of the client machine 10 can access the second resource by double-clicking the icon 257. The request to access the second resource passes to the server 32. The server 32 responds (i.e., "calls back") to the client machine 10 by returning resource-related information such as the name of the resource and capabilities needed by the client machine 10 to access the second application.

With the information provided by the server 32, the client machine 10 then communicates with the master remote machine 30 via connection 377 to determine the server for accessing the second resource. In this example, that server is server 34. The client machine 10 then establishes a connection 378 to the server 34. Server 34 requests the user credentials from the client machine 10 to authenticate the user of the client machine 10. The client machine 10 accesses the second resource on the server 34, and the server 34 returns the results to the client machine 10 via the established connection 378. Accordingly, the client machine 10 can have multiple active connections between the multiple servers.

Figure 3D:
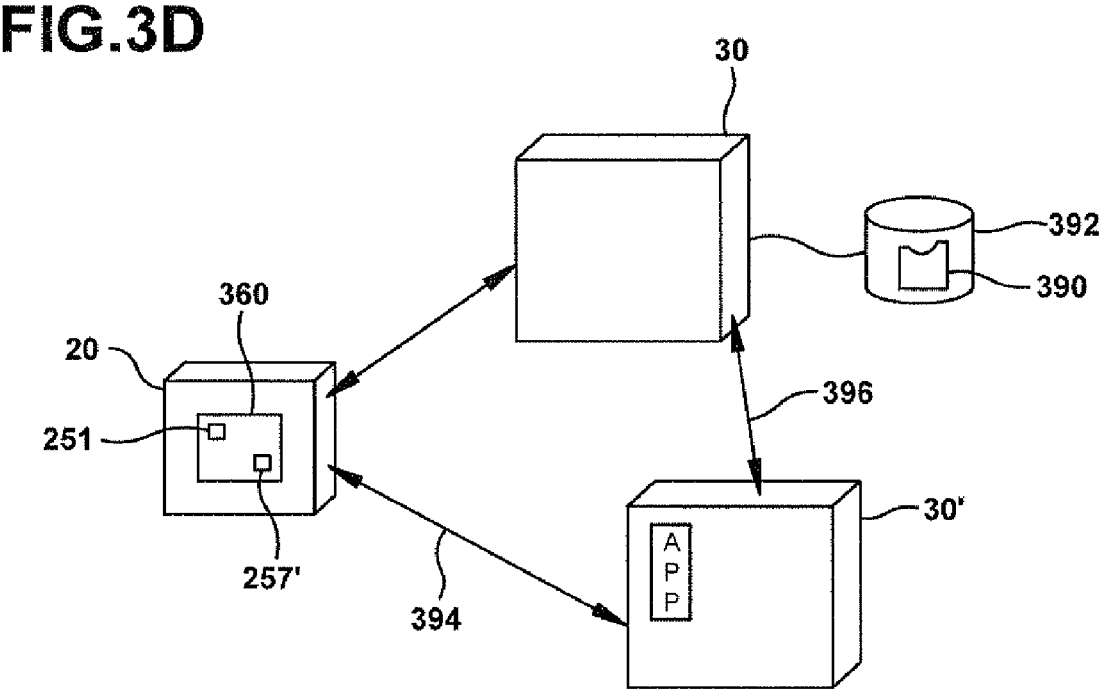
FIG. 3D is a block diagram of one embodiment of a system in which a client machine can access a resource from a resource neighborhood web page displayed at that client machine.

FIG. 3D shows one embodiment of a system of communication between the client machine 10, a remote machine 30 that in this example acts as a web server, and a second remote machine 30'. The client machine 10 authenticates itself to the remote machine 30 as described above in connection with FIG. 2C. In one embodiment, the remote machine 30 accesses an output display template 390, such as an SGML, HTML or XML file, to use as a base for constructing the Resource Neighborhood window to transmit to the client machine 10. The Resource Neighborhood window may display an enumeration of resources available to the client. The enumeration of resources may include an enumeration of available application programs or computing environments. The template may be stored in volatile or persistent memory associated with the server 30 or it may be stored in mass memory 392, such as a disk drive or optical device, as shown in FIG. 3D.

In this embodiment, the template 390 is a standard SGML, HTML, or XML document containing Resource Neighborhood-specific tags that are replaced with dynamic information. The tags indicate to the server 30 where in the output display to insert information corresponding to available resources, such as icon images. In one particular embodiment, the Resource Neighborhood-specific tags are embedded within comments inside a file, allowing the file to remain compatible with standard interpreters. In another embodiment, the Resource Neighborhood-specific tags are extensions of the markup language used as the base for the template.

Examples of HTML tags that may be used in a template are set forth below in Table 1:

TABLE 1

| Tag | Description |
| --- | --- |
| ControlField field value | This tag is used to set the value of data that either persists between Resource Neighborhood web pages, is set by the user, or is used to help in cross page navigation, such as user name, domain, password, template, and resource. |
| DrawResourceNeighborhood | This tag is used to draw a Resource Neighborhood display at this location in an output display. |
| ResourceName | This tag is replaced by the name of the published resource in the current context. |
| WindowType | This tag is replaced by the window type of the published resource in the current context. |
| WindowHeight | This tag is replaced by the window height of the published resource in the current context. |
| WindowWidth | This tag is replaced by the window width of the published resource in the current context. |
| WindowScale | This tag is replaced by the window scale of the published resource in the current context. |
| WindowColors | This tag is replaced by the color depth of the published resource in the current context. |
| SoundType | This tag is replaced by the sound setting of the published resource in the current context. |
| VideoType | This tag is replaced by the video setting of the published resource in the current context. |
| Encryption Level | This tag is replaced by the encryption level of the published resource in the current context. |
| Icon | This tag is replaced by the icon of the published resource in the current context. |

Other tags can be provided to set control fields and to provide conditional processing relating to the Resource Neighborhood application.

In one embodiment, the template is constructed dynamically using, for example, COLD FUSION, manufactured by Allaire Corp. of Cambridge, Mass. or ACTIVE SERVER PAGES manufactured by Microsoft Corporation of Redmond, Wash. Alternatively, the template may be static. The Resource Neighborhood application parses the template, replacing Resource Neighborhood-specific tags as noted above. Tags that are not Resource Neighborhood-specific are left in the file to be parsed by the browser program 80 executing on the client 10.

In one embodiment, a template parser object is provided that accepts an HTML template as input, interprets Resource Neighborhood-specific tags present in the template, and outputs the original template with all Resource Neighborhood tags replaced with appropriate text. The template parser object can be passed a cookie, a URL query string, or a control field from a web server interface to provide the information with which Resource Neighborhood-specific tags should be replaced.

In some embodiments, a web server receives a request from the client machine 10 for an enumeration of available computing environments. In one of these embodiments, the web server executes an application to access data regarding the computing environments. In another of these embodiments, a page template is retrieved from a database. In still of these embodiments, a page is created, at the web server, describing a display of stored computing environment images available to the client machine 10 responsive to the collected information and the retrieved page template, and the created page is transmitted to the client machine 10, indicating to the client machine 10 each computing environment available to the client machine 10. In some embodiments, computing environment images may comprise virtual machine images, resource images, screenshots of suspended virtual machines, and other images selected by a user or administrator for presentation to the user. In yet another of these embodiments, an output display is created indicating each computing environment available to the client machine 10 and transmitting the created output display to the client machine 10.

In some embodiments, an output display is created comprising a page constructed in a markup language, the output display indicating each computing environment available to the client system and transmitted to the client system.

In another embodiment, the Resource Neighborhood application allows scripts to access information via an application programming interface. Scripts may be written in, for example, VBScript or Jscript. In this embodiment, the scripting language is used to dynamically generate an output display using information returned by the application in response to queries posed by the script. Once the output display is generated, it is transmitted to client machine 10 for display by the browser program 80.

A user of the client machine 10 can access a resource by clicking an icon 257, 257' displayed in the Resource Neighborhood web page. In some embodiments, each icon 257, 257' is associated with an encoded URL that specifies: the location of the resource (i.e., on which remote machines it is hosted or, alternatively, the address of a master remote machine, a gateway, or other remote machine 30); a launch command associated with the resource; and a template identifying how the results of accessing the resource should be displayed (i.e., in a window "embedded" in the browser or in a separate window). In some embodiments, the URL includes a file, or a reference to a file, that contains the information necessary for the client to create a connection to the remote machine hosting the resource. This file may be created by the Resource Neighborhood application dynamically. The client machine 10 establishes a connection (arrow 394) with the remote machine 30' identified as hosting the requested resource and exchanges information regarding access to the desired resource. In some embodiments, the connection 394 is made using the Independent Computing Architecture (ICA) protocol, manufactured by Citrix Systems, Inc. of Fort Lauderdale, Fla. In other embodiments, the connection is made using: the RDP protocol, manufactured by Microsoft Corp. of Redmond, Wash.; the X11 protocol; or the Virtual Network Computing (VNC) protocol, manufactured by AT&T Bell Labs. Thus, the client machine 10 may display the results of accessing the resource in a window separate from the web browser 280, or it may "embed" application output within the web browser.

Figure 3E:
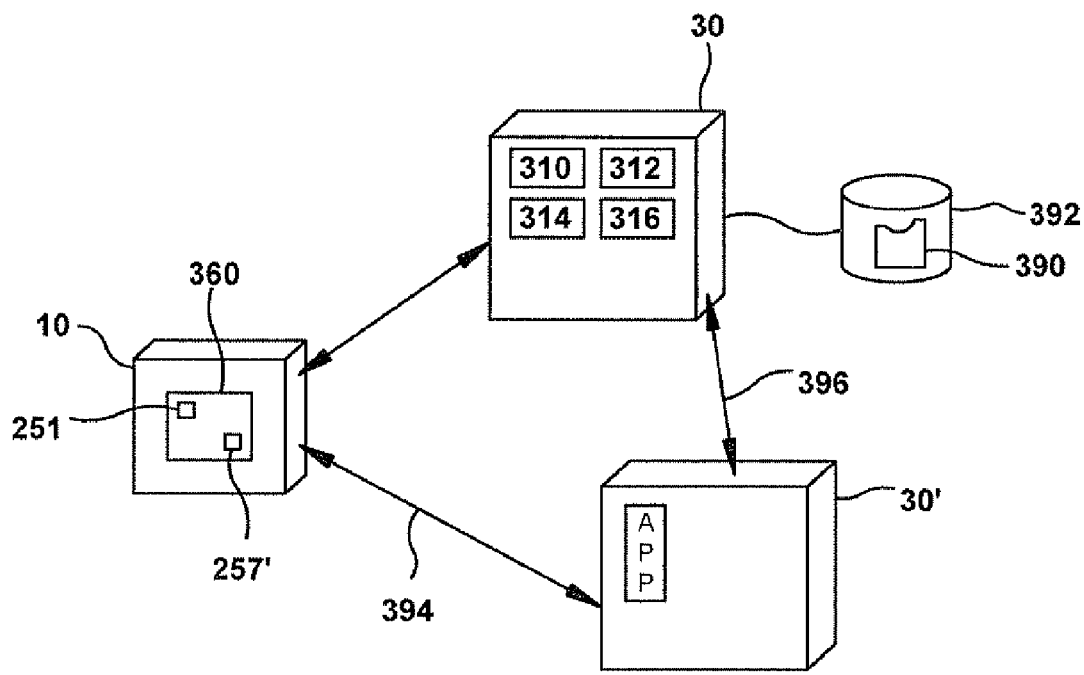
FIG. 3E is a block diagram of one embodiment of a system in which a remote machine acts as an intermediary for a machine farm.

FIG. 3E depicts an embodiment in which a remote machine 30 acts as an intermediary for a machine farm 38 and comprises a broker module 310, a transmitter 312, a receiver 314, and a transceiver 316.

The broker module 310 accesses collected data regarding resources, including application programs, computing environments, and hardware resources. In some embodiments, the broker module 310 accesses collected data regarding resources and determines for each resource whether that resource image is available to a client machine 10. In some embodiments, the server further comprises a database storing the collected data. In one of these embodiments, the broker module 310 determines for each resource whether that resource image is available to a client machine 10 based on the collected data. In other embodiments, the broker module 310 receives user credentials and determines for each resource whether that resource image is available to a client machine 10 based on the user credentials and the collected data.

In some embodiments, the server further comprises an output display creation engine creating output displays indicating each resource available to the client machine 10. In one of these environments, the output display creation engine creates a page describing a display of the resources available to a client system, the page created responsive to the collected information and a page template.

The transmitter 312 transmits accessed data to the client machine 10 indicating to the client machine 10 each resource determined to be available to the client machine 10. In some embodiments, the transmitted data is displayable at the client system as icons in a graphical user interface window representing resources available to the client system. In other embodiments, the transmitted data is displayable at the client system as icons in a graphical user interface window representing resources unavailable to the client system. The receiver 314 receives a request to access one of the available resources. In some embodiments, the receiver receives user credentials from the client machine 10. In other embodiments, the receiver receives a request to access an application program available through one of the available resources, such as an available computing environment. In still other embodiments, a database storing the collected information and the service module determines for each resource stored by the plurality of servers whether that resource image is available to a client machine 10 based on the user credentials and the collected information. In yet other embodiments, a determination is made as to an availability of resources, such as virtual machines or application servers, providing access to the available resources.

The transceiver 316 provides a connection between the client machine 10 and a virtual machine providing the requested resource. In some embodiments, the transceiver 316 provides a connection between the client machine 10 and a virtual machine providing the requested resource and the transceiver 316 establishes a presentation-layer protocol connection. In one of these embodiments, the transceiver 316 establishes an X11 or VNC connection. In another of these embodiments, the transceiver 316 establishes an ICA connection. In still another of these embodiments, the transceiver 316 establishes an RDP connection.

An intermediary machine of the sort just described may be used as any one of the remote machine 30 described above in FIGS. 1-1B, 2A-2B, and 3A-3D.

Figure 4:
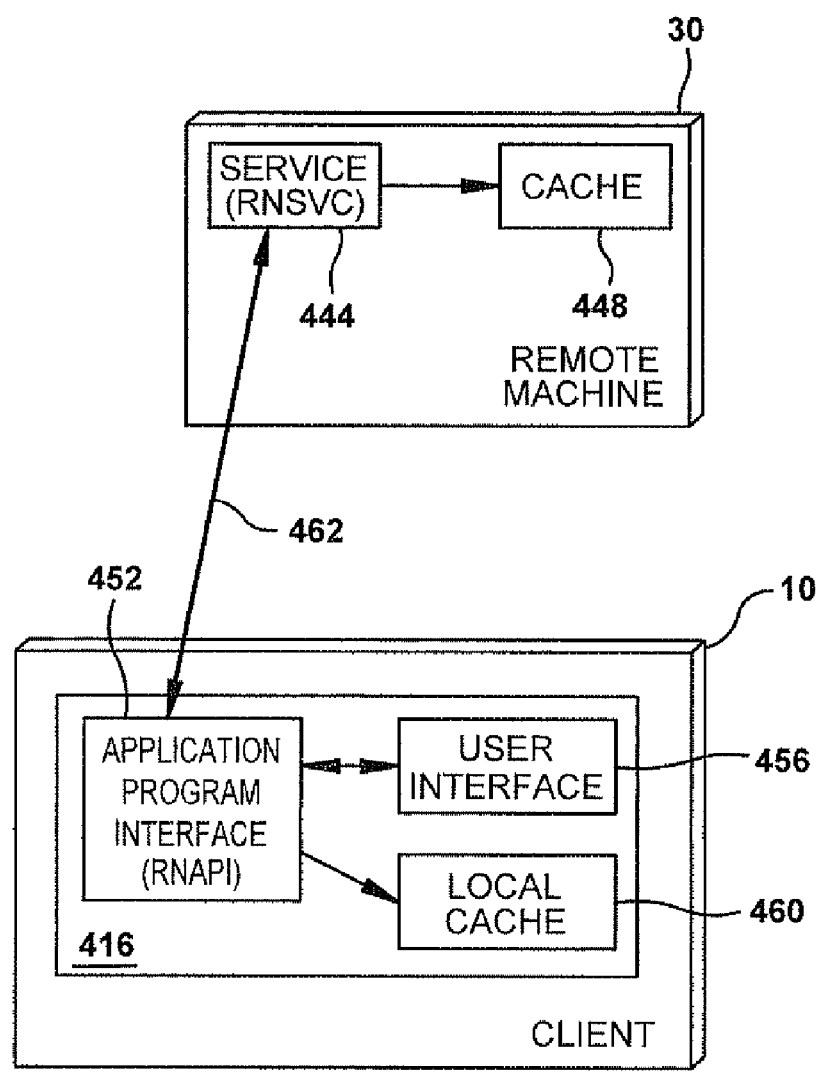
FIG. 4 is a block diagram of one embodiment of a resource neighborhood application in which a client machine is in communication with one of the remote machines.

FIG. 4 illustrates one embodiment of program components for a client-based implementation of the Resource Neighborhood application. A client-based implementation of the Resource Neighborhood application 416 can be used in a network using either the server-based computing model in which the servers execute the Resource Neighborhood application or in a client-based computing model in which the client machine 10 executes the Resource Neighborhood application locally. The Resource Neighborhood application includes a Resource Neighborhood Service (RNSVC) component 444, a resource database component 448, a Resource Neighborhood Application Program Interface (RNAPI) component 452, a Resource Neighborhood User Interface component 456, and a local cache 460.

The remote machine 30, for example, includes the service component (RNSVC) 444 and the resource authorization cache 448. The client machine 10, which is a representative example of a client machine 10 that can support a client-based implementation of the Resource Neighborhood application, includes the application program interface RNAPI 452, the user interface user interface component 456, and the local cache 460 components. The RNAPI 452 communicates with the user interface component 456 and the local cache 460. The RNSVC 444 communicates with the resource authorization cache 448 and with the RNAPI 452 on the client machine 10 via communications link 462.

The communications link 462 can be established by, for example, using the ICA protocol, the RDP protocol, the X11 protocol, the VNC protocol, or any other suitable presentation-level protocol designed to run over industry standard transport protocols, such as TCP/IP, IPX/SPX, NetBEUI, using industry-standard network protocols, such as ISDN, frame relay, and asynchronous transfer mode (ATM) and which provides for virtual channels, which are session-oriented transmission connections that can be used by application-layer code to issue commands for exchanging data. The communications link 462 may also be established by protocols that support RPC or RPC-equivalents such as SOAP and HTTP. The communications link 462 may also be a communications link 150 as described above. The virtual channel commands are designed to be closely integrated with the functions of client machines. The ICA protocol can support the Resource Neighborhood virtual channel.

The Resource Neighborhood virtual channel protocol can include four groups of commands:

(1) Initialization-related commands;

(2) Single authentication related commands that can be supported by each client machine wanting a copy of the user credentials;

(3) Resource data related commands for implementing the Resource Neighborhood user interface; and (4) Resource launch callback-related commands for running the user interface on a remote machine.

The resource authorization cache 448 may be a cache of the authorized user and group information for all the public (i.e., published) resources in a machine farm 38 or in a group of trusted domains. Each remote machine in a machine farm 38 can maintain its own resource-related information in persistent storage and build up the resource authorization cache 448 in volatile storage. In another embodiment, all collected resource-related information in the resource authorization cache 448 can be stored in persistent storage and made accessible to each other server in the machine farm 38. The resource authorization cache 448 can be implemented in a proprietary format (e.g., as a linked list in memory) or using Novell's Directory Services (NDS) or any directory service adhering to the X.500 standard defined by the International Telecommunication Union (ITU) for distributed electronic directories. The resource authorization cache 448 may be implemented as a standard relational database.

The resource authorization cache 448 includes a list of remote machines. Each remote machine in the list has an associated set of resources. Associated with each resource is resource-related information that can include the resource name, a list of remote machines, and client users that are authorized to use that resource. An overly-simplified example of the resource-related information maintained in the database is illustrated by the following Table 2. Users A and B are users of the client machines 10, "n/a" indicates that a desired application program is hosted, but is not available to client machine users, and "–" indicates that the application program is not hosted.

TABLE 2

| Remote Machine Name | Spreadsheet | Customer Database | Word Processor | Calculator |
|---|---|---|---|---|
| Server 30 | User A | User B | n/a | — |
| Server 32 | User B | n/a | User A | — |
| Server 34 | — | — | — | User A User B |

Table 2 shows: a list of servers 30, 32, 34; applications hosted by the servers (Spreadsheet, Customer Database, Word Processor, and Calculator); and those users who are authorized to use the applications. For example, the server 30 hosts the Spreadsheet program, the Customer Database and the Word Processor. User A is authorized to use the Spreadsheet, User B is authorized to use the Customer Database, and no users are authorized to use the Word Processor. It is to be understood that other techniques can be used to indicate who is authorized to use a particular application. For example, the user information stored in the database can be used to indicate those users who are unauthorized to use a particular application rather than those who are authorized, or to indicate that multiple users may access a resource on a remote machine 30, or to indicate that a predetermined group of users are authorized to access a particular resource. Although Table 2 depicts an embodiment in which the resources that are available are application programs, a similar technique may be used for computing environments and other resources.

To obtain the information that is stored in the resource authorization cache 448, the remote machine 30 obtains the resource-related information from each other machine in the machine farm 38 regarding the resources on those remote machines, including control information that indicates which client users and remote machines are permitted to access each particular resource. The resource-related information maintained in the database may or may not persist across re-boots of the remote machine 30.

Each remote machine 30 having the Resource Neighborhood application installed thereon executes the RNSVC software 444. The RNSVC software 444, operating on each remote machine 30 establishes a communication link (e.g. a named pipe) with at least one other and, in some embodiments, each other remote machine 30. The remote machines 30 exchange resource-related information on the communications links. In another embodiment, the RNSVC software 444 collects the resource-related information from the other remote machine 30 in the machine farm 38 through remote registry calls (e.g., the service component 444 transmits a datagram to other remote machine 30 in the farm 38 requesting the resource-related information corresponding to the resources hosted by those remote machine 30). In some embodiments the resource authorization cache is populated by system administrators of by programs and scripts communicating with remotes machines 30. The RNSVC 444 software also maintains the relationships of groups and users to published resources in the resource authorization cache 448 and accesses the information when authenticating a client user. An administrator of the remote machine 30 can use a user interface to configure the RNSVC 444.

Other functions of the RNSVC software 444 include implementing the services and functions requested by the RNAPI 452 and communicating with the RNAPI 452 on the client machine 10 using a Resource Neighborhood virtual channel driver (VCRN). The VCRN operates according to the Resource Neighborhood virtual channel protocol described.

The RNAPI 452 is a set of software functions or services that are used by the Resource Neighborhood application to perform various operations (e.g., open windows on a display screen, open files, and display message boxes). The RNAPI 452 provides a generic mechanism for accessing user interface elements (e.g., icons) produced by running the Resource Neighborhood application and objects in a legacy (i.e., predecessor or existing for some time) client user interface. When the client machine 10 accesses an available resource, the accessing mechanism can launch the resource on the remote machine 30, if necessary (e.g., when the client machine 10 is unable to locally execute the application).

The RNAPI 452 provides all published resource information to the user interface component 456 for display on the screen 12 (FIG. 1) of the client machine 10. The RNAPI 452 also manages machine farm 38 logons in a local database of logon credentials (e.g., passwords) for users of the client machine 10 to support the single authentication feature. Credentials may or may not be persistent across a reboot (power-off and on cycles) of the client machine 10.

The RNAPI 452 provides automatic and manual management for Resource Neighborhood objects stored in the local cache 460. The local cache 460 can either be refreshed manually by the user of the client machine 10, or at a user-definable refresh rate, or by the server at any time during a connection. In a Windows implementation, the RNAPI 452 can build remote application file resource associations and manage the "Start" menu and desktop icons for resource object shortcuts.

The user interface module 456 interfaces the RNAPI 452 and can be a functional superset of an existing client user interface (e.g., Remote Resource Manager). The user interface module 456 accesses the information stored in the local cache 460 through the RNAPI 452 and visually presents that information to the user on the display screen 12 (FIG. 1) of the client machine 10. The displayed information is a mixture of information generated by a user of the client machine 10 and information obtained by the Resource Neighborhood application. The user interface module 456 can also show the user all resources that the user is currently accessing and all active and disconnected sessions.

In a Windows-based embodiment, the user interface module 456 can present a variety of graphical components, such as windows and pull-down menus, to be displayed on the display screen 12 (FIG. 1). A display of a combination of such graphical user interface components is generally referred to as a "desktop." A desktop produced by the user interface module 456 can include a Resource Neighborhood window displaying the neighborhood of resources available to the user of the client machine 10. These resources may be a filtered combination of the published resources hosted by a machine farm 38. The user interface module 456 can generate a Resource Neighborhood window for each machine farm 38 or merge the resources from different machine farms 38 under a single Resource Neighborhood window.

At a top level, the Resource Neighborhood window includes a folder for each machine farm 38. Clicking on one of the folders produces a window containing a representation (e.g., an icon) of each hosted resource available to the user, e.g., see FIGS. 6A and 6B. The Resource Neighborhood window becomes the focal point for accessing published resources, and the user interface module 456 can be used to access resources and launch applications through the RNAPI 452. For example, the user of the client machine 10 can use the mouse 18 (FIG. 1) to select one of the displayed icons and launch the associated resource.

A feature of a client-based implementation is that the user can browse the objects displayed in the Resource Neighborhood window although the client machine is offline, that is, the connection 462 is inactive. Also, a user of the client machine 10 can drag application objects and folders out of the Resource Neighborhood window and into other graphical components (e.g., other windows, folders, etc.) of the desktop.

Figure 5:
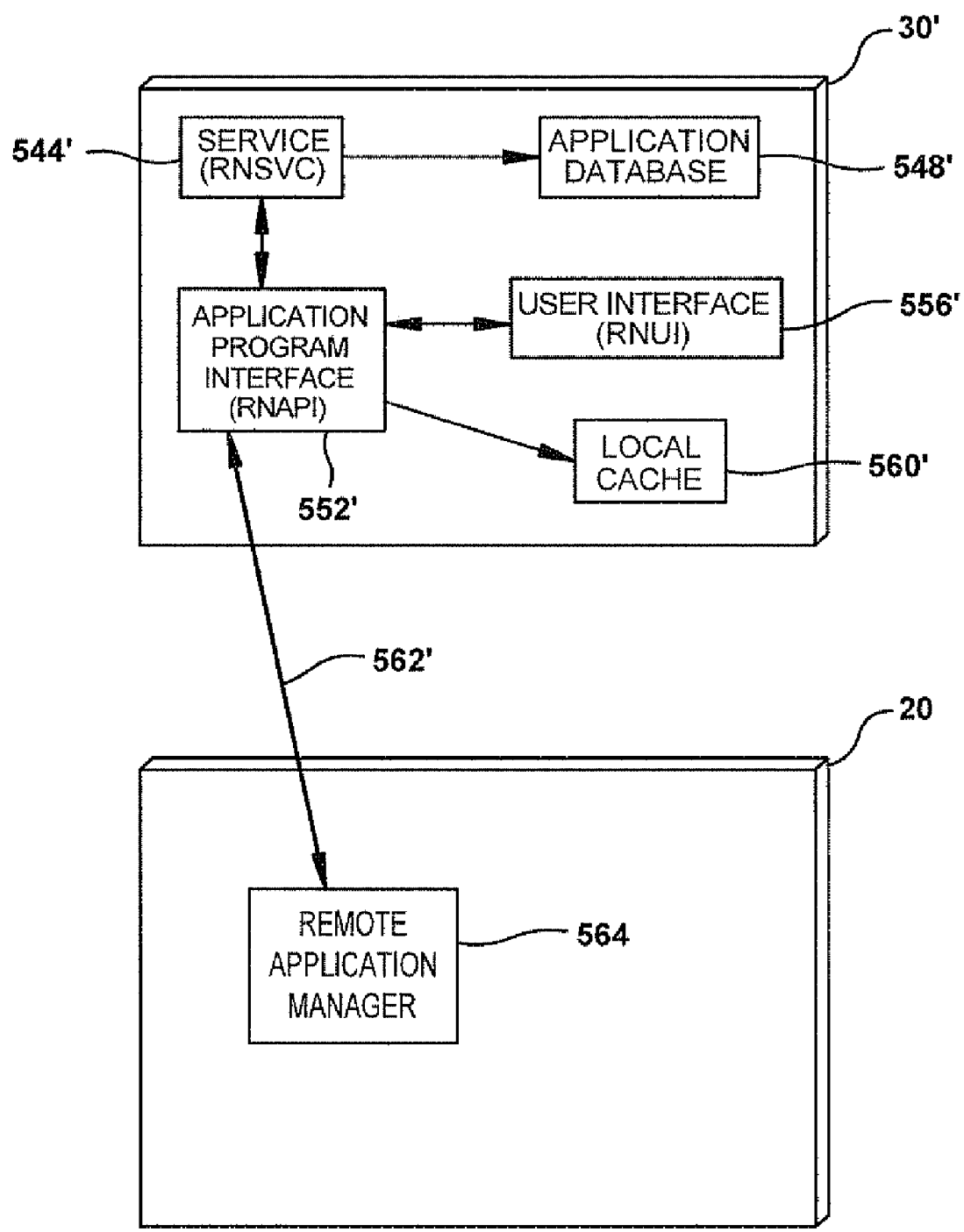
FIG. 5 is a block diagram of a computing embodiment in which a client machine is in communication with a remote machine having an installed resource neighborhood application program of the invention.

FIG. 5 shows one embodiment of the program components for a server-based implementation of the Resource Neighborhood application. The components include a Service (RNSVC) component 544', a Resource Database component 548', an Application Program Interface (RNAPI) component 552', a User Interface component 556' and a local cache 560'. Each software component 544', 548', 552', 556', and 560' is installed on the application server 30'. The software components for the server-based implementation correspond to the software components for the client-based implementation of FIG. 4. The functionality of each server-based software component is similar to the client-based counterpart, with differences or added capabilities described below. The RNSVC 544' communicates with the resource database 548' and with the RNAPI 552' using local procedure calls. The RNAPI 552' also communicates with the user interface module 556' and the local cache 560'.

Similar to that described in FIG. 4 for the client machine 10, the client machine 10 logs on to the network 40 (FIG. 1), the server 30' develops and maintains a database containing the resource related information collected from the other machines in the machine farm 38, and a communication link is established between the server 30' and the client machine 20. The application server 30' may be in communication with the client machine 10 via an ICA connection 562'.

To run the Resource Neighborhood application in a server-based implementation, the user of the client machine 10 connects to an initial desktop (at the server 30') and launches the Resource Neighborhood application from within that desktop environment. The connection to the initial desktop can occur automatically, e.g., via a logon script of the client machine 20, via an entry in a Startup group, or by another centrally managed server specific mechanism. All remote application management and launching is accomplished through this initial desktop.

Similar to that described in FIG. 4 for the server 30, the server 30' uses the user credentials to determine those resources that the user of the client machine 10 is authorized to use. A Resource Neighborhood graphical window is returned to the client machine 10 and displayed on the client screen 22 (FIG. 1). This window can contain icons representing the available and, possibly, the unavailable resources that are in the Resource Neighborhood of the client machine 20.

In one embodiment, the web-based Resource Neighborhood application includes a group of objects that manage various aspects of a resource. In one embodiment, the Resource Neighborhood application includes three primary object classes that "plug in" to a web server: a gateway object class; a credentials object class; and a resources object class. In some specific embodiments, the object classes are provided as JavaBeans. The three primary object classes facilitate: validation of user credentials into a server farm; generation of lists of published resources that a specified user may access; provisioning of detailed information about a specific published resource; and conversion of resource application information into a format compatible with the protocol over which connection will be made.

When provided as JavaBeans, the objects can be accessed in a number of different ways. For example, they may be compiled as COM objects and made available to the web server as ActiveX components. In another embodiment, the JavaBeans can be used in their native form, such as when the server uses Java Server Pages technology. In yet another embodiment, the JavaBeans can be instantiated and used directly in a Java Servlet. In still another embodiment, the remote machine 30 can instantiate the JavaBeans as COM objects directly.

A credentials object class manages information necessary to authenticate a user into a target machine farm 38. A credentials object passes stored user credentials to other Resource Neighborhood objects. In some embodiments, the credentials object is an abstract class that cannot be instantiated and represents a user's credentials. Various class extensions may be provided to allow different authentication mechanisms to be used, including biometrics, smart cards, token-based authentication mechanisms such as challenge-response and time-based password generation, or others. For example, a "clear text credentials" extension may be provided that stores a user's name, domain, and password in plain text.

A gateway object class handles communications with a target machine farm 38. In one embodiment, the gateway object class is provided as an abstract Java class that cannot be instantiated. A particular gateway object may retrieve resource information by communicating with a machine farm 38 using a particular protocol, reading cached resource information, a combination of these two methods, or other various methods.

As noted above, the gateway object class may cache information to minimize communication with a target machine farm 38. Extensions to the gateway object may be provided to communicate with the machine farm 38 over specific protocols, such as HTTP. In one embodiment, an extension class is provided that allows the gateway object to communicate with the machine farm 38 via WINDOWS NT named pipes. The gateway object may provide an application programming interface hook that allows other Resource Neighborhood objects to query the object for application information.

A resources object class contains information about published resources and returns information about resources hosted by the machine farm 38 in order to create the Resource Neighborhood web page. The resources object class creates objects representing resources by retrieving information relating to the resources, either from an object created by the gateway object or directly from the machines in the machine farm 38. A resources object acts as a container for certain properties of the resource, some settable and some not settable, such as: the name of the resource (not settable); the width of the client window, in pixels, for this resource (settable); the height of the client window, in pixels, for this resource (settable); the number of colors to use when connecting to the resource (settable); the severity of audio bandwidth restriction (settable); the level of encryption to use when connecting to the resource (settable); the level of video to use when connecting to this resource (settable); whether the resource should be placed on a client's start menu (settable); whether the resource should be placed on the client's desktop (settable); the identity of the Resource Neighborhood folder to which the resource belongs (settable); the description of the resource (settable); the source of the graphics icon file for the resource (settable); the type of window that should be used when connecting to the resource (not settable); and whether to override default parameters for the object.

Figure 6A:
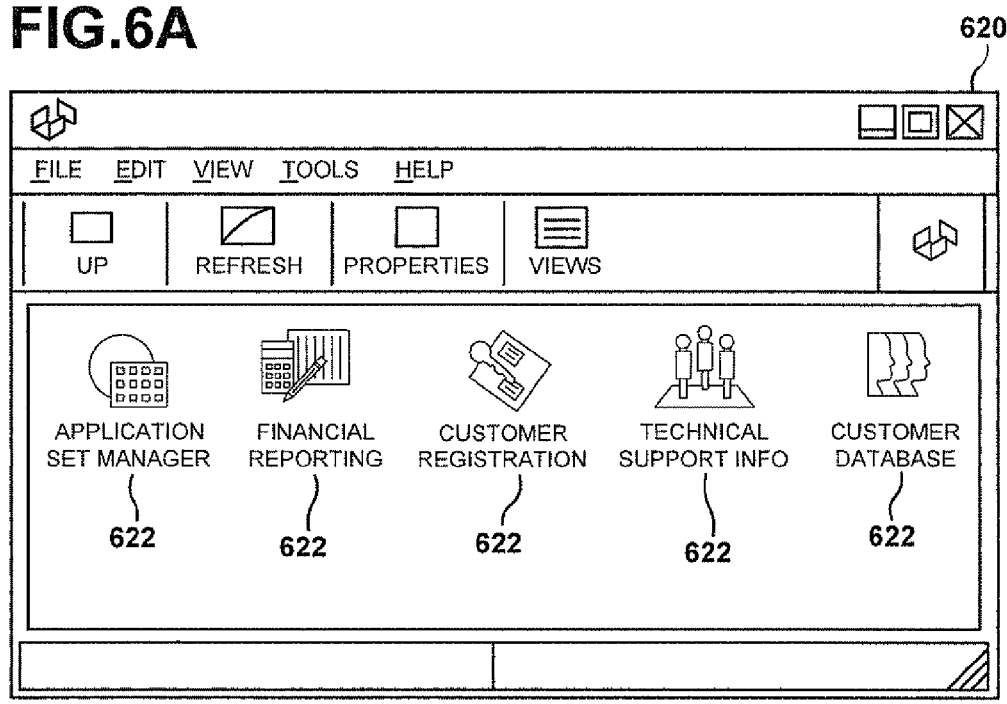
FIG. 6A is a screen shot of an embodiment of a display of a client machine after a resource neighborhood application program is executed.

FIG. 6A is a screenshot of one embodiment of Resource Neighborhood window 620 that can be displayed on the screen 12, 22 (FIG. 1) of a client machine 10, 10' after the Resource Neighborhood application has executed. The window 120 includes graphical icons 622. Each icon 622 represents a resource that is hosted by one of the machines in a machine farm 38. Each represented resource is available to the user of the client machine 10. The user can select one of the resources using the mouse 18, 28 or keyboard 14, 24.

Figure 6B:
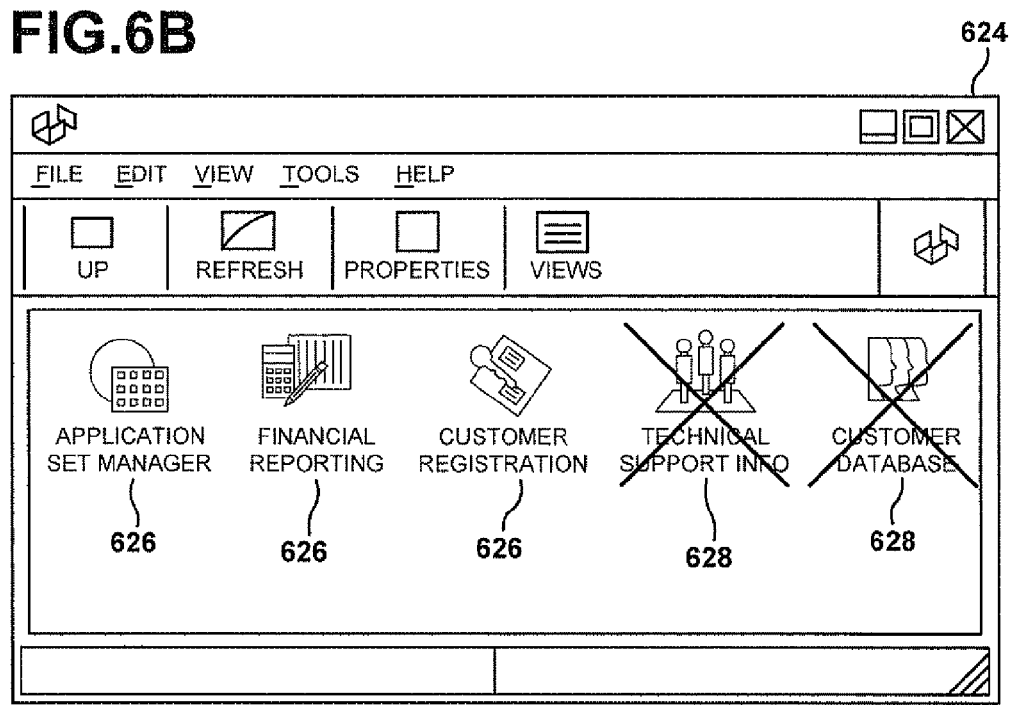
FIG. 6B is a screen shot of another embodiment of a display screen of a client machine after the resource neighborhood application program is executed.

FIG. 6B is a screenshot of another embodiment of a Resource Neighborhood window 624 that can be displayed on the screen 12, 22 (FIG. 1) of a client machine 10, 10' after the Resource Neighborhood application has executed. The window 624 includes graphical icons 626, 628. Each icon 626, 628 represents a resource that is hosted by one of the machines in a machine farm 38. Each resource represented by one of the icons 626 is available to the user of the client machine 10. The user can select one of the resources using the mouse 18, 28 or keyboard 14, 24. For web-based Resource Neighborhood environments, the screenshots of FIGS. 6A and 6B are similar, except that icons 622, 626, 628 are displayed within a browser window.

Each resource represented by one of the icons 628 is unavailable to the user of the client machine 10, although such resources are present in the server farm. The unavailability of these resources can be noted on the display screen (e.g., "X"s can be drawn through the icons 628). An attempt to access such a resource can trigger a message indicating that the user is not authorized to access the resource. Alternatively, the attempt may invoke a method allowing the user of the client machine 10 to request access to the resource.

In some embodiments, the resource comprises a computing environment. In one of these embodiments, a connection is established between the client machine 10 and a virtual machine hosting the requested computing environment. In one embodiment, a presentation layer protocol is used in establishing the connection between the client system and the virtual machine. In another embodiment, the X11 protocol is used in establishing the connection. In still another embodiment, the Remote Desktop Protocol (RDP) is used in establishing the connection. In yet another embodiment, the Independent Computing Architecture (ICA) protocol is used in establishing the connection.

In some embodiments, a connection is established between the client machine 10 and a physical machine, such as a traditional workstation or server, hosting the requested computing environment. In other embodiments, a connection is established between the client machine 10 and a hardware partition hosting the requested computing environment.

Figure 7A:
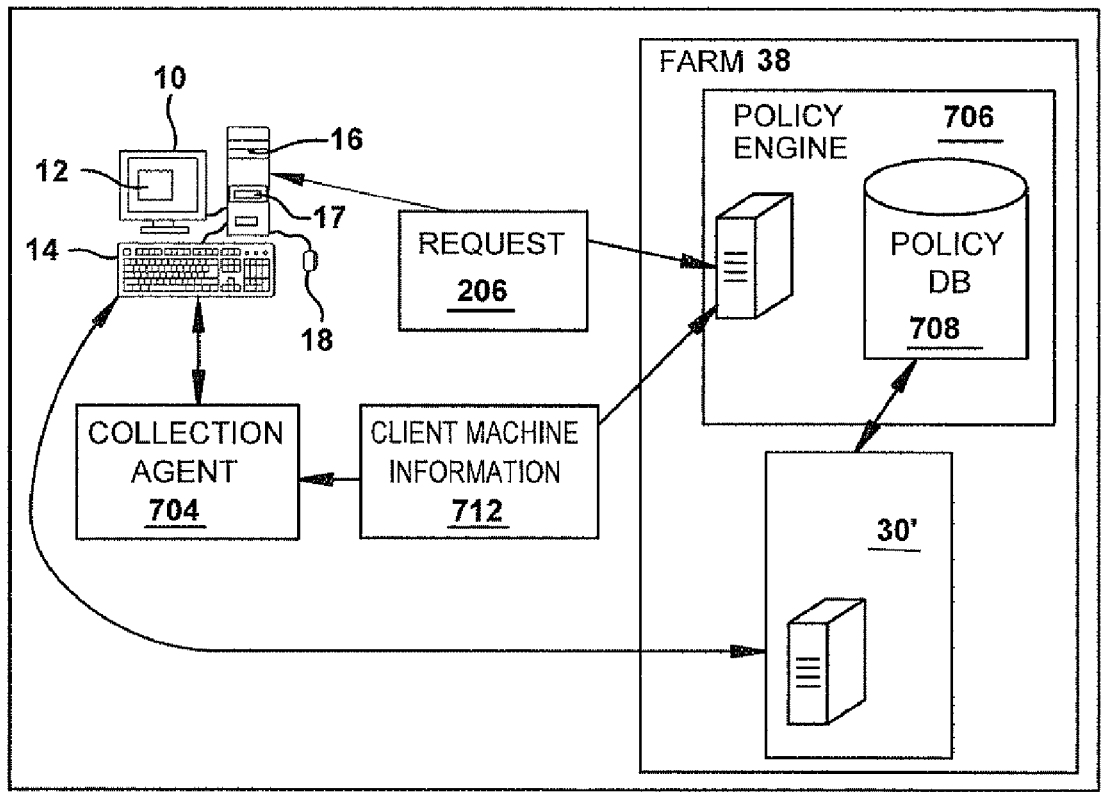
FIG. 7A is a block diagram of an embodiment of a network providing policy-based access to application programs for a machine.

In some embodiments, an enumeration of a plurality of resources available to the client machine 10 is provided (step 204) responsive to a determination by a policy engine regarding whether and how a client machine may access a resource. The policy engine may collect information about the client machine prior to making the determination. Referring now to FIG. 7A, one embodiment of a computer network is depicted which includes a client machine 10, a machine farm 38, a collection agent 704, a policy engine 706, a policy database 708, and a resource server 30'. In one embodiment, the policy engine 706 is a remote machine 30. Although only one client machine 10, collection agent 704, policy engine 706, machine farm 38, and resource server 30' are depicted in the embodiment shown in FIG. 7A, it should be understood that the system may provide multiple ones of any or each of those components.

In brief overview, when the client machine 10 transmits the policy engine 706 a request 206 for a resource enumeration, the collection agent 704 communicates with the client machine 10, retrieving information about the client machine 10, and transmits the client machine information 712 to the policy engine 706. The policy engine 706 makes an access control decision by applying a policy from the policy database 708 to the received information 712.

In more detail, the client machine 710 transmits to the policy engine 706 a request 206 for resource enumeration. In one embodiment, the policy engine 706 resides on a resource server 30'. In another embodiment, the policy engine 706 resides on a remote machine 30. In still another embodiment, a resource server 30' receives the request 206 from the client machine 10 and transmits the request 206 to the policy engine 706. In yet another embodiment, the client machine 10 transmits a request 206 for resource enumeration to an intermediate remote machine 30'" (not shown), which transmits the request 206 to the policy engine 706.

In some embodiments, the client machine 10 transmits the request 206 over a network connection such as those described above. Upon receiving the request, the policy engine 706 initiates information gathering by the collection agent 704. The collection agent 704 gathers information regarding the client machine 10 and transmits the information 712 to the policy engine 706.

In some embodiments, the collection agent 704 gathers and transmits the information 712 over a network connection. In some embodiments, the collection agent 704 comprises bytecode, such as an application written in the bytecode programming language JAVA. In some embodiments, the collection agent 704 comprises at least one script. In those embodiments, the collection agent 704 gathers information by running at least one script on the client machine 10. In some embodiments, the collection agent comprises an Active X control on the client machine 10. An Active X control is a specialized Component Object Model (COM) object that implements a set of interfaces that enable it to look and act like a control.

In one embodiment, the policy engine 706 transmits the collection agent 704 to the client machine 10. In some embodiments, the policy engine 706 requires another execution of the collection agent 704 after the collection agent 704 has transmitted information 712 to the policy engine 706. In some of these embodiments, the policy engine 706 requires another execution of the collection agent 704 because the policy engine 706 may have insufficient information 712 to determine whether the client machine 10 satisfies a particular condition. In other embodiments, the policy engine 706 requires a plurality of executions of the collection agent 704 in response to received information 712.

In some embodiments, the policy engine 706 transmits instructions to the collection agent 704 determining the type of information the collection agent 704 gathers from the client machine 10. In those embodiments, a system administrator may configure the instructions transmitted to the collection agent 704 from the policy engine 706. This provides greater control over the type of information collected. This also expands the types of access control decisions that the policy engine 706 can make, due to the greater control over the type of information collected. The collection agent 704 gathers information 712 including, without limitation, machine ID of the client machine 10, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the remote machine 30, date or time of access request including adjustments for varying time zones, and authorization credentials.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk. In still other embodiments, the device type is a game console.

In some embodiments, the digital watermark includes data embedding. In some embodiments, the watermark comprises a pattern of data inserted into a file to provide source information about the file. In other embodiments, the watermark comprises hashed data files to provide tamper detection. In other embodiments, the watermark provides copyright information about the file.

In some embodiments, the network connection information pertains to bandwidth capabilities. In other embodiments, the network connection information pertains to the Internet Protocol address of the client machine 10. In still other embodiments, the network connection information consists of the Internet Protocol address of the client machine 10. In one embodiment, the network connection information comprises a network zone identifying the logon agent to which the client machine 10 provided authentication credentials.

In some embodiments, the authorization credentials include a number of types of authentication information, including without limitation, user names, client names, client addresses, passwords, Personal Identification Numbers (PINs), voice samples, one-time passcodes, biometric data, digital certificates, tickets, etc. and combinations thereof. After receiving the gathered information 712, the policy engine 706 makes an access control decision based on the received information 712.

Figure 7B:
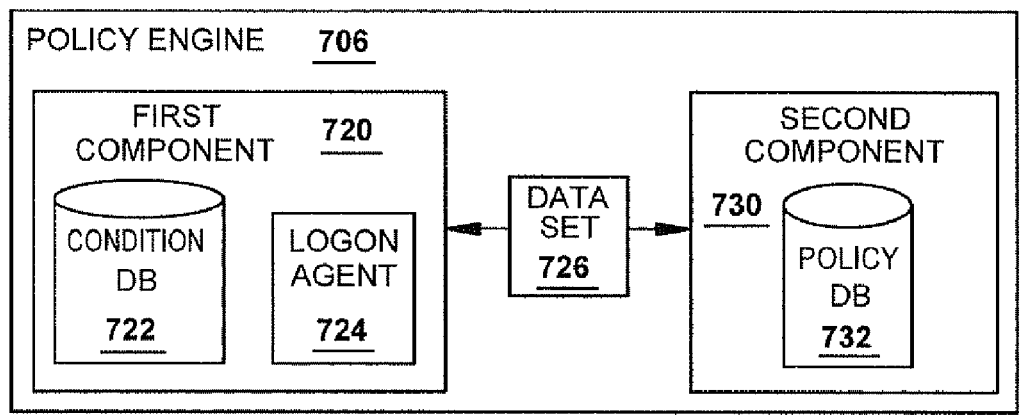
FIG. 7B is a block diagram depicting a more detailed embodiment of a policy engine.

Referring now to FIG. 7B, a block diagram depicts one embodiment of a policy engine 706, including a first component 720, including a condition database 722 and a logon agent 724, and a second component 730, including a policy database 732. The first component 720 applies a condition from the condition database 722 to information 712 received about client machine 10 and determines whether the received information 712 satisfies the condition.

In some embodiments, a condition may require that the client machine 10 execute a particular operating system to satisfy the condition. In other embodiments, a condition may require that the client machine 10 execute a particular operating system patch to satisfy the condition. In still other embodiments, a condition may require that the client machine 10 provide a MAC address for each installed network card to satisfy the condition. In some embodiments, a condition may require that the client machine 10 indicate membership in a particular Active Directory to satisfy the condition. In another embodiment, a condition may require that the client machine 10 execute a virus scanner to satisfy the condition. In other embodiments, a condition may require that the client machine 10 execute a personal firewall to satisfy the condition. In some embodiments, a condition may require that the client machine 10 comprise a particular device type to satisfy the condition. In other embodiments, a condition may require that the client machine 10 establish a particular type of network connection to satisfy the condition.

If the received information satisfies a condition, the first component 720 stores an identifier for that condition in a data set 726. In one embodiment, the received information satisfies a condition if the information makes the condition true. For example, a condition may require that a particular operating system be installed. If the client machine 10 has that operating system, the condition is true and satisfied. In another embodiment, the received information satisfies a condition if the information makes the condition false. For example, a condition may address whether spyware exists on the client machine 10. If the client machine 10 does not contain spyware, the condition is false and satisfied.

In some embodiments, the logon agent 724 resides outside of the policy engine 706. In other embodiments, the logon agent 724 resides on the policy engine 706. In one embodiment, the first component 720 includes a logon agent 724, which initiates the information gathering about client machine 10. In some embodiments, the logon agent 724 further comprises a data store. In these embodiments, the data store includes the conditions for which the collection agent may gather information. This data store is distinct from the condition database 722.

In some embodiments, the logon agent 724 initiates information gathering by executing the collection agent 704. In other embodiments, the logon agent 724 initiates information gathering by transmitting the collection agent 704 to the client machine 10 for execution on the client machine 10. In still other embodiments, the logon agent 724 initiates additional information gathering after receiving information 712. In one embodiment, the logon agent 724 also receives the information 712. In this embodiment, the logon agent 724 generates the data set 726 based upon the received information 712. In some embodiments, the logon agent 724 generates the data set 726 by applying a condition from the database 722 to the information received from the collection agent 704.

In another embodiment, the first component 720 includes a plurality of logon agents 724. In this embodiment, at least one of the plurality of logon agents 724 resides on each network domain from which a client machine 10 may transmit a resource request 710. In this embodiment, the client machine 10 transmits the resource request 710 to a particular logon agent 724. In some embodiments, the logon agent 724 transmits to the policy engine 706 the network domain from which the client machine 10 accessed the logon agent 724. In one embodiment, the network domain from which the client machine 10 accesses a logon agent 724 is referred to as the network zone of the client machine 10.

The condition database 722 stores the conditions that the first component 720 applies to received information. The policy database 732 stores the policies that the second component 730 applies to the received data set 726. In some embodiments, the condition database 722 and the policy database 732 store data in an ODBC-compliant database. For example, the condition database 722 and the policy database 732 may be provided as an ORACLE database, manufactured by Oracle Corporation of Redwood Shores, Calif. In other embodiments, the condition database 722 and the policy database 732 can be a Microsoft ACCESS database or a Microsoft SQL Server database, manufactured by Microsoft Corporation of Redmond, Wash.

After the first component 720 applies the received information to each condition in the condition database 722, the first component transmits the data set 726 to second component 730. In one embodiment, the first component 720 transmits only the data set 726 to the second component 730. Therefore, in this embodiment, the second component 730 does not receive information 712, only identifiers for satisfied conditions. The second component 730 receives the data set 726 and makes an access control decision by applying a policy from the policy database 732 based upon the conditions identified within data set 726.

In one embodiment, policy database 732 stores the policies applied to the received information 712. In one embodiment, the policies stored in the policy database 732 are specified at least in part by the system administrator. In another embodiment, a user specifies at least some of the policies stored in the policy database 732. The user-specified policy or policies are stored as preferences. The policy database 732 can be stored in volatile or non-volatile memory or, for example, distributed through multiple servers.

Using the policy engine 706 as just described, an access control decision based upon information received about a client machine 10 is made. Upon receiving gathered information about the client machine 10, the policy engine 706 generates a data set based upon the information. The data set contains identifiers for each condition satisfied by the received information 712. The policy engine 706 applies a policy to each identified condition within the data set 726. That application yields an enumeration of resources which the client machine 10 may access. In some embodiments, the enumeration of resources includes an enumeration of levels of access to the resource. In one of these embodiments, a plurality of allowable actions associated with the resource is enumerated. In another of these embodiments, a plurality of methods of execution of the resource is enumerated. The policy engine 706 then presents that enumeration to the client machine 10. In some embodiments, as described above in connection with FIGS. 6A and 6B, the policy engine 706 creates a Hypertext Markup Language (HTML) document used to present the enumeration to the client machine.

In some embodiments, the policy engine 706 transmits the enumeration to a different remote machine 30. In one of these embodiments, the remote machine 30 transmits the enumeration to the client machine 10. In another of these embodiments, the remote machine 30 applies additional policies to the enumeration. In still another of these embodiments, the remote machine is an appliance such as an application gateway or a firewall. In some of these embodiments, the policy engine 706 transmits an assigned level of action applicable to a requested resource to a remote machine 30 functioning as a broker server. The broker server establishes, responsive to the assigned level of access, a connection between the client machine 10 and a computing environment providing the requested resource.

Figure 8:
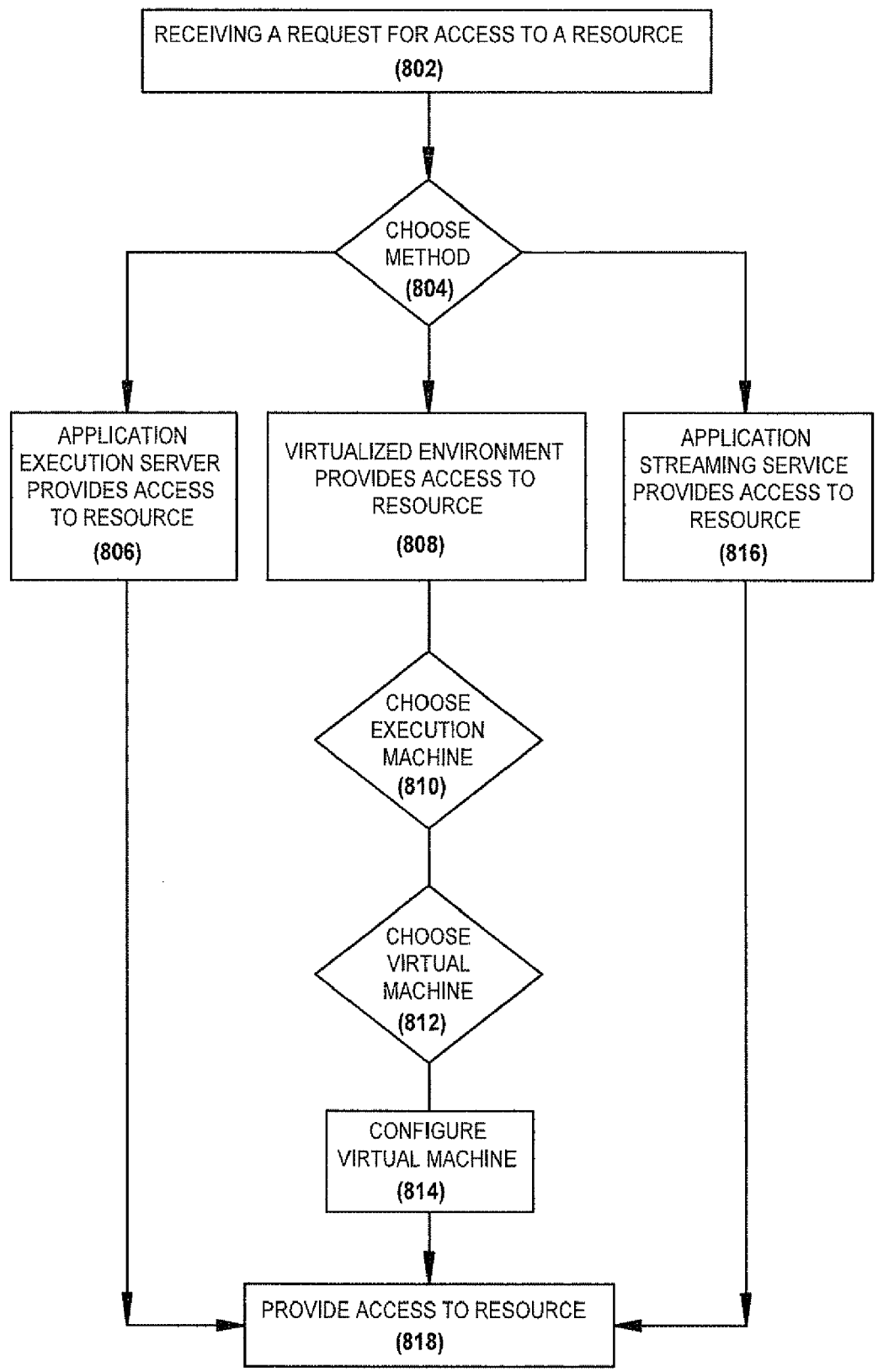
FIG. 8 is a flowchart depicting one embodiment of a process for providing access to a resource.

Referring now to FIG. 8, a flow diagram depicts one embodiment of the steps taken to provide access to a resource. In brief overview, a request for access to a resource is received (step 802). A method for providing access to the resource is identified (step 804). An application execution server may be selected to provide access to the resource (step 806). A virtualized environment may be selected to provide access to a resource (step 808). An application streaming service may be selected to provide access to the resource (step 816). If the virtualized environment is selected to provide access to the resource, an execution machine is identified (step 810). A virtual machine is selected (step 812). The virtual machine is configured (step 814). Access to the resource is provided (step 818).

Still referring to FIG. 8, and in more detail, a request for access to a resource is received (step 802). In one embodiment, a remote machine 30 receives the request. In some embodiments, the remote machine 30 is an intermediate broker server. In other embodiments, the remote machine 30 is a gateway. In still other embodiments, the remote machine 30 is a policy engine. In yet other embodiments, the remote machine 30 is an appliance.

In one embodiment, the remote machine 30 verifies that the user is authorized to access the resource. In still another embodiment, the remote machine 30 receives with the request information verifying authorization for access by the user.

In one embodiment, the remote machine 30 receives a request for an application program. In another embodiment, the remote machine 30 receives a request for access to a file. In yet other embodiments, the remote machine 30 receives a request for access to a computing environment. In one of these embodiments, the computing environment is a desktop environment from which the client machine 10 may execute application programs. In another of these embodiments, the computing environment provides access to one or more application programs. In some embodiments, the remote machine 30 receives a request for access to a computing environment supported by a plurality of hardware requirements. In some embodiments, a remote machine 30 functioning as deployment system receives a request for access to a resource, such as execution of an application program, from a client machine 10.

A method for providing access to the resource is identified (step 804). In one embodiment, a remote machine 30 consults a database to identify the method for providing access. In another embodiment, a remote machine 30 consults a policy or rules database to identify the method for providing access. In still another embodiment, a remote machine 30 receives from a policy engine an identification of a method to select.

For embodiments in which the resource is an application program, a policy may allow execution of the application program on the client machine 10. In another of these embodiments, a policy may enable the client machine 10 to receive a stream of files comprising the application program. In this embodiment, the stream of files may be stored and executed in an isolation environment on the client. In still another of these embodiments, a policy may allow execution of the application program only on a remote machine, such as an application server, and require the remote machine to transmit application-output data to the client machine 10. In yet another of these embodiments, a policy may allow execution of the application program only in a computing environment hosted on a virtual machine. In either of these cases, a stream of files comprising the application programs may be sent to the remote machine.

For embodiments in which the resource is a computing environment, a policy may allow installation of the computing environment on the client machine 10. In another of these embodiments, a policy may enable the client machine 10 to access a copy of the computing environment executing in a virtual machine on a remote machine 30. In still another of these embodiments, a policy may forbid the user of the client machine 10 to access the requested computing environment and offer an alternative computing environment.

For embodiments in which the resource is a computing environment supported by a plurality of hardware resources, a policy may enable the client machine 10 to access a copy of the computing environment executing in a virtual machine, which in turn executes on a hypervisor providing access to the requested plurality of hardware resources. In still another of these embodiments, a policy may forbid the user of the client machine 10 to access the requested computing environment and offer a computing environment supported by an alternative plurality of hardware resources.

The remote machine 30 may choose to provide access to an application execution server which provides access to a requested application program (step 806). The application execution server executes the application program and transmits application output data to the client machine 10. The application execution server may transmit the application output data over a presentation layer protocol, such as X11, VNC, ICA, or RDP.

Referring back to step 804, the remote machine 30 may choose to provide access to an application streaming service capable of transmitting a requested application program to the client machine 10 (step 816) for execution. Embodiments of application streaming services are described in greater detail below.

Referring back to step 804, the remote machine 30 may choose to respond to the client's request by allowing access to a computing environment provided by a virtual machine, the computing environment providing access to the requested resource (step 808). The computing environment may be provided by a virtual machine launched into a hypervisor executing on a remote machine 30'. In other embodiments, the remote machine 30 determines to provision on the client machine 10 a virtual machine providing access to the computing environment.

In embodiments where a remote machine 30 determines to provide access to the requested resource via a virtualized environment, the remote machine 30 identifies an execution machine providing access to a computing environment requested by the client machine 10 (step 810). In one of these embodiments, the remote machine 30 identifies an execution machine capable of hosting the computing environment. In another of these embodiments, the remote machine 30 determines that the user requesting access to the computing environment lacks authorization to access the requested computing environment. The remote machine 30 may identify an alternative computing environment which the user is authorized to access. In still another of these embodiments, the remote machine 30 identifies an execution machine on which a hypervisor provides access to a requested plurality of hardware and in which the requested computing environment may execute.

In other embodiments, the remote machine 30 is an execution machine capable of hosting the computing environment. In some of these embodiments, the computing environment is installed on the execution machine. In others of these embodiments, a hypervisor on the execution machine emulates a plurality of hardware resources required by the requested computing environment and the computing environment is launched in the hypervisor.

In some embodiments, the remote machine 30 identifies a remote machine 30' functioning as an execution machine capable of providing access to the computing environment supported by a requested plurality of hardware resources. In one of these embodiments, the remote machine 30' functions as an execution machine on which a hypervisor emulating the requested plurality of hardware resources executes and on which a computing environment supported by the hypervisor executes.

In some embodiments, an execution machine providing hardware resources, physical or virtual, capable of supporting a particular virtual machine is identified responsive to a load-balancing determination. In one of these embodiments, the execution machine is selected responsive to load-balancing information maintained by a management server 30. In some embodiments, the management server 30 is a single machine. In still other embodiments, several remote machines 30 may be capable of acting as a management server, but only one of such nodes is designated the management server. In some embodiments, a client request is directed to the management server 30 in the first instance. In other embodiments, a remote machine 30 queries the management server 30 to determine the identity of a suitable execution machine.

The master network information server node 30 maintains a table of addresses for the remote machines 30', 30". In addition, the master network information server node 30 receives messages from the remote machines 30', 30" indicating their level of activity, which may comprise CPU load or may comprise an identification of the number of a virtual machines currently hosted by a remote machine 30', 30". The level of activity of the remote machines 30', 30" is maintained in a table along with the address of each of the remote machines 30', 30".

For embodiments, in which a single management server 30 is used, it is desirable to dynamically select a master network information server node 30 from the available remote machines 30 on the network. In this way, if the active management server 30 fails, a new management server 30 may be selected as soon as the failure of the previous management server 30 is detected. In one embodiment a management server 30 is selected by an election process among the remote machines 30.

In one embodiment, any machine (client machine 10 or remote machine 30) may force an election at any time by broadcasting a request election datagram to the machine farm 38. The election results are determined by a comparison of the set of election criteria which is transmitted within the request election datagram transmitted by the requesting node with the set of election criteria maintained on each receiving node. That is, the first election criterion from the datagram of the requesting node is compared by the receiving node to the first criterion of the receiving node. The highest ranking of the two criteria being compared wins the comparison and the node with that criterion wins the election. If the two criteria tie, then the next criteria are sequentially compared until the tie is broken. If a remote machine 30 receiving the request election datagram has a higher election criterion than that received in the request election datagram, the remote machine 30 receiving the request election datagram issues its own request election datagram. If the receiving remote machine 30 has a lower election criteria than the criteria received in the request election datagram, the receiving remote machine 30 determines it is not the master network information server node and attempts to determine which remote machine 30 in the machine farm 38 is the management server 30.

In one embodiment the criteria which determine the outcome of the election include: whether or not the node is statically configured as a master network information server node; whether the remote machine 30 has the higher master network information server software version number; whether the remote machine 30 is an NT domain controller; whether the remote machine 30 is the longest running node; and whether the remote machine 30 has a lexically lower network name. In one embodiment, the datagram structure for the election request includes an unsigned shortword for the server version number, an unsigned shortword in which the bits are flags which designate whether the node is statically configured as a master network information server node, or is executing on a NT domain controller and an unsigned longword containing the amount of time the server has been running.

Periodically, the management server 30 transmits a declare message to the other remote machines 30 declaring itself to be the management server 30. If another remote machine 30 believes itself to be a management server 30, the other remote machine 30 will request an election. In this way erroneous master network information server nodes 30 of the same protocol are detected and removed. In addition an election will also be requested: by any remote machine 30 when that remote machine 30 reboots; by any remote machine 30 to whom the master network information server node has failed to acknowledge an update message; or any client machine 10 to whom the master network information server node 30 has failed to respond to a request for information.

Figure 9:
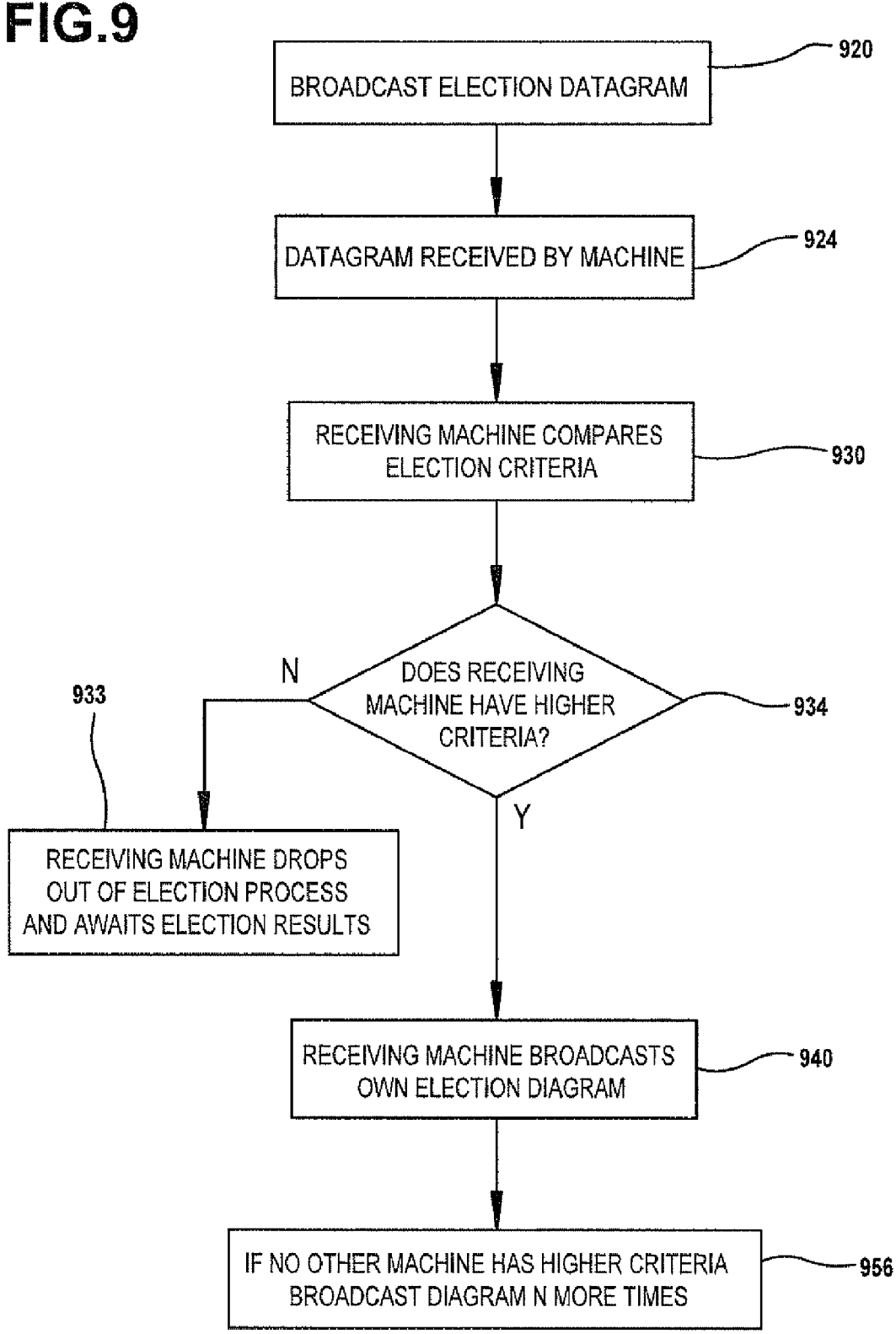
FIG. 9 is a flow diagram depicting one embodiment of a process for electing a management node.

In more detail and referring to FIG. 9, once any remote machine 30 (which may be referred to as a node) broadcasts a request election datagram requesting an election (Step 920), the remote machine 30 receiving the request election datagram (Step 924) first compares its election criteria to the criteria in the request election datagram (Step 930) to determine if the receiving remote machine 30 has higher criteria (Step 934). If the remote machine 30 receiving the datagram has lower election criteria (Step 938) than the criteria contained in the request election datagram, the remote machine 30 receiving the request election datagram drops out of the election process and awaits the results of the election (Step 938).

If the remote machine 30 receiving the request election datagram has higher election criteria than that contained in the request election datagram, then the remote machine 30 receiving the request election datagram broadcasts its own request election datagram containing the remote machine's own election criteria (Step 940). If in response to the transmission of the request election datagram by the second remote machine 30, another remote machine 30' responds with a request election datagram with even higher election criteria, then the second remote machine 30 drops out of the election and the remote machine 30' with higher criteria broadcasts it's own request election datagram. If no other remote machine 30 responds with higher election criteria, the node which has apparently won the election for master network information server node sends n more election requests, (in one embodiment three requests) (Step 956) and then if still no other remote machine 30 responds with higher election criteria, the remote machine 30 which has sent the n election requests is the new management server 30.

After the election has occurred and the new management server 30 has been determined, all the remote machines 30 send all of their configured gateway addresses to the new network information server node 30. In this way the new management server 30 becomes a gateway node.

Referring again to FIG. 1, once the management server 30 is elected, the remote machines 30 send update datagrams to the master network information server 30 providing information about each remote machine 30 transmitting the update datagram. In one embodiment, the update datagram sent to the master network information server node 30 from a remote machine 30 includes: the remote machine 30 name; the network address; the cluster name; the network transport protocol; the total number of remote machines 30 configured with this transport; the number of ports available for connection with a client using this transport protocol; the total number of users permitted to be active at one time; number of available user slots; and server load level. Upon receipt of the update datagram, the master network information server node 30 returns an acknowledgment to the remote machines 30 that transmitted the update datagram indicating that the update datagram was received. If the remote machine 30 transmitting the update datagram does not receive an acknowledgment from the master network information server node 30, the transmitting remote machine 30 assumes that the master network information server node 30 has failed and transmits an election request.

Figure 10:
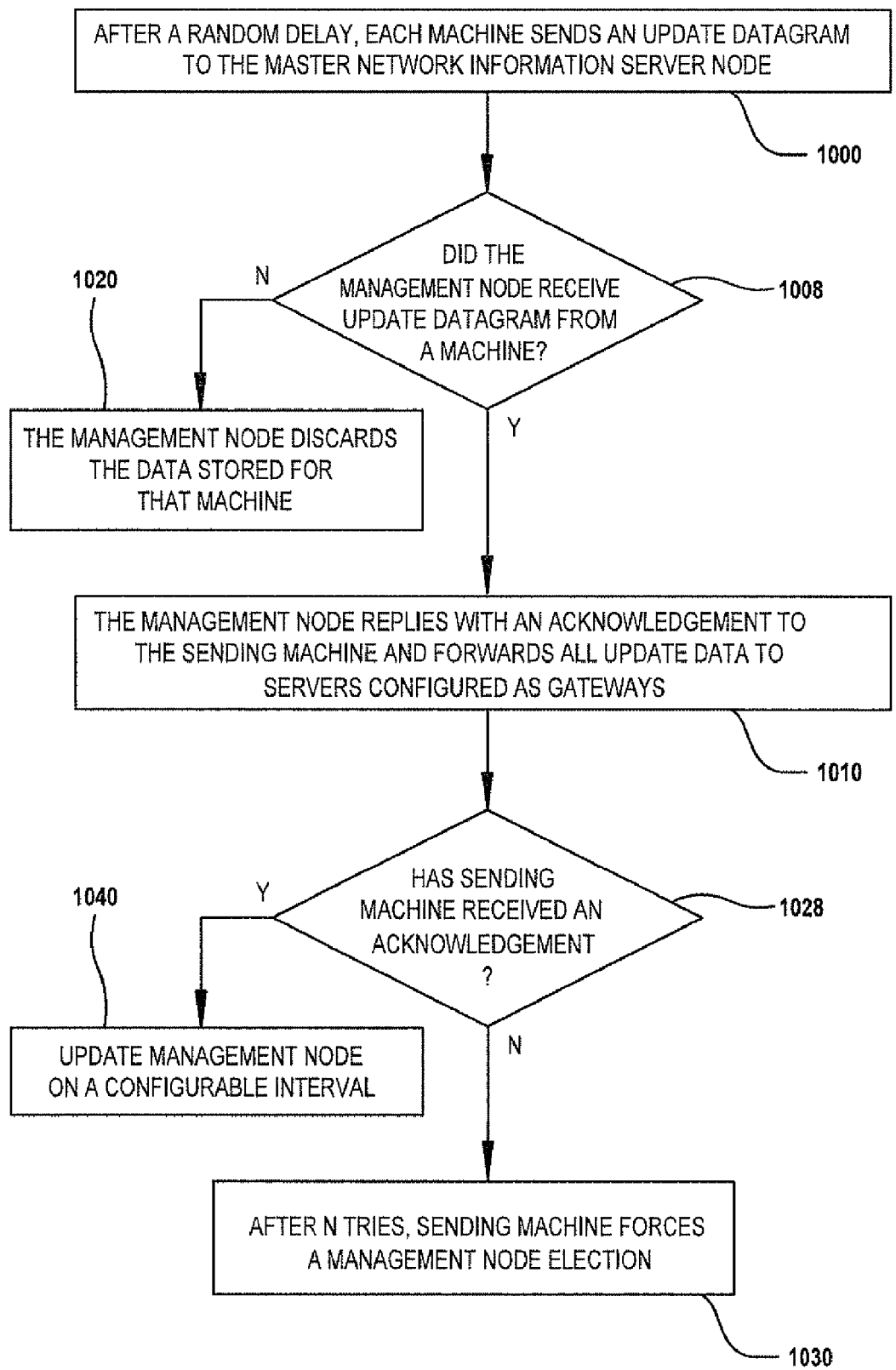
FIG. 10 is a flow diagram depicting one embodiment of a process to update information collected by the management node.

In more detail and referring to FIG. 10, a remote machine 30, after the election of a management server 30, waits a random period of time and then sends a datagram to the management server 30 with its latest load information (Step 1000). In one embodiment the delay is between four and six seconds. If the management server 30 receives (Step 1008) an update datagram from a remote machine 30, then the master network information server node 30 replies to the transmitting remote machine 30 with an acknowledgment (Step 1010) and forwards the data to any remote machine 30 configured as a gateway node. If the master network information server 30 fails to receive data from a remote machine 30 (Step 1008), then the master network information server 30 discards the old data from the remote machine 30 after a predetermined amount of time (Step 1020).

If the remote machine 30 does not receive an acknowledgment from the master network information server node 30 after the remote machine 30 has sent an update datagram (Step 1028), the remote machine 30 retransmits the update datagram. The remote machine 30 will attempt n retransmits (in one embodiment three) before it assumes that the master network information server 30 has failed and then transmits an election request (Step 1030). If the remote machine 30 receives an acknowledgment, then it periodically updates the master network information server node 30, in one embodiment every 5 to 60 minutes (Step 1040).

Figure 11:
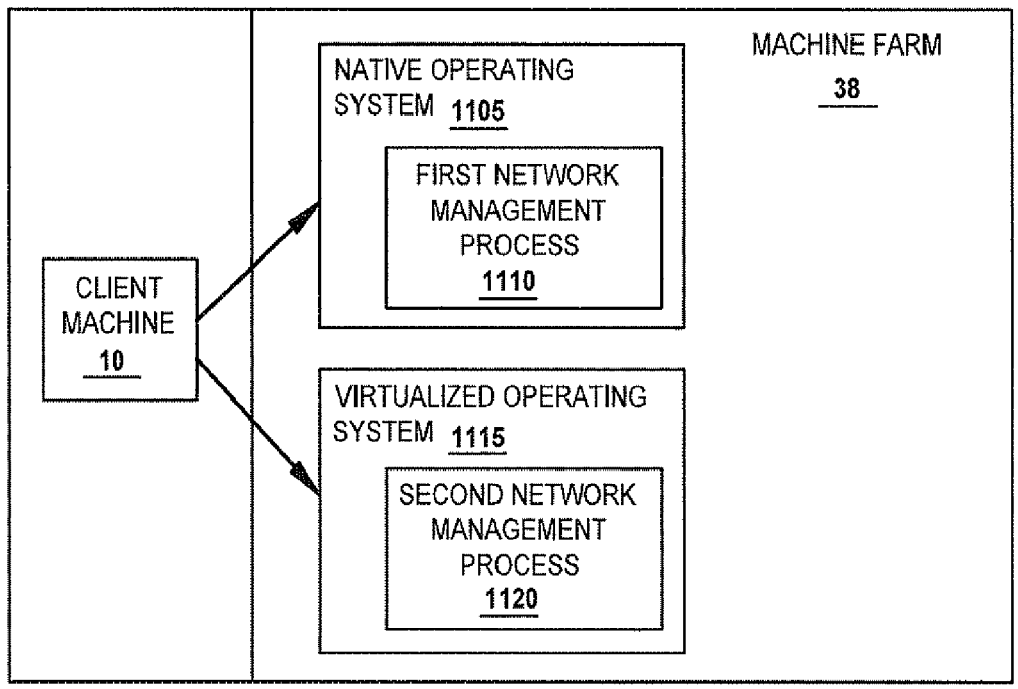
FIG. 11 is a block diagram depicting an embodiment of a machine farm including first and second network management processes.

In some embodiments, a remote machine's participation in the activities just described is controlled by a virtual machine executing in the hypervisor rather than by an operating system. FIG. 11 is a block diagram depicting one embodiment of a machine farm 38 including a first and second network management processes. The first network management process 1110 executes in a native operating system 1105 (such as WINDOWS NT) and accesses a native memory element storing (i) a data table and (ii) at least one election criteria for allowing the first network management process 1110 to be dynamically selected as a management process, the data table having an entry for each of said at least two network management processes. The second network management process 1120 executes in a virtualized operating system 1115 and accesses a virtualized memory element storing (i) a data table and (ii) at least one election criteria for allowing the second network management process 1120 to be dynamically selected as the management process, the data table having an entry for each of said at least two network management processes. The client machine 10 communicates with the one of the first network management process 1110 and the second network management process 1120 selected as the management process and receives from the management process an address of a remote machine 30 with which to communicate. In some embodiments, a plurality of client machines 10 is in communication with a master network information process.

The first network management process 1110 executes in a native operating system 1105. The second network management process 1120 executes in a virtualized operating system 1115. In one embodiment, the at least two network management processes are grouped into clusters. In another embodiment, one of the at least two network processes is a gateway process. In still another embodiment, the gateway process is a master network management process. In some embodiments, the master network management process is selected by a process comprising the steps of (a) broadcasting an election datagram to the at least two network management processes, the election datagram comprising election criteria; and (b) selecting a master network management process in response to the election criteria. In one of these embodiments, the master network management process broadcasts a declare datagram to detect multiple master network management processes using the same transport protocol. In another of these embodiments, the master network management process is selected by a process that occurs after an event selected from the group of events consisting of: a system reboot, a master network management process failing to respond to a datagram sent from a network management process, a master network management process failing to respond to a request from a client machine, detection of at least two master network management processes configured with the same transport, and a new network management process appearing on said network.

In one embodiment, the management process is elected as described above in connection with FIGS. 9 and 10.

In some embodiments, the network includes a third network management process using a different network transport protocol from the first network management process. In one of these embodiments, the third network management process comprises a master network management process for the different network transport protocol.

For embodiments in which machine farm management is decentralized, each remote machine 30 may include a load management subsystem (LMS) providing a load management capability. In general, the LMS manages overall server and network load to minimize response time to client requests.

In some embodiments, an apparatus for selecting a server from a network plurality of servers to service a client request comprises a plurality of network management processes. In one of these embodiments, each of said plurality of network management processes includes an event bus and a subsystem in communication with the event bus. In another of these embodiments, a first one of the plurality of network management processes receives from a client machine a request for access to a computing resource and sends the client request to a second one of the plurality of network management processes. In still another of these embodiments, the second one of the plurality of network management processes executes in a virtualized operating system and comprises a dynamic store and a load management subsystem.

The dynamic store loads information associated with at least some of the plurality of network management processes in a virtualized memory element. In some embodiments, the dynamic store contains information relating to server processor load. In other embodiments, the dynamic store contains information relating to server input/output transaction load.

The load management subsystem (i) receives, via said event bus, a request to identify a server for servicing a client request, (ii) retrieves from said dynamic store the loading information, (iii) chooses, based on the retrieved loading information, one of the plurality of servers for servicing the client request, and (iv) transmits, via said event bus, a message including information identifying the chosen server. In some embodiments, the load management subsystem stores run-time information in the dynamic store at predetermined intervals. In other embodiments, the apparatus further includes a persistent store, the load management subsystem in communication with the persistent store via the event bus, the persistent store containing an identification of at least one rule to be used to manage server load.

In one embodiment, the LMS is rule-based, and an administration tool can be used to modify or create rules for managing server load. A rule is one or more criteria that influences how a LMS will direct requests. Rules may be individualized to a specific remote machine 30. Rules can also be individualized to a specific application or computing environment on a per-server basis. That is, one or more rules may be associated with a copy of an application or a computing environment residing on a first remote machine 30 in the machine farm 38 and different rules may be associated with a copy of the same application or computing environment residing on a second remote machine 30 in a machine farm 38. The output of rules individualized to a specific application may be combined with the output of general server rules to direct a client request.

Rules use the output from one or more operational meters. Operational meters may measure any aspect of server performance and the result is used by rules to help determine which remote machine 30 is most appropriate to service a client request. For example, operational meters may measure: processor load; context switches; memory usage; page faults; page swaps; transmission rate of input/output reads or writes; number of input/output operations performed or number of virtual machines hosted. In one embodiment, operational meters are used by a LMS to measure server performance during the occurrence of certain events such as a request for a client connection. In another embodiment, operational meters are used by a LMS to measure server performance at predetermined intervals, which may be configured by an administrator. A LMS on each remote machine 30 in the machine farm 38 evaluates various performance metrics for the remote machine 30 for each predetermined period of time and stores that information in the dynamic store. For example, every thirty seconds, an evaluation of server load may include a query to operational meters for server's CPU utilization and memory utilization. The results from the query will be used, in conjunction with other applicable load factors, to calculate a load number for this server load. The new load number is then sent to the dynamic store.

Rules and operational meters are, in one embodiment, executable code modules that query specific system conditions, resources, and performance metrics for remote machines 30 in the machine farm 38. Some of the rules accept user-configurable parameters that are entered by the administrator via the administration tool. Rules may be provided to the LMS using a dynamic link library ("DLL"), and the rules and rule parameters applicable to a specific server may be stored in the persistent store. That is, the administrator's selection of rules is stored, together with a weighting factor and applicable settings associated with those rules, in the persistent store. For example, some operational meters may measure load at a predetermined interval; the predetermined interval may be set by the administrator.

Examples of conditional rules that may be used by the LMS to determine to which remote machine 30 to direct a request include: whether the number of client machines 10 that may connect to a remote machine 30 is limited; whether the number of client sessions that may be serviced by a remote machine 30 is limited; whether the number of virtual machines that may be hosted by a remote machine 30 is limited; the number of application or connection licenses available to a remote machine 30; whether the application requested by the client machine 10 is currently executing on the remote machine 30; whether a client is physically proximate to, or is connected by a high bandwidth link to, a server; and whether a client request is being made during a time period for which the remote machine 30 is available to service client requests.

A set of rules may be grouped together by the group subsystem 300 to form a load evaluator associated with a particular server or a particular application. A server load evaluator is a load evaluator that applies to all applications published on the server. An application load evaluator is a load evaluator that encapsulates rules specific to certain applications. In one embodiment, loads for published application programs are the sum of a server load evaluator and an application load evaluator. The load evaluator associated with a particular server may be stored in the persistent store 230. When a LMS initializes, it queries persistent store 230 to determine whether a load evaluator is associated with the remote machine 30 on which the LMS resides. If so, the rules and operational meters are loaded and the LMS begins using those elements of the load evaluator. The outputs of the constituent parts of the load evaluator are combined to calculate composite indicia of the load on particular servers, and each LMS stores the results of its load evaluator in dynamic store. Each rule encapsulated in a load evaluator may have a configurable weighting factor. Many rules have user-configurable parameters that control the way LMS loads are calculated. For example, in one embodiment, a CPU Utilization rule has two parameters: Report Full Load when processor utilization is greater than X-percent; report no load when processor utilization is less than X percent. In one particular embodiment, the load reported by a load evaluator equals the sum of each rule's load times each rule's weight.

In another example, a remote machine 30 that hosts four applications may have three load evaluators with which it is associated. The server itself and a first application may by associated with a first load evaluator, the second and third applications may be associated with a second load evaluator, and the fourth application may be associated with a third load evaluator. When the remote machine 30 boots, it read the first, second, and third load evaluators from the persistent store 230. Periodically (or perhaps after certain events) the remote machine 30 calculates the output for each of the load evaluators and sends those values to the dynamic store. When a connection request is received, those values are used to determine if the remote machine 30 should service a client request.

For example, using operational meters the LMS can obtain information about the processor load on a particular remote machine 30, the memory load on that remote machine 30, and the network load of that remote machine 30. The LMS combines these results to obtain an overall load number that indicates the total aggregate load on that remote machine 30. In determining the aggregate load, the load evaluator may weight each piece of information differently. For embodiments in which a rule is associated with a remote machine 30, the rule may disqualify a remote machine 30 from servicing a client request. For example, a rule may limit the number of client sessions a remote machine 30 may initiate. In this embodiment, if a remote machine 30 is currently servicing the maximum number of client sessions allowed by the rule, it will not be chosen by the LMS to service a new client request, even if the outputs of its operational meters indicate that it is the most favorable remote machine 30 to which to route the client request.

Referring back to FIG. 8, after an execution machine has been selected, a virtual machine providing a requested computing environment is identified (step 812). In some embodiments, declarative policies such as rules databases, policy databases or scripts are consulted to direct requests to a virtual machine. In other embodiments, a remote machine 30 functioning as an application server hosting a plurality of virtual machines is identified. In one of these embodiments, one of the plurality of virtual machines hosted by the application server may be selected and associated with the client machine 10. In another of these embodiments, an identifier for the selected virtual machine may be transmitted to the client machine 10.

In some embodiments, a session management component identifies the virtual machine. In one of these embodiments, an intermediate machine 30 receiving the request invokes a session management component. In another of these embodiments, the intermediate machine launches the session management component in a terminal services session executing on the intermediate machine. In still another of these embodiments, the intermediate machine launches the session management component in a terminal services session executing on the identified execution machine.

In one embodiment, the session management component provides functionality for identifying a location of a virtual machine providing access to a computing environment. In still another embodiment, the session management component is provided as a program module published on a server, such as an application server. In yet another embodiment, the session management component identifies, launches, and monitors virtual machines.

In some embodiments, the session management component communicates with a virtual machine management component to identify a virtual machine. In one of these embodiments, the virtual machine management component provides functionality for locating virtual machines. In another of these embodiments, the virtual machine management component provides functionality for allocating an available virtual machine to a user from a plurality of available virtual machines. In still another embodiment, the virtual machine management component provides functionality for reallocating shared virtual machines to the plurality of available virtual machines. In yet another embodiment, the virtual machine management component provides functionality for tracking a state associated with a virtual machine for each virtual machine in a plurality of virtual machines.

Figure 12:
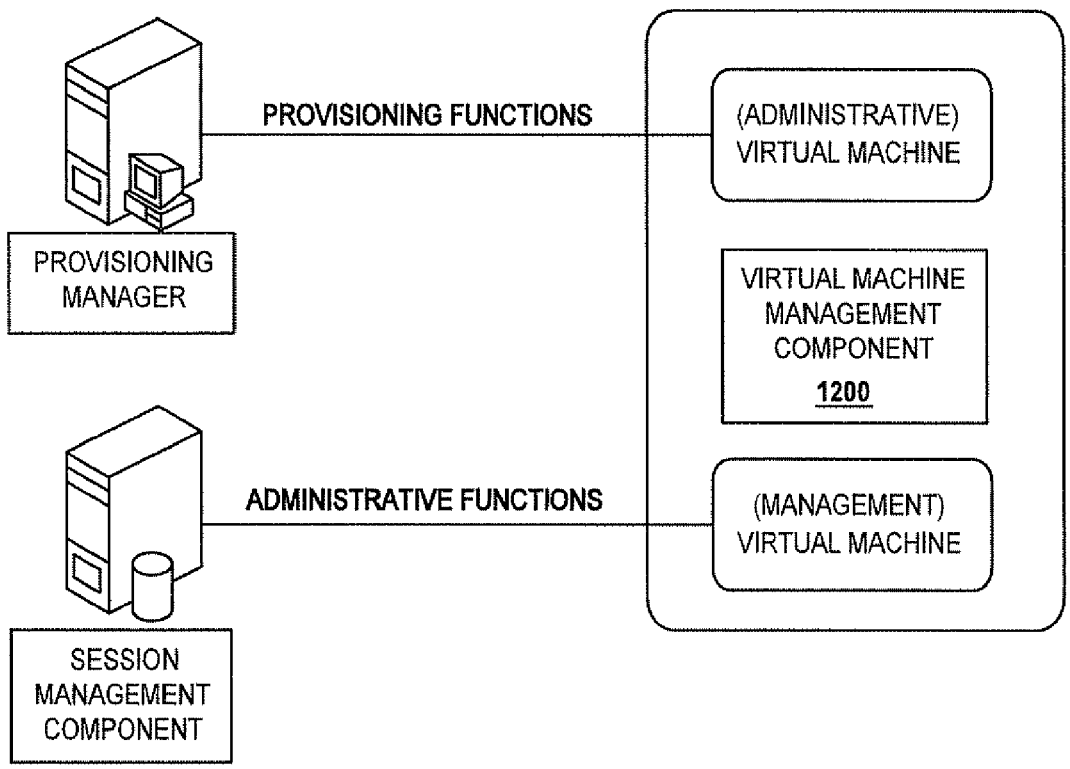
FIG. 12 is a block diagram depicting one embodiment of a virtual machine management component.

Referring now to FIG. 12, a block diagram depicts one embodiment of a virtual machine management component 1200. In one embodiment, the virtual machine management component 1200 provides functionality for accessing and updating a database including a virtual machine catalog. In another embodiment, the virtual machine management component 1200 provides functionality for allowing an administrator or virtual machine provisioning system to add, remove, or modify entries in the database including a virtual machine catalog. In some embodiments, the virtual machine management component 1200 includes a virtual machine providing administrative functionality. In other embodiments, the virtual machine component 1200 includes a virtual machine providing management functionality.

In some embodiments, the virtual machine management component 1200 may receive a request from a provisioning system or from a session management component. In one of these embodiments, a provisioning system contacts the virtual machine management component 1200 when a virtual machine is created or destroyed. In another of these embodiments, the session management component contacts the virtual machine management component 1200 when the session management component is invoked to request a virtual machine to launch. In still another of these embodiments, the session management component contacts the virtual machine management component 1200 when the session management component identifies a change in a state of a launched virtual machine. The session management component may send messages, such as heartbeat messages, to the virtual machine management component 1200 while a virtual machine is active. If the virtual machine may be accessed by more than one user, the virtual machine management component 1200 may reassign the virtual machine to the plurality of available virtual machines after a user has terminated a session with the virtual machine.

In some embodiments, virtual machines of the same machine type may be categorized into a plurality of standard operating environments (SOE). In one of these embodiments, an SOE may be a group of virtual machine images of a particular configuration that implement the function of a particular Machine Type, e.g. a machine type "C++ Developer Workstation" may have one SOE containing images with WinXP Pro SP2 with Visual Studio 2003 installed and another SOE containing images with Win Vista with Visual Studio 2005 installed.

In other embodiments, the virtual machine management component 1200 may provide functionality for one or more of the following actions related to a standard operating environment (an SOE): creating an SOE, updating an SOE, deleting an SOE, finding an SOE, and retrieving an SOE. In still another embodiment, the virtual machine management component 1200 may provide functionality for one or more of the following actions related to virtual machines: create a virtual machine, update a virtual machine, delete a virtual machine, find a virtual machine, and assignment to or removal from a standard operating environment.

A machine type may refer to a non-technical description of a computing environment provided by a virtual machine. Some examples of machine types are "C++ Developer Workstation" or "Secretarial Workstation." Many virtual machines may be grouped in a single machine type. In one embodiment, the virtual machine management component 1200 may provide functionality for one or more of the following actions related to machine types: creating machine types, updating a machine type, deleting a machine type, finding a machine type, and retrieving a machine type.

In some embodiments, the virtual machine management component 1200 may provide functionality for creating virtual machines. In one of these embodiments, an administrator or provisioning service creates a new machine type in a database of virtual machines. The machine type is given a meaningful name such as "HR Manager Workstation." In one embodiment, the machine type name is the name for a class of standard operating environment (SOE) rather than a specific SOE, and multiple SOEs may be assigned to the machine type name. In another embodiment, the machine type may be used to publish the class of virtual machines.

In another of these embodiments, a standard operating environment (SOE) is created for the machine type and assigned to the machine type in the database of virtual machines. In one embodiment, the SOE is a virtual machine with a specific hardware and software configuration. A snapshot of the SOE virtual machine may be taken and used as a template for virtual machine clones. In one embodiment, clones of the SOE virtual machine are assigned to users.

In one embodiment, an administrator clones an SOE for use by users by creating linked clones of the snapshot of the SOE virtual machine. The linked clone virtual machines may be created in consecutively numbered subfolders in the SOE folder. The linked clones of the SOE may be assigned to the SOE in the database of virtual machines.

In another embodiment, an administrator updates a machine type by creating a new SOE, and new linked clones of the SOE. The administrator updates an SOE pointer within a machine type record in the database of virtual machines to point to the new SOE, and marks the old SOE as being superseded. The administrator may create the new SOE by creating a new virtual machine and installing the software, or by creating a full clone of an existing SOE and updating it. As an example the administrator could create a new virtual machine and install Microsoft Windows XP Professional, followed by Windows XP SP1, followed by Microsoft Office 2003, or the administrator could have taken a full clone of an existing SOE with Windows XP and Microsoft Office 2003 already installed, and installs Windows XP SP1 to achieve the same SOE. The new SOE may be created in a new SOE folder and a new SOE record is created in the database of virtual machines. Linked clones of the superseded SOE can be deleted when users have finished with them and the superseded SOE can be deleted when all linked clones have been deleted.

In some embodiments, a virtual machine may be designated as a shared virtual machine. In one of these embodiments, a shared virtual machine is an instance of a virtual machine image that is designated for use by multiple users. In another of these embodiments, the shared virtual machine is used by one user at a time and returned to a pool of available virtual machines when not in use. In still another of these embodiments, as the image of a shared virtual machine is executed, users may change the image but may not persist any changes to the image once it is shutdown. In this embodiment, all changes are discarded when the image is shutdown or a user terminates a session.

In other embodiments, a virtual machine may be designated as a private virtual machine. In one of these embodiments, a private virtual machine is an instance of a virtual machine image that is designated for use by a specific user. Only that user may be allocated to the image, launch the image, or execute the image. In another of these embodiments, private images will be configured to permit changes to be persisted when the image is shutdown. In still another of these embodiments, changes may be configured to be discarded upon image shutdown as per shared images, depending on the requirements of the user.

In some embodiments, a session management component is launched and identifies a virtual machine. In one of these embodiments, the session management component transmits an identification of a user and a virtual machine type identified responsive to a request for access to a resource to the virtual machine management component 1200. In another of these embodiments, the session management component requests an identification of a specific virtual machine to launch. In still another of these embodiments, the session management component requests an identification of a location of the configuration and virtual disk files of the identified virtual machine.

In some embodiments, a virtual machine is identified responsive to the received identification of the user of the requesting machine. In other embodiments, a virtual machine is identified responsive to a request by the user for a type of virtual machine. In still other embodiments, a virtual machine is identified responsive to a request by the user for a type of computing environment.

In some embodiments, the virtual machine management component 1200 transmits to the session management component an identification of a specific virtual machine to launch. In one of these embodiments, the session management component then proceeds to launch the virtual machine. In another of these embodiments, the virtual machine management component launches the virtual machine.

In other embodiments, the virtual machine management component transmits to the session management component an identification of a plurality of virtual machines to launch. In one of these embodiments, the session management component may present an enumeration of available virtual machines to a user. In another of these embodiments, the session management component receives a selection of a virtual machine from the enumeration of available virtual machines and the session management component launches the selected virtual machine. In still other embodiments, the virtual machine management component transmits to the session management component an indication that no virtual machines are available for the user requesting the access. In yet other embodiments, the virtual machine management component 1200 transmits to the session management component an indication that an existing, executing virtual machine has now been allocated to the user.

In yet other embodiments, the virtual machine management component transmits to the session management component an identification of an available virtual machine responsive to accessing a database storing information associated with a plurality of virtual machines, the information including, but not limited to, an identification of the plurality of virtual machines, an identification of a location of files associated with the plurality of virtual machines, an identification of an access control list associated with the plurality of virtual machines, and an indication of availability of the plurality of virtual machines.

In one embodiment, when a virtual machine has been identified as a machine to launch, the virtual machine management component 1200 modifies an access control list associated with the virtual machine responsive to the identification of the user received from the session management component in the initial request. In another embodiment, the virtual machine management component 1200 modifies the access control list to allow the virtual machine to be launched for the user. In still another embodiment, the virtual machine management component 1200 transmits additional information associated with the virtual machine to the session management component. The additional information may include network share details relating to a folder storing files associated with the virtual machine. In yet another embodiment, the session management component uses the additional information to map the folder to a mount point, such as a drive letter, in the virtual machine.

In some embodiments, virtual machine images—configuration and data files comprising the virtual machine—are stored on a storage area network. In other embodiments, virtual machine images are stored in network attached storage. In one of these embodiments, a file server in communication with the storage area network makes the virtual machine images accessible as if they were located on network attached storage.

Referring back to FIG. 8, an identified virtual machine is configured (step 814). In brief overview, an execution machine identified by the intermediate machine executes a hypervisor emulating hardware resources required by the requested computing environment. A session management component launches a configured virtual machine in the hypervisor. Configuration occurs of the virtual machine for a particular client machine 10. A connection is established between the client machine and the virtual machine.

Figure 13:
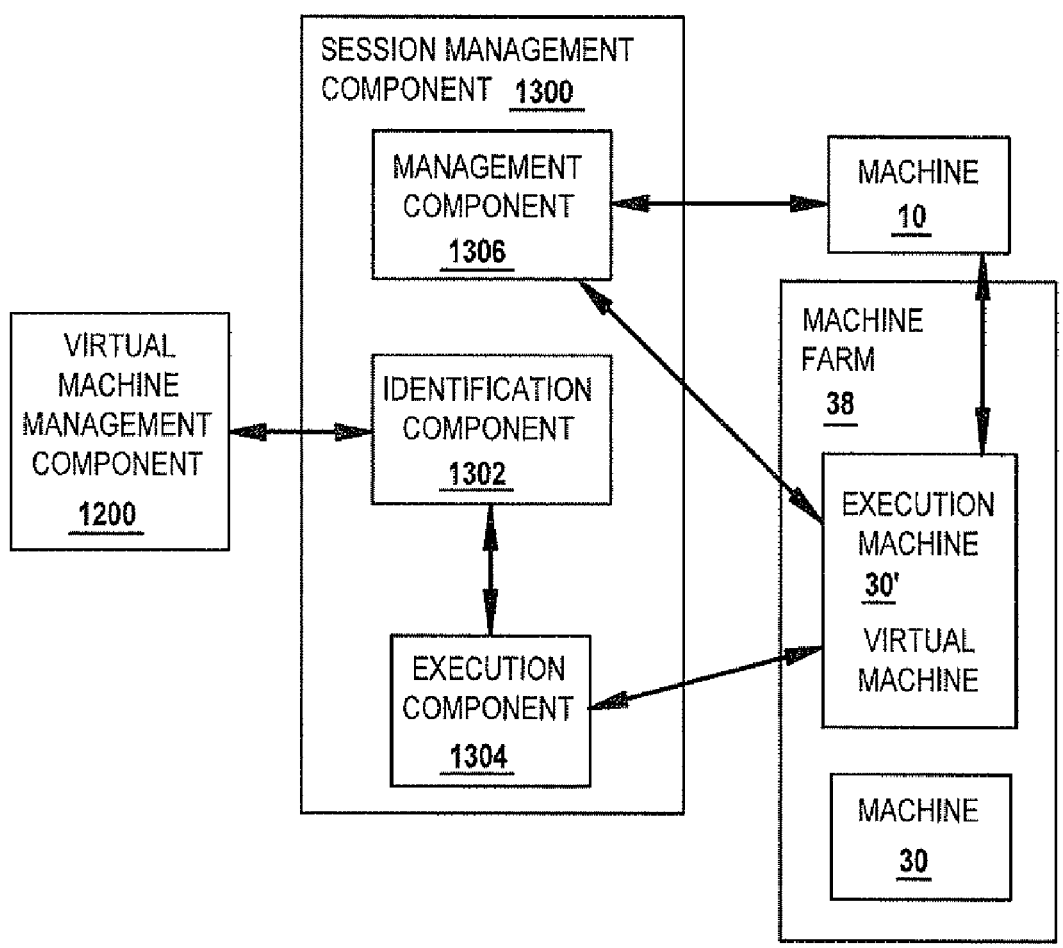
FIG. 13 is a block diagram depicting one embodiment of a session management component.

Referring now to FIG. 13, a block diagram depicts one embodiment of a session management component 1300 in a system providing access to a computing environment by an intermediate machine to a requesting machine. In brief overview, the session management component 1300 includes an identification component 1302, an execution component 1304, and a management component 1306.

The identification component 1302 is in communication with a virtual machine management component and receives an identification of a virtual machine providing a requested computing environment. In some embodiments, the identification component 1302 is in communication with the virtual machine management component 1200. In one embodiment, the identification component 1302 receives an identification of an execution machine 30' into which to launch the virtual machine. In some embodiments, the identification component 1302 identifies an execution machine on which a required hypervisor executes and into which to launch the virtual machine. In other embodiments, the identification component 1302 receives an identification of the execution machine. In one of these embodiments, the identification component 1302 receives the identification from the intermediate machine 30.

In some embodiments, the identification component 1302 further comprises a transceiver. In one of these embodiments, the transceiver in the identification component 1302 receives an identification of a user of the requesting machine and transmits the identification of the user to the virtual machine management component. In another of these embodiments, the transceiver receives an identification by a user of a type of computing environment requested and transmits the identification to the virtual machine management component 1200. In still another of these embodiments, the transceiver receives an identification by a user of a type of virtual machine requested and transmits the identification of the type of virtual machine requested to the virtual machine management component 1200.

In some embodiments, the identification component 1302 receives an identification of a virtual machine providing a requested computing environment, the virtual machine selected responsive to a received identification of a user of the requesting machine. In other embodiments, the identification component 1302 receives an identification of a virtual machine providing a requested computing environment, the virtual machine selected responsive to a received identification of a type of computing environment requested. In other embodiments, the identification component 1302 receives an identification of a virtual machine providing a requested computing environment, the virtual machine selected responsive to a received identification of a type of virtual machine requested.

The execution component 1304 launches the virtual machine into a hypervisor. In one embodiment, the hypervisor executes on an execution machine 30'. In another embodiment, the execution component 1304 is in communication with the identification component. In still another embodiment, the execution component 1304 receives from the identification component 1302 an identification of an execution machine 30' executing a hypervisor into which to launches the virtual machine. In yet another embodiment, the execution component 1304 launches the virtual machine into a hypervisor emulating hardware resources required to support the computing environment. In some embodiments, a virtual machine service component executes in the hypervisor. In other embodiments, a virtual machine service component executes in a guest operating system provided by a virtual machine executing in the hypervisor. In one of these embodiments, the virtual machine service component is in communication with the session management component 1300 and receives configuration information associated with the client machine 10.

The management component 1306 establishes a connection between the requesting machine and the virtual machine and manages the connection. In one embodiment, the management component 1306 provides an internet protocol address associated with the virtual machine to the user of the requesting machine. In another embodiment, the management component 1306 provides an internet protocol address associated with an execution machine to the user of the requesting machine. In still another embodiment, the management component 1306 provides a proxy for communication between the requesting machine and the virtual machine. In yet another embodiment, the management component 1306 establishes a connection between the requesting machine and the virtual machine using a presentation layer protocol.

Although described above as separate functional entities, it should be understood that the identification component 1302, the execution components 1304 and the management component 1306 may be provided as a single functional unit or the functions provided by those components may be grouped into two or more components.

In some embodiments, the session management component 1300 establishes and manages a user's virtual machine session. In one of these embodiments, the session management component 1300 provides functionality for, without limitation, locating a virtual machine, launching a hypervisor, launching a virtual machine in the hypervisor, connecting a user to the virtual machine, and managing the established connection. In another of these embodiments, the session management component 1300 publishes a plurality of available virtual machines. In still another of these embodiments, the session management component 1300 provides, without limitation, enumeration into client drives, mapping of client drives to shared folders on the virtual machine, monitoring of the hypervisor, monitoring of an operating system provided by the virtual machine, and a virtual machine control panel to the user.

In one embodiment, the session management component 1300 provides a virtual machine control panel to the user. The virtual machine control panel may enable a user to switch to the virtual machine, power off the virtual machine, reset the virtual machine, or suspend the virtual machine. In some embodiments, the session management component 1300 provides the virtual machine control panel only to users authorized to access the functionality of the virtual machine control panel.

In some embodiments, a virtual machine service component executes in the hypervisor. In one of these embodiments, the virtual machine service component is in communication with the session management component 1300 and receives configuration information associated with the client machine 10. In another of these embodiments, the session management component 1300 creates a connection to the virtual machine service component, such as a TCP/IP connection, and communicates with the virtual machine service component over the created connection. In still another of these embodiments, the session management component 1300 transmits information associated with the client machine 10, such as initialization parameters or client monitor geometry, to the virtual machine service component.

In some embodiments, the session management component 1300 identifies a folder containing an image of the identified virtual machine. In one of these embodiments, the folder contains configuration and data files comprising the virtual machine. In another of these embodiments, the session management component 1300 mounts the folder in the execution machine prior to launching the virtual machine. In still another of these embodiments, the session management component 1300 copies definition data files associated with the virtual machine onto the execution machine. The session management component 1300 may copy the definition data files back into the identified folder when a session is completed. In yet another of these embodiments, the configuration and data files are streamed to the execution machine, as described below.

In other embodiments, the session management component 1300 enumerates in the virtual machine a plurality of drives associated with the client machine 10. In one of these embodiments, the session management component 1300 creates a folder associated with each drive in the plurality of drives. In another of these embodiments, the session management component 1300 stores a folder associated with a drive in the plurality of drives in the mounted folder containing the identified virtual machine. In still another of these embodiments, an enumeration of the stored folder associated with the drive is provided to a user of the client machine 10. In some embodiments, a protocol stack located in the hypervisor or in the guest operating system enables drive mapping through other techniques, including techniques enabled by presentation layer protocols.

Figure 14:
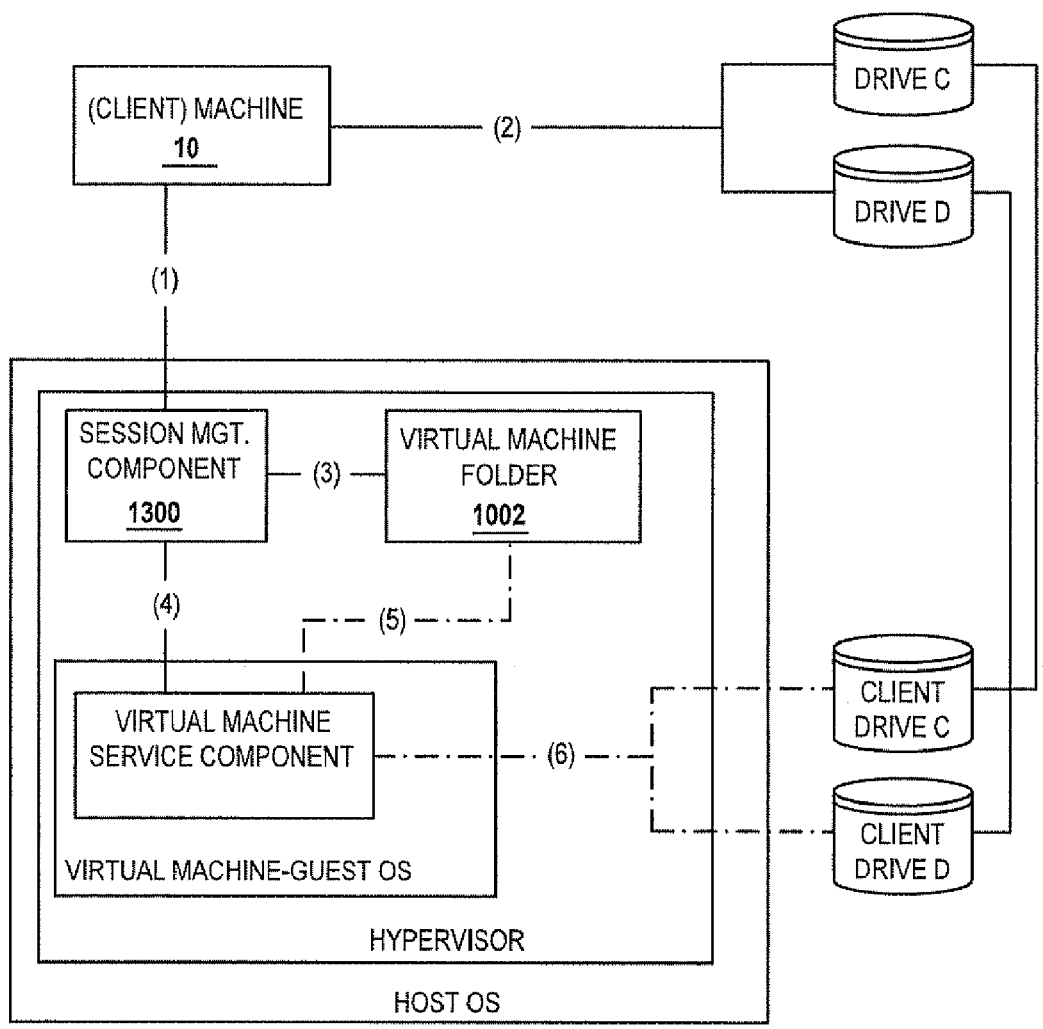
FIG. 14 is a block diagram depicting one embodiment of a system in which a drive associated with the client machine 10 is made available to a computing environment.

Referring now to FIG. 14, a block diagram depicts one embodiment of a system in which a drive associated with the client machine 10 is made available to a computing environment. In brief overview, the client machine 10 has a connection (1) to an execution machine and a connection (2) to a plurality of drives available to a user of the client machine 10.

The session management component 1300 creates a folder associated with each drive in the plurality of drives (3). In one embodiment, the session management component 1300 stores the created folder associated with a drive in the plurality of drives in a virtual machine folder 1002, the mounted folder containing configuration and data files associated with the identified virtual machine. In another embodiment, the session management component 1300 generates a list of shared folders stored in the virtual machine folder 1002.

The session management component 1300 notifies the virtual machine service component of the change to the virtual machine folder 1002 (4). In some embodiments, the session management component 1300 responds to changes in the client device by rebuilding a shared folder list in the virtual machine folder 1002. In one of these embodiments, the session management component 1300 receives an identification of a modification to the drive associated with the client machine 10. In another of these embodiments, the session management component 1300 transmits a notification to the virtual machine service component identifying the change to the virtual machine 1002.

For each folder associated with a drive in the virtual machine folder 1002, the virtual machine service component provides an indication of a mapped client drive to the virtual machine (5). In one embodiment, the virtual machine service component associates the mapped client drive with a drive letter on the virtual machine. In another embodiment, the virtual machine service component monitors for changes to the shared folder list in the virtual machine folder 1002. In some embodiments, an enumeration of the stored folder associated with the drive is provided to a user of the client machine 10.

In some embodiments, the session management component 1300 enumerates in the virtual machine a plurality of printers associated with the client machine 10. In one of these embodiments, the session management component 1300 accesses a printer service to acquire an authorization level required to enumerate a printer in the plurality of printers.

In one embodiment, a printer associated with the client machine 10 is shared as a network printer and made accessible to the virtual machine as a network resource. In another embodiment, the virtual machine generates printer output using the TCP/IP and LPR protocols, and this output is intercepted and transmitted to the printer associated with the client machine 10. In still another embodiment, the virtual machine transmits printer output to a virtualized hardware resource provided by the hypervisor, such as a COM port on the virtual machine. The output is captured and transmitted to the printer associated with the client machine 10. In yet another embodiment, a hypervisor may provide access to a virtual printer or printer port.

Referring back to FIG. 8, as part of the configuration process, an execution machine identified by the intermediate machine executes a hypervisor emulating hardware resources required by the requested computing environment. In one embodiment, the hypervisor executes on the intermediate machine. In another embodiment, the hypervisor executes in a terminal services session executing on the intermediate machine. In still another embodiment, the hypervisor executes on the execution machine. In yet another embodiment, the hypervisor executes in a terminal services session executing on the execution machine. In some embodiments, the hypervisor may be executed on the client machine 10.

In one embodiment, the hypervisor provisions a plurality of hardware resources on the execution machine for use by the requested computing environment. In another embodiment, the hypervisor partitions a plurality of hardware resources on the execution machine and makes the partition available for use by the requested computing environment. In still another embodiment, the hypervisor emulates a plurality of hardware resources on the execution machine for use by the requested computing environment. In yet another embodiment, the hypervisor may partition hardware resources, emulate hardware resources, or provision hardware resources, or all three. For example, a hypervisor may emulate a device (such as a graphics card, network card, and disk), partition the (execution time) of the CPU, and virtualize registers, storage, and underlying devices which they use to fulfill operations on their emulated hardware (such as RAM, and network interface cards).

In some embodiments, the session management component 1300 executes the hypervisor. In one of these embodiments, the session management component 1300 executes the hypervisor in full-screen mode. In other embodiments, the session management component 1300 monitors execution of the hypervisor. In one of these embodiments, the session management component 1300 transmits a notification to the virtual machine management component 1200 that the virtual machine has terminated when the session management component 1300 receives an indication that a virtual machine executing in the hypervisor has terminated. In another of these embodiments, the session management component 1300 receives a notification when the user logs out of a session.

In some embodiments, the hypervisor provides a hardware abstraction layer between hardware on the execution machine and a computing environment provided by a virtual machine. In one of these embodiments, there is no operating system between the execution machine hardware and the hypervisor. The hypervisor may be said to be executing "on bare metal." In another of these embodiments, there is an operating system executing on the execution machine, referred to as a host operating system, and the hypervisor executes from within the operating system. Computing environments provided by a virtual machine may be referred to as guest operating systems.

In one embodiment, the hypervisor executes in a terminal server session on a host operating system on the execution machine. The hypervisor may emulate hardware resources required by a computing environment provided by a virtual machine. The hypervisor may partition hardware and provide access to the partition. The hypervisor may also virtualize existing hardware, making it appear to at least one domain on the hardware as if that domain were the only domain accessing the hardware. In another embodiment, output from the computing environment, or an application or resource executing within the computing environment, is passed from the computing environment to a virtualized hardware resource provided by the hypervisor. In still another embodiment, the hypervisor transmits the output to a component such as the session management component 1300. The session management component 1300 may transmit the received output to a client machine 10 from which a user accesses the computing environment. In yet another embodiment, the hypervisor redirects the output from the virtualized hardware resource to an actual hardware resource, such as a network interface card.

In some embodiments, the hypervisor provides a hardware abstraction layer and creates an environment into which a virtual machine may be launched, the virtual machine comprised of configuration and data files creating a computing environment, which may comprise a guest operating system and application programs or other resource. In other embodiments, the hypervisor provides functionality for transmitting data directed to a virtualized hardware resource and redirecting the data to a requesting machine via the session management component 1300. In one of these embodiments, the communication between the session management component 1300 and the hypervisor enable transmission of updates, such as audio updates, updates associated with a graphical user interface, or updates associated with serial COM port input/output, from the virtual machine to the requesting machine. In another of these embodiments, the communication enables transmission of keyboard or mouse or audio updates from the requesting machine to the virtual machine. In still another of these embodiments, where the hypervisor executes within a terminal server session, the hypervisor may map terminal server drives to the computing environment.

Referring still to FIG. 8, a virtual machine is configured for access by a particular client machine 10. In some embodiments, the management component 1300 receives an identification of a virtual machine already executing in the hypervisor. In other embodiments, the session management component 1300 launches the virtual machine in the hypervisor. In one embodiment, the session management component 1300 receives an identification of a folder containing configuration and data files comprising the virtual machine. In another embodiment, the session management component 1300 mounts the identified folder in the execution machine.

In some embodiments, a virtual machine service component executes in a guest operating system executing within the virtual machine. In one of these embodiments, the virtual machine service component is a system service running in a network service account. In another of these embodiments, the virtual machine service component is configured to initiate execution automatically upon the execution of the computing environment. In still another of these embodiments, the virtual machine service component communicates with the session management component 1300. In other embodiments, the virtual machine service component executes in the hypervisor.

In some embodiments, a virtual machine service component executes within the virtual machine. In one of these embodiments, after launching the virtual machine in the hypervisor, the session management component 1300 establishes a connection, such as a TCP/IP connection, with the virtual machine service component. In another of these embodiments, the virtual machine service component establishes the connection. The connection may be a single multiplexed connection between the components or multiple independent connections.

In still another of these embodiments, the session management component 1300 uses the connection to transmit configuration information to the virtual machine service component. The configuration information may be associated with a presentation layer protocol session executing on the client machine 10 in which output from the virtual machine is presented. The configuration information may also include information associated with display settings and changes, client drive information and authentication data.

In other embodiments, the virtual machine service component receives information associated with a printer to which the requesting machine has access. In one of these embodiments, the virtual machine service component access a network printer service to create in the virtual machine a printer connected to the printer to which the requesting machine has access.

In still other embodiments, the virtual machine service component transmits session status messages to the session management component 1300. In one of these embodiments, the virtual machine service component transmits heartbeat messages to the session management component 1300. In another of these embodiments, the virtual machine service component transmits keep-alive messages to the session management component 1300, to prevent the session management component 1300 from shutting down the virtual machine. In still another of these embodiments, the virtual machine service component transmits a message to the session management component 1300 providing an indication that the user of the client machine 10 has logged off, shut down, or suspended a session with the computing environment. The virtual machine service component may receive the indication of the user's activity from an authentication module.

Referring still to FIG. 8, as described above, a request for access to a resource is received (step 802), a method for providing access to the resource is identified (step 804), and a virtualized environment may be selected to provide access to a resource (step 808). In some embodiments, a client machine 10 receives the request, identifies a method for providing access, and selects a virtualized environment to provide access to a resource. In one of these embodiments, a mobile computing device connects to a client machine 10 referred to as a computing device, which identifies a method for providing access to a computing environment, selects a portable computing environment residing in storage on the mobile computing device and provides access to the portable computing environment.

Figure 89A:
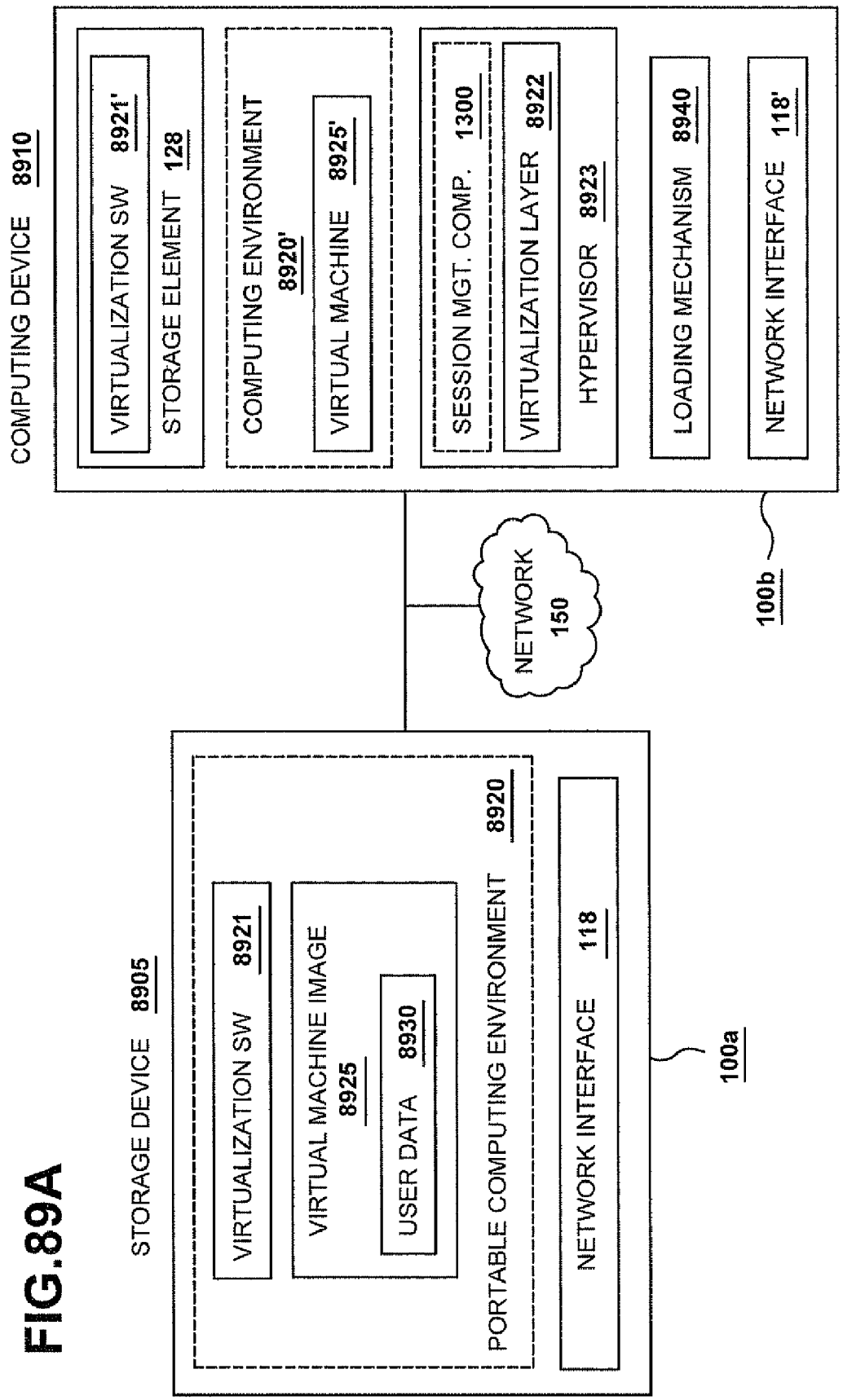
FIG. 89A is a block diagram depicting one embodiment of a storage device and a computing device.
Figure 89B:
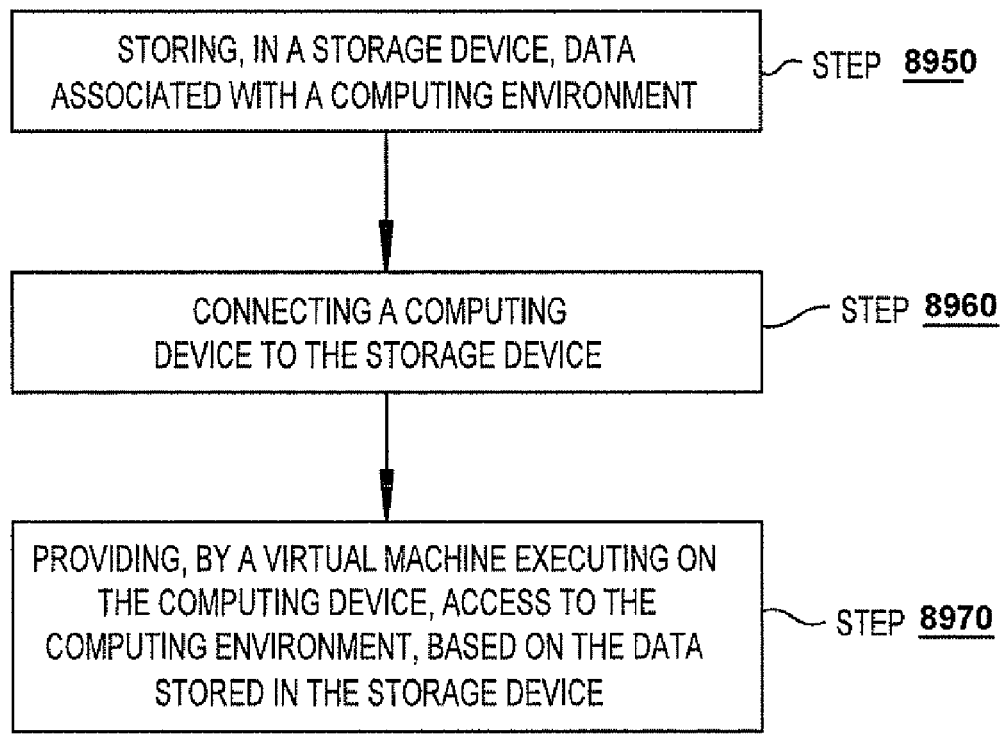
FIG. 89B is a flow diagram depicting one embodiment of the steps taken in a method for providing access to a computing environment on a computing device via a storage device.

Referring ahead to FIGS. 89A and 89B, a storage device and a computing device are depicted. In brief overview, the storage device stores data associated with a computing environment, such as a portable computing environment, which in some embodiments includes virtualization software, a virtual machine image, and user data. A computing device connecting to the storage device, executing a virtual machine, and providing access to the computing environment responsive to data stored in the storage device.

Still referring to FIG. 89A, and in further detail, the storage device 8905 stores the portable computing environment 8920 of one or more users. In one embodiment, the storage device 8905 may be any type and form of hard drive, including a micro hard drive. In another embodiment, the storage device 8905 may be any type and form of portable storage device, such as a flash drive or USB drive, or any type and form of portable storage medium, such as a CD or DVD. In still another embodiment, the storage device 8905 comprises a flash card, a memory stick, multi-media card or a secure digital card. In some embodiments, the storage device 8905 may store applications including word processing or office applications, ICA clients, RDP clients, software to establish any type and form of virtual private network (VPN) or SSL VPN connection, software to accelerate network communications or application delivery or any other type and form of application.

In one embodiment, the storage device 8905 may store a virtual machine image. In another embodiment, the storage device 8905 may comprise a transmitter for transmitting stored data to a computing device 8910. In still another embodiment, the storage device 8905 may comprise a transceiver for accessing stored data, transmitting stored data and receiving data for storage. In yet another embodiment, the storage device 8905 may comprise stored data comprising an application program for executing a virtual machine on a computing device.

In some embodiments, the storage device 8905 is embedded in a mobile computing device. In other embodiments, the storage device 8905 is connected to a mobile computing device. In still other embodiments, the storage device 8905 comprises a portable storage device removable from a computing device.

The storage device 8905 stores data associated with a computing environment. The data may comprise a portable computing environment 8920. In one embodiment, the portable computing environment 8920 is considered portable in that the portable computing environment 8920 may be easily or conveniently carried and transported from one computing device 8910 to another computing device 8910'. In another embodiment, the portable computing environment 8920 is considered portable in that the computing environment may be established or executed on any suitable computing device 8910 with little or no changes to the computing device 8910, or in a further embodiment, with little or no maintenance or administration. In still another embodiment, the portable computing environment 8920 includes a plurality of files representing a desktop environment, or a portion thereof, of a computer system 100, which a user desires to execute on the computing device 8910. In yet another embodiment, the portable computing environment 8920 may represent an environment under which a user operates a home or office desktop computer. In some embodiments, the portable computing environment 8920 represents one or more applications to which a user has access.

The portable computing environment 8920 may include a virtual machine image 8925. In one embodiment, the virtual machine image 8925 comprises a computing environment image, including any of the information, data, files, software, applications and/or operating system needed to execute a computing environment 8920, including files needed to execute the computing environment 8920 via the virtualization software 8921. In another embodiment, the virtual machine image 8925 comprises configuration and data files required to execute a virtual machine providing access to a computing environment requested by a user. In still another embodiment, the virtual machine image 8925 comprises a virtual machine image as described above.

The portable computing environment 8920 may also include user data 8930, including, without limitation, any data, information, files, software or applications of a user. In one embodiment, the user data 8930 is stored in, or as a part of, the virtual machine image 8925. In another embodiment, the user data 8930 may be created, edited or provided by any software, program, or application of the storage device 8905 or of the computing device 8910.

The portable computing environment 8920 may include virtualization software 8921. In some embodiments, the virtualization software 8921 may comprise any suitable means or mechanisms for a user to access, read and/or write any user data 8930 included in or provided by the virtualization software 8921 and/or virtual machine image 8925. In one of these embodiments, the virtualization software 8921 may track, manage and synchronize the access, reading and/or writing of user data 8930 during an established computing environment 8920' with the user data 8930 provided on the storage device 8905. In another of these embodiments, the user data 8930 may only be accessed via the virtualization software 8921 or the established computing environment 8920'. In still another of these embodiments, any software, programs or applications of the storage device 8905 may access the user data 8930 when the storage device 8905 is not connected to the computing device 120 or when a computing environment 8920' is not executing. In yet another of these embodiments, the user data 8930 may comprise data and files created during a session of an established computing environment 8920'.

The computing device 8910 may be any type and form of computer system as described in connection with FIG. 1A and FIG. 1B above. In one embodiment, the computing device 8910 is a client machine 10 as described above. In another embodiment, a connection between a computing device 8910 and a storage device 8905 provides a user of a client machine 10 with access to a requested resource. In still another embodiment, the computing device 8910 receives a request for access to a resource when a connection is made between the computing device 8910 and the storage device 8905. In yet another embodiment, a method for providing access to the resource is identified responsive to information received from the storage device 8905.

In one embodiment, the computing device 8910 has a storage element 128. In another embodiment, the computing device 8910 has a network interface 118' connected to network 150. In still another embodiment, the computing device 8910 has a transceiver for accessing data stored in a storage device 8905 or in a computing device 8910'.

In some embodiments, the computing device 8910 comprises an operational or performance characteristic not provided by the storage device 8905. In one of these embodiments, the computing device 8910 comprises elements, such as a processor or a memory, which the storage device 8905 does not include. In another of these embodiments, the computing device 8910 provides an I/O device, display device, installation medium, or other peripherals, such as a keyboard or printer not available to the storage device 8905. In still another of these embodiments, the computing device 8910 may provide a feature, a resource, or peripheral desired to be used by the user of the storage device 8905. For example, the user may want to access a file or an application provided on a remote machine 30' available via a connection across the network 150. In yet another of these embodiments, the computing device 8910 provides access to a network, such as machine farm 38, not available to the storage device 8905, or to a user of the storage device 8905.

In one embodiment, the computing device 8910 establishes a computing environment 8920' based on the portable computing environment 8920 provided by the storage device 8905. The computing device 8910 establishes a virtual machine 8925' and a virtualization layer 8922 to execute the computing environment 8920' based on the virtualization software 8921 or 8921', virtual machine image 8925 and/or user data 230.

In some embodiments, virtualization allows multiple virtual machines 8925', with heterogeneous operating systems to run in isolation, side-by-side on the same physical machine 8910. In one embodiment, the virtualization software 8921 may include a virtual machine image. Virtual machines may include cross-platform X86 PC emulators, such as the products distributed by The Bochs Project at bochs.sourceforge.net, or VMware products manufactured and distributed by VMware, Inc. of Palo Alto, Calif., or products manufactured and distributed by Softricity, Inc., or the Virtuozzo products manufactured and distributed by SWSoft, Inc. of Herndon, Va., or the Microsoft® Virtual PC products manufactured and distributed by Microsoft Corporation of Redmond, Wash. In another embodiment, the virtualization software 8921 includes any the AppStream products manufactured and distributed by AppStream Inc, of Palo Alto, Calif., or the AppExpress products manufactured and distributed by Stream Theory, Inc of Irvine, Calif.

The computing device 8910 may use any other computing resources of computer system 100b required by the computing environment 8920'. In some embodiments, the hypervisor 8923 provides a virtualized hardware resource required by the computing environment 8920'. In other embodiments, a hypervisor 8923 provides, via a virtualization layer 8922, access to a hardware resource required for execution of a computing environment. In one of these embodiments, the hypervisor 8923 provisions the hardware resource. In another of these embodiments, the hypervisor 8923 virtualizes the hardware resource. In still another of these embodiments, the hypervisor 8923 partitions existing hardware resources and provides access to a partitioned hardware resource.

In some embodiments, a virtual machine 8925' executing on a virtualization layer provides access to a computing environment 8920'. In other embodiments, a session management component 1300 executes the virtual machine 8925. In still other embodiments, virtualization software 8921 or 8921' execute the virtual machine 8925. In one of these embodiments, the portable computing environment 8920 includes any type and form of software for virtualizing on a computing device a user-accessible resource, such as an operating system, desktop, application, and any hardware computing resources. In yet other embodiments, virtual machine image 8925 is accessed to execute a virtual machine 8925'. In one of these embodiments, the virtualization software 8921 or 8921' accesses the virtual machine image.

In some embodiments, the virtualization software 8921 may include software for virtualizing a server, such as the Microsoft Virtual Server products manufactured and distributed by Microsoft Corporation of Redmond, Wash., or the Linux Vserver products distributed by the Linux Vserver Project located at linux-vserver.org. In other embodiments, the virtualization software 8921 may also include an interpreter or just-in-time compiler, such as the JAVA Virtual Machine (JVM) originally manufactured by Sun Microsystems of Santa Clara, Calif., or the Common Language Runtime (CLR) interpreter manufactured by the Microsoft Corporation.

In some embodiments, the computing device 8910 has the virtualization software 8921' stored or installed in storage element 128 prior to a connection with the storage device 8905. In one embodiment, the virtualization software 8921' does not need to be installed on the computing device 8910, and can, instead, be executed from the storage device 8905. In another embodiment, the computing device 8910 installs and executes the virtualization software 8921 on a per connection basis. In this embodiment, the computing device 8910 may remove the virtualization software 8921 from storage element 128 upon termination of the established computing environment 8920'. In still another embodiment, the computing device 8910 installs and executes the virtualization software 8921 on a first connection. In yet embodiment, upon other connections, if the computing device 8910 detects changes to the virtualization software 8921, such as a newer version, the computing device 8910 updates the virtualization software 8921, or installs a newer version of the virtualization software 8921. In other embodiments, the computing device 8910 obtains the virtualization software 8921 from a storage element 128" or a remote machine 30 accessible via network 150.

In one embodiment, the virtualization software 8921 is used to establish a virtualization layer 8922 on the computing device 8910. In another embodiment, the virtualization layer 8922 provides an abstraction layer that decouples or isolates an application or a hardware resource from the operating system. In still another embodiment, the virtualization layer 8922 comprises an application to host or run another operating system or application, such as virtual machine 8925.

In some embodiments, the hypervisor 8923 comprises the virtualization software 8921. In other embodiments, the session management component 1300 comprises the virtualization software 8921. In still other embodiments, the host computing device 8910 stores virtualization software 8921' in storage element 128. In yet other embodiments, the computing device 8910 accesses a remotely located copy of virtualization software 8921'.

In some embodiments, the virtualization layer 8922 and/or virtual machine 8925 provide an execution environment on the computing device 8910. In one of these embodiments, each execution environment is a unique instance of the same execution environment, while, in another of these embodiments, each execution environment may be an instance of different execution environments. Each execution environment may be isolated from and/or not accessible by another execution environment. In other embodiments, the virtualization layer 8922 and/or virtual machine 8925 provides an execution context, space or "sandbox" to isolate processes and tasks running on the same operating system.

In one embodiment, the virtualization layer 8922 communicates with a session management component 1300. In some embodiments, the session management component 1300 is software executing in a layer between a hypervisor 8923 or operating system of the computing device 8910 and one or more virtual machines 8925 that provide a virtual machine abstraction to guest operating systems. In other embodiments, as described above, the session management component 1300 may reside outside of the computing device 8910 and be in communication with a hypervisor 8923 or operating system of the computing device 8910. In still other embodiment, the session management component 1300 can load, run or operate the virtual machine image 8925 from the storage device 8905 to execute a virtual machine 8925'. In yet other embodiments, the session management component 1300 and hypervisor 8923 are incorporated into the same application, software or other executable instructions to provide the virtualization layer 8922. In further embodiments, the session management component 1300 is in communication with a virtual machine service component executing within the computing environment 8920.

In some embodiments and still referring to FIG. 89A, the computing device 8910 includes a loading mechanism 8940, which may comprise software, hardware, or any combination of software and hardware. In one embodiment, the loading mechanism 8940 comprises an autorun configuration file. In another embodiment, the storage device 8905 may include the loading mechanism 8940. In still another embodiment, the storage device 8905 includes the loading mechanism 8940 in an autorun file. In some embodiments, a loading mechanism 8940 on the storage device 8905 establishes the computing environment 8920' on the computing device 8910 based on the portable computing environment 8920 stored in the storage device 8905. In other embodiments, the loading mechanism 8940' of the computing device 8910 establishes of the computing environment 8920'. In still other embodiments, the loading mechanism 8940 of the storage device 8905 works in conjunction with the loading mechanism 8940' of the computing device 8910 to establish the computing environment 8920'.

In one embodiment, the loading mechanism 8940 comprises a driver, such as a device driver or a kernel or user-mode driver for connecting to and/or accessing the storage device 8905, or the storage element 128 thereof. In another embodiment, the loading mechanism 8940 comprises any type and form of executable instructions, such as a program, library, application, service, process, thread or task for accessing the storage element 128 or storage device 8905. In still another embodiment, the loading mechanism 8940 accesses any type and form of data and information on the storage 128 to establish the user environment 8920' in accordance with the operations discussed herein. For example, in some embodiments, the loading mechanism 8940 reads an autorun configuration file in storage element 128 or on storage device 8905. In some embodiments, the loading mechanism 8940 comprises a plug-n-play (PnP) mechanism by which the operating system of the host computing device 8910 recognizes the storage device 8905 upon connection, and loads the drivers to connect to the storage device 8905.

In one embodiment, the loading mechanism 8940 upon detection of a connection between the storage device 8905 and computing device 8910 initiates the loading, establishing and/or executing of the virtualization software 8921 and/or the user environment 8920' on the computing device 8910. In another embodiment, the loading mechanism 8940 may comprise any rules, logic, operations and/or functions regarding the authentication and/or authorization of establishing a computing environment 8920' on the computing device 8910 based on the portable computing environment 8920. In still another embodiment, the loading mechanism 8940 may determine the existence of the virtualization software 8921' on the computing device 8910 and/or the difference in versions between the virtualization software 8921 and virtualization software 8921'. In yet another embodiment, the loading mechanism 8940 may store, load, and/or execute the virtualization software 8921 or 8921' on the computing device 8910. In a further embodiment, the loading mechanism 8940 may store, load, and/or execute the virtual machine image 8925 on the computing device 8910 as a virtual machine 8925 providing access to the computing environment 8920'. In still another embodiment, the loading mechanism 8940 may comprise or provide any type and form of user interface, such as graphical user interface or command line interface.

In some embodiments, the virtualization software 8921, portable computing environment 8920 and/or loading mechanism 8940 are designed and constructed in accordance with the U3 application design specification, or USB smart drive, provided by U3 LLC of Redwood City, Calif. For example, the loading mechanism 8940 may comprise a U3 launchpad program, and the virtualization software 8921 and/or portable user environment 120 may comprise a U3-based application.

Referring now to FIG. 89B, a flow diagram depicts one embodiment of the steps taken in a method for providing access to a computing environment on a computing device via a storage device. In brief overview, a method for providing access to a computing environment includes the step of storing, in a storage device, data associated with a computing environment (step 8950). A computing device connects to the storage device (step 8960). A virtual machine executing on the computing device provides access to the computing environment, based on the data stored in the storage device (step 8970).

In further detail, a storage device 8905 stores data associated with a portable computing environment 8920 (step 8950). In one embodiment, the storage device 8905 stores user data associated with the computing environment. In another embodiment, the storage device 8905 stores a virtual machine image 8925. In still another embodiment, the storage device 8905 stores data associated with a computing environment, the computing environment comprising at least one application program. In yet another embodiment, the storage device 8905 stores data associated with a computing environment, the computing environment comprising an operating system.

In one embodiment, the storage device 8905 stores data comprising an operating system. In another embodiment, the storage device 8905 stores data comprising an application program. In still another embodiment, the storage device 8905 stores an application program for executing a virtual machine on a computing device. In yet another embodiment, the storage device 8905 stores virtualization software for executing a virtual machine on a computing device.

In some embodiments, the storage device 8905 may include a connector for establishing a connection between the storage device 8905 and a computing device. In other embodiments, the storage device 8905 resides in a computing device, such as a mobile computing device. In one of these embodiments, the storage device 8905 is embedded in a mobile computing device. In still other embodiments, the storage device 8905 comprises a portable storage device removable from a computing device.

A computing device connects to the storage device (step 8960). The storage device 8905 may connect to the computing device 8910 by any suitable means and/or mechanism. In one embodiment, the storage device 8905 connects to a computing device 8910 via a mobile computing device. In another embodiment, the storage device 8905 is embedded in a mobile computing device connectable to the computing device 8910.

Upon connection, a request may be received by the computing device 8910 for access to a resource. In one embodiment, the request is for a desktop environment. In another embodiment, the request is for an application or for a plurality of applications. In still another embodiment, the request is for a virtual machine.

In some embodiments, a determination may be made to provide access to the requested resource via a virtualized environment. In one of these embodiments, the determination is made as described above in connection with FIG. 8. In another of these embodiments, the determination is made responsive to information received from the storage device 8905, such as a rule requiring the determination.

In one embodiment, the computing device 8910 accesses the storage device 8905 to access the portable computing environment 8920. In another embodiment, the computing device 8910 obtains the virtualization software 8921 from the storage device 8905 to establish a computing environment 8920'. In still another embodiment, the computing device 8910 does not obtain the virtualization software 8921 from the storage device 8905 as the computing device 8910 has access to the virtualization software 8921 in storage element 128' or via network 150. In yet another embodiment, the computing device 8910 obtains portions of the virtualization software 8921 from the storage device 8905. For example, the virtualization software 8921 on the storage device 8905 may be an updated version or have updated files to the virtualization software 8921' on the computing device 8910. In some embodiments, the storage device 8905 transmits information to the computing device 8910. In one of these embodiments, the storage device 8905 transmits the information with a request for access to a resource.

A virtual machine executing on the computing device provides access to the computing environment, based on the data stored in the storage device (step 8970). In one embodiment, the computing device 8910 retrieves data from the storage device 8905. In another embodiment, the computing device 8910 accesses the storage device 8905 to obtain a virtual machine image 8925 used to execute the virtual machine. In still another embodiment, the computing device 8910 accesses the storage device 8905 to obtain data or information identifying a location of the portable computing environment 8920 that may be accessible to the computing device 8910. For example, the storage device 8905 may comprise user data 8930 identifying a Uniform Resource Locator (URL) associated with a location on which a virtual machine image 8925 is stored, the URL accessible by the computing device 8910 via network 150. In yet another embodiment, the computing device 8910 accesses a storage element identified by the user data 8930, for example, a storage element or remote machine 30 on the network 150 storing the virtual machine image 8925.

In some embodiments, the computing device 8910 mounts the storage device 8905 as a storage, such as a disk, available to the computing device 8910. In one of these embodiments, the computing device 8910 mounts the storage device 8905 as removable media. In other embodiments, the loading mechanism 8940 accesses the storage device 8905.

The computing device 8910 establishes an environment for executing or providing access to the computing environment 8920'. In one embodiment, a virtual machine may be executed in the computing environment 8920' to provide access to a requested resource. In another embodiment, a virtual machine is the requested resource. In still another embodiment, a virtual machine 8925' executes a virtual machine 8925".

In one embodiment, the computing device 8910 executes a virtual machine responsive to a virtual machine image 8925 stored in the storage device 8905. In another embodiment, the computing device 8910 executes a virtual machine 8925' responsive to the data stored in the storage device 8905. In still another embodiment, the computing device 8910 executes the virtual machine responsive to a policy stored in the storage device.

In one embodiment, the computing device 8910 retrieves data stored in the storage device 8905. In another embodiment, the computing device 8910 uses an application program stored in the storage device 8905 to access the data. In still another embodiment, the computing device 8910 provides access to a computing environment by executing an operating system providing access to one or more applications identified by information stored in the storage device, the operating system and the one or more applications having access to user data stored in the storage device 8905.

In one embodiment, the computing device 8910 installs and/or loads the virtualization software 8921 to establish the virtualization layer 8922. In some embodiments, the virtualization software 8921 is designed and constructed as a portable application that can execute, load or establish the virtualization layer 8922 on the computing device 8910 without requiring installation of the virtualization software 8921. In other embodiments, the virtualization software 8921 is automatically installed on the computing device 8910 via an installation script. In one of these embodiments, the virtualization software 8921 is installed without requiring a reboot. In another of these embodiments, the virtualization software 8921 is installed and the virtualization layer 8922 established transparently to a user. In still other embodiments, the virtualization layer 8922 is established using the virtualization software 8921' stored on the computing device 8910 or accessed via network 150.

In some embodiments, the computing device 8910 executes a hypervisor 8923 to establish the virtualization layer 8922. In other embodiments, a hypervisor 8923 on the computing device 8910 and in communication with a hypervisor 8923' on a remote machine 30' establishes the virtualization layer 8922. In still other embodiments, a hypervisor 8923 in communication with a session management component 1300 establishes the virtualization layer 8922. In one of these embodiments, upon establishment of the virtualization layer 8922, the session management component 1300 identifies, provisions, and/or executes a virtual machine in the virtualization layer 8922 as described above in connection with FIG. 8. In yet other embodiments, the loading mechanism 8940 establishes the virtualization layer 8922. In further embodiments, the computing device 8910 establishes a virtualization layer 8922 in which a virtual machine service component executes.

In one embodiment, the virtualization layer 8922 has been established prior to the storage device 8905 connecting to the computing device 8910. For example, the virtualization layer 8922 may have been established for another computing environment 8920' or during a previous connection of the same or a different storage device 8905. In some embodiments, the computing device 8910 and/or loading mechanism 8940 establishes the virtualization layer 8922 and actuates, starts, or executes a session management component 1300 and/or hypervisor 8923. In other embodiments, the computing device 8910 and/or loading mechanism 8940 executes session management component 1300 and/or hypervisor 8923 upon loading or executing a virtual machine 8925.

The computing device 8910 provides access to the computing environment 8920' based on the portable computing environment 8920 (step 8970). In one embodiment, the computing device 8910 and/or loading mechanism 8940 accesses the virtual machine image 8925 from storage device 8905 and executes the virtual machine image 8925 as a virtual machine 8925' in the established virtualized environment 8922. In another embodiment, the computing device 8910 and/or loading mechanism 8940 automatically loads, executes or otherwise establishes the computing environment 8920 with the virtualization layer 8922 upon detection of a connection over network 150. In still another embodiment, the computing device 8910 and/or loading mechanism 8940 automatically loads, executes or otherwise establishes the computing environment 8920 and the virtualization layer 8922 upon detection of existence or identification of the portable computing environment 8920 in storage element 128.

In some embodiments, a user may select the virtual machine image 8925 from the storage device 8905 for execution as a virtual machine 8925' via any type and form of user interface. In one of these embodiments, the virtualization software 8921, virtualization layer 8922, hypervisor 8923, or loading mechanism 8940 may display a user interface for a user to identify a virtual machine image 8925, and/or to execute a virtual machine 8925' based on a virtual machine image 8925. In another of these embodiments, a client, such as an ICA client, an RDP client, or an X11 client, executes on the computing device 8910 and provides the user interface to the user.

In some embodiments, a user may access, read, and/or write user data 8930 during the course of using the established computing environment 8920'. In one of these embodiments, a user of the computing device 8910 may access, read and/or write the user data 8930 to the storage device 8905. In another of these embodiments, a user of the computing device 8910 may edit or modify user data 8930 or may create new data and information in user data 8930.

In other embodiments, a user of the computing device 8910 may access, read, and/or write user data to the storage 128' of the computing device 8910. In still other embodiments, the computing device 8910 may synchronize user data 8930 on the computing device 8910 with user data 8930 on the storage device 8905. In one of these embodiments, the computing device 8910 uses the virtualization layer 8922 or the loading mechanism 8940 to synchronize the user data 8930. In yet other embodiments, the storage device 8905 may have a program or application for synchronizing data between the storage device 8905 and the computing device 8910.

In some embodiments, the storage device 8905 may disconnect from the computing device 8910 at any point in time during the established computing environment 8920'. In other embodiments, the storage device 8905 may disconnect after the computing environment 8920' is terminated on the computing device 8910. In still other embodiments, the computing environment 8920' is automatically terminated upon disconnection of the storage device 8905 to the computing device 8910. In yet other embodiments, the computing environment 8920' may remain established on the computing device 8910 after the storage device 8905 disconnects from the computing device 8910. In one of these embodiments, once the computing environment 8920' is established on the computing device 8910, the storage device 8905 may be disconnected.

In some embodiments, the storage device 8905 can access, read, and/or write user data 8930 to any portion of the portable computing environment 8920. In one of these embodiments, although the portable computing environment 8920 is not established or virtualized on computing device 8910, the storage device 8905 can still access, read, and/or write to and from the user data 8930. In other embodiments, a user may use a first application in the established computing environment 8920' to access a file of the user data 8930. In still other embodiments, the user may use a second application on the storage device 8905 to access the same file of the user data 8930. In yet other embodiments, the virtualization software 8921 or virtual image 8925 allows access to the user data 8930, even though virtualization software 8921 or virtual machine image 8925 is not executing or operating.

Although FIGS. 89A and 89B are generally discussed with one portable computing environment 8920 stored in the storage device 8905, the storage device 8905 may store a plurality of portable computing environments 8920 for establishing a corresponding plurality of computing environments 8920' on the computing device 8910. In some embodiments, the computing device 8910, loading mechanism 8940, or the virtualized layer 8920 provides a user interface for the user to select a portable computing environment from storage to establish the computing environment 8920. For example, the storage device 8905 or the computing device 8910 may have a portable computing environment selection mechanism as is further discussed in connection with FIG. 92A and with FIG. 93A. In other embodiments, the computing device 8910, loading mechanism 8940, or the virtualized layer 8922 uses one of the plurality of portable computing environments based on a characteristic of the computing device, such as operating system type, or based on user data identifying the portable computing environment to use for the computing device.

Figure 90A:
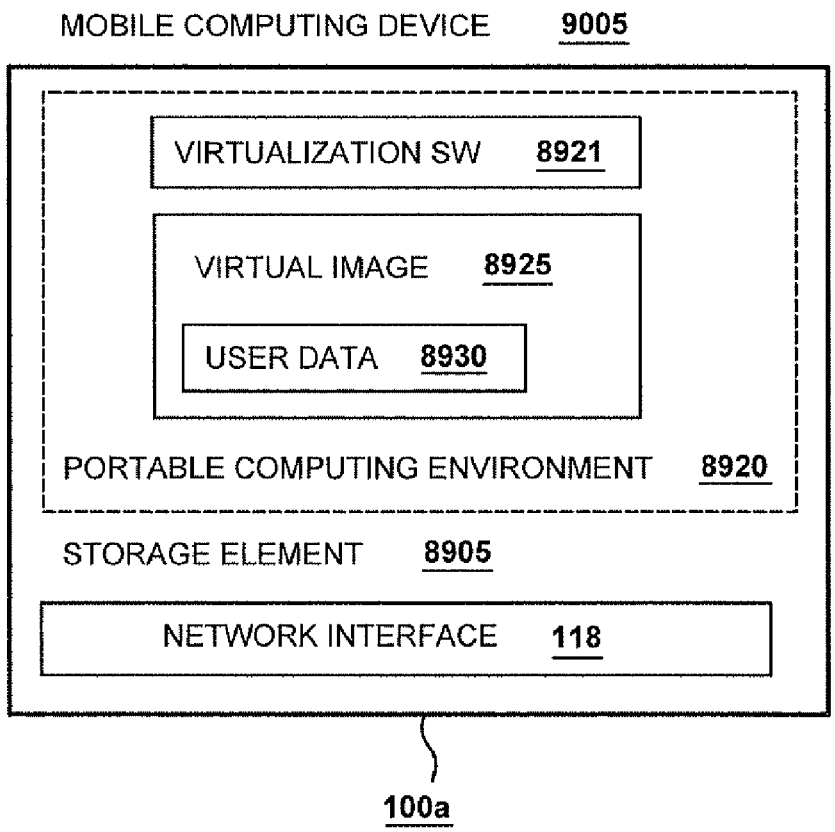
FIG. 90A is a block diagram depicting one embodiment of a mobile computing device.

Referring now to FIG. 90A, a mobile computing device 9005 is depicted. In brief overview, the mobile computing device 9005 may be any type and form of computer system as described in connection with FIG. 1A and FIG. 1B above. In one embodiment, the mobile computing device 9005 comprises a storage device, such as a storage device 8905 as described in connection with FIG. 89A and FIG. 89B. In another embodiment, the mobile computing device 9005 is connected to a storage device 8905. In still another embodiment, the mobile computing device 9005 comprises a portable storage device removable from a computing device. In yet another embodiment, the mobile computing device 9005 has a network interface 118 used to connect to remote machines 30 or client machines 10 on the network 150, such as the computing device 8910. The storage device 8905 may store a portable computing environment 8920, which in some embodiments includes virtualization software 8921, a virtual image 8925, and user data 8930.

In some embodiments, the mobile computing device 9005 stores data associated with a computing environment, executes a virtual machine, and provides access to the computing environment responsive to data stored in the mobile computing device 9005. In one of these embodiments, the mobile computing device 9005 comprises a stored virtual machine image. In another of these embodiments, the mobile computing device 9005 comprises an application program for executing a virtual machine on a computing device. In still another of these embodiments, the mobile computing device 9005 provides access to a computing environment by executing an operating system with access to one or more applications identified via data stored on the mobile computing device, the operating system and the one or more applications having access to the user data on the mobile computing device. In other embodiments, the mobile computing device 9005 stores the portable computing environment 8920 of one or more users in storage provided by a storage device, such as a storage device 8905 as described above in connection with FIGS. 89A and 89B.

In one embodiment, the mobile computing device 9005 decrypts stored data. In another embodiment, the mobile computing device 9005 prevents one of unauthenticated and unauthorized access by a user of the mobile computing device 9005 to a computing environment provided by the mobile computing device 9005.

Figure 90B:
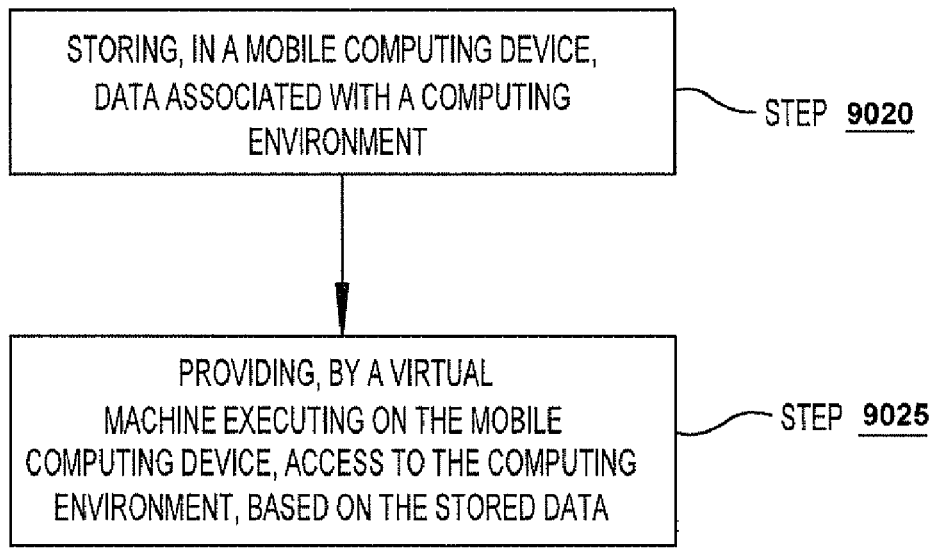
FIG. 90B is a flow diagram depicting one embodiment of the steps taken in a method for providing a portable computing environment by a mobile computing device.

Referring now to FIG. 90B, a flow diagram depicts one embodiment of the steps taken in a method for providing a computing environment by a mobile computing device. In brief overview, a method includes the step of storing, in a mobile computing device 9005, data associated with a computing environment (step 9020). A virtual machine executing on the mobile computing device provides access to the computing environment, based on the stored data (step 9025).

In further detail, the mobile computing device 9005 stores data associated with a computing environment (step 9020). In one embodiment, the mobile computing device 9005 receives the data associated with the computing device from a storage device connected to the mobile computing device 9005. In another embodiment, the mobile computing device stores the data associated with the computing environment in a storage device 8905 embedded in the mobile computing device. In still another embodiment, the mobile computing device 9005 stores user data associated with the computing environment. In yet another embodiment, the mobile computing device 9005 stores a virtual machine image.

In one embodiment, the mobile computing device 9005 stores data associated with a computing environment, the computing environment comprising at least one application program. In another embodiment, the mobile computing device 9005 stores data associated with a computing environment, the computing environment comprising an operating system. In still another embodiment, the mobile computing device 9005 stores data comprising an operating system. In yet another embodiment, the mobile computing device 9005 stores data comprising an application program. In some embodiments, the mobile computing device 9005 stores an application program for executing a virtual machine. In other embodiments, the mobile computing device 9005 stores virtualization software for executing a virtual machine.

In some embodiments, a request may be received by the mobile computing device 9005 for access to a resource. In one of these embodiments, the request is for a desktop environment. In another of these embodiments, the request is for an application or for a plurality of applications. In still another of these embodiments, the request is for a virtual machine. In yet another of these embodiments, the request is for access to a computing environment.

In some embodiments, a determination may be made to provide access to the requested resource via a virtualized environment. In one of these embodiments, the determination is made as described above in connection with FIG. 8. In another of these embodiments, the determination is made responsive to information received from the mobile computing device 9005, such as a rule requiring the determination.

A virtual machine executing on the mobile computing device provides access to the computing environment, based on the stored data (step 9025). In one embodiment, an application program stored in the mobile computing device 9005 executes to access data associated with the computing environment. In another embodiment, the mobile computing device 9005 executes virtualization software, at least a portion of which is stored on the mobile computing device 9005. In still another embodiment, the mobile computing device 9005 provides access to a computing environment by executing an operating system with access to one or more applications stored on the mobile computing device, the operating system and the one or more applications having access to user data stored in the mobile computing device 9005.

In one embodiment, the mobile computing device 9005 executes a virtual machine, responsive to data stored in the mobile computing device 9005. In another embodiment, the mobile computing device executes a virtual machine responsive to a policy stored in the mobile computing device 9005. In still another embodiment, the mobile computing device 9005 executes a virtual machine that provides access to a requested resource or computing environment, the virtual machine executed responsive to a virtual machine image stored in the mobile computing device 9005. In yet another embodiment, the mobile computing device 9005 transfers execution of the virtual machine to a computing device 8910.

Although FIGS. 90A and 90B are generally discussed with one portable user environment 8920 stored in storage 8905 of the mobile computing device 9005, the mobile computing device 9005 may store a plurality of portable computing environments 8920 for establishing a corresponding plurality of computing environments 8920' on the mobile computing device 9005.

Figure 91A:
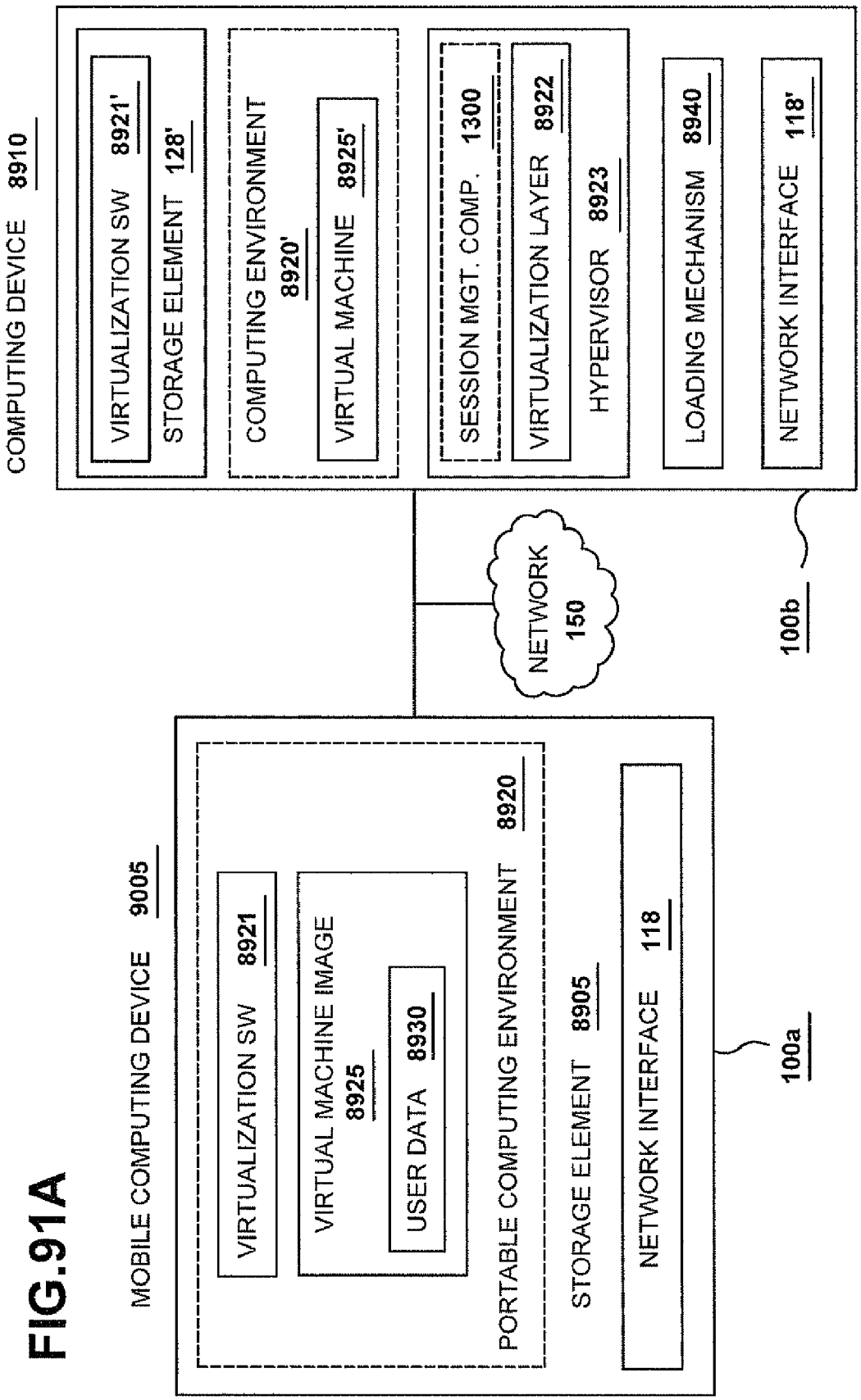
FIG. 91A is a block diagram of one embodiment of a mobile computing device and a computing device.

Referring now to FIG. 91A, a mobile computing device and a computing device are depicted. In brief overview, the mobile computing device stores data associated with a computing environment. The computing device connects to the mobile computing device, executes a virtual machine, and provides access to the computing environment responsive to data stored in the mobile computing device. In one embodiment, the virtual machine executing on the computing device provides access to the computing environment.

In one embodiment, the mobile computing device 9005 may be any type and form of computer system as described in connection with FIG. 1A and FIG. 1B above. In another embodiment, the mobile computing device 9005 comprises a storage device 8905 as described above in connection with FIG. 90A and FIG. 90B. In another embodiment, the mobile computing device may be a mobile computing device 9005 as described above in connection with FIG. 90A and FIG. 90B. In some embodiments, the mobile computing device 9005 provides access to a portable computing environment 8920 of one or more users in storage provided by a storage device, such as a storage device 8905 as described above in connection with FIGS. 89A and 89B.

In some embodiments, the mobile computing device 9005 and the computing device 8910 may have the same processor or computer architecture, such as an X86 based processor architecture. In other embodiments, the mobile computing device 9005 may have a different processor or architecture than the computing device 8910. For example, the computing device 8910 may be a SPARC (Scalable Processor Architecture) and the mobile computing device 9005 may be an ARM based architecture. In some embodiments, the mobile computing device 9005 and the computing device 8910 may both operate a processor, or a data address or bus using the same numbers of bits, such as a 32-bit or 64-bit processor or bus. In other embodiments, the mobile computing device 9005 and the computing device 8910 may operate on processors and/or a data bus with different bit architectures. Furthermore, the mobile computing device 9005 and computing device 8910 may operate the same operating system, in one embodiment, and different operating systems, in another embodiment. For example, the mobile computing device 9005 may operate a PALM operating system while the computing device 8910 runs a WINDOWS operating system.

In one embodiment, a mobile computing device 9005 has multiple processors. One processor may have higher performance characteristics than the other processor, and each processor may share one or more storage and memory elements. For example, a storage element, such as a disk drive or portable storage device, may include a computing environment. The mobile computing device 9005 may also have a switching mechanism to switch between using a first processor having higher performance characteristics and a second processor having lower performance characteristics, based on operating conditions and applications executing on the device. The processor having lower performance characteristics may be used to execute applications with lower power requirements, such as typical PDA functionality of calendar access and email. When an application requires more power, the mobile computing device 9005 may automatically switch execution of such applications to the more powerful processor.

The computing device 8910 connects to the mobile computing device, executes a virtual machine, and provides access to the computing environment responsive to data stored in the mobile computing device 9005. In one embodiment, the computing device 8910 may mount the storage device 8905 of the mobile computing device 9005 as a removable hard drive or storage element 128' of the computing device 8910. In some embodiments, the mobile computing device 9005 may be a plug and play device (PnP) of the computing device 8910, such that a PnP protocol manufactured by Microsoft Corporation of Redmond, Wash., is used between the mobile computing device 9005 and computing device 8910, such as via I/O devices 130*a*-130*n* or network interfaces 118, 118'.

In some embodiments, the computing device 8910 comprises an operational or performance characteristic not provided by the mobile computing device 9005. In one of these embodiments, the computing device 8910 has a more powerful processor 102' and/or larger memory 122' than the processor 102 and memory 122 of the mobile computing device 9005. In another of these embodiments, the computing device 8910 provides an I/O device 130b, display device, installation medium, or other peripherals, such as a keyboard or printer not available to the mobile computing device 9005. In still another of these embodiments, the computing device 8910 may provide a feature, a resource, or peripheral desired to be used by the user of the mobile computing device 9005. For example, the user may want to access a file or an application provided on a remote machine 30' available via a connection across the network 150. In yet another of these embodiments, the computing device 8910 provides access to machines on a network 150, such as those in machine farm 38, not available to the mobile computing device 9005, or to a user of the mobile computing device.

In one embodiment, the computing device 8910 provides access to a computing environment 8920' based on the portable computing environment 8920 provided in the mobile computing device 9005. The computing device 8910 executes a virtual machine 8925' and a virtualization layer 8922 to execute the computing environment 8920' based on the virtualization software 8921 or 8921', virtual machine image 8925, or user data 230. In some embodiments, the computing device comprises a transceiver for accessing data stored in the mobile computing device 9005.

In some embodiments, a loading mechanism on the mobile computing device 9005 actuates the establishment of the computing environment 8920' on the computing device 8910 based on the portable computing environment 8920 stored in the mobile computing device 9005. In other embodiments, the loading mechanism 8940 of the computing device 8910 actuates the establishment of the computing environment 8920'. In yet another embodiment, a loading mechanism on the mobile computing device 9005 works in conjunction with the loading mechanism 8940 of the computing device 8910 to establish the computing environment 8920'.

Figure 91B:
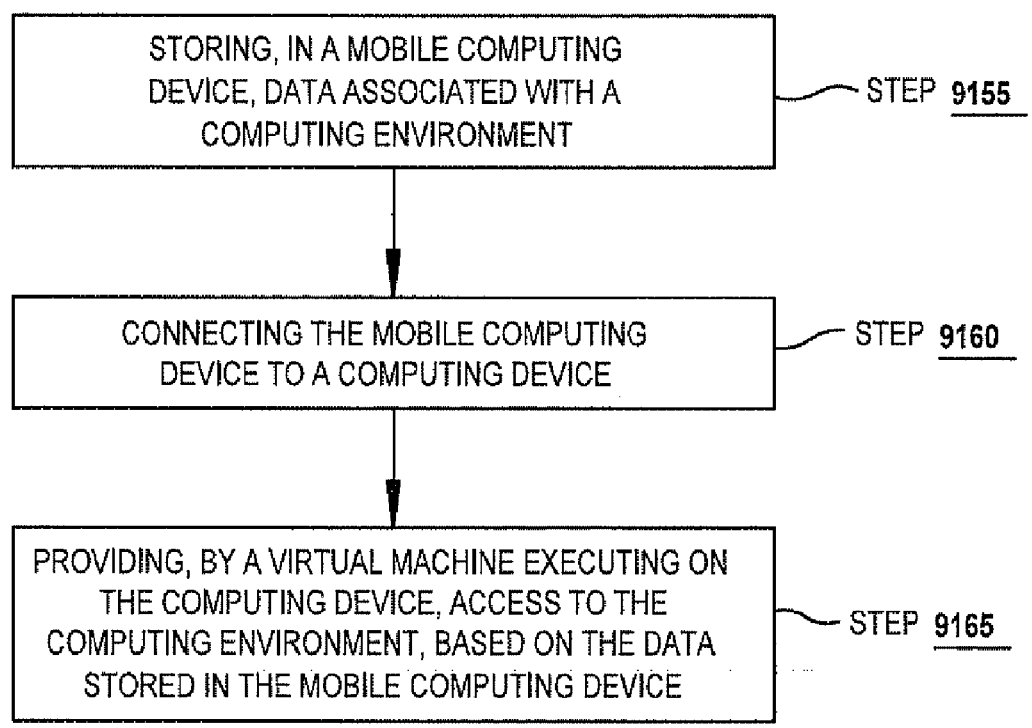
FIG. 91B is a flow diagram depicting depicts one embodiment of the steps taken in a method for providing access to a computing environment on a computing device via a mobile computing device.

Referring now to FIG. 91B, a flow diagram depicts one embodiment of the steps taken in a method for providing access to a computing environment on a computing device via a mobile computing device. In brief overview, a method includes the step of storing, in a mobile computing device, data associated with a computing environment (step 9155). A computing device connects to the mobile computing device (step 9160). A virtual machine executing on the computing device provides access to a computing environment, based on the data stored in the mobile computing device (step 9165).

A mobile computing device stores data associated with a computing environment (step 9155). In one embodiment, the mobile computing device 9005 may store data associated with a computing environment as described above in connection with FIGS. 90A and 90B. In one embodiment, the mobile computing device 9005 may comprise a storage device embedded in the mobile computing device 9005, such as the storage device 8905 described in connection with FIG. 89A through FIG. 90B.

The computing device 8910 connects to the mobile computing device 9005 by any suitable means and/or mechanism (step 9160). In one embodiment, the computing device 8910 connects to a storage device, such as a storage device 8905 as described above in connection with FIG. 89A and FIG. 89B, via the mobile computing device 9005. Upon connection, a request may be received by the computing device 8910 for access to a resource. In one embodiment, the request is for access to a desktop environment. In another embodiment, the request is for an application or for a plurality of applications. In still another embodiment, the request is for a virtual machine. In some embodiments, a determination may be made to provide access to the requested resource via a virtualized environment. In one of these embodiments, the determination is made as described above in connection with FIG. 8. In another of these embodiments, the determination is made responsive to information received from the mobile computing device 9005, such as a rule requiring the determination.

In one embodiment, the computing device 8910 accesses the mobile computing device 9005 to obtain the portable user environment 8920. In another embodiment, the computing device 8910 obtains the virtualization software 8921 to establish the virtualized environment 8922. In still another embodiment, the computing device 8910 does not obtain the virtualization software 8921 from the mobile computing device 9005 as the computing device 8910 has access to the virtualization software 8921 in storage element 128' or via network 150. In yet another embodiment, the computing device 8910 obtains portions of the virtualization software 8921 from the mobile computing device 9005. For example, the virtualization software 8921 on the mobile computing device 9005 may be an updated version or have updated files to the virtualization software 8921' on the computing device 8910. In some embodiments, the mobile computing device 9005 transmits information to the computing device 8910. In one of these embodiments, the mobile computing device 9005 transmits the information with a request for access to a resource.

In one embodiment, the computing device 8910 accesses the mobile computing device 9005 to obtain the virtual machine image 8925. In another embodiment, the computing device 8910 accesses the mobile computing device 9005 to obtain data or information identifying a location of the portable user environment 8920 in any storage that may be accessible to the computing device 8910. For example, the mobile computing device 9005 may comprise user data 8930 identifying a Uniform Resource Locator (URL) associated with a location on which a virtual machine image 8925 is stored, the URL accessible by the computing device 8910 via network 150. In still another embodiment, the computing device 8910 accesses a storage element identified by the user data 8930, for example, a storage element on network 150 storing the virtual machine image 8925. In some embodiments, the computing device 8910 mounts the mobile computing device 9005 as a storage element, such as a disk, available to the computing device 8910. For example, in one embodiment, the computing device 8910 mounts the mobile computing device 9005 as removable media. In one embodiment, the loading mechanism 8940 accesses the mobile computing device 8905.

In some embodiments, the computing device 8910 provides access to a computing environment by executing an operating system with access to one or more applications identified via data stored on the mobile computing device, the operating system and the one or more applications having access to the user data on the storage device. In other embodiments, the computing device prevents one of unauthenticated or unauthorized access by a user of the mobile computing device 9005 to a computing environment provided by the computing device 8910. In still other embodiments, the computing device 8910 decrypts data stored on the mobile computing device 9005.

A virtual machine executing on the computing device 8910 provides access to a computing environment, based on data stored in the mobile computing device 9005 (step 9165). In one embodiment, the computing device 8910 establishes a virtualized environment for providing access to the computing environment 8920' by executing the virtual machine 8925. In another embodiment, a virtual machine may be executed in the user environment 8920' to provide access to a requested resource. In still another embodiment, a virtual machine is the requested resource. In some embodiments, the computing device 8910 executes a virtual machine responsive to a virtual machine image 8925 stored in the mobile computing device 9005. In other embodiments, the computing device 8910 executes a virtual machine responsive to data stored in the mobile computing device 9005.

In one embodiment, an application program stored in the mobile computing device 9005 is executed to access data associated with a computing environment. In another embodiment, the computing device 8910 executes virtualization software 8921' by accessing at least a portion of the virtualization software 8921 stored in the mobile computing device 9005.

In one embodiment, the computing device 8910 executes the virtualization software 8921 to establish the virtualization layer 8922. In some embodiments, the virtualization software 8921 is automatically installed on the host computing device 8910 via an installation script. In one of these embodiments, the virtualization software 8921 is installed without requiring a reboot. In another of these embodiments, the virtualization software 8921 is installed and the virtualization layer 8922 established transparently to a user.

In some embodiments, the computing device 8910 executes a hypervisor 8923 to establish the virtualization layer 8922. In other embodiments, a hypervisor 8923 on the computing device 8910 and in communication with a hypervisor 8923' on a remote machine 30' establishes the virtualization layer 8922. In still other embodiments, a hypervisor 8923 in communication with a session management component 1300 establishes the virtualization layer 8922. In one of these embodiments, upon establishment of the virtualization layer 8922, the session management component 1300 identifies, provisions, and/or executes a virtual machine in the virtualization layer 8922 as described above in connection with FIG. 8. In yet other embodiments, the loading mechanism 8940 establishes the virtualization layer 8922. In one embodiment, the computing device 8910 establishes a virtualization layer 8922 in which a virtual machine service component executes.

In one embodiment, the virtualization layer 8922 has been established prior to the mobile device 9005 connecting to the computing device 8910. For example, the virtualization layer 8922 may have been established for another user environment 8920' or during a previous connection of the same or different mobile computing device 9005. In some embodiments, the computing device 8910 and/or loading mechanism 8940 establishes the virtualization layer 8922 and actuates, starts, or executes a session management component 1300 and/or hypervisor 8923. In other embodiments, the computing device 8910 and/or loading mechanism 8940 executes the session management component 1300 and/or hypervisor 8923 upon loading or executing a virtual machine 8925.

In some embodiments, the computing device 8910 establishes, executes or otherwise provides the computing environment 8920' based on the portable computing environment 8920. In one embodiment, the computing device 8910 and/or loading mechanism 8940 accesses the virtual image 8925 from the mobile computing device 9005 and loads or executes the virtual machine image 8925 as a virtual machine 8925 in the established virtualized environment 8922. In another embodiment, the computing device 8910 and/or loading mechanism 8940 automatically loads, executes or otherwise establishes the computing environment 8920 with the virtualization layer 8922 upon detection of a connection over network 150. In still another embodiment, the computing device 8910 and/or loading mechanism 8940 automatically loads, executes or otherwise establishes the computing environment 8920 and the virtualization layer 8922 upon detection of existence or identification of the portable computing environment 8920 on the mobile computing device 9005.

In some embodiments, a user may select the virtual machine image 8925 from the mobile computing device 9005 for execution as a virtual machine 8925 via any type and form of user interface. In one of these embodiments, the virtualization software 8921, virtualization layer 8922, hypervisor 8923, or loading mechanism 8940 may display a user interface for a user to identify a virtual image 8925, and/or to execute a virtual machine 8925 based on a virtual image 8925. In another of these embodiments, a client, such as an ICA client, an RDP client, or an X11 client, executes on the computing device 8910 and provides the user interface to the user.

In some embodiments, a user may access, read, and/or write user data 8930 during the course of using the established user environment 8920'. In one of these embodiments, the user host computing device 8910 may access, read and/or write the user data 8930 to the mobile computing device 9005. In another of these embodiments, the user of the computing device 8910 may edit or modify user data 8930 or may create new data and information in user data 8930.

In other embodiments, a user of the computing device 8910 may access, read, and/or write user data to the storage element 128' of the computing device 8910. In still other embodiments, the computing device 8910 may synchronize user data 8930 on the computing device 8910 with user data 8930 on the mobile computing device 8905. In one of these embodiments, the computing device 8910 uses the virtualization layer 8922 or the loading mechanism 8940 to synchronize the user data 8930. In yet other embodiments, the mobile computing device 9005 may have a program or application for synchronizing data, such as files and folders, between the mobile computing device 9005 and the computing device 8910.

In one embodiment, the mobile computing device 9005 may disconnect from the computing device 8910. In some embodiments, the mobile computing device 9005 may disconnect at any point in time during the use of the established computing environment 8920'. In other embodiments, the mobile computing device 9005 may disconnect after the computing environment 8920' is terminated on the computing device 8910. In still other embodiments, the user environment 8920' is automatically terminated upon disconnection of the mobile computing device 9005 from the computing device 8910. In one embodiment, the computing environment 8920' may remain established on the computing device 8910 after the mobile computing device 9005 disconnects from the computing device 8910. In some embodiments, once the computing environment 8920' is established on the computing device 8910, the mobile computing device 9005 may be disconnected.

In some embodiments, the mobile computing device 9005 can access, read, and/or write user data 8930 to any portion of the portable computing environment 8920. For example, in one embodiment, although the portable computing environment 8920 is not established or virtualized on computing device 8910, the mobile computing device 9005 can still access, read, and/or write to and from the user data 8930. In one embodiment, the user may use a first application in the established computing environment 8920' to access a file of the user data 8930. In another embodiment, the user may use a second application on the mobile computing device 9005 to access the same file of the user data 8930. In some embodiments, the virtualization software 8921 or virtual machine image 8925 allows access to the user data 8930, even though virtualization software 8921 or virtual image 8925 is not executing or operating.

In some embodiments, the computing device 8910, loading mechanism 8940, or the virtualized layer 8920 provides a user interface for the user to select a portable computing environment from storage to establish the computing environment 8920. For example, the mobile computing device 9005 or the computing device 8910 may have a portable computing environment selection mechanism, as discussed in greater detail below. In other embodiments, the computing device 8910, loading mechanism 8940, or the virtualized layer 8922 uses one of the plurality of portable computing environments based on a characteristic of the computing device 8910, such as an operating system type, or based on user data identifying the portable computing environment to use for the computing device 8910.

Figure 92A:
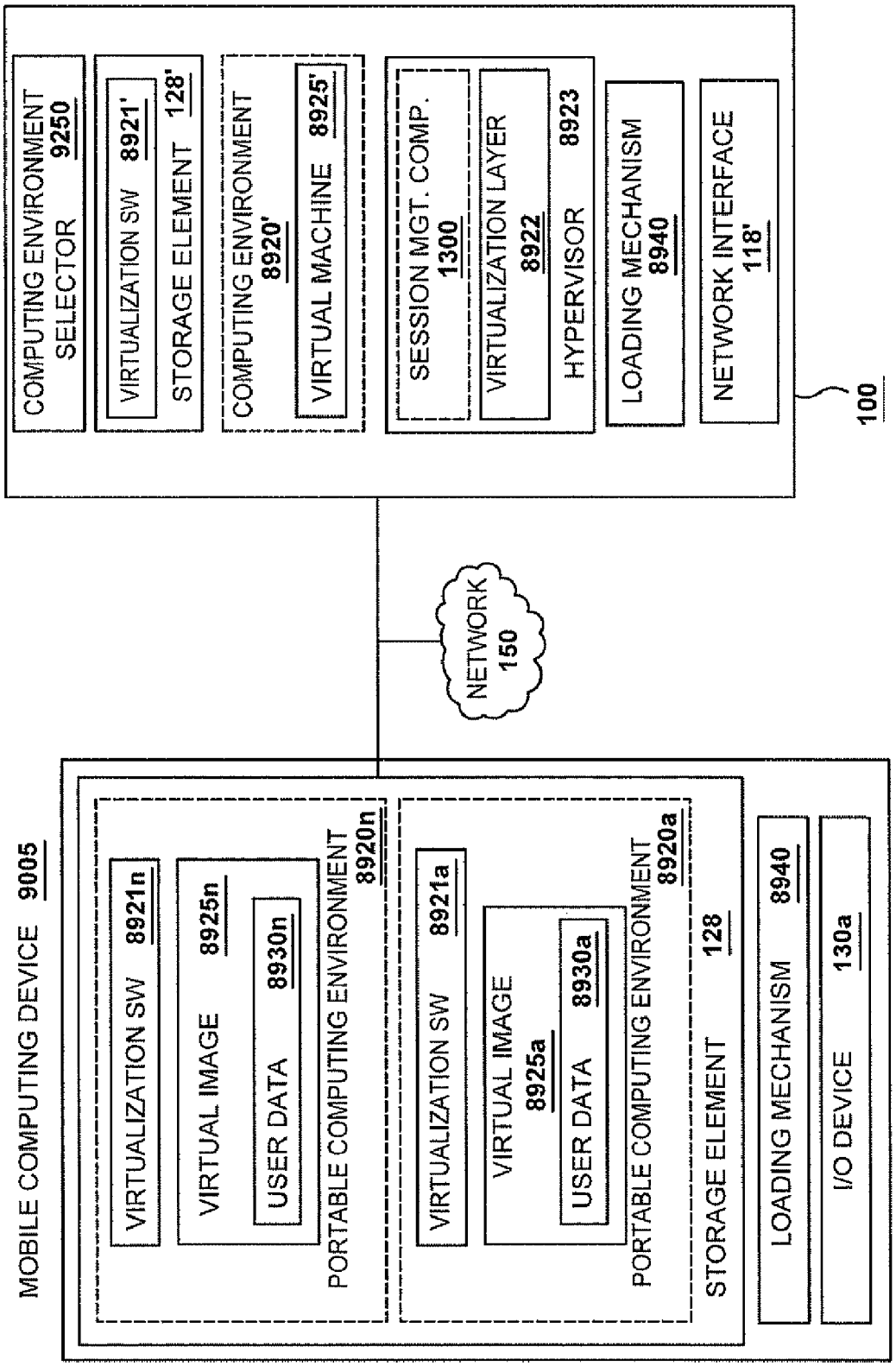
FIG. 92A is a block diagram depicting one embodiment of a mobile computing device and a computing device comprising a computing environment selector.

Referring now to FIG. 92A, in one embodiment, the computing device 8910 further comprises a computing environment selector 9250. In brief overview, FIG. 92A depicts a mobile computing device 9005 connected to a computing device 8910 via a network 150. The mobile computing device 9005 further comprises a storage element 128, an I/O device or interface 130, and a loading mechanism 8940. The mobile computing device 9005 stores one or more portable computing environments 8920*a*-8920*n* in storage element 128. In some embodiments, the storage element 128 comprises a storage device, such as the storage device 8905 described above in connection with FIGS. 90A and 90B.

In some embodiments, the mobile computing device 9005 does not have a user input I/O device 130 and/or a user output I/O device 130. In other embodiments, the mobile computing device 9005 obtains or derives power from the connection to the computing device 8910, such as for example, from a USB connection. In still other embodiments, the mobile computing device 9005 is a card of the following type: CompactFlash, Memory Stick, MultiMediaCard, Secure Digital, or SmartMedia.

In one embodiment, the storage element 128 stores a plurality of computing environments and a plurality of virtual machine images. In another embodiment, the storage element 128 stores one or more of a plurality of virtual machine images providing one of a different operating system or a different application than at least one virtual machine images accessible to the computing device. In still another of these embodiments, the storage element 128 stores one of the data associated with at least one computing environment and the at least one virtual machine image in an encrypted format.

In some embodiments, the mobile computing device 9005 stores data associated with at least one portable computing environment 8920. In one of these embodiments, the mobile computing device 9005 stores data associated with a plurality of portable computing environments 8920*a*-8920*n*. In another of these embodiments, each of the portable computing environments 8920*a*-8920*n* comprises the same virtualization software 8921*a*-8921*n*. In still another of these embodiments, the portable computing environments 8920*a*-8920*n* comprise different virtualization software 8921*a*-8921*n*.

In other embodiments, the portable computing environments 8920*a*-8920*n* may comprise at least one virtualization software 8921*a* that is the same as another virtualization software 8921*b*. In other embodiments, the portable computing environments 8920*a*-8920*n* may comprise at least one virtualization software 8921*a* that is different from another virtualization software 8921*b*. In yet another embodiment, there may be one copy of the virtualization software 8921 to be used for each of the virtual images 8925*a*-8925*n* in storage 128.

In one embodiment, one or more of the virtual machine images 8925*a*-8925*n* provides access to the same operating system or are used on the same operating system. In another embodiment, one or more of the virtual machine images 8925*a*-8925*n* comprises a different operating system or executes on a different operating system. In some embodiments, the virtual machine images 8925*a*-8925*n* share the same user data 8930. In other embodiments, the virtual machine images 8925*a*-8925*n* may each have distinct sets of user data 8930*a*-8930*n*. In one embodiment, one of the virtual machine images 8925*a*-8925*n* may provide access to a first computing environment, for example, a work desktop environment. In another embodiment, one of the virtual machine images 8925*a*-8925*n* may provide access to a second computing environment, for example, a home desktop environment. In some embodiments, a virtual machine image 8925*a*-8925*n* may provide access to a computing environment comprising a set of one or more portable applications of the user. The mobile computing device 9005 may store any desired set of one or more user environments 8920*a*-8920*n*.

The mobile computing device 9005 includes a connector for connecting the mobile computing device 9005 to a computing device, such as the computing device 8910. In one embodiment, the connector is connectable to a computing device 8910 via one of the following: a wireless connection, a USB connection, a Firewire connection, a Bluetooth connection, a Wi-Fi connection, a network connection, and a docking connection.

The mobile computing device 9005 includes a loading mechanism 8940 for automatically loading the at least one computing environment from the storage element onto a computing device upon connection of the mobile computing device to the computing device via the connector. In one embodiment, the loading mechanism 8940 automatically installs the at least one computing environment on the computing device 8910. In another embodiment, the loading mechanism 8940 automatically executes the at least one computing environment on the computing device 8910. In still another embodiment, the loading mechanism 8940 accesses at least one virtual machine image stored in the storage element 128 to execute a virtual machine, the virtual machine providing access to a computing environment.

In some embodiments, the mobile computing device 9005 includes a user interface provided for a user to select one virtual machine image to execute on the computing device 8910 from a plurality of virtual machine images. In other embodiments, the computing device 8910 provides the user interface.

In one embodiment, a selection mechanism, such as a computing environment selector 9250 provides a user interface for a user to select one of the portable computing environments 8920*a*-8920*n* to execute or establish on the computing device 8910. The computing environment selector 9250 may comprise software, hardware, or any combination of software and hardware. In some embodiments, the computing environment selector 9250 has a graphical user interface providing a list of the one or more portable computing environment 8920a-8920n stored in the mobile computing device 9005. In other embodiments, the computing environment selector 9250 may comprise a command line interface. In one embodiment, the computing environment selector 9250 comprises software, stored on or provided by either the mobile computing device 9005 or the computing device 8910. In one embodiment, the virtualized software 8921, virtualized layer 8922 or portable computing environment 8920 comprises the computing environment selector 9250. In another embodiment, the computing environment selector 9250 is executed on the mobile computing device 9005. In some embodiments, the computing environment selector 9250 comprises a hardware and software mechanism on the mobile computing device 9005 for a user to select one of the portable computing environments 8920a-8920n. For example, the mobile computing device 9005 may provide via a screen or visual display unit a text based user interface with a thumb wheel to select a portable computing environment 8920a-8920n.

Referring now to FIG. 92B, a flow diagram depicts another embodiment of the steps taken in a method for establishing a computing environment on a computing device via a mobile computing device. By connecting the mobile computing device 9005 carrying a portable computing environment 8920a-8920n to a computing device 8910, a user establishes a virtualized computing environment 8920' on the computing device 8910. In brief overview, at step 9255, the mobile computing device 9005 is connected to the computing device 8910, and at step 9260, the computing device 8910 detects the connection. At step 9265, and in some embodiments, the user selects a portable computing environment 8920a-8920n from storage to be used on the computing device 8910. At step 9270, a portable computing environment 8920a-8920n in the storage element 128 is decrypted. At step 9275, the virtualization software 8921 is automatically loaded on the computing device 8910. At step 9280, the computing device 8910 executes a virtual machine 8925' in the virtualized environment 8922 based on the portable computing environment 8920a-8920n, such as by accessing virtual image 8925. At step 9285, the computing device 8910 controls access to the computing device 8910 via the virtualized computing environment 8920'.

In further detail, at step 9255, the mobile computing device 9005 is connected to the computing device 8910 by any suitable means and/or mechanisms. At step 9260, the computing device 8910 detects the connection. In some embodiments, the operating system of the computing device 8910 detects connection of the mobile computing device 9005. In other embodiments, a device manager detects the connection of the mobile computing device 9005. In still other embodiments, a plug-and-play manager detects the connection of the mobile computing device 9005. In other embodiments, a device driver for the computing device 8910 detects the connection. In yet another embodiment, the loading mechanism 8940' detects the connection of the mobile computing device 9005.

In some embodiments, upon detection of the connection, the computing device 8910 may automatically install, load, and execute a device driver, software, application, process, service, thread or task to perform any of the operations described herein, as described above in connection with FIGS. 89A and 89B, FIGS. 90A and 90B, and FIGS. 91A and 91B. In other embodiments, upon detection of the connection, computing device 8910 may perform any type and form of authentication and authorization of the user of the mobile computing device 9005.

At step 9265, the user selects a portable computing environment 8920a-8920n from storage element 128 to establish as the computing environment 8920' on the computing device 8910. For example, the user may identify or select, via the computing environment selector 9250, the portable computing environment 8920a-8920n to run on the computing device 8910. In one embodiment, the computing device 8910 displays a user interface providing a list of portable computing environments 8920a-8920n from the mobile computing device 9005 for the user to select to establish on the computing device 8910. In some embodiments, the computing device 8910 executes an application program identified via the storage element 128 of the mobile computing device 9005, such as via an autorun file. In another embodiment, the mobile computing device 9005 has a visual display unit displaying a user interface for the user to select one of the portable computing environments 8920a-8920n. In some embodiments, one of the portable computing environments 8920a-8920n is identified as a default computing environment 8920 to establish on the computing device 8910. In another embodiment, the portable computing environments 8920a-8920n are identified in an order or preference or priority. In one embodiment, the mobile computing device 9005 comprises one portable computing environment 8920. In this embodiment, the portable computing environment 8920 may not need to be selected by the user and is automatically used by the computing device 8910. In another embodiment, although there is one portable computing environment 8920 on the mobile computing device 9005, the user may select the one portable computing environment 8920.

At step 9270, the computing device 8910 may perform decryption on any portion of storage element 128 which may be encrypted. In one embodiment, the storage element 128 comprises an encrypted file system. In another embodiment, the virtualization software 8921, virtual image 8925 and/or user data 8930, or any portions thereof may be encrypted. In one embodiment, the computing device 8910, decrypts the portion of storage 128 using a key via the loading mechanism 8940', the virtualization layer 8920, or another set of executable instructions. In some embodiments, the key may a public key. In other embodiments, the key may be a private key. In one embodiment, the decryption key may be identity-based, such as based on the identity of a user authenticated via the computing device 8910. In another embodiment, the user's authentication credentials, such as user id and/or password, may be used to generate or obtain a key for decryption. For example, the user's authentication credentials may be used to obtain a key stored in the database. In another embodiment, the computing device 8910 generates a private key based on performing an algorithm on the user's authentication credentials and a public key, such as a public key provided by a trusted third party. In yet another embodiment, the mobile computing device 9005 may store a key that is used by the computing device 8910 to authenticate the user and/or generate a decryption key. In some embodiments, the computing device 8910 uses a ticket authority to obtain a ticket for decrypting the encrypted portions of storage 128. Any type and form of authentication technologies may be used in performing the operations described herein, such as password based authentication or biometric authentication. In one embodiment, a token is used to provide two-factor authentication, such as a token manufactured by RSA Security Inc. of Bedford, Mass.

At step 9275, the computing device 8910 provides or establishes the virtualization layer 8922 on the host computing device 8910 as described above in connection with FIGS. 89A-89B, FIGS. 90A-90B, and FIGS. 91A-91B.

At step 9280, the computing device 8910 automatically loads, executes or otherwise establishes a virtual machine 8925a-8925n to provide access to a portable computing environment 8920a-8920n on the virtualized layer 8922. In one embodiment, the computing device 8910 and/or loading mechanism 8940 accesses the virtual machine image 8925a-8925n from the storage element 128 and loads or executes the virtual machine image 8925a-8925n as a virtual machine 8925' in the established virtualized environment 8922. In another embodiment, the computing device 8910 loads, executes or establishes a virtual machine as described above in connection with FIGS. 89A-89B, FIGS. 90A-90B, and FIGS. 91A-91B.

At step 9285, in some embodiments, the computing environment 8920' or virtual machine 8925 is established in a secured manner. In one embodiment, the established computing environment 8920' protects access to user data 8930 or portions of the computing environment 8920 from the environment of the computing device 8910 external to the computing environment 8920'. In one embodiment, the virtualization software 8921 and/or virtualization layer 8922 ensures that contents of the virtual machine 8925' remain secure while running on the computing device 8910. In some embodiments, the virtualization software 8921 and/or virtualization layer 8922 ensures that no input or no output is made available to the environment of the computing device 8910 in a persistent fashion. For example, in one embodiment, the virtualization software 8921 and/or virtualization layer 8922 may disable clipboard access between the host environment and the virtual machine 8925'. In another embodiment, the virtualization software 8921 and/or virtualization layer 8922 disables access to a file system, or portion thereof, of the computing device 8910. In other embodiments, the virtualization software 8921 and/or virtualization layer 8922 prevents paging by the virtual machine 8925' to the page file of the computing device 8910. In one embodiment, the virtual machine 8925' uses the storage element 128 on the mobile computing device 9005 for file and data operations. In some embodiments, the virtualization layer 8922 acts as firewall between the virtual machine 8925' and the host environment. In yet another embodiment, the virtualization software 8921 and/or virtualization layer 8922 may provide a configuration mechanism, such as a user interface, to select which actions may be performed and/or data shared between the computing device 8910 and the virtual machine 8925'.

Although this method is generally discussed as establishing a computing environment 8920' from one of a plurality of portable computing environments 8920a-8920n, a plurality of computing environments 8920', 8920" may be established on the computing device 8910. For example, a first computing environment 8920' may be established on the computing device 8910 using a first portable computing environment 8920a from the mobile computing device 9005, and a second computing environment 8920" may be established on the computing device 8910 using a second portable computing environment 8920b from the mobile computing device 9005.

Figure 93A:
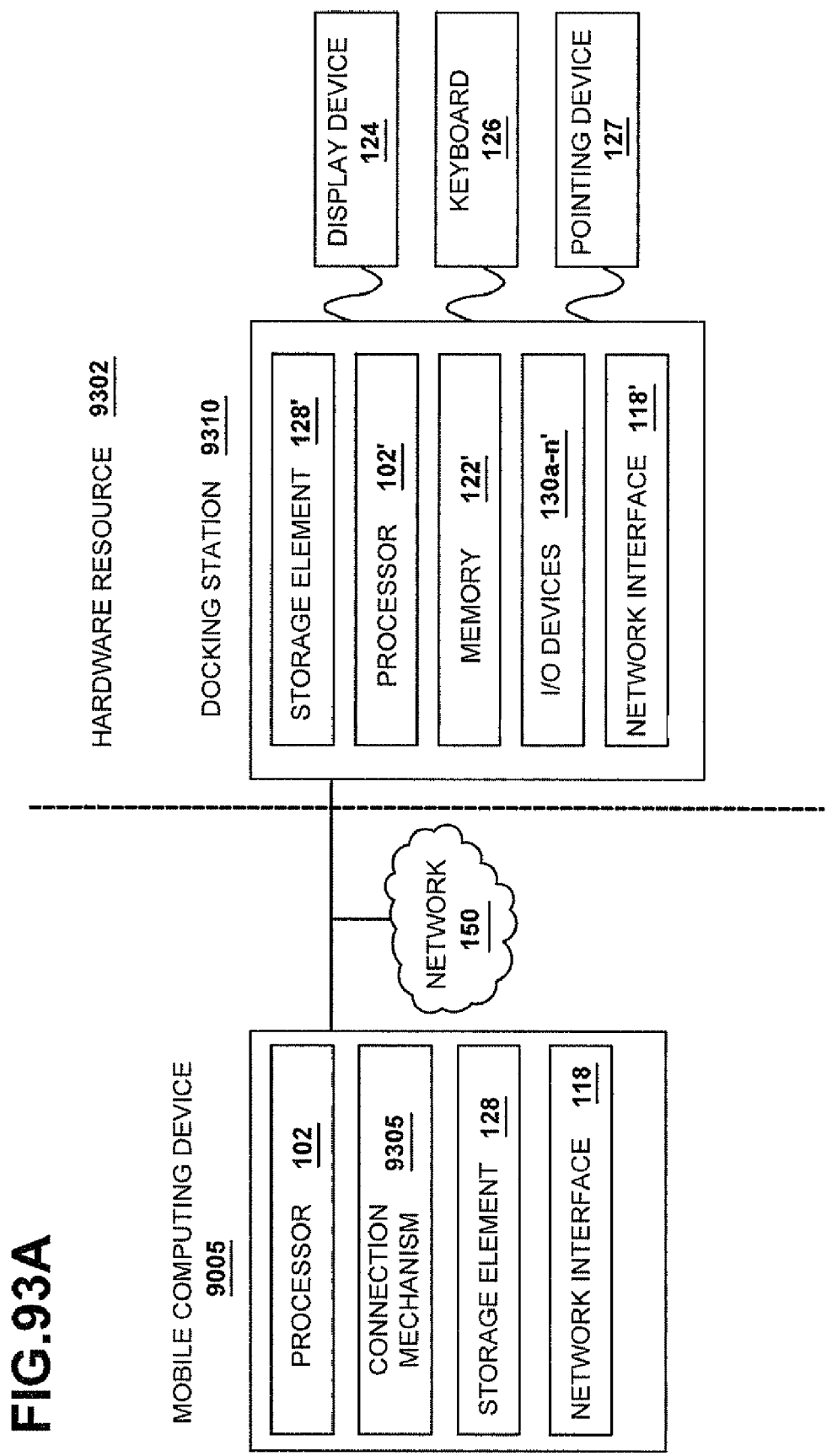
FIG. 93A is a block diagram depicting one embodiment of a mobile computing device connecting to a docking station.
Figure 93C:
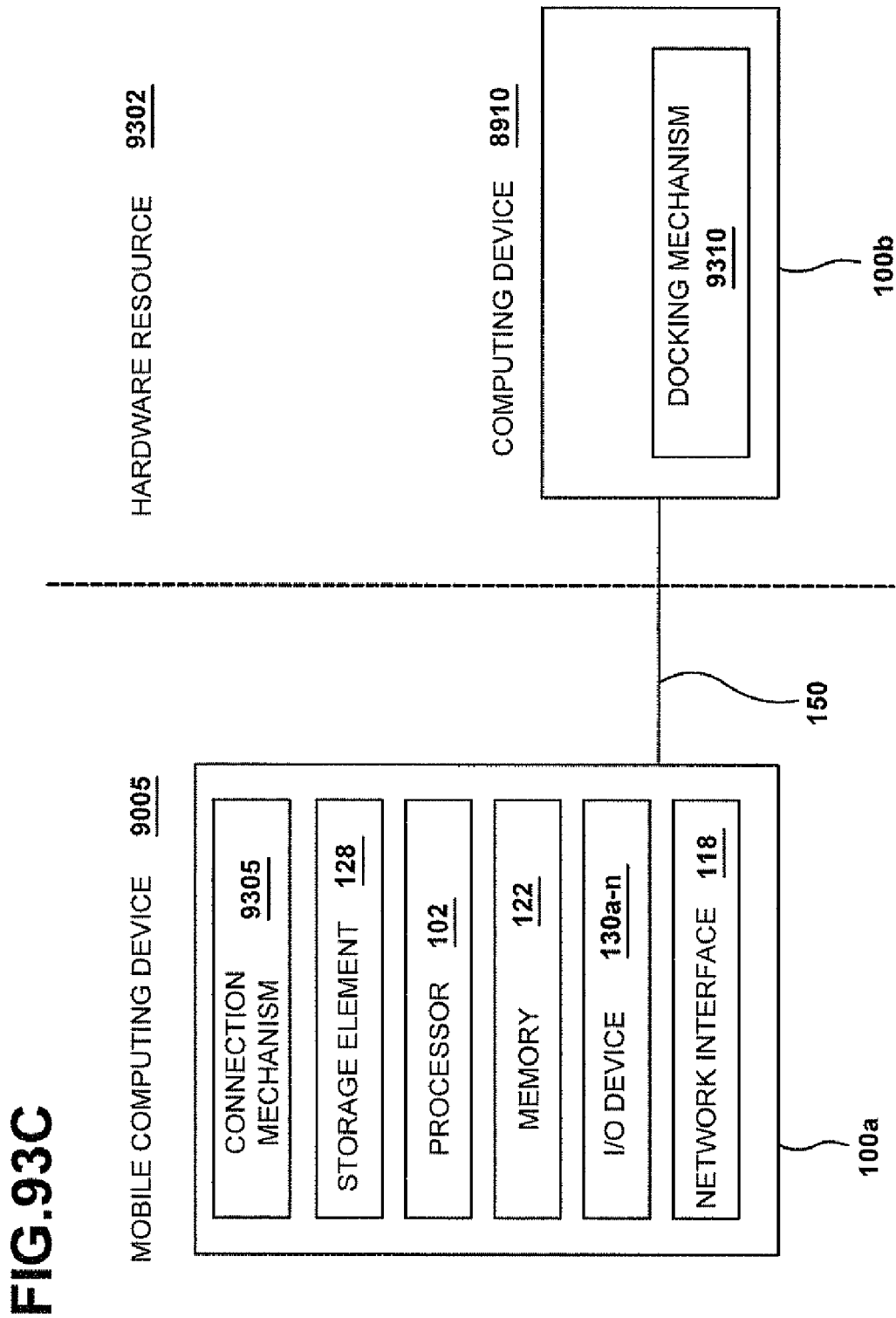
FIG. 93C is a block diagram depicting one embodiment of a mobile computing device and computing device having a docking mechanism.
Figure 93D:
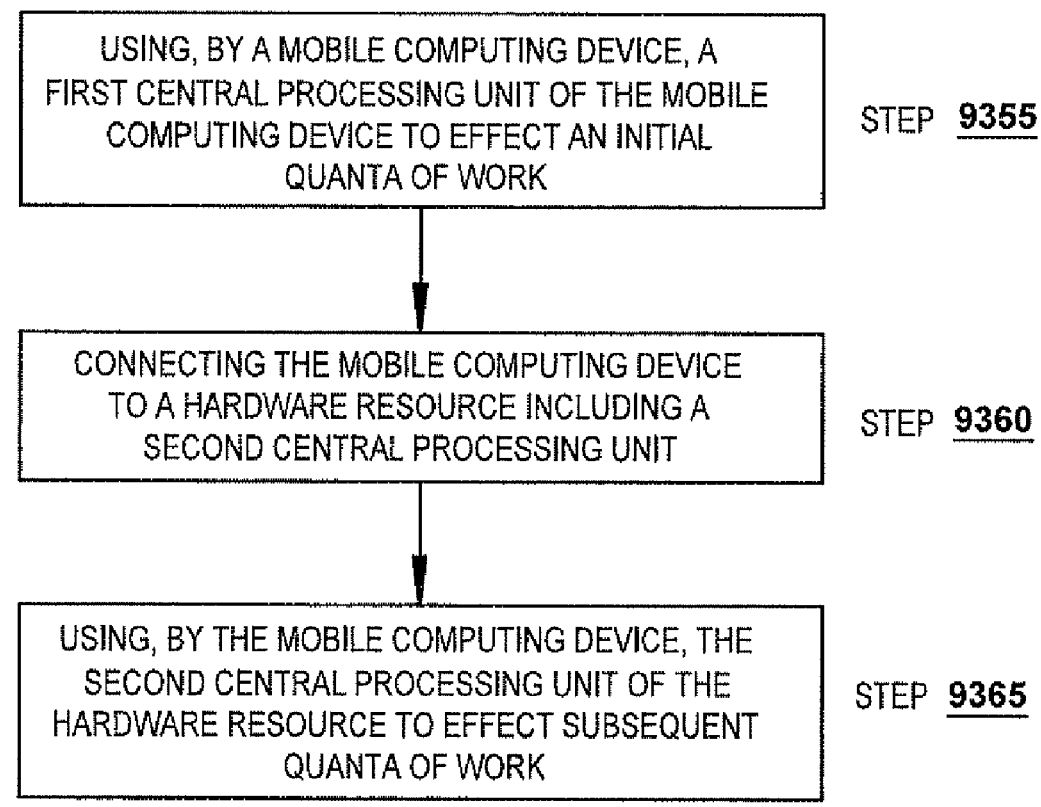
FIG. 93D is a flow diagram depicting one embodiment of the steps taken in a method of providing to a mobile computing device one or more hardware resources.

Referring now to FIGS. 93A-93D, block diagrams depict embodiments of systems and methods for a mobile computing device to one or more hardware resources. The hardware resource may provide access to resources, such as a processor or memory with greater power, size, capacity or performance as compared to corresponding resources of the mobile computing device. FIG. 93A depicts an embodiment of a mobile computing device 9005 connecting to a docking station or device having a processor, memory and other computing resources for use by the mobile computing device. FIG. 93B depicts an embodiment of a mobile computing device connecting to a second hardware resource, via a docking mechanism, to use a processor, memory and/or resources of the second hardware resource. FIG. 93C depicts an embodiment of a docking station providing connectivity to a second hardware resource, such as a computing device, to use a processor, memory and/or resources of the second hardware resource. FIG. 93D depicts one embodiment of the steps taken in a method of providing to a mobile computing device one or more hardware resources, as described in the environments illustrated in FIGS. 93A-93C. In some embodiments, a portable computing environment may be established on the hardware resource in accordance with any of the systems and method described in conjunction with FIGS. 89A-89B, 90A-90B, 91A-91C, 92A-92B. In other embodiments, the computing environment of the mobile computing device is accessed using the processor, memory, and/or resources of the hardware resource.

Referring now to FIG. 93A, in brief overview, the depicted system includes a mobile computing device 9005 connected to a hardware resource 9302. The mobile computing device 9005 has a central processing unit 102. The hardware resource 9302 has a central processing unit 102'. In one embodiment, the hardware resource 9302 includes a docking station 9310 providing access to the hardware resource 9302. In another embodiment, the docking station 9310 includes a processor 102' and memory 122'. In still another embodiment, the mobile computing device provides the functionality of a mobile computing device 9005 as described above in connection with FIGS. 90A, 90B, 91A, 91B, 92A, and 92B.

The mobile computing device 9005 comprises a connection mechanism 9305 for connecting the mobile computing device 9005 to the hardware resource 9302. The mobile computing device 9005 uses the central processing unit 102 to effect an initial quanta of work and uses the central processing unit 102' of the hardware resource 9302 to effect subsequent quanta of work when connected to the hardware resource 9302. In one embodiment, the mobile computing device 9005 uses the connection mechanism 9305 to switch to using the processing or computing capabilities of the hardware resource 9302 upon or after connecting to the hardware resource 9302. For example, the mobile computing device 9005 may execute a computing environment 8920 on the hardware resource 9302 after connecting to the docking station 9310.

In one embodiment, the mobile computing device 9005 connects to the hardware resource 9302 via connection across network 150. In another embodiment, the mobile computing device 8905 is docked to the hardware resource 9302 via a I/O device mechanism 130a-130n designed and constructed to connect to, and/or interface or communicate with the type and form of mobile computing device 9005. In one embodiment, the mobile computing device 9005 is docked to the hardware resource 9302 via a docking connector. For example, one of the devices 9005 or 9310 may have a docking connector, and one of the device 9005 or 9310 may have a corresponding interface or connection mechanism designed to receive the connector.

The connection mechanism 9305 may comprise software, hardware, or any combination of software and hardware enabling the mobile computing device 9005 to access the hardware resource 9302. In some embodiments, the connection mechanism 9305 comprises any type and form of integrated circuit, such as a Field Programmable Gate Array (FPGA), Programmable Logic Device (PLD), or Application Specific Integrated Circuit (ASIC) capable of performing any of the operations described herein.

In one embodiment, the connection mechanism 9305 comprises one of the following: a wireless connection, a USB connection, a Firewire connection, a Bluetooth connection, a Wi-Fi connection, a network connection, and a docking connection.

In some embodiments, the connection mechanism 9305 is enables the system or mother board of the mobile computing device 9005 to use a processor 102' and/or memory 122' of the hardware resource 9302. In other embodiments, the connection mechanism 9305 communicates with any system or data bus of the mobile computing device 9005 to transmit and receive signals directing the mobile computing device 9005 to use a resource of the hardware resource 9302, such as the processor 102' and memory 122' of the docking station 9310. In some embodiments, the connection mechanism 9305 may communicate with a system or data bus of the hardware resource 9302 to enable the use of resources of the hardware resource 9302 by the mobile computing device 9005.

In one embodiment, the connection mechanism 9305 may have the mobile computing device 9005 reboot, restart or reset when connected or docked to the hardware resource 9302. In another embodiment, the connection mechanism 9305 may allow real-time switching to use a computing resource of the hardware resource 9302 without a reboot or restart. In some embodiments, the connection mechanism 9305 transfers data from memory 122 on the mobile computing device 9005 to memory 122' of hardware resource 9302. In other embodiments, the connection mechanism 9305 transfers execution of a process from a processor 102 on the mobile computing device 9005 to processor 102' of the hardware resource 9302. In still other embodiments, the mobile computing device 9005 transfers central processing control and management to the hardware resource 9302. In yet other embodiments, the connection mechanism 9305 provides for the use of the processor 102 and/or memory 122 on the mobile computing device 9005 in conjunction with the processor 102' and/or memory 122' of the hardware resource 9302. For example, when connected to the hardware resource 9302, the mobile computing device 9005 may operate as a multi-processor device.

In some embodiments, the mobile computing device 9005 and/or connection mechanism 9305 maintains the state of the processor 102 and/or memory 122 on the mobile computing device 9005. As such, in some of these embodiments, upon disconnection from the hardware resource 9302, the mobile computing environment 9005 continues from a state prior to connection to the hardware resource 9302. In others of these embodiments, the connection mechanism 9305 transfers data, information, and execution or control from a processor 102' and/or memory 122' to the processor 102 and/or memory 122 of the mobile computing device 9005.

In one embodiment, the connection mechanism 9305 comprises any type and form of user interface to receive user input regarding connection to the hardware resource 9302, use of hardware resources, and transfer of data and control between hardware resources. For example, the connection mechanism 9305 may display a graphical user interface upon docking to the hardware resource 9302 for the user to setup, configure, control and/or manage the use of the hardware resource 9302.

In some embodiments, the hardware resource 9302 uses the storage element 128 of the mobile computing device 9005 to provide access to a computing environment. In one of these embodiments, the hardware resource 9302 executes an operating system stored in storage element 128 of the connected mobile computing device 9005. In another of these embodiments, the hardware resource 9302 mounts the storage element 128 of the connected mobile computing device 9005 for access by the hardware resource 9302. In still another of these embodiments, the user uses the operating system or computing environment of the hardware resource 9302 but executes applications and accesses data on the storage element 128 of the mobile computing device 9005. In yet another of these embodiments, the mobile computing device 9005 may store portable applications to execute in the hardware resource 9302.

In one embodiment, the hardware resource 9302 executes a virtual machine to provide access to a computing environment stored in the mobile computing device 9005. In another embodiment, the hardware resource 9302 executes a virtual machine, the virtual machine providing access to a virtualized computing environment. In still another embodiment, a file from a storage location provided by the mobile computing device 9005 is accessed by a user via the hardware resource 9302 when the mobile computing device 9005 is connected to the hardware resource 9302, and the file is accessed by the user, via the mobile computing device 9005, when the mobile computing device 9005 is not connected to the hardware resource 9302.

Still referring to FIG. 93A and in one embodiment, the hardware resource 9302 comprises a docking station 9310, the docking station 9310 comprising a computer system 100. In some embodiments, the docking station 9110 may be any type and form of computer system 100, as described above in connection with FIGS. 1A-1B. In one of these embodiments, and as described in connection with FIGS. 1A-1B, the docking station 9110 may comprise components including, but not limited to, a processor 102', memory 122, storage 128, a network interface 118', and/or one or more I/O devices 130a-130n'. In another of these embodiments, the docking station 9110 is connected to a display device 124, a keyboard 126, and/or a pointing device 127. The docking station 9310 may also be connected to or provide access to other hardware resources and computing peripherals. In some embodiments, the docking station 9310 provides access to resources of another computer system 100 via a network 150.

In one embodiment, the hardware resource 9302 has a processor 102' having a higher processor speed than the processor 102 of the mobile computing device 9005. In another embodiment, the hardware resource 9302 has a processor 102' comprising a processor architecture different than a processor architecture of the processor 102 of the mobile computing device 9005. In still another embodiment, the mobile computing device 9005 uses the processor 102 to effect an initial quanta of work and, upon connection to the hardware resource 9302 via the connection mechanism 9305, uses the processor 102' to effect a subsequent quanta of work. In yet another embodiment, the mobile computing device 9005 determines that a memory 122' of the hardware resource 9302 has a memory size larger than a memory size of a memory 122 of the mobile computing device 9005 and uses the memory 122' of the hardware resource 9302 to effect subsequent quanta of work.

In some embodiments, the mobile computing device 9005 uses a first operating system executing on the first central processing unit when not connected to the hardware resource and a second operating system executing on the second central processing unit when connected to the hardware resource. In one of these embodiments, the second operating system is different than the first operating system.

Referring now to FIG. 93B, another embodiment of the hardware resource 9302 and the mobile computing device 9005 is depicted. In brief overview, the mobile computing device 9005 connects to a docking station 9310 across a network 150, and in turn, docking station 9310 connects to a computing device 8910. In this embodiment, the hardware resource 9302 includes a docking station 9310 connected to or in communication with a computing device 8910. Instead of providing resources, such as a processor 102' and memory 122' as depicted in FIG. 93A, the docking station 9310 provides access to resources of a second computing device 8910 via the connection across network 150'. In one embodiment, after connection to the docking station 9310, the mobile computing device 9005 uses resources of the computing device 8910 via connections across networks 150 and 150'.

Referring now to FIG. 93C, another embodiment of the hardware resource 9302 and the mobile computing device 9005 is depicted. In brief overview, the mobile computing device 9005 connects to the computing device 8910 via docking mechanism 9310. In this embodiment, the hardware resource 9302 includes a computing device 8910 having a docketing mechanism 9310, such as an I/O device or mechanism 130, to dock the mobile computing device 9005. After connection via docking mechanism 9310, the mobile computing device 9005 uses the resources of the computing device 8910, such as a processor and/or memory. In some embodiments, the hardware resource 9302 provides access the mobile computing device 9005 with access to a peripheral computing device.

In any of the embodiments depicted in FIGS. 93A-93C, the hardware resource 9302 may provide resources and capabilities offering improved power, performance, or other operating or performance characteristics desired by the user of the mobile computing device 8905 or suitable for one or more applications of the mobile computing device, as described in more detail above in connection with FIGS. 89A-89B, 90A-90B, 91A-91B, and 92A-92B.

Referring now to FIG. 93D, a flow diagram depicts one embodiment of the steps taken in a method for providing to a mobile computing device one or more hardware resources. In brief overview, the mobile computing device uses a first central processing unit of the mobile computing device 9005 to effect an initial quanta of work (step 9355). The mobile computing device 9005 connects to a hardware resource 9302 including a second central processing unit (step 9360). The mobile computing device uses a second central processing unit of the hardware resource 9302 to effect subsequent quanta of work (step 9365).

A mobile computing device uses a first central processing unit to effect an initial quanta of work (step 9355). In one embodiment, the mobile computing device is a computer 100 as described above in connection with FIGS. 1A and 1B. In another embodiment, the mobile computing device is a mobile computing device 9005 as described above in connection with FIGS. 90A-92B.

The mobile computing device 9005 connects to a hardware resource 9302 including a central processing unit (step 9360). In one embodiment, the mobile computing device 9005 connects to the hardware resource 9302 by any suitable means and/or mechanisms. In some embodiments, the mobile computing device 8905 connects or docks to a docking station 9310 providing one or more resources. In one of these embodiments, the mobile computing device 9005 connects to a docking station 9310 having a processor 102' and/or memory 122'. In another of these embodiments, the mobile computing device 9005 connects to a docking station 9310 providing a connection to a second computing device 8910, the second computing device 8910 including a processor 102'. In still another of these embodiments, the mobile computing device 9005 connects or docks to a docking mechanism 9310 of a host computing device 8910.

In some embodiments, the mobile computing device 8905 and the docking station 9110 may connect via any type and form of connection, wired, wireless or otherwise, including, but not limited to, via a wireless connection, a Wi-Fi connection, a USB connection, a Firewire connection, a Bluetooth connection, a network connection, and a docking connection. The mobile computing device 8905 and docking station 9110 may communicate via any type and form of protocol, such as a device, bus, communication, application, data, or network protocol.

The mobile computing device 9005 uses a central processing unit of the hardware resource 9302 (step 9370). In one embodiment, the mobile computing device 9005 initiates use of a processor 102' and/or memory 122' of the hardware resource 9302 via a connection mechanism 9305. In another embodiment, the mobile computing device 9005 transfers execution control and management to the central processing unit of the hardware resource 9302. In still another embodiment, the mobile computing device 9005 transfers data and information to the processor and/or memory of the hardware resource 9302. In some embodiments, the mobile computing device 9005 uses the processor and/or memory of the hardware resource 9302 as a second processor and/or memory for the mobile computing device 9005.

In one embodiment, the mobile computing device 9005 connects to a hardware resource 9302 comprising one of the following: a first docking station having the second central processing unit; a second computing device having the second central processing unit; and a second docking station providing access to a third computing device having the second central processing unit.

In some embodiments, an application program on the mobile computing device 9005 executes in the processor 102' and uses memory 122' of the computing environment 9102 and displays on a visual display unit of the mobile computing device 9005. In other embodiments, an application program executing on the processor and using the memory of the hardware resource 9302 receives user input from an input device of the mobile computing device 9005. In still other embodiments, an application program executing on the processor and using the memory of the hardware resource 9302 displays on a display device 124 of the hardware resource 9302 while receiving input from an input mechanism of the mobile computing device 9005.

In one embodiment, an application program executing on the processor and using the memory of the hardware resource 9302 displays on a visual display unit of the mobile computing environment 9005 while receiving input from an input device of the hardware resource 9302, such as keyboard 126 and pointing device 127. In some embodiments, the computing environment of mobile computing device 9005 executes on the processor and memory of the mobile computing device 9005 but also uses a resource of the hardware resource 9302, such as a network connection, printer, display device, input device, or any I/O device 120.

In one embodiment, the mobile computing device 9005 determines that the second central processing unit has a processor speed greater than a processor speed of the first central processing unit and uses the second central processing unit of the hardware resource to effect subsequent quanta of work. In another embodiment, the mobile computing device 9005 determines that the second central processing unit has a processor architecture different than a processor architecture of the first central processing unit and uses the second central processing unit of the hardware resource to effect subsequent quanta of work. In still another embodiment, the mobile computing device 9005 identifies a memory of the mobile computing device 9005 and identifies a second memory of the hardware resource 9302. In yet another embodiment, the mobile computing device 9005 determines that the second memory of the hardware resource has a memory size larger than a memory size of the first memory of the mobile computing device and uses the second memory of the hardware resource to effect subsequent quanta of work.

In some embodiments, the hardware resource 9302 uses one or more resources of the mobile computing device 9005. In one of these embodiments, the hardware resource 9302 accesses a storage element or storage device of the mobile computing device 9005, such as the storage element 128. In some embodiments, the hardware resource 9302 mounts the storage element 128. In another of these embodiments, the hardware resource 9302 boots or reboots or otherwise establishes an environment based on a computing environment stored on the mounted storage element 128. In still another of these embodiments, the hardware resource 9302 uses the processor 102 and/or memory 122 of the mobile computing device 9005 in addition to the processor and/or memory of the hardware resource 9302.

In some embodiments, the hardware resource 9302 uses a display device and/or input device of the mobile computing device 9005. In other embodiments, the hardware resource 9302 executes a computing environment 8920' based on a portable computing environment 8920 in the storage element 128 of the mobile computing device 9005. In some embodiments, the portable computing environment 8920 may execute in the hardware resource 9302 but display on and receive input from the mobile computing device 9005.

In one embodiment, the hardware resource 9302 provides the mobile computing device 9005 with access to a peripheral computing device of the hardware resource. In another embodiment, the mobile computing device 9005 uses a first operating system executing on the first central processing unit on the mobile computing device 9005 when not connected to the hardware resource 9302 and a second operating system executing on the second central processing unit of the hardware resource 9302 when connected to the hardware resource 9302. In still another embodiment, the first operating system is different than the second operating system. In yet another embodiment, a virtual machine executing on the hardware resource 9302 provides the mobile device 9005 with access to a first operating system. In some embodiments, the hardware resource 9302 executes a virtual machine to provide access to a computing environment stored in the mobile computing device 9005. In other embodiments, the mobile computing device 9005 provides access to a computing environment on the hardware resource 9302. In still other embodiments, a user accesses, via the hardware resource 9302, a file stored in the mobile computing device 9005 when the mobile computing device 9005 is connected to the hardware resource 9302 and accessing, by the user, via the mobile computing device 9005, the file stored in the mobile computing device 9005 when the mobile computing device 9005 is not connected to the hardware resource 9302.

In one embodiment, the mobile computing device 9005 uses a processor of the hardware resource 9302 to provide access to a computing environment stored on the mobile computing device 9005. In another embodiment, the mobile computing device 9005 uses a processor of the hardware resource 9302 to provide access to an operating system stored on the mobile computing device 9005. In still another embodiment, the mobile computing device 9005 uses a processor of the hardware resource 9302 to provide access to an application program stored on the mobile computing device 9005. In yet another embodiment, the mobile computing device 9005 uses a processor of the hardware resource 9302 to execute a virtual machine on the hardware resource, responsive to a virtual machine image stored on the mobile computing device. In some embodiments, the mobile computing device uses a processor of the hardware resource 9302 to provide access to a computing environment stored on the hardware resource.

Figure 94A:
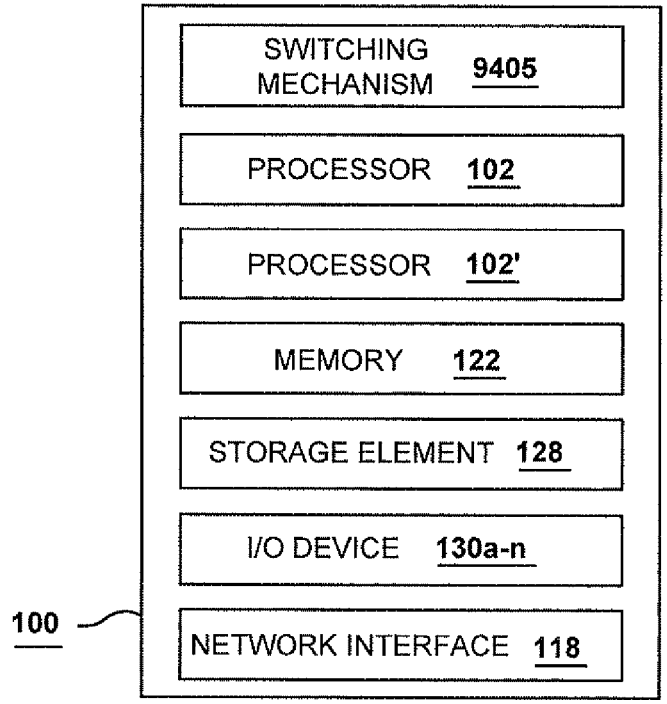
FIG. 94A is a block diagram depicting one embodiment of a mobile computing device having a plurality of processors.

Referring now to FIG. 94A, a block diagram depicts one embodiment of a mobile computing device having a plurality of processors. In brief overview, mobile computing device 9005 comprises a first processor 102 and a second processor 102'. The processors 102, 102' may access a memory 122 and/or storage element 128 on the mobile computing device 9005. The mobile computing device 9005 includes a switching mechanism 9405 for switching between using the first processor 102 and the second processor 102'. In some cases, the mobile computing device 9005 may have a lower-powered processor 102 for minimal functionality or standby operations, and have a higher-powered processor 102 for normal operations or for applications suitable or requiring more powerful processor capability. While mobile, the user may want to access features such as email, calendar, and contact information much like a PDA or smartphone. When accessing such applications, the mobile computing device 9005 may use the lower-powered processor 102 to lengthen battery-life and conserve power. The user may at any time want to access an application having higher processor requirements or suitability. When accessing these applications, the mobile computing device 9005 may use the higher-powered processor 102'.

In further detail, the processor 102 and processor 102' may be the same type and speed of processor. In other embodiments, the processor 102 and processor 102' may be a different type and speed of processor. In some embodiments, processor 102 comprises a processing speed and/or capability greater than processor 102'. In other embodiments, processor 102' comprises a processing speed and/or capability greater than the processor 102. In some embodiments, the processor 102 and 102' are single core processors. In other embodiments, the processor 102 and 102' are multiple core processors. In one embodiment, the processor 102 is a single core processor and processor 102' is a multiple core processor, such as dual or quad core processor. In yet another embodiment, the processors 102 and 102' comprise the same processor architecture and/or are manufactured by the same processor manufacturer. In other embodiments, the processors 102 and 102' comprise different processor architectures and/or are manufactured by different processor manufacturers.

In some embodiments, a first processor 102 comprises operational characteristics designed and constructed for lower power consumption, longer battery life, performance and/or applications of a mobile or portable computing device. In one of these embodiments, a first processor 102 may be referred to as a low-powered CPU. In other embodiments, a second processor 102' comprises operational characteristics designed and constructed for the power, performance and/or application requirements of a desktop computing environment, server computing environment, or otherwise a non-mobile computing environment. In one of these embodiments, the second processor 102' may be referred to as a high-powered CPU. In other embodiments, the processor 102 provides a first level of processing or processor capability, and the second processor 102' provides a second level of processing or processor capability. In one of these embodiments, the second level of capability is greater or higher than the first level. In another of these embodiments, the second level of capability is preferred over the first level. In still other embodiments, the mobile computing device uses the first processor for one or more applications suitable for the first level of power consumption and processing capability, and the mobile computing device uses the second processor for one or more applications suitable for the second level of power consumption and processing capability.

The switching mechanism 9405 enables the mobile computing device 9005 to switch between using a first processor 102 and a second processor 102', or any plurality of processors. In some embodiments, the switching mechanism 9405 comprises any type and form of integrated circuit, such as a Field Programmable Gate Array (FPGA), Programmable Logic Device (PLD), or Application Specific Integrated Circuit (ASIC) capable of performing any of the operations described herein. In some embodiments, the switching mechanism 9405 enables the system or mother board of the mobile computing device 9005 to use a first processor 102. In some embodiments, the switching mechanism 9405 enables the system or mother board of the mobile computing device 8905 to use a second processor 102'. In one embodiment, the switching mechanism 9405 communicates with any system or data bus of the mobile computing device 9005 to transmit and/or receive signals directing the mobile computing device 9005 to use a second processor 102' instead of a first processor 102, and likewise to use the first processor 102 instead of the second processor 102'. In some embodiments, the switching mechanism 9405 may interface and/or communicate with a system or data bus of the mobile computing device 9005 to transmit and/or receive signals to use both the first processor 102 and second processor 102' instead of just the first processor 102 or the second processor 102'.

In another embodiment, the switching mechanism 9405 transfers data and execution from processor 102 to processor 102' of the mobile computing device 9005. In some embodiments, the switching mechanism 9405 transfers central processing control and management from a first processor 102 to a second processor 102', or from the second processor 102' to the first processor 102. In one embodiment, the switching mechanism 9405 may have the mobile computing device 9005 reboot, restart or reset when switching between using a processor 102, 102'. In another embodiment, the switching mechanism 9405 may perform real-time switching from processor to processor.

In some embodiments, the switching mechanism 9405 identifies a condition, event or trigger upon which to switch between using one processor and another processor. In other embodiments, switching mechanism switches to one of the first processor or the second processor based on a user selection. In one of these embodiments, the switching mechanism 9405 comprises a user interface, such as a graphical user interface or a command line user interface, for a user to identify, specify or configure the conditions, events or triggers for performing switching between processors. For example, the switching mechanism 9405 may switch, automatically, manually or otherwise, between a first processor 102 and a second processor 102' based on any operational characteristics of the mobile computing device 9005 or the processors 102, 102'. In still other embodiments, the switch mechanism 9105 switches between use of a processor based on a level of load of the first processor or second processor. In yet other embodiments, the switch mechanism 9405 switches between use of a processor based on a level of activity, such as task, processes, applications, of the first processor 102 or second processor 102'. In some embodiments, the switch mechanism 9405 switches between using a first processor and a second processor based on a level of consumption of power and/or battery life. In still another embodiment, the switch mechanism 9405 switches between use of a processor based on a type of application actuated or executed on the mobile computing device 9005.

In another embodiment, the switching mechanism 9405 comprises a user interface for the user to switch between processors 102, 102'. For example, using a hot key, set of key strokes, or selecting an icon in a task bar, a user may instruct, command or direct the mobile computing device 9005 and/or switching mechanism 9405 to switch between processors, use one processor instead of another, or use the plurality of processors 102, 102' at the same time.

Figure 94B:
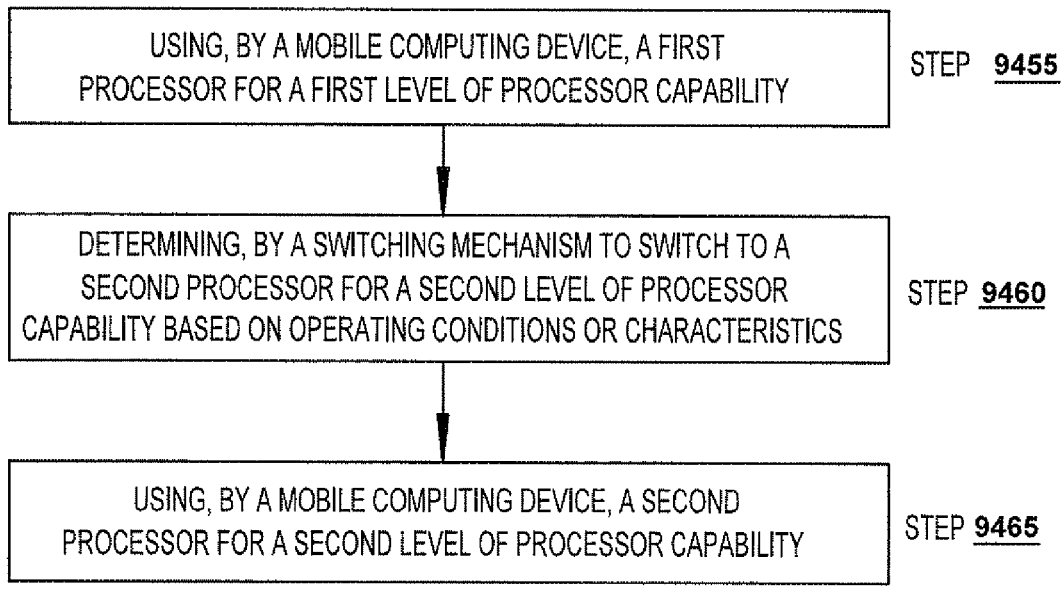
FIG. 94B is a flow diagram depicting one embodiment of the steps taken in a method for switching, by a mobile computing device, between use of multiple processors.

Referring now to FIG. 94B, a flow diagram depicts one embodiment of a method for switching, by a mobile computing device, between use of multiple processors. In brief overview, the mobile computing device uses a first processor designed and constructed to provide a first level of power consumption and processing capability (step 9455). The switching mechanism determines to switch the mobile computing device to using a second processor based on an operating characteristic of the mobile computing device, the second processor designed and constructed to provide a second level of power consumption and processing capability (step 9460). The mobile computing device 9005 uses the second processor responsive to the determination by the switching mechanism.

In further detail, the mobile computing device 9005 uses the first processor (step 9455). In one embodiment, the switching mechanism 9405 identifies the first processor 120 as the default processor for use by the mobile computing device 9005. In another embodiment, the mobile computing device 9005 uses the first processor 120 upon starting, restarting or booting of the operating system on the mobile computing device 9005. In some embodiments, a user selects the first processor 120 as the default processor. In one of these embodiments, the use may have identified the first processor 120 to the switching mechanism 9405.

The switching mechanism 9405 determines to switch the mobile computing device 9005 to using the second processor 120', based on an operating characteristic of the mobile computing device, the second processor designed and constructed to provide a second level of power consumption and processing capability (step 9460). In some embodiments, the switching mechanism 9405 determines to switch based on operating conditions or characteristics of the mobile computing device 9005, such as the operating system, resource usage, memory usage, power consumption, load, and numbers of processes, applications, services or tasks.

In one embodiment, the second level of power consumption and processing capability of the second processor comprises a level greater than the first level of power consumption and processing capability of the first processor. In another embodiment, the mobile computing device uses the first processor for one or more applications suitable for the first level of power consumption and processing capability, and uses the second processor for one or more applications suitable for the second level of power consumption and processing capability. In still another embodiment, the switching mechanism 9405 switches to one of the first processor or the second processor automatically based on the initiation of execution of an application.

In some embodiments, the switching mechanism 9405 switches to one of the first processor or the second processor automatically based on one or more of the following operating characteristics: a level of load of one of the first processor or the second processor, a level of activity of one of the first processor or the second processor, and a level of power consumption of one of the first processor or the second processor.

In one of these embodiments, the switching mechanism 9405 determines the load, activity or power consumption of the first processor 102 is near, equal or greater than the processing capability of the first processor 102. In another of these embodiments, the switching mechanism 9405 determines the processor requirements of an application executed by the user or requested by the user for execution is near, equal or greater than the processing capability of the first processor 102.

In other embodiments, the switching mechanism 9405 determines the mobile computing device 9005 would perform at a more suitable performance or operational level, or in a manner desired by the user if the mobile computing device 9005 was using the second level of processing capability of the second processor 120'. In still other embodiments, a user selects to switch to using the second processor 120'. In one of these embodiments, a user, via a user interface, directs or instructs the switching mechanism 9405 to switch the mobile computing device 9005 to use the second processor 120'.

The mobile computing device 9005 uses the second processor 120 (step 9465). In one embodiment, the mobile computing device 9005 uses the second processor 120' instead of the first processor 120. In another embodiment, the mobile computing device 9005 uses the second processor 120' in addition to the first processor 120. In some embodiments, the mobile computing device 9005 and/or switching mechanism 9405 transfers information, data, control and/or management to the second processor 120' to continue operation of the operating system, applications, process, services or tasks executing on the first processor 102. In other embodiments, new applications or processes initiated by the user are executed on the second processor 120'.

In some embodiments, the switching mechanism 9405 switches to having the mobile computing device 9005 use the first processor 120 for a first level of processing capability. As with step 9460, the switching mechanism 9405 determines to switch based on the operating conditions or characteristics of the device 9005, such as the operating system, resource usage, memory usage, power consumption, load, and numbers of processes, applications, services or tasks. For example, in one embodiment, the switching mechanism 9405 determines the load, activity or power consumption of the second processor 102' is greater than the processing capability needed for operating the mobile computing device 9005 in its current state. In another embodiment, the switching mechanism 9405 determines the processor requirements of an application executed by the user or requested by the user for execution is near, or equal to the processing capability of the first processor 102. In some embodiments, the switching mechanism 9405 determines the processor requirements of an application executed by the user or requested by the user for execution is less than the second level of processing capability of processor 120'. In other embodiments, the switching mechanism 9405 determines the mobile computing device 9005 would perform at a suitable performance or operational level, or in a manner desired by the user if the mobile computing device 9005 was using the first level of processing capability of the first processor 120. For example, the mobile computing device 9005 would perform in a suitable manner for the user using the first processor 102 but would also save on battery life or reduce power consumption. In yet another embodiment, a user selects to switch to using the first processor 120. For example, in one embodiment, the user via a user interface directs or instructs the switching mechanism 9405 to switch the mobile computing device 9005 to use the first processor 120. The method 9450 may be performed again to switch the mobile computing device 9005 to using the first processor at step 9455.

Referring still to FIG. 8, in some embodiments, the session management component 1300 uses a connection to transmit information associated with a monitor on the client machine 10 to the virtual machine service component. In one of these embodiments, multi-monitor geometry support is provided. In another of these embodiments, the session management component 1300 accesses multi-monitor information and enables the virtual machine service component to create a version of the multi-monitor information in the virtual machine.

In one embodiment, techniques are provided for virtualizing a display environment of a client by modifying and controlling the behavior and appearance of an application's window based on a desired display layout for the client. The techniques may be used for simulating or providing a multiple display setup for a single display environment. One embodiment provides a window processing mechanism to intercept a selected message to a window of an application and modify the message to the window to display the window on the client based on the desired display layout. The message to the window provides for the behavior or appearance of a window used or displayed by the application. In one embodiment, the window processing mechanism provides a hooking mechanism to an application's window procedure and replaces the original window procedure with a window procedure designed to intercept a selected window message and modify values of arguments or parameters of the intercepted window message based on the desired display layout of the client. As such, selected window messages are processed to provide or translate the behavior or appearance of the window to the desired display layout.

The techniques and mechanisms described may be practiced in a server-based computing environment, such as between a client machine 10 and a remote machine 30 communicating via a remote display protocol. A remote machine 30, or a virtual machine executing in a hypervisor on the remote machine 30, may be setup or configured for a single display environment while the client machine 10 may be setup or configured for one or more display devices. For example, a session on a machine, such as a session on a WINDOWS server operating system may only be able to be configured or setup for a single display. The server may obtain a preferred or desired display layout for the client, and store the display layout in association with the client, such as associating the display layout with a remote session for the client. The window message processing mechanism may be used by the server to intercept and modify selected messages to windows of the application running on the server on behalf of the client. The window messages are modified to provide a behavior or appearance of the window based on the display layout associated with the client. As such, the display output communicated by the server to the client includes display output to be displayed on the client according to the client's display layout rather than the display layout, e.g., single display layout, of the session on the server.

Using the techniques and mechanisms described herein allows a user to access a remotely available application in a server-based computing environment regardless of the monitor layout of the client. Instead of the server associating a single display with the remote session, the server will provide display output based on the client's display layout. Furthermore, remotely-provided application may maximize to the proper display from the perspective of the client. Also, menu items and other windows of an application may be displayed appropriately within an application, for example, without appearing disjoint from the application. Additionally, the issue of a window being rendered off-screen after changes to the display layout is handled by automatically moving the window to a viewable upon detection of an off-screen window.

Furthermore, these techniques and mechanisms may also be practiced in a local computing environment to virtualize, simulate, or otherwise provide a multiple monitor environment for a client having a single display device. Although the client may have a single display device, a desired display layout may be configured or provided to specify multiple displays. The window processing mechanism may be used to intercept and modify window messages for an application on the client to control the behavior or appearance of the window based on the desired display layout instead of the actual monitor layout. As such, a user may gain the functionality, benefits, and advantages of a multiple monitor environment without having multiple display devices.

Figure 15A:
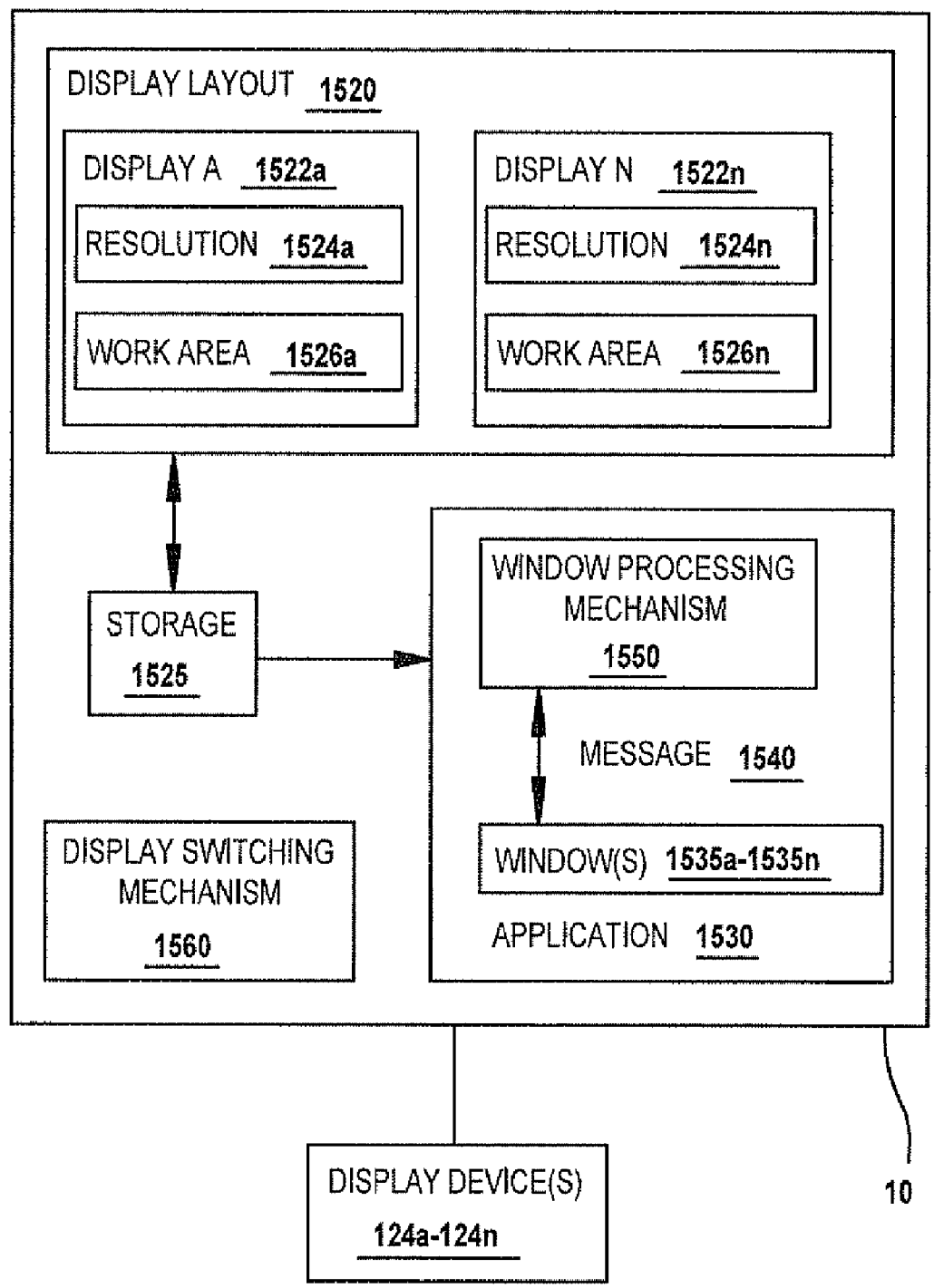
FIG. 15A is a block diagram depicting one embodiment of a client machine supporting multiple client machine display devices.

Referring now to FIG. 15A, one embodiment of an environment 1502 is depicted. In brief overview, a client machine 10, may be connected to or otherwise use a display device 124, in one embodiment, or multiple display devices 124a-124n, in another embodiment. The client machine 10 includes a display layout 1520 comprising a desired display configuration for the client machine 10, such as for display device 124. The client machine 10 includes a storage element 1525 for storing the display layout of the client machine 10. The client machine 10 also includes a window processing mechanism 1550.

In further detail, the display layout 1520 comprises any type and/or form of information or data to identify, specify, or describe a desired display layout configuration for the client. In one embodiment, the display layout 1520 may comprise a file or set of files in any format. In another embodiment, the display layout 1520 may comprise any information or data stored in any type and/or form of storage or memory element provided by the client machine 10. In an additional embodiment, the display layout 1520 may be provided or stored in any suitable type and/or form of database. In further embodiments, the display layout 1520 may be provided via any object, data structure, or application programming interface (API). The display layout 1520 may comprise any graphical, textual, or combination of graphical and textual elements. The display layout 1520 may be created, edited, configured, or otherwise provided by any suitable means and/or mechanisms, such as a graphical and/or text-based tool, program or application. In one embodiment, a graphical tool with a user interface may be used to design, create, edit and configure the display layout 1520.

The display layout 1520 may include attributes, properties, characteristics, values, settings, profiles, and other display configuration information 1522a-1522n to define each display for the client. The display layout 1520 may include display configuration 1522a-1522n for each of the desired displays, physical, virtual, or otherwise. In some embodiments, the display layout 1520 includes a description of the layout, location, position, organization, or arrangement for each display device 124a-124n. In one embodiment, the display layout 1520 includes a visual or graphical arrangement identifying the location and/or size of each monitor with respect to each other. In some embodiments, each display 1522a-1522n is identified by an identifier, such as a name or number. Also, the display configuration 1522a-1522n may include a monitor type, a screen refresh rate, adapter type, adapter information, screen resolution, a color quality, a color scheme, a font size, a background, a style for buttons and menus, and a screen saver.

Additionally, the display configuration 1522a-1522n may include information or data to identify or specify a resolution 1524a-1524n and/or a work area 1526a-1526n for each display, such as the display corresponding to a display device 124a-124n. In one embodiment, the resolution 1524a-1524n identifies the number of pixels, or individual points of color, contained on a display monitor, expressed in terms of the number of pixels on the horizontal axis and the number of pixels on the vertical axis. As those ordinarily skilled in the art will appreciate, the sharpness of the image displayed on the display device 124a-124n may depend on the resolution and the size of the display device 124a-124n. In another embodiment, the work area 1526a-1526n identifies the usable dimensions of the screen area of the display device 124a-124n in pixels. In some embodiments, the work area 1526a-1526n does not include the dimensions of the screen area not useable by the user, such as the portion of the screen area having a menu, tool, or task bar, such as the task bar on a desktop provided via a WINDOWS operating system.

In one embodiment, the display layout 1520 is configured to correspond to the number of display devices 124a-124n, and their available features and characteristics, accessible by the client. In other embodiments, the display layout 1520 does not match or correspond to the number of display devices 124a-124n connected to the client. For example, the client machine 10 may have a single display device 124a but the display layout 1520 may be configured for multiple display devices 124a-124n. In one aspect, the display layout 1520 may be configured for a display device 124a that is virtual, or a virtual display device. A virtual display device is rendered off the screen area of the physical display device 124a and may be placed on and off the visible screen area by any suitable mechanism and/or means, such as for example, tabbing between desktops, or panning and scrolling beyond the work area of the physical display device 124a. A virtual display device may comprise a resolution 1524a-1524n, a work area 1526a-1526n, and any other data or information in a display configuration 1522a-1522n as if it was a physical display device 1524a-1524n connected or to be connected to a client machine 10.

In some embodiments, the work area 1526a-1526n of the virtual display device is relative to and/or adjacent horizontally or vertically to the screen area of the physical display device 124a-124n. In other embodiments, the resolution 1524a-1524n of the virtual display device is the same resolution 1524a-1524n of the physical display device 124a, or one of the resolutions 1524a-1524n supported by the physical display device 124a. In some embodiments, a display 1522a corresponding to a physical display device 124a is not required to be configured as the top left monitor. In other embodiments, the display layout 1520 may comprise any arrangement of positive and/or negative coordinate systems, and any displays 1522a-1522n, or display devices 124a-124n, virtual or otherwise, may be configured to be located with any positive and/or negative coordinates, or in any portion of the positive and/or negative coordinate system.

The storage element 1525 illustrated in the client machine 10 of FIG. 15A may comprise any type and/or form of storage or memory, such as random-access memory, a disk drive, a disk array, a rewriteable optical drive, shared memory, a database, a file, an object, a data structure, or any other type and/or form of storage or memory element that allows the storing of and access to information or data, such as the display layout 1520. In one embodiment, storage element 1525 provides the display layout 1520 as a globally mapped data file, which may be accessible by any of the applications 1530 of the client machine 10. In some embodiments, the storage element 1525 stores the display layout 1520, or a portion of the display layout 1520. In other embodiments, the display layout 1520 may be converted, translated, transformed or otherwise altered to be stored in the storage element 1525. Although the storage element 1525 is illustrated on the client machine 10, another client machine 10 accessible to the client machine 10, such as a server, may have a storage element for storing the display layout 1520.

In some embodiments, the client machine 10 executes or otherwise provides one or more applications 1530. The application 1530 can be any type and/or form of software, program, or executable instructions such as any type and/or form of web browser, web-based client, client-server application, a thin-client computing client, an ActiveX control, or a Java applet, or any other type and/or form of executable instructions capable of executing on client machine 10. In some embodiments, the application 1530 provides one or more windows 1535a-1535n, also sometimes collectively referenced herein as 1535. In one embodiment, the window 1535a-1535n is a graphic, sometimes rectangular in shape, having either some kind of user interface or graphical or textual representation of the output of, and in some cases, allowing input for the application 1530. In another embodiment, the window 1535a-1535n comprises an area on the screen that displays information, including user documents as well as communications such as alert boxes and dialog boxes. Additionally, the user may open or close a window, move it around on the display, and sometimes change its size, scroll through it, and edit its contents.

In one embodiment, the user interface for the application 1530 is the window 1535a-1535n. In other embodiments, the application 1530 provides a top level window 1535a-1535n for the presentation and/or navigation structure or framework for the application 1530, and provides additional windows 1535a-1535n in response to input or other events. For example, the application 1530 may have a menu system and screen area for a user interface represented by a top level window 1535a, and based on user input, displays a secondary or smaller window 1535 to provide output to the user and/or receive input from the user regarding the application 1530.

The application 1530, and/or any windows 1535a-1535n of the application may receive a message 1540, such as a window message, as input. The message 1540 may be any type and/or form of communication via any type and/or form of medium. In some embodiments, the message 1540 comprises a communication to a window 1535a-1535n to control or direct the behavior, appearance, attributes, or properties of the window 1535a-1535n. In an exemplary embodiment of a WINDOWS-based environment, the application 1530 is event-driven, and waits for the operating system, or system, to pass input to them. The system passes all input for an application to the various windows 1535a-1535n in the application 1530. Each window 1535a-1535n has a function, called a window procedure, which the operating system calls in response to receiving input for the window. A window procedure is a function that receives and processes all messages sent to the window. A window class may have a window procedure, and every window created with that class uses that same window procedure to respond to messages. The window procedure processes the input and returns control to the system. The system passes input to a window procedure in the form of a message 1540, which may be generated by the operating system or other applications 1530. A message 1540 may be generated for an input event, for example, when the user types, moves the mouse, or clicks a control such as a scroll bar. A message 1540 may also be generated in response to changes in the operating system or computing device brought about by an application 1530. An application 1530 can generate messages to direct windows 1535a-1535n of the application 1530 to perform tasks or to communicate with windows 1535a-1535n in other applications.

In the exemplary embodiment of a WINDOWS-based system, a message 1540 is sent to a window procedure with parameters. In one embodiment, the message 1540 comprises a set of four parameters: a window handle, a message identifier, and two values referred to as message parameters. The window handle identifies the window for which the message is intended, and is used to determine which window procedure should receive the message. A message identifier identifies a purpose or function of the message 1540. When a window procedure receives a message, it uses the message identifier to determine how to process the message. For example, a message identifier WM_PAINT of a message 1540 may indicate to a window procedure that the window's 1535 client area has changed and must be repainted. The parameters of a message 1540 may specify data or the location of data used by a window procedure when processing a message 1540. The meaning and value of the parameters may depend on the message 1540. A message parameter can include an integer, a string, packed bit flags, a pointer to a structure containing additional data, or any type and/or form of data or information.

Although a message 1540 is generally described in the context of a WINDOWS-based environment, a message 1540 may be any type and/or form of communication in any type of operating system or environment, as one ordinarily skilled in the art would recognize and appreciate, to control or direct the appearance, behavior and attributes of a window 1540 being displayed or otherwise being used, processed, or provided by the application 1530. As such, the message 1540 may be in a form and have content suitable to the environment or operating system for which the operations described herein may be practiced.

Still referring to FIG. 15A, the window processing mechanism 1550, also referred to as a window message processing mechanism, provides the means and mechanism for changing, controlling or directing an appearance, behavior or attribute of the window 1535a-1535n of an application 1530 based on the desired display layout 1520 of the client 1505. The window processing mechanism 1550 may comprise an application programming interface (API), application, module, software component, library, service, process, task or any other form and/or type of executable instructions designed to and capable of executing or providing the functionality described herein. The window processing mechanism 1550 may comprise software, hardware, or any combination of software and hardware. In some embodiments, an application 1530 may be designed or constructed to include the functionality of the window processing mechanism 1550, while in some other embodiments, the window processing mechanism 1550 is designed and constructed to be used by existing applications 1530, for example, without changing the application 1530.

In one embodiment, the window processing mechanism 1550 comprises a mechanism for subclassing window procedures of a window 1535 of the application 1530, and providing a window procedure that gets called or used in place of the original window procedure of the window 1535.

In one embodiment, a hooking mechanism is used by the window processing mechanism 1550 to provide the replacement window procedure. In some embodiments, a hooking mechanism comprises using an application programming interface (API) to replace the executable instructions or code of a function, procedure, or API with a desired set of executable instructions or code. For example, the window processing mechanism 1550 may introduce a hooking mechanism for any API related to creating, establishing, or providing a window 1535, for example, the CreateWindowA, CreateWindowW, CreateWindowExA, and CreateWindowExW APIs of the WINDOWS operating system environment. In some embodiments, the window procedure is replaced via the Windows application programming interface (API) calls of GetWindowLong and SetWindowLong. In other embodiments, the replaced window procedure is stored in a list of any suitable type and/or form along with a window handle or reference to the replaced window procedure. As such, the window procedure used by the window processing mechanism 1550 may call the replaced window procedure. For example, the window processing mechanism 1550 may pass through a message 1540 to the original window procedure for processing.

The window procedure of the window processing mechanism 1550 may be constructed and designed to intercept all or a portion of the messages 1540 communicated to or received by the window 1535. In some embodiments, the window procedure intercepts all messages 1540 and any messages 1540 not to be modified are communicated to the original or replaced window procedure. In one embodiment of a Microsoft® Windows based environment, the window procedure of the window processing mechanism 1550 intercepts messages 1540 with a message identifier comprising one of the following: 1) WM_DISPLAYCHANGE, 2) WM_WINDOWPOSCHANGED, 3) WM_WINDOWPOSCHANGING, and 4) WM_GETMAXMININFO. A WM_DISPLAYCHANGE message 1540 communicates to a window 1535 a change in a resolution 1524 of a display 124. A WM_WINDOWPOSCHANGED message 1540 communicates to a window 1535 a change in a size, position, or a place in the Z order for the window 1540. A WM_WINDOWPOSCHANGING message 1540 is communicate to a window 1535 when a change in a size, position, or a place in the Z order for the window 1540 is about to occur. A WM_GETMAXMININFO message 1540 is communicated to a window 1535 when a size or position, or a window 1540 is about to change.

The window processing mechanism 1550 intercepts a message 1540 and modifies a return value or parameter of the message 1540 to correspond to or be based on the display layout 1520. In some embodiments, the window processing mechanism 1550 intercepts messages 1540 for a top-level window 1535, and in other embodiments, the window processing mechanism 1550 intercepts messages for windows 1535 that are not a top-level window. In further embodiments, the window processing mechanism 1550 intercepts messages 1540 for a certain set of windows 1540. For example, the window processing mechanism 1550 may be configured to intercept windows 1550 defined in a list, database, storage 1525, or any other type and/or form of configuration medium.

The message 1540 intercepted by the window processing mechanism 1550 may have return values, arguments, and/or parameters designed or targeted for the actual display layout of the client machine 10 or remote machine 30, but the window processing mechanism 1550 changes the return values, arguments and/or parameters to be designed or targeted for the display configuration 1522a-1522n provided by the desired display layout 1520. The window processing mechanism 1550 may read, access, acquire or otherwise obtain the display layout 1520 from the storage element 1525 by any suitable means and/or mechanism. The window processing mechanism 1550 may comprise any type of logic, functionality, business rules, or operations to obtain the values, arguments, and parameters of the message 1540 and analyze, compare or otherwise process the values, arguments, and parameters of the message 1540 in view of the display layout 1520, and determine any changes or modifications to the values, arguments or parameters or the message 1540 to display the window 1535 on a display identified by the display layout 1520. The window processing mechanism 1550 modifies the message 1540 according to the determined changes and communicates the message 1540 to the window 1535. In some embodiments, the window processing mechanism 1550 determines the message 1540 does not need to be modified and thus communicates the message 1540 in the same form as intercepted by the window processing mechanism 1550. In other embodiments, the window processing mechanism 1550 replaces the message 1540 with a second message.

Figure 15B:
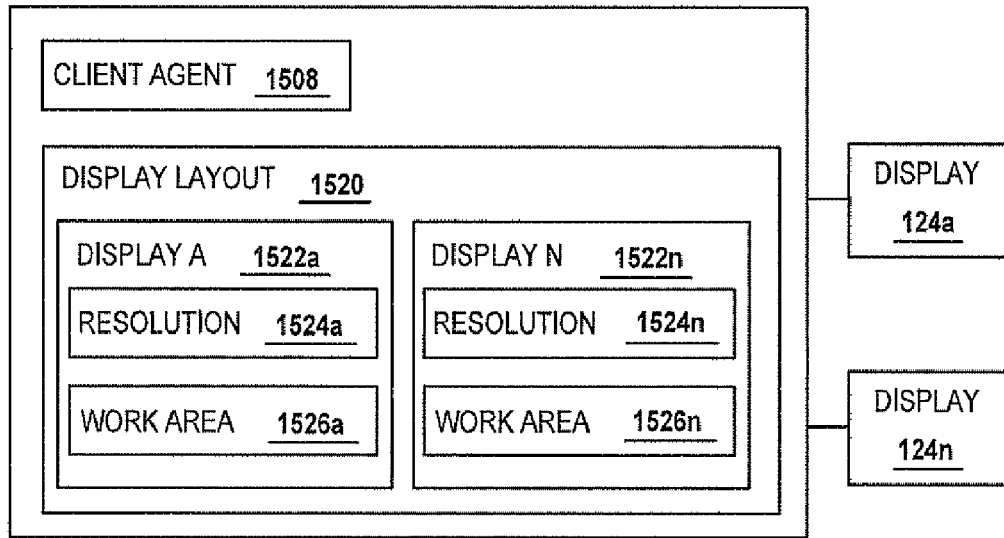
FIG. 15B is a block diagram depicting one embodiment of a system for supporting multiple client machine display devices

Referring now to FIG. 15B, another embodiment of a networked computer environment is shown in which the client machine 10 communicates with a remote machine 30 via one or more communication networks 150. The client machine 10 may be connected to or otherwise use one or more display devices 124a-124n. The client machine 10 includes a display layout 1520 comprising a desired display configuration for the client machine 10, such as for display devices 124a-124n. The client machine 10 may also include a client agent 1508. The remote machine 30 includes an application 1530 providing one or more windows 1535a-1535n, and a storage element 1525 for storing the display layout 1520 of the client machine 10. The remote machine 30 also includes a server agent 1528, a session login mechanism 1545, and a window processing mechanism 1550.

The environment 1500 may provide a server-based or thin-client computing environment for practicing the operations described herein. For example, the application 1530 may be an application executed on the remote machine 30 on behalf of the client machine 10. The display output from execution of the application 1530 may be communicated to the client machine 10 for display on the client, for example, via the client agent 1508. The display output may be communicated between the remote machine 30 and client machine 10 via a remote display protocol. The display output may be based on a window 1540 of the application 1530 running on the remote machine 30 but to be displayed on the client machine 10. As will be described in further detail below, the window processing mechanism 1550 on the remote machine 30 intercepts and modifies messages 1540 of the application 1530 running on the remote machine 30, communicates the message 1540 to the window 1535. As such, the display output communicated to the client machine 10 reflects the modified message 1540 processed by the window 1535.

In one embodiment, as shown in FIG. 15B, a client agent 1508 is included within the client machine 10. The client agent 1508 can be, for example, implemented as a software program and/or as a hardware device, such as, for example, an ASIC or an FPGA. An example of a client agent 1508 with a user interface is a Web Browser (e.g. Internet Explorer and/or Netscape™ Navigator browser). The client agent 1508 can use any type of protocol, such as a remote display protocol, and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Protocol (RDP) client agent from Microsoft Corporation of Redmond, Wash. In some embodiments, the client agent 1508 is configured to connect to the remote machine 30. In some embodiments (not shown), the client 1508 includes a plurality of client agents 1508, each of which may communicate with a remote machine 30, respectively.

Additionally, the remote machine 30 may comprise a server agent 1528 which may be capable of and configured to work in conjunction with the client agent 1508. For example, the server agent 1528 may be a server side component that accepts connections and requests from the client agent 1508. In another embodiment, the server agent 1528 may be capable of and configured to accept or establish remote access connections or sessions for the client machine 10. In one embodiment, the client agent 1508 and server agent 1528 may communicate using a protocol, such as http, ICA or RDP, over the network 1504. In some embodiments, the client agent 1508 and/or server agent 1528 are used to establish, re-establish, maintain, or otherwise provide a server-based computing or thin-client computing based connection or session. In another embodiment, the client agent 1508 and the server agent 1528 establish the start and end points of communications for a connection between the client machine 10 and the destination remote machine 30.

In some embodiments, the remote machine 30 includes a storage element 1525 for storing the display layout. In one embodiment, storage element 1525 provides the display layout 1520 as a globally mapped data file, which may be accessible by any of the applications 1530 of the remote machine 30. In some embodiments, the display layout 1520 is stored in the same form as provided to or received by the remote machine 30. Although the storage element 1525 is illustrated on the remote machine 30 in FIG. 15B, the client machine 10 may also include a storage element 1525', and in some embodiments, the client machine 10 stores the display layout 1520 in the client's storage element 1525', and/or to the remote machine's storage element 1525.

The remote machine 30 may also include a session login mechanism 1545, which may include any type and/or form of service, process, task or program, application, or executable instructions on the remote machine 30 to handle and process login or session requests. The session login mechanism 1545, or any portion thereof, may be provided via the operating system of the remote machine 30. In one embodiment, the session login mechanism 1545 includes the windows logon process, winlogon, a component of the Microsoft® Windows families of operating systems. As such, the session login mechanism 1545 may provide interactive logon support, and may include a Graphical Identification and Authentication dynamically linked library (DLL) referred to as the GINA, and any number of network providers. The session login mechanism 1545 may include any interfaces, such as an application programming interface (API) or dynamically linked libraries, i.e., a dll, to allow any resource, application, network or network provide gather obtain any identification and authentication information during a logon process.

The session login mechanism 1545 may perform an authentication process and password-updating operations for the operating system and/or for one or more resources, programs, applications, networks, or network providers. In one embodiment, the session login mechanism 1545 provides authentication services for the operating system, and in additional embodiments, also provides authentication services for access to applications 1530 to be executed on the remote machine 30 on behalf of the client machine 10, such as in a server-based or thin-client computing model. Additionally, the session login mechanism 1545 may monitor any mouse and/or keyboard activity related to logging on or secure access of the remote machine 30, or any resource, application, network, or network provider. In some embodiments, the session login mechanism 1545 may establish any initial services, processes, or tasks for a user or session on the remote machine 30.

The remote machine 30 may execute or otherwise provide one or more applications 1530. The application 1530 can be any type and/or form of software, program, or executable instructions such as any type and/or form of web browser, web-based client, client-server application, a thin-client computing client, an ActiveX control, or a Java applet, or any other type and/or form of executable instructions capable of executing on client machine 10 or communicating via a network 1504. The application 1530 can use any type of protocol and it can be, for example, an HTTP client, an FTP client, an Oscar client, or a Telnet client. In some embodiments, the application 1530 uses a remote display or presentation level protocol. In other embodiments, the application 1530 comprises any type of software related to Voice-Over-Internet Protocol (VoIP) communications, such as a soft IP telephone. In further embodiments, the application 1530 comprises any application related to real-time data communications, such as applications for streaming video and/or audio. In some embodiments, the application 1530 provides one or more windows 1535a-1535n, also sometimes collectively referenced herein as 1535.

In some embodiments, the remote machine 30 or a machine farm 38 may be running one or more applications 1530, such as an application 1530 providing a thin-client computing or remote display presentation application. In one embodiment, the remote machine 30 or machine farm executes as an application 1530, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application 1530 is an ICA client, developed by Citrix Systems, Inc. of Fort Lauderdale, Fla. In other embodiments, the application 1530 includes a Remote Desktop (RDP) client, developed by Microsoft Corporation of Redmond, Wash.

Additionally, the remote machine 30 may run an application 1530, which for example, may be an application server providing email services such as Microsoft Exchange manufactured by the Microsoft Corporation of Redmond, Wash., a web or Internet server, or a desktop sharing server, or a collaboration server. In some embodiments, any of the applications 1530 may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office LiveMeeting provided by Microsoft Corporation of Redmond, Wash.

Figure 15C:
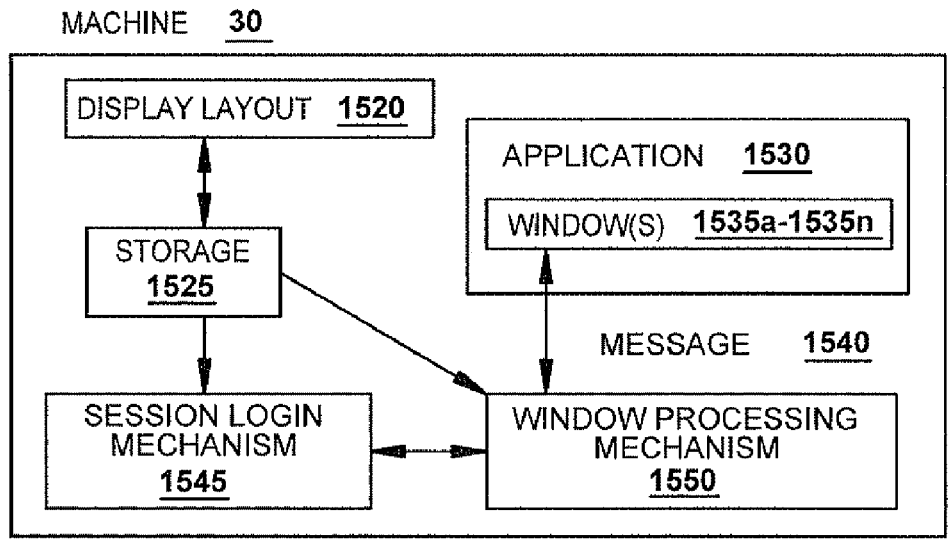
FIG. 15C is a block diagram depicting one embodiment of a session login mechanism providing support for multiple client machine display devices.

Although in FIG. 15A and FIG. 15B, the window processing mechanism 1550 is illustrated as included in the application 1530, the window processing mechanism 1550 may reside in any portion of the remote machine 30, the client machine 10, and/or external to the application 1530, for example, as illustrated in FIG. 15C. In one embodiment, the window processing mechanism 1550 comprises a service, process, or task that runs in a system context or with the system privileges of the operating system. In some embodiments, the windows processing mechanism 1550 may monitor messages 1540 communicated to windows 1535a-1535n of an application 1530, and intercept and modify the message 1540 to the windows 1535a-1535n. One ordinarily skilled in the art will recognize and appreciate that the windows processing mechanism 1550 may comprise any type and/or form of executable instructions capable of performing the operations described herein.

In another embodiment of illustrated in FIG. 15C, the session login mechanism 1545 may be used to provide for, or use, any of the functionality of the window processing mechanism 1550. In some embodiments, the session login mechanism 1545 may read, access, acquire or otherwise obtain the display layout 1520 from the storage element 1525. In other embodiments, the session login mechanism 1545 accesses, loads, or uses the functionality of the window processing mechanism 1550 via a dynamically loaded library, such as a library provided via a network provider to the winlogon process of a WINDOWS operating system. In other embodiments, the session login mechanism interfaces with or communicates to the window processing mechanism 1550 to provide the techniques described herein. In further embodiments, the session login mechanism 1545 may use the techniques described herein during reconnection, re-establishment, and/or re-authentication of a login or user session, such as a remote session in a server-based computing environment 1500.

In another aspect, techniques for virtualizing a display environment of a client machine 10 by controlling or directing the appearance, behavior and attributes of a window 1535 of an application 1530 based on the desired display layout 1520 for a client machine 10 are described. In view of the systems and structure of the environments 1500, 1501, and 1502 depicted in FIGS. 15A-15C, the operations, functionality, and techniques will be addressed by the methods depicted in FIGS. 3A-3D. FIG. 3A depicts a method 300 for practicing an embodiment using the window processing mechanism 1550. FIG. 3B depicts examples of window messages and processing used in conjunction with the method 300. FIG. 3C depicts a method 350 for practicing an embodiment when reconnecting, re-establishing or re-authenticating via the session login mechanism 1545. FIG. 3D depicts illustrative method 360 for changing the client's display layout 1520, for example, during execution of an application 1530.

Figure 16A:
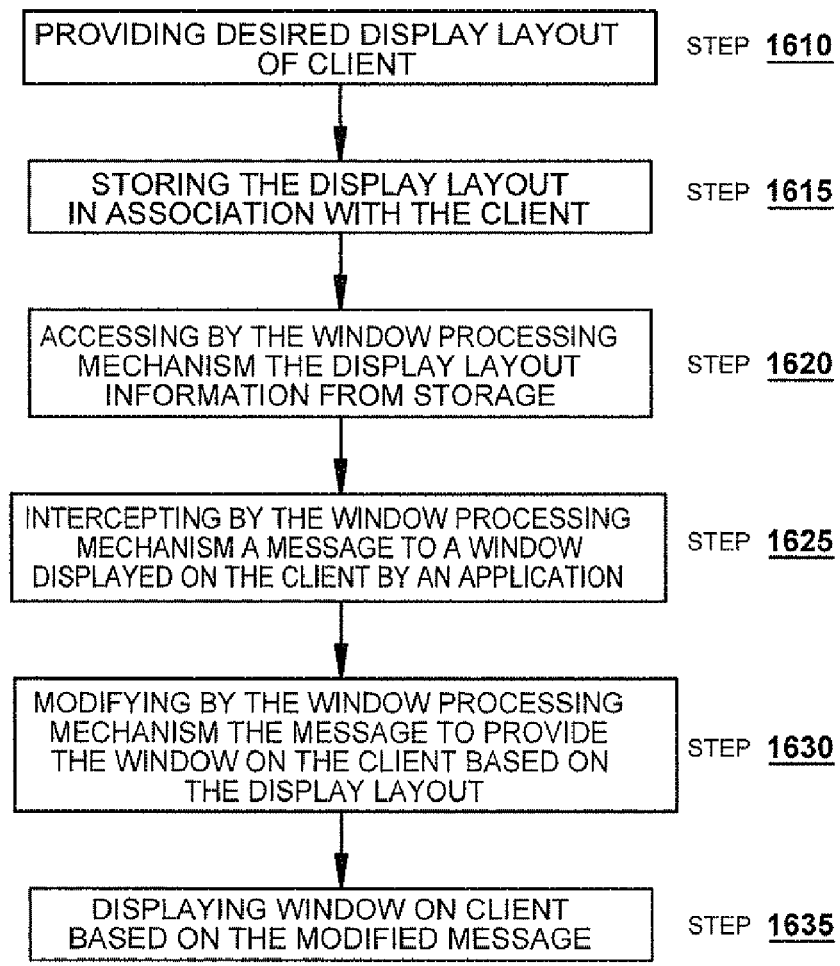
FIG. 16A is a flow diagram depicting one embodiment of the steps to be taken to provide a desired display layout to a client machine having multiple display devices.

Referring now to FIG. 16A, in brief overview, one embodiment of a method for providing a desired display layout 1520 of the client machine 10 is shown. At step 1610, and at step 1615, the display layout 1520 is stored in the storage element 1525, and the display layout 1520 is associated with the client 1505. At step 1620, the window processing mechanism 1550 accesses the display layout 1520 from the storage element 225 to obtain the desired display layout information for the client machine 10. At step 1625, the window processing mechanism 1550 intercepts messages 1540 to a window 1535 displayed on a client machine 10 by an application 1530. At step 1630, the window processing mechanism 1550 modifies the message 1540 to provide the window 1535 on the client machine 10 based on the desired display layout 1520 for the client machine 10. At step 1635, the window 1535 is displayed on the client machine 10 based on the modified message 1540. As such, the appearance and behavior of the window 235 is translated to and based on the display layout 1520.

In further detail, at step 1610 of the method, the desired display layout 120 for the client is provided. In one embodiment, the display layout 120 is communicated from the client machine 10 to the remote machine 30. For example, the client machine 10 establishes a connection or communication session with the remote machine 30. In some cases, the remote machine 30 requests the display layout 1520 from the client machine 10, and the client 1505 communicates the display layout 1520 in response to the request. In another embodiment, the display layout 1520 is communicated via the session login mechanism 1545 during a logon or authentication process, and in some embodiments, upon a re-logon or re-authentication process. In one embodiment, the display layout 1520 is stored in a database and queried by the client machine 10 or remote machine 30 to obtain the display layout 1520. In other embodiments, the display layout 1520 is downloaded, by either the client machine 10 or the remote machine 30 from a web server, a web-site, an application server, another remote machine 30' or via the Internet. In further embodiments, a user may configure the display layout 1520 with a program, application, or tool, and store the display layout 1520 on a client machine 10, remote machine 30, or another client machine 10.

At step 1615, the display layout 1520 is stored in the storage element 1525, and associated with the client machine 10. In some embodiments, the remote machine 30 receives the display layout 1520 from the client machine 10 and stores the display layout 1520 in the storage element 1525. In one embodiment, the remote machine 30 stores the display layout 1520 as a globally mapped data file on the remote machine 30 accessible by one or more applications 1530. In another embodiment the remote machine 30 stores the display layout 1520 to another client machine 10 accessible to the remote machine 30, such as via the network 1504. In some embodiments, the client machine 10 stores the display layout 1520 to a storage element 1525 on the remote machine 30, to a storage element 1525 on the client machine 10, or to a storage element 1525 accessible via the network 1504 or via the Internet.

The display layout 1520 may be stored to the storage element 1525 in any form suitable to the storage element 1525, and may be converted, transformed, altered, translated or otherwise processed for storage in the storage element 1525. For example, in one embodiment, the display layout 1520 may comprise data, such as a file, on the client machine 10 transmitted via network packets to the remote machine 30, and then translated into a globally mapped data file on the remote machine 30. In another embodiment, the display layout 1520 is stored into any type and/or form of database 1525, such as a relational database. In other embodiments, the display layout 1520 is stored in storage 1525 comprising memory. For example, the display layout 1520 may comprise or be represented by any type of object, data structure, or portion of memory on the client machine 10 and/or remote machine 30.

The display layout 1520 may be associated with the client machine 10 by any suitable means and/or mechanisms. In one embodiment, the name, or any portion thereof, of the globally mapped data file may identify the client machine 10. In another embodiment, any portion of content of the globally mapped data file may identify the client machine 10. In additional embodiments, the client machine 10 or remote machine 30 may use any type of object, data structure, process, or other elements in memory to associate the display layout 1520 with the client machine 10. In other embodiments, the client machine 10 or remote machine 30 may use portions of the storage element 1525 or other types of storage, such as another file, to associate the display layout 1520 with the client.

The window processing mechanism 1550, at step 1620 of illustrative method 300, accesses the display layout 1520 from the storage element 1525 to obtain the desired display layout information for the client machine 10. In one embodiment, the executable instructions of the window procedure used by the window processing mechanism 1550 comprises instructions to load, read, or otherwise acquire the display layout 1520. For example, the window processing mechanism 1550 may perform any type and/or forms of file input/output, i.e., file I/O, operations to read a globally mapped data file having the display layout 1520. In another embodiment, the instructions of the hooking application programming interface (API) for the window processing mechanism 1550 provides instructions for obtaining the display layout 1520. In another embodiment, the application 1530 reads or accesses the display layout 1520, for example, upon execution or start up. In some embodiments, the application 1530 may be executed during a session, such as a user or remote session. In one embodiment, the globally mapped data file 1525 may only be accessible by an application 1530 associated with or available via the remote session. In further embodiments, access to the globally mapped data file may have access locked by a mutex or semaphore, which is global for the remote session. One ordinarily skilled in the art will recognize and appreciate that any type and/or form of locking mechanism can be used to control access the storage element 1525, such as a globally mapped data file.

At step 1625, the window processing mechanism 1550 intercepts messages 1540 to a window 1535 displayed on a client machine 10 by an application 1530. In one embodiment, upon obtaining the display layout 1520 a hooking mechanism is introduced into the remote machine 30 or the application 1530 on the remote machine 30, which hooks one or more window creation application programming interfaces (APIs), such as for example, a create window type of API in a WINDOWS based environment. In some embodiments, the window processing mechanism 1550 intercepts all messages 1540 to windows 1535 of the application 1530. In other embodiments, the window processing mechanism 1550 intercepts messages 1540 of a certain message identifier or name. In one embodiment, the message 240 may have arguments, parameters or values that are used by the window processing mechanism 1550 to determine that the message 1540 should be intercepted. In additional embodiments, the window processing mechanism 1550 intercepts messages 1540 to some of the windows 1535 of the application 1530, and in further embodiments, only for a portion of the types of messages 240 communicated to these windows 1535. In yet another embodiment, the window processing mechanism 1550 is configurable, for example, by a user, to select the messages 1540, by name, type, or otherwise, to be intercepted.

In some embodiments, the window processing mechanism 1550 intercepts messages 1540 communicated to or intended for a top-level window 1535 of the application 1530. In other embodiments, the window processing mechanism 1550 may intercept any level of window 1535, or only certain levels of windows 1535 in a hierarchy of windows 1535. For example, the window processing mechanism 1550 may ignore any popup dialog windows of a second level window displayed on top of or in front of a top-level window 1535.

In one embodiment, the window processing mechanism 1550 may intercept a message 1540 but pass the message 1540 through or communicate the message 1540 to the original or replaced window procedure. In some embodiments, the window processing mechanism 1550 ignores certain messages 1540. In another embodiment, the window procedure of the window processing mechanism 1550 also includes the functionality and operations of the replaced window procedure. As such, the window processing mechanism 1550 may intercept a message 1540 and have either the replaced window procedure or the window procedure hooked into the application 1540 process the message 1540.

At step 1630, the window processing mechanism 1550 modifies the message 1540 to provide the window 1535 on the client machine 10 based on the desired display layout 1520 for the client machine 10. In some embodiments, the window processing mechanism 1550 examines, inspects, analyzes, or otherwise processes any values, arguments, or parameters of the message 1540 in comparison to the display layout 1520 for the client machine 10 displaying the application 1530. Based on the comparison, the window processing mechanism 1550 may modify, adjust, edit, change, alter, replace, translate or otherwise set or provide values, arguments, and/or parameters for the message 1540 that will provide the desired behavior, appearance and attributes of the window 235 as displayed or to be displayed by the application 1530 on the client machine 10 in accordance with the display layout 1520. For example, the values and/or parameters of the message 1540 may indicate a size, position, location, resolution or other attributes of the window 1535. These characteristics may be based on a display environment different than as specified in the display layout 1520. As such, in some embodiments, the window processing mechanism 1550 may modify the size, position, location, resolution or other attributes of the message 1540 for a display 1522a-1522n specified in the display layout 1520.

By way of further example, and referring now to FIG. 16B, the window processing mechanism 1550 may intercept and modify a message 1540 identified as one of the following: 1) WM_GETMAXMININFO, 2) WM_WINDOWPOSCHANGING, 3) WM_WINDOWPOSCHANGED, and 4) WM_DISPLAYCHANGE. At illustrative step 1630a, for a message 1540 intercepted and identified as a WM_GETMINMAXINFO, the window processing mechanism 1550 analyzes the position of the application 1530, i.e., a top-level window 1535, relative to the one or more displays 1522a-1522n of the display layout 1520, and determines which of the displays 1522a-1522n the application 1530 should be maximized to. The window processing mechanism 1550 modifies the message 1540 to provide values corresponding and translated to the resolution based on the desired display layout 1520. For example, a remote machine 30 may provide window resolution for a single monitor session, and the window processing mechanism 1550 translates the resolution to the multiple display environment provided via the display layout 1520. As such, this technique enables the application 1530 to maximize to a desired location in accordance with the display layout 1520, instead of the single monitor session.

At illustrative step 1630b, for a message 1540 intercepted and identified as WM_WINDOWPOSCHANGING, the window processing mechanism 1550 determines if the window 1535 is in the maximized state, and if so, the message 1540 is modified to set the window flag to a no move style of window, or otherwise to fix the location or position of the window 1535, or not allow the position of the window 1535 to change. As such, in the maximized state a user may not be able to move the window 1535. This technique enables the application 1530, or a window 1535 of the application 1530 to be maximized to a set or fixed location on a display 1522a-1522n specified by the display layout 1520. In some embodiments, either in response to the WM_WINDOWPOSCHANGING message 1540 or otherwise, the window processing mechanism 1550 determines the window 1535 is not in the maximized state, and modifies the message 1540 to remove the no move style, e.g., the window's position is no longer fixed, or to otherwise allow the position of the window 1535 to be moved.

At illustrative step 1630c, for a message 1540 intercepted and identified as WM_WINDOWPOSCHANGED, the window processing mechanism 1550 compares the position or location of the window 1535 to the display layout 1520 and if the window 1535 is to be rendered outside the screen or work area of display 1522a-1522n, then the position or location of the window 1535 is changed to be rendered in at least a portion of the screen or work area of the display 1522a-1522n. This technique enables the user not to lose the application 1530 or window 1535 of the application 1530 to an off-screen location.

At illustrative step 1630d, for a message 1540 intercepted and identified as WM_DISPLAYCHANGED, the window processing mechanism 1550 suspends passing of messages 1540 until a new or second display layout 1520 is obtained or provided for the client 1505. In one embodiment, the window processing mechanism 1550 suspends the processing of all messages 1540. In some embodiments, the window processing mechanism 1550 suspends messages 1540 that are intercepted and communicated to the replaced or original window procedure. In other embodiments, the window processing mechanism 1550 suspends messages for the replaced or original window procedure while continuing to process other messages 1540. This technique enables a client machine 10 to dynamically change the display layout 1520 at any time, for example, during the execution of an application 1530.

Although the techniques of are generally described above in relation to message, one ordinarily skilled in the art will recognize and appreciate that any message of any type and/or form may be used. Furthermore, the window processing mechanism 1550 may perform any logic, function, operations or rules based on the message 1540 and/or the display layout 1520, and even for the same type of message 1540, may perform a different operation or function for each instance of the message 1540 depending on changes to the display layout 1520 or any events, conditions or status of the environment 1500, 1501 or 1502.

Referring back to FIG. 16A, at step 1635 of method 300, the window 1535 is displayed on the client machine 10 based on the message 1540 processed via the window processing mechanism 1550. As such, when the window processing mechanism 1550 modifies the message 1540 based on the display layout 1520, the window 1535 is displayed on the client machine 10 according to the display layout 1520. In some embodiments, the window processing mechanism 250 does not modify the message 1540, and therefore, the window 1540 is displayed on the client machine 10 according to the unmodified message 1540. The technique as illustrated above enables, for example, in one embodiment of a server-based computing environment 1500, an application 1530 running on remote machine 30 to provide display output to the client machine 10 that controls and directs the behavior, appearance, and attributes of windows in the display output in any manner desired and specified by the display layout 1520, which may not correspond to the physical display layout of the client machine 10.

In another aspect, although techniques described herein are generally described with a window management system from WINDOWS operating system, one ordinarily skilled in the art will recognize and appreciate that techniques described herein may be practiced with any type and/or form of window manager or management system, such any type and/or form of X-windows managers, including any custom or open-source based window manager running on any type of operating system.

Referring now to FIG. 16C, these techniques may be practiced during the re-connection, re-establishment or re-authentication of any communication session or user session, for example a remote display session between the client machine 10 and the remote machine 30. In one embodiment, the session login mechanism 1545 as illustrated on the remote machine 30 of FIGS. 15A and 15B may include the window processing mechanism 1550, or any portion thereof. In brief overview of method 350, the session login mechanism 1545, at step 1652, accesses or obtains the display layout 1520 from the storage element 1525. At step 1654, there may be a disconnection and reconnection processed by the session login mechanism 1545. Upon re-establishing and/or re-authenticating the session, the session login mechanism, at step 1656, compares a location of a window 1535 to the client's display layout 1520, and at step 1658, modifies the window 235 to display on the client machine 10 based on the client's display layout 1520.

At illustrative step 1652, the session login mechanism 1545 obtains information on the display layout 1520 by any suitable means and/or mechanisms. For example, the window processing mechanism 1550 included in or used by the session login mechanism 1545 may have executable instructions, such as file I/O operations, to access a globally mapped data file 1525. In another embodiment, the session login mechanism 1545 may load dynamically linked libraries that load, read or otherwise access the storage element 225 having the display layout information. In one embodiment, as part of establishing or re-establishing the session, the session login mechanism 1545 may obtain the display layout 1520 from the client 1520. For example, the session login mechanism 1545 requests the display layout 1520 from the client machine 10 along with any identification or authentication credentials.

At illustrative step 1654, any type of disconnection or disruption to a session between the client machine 10 and remote machine 30 may occur, and any type of reconnection or re-establishment of the session may be facilitated via the session login mechanism 1545. In some cases, a user may cause a disconnection or disruption, temporary or otherwise, to a session between the client machine 10 and the remote machine 30 due to physical changes in the client's display environment or because the user moves to another client machine 10. In one case, the user moves from a first client machine 10a, such as a work computer, to a second client machine 10b, such as a home computer. The remote machine 30 may maintain the same user session between computing devices 100a-110b but the display layout 1520 may have changed. In another case, the user and/or the client machine 10 may traverse network segments or network access points that cause changes in the network address or host name, e.g., internet protocol (IP) address, of the client machine 10 or causes the client machine 10 to disconnect. The client machine 10 may reconnect, manually or automatically, to the network 1504, such as via the client agent 1508. As such, the session login mechanism 1545 may facilitate or be used to facilitate the reconnection.

At step 1656 of method 350, the session login mechanism 1545 compares the location or position of a window 1535 of an application 1530 in relation to the desired display layout 1520. In some embodiments, the session login mechanism 1545 intercepts a message 1540 to a window 1535, and examines, inspects or analyzes any portion of the message 1540, such as a value or parameter. In one embodiment, the session login mechanism 1545 queries, acquires or obtains the current location or position of one or more windows 1535 of the application 1530 via an application programming interface (API). In another embodiment, the session login mechanism 1545 requests from the application 1530, the location or position of any of the application's windows. The session login mechanism 1545 compares the location, position, size, and any other attributes of the window 1535 to any information in the display layout 1520.

At step 1658, the session login mechanism 1545 may modify the window 1535 based on the desired display layout 1520. From the comparison of the information about the window 1535 to the information of the display layout 1520, the session login mechanism 1545, in some embodiments, modifies the window 1535 to display on the client machine 10 via a display 1522a-1522n identified in the display layout 1520 in a desired manner. In one embodiment, via the functionality of the window processing mechanism 1550 embodied in or interfaced with the session login mechanism 1545, a message 1540 to a window 1535 may be intercepted and modified in accordance with the operations described herein. In another embodiment, the session login mechanism 1545 may modify one or more windows 1535 of the application 1530 via any application programming interface (API) to modify such windows 1535. The techniques depicted by method 350 enable client sessions to be disconnected and reconnected and have the display of windows be adjusted accordingly to any new or changed display environments of the client machine 10, new or changed display layouts 1520 of the client machine 10, or changes from one client machine 10*a* to another client machine 10*b*.

Figure 16D:
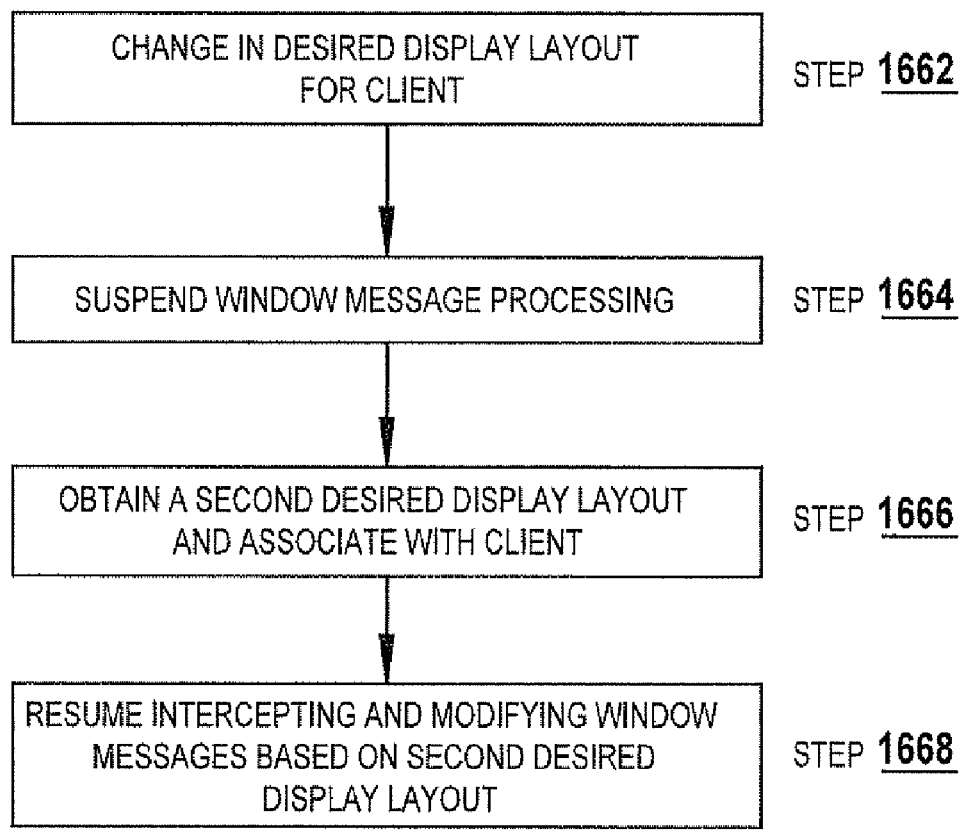
FIG. 16D is a flow diagram depicting one embodiment of the steps taken to change a desired display layout for a client machine.

In another aspect, dynamically changing a display layout 1520 for a client machine 10 is described. Referring now to FIG. 16D, the techniques described may be practiced for a change to a display layout 1520 that occurs during the execution of an application 1530. In brief overview of illustrative method 360, at step 1662, a client's display layout 1520 is changed. At step 1664, the window processing mechanism 350 suspends window message processing when the client's display layout 1520 is changed. At step 1666, an updated or a second display layout 1520' is obtained by the window processing mechanism 1550, and at step 1668, the window processing mechanism 1550 resumes intercepting and modifying messages 1540 to windows 1535 based on the second display layout 1520'.

In further detail, at step 1662, the display layout 1520 may be changed at any time and for any reason. In one embodiment, the display environment for the client machine 10 may change and the display layout 1520 may be updated to reflect the changed display environment. For example, another display device 124 may be connected to the client machine 10. In another embodiment, a user of the client machine 10 may be making adjustments, updating or otherwise changing the display layout 1520 to suit the user's desire for a behavior and appearance of applications 1530 and the display of windows 1535 of the application 1530 on the client machine 10. In yet a further embodiment, a first session may be on a first client machine 10 with a first display layout 1520, and the user switches to a second session or maintains the first session on a second client machine 10' with a second or updated display layout 1520'.

At step 1665, the method suspends intercepting and modifying messages 1540 for windows 1535 of an application 1530 upon notification of a change to the display layout 1520. In one embodiment, the window processing mechanism 1550 intercepts a message 1540, such as the WM_DISPLAYCHANGE message, indicating a change in any attribute or characteristic, for example, the resolution, of the display environment. In another embodiment, the client machine 10 communicates a notice to the remote machine 30, the window processing mechanism 1550 or the session login mechanism 1545 indicating a change has occurred or is about to occur to the display layout 1520. In yet another embodiment, the application 1530 may comprise a user interface mechanism for a user to indicate a change to the display environment, or to have the application 1530 suspend processing of window messages according to the display layout 1520.

The window processing mechanism 1550 may suspend the processing of messages 240 for all applications 230, a portion of applications 230, or for a portion of windows 235 of one, some, or all of the application 230. In one embodiment, the window processing mechanism 1550 queues any messages 240 received until the window processing mechanism 1550 obtains another display layout 1520. In another embodiment, the window processing mechanism 1550 only suspends processing of window messages to be modified according to the display layout 1520, and continues passing the messages 240 not to be modified to the original or replaced window procedure.

At step 1666 of the method, an updated or a second display layout 1520' is obtained to use for window message processing. The updated or second display layout 1520' may be provided by any suitable means and/or mechanisms. In one embodiment, the updated or second display layout 1520' is stored with the first display layout 1520 in the storage element 225. In another embodiment, the updated or second display layout 1520' is stored as an updated version of the first display layout 1520, and in further embodiments, the second display layout 1520' may replace the first display layout 1520 in the storage element 225. In one embodiment, the client machine 10 communicates the updated or second display layout 1520' to the remote machine 30 or stores the second display layout 1520' to the storage element 225 on the remote machine 30. In some embodiments, the client machine 10 via a reconnection or re-establishment to the remote machine 30 may provide an updated display layout 1520. In one embodiment, the client machine 10 communicates an unchanged display layout 1520 or a display layout 1520 to the remote machine 30 that the remote machine 30 already has stored in the storage element 225. In yet other embodiments, the remote machine 30 or client machine 10 may obtain the second display layout 1520' from another client machine 10 on the network 204, such as downloading the second display layout 1520' form a remote machine 30. As described above in connection with illustrative method 300, the window processing mechanism 350 may obtain the display layout 1520 from the storage element 225 by a variety of means and/or mechanisms.

At step 1668 of method 360, the window processing mechanism 1550 resumes intercepting and modifying messages 240 to windows 235 based on the second display layout 1520. In one embodiment, if the window processing mechanism 1550 queued any messages 240, the window processing mechanism 1550 analyzes and modifies the queued messages 240 based on the second display layout 1520'. Otherwise, the window processing mechanism 1550 uses the second display layout 1520' to modify any messages 240 intercepted after obtaining the second display layout 1520'. Using the techniques described herein, a client display environment and a client's display layout can be dynamically changed during the course of executing one or more applications, and the display of windows for the application appear and behave according to the changes to the display layout. For example, another display device may be added to the client, and an application may be minimized during a change in the display layout. When the display layout is updated, the user can maximize the application and have the application appear in the appropriate display even though the display environment changed when the application was minimized.

In view of the functions, structures, and operations described above, systems and methods are provided to control and direct the appearance, behavior and attributes of windows of an application in a flexible manner for virtualizing, simulating or providing a multiple display environment without restricting or limiting the client side display configuration. For example, the display layout of the client may not be limited to configure the physical monitor of the client as the primary display, i.e. as the top left most monitor in the display layout configuration. The systems and methods described may be practiced in a server-based or thin-client based computing environment, with clients having multiple display devices, or with clients having a single display device. Additionally, the configuration of a display layout that is not restricted or limited to the physical display environment of the client is provided. The display environment of the client may extend to include additional virtual displays, so if the client has two display devices, three or more displays may be virtualized or simulated for the client. A single display configuration for a single display device may be implemented while still changing the appearance and behavior of windows based on a desired or customized display layout. A client or user may gain the functionality, benefits, and advantages of a multiple display environment without having multiple display devices, or having all the display devices desired.

In one embodiment, multi-monitor support provides maximizing of windows to fill a single monitor rather than the full screen and centering of dialogs on a monitor rather than on a screen. In another embodiment the session management component, the virtual machine service component, and a multi-monitor hook component executing in a computing environment provided by a virtual machine together provide multi-monitor support in a virtual machine environment. In still another embodiment, a multi-monitor hook component and a component acquiring client geometry data provide multi-monitor support in a virtual machine environment.

In one embodiment, the session management component 1300 reads the monitor configuration for the client machine 10 from a multi-monitor hook file mapping. In some embodiments where a user of the client machine 10 establishes a connection to a presentation server executing on an execution machine in which the virtual machine provides access to a computing environment, the presentation server generates the multi-monitor hook file mapping upon establishment of the connection by the user.

In one embodiment, the session management component 1300 sends a message to the virtual machine service component containing the monitor layout for the user. In some embodiments, the message is sent when the session management component 1300 detects a user reconnection, so that the monitor layout remains synchronized with the client machine 10.

The virtual machine service component receives the monitor layout messages provided by the session management component 900. In some embodiments, the virtual machine service component creates a file mapping in the computing environment and updates the file to include monitor layout data.

In other embodiments, the virtual machine service component also creates a checksum for the data that is used by the multi-monitor hook component to ensure that it has correctly read the layout data. In one of these embodiments, a checksum is used rather than a locking scheme to synchronize access to the layout data. In this embodiment, the checksum does not cause any blocking between the processes reading the data. The layout data is updated infrequently and may be small in size, so the checksum calculation may complete quickly. In another of these embodiments, the reader processes save the checksum, read the data and recalculate the checksum. If the calculated checksum does not match the saved checksum it indicates that the data was updated while it was being read and the process is repeated. As the data is usually only updated when the user reconnects to another client and given the short time required to read the data, it is unlikely that a reader would have to reread the data more than once for a particular change. In some embodiments, the virtual machine service component uses a stored default display setting for the client machine 10, the stored default selected to ensure that the computing environment has valid display settings upon initialization of the session.

In some environments, a multi-monitor hook component executes in a computing environment provided by a virtual machine. In one of these embodiments, the multi-monitor hook component receives an event for each window created just before the window is created, including a window handle for the window being created. The multi-monitor hook component may identify a window type of the window and determine to hook window messages for the window. In some embodiments, windows having window types indicating that the window can be maximized or that the window is a dialog will be hooked. Hooked windows may be added to an array that contains the window handle and an original window procedure. In other embodiments, the multi-monitor hook component receives an event indicating that a window is about to be destroyed. In one of these embodiments, the multi-monitor hook component removes the entry in the hook array associated with the window.

In some embodiments, the multi-monitor hook component receives an identification of a window after the window is created and before the window is displayed. In one of these embodiments, the multi-monitor hook component checks the position of the dialog and if it spans multiple monitors, the multi-monitor hook component repositions the window to the centre of the monitor that contains most of the dialog, or the first monitor containing the dialog if the dialogs area is equally split between two monitors. In other embodiments, the multi-monitor hook component receives an event when a window is about to be maximized. The multi-monitor hook component ensures that when the window is maximized from the minimized state it will be positioned on the correct monitor.

In some embodiments, the multi-monitor hook component receives an event when a window is being maximized. The multi-monitor hook component checks the state of the window and, if the window is minimized, the multi-monitor hook component retrieves an identification of a monitor in which the window is minimized from the window hook array. If the window is not minimized, the multi-monitor hook component identifies the monitor that contains most of the window. If no monitor is found, or if the monitor does not exist (as after a reconnection) monitor 0 is used. The multi-monitor hook component then removes the origin and size of the monitor from its saved monitor information and updates the MINMAXINFO structure pointed to by the message. This causes the window to maximize to the specified monitor only.

In some embodiments, the virtual machine service component receives authentication information associated with a user of the client machine 10. In one of these embodiments, the virtual machine service component receives the authentication information from a protocol stack component receiving the credentials from the client machine 10. In another of these embodiments, the virtual machine service component receives authentication information from the session management component 1300. In still another of these embodiments, the virtual machine service component uses the received authentication information to authenticate the user of the client machine 10 to the computing environment provided by the virtual machine.

In one embodiment, when the communications channel is established and the initial session related information is passed to the virtual machine service component, the virtual machine service component automatically logs the user into the computing environment. In one embodiment, the virtual machine service component receives credentials from the session management component 1300. In another embodiment, the virtual machine service component receives credentials previously provided by the user. In some embodiments, the user provides credentials to the client machine 10 prior to requesting access to a resource. In one of these embodiments, the user provides credentials to a client agent, such as an ICA client. The virtual machine service component automatically reconfigures the display settings of the guest operating system to match those of the ICA client. The virtual machine produces graphics and sound output to the virtual devices that redirect that output to a client agent, such as an ICA client, on the requesting machine. The virtual machine receives audio input, mouse and keyboard device data redirected from the ICA client. When the virtual machine is shutdown or suspended the session management component 1300 cleans up and shuts down the ICA session.

The remote machines 30, 30', and 30" can belong to the same authentication domain. A domain may comprise a group of machines, such as application servers, execution machines, or client nodes under control of one security database. A domain can include one or more machine farms linked together to act as a single system to provide centralized administration. Conversely, a machine farm can include one or more domains. For servers of two different domains to belong to the same machine farm, a trust relationship may need to exist between the domains. A trust relationship is an association between the different domains that allows a user to access the resources associated with each domain with just one log-on authentication.

In one embodiment, the remote machine 30''' is in a different domain than the farm 38. In another embodiment, the remote machine 30''' is in the same domain as machines 30, 30', and 30". For either embodiment, machines 30, 30', and 30" can belong to one server farm, while the remote machine 30''' belongs to another machine farm, or all of the machines 30, 30', 30" and 30''' can belong to the same machine farm. When a new machine is connected to the network 150, the new machine either joins an existing machine farm or starts a new machine farm.

The machines 10 may be in a domain, or may be unconnected with any domain. In one embodiment, the client machine 10 is in the domain 38. In another embodiment, the client machine 10 is in another domain that does not include any of the machines 30, 30', 30" and 30'''. In another embodiment, the client machine 10 is not in any domain.

In one embodiment the client machine 10 is in the domain 38 and a user of the machine provides user credentials to log onto the client machine 10. User credentials typically include the name of the user of the machine, the password of the user, and the name of the domain in which the user is recognized. The user credentials can be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client node can be obtained and submitted for authentication.

From the user-provided credentials, the client machine 10 generates user authentication data. The client machine 10 transmits this user authentication data to the remote machine 30. In this embodiment, the user credentials are not transmitted over a network, only the resulting user authentication data is transmitted by the client machine 10.

The remote machine 30 may determine which resources hosted by the machine farm containing remote machine 30 are available for use by the user of the client machine 10. In one embodiment, the remote machine 30 consults user authentication data to make this determination. In another embodiment, the remote machine 30 consults information associated with a resource requested by the user to make the determination. The remote machine 30 transmits information representing the available resources to the client machine 10.

The user authentication performed by the remote machine 30 can suffice to authorize the use of each hosted resource presented to the client machine 10, although such resources may reside at another machine. Accordingly, in this embodiment, when the client machine 10 accesses or launches (i.e., initiates execution of) one of the hosted resources, additional input of user credentials by the user will be unnecessary to authenticate access to that resource. Thus, a single entry of the user credentials can serve to determine the available resources and to authorize the access or launching of such resources without an additional, manual log-on authentication process by the user.

Figure 17:
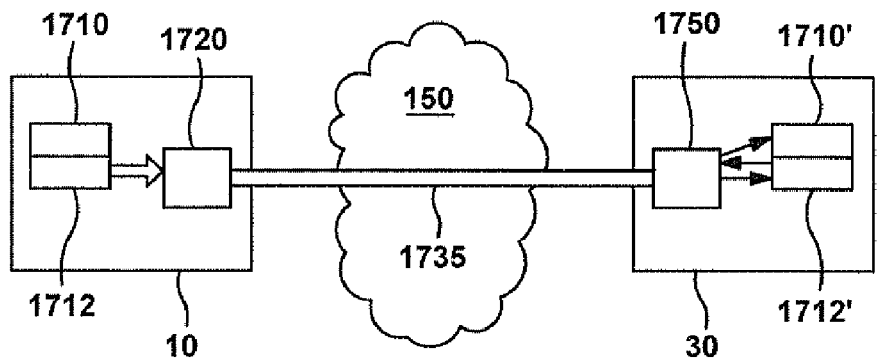
FIG. 17 is a block diagram depicting one embodiment of a system in which a remote machine authenticates the user of a client machine.

FIG. 17 depicts in more detail a system for remotely authenticating a client of a client machine 10 to a remote machine 30. As shown in FIG. 17, the client machine 10 includes an authentication module 1710 in communication with a thin-client program 1720. The authentication module 1710 receives user authentication credentials provided for the purposes of authenticating a user to the client machine 100, the remote machine 30, or both. Received authentication credentials can include username-password combinations, graphical password data, data derived from time-based tokens such as the SecurID line of tokens manufactured by RSA Security Inc. of Bedford, Mass., challenge-response data, information from smart cards, and biometric information such as fingerprints, voiceprints, or facial features. The authentication module 1710 may use the provided authentication credentials to authenticate the user to the machine 100. For example, in WINDOWS-based environments, the authentication module 1710 may be provided by the MSGINA dynamically-linked library. In other embodiments, for example, in Unix-based environments, the authentication module 1710 may be provided by the Unix Pluggable Authentication Manager, using the pam_krb module. In still other embodiments, the authentication module 1710 may be provided by the UNIX kinit command program.

In the embodiment shown in FIG. 17, the machine 100 also includes a security service 1712. In some embodiments, the authentication module 1710 and the security service 1712 are provided as the same dynamically-linked library. The security service 1712 provides security services to modules and applications on the machine 100, including the authentication module 1710 and the thin-client application 1720, such as authentication to the machine 100 and authentication to remote machines or network services. For example, the security service 1712, which may be the GSSAPI specified by the Internet Engineering Task Force (IETF) or the SSPI manufactured by Microsoft Corporation of Redmond, Wash., may obtain a Kerberos ticket in response to receipt of the user authentication credentials and use this ticket to obtain additional Kerberos tickets to authenticate the user to remote machines or network services, at the request of modules or applications on the machine 100. The security service 1712 may then generate user authentication data using these Kerberos tickets if needed for remote authentication. In one embodiment, the security service 1712 may generate the user authentication data using an external authentication service, such as a Key Distribution Center in a Kerberos environment or Active Directory in a Windows-based environment.

The security service 1712 provides the generated user authentication data, e.g., Kerberos ticket and associated Kerberos authenticator, to the thin-client application 1720. The thin-client application 1720 transmits the user authentication data to a remote machine 30 for remote authentication of the user. Thus, unlike existing single sign-on mechanisms for server-based computing, user-provided authentication credentials are not transmitted over the network 150 to a remote machine 30. The user authentication data generated by the security service 1712 is independent of the method used by the user to authenticate to the machine 100. Thus, for example, a Kerberos ticket for the user of machine 100 is obtained whether the user uses a username-password combination or a biometric to authenticate to the machine 100.

In the embodiment shown in FIG. 17, the thin-client application 1720 communicates with the remote machine 30 via a thin-client protocol having one or more virtual channels 1735. In these embodiments, the thin-client application 1720 loads a virtual channel driver and uses it to send and receive messages on the authentication virtual channel. In some embodiments, the virtual channel driver exposes functions for opening the virtual channel and sending data over it.

The thin-client application 1720 passes a data structure to the remote machine 30 for the virtual channel 1735 when the thin-client protocol connection is established, indicating to the server-side thin-client application 1750 that the authentication virtual channel is available. In one embodiment, the virtual channel data structure for the authentication virtual channel contains the virtual channel information and a representation of the size of the largest data packet the machine 100 can accept from or send to the remote machine 30 over the virtual channel 1735. The data packet size is constrained by the maximum thin-client size and any specific memory restrictions imposed by the client machine 10. In one particular embodiment, the data structure for the authentication virtual channel is defined as:

```
typedef struct__C2H
{
    VD__C2H        Header;
    UINT16         cbMaxDataSize;
} C2H, *PC2H;
```

The server-side thin-client application 1750 indicates to the thin-client application 1720 its intention to perform authentication using the authentication virtual channel 1735 by opening the virtual channel and sending a bind request message onto the channel. Once the virtual channel has been opened, the virtual channel driver in the thin-client application 1720, in one embodiment, reads a message requesting a binding from the virtual channel, sends a message onto the virtual channel responding to the bind request; and reads a "commit" message from the channel. In one embodiment, the message requesting a binding includes data specifying the protocol version that is supported. In other embodiments, the protocol version can be negotiated between the thin-client application 1720 and the server-side thin-client application 1750 using the bind request and bind response messages.

The bind request, bind response, and bind commit initialization messages allow the server-side thin-client application 1750 and the thin-client application 1720 to conduct a 3-way handshake initiated by the server-side thin-client application 1750, and negotiate capabilities. A 2-way handshake may be initiated by the server-side thin-client application 1750 when the current set of virtual channel capabilities can be negotiated using a 2-way handshake only, but a 3-way handshake is supported to allow more flexibility that might be required by new capabilities or future enhancements to current capabilities. For example, in a 3-way handshake, after receiving a "menu" of capabilities from the server-side thin-client application 1750, the thin-client application 1720 can exhibit a specific preference or could instead acknowledge a whole set of options pertaining to a specific capability thus letting the server-side thin-client application 1750 decide on a specific option. In a 2-way handshake to be initiated by the thin-client application 1720, the thin-client application 1720 could not exhibit a specific preference because it might not be supported by the host.

Following channel setup, the virtual channel driver of both the thin-client application 1720 and the server-side thin-client application 1750 does the following in a loop until a "stop" message or an "error" message is received: retrieve authentication data from the security service 1712, 1712', providing as input any authentication data sent by the other party via the virtual channel; and send the retrieved authentication data (if any) onto the virtual channel in a data message. If the retrieval of data from the security service 1712, 1712' returned a "STOP" message, then signal stop and close the authentication virtual channel. In some embodiments the virtual channel driver may reset itself on a "stop" signal. If the retrieval of data from the security service 1712, 1712' returned a "CONTINUE" message, then continue. If the retrieval of authentication data from the security service 1712, 1712' returned an "ERROR", then signal that an error has occurred and close the authentication virtual channel.

As long as "stop" or "error" are not signaled, the virtual channel driver of the thin-client application 1720 and the server-side thin-client application 1750 are free to exchange data messages until the security service 1712, 1712' stops producing data buffers to be sent. In some embodiments, the number of messages exchanged may be limited by the virtual channel driver, the server-side thin-client application 1750, or the virtual channel 1735. In other embodiments, the virtual channel driver of the thin-client application 1720 and the server-side thin-client application 1750 exchange messages sequentially, that is, two messages are not sent in one direction without a reply to the first being sent in the other. In either embodiment, message exchange can stop after a message has been sent in either direction.

In some particular embodiments, the data messages are sent over the virtual channel Least Significant Double Word (LSDW), Least Significant Word (LSW), Least Significant Byte (LSB) first. In other particular embodiments, the data messages are aligned at a byte boundary and fully packed in memory. In these embodiments, data fields will be aligned in memory as written to or read from the virtual channel.

Some messages transmitted on the authentication virtual channel span multiple virtual channel packets. To support this, every message must be preceded by a message specifying the length of the next transmitted command. An example of a message that may be used to specify the length of the next command is:

```
typedef struct__PKT__CMDLEN
{
    UINT32         Length;
    UINT8          Command;
    UINT8          FlagsBitMask;
} PKT__CMDLEN, *PPKT__CMDLEN;
```

In some of these embodiments, PKT_CMDLEN also contains a command number to indicate what type of message is to follow:

```
#define CMD__BIND__REQUEST     0x00
#define CMD__BIND__RESPONSE    0x01
```

-continued

| | |
|---|---|
| #define CMD_BIND_COMMIT | 0x02 |
| #define CMD_SSPI_DATA | 0x03 |

A PKT_CMDLEN packet containing Length=0 indicates that no more data will follow (i.e. a logical channel close).

The server-side thin-client application 1750 passes the authentication data it receives over the authentication virtual channel to its security service 1712'. If the server-side security service 1712' is able to verify the data, it generates an access token representing a logon session for the user, allowing the user to authenticate to the remote machine 30 without resubmitting authentication credentials. An access token is a data object that includes, among other things, a locally unique identifier (LUID) for the logon session. If the server-side security service 1712' is not able to verify the data, the user is prompted to resubmit authentication credentials.

In some embodiments, until the server-side security service 1712' authenticates the user, the only virtual channel over which the user may communicate with the remote machine 30 is the authentication virtual channel. In some of these embodiments, after authentication, new virtual channels are initiated for communication. In other embodiments, only one virtual channel exists and it may only be used for authentication-related communications until the user is authenticated, and it may be used for other communications after the user is authenticated.

For embodiments in which the remote machine 30 operates under control of a MICROSOFT WINDOWS operating system, the access token generated by the server-side security service 1712' is an impersonation token that has only network logon rights. That is, the generated access token is not suitable to use for starting applications to run interactively, as is required in the WINDOWS server-based computing environment. To allow applications to run interactively, a primary access token is needed that has interactive logon rights. In one embodiment, the generated access token is modified to provide the appropriate rights. In another embodiment, a new token is generated for the user.

For embodiments in which the server-side computing device 140 operates under control of a Unix-based operating system, if the server-side security service 1712' verifies the authentication data it receives over the authentication virtual channel from the server-side thin-client application 1750, the server-side thin-client application 1750 will grant the user access to the resources. In these embodiments, the server-side security service 1712' does not generate an access token.

In some embodiments, after the remote machine 30 has authenticated the user, the remote machine 30 presents an enumeration of resources available to the user. In these embodiments, the remote machine 30 may create a page describing a display of resources, hosted by a plurality of machines, available to the machine 100. The remote machine 30 may then transmit the created page to the machine 100 for display and receive from the machine 100, a request to access one of the hosted resources.

In some of these embodiments, the selected one of the available resources hosted by one of the plurality of machines is then executed without requiring further receipt of user authentication data from the machine 100. In some of these embodiments, the remote machine 30 initiates, in response to successful authentication by the user, a connection from the remote machine 30 to a second remote machine 30' which is hosting a resource available to the user. In these embodiments, the available resource is executed over the connection. In some embodiments, the connection is a virtual channel.

In other embodiments, the first remote machine 30 is hosting the selected one of the available resources. In some of these embodiments, the remote machine 30 makes the resource available to the user over the existing connection. In others of these embodiments, the remote machine 30 makes the resource available to the user over a new connection. In some of those embodiments, the new connection comprises a virtual channel.

In some embodiments, a plurality of components are provided for authenticating a user of the client machine 10 to a virtual machine on a remote machine 30. In one of these embodiments, functionality is provided for a Kerberos-based Single Sign-On process between the client machine 10 and a guest operating system provided by the virtual machine.

In some embodiments, a user seeking to access a resource provided by a virtual machine provides authentication credentials multiple times to different entities. In one of these embodiments, the user is authenticated by a client agent on the client machine 10, by a remote machine 30, and by a computing environment provided by a virtual machine in the remote machine 30. In some of these embodiments, single sign-on support would enable authentication of the user to different entities with only one transmission of authentication credentials from the user.

Authentication of the user to the client machine and the remote machine 30 may be accomplished as described above in connection with FIG. 17. In some embodiments, an authentication component, a GINA (Graphical Identification and Authentication) component, an authentication module in the session management component and an authentication module for the virtual machine service component are provided. In one embodiment, a bi-directional virtual channel enables communication between a service management component on the remote machine 30 and a virtual machine service component executing in the guest operating system. In one embodiment, the remote machine 30 includes client-side single sign-on functionality and the virtual machine includes server-side single sign-on functionality. In still another embodiment, the service management component implements an authentication module and communicates with an authentication module in the virtual machine service component to authenticate the user.

In one embodiment, the session management component creates a Kerberos SSPI channel between itself and the virtual machine service component. When the channel is established the session management component acquires the credentials of the user and initializes a security context using this data. The initialization data returned is sent to the virtual machine service component which accepts the data and starts an exchange of SSPI messages between the two components until the security context is established in the virtual machine service component. This context is then used to log the user on to the virtual machine using a single sign-on GINA component.

In some embodiments, the session management component authenticates the user to a host operating system on the remote machine 30. In one of these embodiments, the host operating system then authenticates the user to the virtual machine. In other embodiments, the session management component authenticates the user to a hypervisor. In one of these embodiments, the hypervisor then authenticates the user to the virtual machine. In still other embodiments, the session management component authenticates the user to a virtual machine providing management functionality for the virtual machine to which the user seeks access.

Referring back to FIG. 8, a remote machine 30 may determine to provide access to a resource streaming service capable of transmitting a requested resource to the client machine (step 816). In some embodiments, the remote machine 30 determines to implement a resource streaming service to transmit to the client machine 10 or to a remote machine 30' a requested resource. In other embodiments, the remote machine 30 determines to use a resource streaming service to stream the resource to a computing environment provided by a virtual machine. In still other embodiments, the resource is a computing environment and the remote machine 30 determines to use a resource streaming technique to stream the computing environment to a virtual machine. In some embodiments, the plurality of resource files resides on the remote machine 30'. In other embodiments, the plurality of resource files resides on a separate file server or remote machine 30". In still other embodiments, the plurality of resource files may be transmitted to a client machine 10. In yet other embodiments, a file in the plurality of resource files may be executed prior to transmission of a second file in the plurality of resource files to the client machine 10.

In some embodiments, the remote machine 30 retrieves information about the enumerated resource from a remote machine 30'. In one of these embodiments, the remote machine 30 receives an identification of a remote machine 30" hosting a plurality of resource files. In another of these embodiments, the remote machine 30 receives identification of a location of a plurality of resource files, the identification conforming to a Universal Naming Convention (UNC). In still another of these embodiments, the identification includes a network location and a socket for a resource streaming protocol.

In one embodiment, the remote machine 30 retrieves a file containing information about the enumerated resource. The file may include an identification of a location of a remote machine 30' hosting the enumerated resource. The file may include an identification of a plurality of versions of the enumerated resource. The file may include an enumeration of a plurality of resource files comprising the enumerated resource. The file may include an identification of a compressed file comprising a plurality of resources files comprising the enumerated resource. The file may include an identification of pre-requisites to be satisfied by a machine executing the enumerated resource. The file may include an enumeration of data files associated with the enumerated resource. The file may include an enumeration of scripts to be executed on a machine executing the enumerated resource. The file may include an enumeration of registry data associated with the enumerated resource. The file may include an enumeration of rules for use in an embodiment where the enumerated resource executes within an isolation environment. In one embodiment, the file may be referred to as a "manifest" file. The information that the file may contain is described in further detail below.

The stream of data packets may include resource files comprising the enumerated resource. In some embodiments, resource files include data files associated with an resource. In other embodiments, resource files include executable files required for execution of the resource. In still other embodiments, the resource files include metadata including information about the files, such as location, compatibility requirements, configuration data, registry data, identification of execution scripts rules for use in isolation environments, or authorization requirements.

In some embodiments, the streamed resource executes prior to the transmission of each resource file in a plurality of resource files comprising the streamed resource. In one of these embodiments, execution of the streamed resource begins upon receipt by a client machine 10 of one resource file in the plurality of resources. In another of these embodiments, execution of the streamed resource begins upon receipt by a client machine 10 of an executable resource file in the plurality of resource files. In still another of these embodiments, the client machine 10 executes a first received resource file in a plurality of resource files and the first received resource file requests access to a second resource file in the plurality of resource files.

In one embodiment, the streamed resource executes on the client machine 10 without permanently residing on the client machine 10. In this embodiment, the streamed resource may execute on the client machine 10 and be removed from the client machine 10 upon termination of the streamed resource. In another embodiment, the streamed resource executes on the client machine 10 after a pre-deployed copy of each resource file is stored on the client machine 10. In still another embodiment, the streamed resource executes on the client machine 10 after a copy of each resource file is stored in an isolation environment on the client machine 10. In yet another embodiment, the streamed resource executes on the client machine 10 after a copy of each resource file is stored in a cache on the client machine 10.

In some embodiments, the remote machine 30 streams the enumerated resource to the remote machine 30, executes the enumerated resource on the remote machine 30, and provides to the client machine 10 resource-output data generated by the execution of the enumerated resource. In other embodiments, a resource is streamed to a virtual machine and resource output data is transmitted to a client machine 10 using a presentation layer protocol such as X11, VNC, ICA or RDP.

In one embodiment, the remote machine 30 receives a plurality of resource files comprising the enumerated resource. In another embodiment, the remote machine 30 provides the resource-output data via a presentation level protocol, such as an ICA presentation level protocol or a Remote Desktop Windows presentation level protocol or an X-Windows presentation level protocol.

In some embodiments, the remote machine 30 also provides access information associated with the enumerated resource, the access information generated responsive to the selected method. In one of these embodiments, the access information provides an indication to the client machine 10 of the selected method for execution of the enumerated resource. In another of these embodiments, the access information includes an identification of a location of the enumerated resource, the identification conforming to a Universal Naming Convention (UNC). In still another of these embodiments, the access information includes an identification of a session management server.

In some embodiments, the access information includes a launch ticket comprising authentication information. In one of these embodiments, the client machine 10 may use the launch ticket to authenticate the access information received from the remote machine 30. In another of these embodiments, the client machine 10 may use the launch ticket to authenticate itself to a second remote machine 30 hosting the enumerated resource. In still another of these embodiments, the remote machine 30 includes the launch ticket in the access information responsive to a request from the client machine 10 for the launch ticket.

Figure 18:
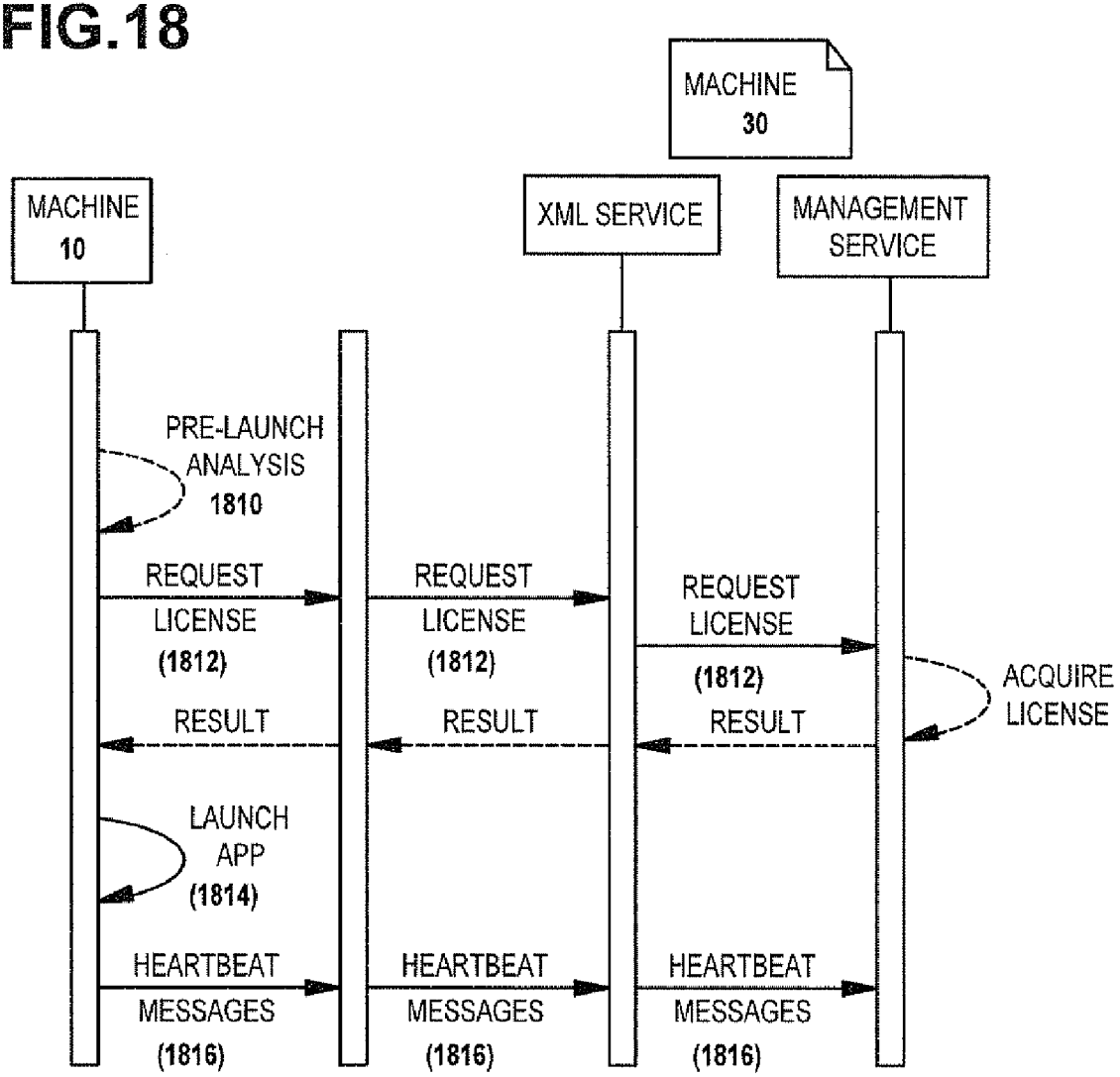
FIG. 18 is a flow diagram depicting one embodiment of the steps taken to access a plurality of files comprising an application program.

Referring now to FIG. 18, flow diagram depicts one embodiment of the steps taken to access a plurality of files comprising a resource, such as a computing environment or an application program. A client machine 10 performs a pre-launch analysis (step 1810). In one embodiment, the client machine 10 performs the pre-launch analysis prior to retrieving and executing a plurality of resource files comprising a resource. In another embodiment, the client machine 10 performs the pre-launch analysis responsive to a received indication that the pre-launch analysis is a requirement for authorization to access the plurality of resource files comprising a resource.

In some embodiments, the client machine 10 receives, from a remote machine 30, access information associated with the plurality of resource files. In one of these embodiments, the access information includes an identification of a location of a remote machine 30' hosting the plurality of resource files. In another of these embodiments, the client machine 10 receives an identification of a plurality of resources comprising one or more versions of the resource. In still another of these embodiments, the client machine 10 receives an identification of a plurality of resource files comprising one or more resources. In other embodiments, the client machine 10 receives an enumeration of resources available to the client machine 10 for retrieval and execution. In one of these embodiments, the enumeration results from an evaluation of the client machine 10. In still other embodiments, the client machine 10 retrieves at least one characteristic responsive to the retrieved identification of the plurality of resource files comprising a resource.

In some embodiments, the access information includes a launch ticket capable of authorizing the client machine 10 to access the plurality of resource files. In one of these embodiments, the launch ticket is provided to the client machine 10 responsive to an evaluation of the client machine 10. In another of these embodiments, the launch ticket is provided to the client machine 10 subsequent to a pre-launch analysis of the client machine 10 by the client machine 10.

In other embodiments, the client machine 10 retrieves at least one characteristic required for execution of the plurality of resource files. In one of these embodiments, the access information includes the at least one characteristic. In another of these embodiments, the access information indicates a location of a file for retrieval by the client machine 10, the file enumerating the at least one characteristic. In still another of these embodiments, the file enumerating the at least one characteristic further comprises an enumeration of the plurality of resource files and an identification of a remote machine 30 hosting the plurality of resource files.

The client machine 10 determines the existence of the at least one characteristic on the client machine 10. In one embodiment, the client machine 10 makes this determination as part of the pre-launch analysis. In another embodiment, the client machine 10 determines whether the client machine 10 has the at least one characteristic.

In one embodiment, determining the existence of the at least one characteristic on the client machine 10 includes determining whether a device driver is installed on the client machine 10. In another embodiment, determining the existence of the at least one characteristic on the client machine 10 includes determining whether an operating system is installed on the client machine 10. In still another embodiment, determining the existence of the at least one characteristic on the client machine 10 includes determining whether a particular operating system is installed on the client machine 10. In yet another embodiment, determining the existence of the at least one characteristic on the client machine 10 includes determining whether a particular revision level of an operating system is installed on the client machine 10. For embodiments in which a remote machine 30 acts as a client machine 10 (such as, for example, a terminal services session in which the remote machine executes computing resources on behalf of a user of a client machine), determining the existence of at least on characteristic may include determining whether the remote machine 30 executes a hypervisor or, alternatively, whether the remote machine executes a hypervisor which itself executes in the native operating system.

In some embodiments, determining the existence of the at least one characteristic on the client machine 10 includes determining whether the client machine 10 has acquired authorization to execute an enumerated resource. In one of these embodiments, a determination is made by the client machine 10 as to whether the client machine 10 has received a license to execute the enumerated resource. In another of these embodiments, a determination is made by the client machine 10 as to whether the client machine 10 has received a license to receive across a resource streaming session a plurality of resource files comprising the enumerated resource. In other embodiments, determining the existence of the at least one characteristic on the client machine 10 includes determining whether the client machine 10 has sufficient bandwidth available to retrieve and execute an enumerated resource.

In some embodiments, determining the existence of the at least one characteristic on the client machine 10 includes execution of a script on the client machine 10. In other embodiments, determining the existence of the at least one characteristic on the client machine 10 includes installation of software on the client machine 10. In still other embodiments, determining the existence of the at least one characteristic on the client machine 10 includes modification of a registry on the client machine 10. In yet other embodiments, determining the existence of the at least one characteristic on the client machine 10 includes transmission of a collection agent 704 to the client machine 10 for execution on the client machine 10 to gather credentials associated with the client machine 10.

The client machine 10 requests, from a remote machine 30, authorization for execution of the plurality of resource files, the request including a launch ticket (step 1812). In some embodiments, the client machine 10 makes the request responsive to a determination that at least one characteristic exists on the client machine 10. In one of these embodiments, the client machine 10 determines that a plurality of characteristics exist on the client machine 10, the plurality of characteristics associated with an enumerated resource and received responsive to a request to execute the enumerated resource. In another of these embodiments, whether the client machine 10 receives an indication that authorization for execution of the enumerated resource files depends upon existence of the at least one characteristic on the client machine 10. In one embodiment, the client machine 10 received an enumeration of resources, requested execution of an enumerated resource, and received access information including the at least one characteristic and a launch ticket authorizing the execution of the enumerated resource upon the determination of the existence of the at least one characteristic on the client machine 10. In one embodiment, the client machine 10 receives from the remote machine 30 a license authorizing execution of the plurality of resource files. In some embodiments, the license authorizes execution for a specified time period. In one of these embodiments, the license requires transmission of a heart beat message to maintain authorization for execution of the plurality of resource files. For embodiments in which a virtual machine is streamed or otherwise downloaded to the client machine, a license pool may be provided that authorizes the virtual machine, its guest operating system and all the licensed software installed within that guest operating system. In some of these embodiments, a single license is provided that authorizes those entities.

In another embodiment, the client machine 10 receives from the remote machine 30 the license and an identifier associated with a remote machine 30 monitoring execution of the plurality of resource files. In some embodiments, the remote machine 30 is a session management server 1962, as described below in connection with FIG. 19. In one of these embodiments, the session management server 1962 includes a session management subsystem 1910 that monitors the session associated with the client machine 10. In other embodiments, a separate remote machine 30"" is the session management server 1962.

Referring back to FIG. 18, the client machine 10 receives and executes the plurality of resource files (step 1814). In one embodiment, the client machine 10 receives the plurality of resource files across a resource streaming session. In another embodiment, the client machine 10 stores the plurality of resource files in an isolation environment on the client machine 10. In still another embodiment, the client machine 10 executes one of the plurality of resource files prior to receiving a second of the plurality of resource files. In some embodiments, a remote machine 30 transmits the plurality of resource files to a plurality of client machines 10, each client machine 10 in the plurality having established a separate resource streaming session with the remote machine 30.

In some embodiments, the client machine 10 stores the plurality of resource files in a cache and delays execution of the resource files. In one of these embodiments, the client machine 10 receives authorization to execute the resource files during a pre-defined period of time. In another of these embodiments, the client machine 10 receives authorization to execute the resource files during the pre-defined period of time when the client machine 10 lacks access to a network. In other embodiments, the client machine 10 stores the plurality of resource files in a cache. In one of these embodiments, a resource streaming client 1952 (described in further detail below in connection with FIG. 19) establishes an internal resource streaming session to retrieve the plurality of resource files from the cache. In another of these embodiments, the client machine 10 receives authorization to execute the resource files during a pre-defined period of time when the client machine 10 lacks access to a network.

The client machine 10 transmits at least one heartbeat message to a remote machine (step 1816). In some embodiments, the client machine 10 transmits the at least one heartbeat message to retain authorization to execute the plurality of resource files comprising the enumerated resource. In other embodiments, the client machine 10 transmits the at least one heartbeat message to retain authorization retrieve a resource file in the plurality of resource files. In still other embodiments, the client machine 10 receives a license authorizing execution of the plurality of resource files during a pre-determined period of time.

In some embodiments, the client machine 10 transmits the heartbeat message to a second remote machine 30"". In one of these embodiments, the second remote machine 30"" may comprise a session management server 1962 monitoring the retrieval and execution of the plurality of resource files. In another of these embodiments, the second remote machine 30"" may renew a license authorizing execution of the plurality of resource files, responsive to the transmitted heartbeat message. In still another of these embodiments, the second remote machine 30"" may transmit to the client machine 10 a command, responsive to the transmitted heartbeat message.

Figure 19:
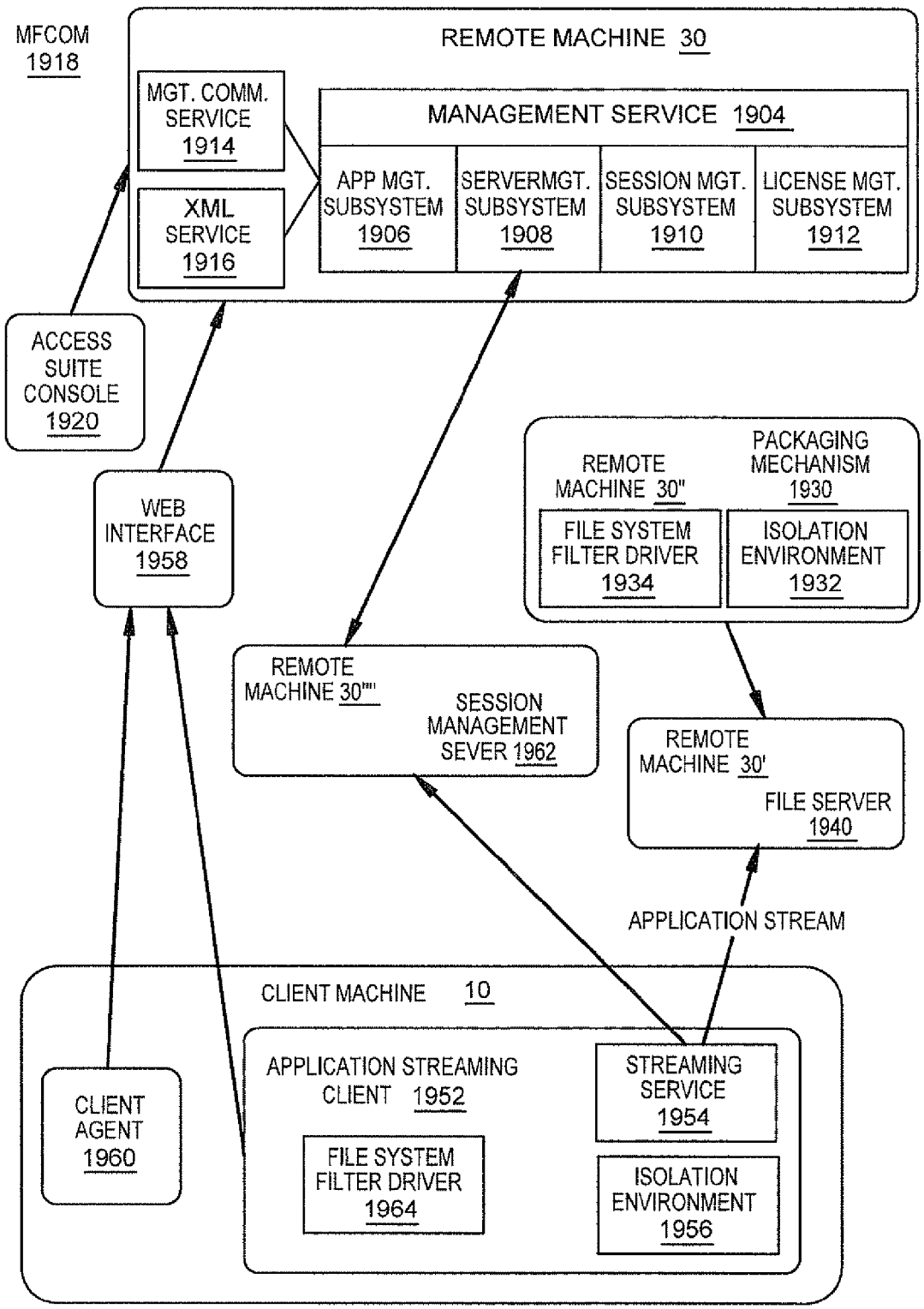
FIG. 19 is a block diagram depicting one embodiment of a client machine 10 including an application streaming client, a streaming service and an isolation environment.

Referring now to FIG. 19, the client machine 10 may include a resource streaming client 1952, a streaming service 1954 and an isolation environment 1956.

The resource streaming client 1952 may be an executable program. In some embodiments, the resource streaming client 1952 may be able to launch another executable program. In other embodiments, the resource streaming client 1952 may initiate the streaming service 1954. In one of these embodiments, the resource streaming client 1952 may provide the streaming service 1954 with a parameter associated with executing a resource. In another of these embodiments, the resource streaming client 1952 may initiate the streaming service 1954 using a remote procedure call.

In one embodiment, the client machine 10 requests execution of a resource and receives access information from a remote machine 30 regarding execution. In another embodiment, the resource streaming client 1952 receives the access information. In still another embodiment, the resource streaming client 1952 provides the access information to the streaming service 1954. In yet another embodiment, the access information includes an identification of a location of a file associated with a plurality of resource files comprising the resource.

In one embodiment, the streaming service 1954 retrieves a file associated with a plurality of resource files. In some embodiments, the retrieved file includes an identification of a location of the plurality of resource files. In one of these embodiments, the streaming service 1954 retrieves the plurality of resource files. In another of these embodiments, the streaming service 1954 executes the retrieved plurality of resource files on the client machine 10. In other embodiments, the streaming service 1954 transmits heartbeat messages to a remote machine 30 to maintain authorization to retrieve and execute a plurality of resource files.

In some embodiments, the retrieved file includes an identification of a location of more than one plurality of resource files, each plurality of resource files comprising a different resource. In one of these embodiments, the streaming service 1954 retrieves the plurality of resource files comprising the resource compatible with the client machine 10. In another of these embodiments, the streaming service 1954 receives authorization to retrieve a particular plurality of resource files, responsive to an evaluation of the client machine 10.

In some embodiments, the plurality of resource files are compressed and stored on a file server within an archive file such as a CAB, ZIP, SIT, TAR, JAR or other archive file. In one embodiment, a plurality of resource files stored in an archive file comprises a resource. In another embodiment, multiple pluralities of resource files stored in an archive file each comprise different versions of a resource. In still another embodiment, multiple pluralities of resource files stored in an archive file each comprise different resources. In some embodiments, an archive file includes metadata associated with each file in the plurality of resource files. In one of these embodiments, the streaming service 1954 generates a directory structure responsive to the included metadata. As will be described in greater detail below, the metadata may be used to satisfy requests by resources for directory enumeration.

In one embodiment, the streaming service 1954 decompresses an archive file to acquire the plurality of resource files. In another embodiment, the streaming service 1954 determines whether a local copy of a file within the plurality of resource files exists in a cache on the client machine 10 prior to retrieving the file from the plurality of resource files. In still another embodiment, the file system filter driver 1964 determines whether the local copy exists in the cache. In some embodiments, the streaming service 1954 modifies a registry entry prior to retrieving a file within the plurality of resource files.

In some embodiments, the streaming service 1954 stores a plurality of resource files in a cache on the client machine 10. In one of these embodiments, the streaming service 1954 may provide functionality for caching a plurality of resource files upon receiving a request to cache the plurality of resource files. In another of these embodiments, the streaming service 1954 may provide functionality for securing a cache on the client machine 10. In another of these embodiments, the streaming service 1954 may use an algorithm to adjust a size and a location of the cache.

In some embodiments, the streaming service 1954 creates an isolation environment 1956 on the client machine 10. In one of these embodiments, the streaming service 1954 uses an isolation environment application programming interface to create the isolation environment 1956. In another of these embodiments, the streaming service 1954 stores the plurality of resource files in the isolation environment 1956. In still another of these embodiments, the streaming service 1954 executes a file in the plurality of resource files within the isolation environment. In yet another of these embodiments, the streaming service 1954 executes the resource in the isolation environment. In some embodiments, the streaming service 1954 accesses an isolation environment 1956 provided by a virtual machine.

For embodiments in which authorization is received to execute a resource on the client machine 10, the execution of the resource may occur within an isolation environment 1956. In some embodiments, a plurality of resource files comprising the resource is stored on the client machine 10 prior to execution of the resource. In other embodiments, a subset of the plurality of resource files is stored on the client machine 10 prior to execution of the resource. In still other embodiments, the plurality of resource files does not reside in the isolation environment 1956. In yet other embodiments, a subset of the plurality of resources files do not reside on the client machine 10. Regardless of whether a subset of the plurality of resource files or each resource file in the plurality of resource files reside on the client machine 10 or in isolation environment 1956, in some embodiments, a resource file in the plurality of resource files may be executed within an isolation environment 1956.

In some embodiments, isolation environments are used to provide additional functionality to the resource streaming client 1952. In one of these embodiments, a resource is executed within an isolation environment. In another of these embodiments, a retrieved plurality of resource files resides within the isolation environment. In still another of these embodiments, changes to a registry on the client machine 10 are made within the isolation environment.

In one embodiment, the resource streaming client 1952 includes an isolation environment 1956. In some embodiments, the resource streaming client 1952 includes a file system filter driver 1964 intercepting resource requests for files. In one of these embodiments, the file system filter driver 1964 intercepts a resource request to open an existing file and determines that the file does not reside in the isolation environment 1956. In another of these embodiments, the file system filter driver 1964 redirects the request to the streaming service 1954 responsive to a determination that the file does not reside in the isolation environment 1956. The streaming service 1954 may extract the file from the plurality of resource files and store the file in the isolation environment 1956. The file system filter driver 1964 may then respond to the request for the file with the stored copy of the file. In some embodiments, the file system filter driver 1964 may redirect the request for the file to a file server 1940, responsive to an indication that the streaming service 1954 has not retrieved the file or the plurality of resource files and a determination the file does not reside in the isolation environment 1956.

In some embodiments, the file system filter driver 1964 uses a strict isolation rule to prevent conflicting or inconsistent data from appearing in the isolation environment 1956. In one of these embodiments, the file system filter driver 1964 intercepting a request for a resource in a user isolation environment may redirect the request to a resource isolation environment. In another of these embodiments, the file system filter driver 1964 does not redirect the request to a system scope.

In one embodiment, the streaming service 1954 uses IOCTL commands to communicate with the filter driver. In another embodiment, communications to the file server 1940 are received with the Microsoft SMB streaming protocol.

Figure 20:
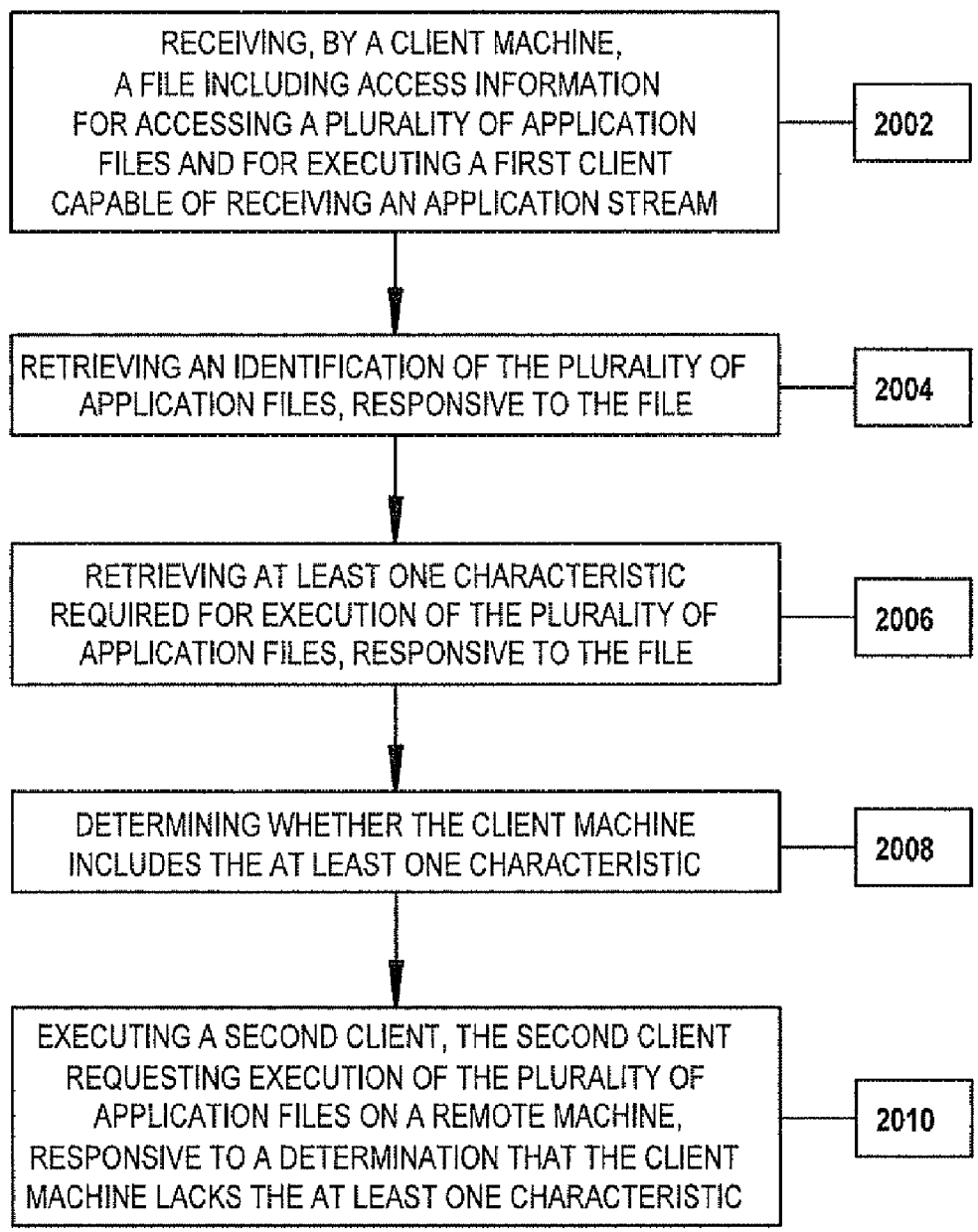
FIG. 20 is a flow diagram depicting one embodiment of steps taken by a client machine to execute an application.

Referring now to FIG. 20, a flow diagram depicts one embodiment of steps taken by a client machine 10 to execute a resource. As described above in FIG. 18, regarding step 1814, a client machine 10 receives and executes the plurality of resource files. In brief overview, the client machine 10 receives a file including access information for accessing a plurality of resource files and for executing a first client capable of receiving a resource stream (step 2002). The client machine 10 retrieves an identification of the plurality of resource files, responsive to the file (step 2004). The client machine 10 retrieves at least one characteristic required for execution of the plurality of resource files, responsive to the file (step 2006). The client machine 10 determines whether the client machine 10 includes the at least one characteristic (step 2008). The client machine 10 executes a second client, the second client requesting execution of the plurality of resource files on a remote machine 30, responsive to a determination that the client machine 10 lacks the at least one characteristic (step 2010).

Referring to FIG. 20, and in greater detail, the client machine 10 receives a file including access information for accessing a plurality of resource files and for executing a first client capable of receiving a resource stream (step 2002). In one embodiment, the client machine 10 receives access information including an identification of a location of a plurality of resource files comprising a resource. In another embodiment, the client machine 10 receives the file responsive to requesting execution of the resource. In still another embodiment, the access information includes an indication that the plurality of resource files reside on a remote machine 30' such as a resource server or a file server. In yet another embodiment, the access information indicates that the client machine 10 may retrieve the plurality of resource files from the remote machine 30 over a resource streaming session.

The client machine 10 retrieves an identification of the plurality of resource files, responsive to the file (step 2004). In one embodiment, the client machine 10 identifies a remote machine 30 on which the plurality of resource files resides, responsive to the file including access information. In another embodiment, the client machine 10 retrieves from the remote machine 30 a file identifying the plurality of resource files. In some embodiments, the plurality of resource files comprises a resource. In other embodiments, the plurality of resource files comprises multiple resources. In still other embodiments, the plurality of resource files comprises multiple versions of a single resource.

Figure 21:
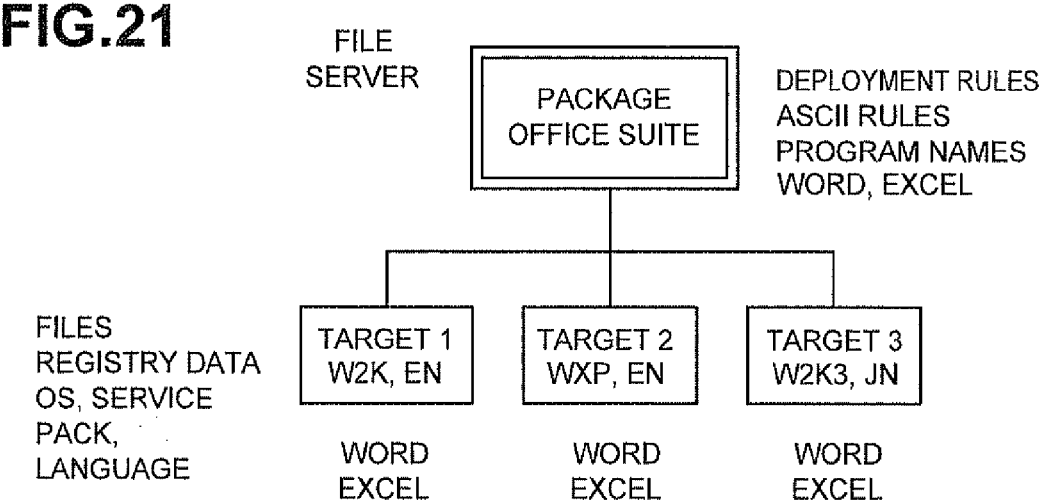
FIG. 21 is a block diagram depicts one embodiment of a plurality of application files.

Referring ahead to FIG. 21, a block diagram depicts one embodiment of a plurality of resource files residing on a remote machine 30', such as file server 1940. In FIG. 21, a plurality of resource files, referred to as a package, includes resource files comprising three different versions of one or more resources.

In one embodiment, each subset of resource files comprising a version of one or more resources and stored within the package is referred to as a target. Target 1, for example, includes a version of a word processing resource and of a spreadsheet program, the version compatible with the English language version of the Microsoft Windows 2000 operating system. Target 2 includes a version of a word processing resource and of a spreadsheet program, the version compatible with the English language version of the Microsoft XP operating system. Target 3 a version of a word processing resource and of a spreadsheet program, the version compatible with the Japanese language version of the Microsoft Windows 2003 operating system with service pack 3.

Returning back to FIG. 20, in some embodiments, the file retrieved from the remote machine 30 hosting the plurality of resource files includes a description of the package and the targets included in the plurality of resource files. In other embodiments, the file retrieved from the remote machine 30 identifies the plurality of resource files comprising a resource requested for execution by the client machine 10.

The client machine 10 retrieves at least one characteristic required for execution of the plurality of resource files, responsive to the file (step 2006). In some embodiments, the client machine 10 may not execute a resource unless the client machine 10 includes certain characteristics. In one of these embodiments, different resources require client machines 10 to include different characteristics from the characteristics required by other resources. In another of these embodiments, the client machine 10 receives an identification of the at least one characteristic required for execution of the plurality of resource files comprising the resource requested by the client machine 10.

Still referring to FIG. 20, the client machine 10 determines whether the client machine 10 includes the at least one characteristic (step 2008). In one embodiment, the client machine 10 evaluates an operating system on the client machine 10 to determine whether the client machine 10 includes the at least one characteristic. In another embodiment, the client machine 10 identifies a language used by an operating system on the client machine 10 to determine whether the client machine 10 includes the at least one characteristic. In still another embodiment, the client machine 10 identifies a revision level of an operating system on the client machine 10 to determine whether the client machine 10 includes the at least one characteristic. In yet another embodiment, the client machine 10 identifies a resource version of a resource residing on the client machine 10 to determine whether the client machine 10 includes the at least one characteristic. In some embodiments, the client machine 10 determines whether the client machine 10 includes a device driver to determine whether the client machine 10 includes the at least one characteristic. In other embodiments, the client machine 10 determines whether the client machine 10 includes an operating system to determine whether the client machine 10 includes the at least one characteristic. In still other embodiments, the client machine 10 determines whether the client machine 10 includes a license to execute the plurality of resource files to determine whether the client machine 10 includes the at least one characteristic.

In one embodiment, the client machine 10 determines whether the client machine 10 comprises a required amount of available disk space to access the resource. In another embodiment, the client machine 10 determines whether a central processing unit of the client machine 10 provides a required processing speed. In still another embodiment, the client machine 10 determines whether the client machine 10 comprises a required amount of available RAM. In yet another embodiment, the client machine 10 determines whether the client machine 10 comprises a required level of graphical processing and display capabilities.

The client machine 10 executes a second client, the second client requesting execution of the plurality of resource files on a remote machine 30, responsive to a determination that the client machine 10 lacks the at least one characteristic (step 2010). In one embodiment, when the client machine 10 determines that the client machine 10 lacks the at least one characteristic, the client machine 10 does not execute the first client capable of receiving a resource stream. In another embodiment, a policy prohibits the client machine 10 from receiving the plurality of resource files over a resource stream when the client machine 10 lacks the at least one characteristic. In some embodiments, the client machine 10 determines that the client machine 10 does include the at least one characteristic. In one of these embodiments, the client machine 10 executes the first client, the first client receiving a resource stream comprising the plurality of resource files from a remote machine 30 for execution on the client machine 10.

In some embodiments, the client machine 10 executes the second client requesting execution of the plurality of resource files on a remote machine 30 upon determining that the client machine 10 lacks the at least one characteristic. In one of these embodiments, the second client transmits the request to a remote machine 30 hosting the plurality of resource files. In another of these embodiments, the remote machine 30 executes the plurality of resource files comprising the resource and generates resource-output data. In still another of these embodiments, the second client receives resource-output data generated by execution of the plurality of resource files on the remote machine 30. In yet another of these embodiments, the second client displays the resource-output on the client machine 10. In one embodiment, the client machine 10 requests execution of the plurality of application files on a physical machine 30. In another embodiment, the client machine 10 requests execution of the plurality of application files on a virtual machine executing on a remote machine 30.

In some embodiments, the second client receives a file comprising access information for accessing a plurality of resource files and requests, responsive to a determination by the first client that the client machine 10 lacks the at least one characteristic, execution of the plurality of resource files on a virtual machine providing a computing environment having the least one characteristic. In other embodiments, the client machine 10 executes the second client requesting execution of the plurality of resource files on a remote machine 30 upon determining that the client machine 10 lacks the at least one characteristic. In one of these embodiments, the second client transmits the request to a remote machine 30 hosting the plurality of resource files. In another of these embodiments, a virtual machine executing on the remote machine 30 executes the plurality of resource files comprising the resource and generates resource-output data. In still another of these embodiments, the second client receives resource-output data generated by execution of the plurality of resource files on the virtual machine. In yet another of these embodiments, the second client displays the resource-output on the client machine 10.

In some embodiments, the second client transmits the request to a remote machine 30 that does not host the plurality of resource files. In one of these embodiments, the remote machine 30 may request the plurality of resource files from a second remote machine 30 hosting the plurality of resource files. In another of these embodiments, the remote machine 30 may receive the plurality of resource files from the second remote machine 30 across a resource streaming session. In still another of these embodiments, the remote machine 30 stores the received plurality of resource files in an isolation environment and executes the resource within the isolation environment. In yet another of these embodiments, the remote machine 30 transmits the generated resource-output data to the second client on the client machine 10.

In some embodiments, the second client transmits the request to a remote machine 30 that does not host the plurality of resource files. In one of these embodiments, the remote machine 30 may request the plurality of resource files from a second remote machine 30 hosting the plurality of resource files. In another of these embodiments, the remote machine 30 may receive the plurality of resource files from the second remote machine 30 across a resource streaming session.

In other embodiments, the remote machine 30 stores the received plurality of resource files in a computing environment provided by a virtual machine executing on the remote machine 30, the computing environment having the at least one characteristic. In yet another of these embodiments, the remote machine 30 executes the resource within the computing environment provided by the virtual machine and transmits the generated resource-output data to the second client on the client machine 10.

In some embodiments, a virtual machine on the remote machine 30 executes the plurality of resource files. In one of these embodiments, the virtual machine receives for execution a resource stream comprising the plurality of resource files. In some embodiments, a virtual machine may receive for execution a resource stream responsive to an application of a policy. In one of these embodiments, the result of the application of the policy depends on an availability of the requested resource in the machine farm 38 (including availability of a suitably configured physical machine 30 or virtual machine), the sensitivity of the requested resource (including whether a policy prevents the transmission of the requested resource to an unsecured environment), information associated with the user of the client machine 10 (including authorization to execute or access the requested resource in an unsecured environment).

Referring back to FIG. 19, in one embodiment, the first client machine 10, capable of receiving the resource stream, is a resource streaming client 1952. The resource streaming client 1952 receiving the file, retrieving an identification of a plurality of resource files and at least one characteristic required for execution of the plurality of resource files, responsive to the file, and determining whether the client machine 10 includes the at least one characteristic. In another embodiment, the second client is a client agent 1960. In some embodiments, the client agent 1960 receives the file from the resource streaming client 1952 responsive to a determination, by the resource streaming client 1952, that the client machine 10 lacks the at least one characteristic.

A remote machine 30 includes functionality for monitoring resource usage by a client machine 10. The remote machine 30 may monitor the status of each resource used by the client machine 10, for example upon execution or termination of a resource. In one embodiment, the remote machine 30 requires the client machine 10 to transmit messages about the status of a resource executed by the client machine 10. In another embodiment, when a client machine 10 connects to a network on which the remote machine 30 resides, the client machine 10 transmits a message indicating that the client machine 10 has connected to the network.

In one embodiment, the client machine 10 is said to have a session when the client machine 10 interacts with the remote machine 30 and executes one or more resources. In another embodiment, the remote machine 30 requires the client machine 10 to maintain, for the duration of a session, a license authorizing execution of resources received from a remote machine 30. In still another embodiment, sessions have unique session identifiers assigned by the remote machine 30.

In one embodiment, the client machine 10 transmits the messages to the remote machine 30 with which it interacted to receive and execute the resource. In another embodiment, the client machine 10 receives from the remote machine 30 an identifier of a second remote machine 30, such as a session management server 1962, the second remote machine 30 receiving and storing all transmitted messages associated with the session on the client machine 10.

In some embodiments, the session management server 1962 is a remote machine 30 providing license management and session monitoring services. In one of these embodiments, the session management server 1962 includes a server management subsystem 1908 providing these services.

In one embodiment, the client machine 10 transmits messages directly to the session management server 1962. In another embodiment, the client machine 10 transmits messages to a remote machine 30, the remote machine 30 forwarding the messages to the session management server 1962 with an identification of the client machine 10.

A client machine 10 may transmit a heartbeat message to the remote machine 30. In one embodiment, the heartbeat message includes a request for a license. In this embodiment, the client machine 10 may transmit the heartbeat message after receiving access information associated with a resource which the client machine 10 requested authorization to execute. The client machine 10 may transmit the heartbeat message prior to executing the resource. In one embodiment, the client machine 10 includes with the heartbeat message a launch ticket received with the access information. In this embodiment, the remote machine 30 may grant the client machine 10 a license upon successful verification of the launch ticket.

In another embodiment, the heartbeat message includes an indication that the client machine 10 has initiated execution of a resource. In still another embodiment, the heartbeat message includes an indication that the client machine 10 has terminated execution of a resource. In yet another embodiment, the heartbeat message includes an indication of a failure to execute a resource.

In one embodiment, the heartbeat message includes a request for an identification of a second session management server, such as a session management server 1962. In another embodiment, the heartbeat message includes an indication that the client machine 10 has connected to a network on which the remote machine 30 resides.

In some embodiments, the heartbeat message includes a request to reset a resource streaming session. In one of these embodiments, the client machine 10 transmits this heartbeat message when an error has occurred and a connection is terminated between a network on which the remote machine 30 resides and the client machine 10. In another of these embodiments, the client machine 10 transmits with the heartbeat message information associated with the session. In still another of these embodiments, the remote machine 30 may transmit to the client machine 10 session-related data if the session has not expired.

In another of these embodiments, if a remote machine 30 disconnects from a network on which it replies, the client machine 10 may not receive a reply to a heartbeat message transmitted to the remote machine 30. In one embodiment, the client machine 10 may re-establish a session by transmitting a message requesting a session reset to the remote machine 30. In another embodiment, the client machine 10 may re-establish a session by transmitting a message requesting a session reset to a second remote machine 30. In some embodiments, when the remote machine 30 reconnects to the network, it will create a new session for each session reset request received while the remote machine 30 was disconnected. In one of these embodiments, the new session will be associated with the reconnected and unlicensed state. In another of these embodiments, no new license will be acquired for the new session. In still another of these embodiments, when the client machine 10 executes a resource, a new license will be acquired and all sessions associated with the client machine 10 will be associated with an active and licensed state.

In some embodiments, a resource streaming client 1952 on the client machine 10 generates the heartbeat message. In one of these embodiments, the resource streaming client 1952 forwards the heartbeat message to a web interface 1958 for transmission to the client machine 10 for transmission to the remote machine 30. In other embodiments, the management service 1904 on the remote machine 30 receives the heartbeat message from the client machine 10 via the web interface 1958. In still other embodiments, a remote machine 30 comprising a collector point 240 (described above) receives and stores the heartbeat messages.

In some embodiments, the resource streaming client 1952 requests a license from the remote machine 30. In one of these embodiments, the license authorizes execution of a resource on the client machine 10. In another of these embodiments, the remote machine 30 may access a second remote machine 30 to provide the license. In still another of these embodiments, the remote machine 30 may provide the license to the client machine 10. In yet another of these embodiments, the remote machine 30 may provide a license acceptable for authorization purposes to a second remote machine 30. In some embodiments, the license is revoked upon termination of execution of a resource.

Referring back to FIG. 8, a request for access to a resource is received (step 802). In some embodiments, the resource is a file. In one of these embodiments, an application program is selected and executed to provide access to the file. In another of these embodiments, a type of file associated with the requested file is identified to select an application program for execution. In still another of these embodiments, prior to the request for access to the file, an application program is associated with a type of file, enabling automatic selection of the application program upon identification of a type of file associated with the requested file. In some embodiments, file type association (FTA) functionality permits users to automatically initiate the execution of application programs associated with a data file, even though the data file and the executable program are hosted on different computing nodes.

Typically, file type association functionality permits users to transparently execute executable programs by selecting data files located on a computing machine that differs from the machine(s) where the executable programs are located. In one embodiment, a user of a client machine 10 can transparently invoke the execution of an executable program on a remote machine 30 by selecting a data file located on the client machine 10. In another embodiment, a user can transparently invoke the execution of an application program on their client machine 10 by selecting a data file located on a remote machine 30. In still another embodiment, a user can select a data file stored on a remote machine 30', such as a web server, and transparently invoke the execution of an associated executable program on a remote machine 30, such as an application execution server. Typically, execution permits processing of the contents of the selected data file, the output of which is then provided to the user at the client machine 10.

It is to be understood that examples using filename extensions necessarily reflect the idiosyncrasies of embodiments utilizing the WINDOWS family of operating systems. Other embodiments implement methods and apparatus in accord using special parameters stored in the data file itself, the data contained in the data file, the file system records associated with the data file, or a separate data file or database. For example, embodiments using the MacOS family of operating systems utilize file and application creator types and store file-type association data in the Desktop file associated with each storage device. Embodiments using a UNIX-variant operating system utilize file extensions, embedded parameters, or other mechanisms as appropriate. Accordingly, the scope of the claims should not be read to be limited to embodiments relying on filename extensions or embodiments utilizing WINDOWS operating systems.

Client-Based FTA

Figure 22A:
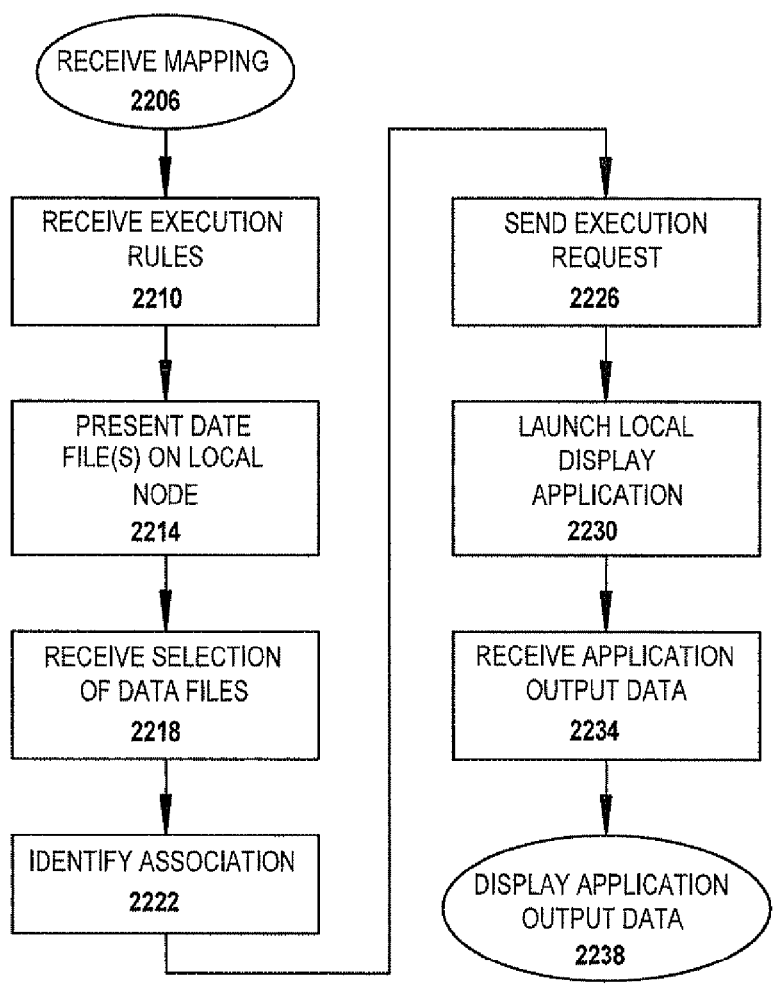
FIG. 22A is a flow diagram depicting one embodiment of the steps taken to enable transparent distributed program execution on a remote machine through the selection of graphical indicia representative of a data file located on the client machine.

Referring to FIG. 22A, a flow diagram depicts one embodiment of the steps taken in a method of enabling transparent distributed program execution on a remote machine 30 through the selection of graphical indicia representative of a data file located on the client machine 10. The client machine 10 receives, from one of a plurality of remote machines 30, a mapping specifying an association between a type of data file and an executable program for execution on one of a plurality of remote machines 30 (Step 2206). In some embodiments, the mapping specifies an association between a type of data file and an executable program for execution on a virtual machine located on one of a plurality of remote machines 30.

The client machine 10 presents a graphical depiction of a data file stored on the client machine 10 (Step 2214) and receives a selection of the graphical depiction of the data file (Step 2218). The client machine 10 identifies an executable program associated with the type of the selected data file using the received mapping (Step 2222) and sends a request to a remote machine 30 for execution of the identified executable program (Step 2226). In one embodiment, the client machine 10 initiates the execution of a local display application (Step 2230) to receive application output data from the executing program (Step 2234), which it displays to the end user (Step 2238).

Still referring to FIG. 22A, when the client, machine 10 receives the mapping (Step 106), the mapping may be received by itself, with several other mappings, or with other messages or data such as software updates. Table 3 illustrates an exemplary mapping provided in one embodiment of the invention:

TABLE 3

| File type: | Executable program: |
| --- | --- |
| ".DOC", ".RTF" | MSWORD.EXE |
| ".PDF" | ACROBAT.EXE |

In one embodiment, the mapping identifies an association between a particular executable program for use with a particular data file or type of data file stored on the user's client machine 10. In another embodiment, the mapping specifies the relationship between an executable program and a data file in terms of a client machine 10 application that launches the executable program on a remote machine 30 and displays the output from execution at the client machine 10. For example, as described in connection with FIG. 8A (step 2206), the mapping could specify that when a ".DOC" file is selected, the client machine 10 is to execute METAFRAME from Citrix Software of Ft. Lauderdale, Fla., which in turn sends a request to one of a plurality of remote machines 30 to execute WORD, receiving the output data from execution for display to the user at the client machine 10. In some embodiments, a remote machine 30 receiving the request to execute the application program chooses a method for providing access to the application program, as described above in connection with FIG. 8 (step 804). In one of these embodiments, the remote machine 30 determines to execute the application and provide the application output data to the client machine 10. In another of these embodiments, the remote machine 30 identifies a remote machine 30 that executes the application and provides the application output data to the client machine 10. In still another of these embodiments, the remote machine 30 identifies an application streaming service that transmits the application program to the client machine 10 for local execution. In yet another of these embodiments, the remote machine 30 identifies a remote machine 30' on which a virtual machine provides a computing environment capable of executing the application program and transmitting the application output data to the client machine 10.

In still another embodiment, mapping specifies the relationship between an executable program and a data file in terms of a client machine 10 application that requests transmission of the executable program to the client machine 10 from an application streaming service provided by a remote machine 30. In other embodiments, the mapping could specify that when a file is selected, the client machine 10 is to establish a connection to a virtual machine provided by one of a plurality of remote machines 30 to initiate execution of an application program on the virtual machine and to receive application output data from the execution for display to the user at client machine 10. In some of these embodiments, as described in connection with FIG. 8 (step 808), a virtual machine and an execution machine onto which the virtual machine is launched are identified, configured, and provide the user of the client machine 10 with access to the file.

In some embodiments, the client machine 10 displays a list of file names associated with data files stored on the client machine 10. In still another embodiment, indicia representative of files stored on the client machine 10 are intermingled with indicia representative of files stored on one or more remote machines 30, or on virtual machines executing on remote machines 30. In this embodiment, client-based FTA is operative when indicia representative of a file stored on the client machine 10 is selected. In another embodiment, multiple forms of FTA (see below) are operative, with the appropriate form of FTA activated based on the location of the file associated with the selected indicia.

Figure 22B:
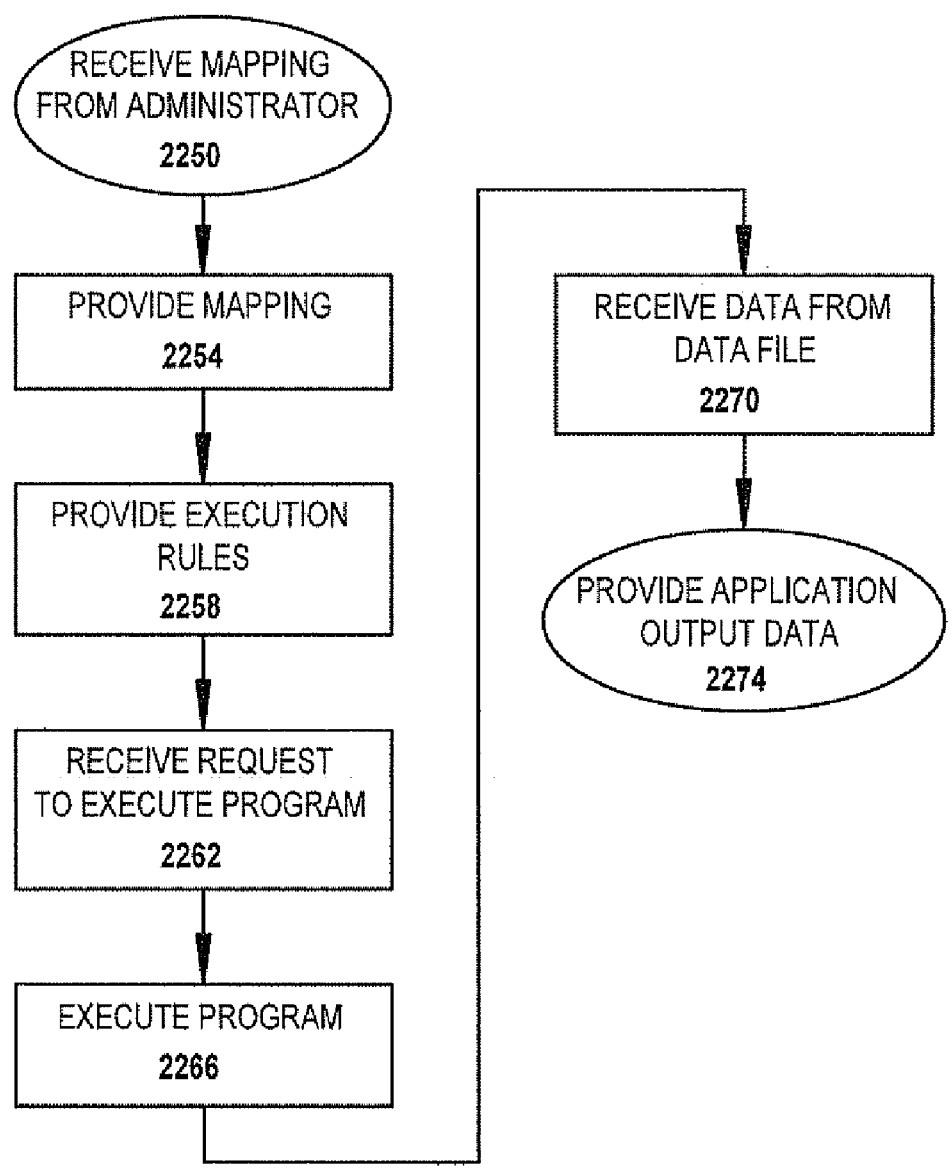
FIG. 22B is a flow diagram depicting one embodiment of the steps taken by a remote machine to enable transparent distributed program execution on a remote machine through the selection of graphical indicia representative of a data file located on the client machine.

FIG. 22B illustrates one embodiment of the steps taken by a remote machine 30 in the client-based file-type association process. A mapping is provided specifying an association between a type of data file stored on a client machine 10 and an executable program for execution on one of a plurality of remote machines 30 (Step 2254). A request to execute the executable program is received (Step 2262) and the executable program is executed on one of a plurality of remote machines 30 (Step 2266). In one embodiment, the remote machine 30 receiving the request to execute the executable program chooses to provide the requested access as describe above in connection with FIG. 8 (step 2204 and step 2206). In some embodiments, the remote machine 30 receives a request for transmission of the identified executable program to the client machine 10 for local execution. In one of these embodiments, the remote machine 30 chooses to provide the client machine 10 with the executable program via an application streaming service as described above. In another of these embodiments, the remote machine 30 chooses to stream the executable program to a remote machine 30 or to a virtual machine executing on a remote machine 30'.

Server-Based FTA

Figure 23:
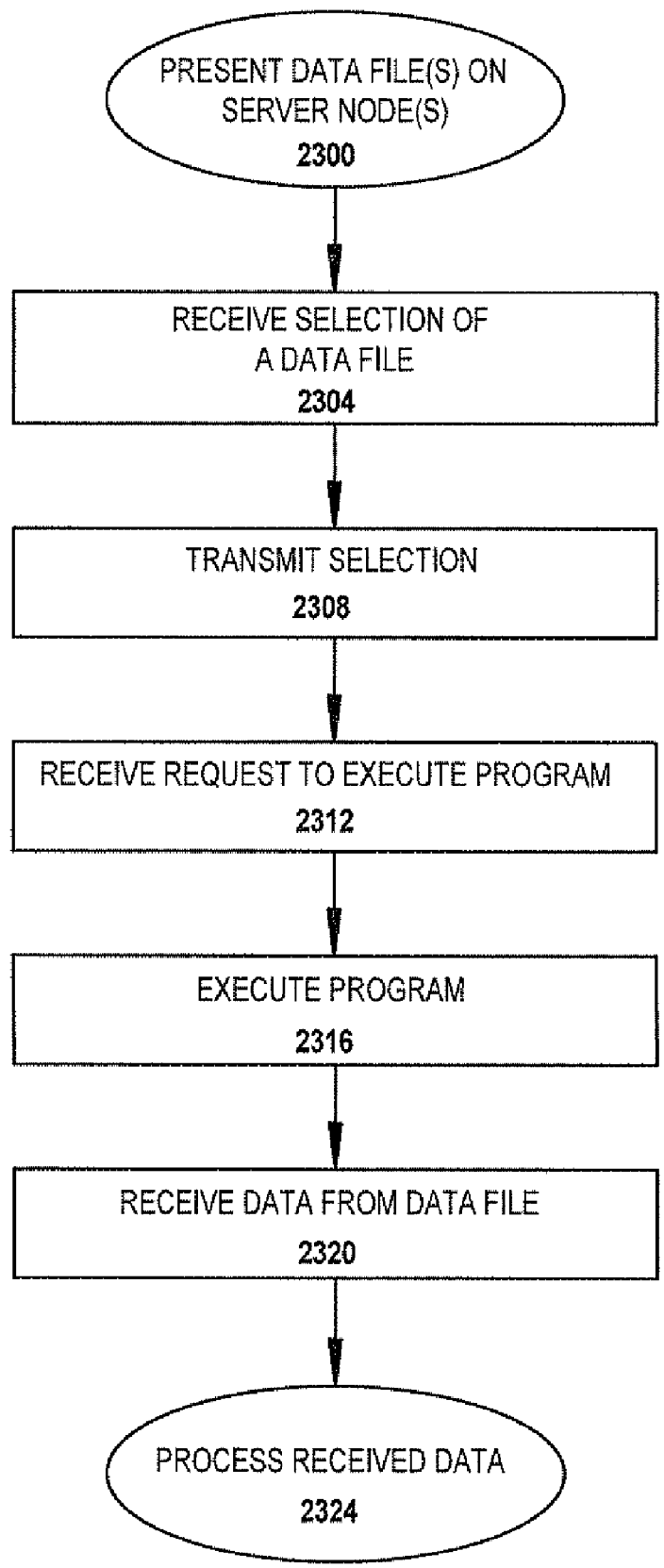
FIG. 23 is a flow diagram depicting another embodiment of the steps taken to enable transparent distributed program execution on a client machine through the selection of graphical indicia representative of a data file located on a remote machine.

Referring now to FIG. 23, a flow diagram depicts another embodiment of the steps taken in a method for enabling transparent distributed program execution on a client machine 10 through the selection of graphical indicia representative of a data file located on a remote machine 30. The client machine 10 presents a graphical depiction of a data file stored on one of a plurality of remote machines 30 (Step 2300). The client machine 10 receives a selection of the graphical depiction of the data file (Step 2304) and transmits the selection to one of the plurality of remote machines 30 (Step 2308). The client machine 10 receives a request from one of the plurality of remote machines 30 to execute an executable program associated with the selected data file (Step 2312) and executes the associated executable program (Step 2316).

Still referring to FIG. 23, the client machine 10 presents a user with a graphical depiction of at least one data file stored on at least one remote machine 30 (Step 2300). In one embodiment, indicia representative of files stored on one or more remote machines 30, and on virtual machines executing on the one or more remote machines 30, are intermingled with indicia representative of files stored on the client machine 10. In this embodiment, server-based FTA is operative when indicia representative of a file stored on a remote machine 30 is selected. In another embodiment, multiple forms of FTA (see above, below) are operative, with the appropriate form of FTA activated based on the location of the file associated with the selected graphical indicia.

As described above in connection with FIG. 8 (step 804), a remote machine 30 receiving a request to access a selected data file chooses a method for providing access to the data file. In one embodiment, the data file resides on the remote machine 30. In another embodiment, the data file resides on a remote machine 30', such as a web server. In some embodiments, the remote machine 30 consults a mapping to identify an application program associated with the requested data file.

In some embodiments, the remote machine 30 chooses to provide the client machine 10 with access to the file via execution of the associated application program in a computing environment provided by a virtual machine (step 806). In one of these embodiments, the remote machine 30 may identify a remote machine 30' to execute the application program and transmit application output data to the client machine 10. In another of these embodiments, the remote machine 30 identifies a remote machine 30' to execute the application program in a computing environment provided by a virtual machine executing on the remote machine 30', as described in connection with FIG. 8 (step 808).

In other embodiments, the remote machine 30 identifies a remote machine 30' providing an application streaming service capable of transmitting the application program to the client machine 10 for execution on the client machine 10 as described in connection with FIG. 8 (step 816). In one of these embodiments, the application streaming service transmits the application program to a remote machine 30' for execution and the remote machine 30 transmits application output data resulting from the execution to the client machine 10.

In some embodiments, the remote machine 30 selects one of a predetermined number of methods for executing a requested application program, responsive to a policy, the predetermined number of methods including a method for executing the requested application in a computing environment provided by a virtual machine. In one of these embodiments, the application streaming service transmits the application program to a remote machine 30' for executing in a computing environment provided by a virtual machine executing in the remote machine 30'. In another of these embodiments, the remote machine 30 selects a method for streaming the requested application program to a virtual machine and executing the enumerated application in the virtual machine environment. In still another of these embodiments, the virtual machine is evaluated and, a determination to stream the requested application is made responsive to the evaluation. In other embodiments, the determination to stream one of a plurality of files comprising an enumerated application program to a virtual machine is made responsive to credentials gathered from a client machine 10.

Having received data associated with the selected data file, the client machine 10 typically processes the received data using the executing program and displays the result of the processing to the end user.

As described above, a client machine 10 connects to one or more of the remote machines 30 in the machine farm 38. In some of these embodiments, the client machine 10 may communicate with remote machines 30 to receive application-output data generated by an execution of an application program on a remote machine 30, or on a virtual machine executing on the remote machine 30. In some embodiments, protocol stacks are implemented to enable communications between the client machine 10 and remote machines 30.

Figure 24:
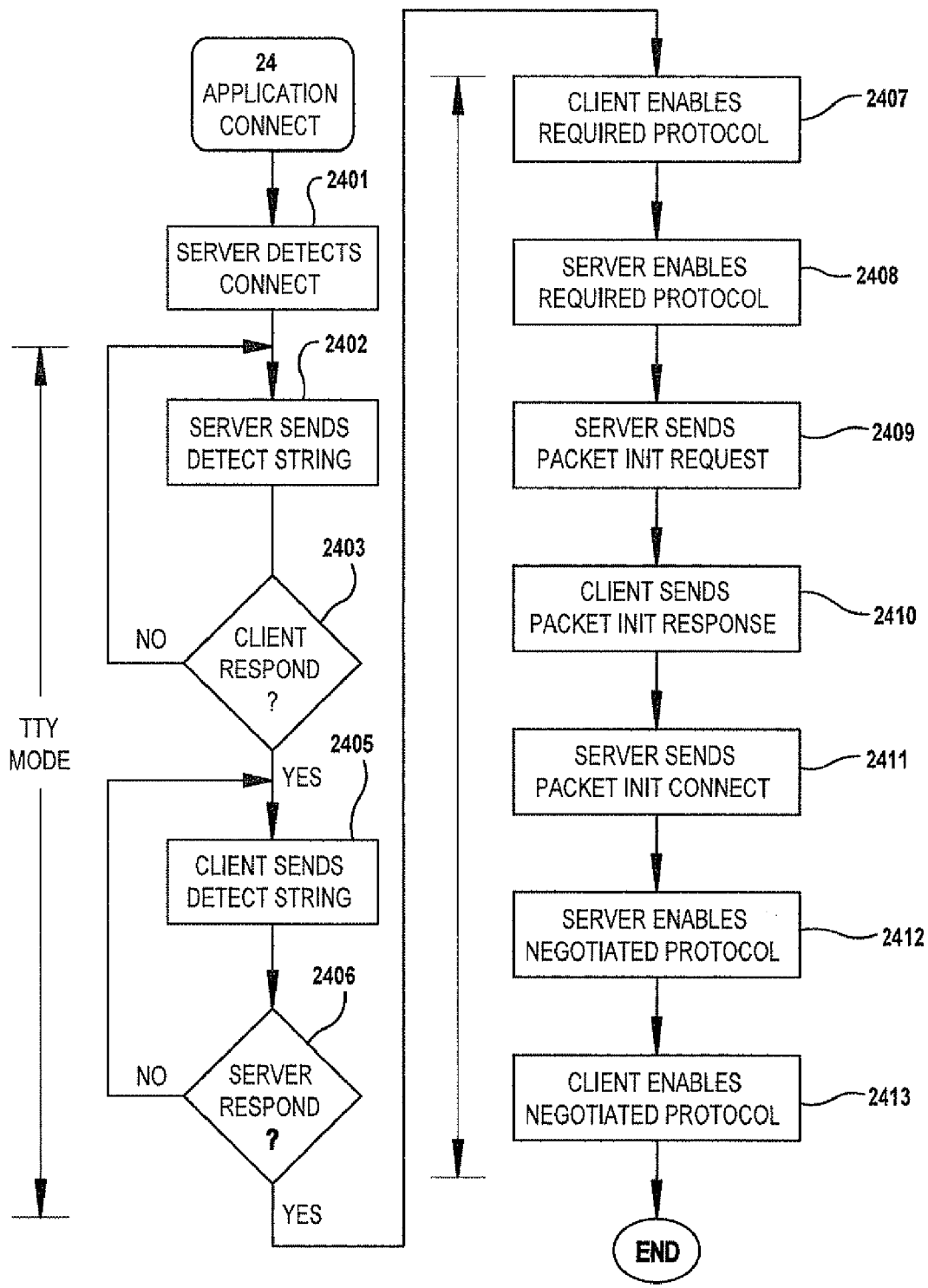
FIG. 24 is a flow diagram depicting one embodiment of the steps taken to negotiate the protocol for a connection between a client machine and a remote machine.

FIG. 24 is a flow diagram depicting one particular embodiment of a method for establishing an extensible and dynamically bindable protocol stack 20. In one embodiment, the method allows a client machine 10 to specify the contents of a protocol stack dynamically without requiring that a remote machine 30 have a prior protocol stack description for a particular client machine and a particular application requirement.

In one embodiment, a remote machine 30 is on-line and monitoring activity on a specific transport system (e.g. LAN or WAN) and has initialized its protocol stack with the minimal necessary protocol modules to support a "TTY" communication mode. This mode is a raw ASCII stream mode with no protocol assumptions above the transport layer (i.e. there are no protocol layers for compression, encryption, reliability, framing, or modem). Similarly, a client machine 10 seeking access to the remote machine 30 establishes a connection to the common transport system with the minimum protocol set needed to support a TTY communication mode.

Upon detecting that a client machine 10 has established transport system connection (step 2401), the application server broadcasts a TTY data stream, "DETECT.sub.-- STRING", in step 2402 that indicates service is available. The method used for detecting a client machine connection is transport system dependent (e.g. in the case of the TCP transport, when a client machine connects to a known port). If the client machine 10 does not respond within a prescribed time period, step 2403, a re-broadcast of mission of the message occurs in step 2402. Otherwise the process proceeds to step 2405 where the client machine 10 sends the TTY string "DETECT-STRING". In step 2406, the client machine 10 waits for the remote machine 30 to respond and, if the response is within a prescribed time interval, the process proceeds to steps 2407 where the client machine 10 enables the required protocol for supporting its application. Otherwise, the client machine 10 repeats the transmission of the message in step 2405. The server responds in step 4108 by enabling the required set of protocols. At step 2409, the TTY mode of communication ends because the next message sent by the server is a presentation layer protocol packet, "PACKET.sub.-- INIT.sub.-- REQUEST", which indicates that the client's required "DETECT.sub.-- STRING" has been received and accepted. In response to step 2409, the client, at step 2410, sends a set of presentation layer protocol packets, "PACKET.sub.-- INIT.sub.-- RESPONSE", each of which is used to specify a required or optional protocol module that is being negotiated with the server. At step 2411, the server sends a set of "PACKET.sub.-- INIT.sub.-- CONNECT" packets. The number of packets is variable: one for each client packet sent in step 2410, thus giving the remote machine 30 the opportunity to negotiate the parameters under which communications will take place by overriding the parameters of the client machine 10; or, the remote machine 30 may indicate that all of the parameters of the client machine 10 are acceptable by sending the parameters unchanged. At step 2412 the remote machine 30 enables the negotiated protocols (including any optional protocols) of step 2411. After the client machine 10 receives the packets from step 2411, the client machine 10 enables the negotiated protocols in step 2413.

Still referring to FIG. 24, in some embodiments, a virtual machine host server communicates with the client machine 10 to enable negotiated protocols. As described above, a request is received from a client machine 10 for access to a computing environment or for application execution, the request including an identification of a user of the client machine 10. In some embodiments, a virtual machine is launched in communication with a hypervisor. In other embodiments, a virtual machine host server is initialized with a prescribed set of protocols and associated protocol parameters providing a common transport mechanism, wherein the common transport mechanism is for raw ASCII stream mode communications. In still other embodiments, a virtual machine host server is initialized with a prescribed set of protocols and associated protocol parameters providing a common transport mechanism.

A virtual machine host server creates a first portion of a protocol stack. In one embodiment, a hypervisor creates the first portion of the protocol stack. In another embodiment, the hypervisor transmits a request protocol message to the client machine 10. In still another embodiment, the hypervisor receives from the client machine 10 a plurality of protocol packets specifying one or more protocol parameters desired by the client machine 10. In yet another embodiment, the virtual machine host server generates, in response to each received protocol packet, a packet counter-specifying one or more protocol parameters.

The virtual machine host server transmits a request protocol message to the client machine 10. The virtual machine host server receives from the client machine 10 a plurality of protocol packets specifying one or more protocol parameters desired by the client machine 10. The virtual machine host server transmits, in response to each received protocol packet, a packet counter-specifying one or more protocol parameters. In one embodiment, the virtual machine host server sends an acknowledgment message to the client machine 10 indicating that at least one of the protocols specified by the client machine 10 has been enabled. In another embodiment, the virtual machine host server responds to each received protocol packet transmitted by the client machine 10 with a virtual machine host server protocol packet, at least one of the virtual machine host server protocol packets modifying at least one of the associated protocol parameters. The virtual machine host server creates on the virtual machine host server a second portion of a protocol stack, the first portion and the second portion of the protocol stack establishing a communication channel for communicating with the client machine 10 having the negotiated protocol parameters.

Still referring to FIG. 24, in some embodiments, a virtual machine communicates with the client machine 10 to enable negotiated protocols as described above. As described above, a request is received from a client machine 10 for access to a computing environment or for application execution, the request including an identification of a user of the client machine 10. A virtual machine in communication with a hypervisor is identified. In one embodiment, a virtual machine is launched in communication with a hypervisor. In another embodiment, a virtual machine in communication with a hypervisor is allocated. In one embodiment, a second virtual machine is initialized with a prescribed set of protocols and associated protocol parameters providing a common transport mechanism. In another embodiment, the second virtual machine is initialized with a prescribed set of protocols and associated protocol parameters providing a common transport mechanism, wherein the common transport mechanism is for raw ASCII stream mode communications.

The second virtual machine creates a first portion of a protocol stack. The second virtual machine transmits a request protocol message to the client machine 10. The second virtual machine receives from the client machine 10 a plurality of protocol packets specifying one or more protocol parameters desired by the client machine 10. The second virtual machine transmits, in response to each received protocol packet, a packet counter-specifying one or more protocol parameters. In one embodiment, the second virtual machine sends an acknowledgement message to the client machine 10 indicating that at least one of the protocols specified by the client machine 10 has been enabled. In another embodiment, the second virtual machine responds to each received protocol packet transmitted by the client machine 10 with a response protocol packet, at least one of the response protocol packets modifying at least one of the associated protocol parameters. The first virtual machine creates a second portion of a protocol stack, the first portion and the second portion of the protocol stack establishing a communication channel for communicating with the client machine 10 having the negotiated protocol parameters. In one embodiment, the first virtual machine sends an acknowledgment message to the client machine 10 indicating that at least one of the protocols specified by the client machine 10 has been enabled. In another embodiment, the first virtual machine responds to each received protocol packet transmitted by the client machine 10 with a response protocol packet, at least one of the response protocol packets modifying at least one of the associated protocol parameters.

Still referring to FIG. 24, in some embodiments, a virtual machine host server communicates with the client machine 10 to enable negotiated protocols as described above. As described above, a request is received from a client machine 10 for access to a computing environment or for application execution, the request including an identification of a user of the client machine 10. In one embodiment, a virtual machine is launched in communication with a hypervisor. In another embodiment, a virtual machine in communication with a hypervisor is allocated. In one embodiment, the virtual machine host server is initialized with a prescribed set of protocols and associated protocol parameters providing a common transport mechanism. In another embodiment, the virtual machine host server is initialized with a prescribed set of protocols and associated protocol parameters providing a common transport mechanism, wherein the common transport mechanism is for raw ASCII stream mode communications.

The virtual machine host server transmits a request protocol message to the client machine 10. The virtual machine host server receives from the client machine 10 a plurality of protocol packets specifying one or more protocol parameters desired by the client machine 10. The virtual machine host server transmits, in response to each received protocol packet, a packet counter-specifying one or more protocol parameters. In one embodiment, the virtual machine host server sends an acknowledgement message to the client machine 10 indicating that at least one of the protocols specified by the client machine 10 has been enabled. In another embodiment, the virtual machine host server responds to each received protocol packet transmitted by the client machine 10 with a virtual machine host server protocol packet, at least one of the virtual machine host server protocol packets modifying at least one of the associated protocol parameters. The virtual machine host server generates a data structure representing the connection and associated with an initial protocol stack. The virtual machine host server identifies a virtual machine in communication with a hypervisor and generates a client space in the identified virtual machine. The virtual machine host server generates a second protocol stack associated with the generated client space and transfers the established connection between the virtual machine host server and the client machine 10 from the initial protocol stack to the second protocol stack by associating the data structure with the second protocol stack.

Still referring to FIG. 24, in some embodiments, a virtual machine communicates with the client machine 10 to enable negotiated protocols as described above. As described above, a request is received from a client machine 10 for access to a computing environment or for application execution, the request including an identification of a user of the client machine 10. A first virtual machine in communication with a hypervisor is identified. In one embodiment, a second virtual machine is initialized with a prescribed set of protocols and associated protocol parameters providing a common transport mechanism. In another embodiment, a second virtual machine is initialized with a prescribed set of protocols and associated protocol parameters providing a common transport mechanism, wherein the common transport mechanism is for raw ASCII stream mode communications.

The second virtual machine transmits a request protocol message to the client machine 10. The second virtual machine receives from the client machine 10 a plurality of protocol packets specifying one or more protocol parameters desired by the client machine 10. The second virtual machine transmits, in response to each received protocol packet, a packet counter-specifying one or more protocol parameters. In one embodiment, the second virtual machine sends an acknowledgement message to the client machine 10 indicating that at least one of the protocols specified by the client machine 10 has been enabled. In another embodiment, the second virtual machine responds to each received protocol packet transmitted by the client machine 10 with a response protocol packet, at least one of the response protocol packets modifying at least one of the associated protocol parameters. The second virtual machine generates a data structure representing the connection and associated with an initial protocol stack. The second virtual machine generates a client space in the identified first virtual machine. The second virtual machine generates a second protocol stack associated with the generated client space and transfers the established connection between the second virtual machine and the client machine 10 from the initial protocol stack to the second protocol stack by associating the data structure with the second protocol stack.

Figure 25:
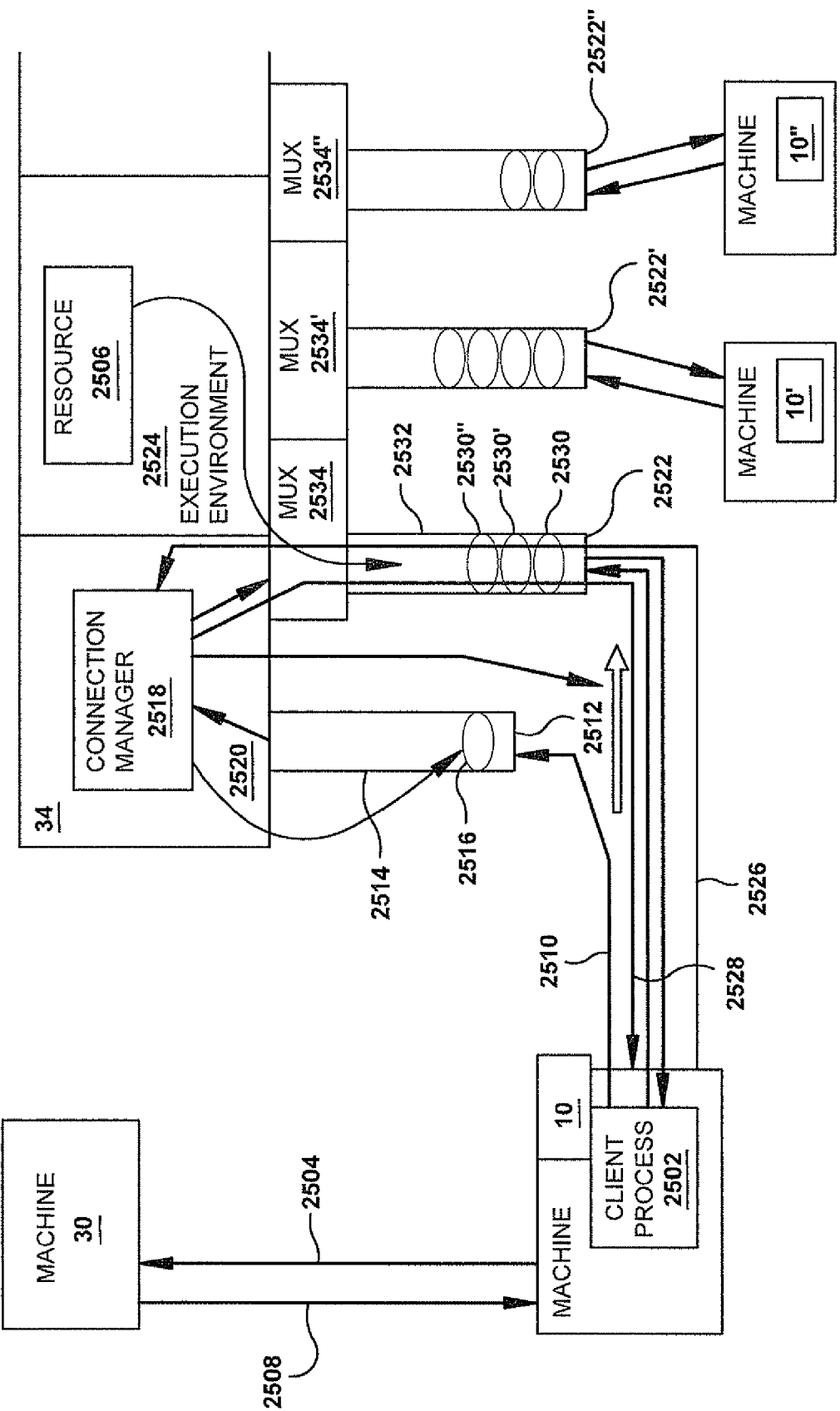
FIG. 25 is a block diagram depicting an embodiment of a remote machine and a client machine establishing a protocol stack for communication.

Referring now to FIG. 25, a block diagram depicts one embodiment of a client machine 10 in communication with a remote machine 30. When a client machine 10 wishes to access a resource provided by a remote machine 30, the client machine 10 may transmit a request to the general communications port previously defined by the communications protocol or to the "well-known" communications port on the remote machine 30. In one embodiment, the communication takes place by way of a datagram service. The remote machine 30 accesses the table of server addresses and returns a message containing the address of the remote machine 30' providing access to the requested resource and having the least load. In some embodiments, an address of a virtual machine executing on a remote machine 30' having the least load is provided. For embodiments in which the message identifies the execution machine having the lightest load, the operating system or hypervisor may forward the communication request, and all subsequent traffic, to the appropriate virtual machine.

Subsequent communications are automatically addressed by the client machine 10 also to a "well-known" or predefined general communications port on the remote machine 30'. In one embodiment, the type of protocol with which the initial query was made to the remote machine 30 determines the protocol of the information returned by the remote machine 30 to the client machine 10. Thus, if the request were made using a TCP/IP datagram, the remote machine 30 would return the TCP/IP address of the remote machine 30' to the client machine 10 and the client machine 10 would subsequently establish contact with the remote machine 30' using that protocol. In another embodiment, the datagram requesting an application address by a client machine 10 includes a request for a different type of protocol than the one used to send the request to the remote machine 30. For example, the client machine 10 may make a request to the remote machine 30 using the IPX protocol and request the address of the remote machine 30' as a TCP/IP protocol address.

As described above, in connection with FIG. 8, (steps 802-804), a remote machine 30 receives a request for access to a resource and chooses a method for providing access to the requested resource. In some embodiments, the remote machine 30 returns the network address of a remote machine 30' having the desired resource to the client machine 10. The client machine 10 then uses the information received from the remote machine 30 to request connection to the specified remote machine 30'. As is described above, such a connection is first established to a "well-known" communications port and is later transferred to a specific communications port under control of a connection manager. The specific communications port is associated with the resource executing on the remote machine 30' which then communicates with the client machine 10 through the specific communications port.

In more detail, and referring to FIG. 25, in some embodiments, a client process 2502 on client machine 10 makes a request 2504 to the remote machine 30 to obtain the address of a remote machine 30' which includes the desired resource 2506. The remote machine 30 returns to the client machine 10 a message 2508 containing the address of the remote machine 30' which includes the resource 2506. In one embodiment, the protocol used at this point of the connection is a datagram service.

The client machine 10 uses the returned address to establish a communication channel 2510 with the remote machine 30'. The port number used by the client machine 10 corresponds to the "well-known port" in the remote machine 30' which has been defined by the network protocol as the port by which the remote machine 30' establishes communication connections with client machines 10. The well-known port 2512 has a rudimentary protocol stack 2514 which includes primarily an endpoint data structure 2516.

The endpoint data structure 2516 points to the communication protocol stack 76 and client connection thereby establishing a unique representation or "handle" for the client machine 10. The endpoint data structure 2516 permits the connection between the remote machine 30' and the client machine 10 to be moved at will between the connection manager 2518 and the various resources 2506 on the machine 30'. In some embodiments, the endpoint data structure 2516 permits the connection between the remote machine 30' and the client machine 10 to be moved at will to or from a virtual machine providing management functionality for a virtual machine on the remote machine 30'.

The endpoint data structure 2516, in one embodiment, not only contains the handle to the client machine 10 but may also contain other information relating to the client connection. In the embodiment shown, the machine 30' monitors activity on a specific communications system (e.g. LAN or WAN) and has initialized this minimum protocol stack 76 with only the necessary protocol modules needed to support a "TTY" communication mode. The "TTY" communication mode is a simple ASCII stream with no protocol assumptions above the transport layer. That is, there are no protocol layers for compression, encryption, reliability, framing, or presentation of transmitted data. Thus a client machine 10 seeking a resource 2506 running on the client machine 10' establishes a connection to the well-known communications port 2512 with the minimum protocol set needed to support a TTY communication mode.

A connection manager 2518 executing on the machine 30' is "listening" to the well-known communications port 2512 for a connection request 2510. When a connection request 2510 is received from the client machine 10, the connection manager 2518 is notified 2520. The connection manager 2518 knows which protocol is being used based on the notification 2520.

With this information the connection manager 2518 creates a new minimum protocol communications stack 2522, starts a computing environment 2524 (referred to throughout this discussion as an execution environment 2524) and binds the new minimum protocol stack 2522 to the execution environment 2524. In some embodiments, the connection manager 2518 creates a new minimum protocol stack 2522 in a virtual machine on the remote machine 30'. In other embodiments, the connection manager 2518 creates a new minimum protocol stack 2522 in a virtual machine providing administrative or management functionality for a virtual machine executing on the remote machine 30'. In still other embodiments, the connection manager 2518 creates a plurality of minimum protocol stacks 2522, each of which may be located on the remote machine 30', in a computing environment provided by a virtual machine executing on the remote machine 30', or on a virtual machine providing administrative or management functionality for a virtual machine executing on the remote machine 30'.

In one embodiment, the remote machine 30' includes a number of execution environments 2524 which have been previously been started, but which have not been associated with a communications port. In this embodiment, the preconnection starting of the execution environments permits a faster response time than if each execution environment 2524 is started when the connection request is received from the client machine 10. When the execution environment 2524 is started, the resource 2506 requested by the client machine 10 is also started. In another embodiment, if the client machine 10 does not specify a resource, either a default application is started or the execution environment 2524 with no resource started. In some embodiments, the execution environment 2524 is the requested resource.

The connection manager 2518 then moves the client connection, including the unique client identifier or handle, from the well-known port 2512 to the new minimum protocol stack 2522. In some embodiments, the connection manager 2518 moves the client connection to the new minimum protocol stack 2522 in a virtual machine on the remote machine 30'. In other embodiments, the connection manager 2518 moves the client connection to the new minimum protocol stack 2522 in a virtual machine providing administrative or management functionality for a virtual machine executing on the remote machine 30'. In still other embodiments, the connection manager 2518 moves portions of the client connection to a plurality of minimum protocol stacks 2522, each of which may be located on the remote machine 30', in a computing environment provided by a virtual machine executing on the remote machine 30', or on a virtual machine providing administrative or management functionality for a virtual machine executing on the remote machine 30'.

The connection manager 2518, using the minimum protocol stack 2522 sends a TTY data stream that indicates service is available. Thus, this method for detecting a client connection is independent of the port to which the connection is first established. If the client machine 10 does not respond within a prescribed time period (e.g. 5 seconds) to the service available message, a resend of the "service available" message is performed by the machine 30'.

If the client machine 10 receives the message, the client machine 10 sends a TTY string indicating that the "service available" message was detected. The client machine 10 waits for the machine 30' to respond and if the response is not within a prescribed time interval (e.g. 5 seconds) the client machine 10 resends the message. The connection manager 2518 then queries 90 the client machine 10 asking for the client's default communication parameters. This query 90 takes the form of a message which is passed back to the client machine 10 and which indicates that the client machine 10 should respond with details regarding what protocols the client machine 10 would like to use in the connection.

In response, the client machine 10 sends a set of protocol packets 2526; each packet of which is used to specify a required or optional protocol module that is being requested from the remote machine 30'. In one embodiment, the number of packets in the set is variable with one packet being sent for each protocol requested. In another embodiment, the number of packets that is being sent is included in the header of the first packet. In a third embodiment, the remaining number of packets being sent is included in the header of each packet and is decremented with each succeeding packet sent. Thus, the client machine 10 may respond to the query 2528 by indicating that, for example, encryption and data compression will be used. In such a case, two protocol packets will be sent from the machine client 10 to the remote machine 30' and, in one embodiment, the header of the first packet will indicate the number of packets as two.

Once the responses to the query 90 have been received, the connection manager 2518 builds a protocol stack using protocol drivers 2530, 2530', 2530" which correspond to the protocols requested by the client machine 10. In one embodiment, the connections manager 2518 places each of the required protocol drivers 2530, 2530', 2530", corresponding to the requested client protocols (e.g. an encryption driver if encryption is desired by the client) into the protocol stack "container" 2532 and links them together. In some embodiments the connections manager 80 places protocol drivers 2530, 2530', 2530" into a plurality of protocol stack "containers" 2532 residing in different locations and links the plurality of protocol stack "containers" 2532. This dynamic process allows a client machine 10 to specify the contents of a protocol stack dynamically without requiring that the machine 30' have a prior protocol stack description for a particular client machine 10. Using this method, multiple client machines 10 may be served by a single machine 30, even if the separate client machines 10 have vastly differing requirements for the associated communications channel. In the embodiment shown, each client machine 10, 10', 10" is associated with a respective communications protocol stack 2522, 2522' and 2522". Such dynamically extensible protocol stacks are described in more detail below.

In the embodiment just discussed, the "container" 2532 is a user level or kernel level device driver, such as an NT device driver. This container driver provides ancillary support for the inner protocol modules or "drivers" (generally 2530) which correspond to the protocol requirements of the client machine 10. This ancillary support is in the form of helper routines that, for example, aid one protocol driver to transfer data to the next driver. Alternatively, in another embodiment each protocol driver is a complete user-level or kernel-level driver in itself.

Figure 26:
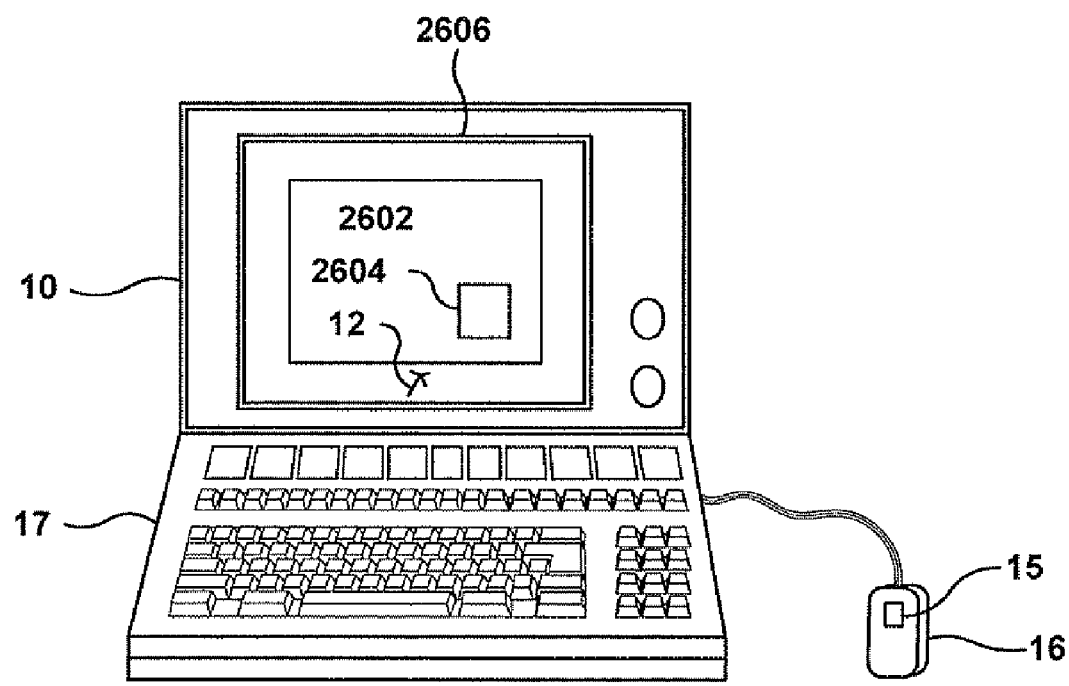
FIG. 26 is a block diagram depicting one embodiment of a client machine architecture.

Referring now to FIG. 26, the viewing user uses a so-called "browser" program to display an HTML page 2602 having a resource window 2604 on the screen 2606 of the user's client machine 10. Once the viewing user has indicated that execution of the resource 2506 should commence, the browser application 2706 instantiates a parameter handler 2708 and passes the instantiation parameters associated with the resource window 2604 by the generic embedded window tag 2704. The parameter handler 2708 instance spawns a network executive 2710 and passes to it the parameters of the resource window 2604. The network executive 2710 determines which resource 2506 is to be invoked, and on what machine 30' that resource 2506 resides. Generally this information is passed to it by the parameter handler 2708 instance which gets it from the browser application 2706 in the form of the generic embedded window tag 2704, but the network executive 2710 may need to query another remote machine 30, in order to determine which servers, if any, host the desired resource 2506. The network executive 2710 then begins execution of the resource and displays the output of the resource 2506 in the resource window 2604 as described in detail above.

The network executive 2710 continues to directly display resource output in the resource output window 2604' until the viewing user indicates that execution of the resource 2506 should stop, e.g. by closing the resource window 2604, or until the viewing user clicks on a tag indicating that a different HTML page should be displayed. When this occurs, execution of the resource 2506 can be terminated. It is preferred, however, is to "cache" the connection. In effect, the first parameter handler 2708 instance is not immediately terminated. However, the resource 2506 continues executing with a reduced priority level, i.e. in "background" mode, because the first parameter handler 2708 no longer has "focus".

In general, it is desirable to accomplish connection caching by providing the parameter handler 2708 source code with a globally accessible data structure for registering instances.

For example, the parameter handler 2708 may be provided with a globally accessible linked list data structure, data array, data table, or other data structure. Because the data structure is globally available, each instance of the parameter handler 2708 is able to read and write the data structure. This allows each instance of the parameter handler 2708 to "register" with every other instance by writing to the data structure to signal its existence.

For embodiments in which no other connection information is stored, a predetermined limit on the number of connections that may be cached at any one time can be set. In these embodiments if registration of an instance would result in an excess number of cached connections, one of the "cached" connections is removed, i.e. the parameter handler 2708 instantiation associated with that connection is notified that it should terminate. Before termination, the parameter handler 2708 notifies its associated network executive 2710 that it should terminate. In turn, the network executive 2710 closes its session with the server hosting the resource 2506 and then terminates.

In embodiments in which other information is stored, the additional information may be used to more effectively manage the cached connections. For example, if a user has not actively viewed an HTML page 2602 in a predetermined number of minutes, e.g. ten minutes, the parameter handler 2708 instantiation is instructed to terminate, the session with the hosting server is terminated, and the parameter handler 2708 instance removes its entry in the registry.

Cached connection information may be managed using any known cache management scheme. Connection entries may be discarded on a "first in, first out" basis, i.e. the oldest entry is discarded each time a new entry must be added. Alternatively, cached connection information entries may be discarded on a "least recently used" basis, which discards information relating to connections which have been used the least amount by the user. Other cache management techniques, such as random replacement, may also be used.

If the viewing user returns to a previous HTML page 2602 having a cached connection, the network executive 2710 associated with the HTML page 2602 is returned to the foreground, i.e., it regains "focus", and processing of the associated resource resumes at a normal priority level. If necessary, the network executive 2710 re-establishes the connection with the resource 2506. Although no output data is stored by the network executive 2710 for cached connections, as soon as a connection is re-established for a resource window 2604 the connection to the resource 2506 is re-established and the resource 2506 again writes directly to the resource window 2604.

Figure 27:
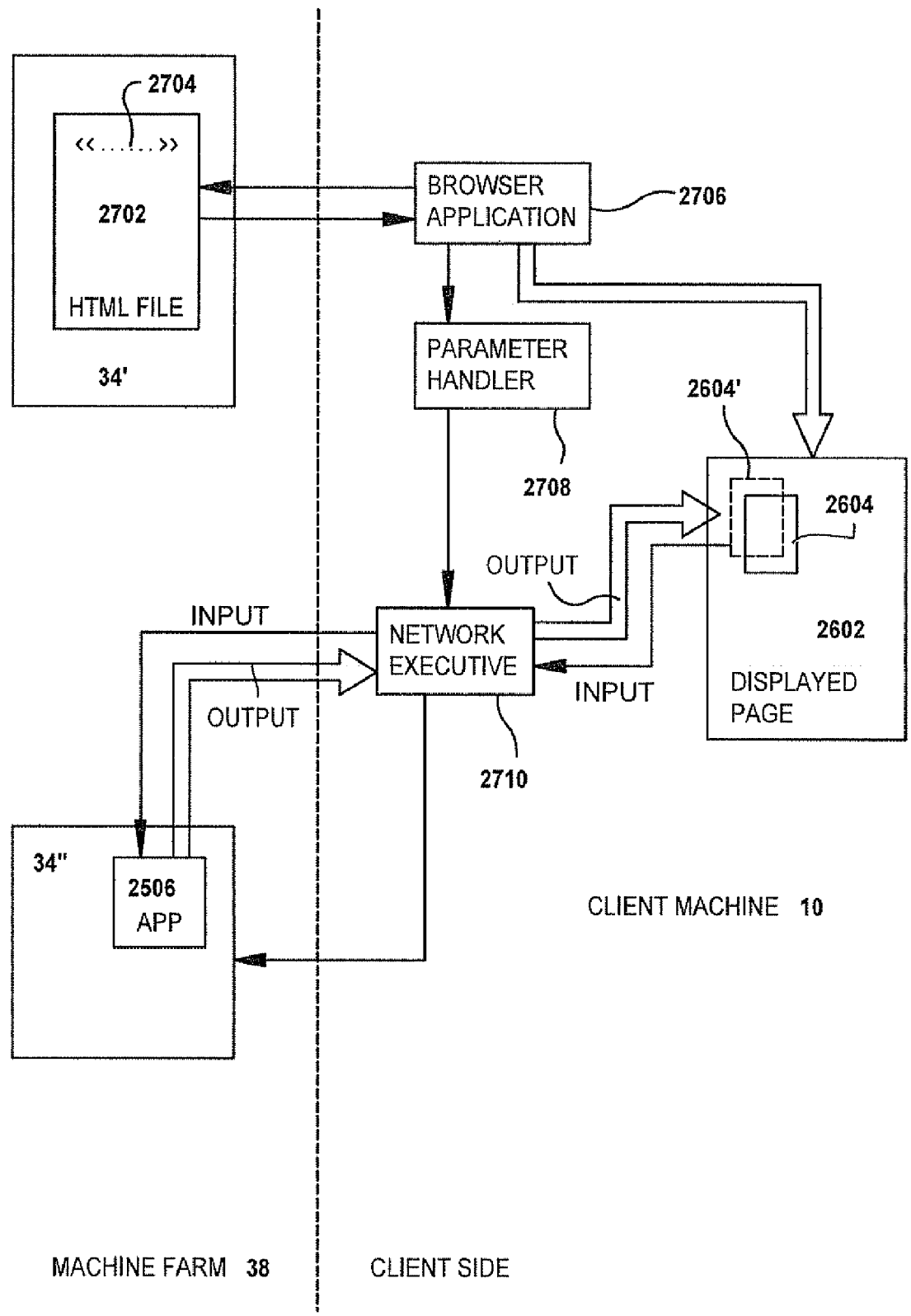
FIG. 27 is a block diagram depicting one embodiment of communication between a client machine and a machine farm.

Referring to FIG. 27, an HTML file 2602 located on a machine 30' and constructed in accordance with an embodiment of the invention includes a generic embedded window tag 2704. The generic embedded window tag 2704 is any data construct which indicates to a browser 60 displaying the HTML file 2602 that a generic embedded window 2604 should be displayed at a particular location in the HTML page 2602 described by the HTML file 2602. The generic embedded window tag 2704 may include additional information, such as height of the window, width of the window, border style of the window, background color or pattern in the window, which resources may be displayed in the window, how often the output display should be updated, or any other additional information that is useful to enhance display of the resource output.

Some examples of generic embedded window tags that can be embedded in an HTML file follow.

```
ActiveX tag
    <object classid="clsid:238f6f83-b8b4-11cf-8771-00a024541ee3"
        data="/ica/direct.ica" CODEBASE="/cab/wfica.cab"
        width=436 height=295>
        <param name="Start" value="Auto">
        <param name="Border" value="On">
    </object>
Netscape Plugin tag
    <embed src="http://www.citrix.com/ica/direct.ica"
        pluginspage="http://www.citrix.com/plugin.html"
        height=295 width=436 Start=Auto Border=On>
    <embed>
JAVA tag
    <applet code=JICA.class width=436 height=295>
        <param name=Address      value="128.4.1.2602">
        <param name=InitialProgram value=Microsoft Word 7.0>
        <param name=Start         value=Auto>
        <param name=Border        value=On>
    </applet>
```

In each case above, the tag indicates that a window having a height of 295 pixels and a width of 436 pixels should be drawn to receive resource output. Each tag also specifies that the resource should automatically start execution and that the window in which the resource output is displayed should be drawn with a border. The ActiveX and Netscape Plugin tags have the remote resource parameters specified in the file "direct.ica" located in the directory "/ica." The JAVA tag specifies the remote resource parameters directly. In the example above, the address of the machine 30 hosting the resource is specified as well as the name of the resource to be executed.

The browser application 2706 accesses the HTML file 2602 by issuing a request to a specific Uniform Resource Locator (URL) address. The machine 30' hosting the HTML file 2602 transmits the HTML file 2602 data to the browser application 2706, which displays text and translates any tags that are included in the HTML file 2602. The browser application 2706 displays the HTML file 2602 data as an HTML page 2602. If a generic embedded window tag 2704 is present in the HTML file 2602, such as one of the tags described above, the browser 60 draws a blank window 2604 in the displayed HTML page 2602.

Execution of the desired resource 2506 may commence immediately upon display of the HTML page 2602 or execution may await some signal, e.g. a specified user input which indicates execution of the resource 2506 should begin. Once execution of the resource 2506 is commenced, the browser application 2706 instantiates a parameter handler 2708 associated with the resource window 2604. The parameter handler 2708 instance may be spawned as a child process of the browser application 2706, as a peer process of the browser application 2706, a statically-linked thread of execution, a dynamically-link thread of execution, or as a Dynamically Linked Library ("DLL") associated with the browser application 2706.

The browser application 2706 passes any specific parameters associated with the resource window 2604 that were provided by the generic embedded window 66 tag to the parameter handler 2708 instance. Additionally, the browser application 2706 may pass the handle for the resource window 2604 to the parameter handler 2708 instance or the parameter handler 2708 instance may query the browser application 2706 to retrieve the handle for the resource window 2604. The parameter handler 2708 instance also spawns a network executive 2710. The network executive 2710 may be spawned as a child process of the parameter handler 2708 instance, a statically-linked thread of execution, a dynamically-link thread of execution, or as a peer process of the parameter handler 2708 instance.

The parameter handler 2708 instance forwards any specified resource window 2604 parameters to the network executive 2710. Parameters which are not specified by the parameter handler 2708 instance or the embedded generic window tag 2704 may be set to default values. The network executive 2710 may have certain parameter defaults hard-coded, or the network executive 2710 may access a file which contains parameter defaults.

The network executive 2710 creates its own resource output window 2604'. The network executive 2710 creates its resource output window 2604' as a child of the displayed resource window 2604 and displays its resource output window 2604' directly over the parent window 2604 drawn by the browser application 2706. Since the resource output window 2604' drawn by the network executive 2710 is a child of the resource window 2604 drawn by the browser application 2706, the resource output window 2604' inherits various properties of its parent including position information. Accordingly, the resource output window 2604' will follow the resource window 2604 as the viewing user scrolls the screen of the browser application 2706 or performs other actions which vary the position of the resource window 2604.

The network executive 2710 also establishes a communications channel with the machine 30' and invokes execution of the desired resource 2506 by the machine 30' using the connection methodology described above. The network executive 2710, which acts as the client machine 10 in the above description, passes any parameters it received from the parameter handler 2708 instantiation to the machine 30', along with any necessary default values. If a parameter is not passed to the machine 30', the machine 30' may request the parameter if it is a necessary parameter which has no default value, e.g. "user id," or it may provide a default value for the parameter, e.g. execution priority. The machine 30' begins execution of the desired resource 2506 and directs the output to the network executive 2710. The network executive 2710 receives data from the resource 2506 and displays the output data in its resource output window 2604'. Since the resource output window 2604' is drawn on top of the resource window 2604 drawn by the browser application 2706, the resource output data is displayed in the HTML page 2602. As noted above, the resource output window 2604' drawn by the network executive 2710 is a child of the resource window 2604 drawn by the browser application 2706. This allows the resource output window 2604' to scroll as the HTML page 2602 is scrolled The resource output window 2604' also receives input from the viewing user. Raw input data, e.g. a mouse click, is received into the resource output window 2604' by the network executive 2710. The network executive 2710 forwards the raw input data to the resource 2506 executing on the machine 30" In this manner, the viewing user is able to interact with the resource 2506 via the HTML page 2602.

Figure 28:
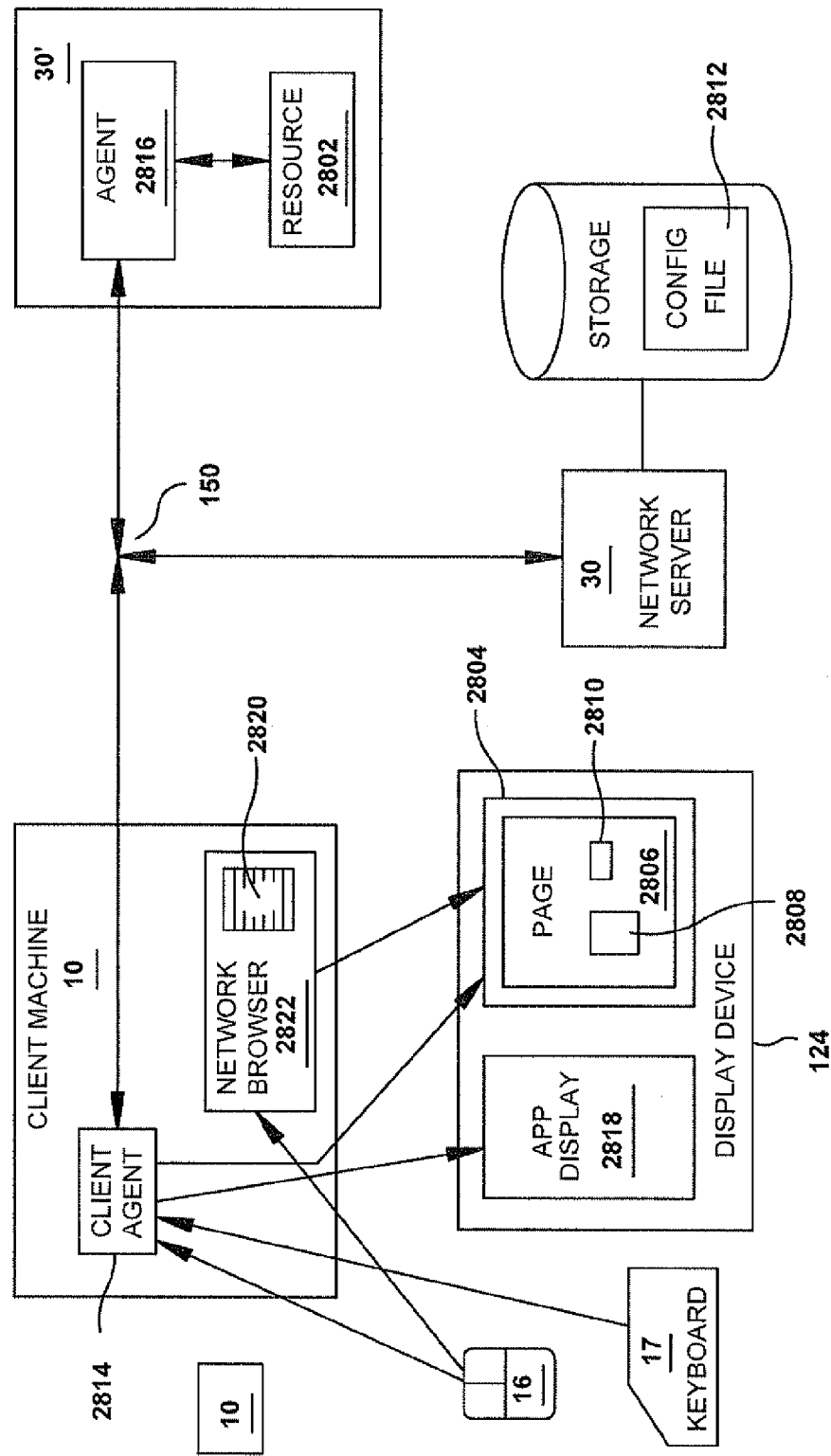
FIG. 28 is a block diagram depicting one embodiment of a client machine architecture.

Referring now to FIG. 28, and in brief overview, an embodiment of an interactive hypermedium system of the invention includes a client machine 10, a network remote machine 30 and an execution remote machine 30' interconnected by a communications link 150, herein referred to without any loss of generality as a network or web. The network remote machine 30 may be provided by a remote machine 30. The execution machine 30' may be provided by a physical machine or a virtual machine.

A user on a client machine 10 wishing to access the resource 2802 which is located on the execution machine 30' on the web 150 does so through a graphical user interface 2804, which is herein referred to without any loss of generality as a hypermedium, located on the client machine 10. The graphical interface is displayed on a graphical display device 124. Data is entered by a mouse 16 and a keyboard 17 located on the client machine 10. The graphical display or page 2806 which the user first views on the hypermedium 2804 is referred to herein without any loss of generality as the home page or web page of the resource 2802. A page 2806 or home page of the hypermedium 2804 includes a graphic link 2808 or textual link 2810 herein referred to without any loss of generality as a hyperlink. The web page is displayed by a process 2602 referred to herein without any loss of generality as a network browser 2602 executing on the client machine 10.

The network browser 2602 obtains the first page or web page 2806 from a network remote machine 30 and displays the web page 2806 on the hypermedium 2804 for the user to view on the graphical display device 124. When the user selects a resource 2802 to access (by selecting a graphical 2808 or textual 2810 hyperlink using the mouse 16 or keyboard 17) the network browser 2602 obtains a network configuration file 2812 corresponding to the selected resource 2802 from a predetermined network server 2606 and starts a client agent 2814 which will communicate with the selected resource 2802. This will be discussed in more detail below.

The client agent 2814 reads the configuration file 2812 and establishes a communications link to a server agent 2816 on the execution server 24 specified by the configuration file 2812. In one embodiment, the configuration file 2812 includes the name of the resource and the node location of the resource 2802 corresponding to the hyperlink 2808, 2810. The configuration file may also contain optional information such as authentication or authorized user information. Server agent 2816 performs the operations necessary (such as authentication) to permit the client agent 2814 access to the resource 2802, and once access is permitted, allows access to the resource 2802 requested by the user. The server agent 2816 may execute in a hypervisor, a virtual machine, or on an operating system. In some embodiments, the functionality provided by the server agent 2816 is split between a hypervisor and a virtual machine or between two virtual machines. In still other embodiments, the functionality provided by the server agent is split between a hypervisor and a guest operating system executing in a virtual machine. In some embodiments, a connection to a computing environment including the resource 2802 is established, as described in further detail below.

Once the resource 2802 is available on the execution server 30', the client machine 10 may access the resource 2802 through the server agent 2816 directly with the client agent 2814 without intervention by the network browser 2602. The client agent 2814 is then responsible for receiving data from the user through the mouse 16 and keyboard 17 and transmitting it to the resource 2802 on the execution machine 30'. Similarly, the client agent 2814 is responsible for receiving data from the resource 2802 on the execution machine 30' and displaying the data in a display window 2818 on the graphical display device 124 on the client machine 10. It should be noted that the display window 2818 may be located within the boundaries or outside the boundaries of the hypermedium 2804. When the resource 2802 is completed the server agent 2816 instructs the client agent 2814 to disconnect the communication link 150 between the client agent 2814 and the server agent 2816. In some embodiments, the server agent 2816 may reside outside of the execution machine 30'. In other embodiments, the client agent 2814 may reside outside of the client machine 10.

Figure 29:
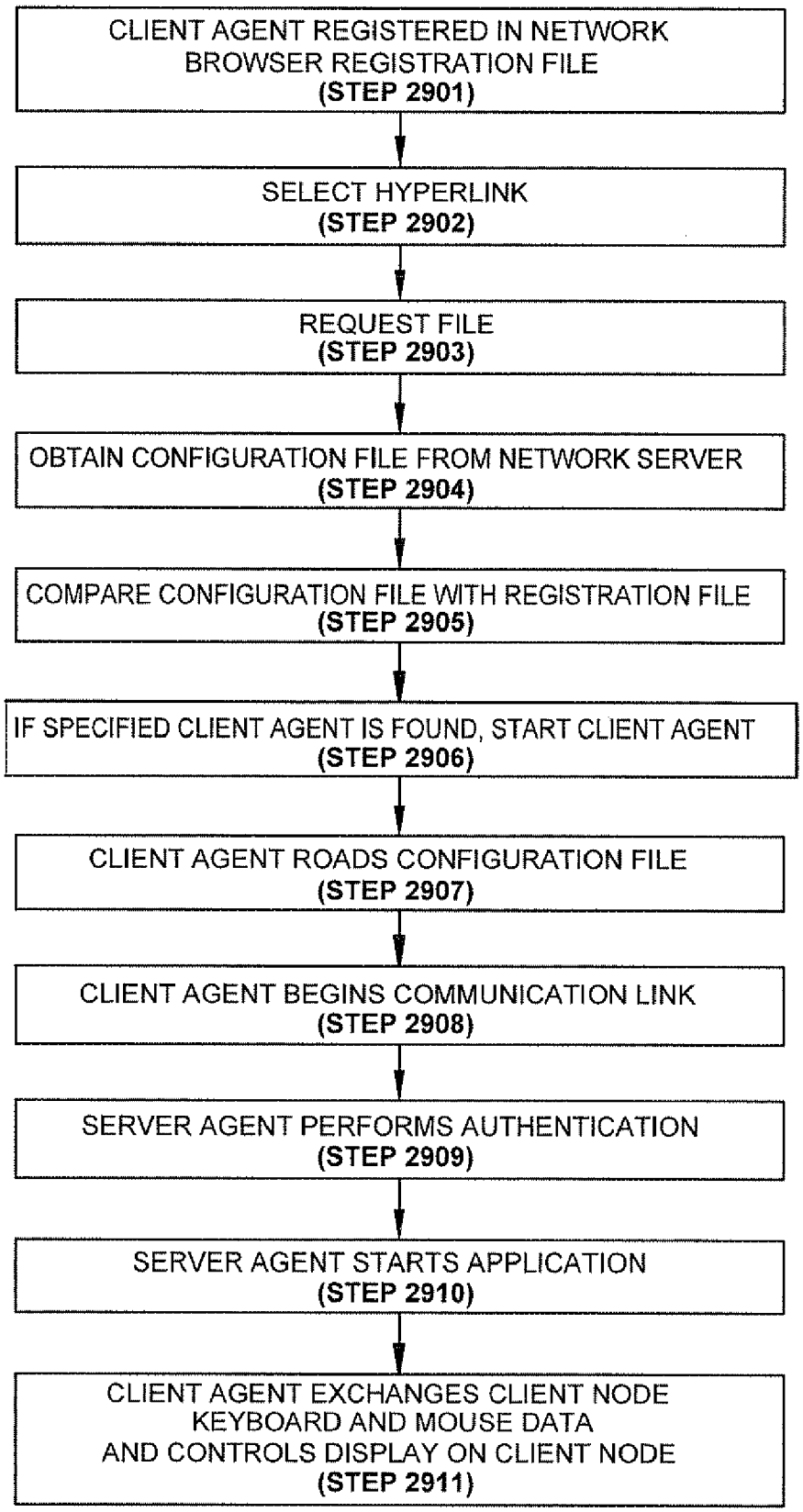
FIG. 29 is a flow diagram depicting one embodiment of the steps taken to display application output in a web page.

FIG. 29 depicts the operation of the system in more detail. Initially, the client agent 2814 is registered (step 2901) with the network browser 2602 of the client machine 10 and an entry is made in the network browser's registration file 2820 (FIG. 28). This entry permits the network browser 2602 to start the client agent 2814 whenever a given file type (including types such as a MIME type) is requested by the hyperlink 2808, 2810 of the hypermedium 2804. In this case the client agent 2814 is designed to permit a user on the client machine 10 to execute and interact with a remote resource 2802 on an execution machine 30'. The client agent 2814 would be registered with the network browser 2602 such that whenever a hyperlink 2808, 2810 requested the given file type (for example .RMT for remote execution) from the network browser 2602, the network browser 2602 would start the client agent 2814 which would permit remote execution and interaction with a resource 2802 resident on an execution machine 30'. The invoking of the client agent 2814 is discussed in more detail below.

When a user wishes to access a resource from a hypermedium environment, for example a database program, the hypermedium 2804 is displayed in a manner that is well known to those skilled in the art. When the user selects a hyperlink 2808, 2810 on the page 2806 of the hypermedium (step 2902) by using the mouse 16 or keyboard 17 on the client machine 10, a request is made to the network browser 2602 for the corresponding data file (step 2903). In this example, the file type (.RMT) is requested.

The network browser 2602 obtains the corresponding configuration file 2812 from the network server 2606 which is specified in the file request made by the hyperlink 2808, 2810 to the network browser 2602 (step 2904). The network browser 2602 then compares the obtained configuration file 2812 with the registration file 2820 of client agent names which it maintains (step 2905). In one embodiment, the network browser 2602 compares a file type of the obtained configuration file 2812 with the registration file 2820. In another embodiment, the network browser 2602 compares an entry in the obtained configuration file 2802 with the registration file 2820. If the client agent 2814 specified by the configuration file 2812 is found in the registration file 2820, the client agent 2814 is started (step 2906).

The invoked client agent 2814 reads the configuration file 2812 (step 2907), and based upon the information in the configuration file 2812, begins to establish a communication link with the server agent 2816 on the execution server 24 (step 2908), in this case the sales database application execution server (generally 30').

Considering the process of beginning the communications link of step 2908 (FIG. 29) in more detail, communication begins with the server agent 2816 monitoring communication activity on the network 150. At this point, no protocol assumptions are made by the server agent 2816 beyond those necessary for the transport layer. Similarly, the client agent 2814 also makes no assumption of the communications protocol beyond that required by the transport layer. Once the server agent 2816 determines that a client agent 2814 is attempting to communicate with it, the server agent 2816 transmits a message to the client agent 2814 indicating that service is available.

Once the client agent 2814 determines that service is available on the execution remote machine 30', the client agent 2814 transmits a message to the server agent 2816 indicating that it is ready to proceed with the communication protocol. Once the server agent 2816 has responded that it is ready to continue the communication protocol, the client agent 2814 enables the protocol necessary for it to run the application 36.

In response to the message from the client agent 2814, the server agent 2816 also enables the required protocol. The server agent 2816 then transmits a message using the required protocol indicating that the client agent's request has been received and accepted.

In response the client agent 2814 and the server agent 2816 exchange a set of messages which negotiate the parameters under which communications will occur. Once negotiations are complete, the client agent 2814 and the server agent 2816 are able to communicate as necessary for the resource 2802 to be run by the user.

Once the communications protocol has been established and the server agent 2816 has authenticated the client agent 2814 (step 2909) (for example determining that the user has permission to read and write to the database) access to the resource 2802 (step 2910) is provided by the application execution server 24. At this point resource 2802 on the execution server 30' is communicating via the server agent 2816 with the client agent 2814 on the client machine 10. The client agent 2814 is now responsible for transmitting data input by the user using the mouse 16 and keyboard 17 to the resource 2802 on the execution machine 30'. Further, the client agent 2814 is responsible for receiving data for display from the resource 2802 and displaying that data in the application window 2818 on the graphical display device 124 of the client machine 10.

It should be noted that the underlying presentation protocol which passes data to a transport layer such as TCP/IP must be capable of transferring graphical information. Examples of such protocols which may be used for interactive hypermedia communication include public domain X11 protocol, the proprietary Independent Computing Architecture (ICA) protocol of Citrix Systems Inc., or the proprietary Remote Desktop Protocol (RDP) of Microsoft Corporation.

Thus the above described system permits a user on a client machine 10, which may have very limited resources, to start and interact with a resource 2802 located on an execution machine 30'. The resource 2802 then runs on the execution machine 30' and the data is input and the results displayed on the client machine 10. In some embodiments, the accessed resource 2802 executes in a virtual machine provided by the remote machine 30'.

Figure 30:
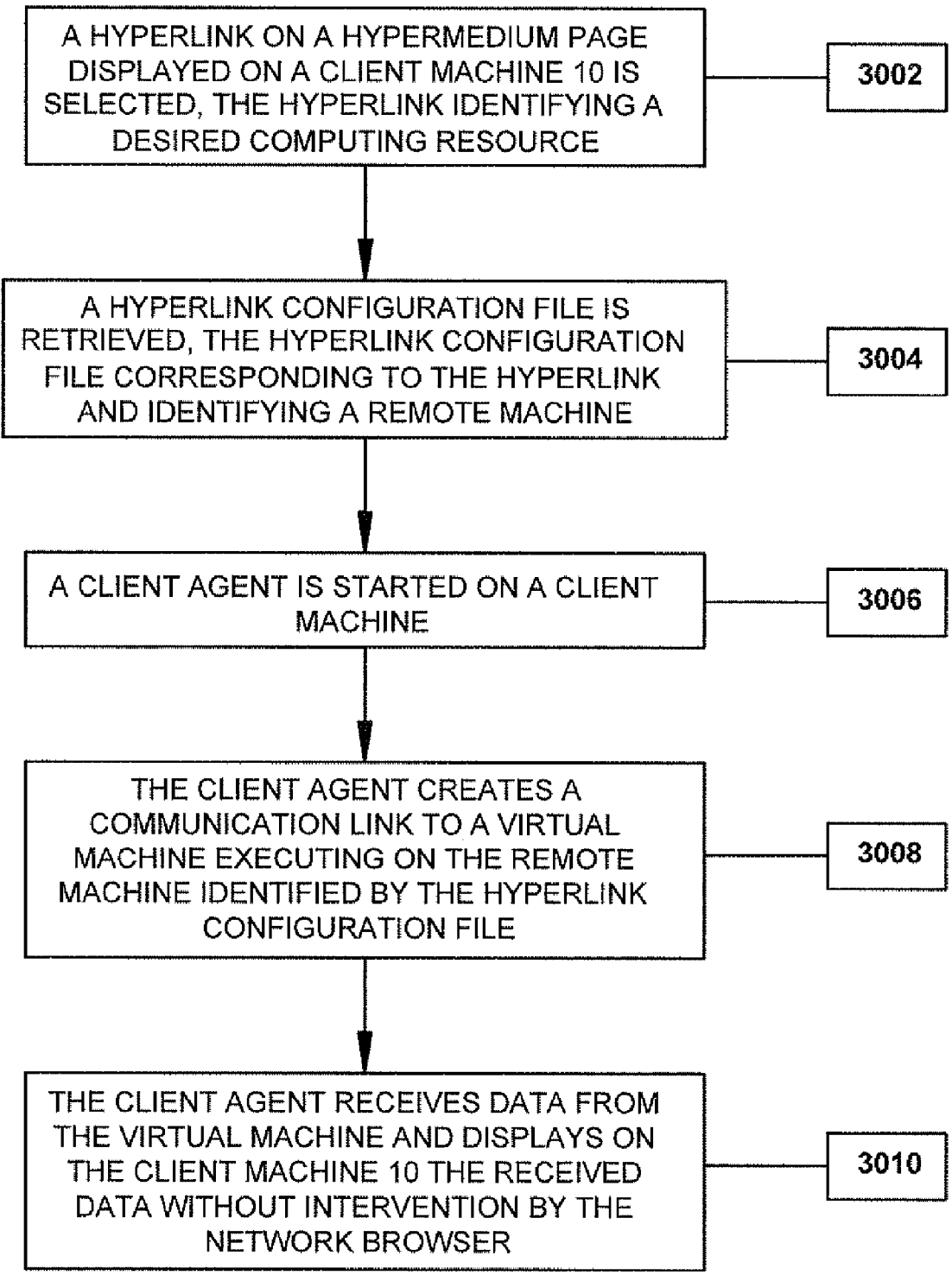
FIG. 30 is a flow diagram depicting one embodiment of the steps taken link to a virtual machine identified by a hyperlink configuration file.

Referring now to FIG. 30, a flow diagram depicts an embodiment of method of making a hypermedium page interactive, the hypermedium page displayed by a network browser. As described above, a hyperlink on a hypermedium page displayed on a client machine 10 is selected, the hyperlink identifying a desired computing resource (step 3002). A hyperlink configuration file is retrieved, the hyperlink configuration file corresponding to the hyperlink and identifying a remote machine 30' (step 3004). A client agent is started on a client machine 10 (step 3006). The client agent creates a communication link to a virtual machine executing on the remote machine 30' identified by the hyperlink configuration file (step 3008). The client agent receives data from the virtual machine and displays on the client machine 10 the received data without intervention by the network browser (step 3010).

A hyperlink on a hypermedium page displayed on a client machine 10 is selected, the hyperlink identifying a desired computing resource (step 3002). In one embodiment, the hypermedium page is obtained from a remote machine 30 prior to selection of the hyperlink on the hypermedium page. In another embodiment, the hypermedium page is received responsive to a request for an enumeration of available resources.

A hyperlink configuration file is retrieved, the hyperlink configuration file corresponding to the hyperlink and identifying a remote machine 30' (step 3004). In one embodiment, a remote machine 30, functioning as a brokering machine, identifies the remote machine 30'. In another embodiment, the remote machine 30' functions as an execution machine. In still another embodiment, a hypervisor executes on the remote machine 30'. In yet another embodiment, a virtual machine is launched into a hypervisor executing on the remote machine 30. In some embodiments, a server agent starts on a virtual machine in the remote machine 30'.

A client agent is started on the client machine 10 (step 3006). In one embodiment, the client agent is started by the network browser upon a successful match of an entry in the hyperlink configuration file with an identifier associated with the client agent in a registration file accessible by the network browser. In another embodiment, the client agent is registered with the network browser.

The client agent creates a communication link to a virtual machine executing on the remote machine 30' identified by the hyperlink configuration file (step 3008). In one embodiment, execution of an identified application program begins on the virtual machine in response to the created communication link. In another embodiment, the client agent creates the communication link without intervention by the network browser.

The client agent receives data from the virtual machine and displays on the client machine 10 the received data without intervention by the network browser (step 3010). In one embodiment, the data received from the virtual machine is displayed in a display window on the client machine 10. In some embodiments, a presentation layer protocol is employed for communication over the communication link.

Referring back to FIG. 28, in some embodiments of a system for making a hypermedium page interactive, access to a requested computing environment is provided through the interactive hypermedium page. The client machine 10 executes a browser application 2602. A remote machine 30 functions as a network server 2606 and transmits a network configuration file to the client machine 10. A client agent 2814 executing on the client machine 10 establishes a communications link with a remote machine 30', functioning as an execution machine 30'.

As described above, the client machine 10 executes a browser application 2602, which displays a hypermedium page including a hyperlink identifying a resource 2802. A remote machine 30 functions as a network server 30 and transmits, in response to selection of said hyperlink, a network configuration file to the client machine 10, the network configuration file corresponding to said identified computing resource 2802. In some embodiments, a process obtains the hypermedium page from the network server 30 and provides the hypermedium page to the client machine 10.

In one embodiment, the network configuration file comprises a resource identifier corresponding to said hyperlink and a virtual machine address corresponding to said hyperlink. In some embodiments, the virtual machine address is a virtual IP address provided by a hyperlink in which the virtual machine executes. In other embodiments, the virtual machine address is an IP address associated with an execution machine 30' on which the virtual machine executes.

A client agent 2814 executing on the client machine 10 establishes a communications link with a remote machine 30', functioning as an execution machine 30'. The client agent 2814 establishes the link responsive to data in the network configuration file. In one embodiment, a hypervisor executes on the execution machine 30' and a virtual machine providing the resource 2802 executes in the hypervisor. In some embodiments, the virtual machine transmits data to the client agent 2814 for display without intervention by the browser application 2602. In one of these embodiments, the virtual machine provides access to the requested resource 2802 and the data is output from an execution of the requested resource 2802.

In some embodiments, the client agent establishes, responsive to data in the configuration file, a communications link with a management program executing on a remote machine. In one of these embodiments, the management program executes on the network server 2606. In another of these embodiments, the management program executes on the execution machine 30'. In still another of these embodiments, the management program executes on a virtual machine in the execution machine 30'. In yet another of these embodiments, the management program executes on a virtual machine having management privileges on the execution machine 30' or on a remote machine 30". In other embodiments, the management program launches the virtual machine providing the desired computing resource into a hyperlink on the execution machine 30'.

In some embodiments, the client agent 2814 displays data received from said virtual machine in a display window located at the client machine 10. In one of these embodiments, the display window is located within the boundaries of the hypermedium page. In another of these embodiments, the display window is located outside the boundaries of the hypermedium page.

Figure 31:
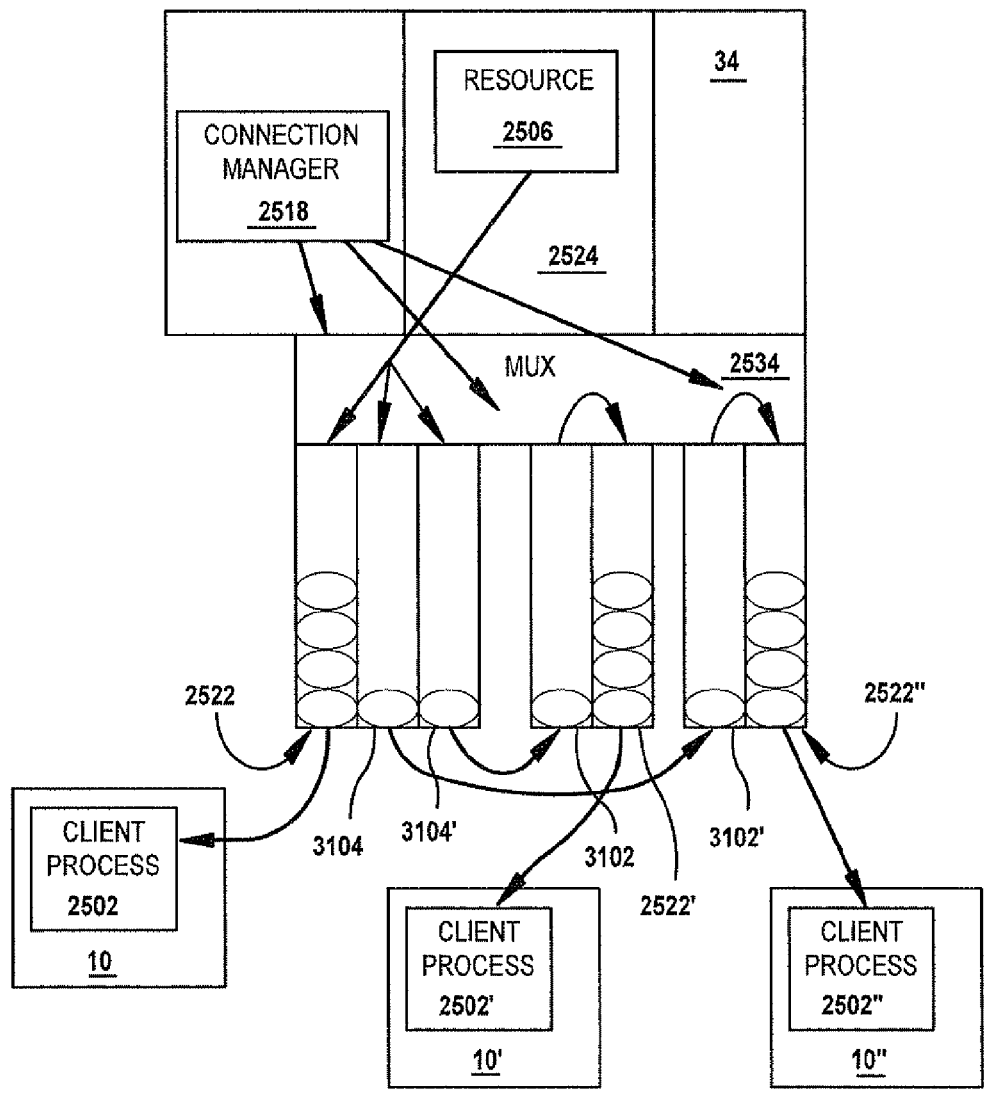
FIG. 31 is a block diagram depicting an embodiment of a system architecture in which a multiplexer is used to transmit data to more than one client machine.

Referring to FIG. 31, in some embodiments of the methods described above, data transmitted by the resource 2506 is sent to other remote machines 30 prior to being sent to client machines 10. In this manner, data transmitted by the resource 2506 is transmitted to an increasing number of client machines 10 as the network fans out.

When each client machine 10 terminates its connection with the machine 30', each client protocol stack (generally 2522) and its associated minimal stack (generally 3102) is destroyed. Similarly, the minimal protocol stack (generally 3104) associated with the first client protocol stack 2522 is also destroyed. When the last of the minimal 3102 and second (and subsequent) client protocol stacks 2522 has terminated, the configuration is as it was initially with only a first client communications protocol stack 2522 associated with the execution environment 2524. Note that until all the second and subsequent client protocol stacks 2522 are terminated, the first client protocol stack 2522 may not be destroyed, even if the client machine 10 is no longer present.

As shown in FIG. 25 above, each execution environment 2524 communicates with each protocol stack 2522 through a multiplexer 2534, 2534', 2534". Now referring also to FIG. 31, it is possible for more than one machine 10 to receive data being transmitted to the client machine 10, for example, in order to shadow or monitor the transmission of data from a machine 30' or to broadcast data from a specialized broadcast application, such as a stock quotation application, from which the same data is broadcast or transmitted substantially simultaneously to a number of clients (generally 10).

In such a case, the client machine 10 causes the specialized resource 2506 to execute and transmit its data to the client machine 10 as discussed previously. When a client machine 10' requests access to the broadcast resource 2506, the connection manager 2518 begins to construct the protocol stack 2522' for the second client machine 10' as previously discussed with regard to the first client machine 10. However, because the resource 2506 is a broadcast application, the connection manager 2518 recognizes that it need not start an additional execution environment 2524 and instead takes the steps necessary to send the data from the broadcast resource 2506 to the client machine 10 and any additional machine 10".

First, the connection manager 2518 creates a first minimal communications protocol stack 3104 which it associates with a communications protocol stack 2522 of the first client machine 10. The connection manager 2518 next creates a second minimal protocol stack 3102 and associates it with the communications protocol stack 2522' of the second client machine 10'. As each additional client machine 10" requests access to the broadcast resource 2506, another minimal protocol stack 3104' is created and associated with the first client protocol stack 2522 and another minimal protocol stack 3102' and client protocol stack 2522" is created for each new client machine 10". The first client protocol stack 2522 and all the minimal protocol stacks 3104, 3104' associated with the first client protocol stack 2522, and each pair of client protocol stacks 2522', 2522" and minimal protocol stacks 3102, 3102' associated with each additional machine 10', 10" are in communication by way of a multiplexer 2534.

In some embodiments, the connection manager 2518 resides outside of a virtual machine executing on a remote machine 30' and creates minimal protocol stacks 3102 within the virtual machine executing on the remote machine 30'. In other embodiments, the connection manager 2518 resides outside of a virtual machine executing on a remote machine 30' and creates minimal protocol stacks 3102 within a second virtual machine providing management and administrative functionality for the virtual machine executing on the remote machine 30'. In still other embodiments, the connection manager 2518 resides outside of a virtual machine executing on a remote machine 30' and creates minimal protocol stacks 3102 within a hypervisor providing management and administrative functionality for the virtual machine executing on the remote machine 30'. In yet other embodiments, the connection manager 2518 resides outside of a virtual machine executing on a remote machine 30' and creates minimal protocol stacks 3102 within a host operating system on the remote machine 30' providing management and administrative functionality for the virtual machine executing on the remote machine 30'. In some embodiments, the connection manager 2518 resides inside a virtual machine executing on a remote machine 30' and creates minimal protocol stacks 3102 within the virtual machine executing on the remote machine 30'.

When a multiplexer 2534 is directing data to or receiving data from only one machine 10, the multiplexer 2534 is acting as a simple pass-through device. However, when there is more than one client machine 10, 10', 10" receiving data from or transmitting data to a single resource 2506, each multiplexer (generally 2534) takes on two additional configurations. In one configuration, the multiplexer 2534 is configured to send resource data to or receive data from both the first client protocol stack 2522 and each of the minimal communications protocol stacks 3104, 3104' associated with it. In the second configuration the multiplexer 2534 is configured to send data received by the minimal protocol stack 3102, 3102' to the client protocol stack 2522', 2522", respectively, associated with it. In this embodiment, the multiplexer 2534 may receive input data directly from each client protocol stack 2522, 2522', 2522".

The connection manager 2518 connects the minimal protocol stacks 3104, 3104' associated with the client machine 10 with the minimal protocol stacks 3102, 3102' respectively, of the second client machine 10' and subsequent client machines 10" and instructs the multiplexer 2534 to direct output from the resource 2506 to the communications protocol stack 2522 of the client machine 10 and its associated minimal protocol stacks 3104, 3104'. The multiplexer 2534 is also instructed by the connection manager 2518 to connect each second and subsequent client minimal protocol stack 3102, 3102' to its associated client protocol stack 2522, 2522', respectively. Data transmitted to the client machine 10 by way of the first client protocol stack 2522 is therefore also transmitted to the minimal protocol stacks 3104, 3104' associated with the client machine 10 and hence to the client machine 10' and subsequent client machines 10" by way of their associated protocol stacks 2522', 2522", respectively, and associated minimal protocol stacks 3102, 3102', respectively. In one embodiment, the protocol stack container includes a data structure to keep track of the number and type of protocols associated with a given resource 2506.

Figure 32:
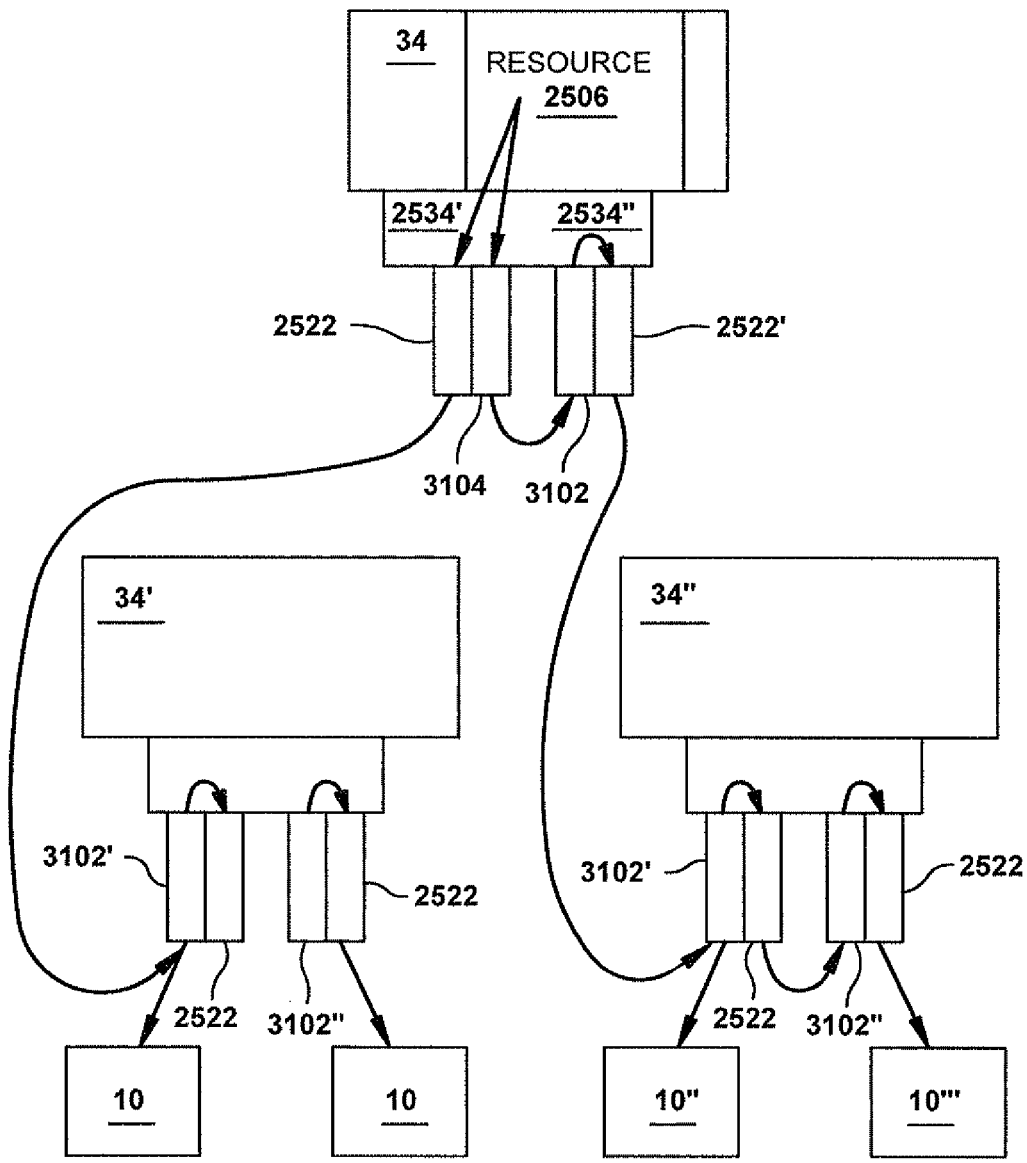
FIG. 32 is a block diagram depicting another embodiment of a system architecture in which a multiplexer is used to transmit data to more than one client machine.

Referring to FIG. 32, as discussed above, it is possible that the "clients" of one machine 30' be other remote machines 30' and 30" (only two being shown for simplicity). The remote machines 30' and 30" then transmit the data to client machines 10 or to additional remote machines 30'. In this embodiment the output of the server protocol stack (generally 2522) is connected to the protocol stacks 107' of the secondary remote machines 30' and 30". Then as described previously, the data is transmitted between the protocol stacks and out to the client machines 10. In this manner the data may fan out and be distributed to many more clients than may reasonably be supported by one server. In some embodiments, the output of the server protocol stack may be connected to protocol stacks 3102' created in virtual machines executing on remote machines 30.

In brief overview, in one embodiment of the methods described above, a user of a client machine 10 requests access to one or more resources from a remote machine 30, which may provide web server functionality. After authenticating the user's credentials, the web server accesses user-specific and resource-specific parameters from a memory coupled to the web server. The web server subsequently communicates these parameters to one or more remote machines 30 hosting the requested resources, and software processes operating on the resource servers execute and initialize the requested resources using the communicated parameters. In this manner, each instance of the resources is personalized for a particular requesting user. The particular network addresses of the resource servers hosting these personalized application programs are then forwarded to the user's client machine 10, which establishes a communications link and client-server session therewith.

Commands, events, graphical data, and window attribute information associated with the executing resources are communicated between the user device and the resource servers during the client-server session to ensure that the resource-output data is displayed seamlessly on the desktop of the user device. Seamless display of the resource-output data refers to the presentation of the data on the user desktop in a manner that is consistent with how locally-executing resources are presented and manipulated in the local desktop of the user device. A user may therefore view and interact with the resource-output data generated by the remote resources as if the resources were being executed locally.

In one embodiment, the output of the resources is displayed in one or more resource-output windows positioned within a web page displayed by a web browser of the user's device. The resource may be executing on a remote machine 30 or on a virtual machine executing on the remote machine 30. In a further embodiment, the attributes of the resource-output windows can be modified so that the resource-output windows are moveable and resizable within the boundaries of the web page. In another embodiment, the resource-output windows initially appear within the boundaries of the web page and are subsequently moveable so that they are positioned outside the boundaries of the web page and thus give the appearance that the application-output windows correspond to locally-executing applications rather than to remotely-executing applications. In yet another embodiment, the application-output windows initially appear outside the boundaries of the web page and thus also appear to correspond to locally-executing applications. In one embodiment, the application output displayed in the application-output windows and the attributes of the application-output windows themselves are communicated and manipulated by software processes on the user's device and on the resource servers, without involvement of the web server or web browser that initially provided access to the resources.

Figure 33:
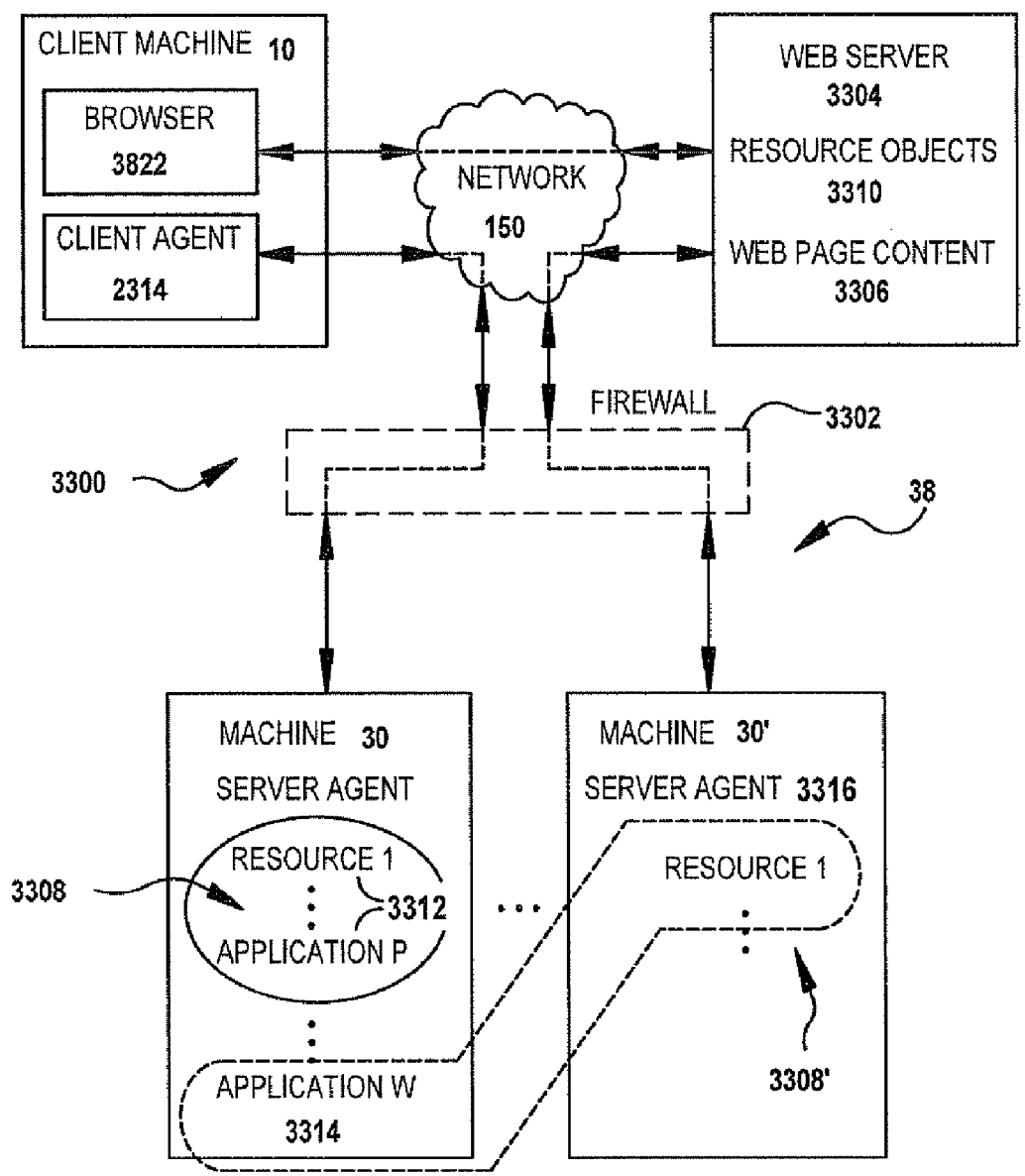
FIG. 33 is a block diagram depicting one embodiment of an architecture for displaying application output in a web page.

In more detail and with reference to FIG. 33, a server-based computing architecture 3300, capable of providing remote users with web-access to the full functionality of web and legacy applications (e.g., unmodified application programs that are not designed for web-based delivery), includes a client machine 10 (e.g., any digital data processing device), a web server 3304, one or more remote machines 30 that are either standalone or clustered within a machine farm 38 and which are preferably protected by a firewall 3302, and a data communications network 150 (e.g., Internet, Intranet, etc.) that provides the necessary connectivity to enable each of these elements to communicate with each other.

In other embodiments, the web server 3304 is a remote machine 30. In some of these embodiments, virtual machines may be executing on one or more of the remote machines 30, the virtual machines providing computing environments in which a requested resource resides and generates resource-output data.

In operation and also with reference to FIG. 28, a user of the client machine 10 directs a browser 2822 executing on the client machine 10 to submit a request for access to particular web page content 3306 accessible via the web server 3304. In one embodiment, the user enters a universal resource locator ("URL") address into the browser 2822. The URL is associated with the web page content 3306 hosted by the web server 3304 and the browser 2822 responds by transmitting the request for access to the appropriate URL address. The web server 3304 receives the request for access, which typically includes user credential information (e.g., user ID, password, group/project membership identifier, etc.), and authenticates the user to the machine farm 38 or to the individual servers 114 that provide at least some of the web page content 3306.

The web server 3304 authenticates the user by accessing an authentication process that compares the credentials entered by the user with previously-assigned credentials. In one embodiment, the authentication process and database of previously-assigned credentials are stored and maintained on the web server 3304. In other embodiments, the previously-assigned credentials can be stored in the machine farm 38, on individual application remote machines 30, and/or on an administrative server (not shown) that is coupled to the web server 3304 via the Internet or other data communication network.

In the scenario where the web page content 3306 corresponds to an enterprise portal, which provides access to a resource set 3308 (e.g., the set of resources that have been personalized for the user by a portal administrator), the web server 3304 accesses one or more resource objects 3310 (e.g., COM-compliant Java objects, ActiveX objects, HTML tags, etc.) that call web server-side scripts to authenticate the user and/or to obtain the resource set 3308 information associated with the portal and user from the machine farm 38. The resource objects 3310 also include properties that are associated with the user and/or the particular resources 3312 in the resource set 3308 that are provided via the portal. The user properties include, for example, group/project information that identifies the particular resources 3312 and data that the user needs to access in order to allow the user to collaborate with other members of the group/project. The resource properties include, for example, the user's preferences for each of the resources 3312 in the resource set 3308.

The scripts called by the resource objects 3310 establish a network session between the web server 3304 and the machine farm 38 via, for example, a central administrative process (not shown), which monitors and controls each resource machine 30 in the machine farm 38. The administrative process selects one or more resource servers, which host the resources 3312 in the resource set 3308 specified by the resource objects 3310, based, for example, on a server and/or network performance basis. The desired resource set 3308 can be provided entirely by a single server 30 by selecting/allocating each resource 3312 in the resource set 3308 from a plurality of resources 3312, 3314 hosted on the server 30. Alternatively, the resource set 3308' can be provided by a plurality of remote machines 30 with each machine 30 hosting at least one of the resources in the resource set 3308'.

The administrative process launches one or more server agents 3316 on the selected/allocated remote machines 30 in response to the scripts called by the resource objects 3310. Server agents 3316 are software processes that execute, initialize, and interact with each of the resources 3312 in the resource set 3308 in accordance with the properties specified by the resource objects 3310. In one embodiment, there is a server agent 3316 for each resource 3312 in the resource set 3308. In other embodiments, there is a single server agent 3316 for the resource set 3308, to the extent that all of the resources 3312 are hosted on the same server 30. In yet another embodiment, there is a single server agent 3316 for each server 30. The server agents 3316 then provide the output of the resources 3312 in the resource set 3308 as well as any other information relating to the resource set 3308 to the web server 3304, which subsequently formats the resource set information into the web page content 3306. The web page content 3306 can include application icons corresponding to one or more of the resources 3312 in the resource set 3308 as well as resource-output data from one or more of the resources 3312. In one embodiment, the resource-output data provided by the resources 3312 corresponds to graphical data that is formatted to fit into a window, which exhibits attributes (e.g., window position on the web page, size, style, z-order, etc.) as initially specified by the properties of the resource objects 3310.

Figure 34:
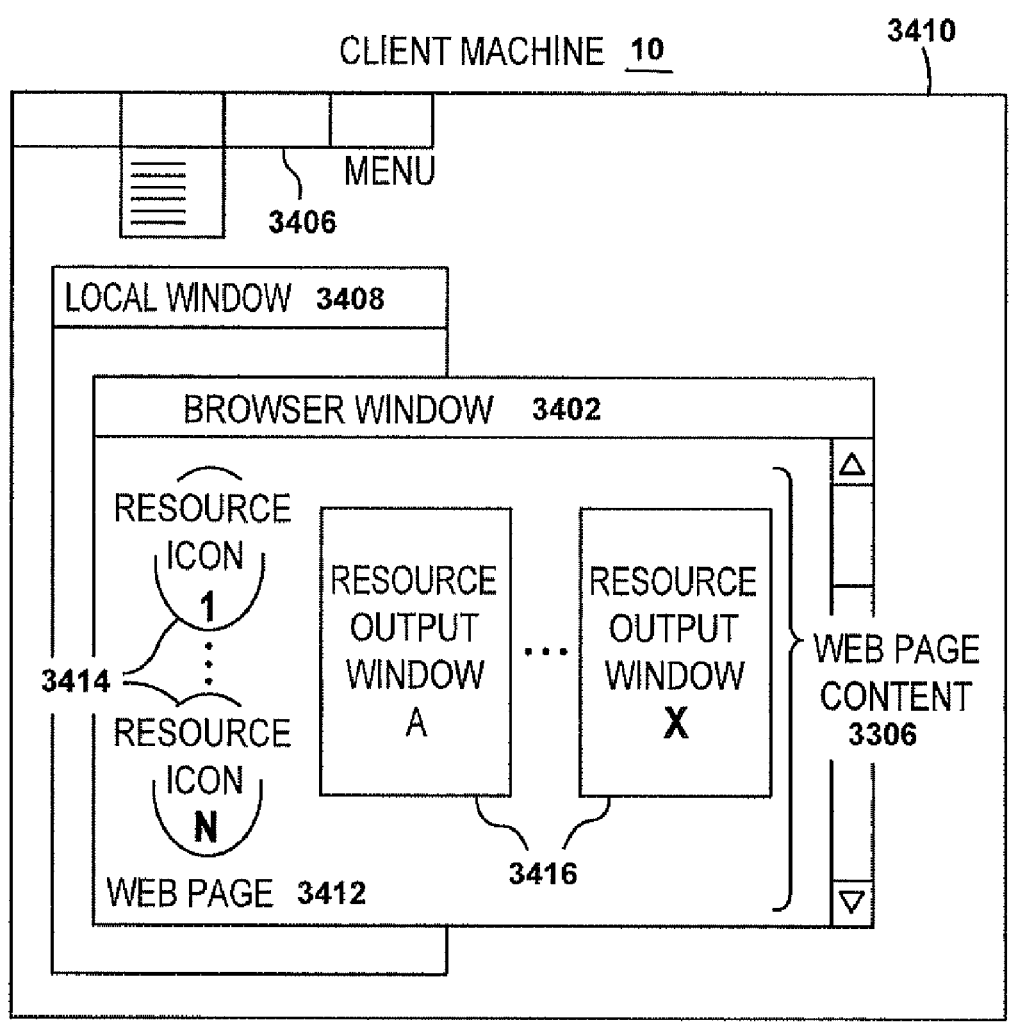
FIG. 34 is a block diagram depicting another embodiment of an architecture for displaying application output in a web page.

In one embodiment and with reference to FIG. 34, the browser 2822 receives and displays the web page content 3306 within a browser window 3402, which includes many possible graphical user interface ("GUI") elements (e.g., menu 3406, local window 3408, etc.) that form the client desktop 3410 displayed on a display device coupled to the client machine 10. In this embodiment, the web page content 3306 is displayed within a web page 3412 displayed in the browser window 3402 and includes one or more resource icons 3414 and/or one or more resource-output windows 3416, which are associated with the resource set 3308. In one embodiment, one or more of the resource objects 3310 also form part of the web page content 3306 of the web page 3412 and can therefore set the initial attributes (size, z-order, position) of the resource-output windows 3416. The initial orientation, size, position, and z-order of each of the resource-output windows 3416 displayed on the web page 3412 can be modified, as described below, so that the resource-output windows 3416 exhibit different orientations, sizes, positions, and z-orders relative to the web page 3412 and/or relative to the client desktop 3410.

The resource objects 3310 can be any data constructs which indicate to the browser 2822 displaying the web page content 3306 that a resource-output window 3416 should be displayed at a particular location in the web page 3412. The resource objects 3310 may include additional information, such as the height, width, border style, background color or pattern in the resource-output window 3416, along with indicia of which resources 3312 may be displayed in the window 3416, how often the output display should be updated, or any other additional information that is useful to enhance the display of the resource output.

In one embodiment, the resource objects 3310 are window tags that are embedded in an HTML file, examples of such tags are delineated below.

| ActiveX tag |
|---|
| <object classid="clsid:238f6f83-b8b4-11cf-8771-00a024541ee3" data="/ica/direct.ica" CODEBASE="/cab/wfica.cab" width=436 height=295> <param name="Start" value="Auto"> <param name="Border" value="On"> </object> |

| Netscape Plugin tag |
|---|
| <embed src="http://www.citrix.com/ica/direct.ica" pluginspage="http://www.citrix.com/plugin.html" height=295 width=436 Start=Auto Border=On> <embed> |

| JAVA tag |
|---|
| <applet code=JICA.class width=436 height=295> <param name=Address        value="128.4.1.2602"> <param name=InitialProgram value=Microsoft Word 7.0> <param name=Start          value=Auto> <param name=Border         value=On> </applet> |

In each case above, the tag indicates that a resource-output window 3416 having a height of 295 pixels and a width of 436 pixels should be drawn to receive output data from the resource 3312. Each tag also specifies that the resource 3312 should automatically start execution and that the resource-output window 3416 in which the resource output is displayed should be drawn with a border. The ActiveX and Netscape Plugin tags have the properties of the remote resource 3312 specified in the file "direct.ica" located in the directory "/ica." The JAVA tag specifies the properties of the remote resource 3312 directly. In the example above, the address of the server 30 hosting the resource 3312 is specified as well as the name of the resource 3312 to be executed.

In one embodiment, the resource 3312 executes substantially at the same time as the display of the web page 3412. In another embodiment, the resource 3312 executes when instructed to do so by the server 30 as part of providing web page content 3306 to the web server 3304. In yet another embodiment, the resource executes in response to a signal, such as a user-specified input (e.g., selecting a resource icon 3414 on the web page 3412. Once execution of the resource 3312 is commenced, the browser 2822 instantiates a client agent 2814 on the client machine 10. Alternatively, the client agent 2814 is instantiated substantially at the same time as the display of the web page 3412 or in response to user-specified inputs.

The client agent 2814 comprises one or more software processes, which execute on the client machine 10 and which are configured to interact with the server agent 3316, browser 2822, resource-output window 3416, and/or web server 3304. In one embodiment, the client agent 2814 is spawned as a child process of the browser 2822. In other embodiments, the client agent 2814 is a peer process of the browser 2822 or a dynamically linked library associated with the browser 2822. In one embodiment, a client agent 2814 is instantiated for each resource-output window 3416 displayed in the web page 3412. In another embodiment, a single client agent 2814 is instantiated for one or more resource-output windows 3416 associated with a particular one of the resources 3312 in the resource set 3308. In yet another embodiment, a single client agent 2814 is instantiated for each server agent 3316, which contributed to the web page content 3306. In yet another embodiment, a single client agent 2814 is instantiated for the entire resource set 3308.

The browser 2822 passes the properties of the resource objects 3310 relating to particular resources 3312 in the resource set 3308 to the client agent 2814 associated with those same resources 3308. Additionally, the browser 2822 may pass a handle for a resource-output window 3416 to the client agent 2814 or the client agent 2814 may query the browser 2822 to retrieve the handle for the resource-output window 3416. Resource properties, which are not specified by either the browser 2822 or the resource objects 3310, may be set to default values. The client agent 2814 may also have certain property defaults hard-coded, or the client agent 2814 may access a file which contains property defaults.

The client agent 2814 uses the name of the resource 3312 and the address of the resource server 30, which are both provided as part of the properties of the resource objects 3310, to establish a communications link and initiate a client-server session with the server agent 3316 associated with the resource server 30 and resource 3312. The client agent 2814 passes some or all of the properties of the resource objects 3310 to the server agent 3316 along with any necessary default values. Alternatively, the server agent 3316 may have already received some or all of the properties of the resource objects 3310 from the web server 3304 prior to contributing to the web page content 3306, which was subsequently displayed in the web page 3412. If a particular property is not passed to the server agent 3316, the server agent 3316 may request it from the client agent 2814 if it is a necessary property to which it has no default value (e.g., user ID) or the server agent 3316 may provide its own default value for the property (e.g., execution priority).

The server agent 3316 uses the properties received from the client agent 2814 to authenticate the client agent 2814 and to execute the desired resource 3312 if it has not previously been started. Once the resource 3312 is executing and the client agent 2814 has been authenticated, the resource 3312 communicates through the server agent 130 directly with the client agent 2814, without intervention of the browser 2822 or web server 3304. The client agent 2814 receives output data from the resource 3312 and displays the output data in the appropriate resource-output window 3416 in the web page 3412. The client agent 2814 also detects input events, such as mouse clicks and keyboard inputs, associated with the resource-output window 130 and forwards any such input events to the resource 3312 via the server agent 3316. This type of client-server session is repeated for each resource 3312 in the application set 126 that is selected by the user and thus enables the user to interact with all of the resources in the resource set 3308.

The data exchanged between the client agent 2814 and server agent 3316 during the client-server session includes not only input events and the graphical output data of the resource 3312, but also window attribute information (e.g., window position, z-order, size, style, color, etc.). The window attribute information of the resource-output windows 3416 is initially specified by the resource objects 3310 embedded in the web page 3412. For example, the resource objects 3310 can include an ActiveX control, which specifies and controls the window attributes of the resource-output windows 3416 during the client-server session. In one embodiment, the resource-output windows 3416 exhibit the same dimensions as the corresponding ActiveX controls.

The client agent 2814 communicates the initial window attributes of the local application-output windows to the server agent 3316 along with information relating to the client desktop 3410 (e.g., size, resolution, etc.). The server agent 3316 responds by conforming the size of its server desktop to that of the client desktop 3410 and by conforming the window attributes of local server windows to those of the resource-output windows 3416 on the client desktop 3410. The resource-output windows 3416 on the client desktop 3410 and the server windows on the server desktop thus exhibit the same window attributes and display the same graphical output data that is generated by the resource 3312. Note that the server desktop can correspond to either an offscreen surface contained within the server's video memory or to an onscreen surface displayed on a display device coupled to the server 30.

The user of the client machine 10 can move, resize, and/or alter the z-order or other initial window attributes of the resource-output windows 3416 during the client-server session, by entering an input event that is detected by the client agent 2814 and then communicated to the server agent 3316. The server agent 3316 conforms its desktop and/or windows to be consistent with the input event and then transmits updated graphical output data and window attribute information, corresponding to the input event, to the client agent 2814 with instructions to update the resource-output windows 3416 so that they match the windows on the server 30.

For example, if the user of the client machine 10 resizes one of the resource-output windows 3416 from that originally specified by the resource objects 3310 (such as by clicking with the mouse and dragging the border of the application-output window 3416 to the desired location/size), the client agent 2814 detects the input event generated by the mouse action and communicates it to the server agent 3316, which effects the same resize event in the on or offscreen surfaces of the server 30. The server agent 3316 then sends repaint and resizes command messages to the client agent 2814 along with updated graphical output data and window attribute information. In response, the client agent 2814 modifies the appropriate resource object 3310 affected by the resize event (e.g., the ActiveX control discussed above) so that the corresponding resource-output window 3416 is resized and the updated graphical output data is painted within the borders of the -output window 3416.

Figure 35:
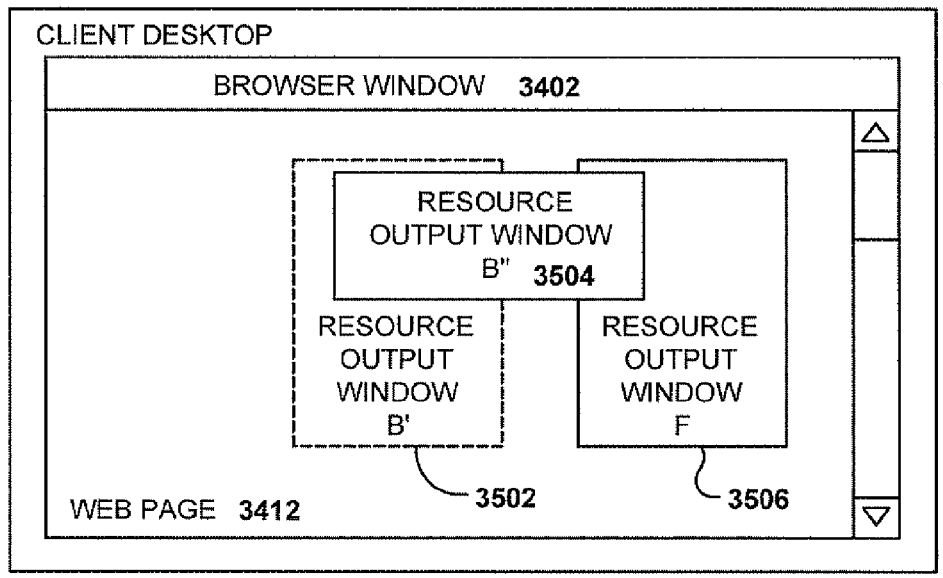
FIG. 35 is a block diagram depicting another embodiment of an architecture for displaying application output in a web page.
Figure 36:
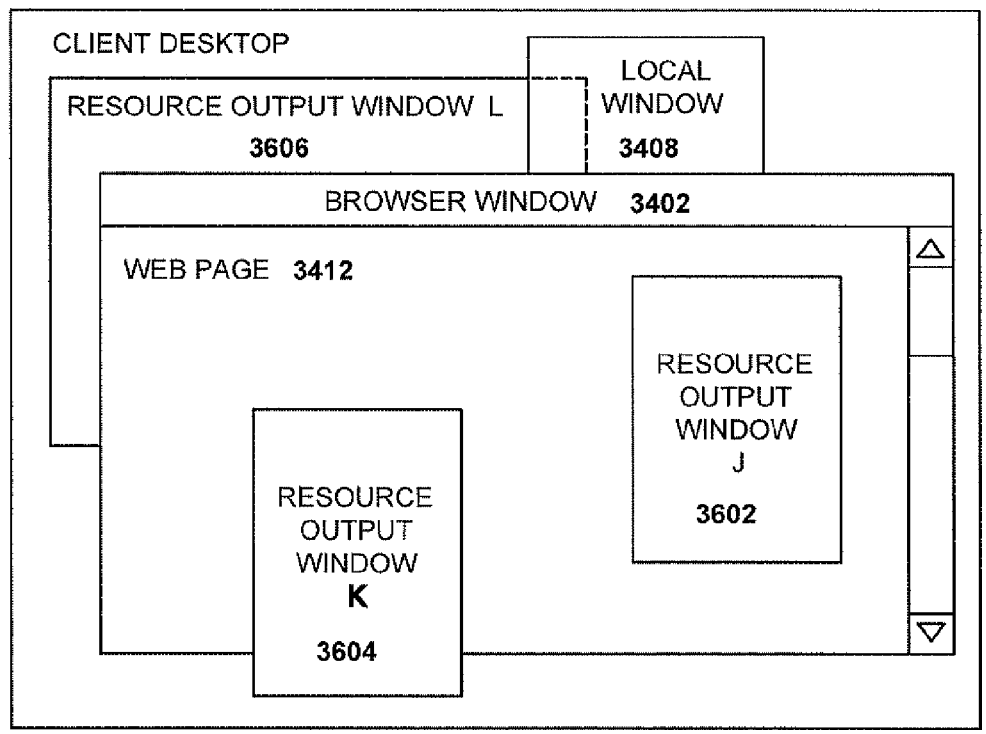
FIG. 36 is a block diagram depicting another embodiment of an architecture for displaying application output in a web page.

These embodiments thus enable the window attributes of the resource-output window 3416 to be modified so that the resource-output window 3416 can be moved, resized, etc., within the boundaries of the browser window 3402. With reference to FIG. 35 and by way of nonlimiting example, resource-output window B' 3502 can be resized using the methodology described above to form resource-output window B" 3504, which overlaps (thus exhibiting a different z-order from) resource-output window F 3506. Alternatively, the resource-output window 3416 can be moved or resized to extend beyond or be entirely outside of the browser window 3402. By way of nonlimiting example and with reference to FIG. 36, resource-output window J 3602 lies within the boundaries of the browser window 3402, while resource-output window K 3604 extends beyond the boundaries of the browser window 3402 and resource-output window L 3606 is entirely outside the browser window 3402. Note that the resource-output windows can exhibit varying z-orders with respect to other elements in the client desktop 3410. For example, local window 3608 exhibits a z-order between that of the browser window 3402 and resource-output window L 3606. In this embodiment, the client agent 2814 instructs the operating system of the client machine 10 to draw the desired resource-output window 3416 in response to command messages received from the server agent 3316, without having to first modify the properties of the resource objects 3310 embedded in the web page 3412, which initially established the window attributes of the resource-output window 3416.

In one embodiment, each input event affecting the resource-output window 3416 is transferred to and processed by the server agent 3316, which then instructs the client agent 2814 to effect corresponding changes in the resource-output window 3416. In another embodiment, one or more input event types (e.g., click and drag mouse actions directed at moving the resource-output window 3416 to another grid location on the web page 3412) are processed entirely by the client agent 2814 and not reported to the server agent 3316, where the graphical output data displayed within the resource-output window 3416 remains unchanged.

Figure 37:
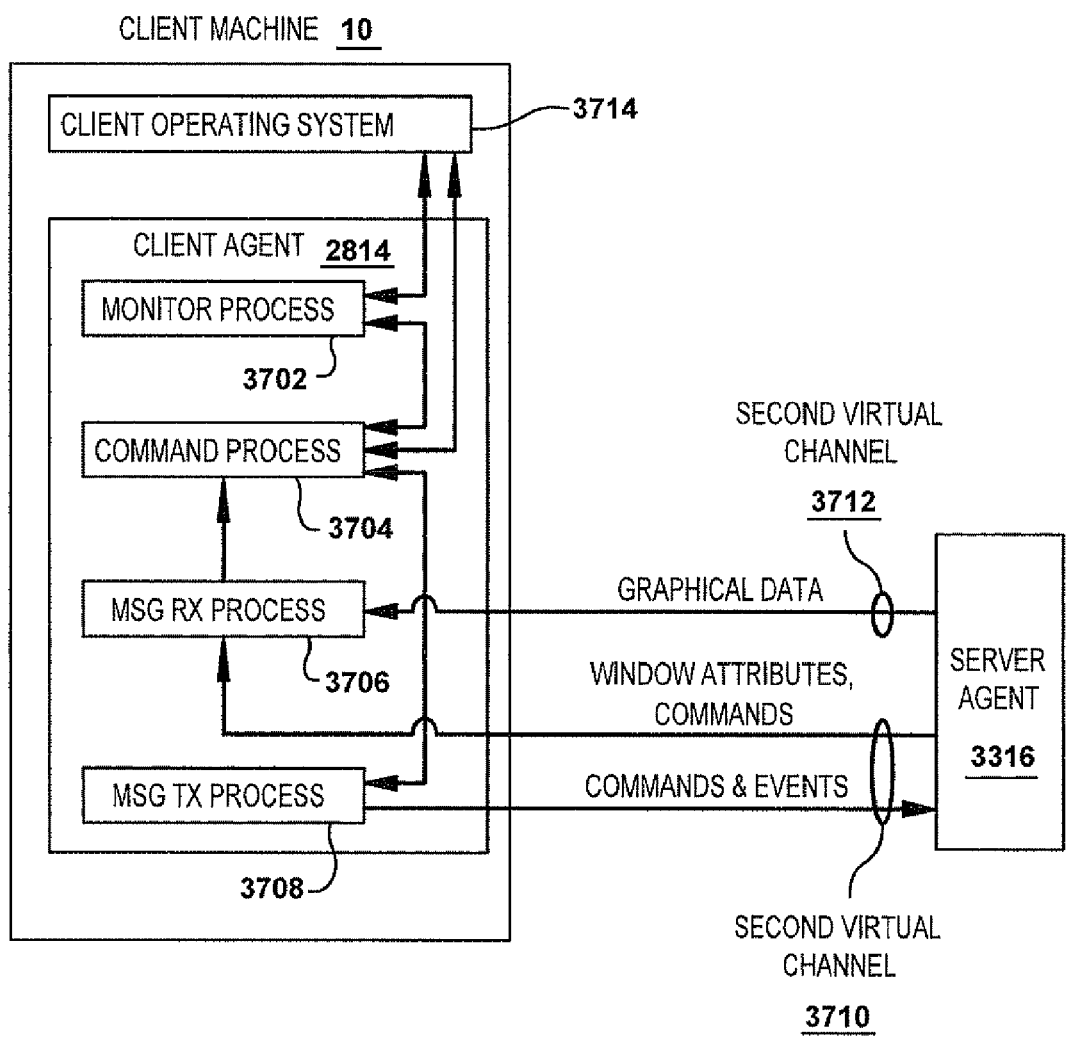
FIG. 37 is a block diagram depicting one embodiment of a client machine receiving window attribute data via a virtual channel.

In more detail and with reference to FIG. 37, the client agent 2814 comprises a monitor process 3702, a command process 3704, a message receiving process 3706, and a message transmission process 3708. In one embodiment, each process 3702, 3704, 3706, 3708 is a separately functioning code segment that operates independently of the other processes. For example, the message receiving process 3706 and the command process 3704 can be implemented as separate threads, which communicate with each other via a named pipe or shared memory. Use of a common data set allows the message receiving process 3706 and the message transmission process 3708 to be synchronized.

The message receiving process 3706 receives graphical data, window attribute information, and commands from the server agent 3316 via the communications link that provides the connectivity between the client agent 2814 and server agent 3316 during the client-server session. The communications link preferably includes a first virtual channel 3710 and a second virtual channel 3712. Command, event, and window attribute information is passed between the client agent 2814 and the server agent 3316 via the first virtual channel 3710, while graphical data corresponding to the graphical contents of the resource-output windows 3416 is passed via the second virtual channel 3712. The message receiving process 3706 informs the command process 3704 of the commands, window attributes, and graphical data received from the server agent 3316 and the command process 3704 further processes this data.

In one embodiment, the command process 3704 processes the commands received from the server agent 3316 by instructing the client operating system 3714 to form and/or modify affected resource-output windows 3416 in accordance with the window attributes specified by the server agent 3316. The command process 3704 also instructs the client operating system 3714 to display the graphical data provided by the server agent 3316 in the appropriate resource-output windows 3416. In one embodiment, the command process 3704 implements changes to the resource-output windows 3416 in the client desktop 3410 by issuing GDI commands. In other embodiments, the command process 3704 issues commands directly to an associated graphics subsystem or via graphics API commands.

The command process 3704 also instructs the monitor process 3702 to periodically monitor the client desktop 3410 in order to detect changes affecting the resource-output windows 3416. In one embodiment, the monitor process 3702 instructs the client operating system 3714 to return information relating to the client desktop 3410 at predetermined polling intervals. In other embodiments, the monitor process 3702 monitors the message queue maintained by the client operating system 3714 in order to detect changes affecting the resource-output windows. The monitor process 3702 communicates some or all of the detected desktop changes to the command process 3704 for further processing.

In one embodiment, the command process 3704 instructs the message transmission process 3708 to transmit all of the changes detected by the monitor process 3702 to the server agent 3316 via the first virtual channel. In another embodiment, the command process 3704 instructs the message transmission process 3708 to transmit a subset of the detected changes, such as changes which only affect the graphical data and/or window attributes of the resource-output windows 3416. The server agent 3316 receives the detected changes along with any commands from the command process 3704 and any input events made by the user of the client machine 10 that triggered the detected changes. The server agent 3316 then modifies its local desktop to accommodate the detected changes and transmits associated commands, window attributes, and graphical data back to the client's message receiving process 3706. In this manner, desktop elements, such as the resource-output windows 3416, that are common in the client and server desktops remain in lock step.

The command process 3704 of the client agent 2814 ensures that analogous/common elements in the client and server desktops remain in lock step by maintaining a common window list. The common window list includes the window attribute information for each window in the client desktop 3410 and for each corresponding window in the resource server desktop. In embodiments, in which a plurality of client agents is executing on the client machine 10, the command process 3704 of a single client agent 2814 has primary responsibility for maintaining the common window list. If the single client agent 2814 terminates, while other client agents remain in operation, the remaining client agents will elect another primary client agent to maintain the common window list.

Figure 38:
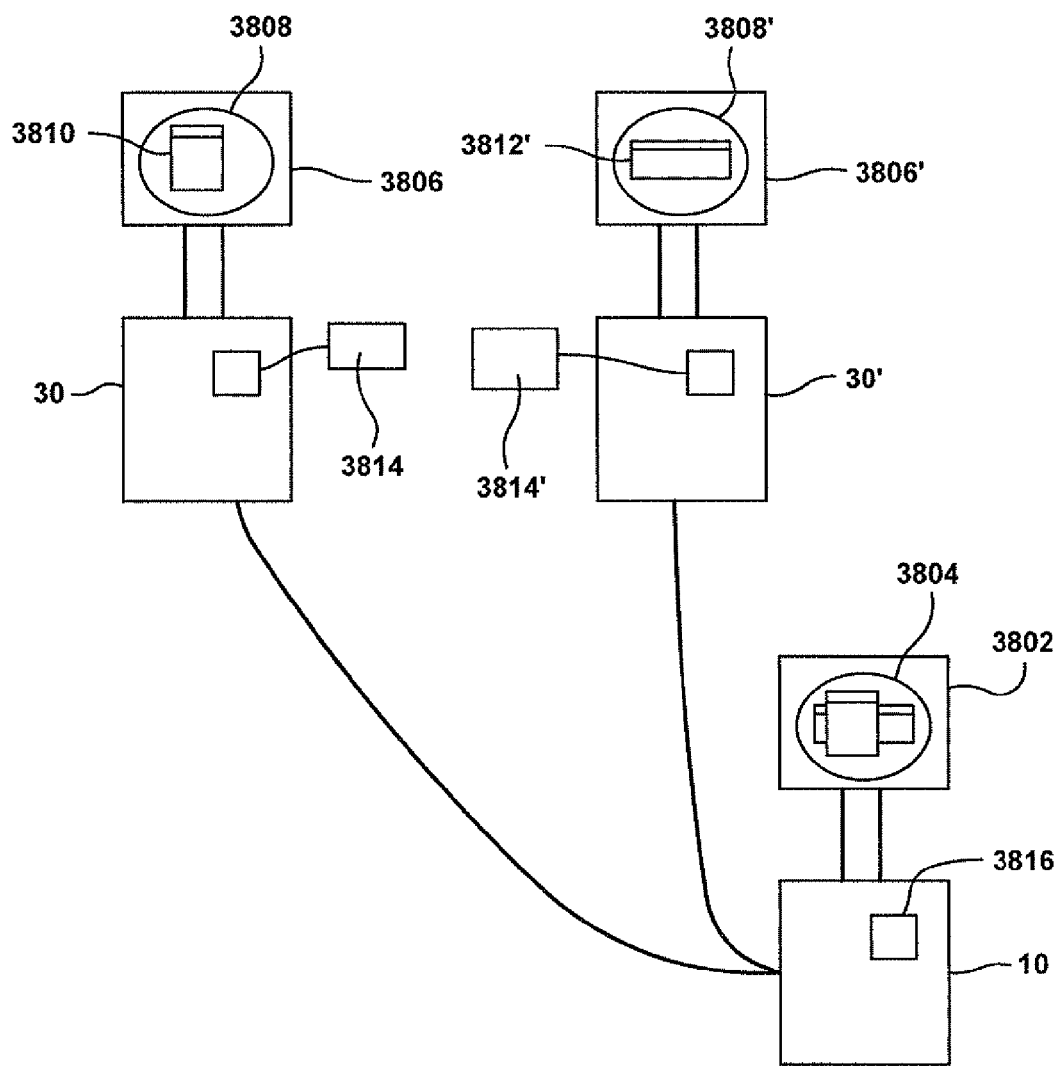
FIG. 38 is a block diagram depicting a client machine connected to more than one remote machine.

FIG. 38 depicts a system in which a client machine 10 is connected to more than one remote machine 30, 30'. As shown in FIG. 38, client machine 10 has an associated display 3802. The display 3802 may be used to display one or more components of a graphical user interface, such as windows and pull-down menus. The collection of graphical user interface components displayed to a user by the display 3802 is generally referred to as the "desktop." As shown in FIG. 38, the client machine 10 displays a local desktop environment 3804 to a user. Client machine 10 may provide at least a part of the local desktop environment 3804 or client machine 10 may simply display various desktop components received from other sources such as remote machines 30. As shown in FIG. 38, each remote machine 30, 30' has an associated display 3806, 3806' which also displays a desktop environment 3808, 3808'. It should be noted that display 3806, 3806' need not be a video display monitor. For example, display 3806, 3806' may simply be a bank of video RAM to which resources write the output of graphical procedure calls. FIG. 38 depicts an embodiment of a system in which each machine 30 displays 3806, 3806' displays one graphical user interface window 3810, 3812'.

Each remote machine 30, 30' also includes at least one agent 3814, 3814'. In some embodiments, each remote machine 30, 30' includes one agent 3814, 3814' for each client machine 10 connected to the remote machine 30, 30'. Client machine 10 may also host an agent 3816. In some embodiments, a client machine 10 hosts a separate local agent 3816 for each remote machine 30 to which the client machine 10 is connected. In other embodiments, the client machine 10 hosts a single agent 3816 that manages connections to multiple remote machines 30. Each of the agents 3814, 3814', 3816 may monitor their associated desktop environment 3808, 3808', 3816 for windows which: change position; are opened; are closed; change size; are minimized; are maximized; or are brought to the top of the desktop, i.e., windows which gain focus that do not previously have focus. Each agent 3814, 3814', 3816 transmits messages indicative of changes in their associated desktop 3808, 3808', 3804 to other agents. For example, local agent 3816 may receive messages transmitted from server node agents 3814, 3814'. The local agent 3816 commands the client machine 10 to modify the local desktop environment 3804 in response to the messages received from server agents 3814, 3814', that is, the local agent 3816 issues commands to the client machine 10 to conform the local desktop environment 3804 to the desktop environment 3804 In other embodiments, agents 3814, 3814' for remote machine 30, 30' receive messages from a local agent 3816 and command the machine 30, 30' to modify the desktop environment 3808, 3808' in response to messages received from the local agent 3816.

In one embodiment, the agents 3814, 3816 monitor changes to their associated desktop environment 3808, 3808' by periodically issuing one or more of a set of commands provided by the operating system that allow details of the graphical user interface desktop to be determined. For embodiments in which the agents 3814, 3816 reside on nodes that execute a version of the WINDOWS operating system, the agents 3814, 3816 may periodically issue the Enum Windows command to the WINDOWS operating system, which returns a list of all windows present on the desktop, together with information related to those windows. The agents 3814, 3816 can issue the Enum Windows command every 50 milliseconds, every 100 milliseconds, every 500 milliseconds, or at any period that allows the agent 3814, 3816 to rapidly determine when changes to its associated desktop environment have occurred without putting a significant computational burden on the node. In this embodiment, the agent 3814, 3816 maintains a data structure storing information about the desktop windows and compares the values returned by the Enum Windows command to the data structure to determine changes.

Information determined and stored by the agent 3814, 3814' can include the title bar associated with each window, the location of each window in the desktop environment 3808, 3808', the size of each window, and the z-order positioning of each window in the desktop environment 3808, 3808'. In another embodiment, the agent 3814, 3814', 3816 monitors an intranode graphics message queue to determine changes to its associated desktop environment. Server agents 3814, 3814' monitor an intraserver message queue and local agent 3816 monitors an intraclient message queue. In this embodiment, changes to the desktop environment 3808, 3808' are affected via messages sent to a graphics subsystem from system applications or the operating system itself. Thus, a resource executing on a remote machine 30, 30' would send a message to a graphics engine residing on the server 30, 30' in order to change the server desktop environment 3808, 3808'. Other commands which return graphical user interface data are readily apparent to those of ordinary skill in the art. For embodiments in which the agents 3814, 3816 reside on nodes executing a version of the WINDOWS operating system, the agents 3814, 3816 monitor the Windows Message Queue for messages affecting the desktop environment associated with the node on which the agent resides. Examples of such messages include: WM_SETFOCUS, which indicates to which window focus will be given (i.e., brought to the "top" of the desktop); WM_KILLFOCUS, which removes focus from an indicated window; and WM_WINDOW-POSCHANGING, which indicates a change in the position of a window. Other messages that can be posted to the Windows Message Queue are readily known to those of ordinary skill in the art.

Figure 39:
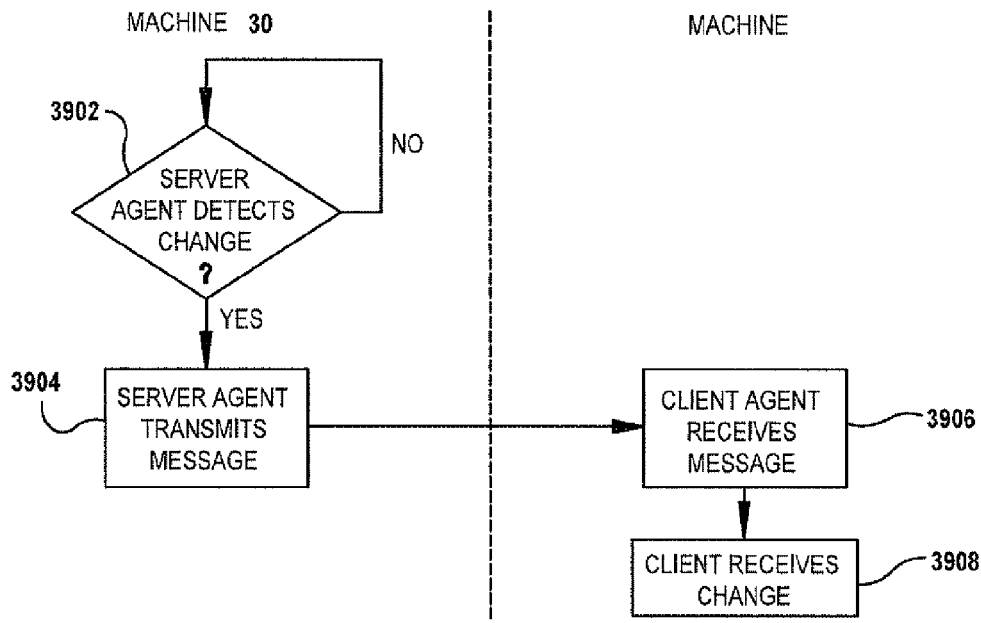
FIG. 39 is a flow diagram depicting one embodiment of the steps taken to detect and transmit server-initiated display changes.

Referring now to FIG. 39, the steps taken during a server-initiated event are shown. The agent 3814 for remote machine 30 senses a change in its associated desktop (step 3902). The agent 3814 may do this by intercepting a window event on the server message queue, or the agent 3814 may determine a change in the desktop by comparing the results returned from serially issued operating system commands, as described above. The agent 3814 sends a message to a client agent 3816 indicating the change in the server desktop 3810 (step 3904). For example, if a new window has been given focus, the agent 3814 can transmit a message to a client agent 3816 indicating the identity of the new "top" window. In one embodiment, the agent 3814 broadcasts its message to all client agents 3816 that exist in the system. Alternatively, the agent 3814 may transmit its message only to a predetermined subset of client agents 3816. For example, when a client machine 10 makes a connection to a remote machine 30, the client agent 3816 may register with the agent 3814. In this embodiment, the agent 3814 would transmit change messages only to those client agents that have registered with the remote machine 30.

The client agent 3816 receives the transmitted message (step 3906). In embodiments in which the remote machine 30 broadcasts commands, the client agent 3816 must have some mechanism for determining whether a transmitted command affects its associated desktop. For example, the client agent 3816 may maintain a list of remote machines 30 to which it is connected. In these embodiments, the client agent 3816 responds to messages broadcast by any remote machine 30 present in its list. For embodiments in which the agent 3814 does not broadcast messages, no such mechanism is necessary.

The client agent 3816 implements a change to its associated desktop 14 responsively to the received message (step 3908). The client agent 3816 may accomplish this by directly issuing graphics Application Programming Interface commands that cause the client machine 10 to change the display of its associated desktop. Alternatively, the client agent 3816 may issue GDI commands to change its associated desktop. In still other embodiments, the client agent 3816 issues commands directly to the system, whether implemented in hardware or software, responsible for displaying graphics on the client machine 10.

Figure 40:
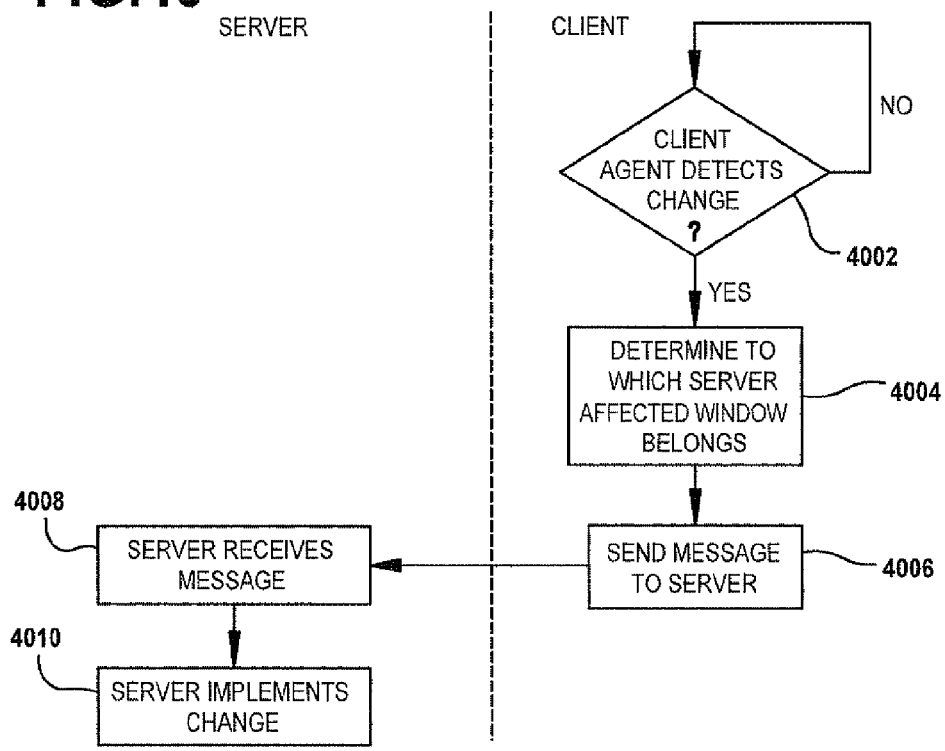
FIG. 40 is a flow diagram depicting one embodiment of the steps taken to detect and transmit client-initiated display changes.

Referring now to FIG. 40, the steps taken when a client machine 10 initiates a desktop change are shown. The client agent 3816 senses a change in its associated desktop 14 (step 4002). As noted above, this may be done on an event-driven basis or by polling the operating system operating on the client machine 10. The client agent 3816 determines to which remote machine 30 the affected window belongs (step 4004). To facilitate this process, the client agent 3816 may maintain a list that associates remote windows with a particular remote machine 30. The client agent 3816 then sends a message to the identified remote machine 30 indicating the change in its desktop 14 (step 4006). Alternatively, the client agent 3816 may skip step 404 entirely and broadcast its change message to all remote machines 30. The server agent receives the transmitted message (step 4008) and implements the change in its associated desktop (step 4010), as described above.

In one particular embodiment, a client machine 10 and a remote machine 30 communicate using the ICA protocol and the client machine 10 and the remote machine 30 execute a version of the WINDOWS operating system. Client machine 10 hosts a local agent 3816 that may be provided as a dynamically linked library module. The remote machine 30 hosts an agent 3814 that may be provided as a separate thread.

In this embodiment, the local agent 3816 and the agent 3814 exchange graphical data, i.e., the data actually displayed in each window on the desktop, via a first ICA virtual channel. Information about window positioning, window size, z-access ordering of window and other such information is communicated between the client machine 10 and the remote machine 30 via a second ICA virtual channel. Throughout the description, when the client machine 10 and the remote machine 30 are actively exchanging information via the second ICA virtual channel, the client machine 10 will be referred to as being in "seamless windowing mode."

Figure 41:
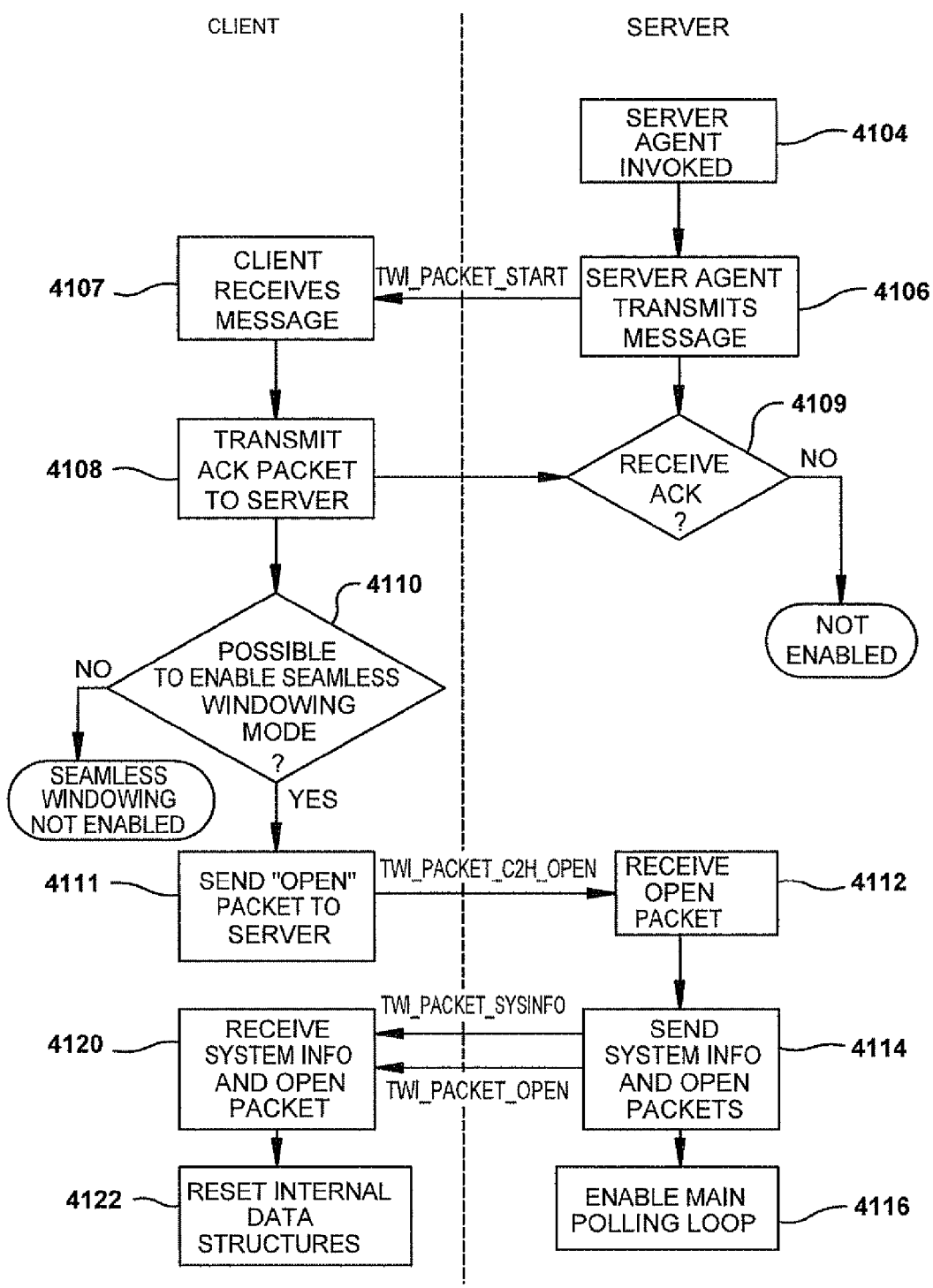
FIG. 41 is a flow diagram depicting one embodiment for enabling transmission of seamless windows between a client machine and a remote machine.

Referring now to FIG. 41, the process for enabling seamless windowing mode between the local agent 3816 and agent 3814 is shown. In this embodiment, all communication between a server agent and a client agent is packet-oriented and takes place over a dedicated ICA virtual channel, making the functioning of the agents 3814, 3816 independent from the underlying communication protocol. All packets start with packet type (1 byte), followed by packet data length (2 bytes, can be zero) and data (optional). Agents 3814, 3816 will try to send as much data in a single network packet as possible, but it will always send complete packets. That is, the size of seamless window virtual packets never exceeds the allowable size of an ICA packet. Packet flow control and delivery confirmation is implemented by the transport level of the ICA protocol. Individual packets are executed immediately on reception.

The client agent 3816 waits for an initial packet from the server agent 3814. After user logon to the server, a server agent 3814 will be invoked (step 4104).

The server agent 3814 sends a TWI_PACKET_START packet to the client agent 3816, which includes some essential information about the remote machine 30 desktop environment (desktop resolution, desktop size, version number of ICA protocol supported by the server, etc.) (step 4106). This packet is sent by the server agent 3814 on initial connection or on reconnect, and is used to: (1) detect seamless windowing capabilities of the client machine 10; and (2) requests basic machine 10 information.

The client agent receives the TWI_PACKET_START packet (step 4107) and responds with a TWI_PACKET_C2H_START_ACK packet, confirming TWI_PACKET_START and supplying machine 10 version/capabilities information (step 4108). This packet is sent by the client agent 3816 to confirm reception of TWI_PACKET_START packet and to send the requested basic machine 10 information to the server agent 3814.

If there is no response from the client agent 3816 (step 4109), the server agent 3814 assumes that the client machine 10 is unable to enter seamless windowing mode, and the seamless windowing virtual channel is not used by the remote machine 30 to communicate window information. In this case, the remote machine 30 continues to communicate graphical data to the client machine 10 via another virtual channel, and the client machine 10 desktop displays the server desktop without incorporating windows from other nodes.

The client agent 3816 uses the information sent by the server agent 3814 in step 4106 to determine if a seamless windowing session can be established between the server agent 3814 and the client agent 3816. In one embodiment, the client agent 3816 compares information relating to the version of the virtual channel protocol supported by the server agent 3814 to makes the determination If the client agent 3816 determines that it is possible to enable seamless windowing mode (step 4110), the client agent 3816 sends a TWI_PACKET_C2H_OPEN packet to the server agent 3814 (step 4111). This packet requests that the server agent 3814 enable seamless windowing mode.

On reception of a TWI_PACKET_C2H_OPEN packet (step 4112) the server agent 3816 (I) resets its internal data structures, (ii) sends a TWI_PACKET_SYSINFO packet to the client agent 3816 to communicate some general information regarding the window settings on the remote machine 30 to the client agent 3816, (iii) sends a TWI_PACKET_OPEN packet to the client agent 3816 (step 4114) indicating the establishment of seamless windowing mode, and (iv) enables its main polling loop (step 4116) that will poll the operating system on the server node for desktop changes. If the client agent 3816 and the server agent 3814 do not support the same version of the seamless window protocol, the server agent 3814 ignores the TWI_PACKET_C2H_OPEN packet.

On reception of TWI_PACKET_OPEN packet (step 4120), the client agent 3816 resets its internal data structures (step 4122) and seamless windowing mode between the client agent 3816 and the server agent 3814 is established.

During a seamless windowing mode session, the server agent 3814 will send window information such as window position, size, styles, window text, etc. for all top-level windows on the server node. Also, foreground window information is sent, i.e., which window on the server node desktop is the foreground window. In accordance with this information, the client agent 3816 creates windows with the same size/position as the server node windows on the machine desktop. In some embodiments, window elements are transmitted as bitmaps from the server node 20. Examples of packets sent by the server agent 3814 include: TWI_PACKET_CLOSE, which is sent to switch the client agent 3816 out of seamless windowing mode and back to regular, or full screen, mode; that is, the client machine 10 is switched back to displaying the server node desktop environment without incorporating windows from other desktop environments; TWI_PACKET_CREATEW, which is sent to create new windows on the client machine 10; TWI_PACKET_DELETEW, which is sent to destroy a window on the client machine 10; TWI_PACKET_CHANGEW, which is sent to change a window displayed by the local node 10; TWI_PACKET_SYSINFO, which is sent to report remote machine 30 system settings—normally it is sent only once, but the packet can be sent multiple times; TWI_PACKET_FOREGROUNDW, which is sent during normal seamless windowing mode operation to change the foreground window; TWI_PACKET_SETTOPW, which is sent during normal seamless windowing mode operation to change the top window, that is, to bring a new window to top; TWI_PACKET_SETFOCUS, which is sent during normal seamless windowing mode operation to change the focus window; TWI_PACKET_FOCUSACK, which is sent in response to TWI_PACKET_C2H_SETFOCUS (see below), and reports the result of a SetFocus attempt; and TWI_PACKET_SPA_STATUS, which is sent in response to TWI_PACKET_C2H_START_PUBLICAPP (see below), and is used to report the result of the requested operation.

Examples of packets that can be sent by the client agent 3816 to the server agent 3814 include: TWI_PACKET_C2H_PAUSE, which is sent to suspend the server agent 3814, that is, the server agent 3814 will stop sending window information, clear its internal data structure and send a TWI_PACKET_CLOSE packet (see above); TWI_PACKET_C2H_RESUME, which is sent to resume the server agent 3814—the server agent 3814 will clear its internal data structure, and send a TWI_PACKET_OPEN packet (see above); TWI_PACKET_C2H_SETPOS, which is sent to report window size/position change on the machine; TWI_PACKET_C2H_SETFOCUS, which is sent to report a change in the focus window on the machine; TWI_PACKET_C2H_RESTORE, which is sent to request restoration of a minimized window; TWI_PACKET_C2H_TERMINATE, which is sent to request termination of a program executing on the remote machine 30; TWI_PACKET_C2H_STARTAPP, which is sent to start a new resource on the remote machine 30; TWI_PACKET_C2H_LOGOUT, which is sent to end the current session; TWI_PACKET_C2H_START_PUBLICAPP, which is sent to start a new published resource on the remote machine 30; and TWI_PACKET_C2H_CLIENTINFO, which is sent to report client desktop settings to the server agent 3814—this packet is generally sent on startup, but can also be used during seamless windowing session.

The client agent 3816 will try to perform some operations (such as window move and resize) locally, sending update information back to the remote machine 30 afterwards. Proper window behavior is emulated by intercepting the WM_NCHITTEST message for the client-created windows. Foreground window changes can happen on both the client machine 10 and the remote machine 30, so the client machine 10 and remote machine 30 will negotiate and balance actual foreground window changes. For example, if the remote machine 30 changes its foreground window, that change should be properly represented on the client machine 10 desktop. The server agent 3814 sends information regarding the new foreground window to the client agent 3816 using the TWI_PACKET_FOREGROUNDW packet. Similarly, if the client agent 3816 detects a foreground window change on the client machine 10 desktop, the client agent 3816 sends information regarding the change to the server agent 3814 and the server agent 3814 implements the change on the remote machine 30 desktop.

When focus is taken away from a window representing a server window and is given to a local machine 10 window, the client machine 10 notifies the remote machine 30 of the change and the remote machine 30 gives focus to an invisible window. For embodiments in which the client machine 10 is connected to two server nodes 30, and focus is shifted from a window representing a window from the first remote machine 30 and is given to a window representing a window from the second remote machine 30', the client machine 10 sends a packet informing the current remote machine 30 or 30' that its window no longer has focus. Once the remote machine 30 or 30' responds by giving focus to an invisible window, the client agent 3816 instructs the other remote machine 30 that its window now has focus on the client machine 10 desktop.

In some embodiments, it is desirable to add some complexity to the agent's main polling loop to reduce network traffic. In these embodiments, the main polling loop includes a comparison between the current foreground window and the identity of the window last requested to be moved to the foreground. If the current foreground window matches the window identified in the most recent request, the agent does not need to send information acknowledging the change. This technique is useful in both server agent 3814 and client agents 3816.

Window z-ordering on the client machine 10 is a superset of the server node z-ordering (machine 10 will always have more windows than the host). Server node Bordering is reproduced on the client machine 10 by reproducing owner/owned relationship among windows and the TOP_MOST flag in the window style. Owner/owned relationships refer to windows which are children of other windows, such as dialog boxes associated with resource windows. The dialog box is said to be owned by the resource window, and the dialog box will always appear on top of its owner. The TOP_MOST flag indicates that a particular window should appear on "top" of the desktop, for example, the status bar in WINDOWS 95.

When a user disconnects, the server agent 3814 switches itself to suspended mode, and will not send information to the client agent 3816. On a reconnect, the server agent 3814 sends a TWI_PACKET_START packet, reporting HostAgentState as "already running, reconnect."

Based on the version number of the protocol supported by the server the client machine 10 will decide whether it is possible to enable seamless windowing mode (from the client machine 10 point of view). If it is possible to switch to seamless windowing mode, the client agent 3816 will send a TWI_PACKET_C2H_OPEN packet, asking the server agent 3814 to enable seamless windowing mode.

Figure 42:
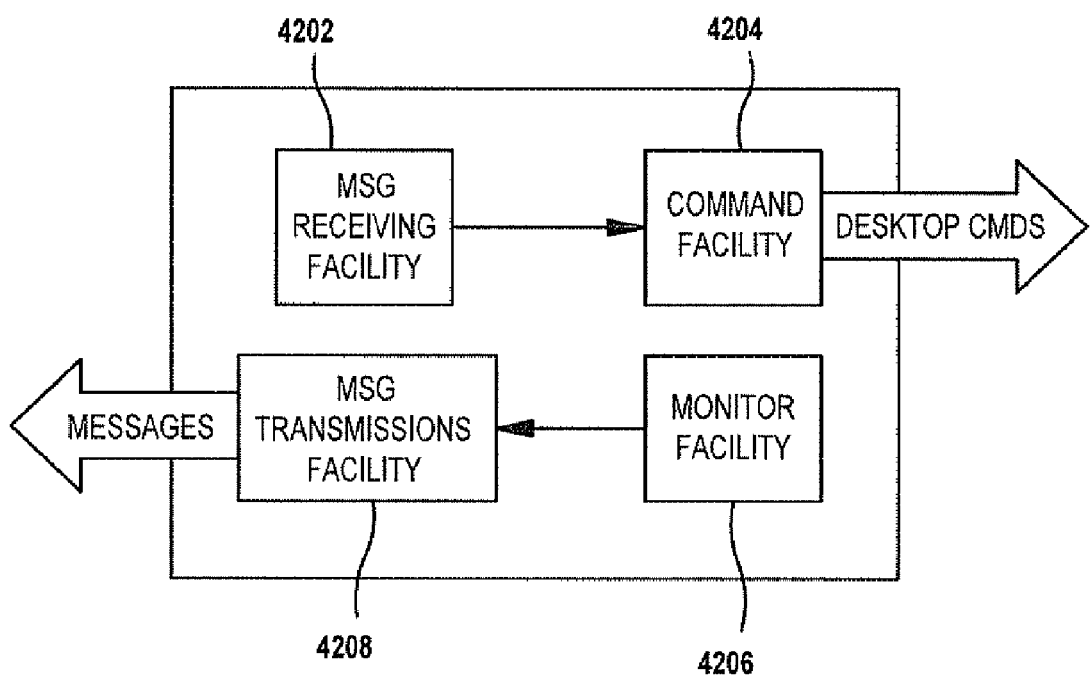
FIG. 42 is a block diagram depicting one embodiment of an agent.

Each agent responsible for monitoring an associated desktop may be implemented as a stand-alone software routine (such as an executable file on DOS-based systems), a dynamically linked library routine (DLL), or as an integral piece of the operating system. Referring now to FIG. 42, and in brief overview, each agent includes a message receiving facility 4202, a command facility 4204, a monitor facility 4206, and a message transmission facility 4208. Agent-agent communication is full-duplex, i.e., agents can transmit and receive messages simultaneously. Thus, each facility can be implemented as a separately functioning code segment that operates independently of the other facilities. For example, message receiving facility 4202 and command facility 4204 can be implemented as separate threads which communicate with each other via a named pipe or shared memory. Use of a common data allows the message receiving facility 4202 and the message transmitting facility 4208 to be synchronized.

Message receiving facility 4202 receives messages transmitted from other agents indicating changes in the desktop environments associated with those agents. Message receiving facility 4202 may connect directly with the physical layer of the communications protocol the agents use to communicate, or the message receiving facility 4202 may operate at a higher layer of the protocol by cooperating with one or more communications subsystems. For embodiments in which messages are broadcast by agents, the message receiving facility 4202 has some mechanism for determining whether a broadcast message is intended for it. For example, the message receiving facility 4202 may store a list of the windows which its associated desktop displays. The message receiving facility 4202 would compare the target of any received message to its list of windows to determine whether or not to take action on the received message. The message receiving facility may be implemented as a blocking function. Alternatively, the message receiving facility can be implemented a call-back function invoked by the ICA virtual channel transport.

Once the message receiving facility 4202 has determined that a received message is intended for its desktop, the command facility is invoked to effect the change indicated by the message to the associated desktop environment. The command facility 4204 may be passed the received message facility, or the message receiving facility 4202 may process the received message before communicating with the command facility 4204. The command facility 4204 may implement the desktop change indicated by the received message by issuing GDI commands. In other embodiments, the command facility 4204 may issue commands directly to an associated graphics subsystem or may issue other graphics API commands.

During a seamless windowing session, a number of desktops are associated with a single machine 10—one desktop on the client machine 10 itself and one desktop per remote machine 30 to which the client machine 10 is connected. The client agent 3816, in conjunction with the server agent 3814, 3814', creates a combined window list representing the z-order of all desktops. All participating desktops are "linked" together by the client agents 40 and the server agents 3814, 3814', and any z-order changes on any desktops will be propagated to other desktops.

In one embodiment, each remote machine 30 has knowledge only of its own graphical desktop representation and the remote machine 30 desktops are individually represented within the client machine 10. The client machine 10 display is updated by combining all remote machine 30 and machine 10 desktop images into a single display image based on the window information that has been obtained from each server node 30 30' by the client agent 3816. The resulting image is displayed at the client machine 10.

The combining process involves building a common window list based on the windows information exchanged by all agents. Using the combined window list, the graphical desktop data is clipped and merged for representation by the client machine 10. The node takes care of "clipping" displayed windows resulting from the commands issued by the command facility 4204. Such "clipping" functions are well-known to those of ordinary skill in the art. In some embodiments, however, the command facility 4204 maintains a shadow bitmap of clipped windows. That is, the command facility 4204 maintains a bit image of windows that are obscured by other windows. This allows the agent to change its associated desktop without requiring it to reload the window image of an obscured window from the appropriate source. In other embodiments, the node determines whether graphical data is obscured at the time it is received. If it is, the node ignores the received graphical data. If it is not, the node displays the data. The node makes a determination as to whether the graphical data is obscured by applying clipping functions.

Monitoring facility 4206 monitors the desktop associated with the agent. Monitoring facility 4206 may monitor the desktop by periodically issuing commands provided by the operating system executing on the node which return information about the node's desktop. Alternatively, the monitoring facility 506 may watch for messages posted to an intranode message queue. As noted above, in one particular embodiment the monitoring facility 4206 monitors the Windows Message Queue. Once a desktop change occurred, the message transmission facility 4208 transmits a message indicating the change that has occurred. In some embodiments, the message transmission facility 4208 broadcasts notification of the change.

In one embodiment, message transmission facility 4208 can be implemented in the form of non-blocking function that can be called from any window procedure. If the function can not send a data packet immediately (for example, the communication subsystem has no buffer space), a timer will be set and retry attempts will be done until the send succeeds.

Figure 43:
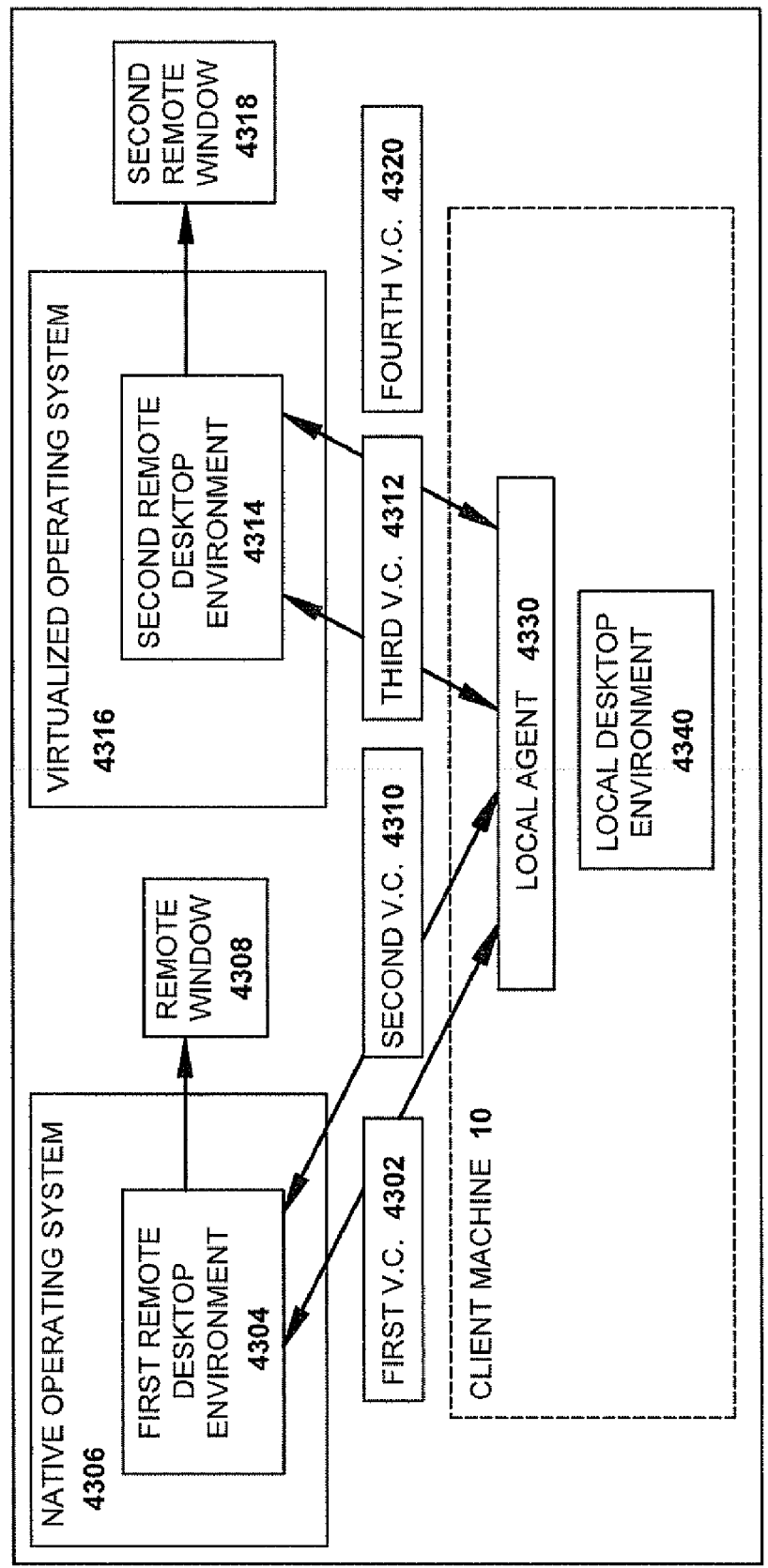
FIG. 43 is a block diagram depicting one embodiment of a system for enabling seamless windowing mode between a client machine and remote computing environments.

Referring now to FIG. 43, an embodiment of a system for enabling seamless windowing mode between a client machine 10 and remote computing environments is shown. In brief overview, the system includes a first virtual channel 4302, a first remote desktop environment 4304, a native operating system 4306, a remote window 4308, a second virtual channel 4310, a third virtual channel 4312, a second remote desktop environment 4314, a virtualized operating system 4316, a remote window 4318, a fourth virtual channel 4320, a local agent 4330, and a local desktop environment 4340.

In some embodiments the methods and systems described above in connection with FIGS. 24-37 may be implemented in systems including virtual machines. In some embodiments, the local agent 4330 resides on a client machine 10. In one of these embodiments, the client machine 10 establishes a connection to a physical machine providing access to a resource requested by the client machine 10. In this embodiment, the local agent 4330 on the client machine 10 may receive window attribute data and graphical data associated with a remote window 4308 from an agent on a remote machine 30 as described above.

In other embodiments, the client machine 10 has established a connection to a virtual machine providing access to a resource. In one of these embodiments, an agent for the remote machine 30 may reside in the virtual machine. In another of these embodiments, the agent for the remote machine 30 may reside in a hypervisor into which the virtual machine is launched. In still another of these embodiments, the agent for the remote machine 30 may reside in a second virtual machine providing management functionality for the virtual machine on the remote machine 30. In these embodiments, the client machine 10 may receive window attribute data and graphical data associated with a remote window 4308 through the implementation of the methods and systems described above in connection with FIGS. 24-37.

The client machine 10 may access multiple resources from different remote machines 30. In some embodiments, the client machine 10 may access resources on different machines substantially simultaneously over multiple established connections to, for example, both physical machines on remote machines 30 and to virtual machines executing in a hypervisor on remote machines 30'.

Referring still to FIG. 43, and in greater detail, a block diagram depicts one embodiment of a system for receiving window attribute data and graphical data associated with remote windows from virtualized operating systems and from native operating systems. The first virtual channel 4302 is coupled to the first remote desktop environment 4304, which is provided by the native operating system 4306. The first virtual channel 4302 conveys graphical data associated with the remote window 4308 provided by the first remote desktop environment 4304. The second virtual channel 4310 coupled to the first remote desktop environment 4304 conveys window attribute data associated with the remote window 4308 provided by the first remote desktop environment 4304.

The third virtual channel 4312 is coupled to the second remote desktop environment 4314 provided by a virtualized operating system 4316, the third virtual channel 4312 conveying graphical data associated with the second remote window 4318 provided by the third remote desktop environment 4314. The fourth virtual channel 4320 coupled to the second remote desktop environment 4314 and conveying window attribute data associated with the second remote window 4318 provided by the second remote desktop environment 4314. In one embodiment, the window attribute data associated with the remote windows 708 and 718 and conveyed by the second virtual channel 4310 and the fourth virtual channel 4320 includes the size and z-order of the remote windows.

The local agent 3814, coupled to the first remote desktop 4304 and the second remote desktop 4314 via the first, second, third and fourth virtual channels directs the formation of a first window in the local desktop environment 4340 corresponding to the remote window 4308 provided by the first remote desktop environment 4304 and the formation of a second window in the local desktop environment 4340 corresponding to the second remote window 4318 provided by the second remote desktop environment 4314. The first local window displays the graphical data conveyed by the first virtual channel 4302 in accordance with the window attribute data conveyed by the second virtual channel 4310 and the second local window displaying the graphical data conveyed by the third virtual channel 4312 in accordance with the window attribute data conveyed by the fourth virtual channel 4320. In one embodiment, the local agent 4330 forms and maintains a combined windows list representing a modifiable z-order of a corresponding window in the local desktop environment 4340.

In some embodiments, a local operating system forms the local desktop environment 4340. In one of these embodiments, the local agent 4330 periodically polls the local operating system to detect an attribute change in one of the first local window and the second local window. In another of these embodiments, upon detection of attribute change, the local agent 4330 transmits a message to one of the first remote desktop environment and the second remote desktop environment indicative of the attribute change. In some embodiments, corresponding windows on the local desktop environment 4340 and on the remote desktop environments 4304 and 4314 exhibit window attribute data substantially similar relative to the local desktop environment as to the window attribute data of the remote windows relative to their respective remote desktop environment.

Figure 44:
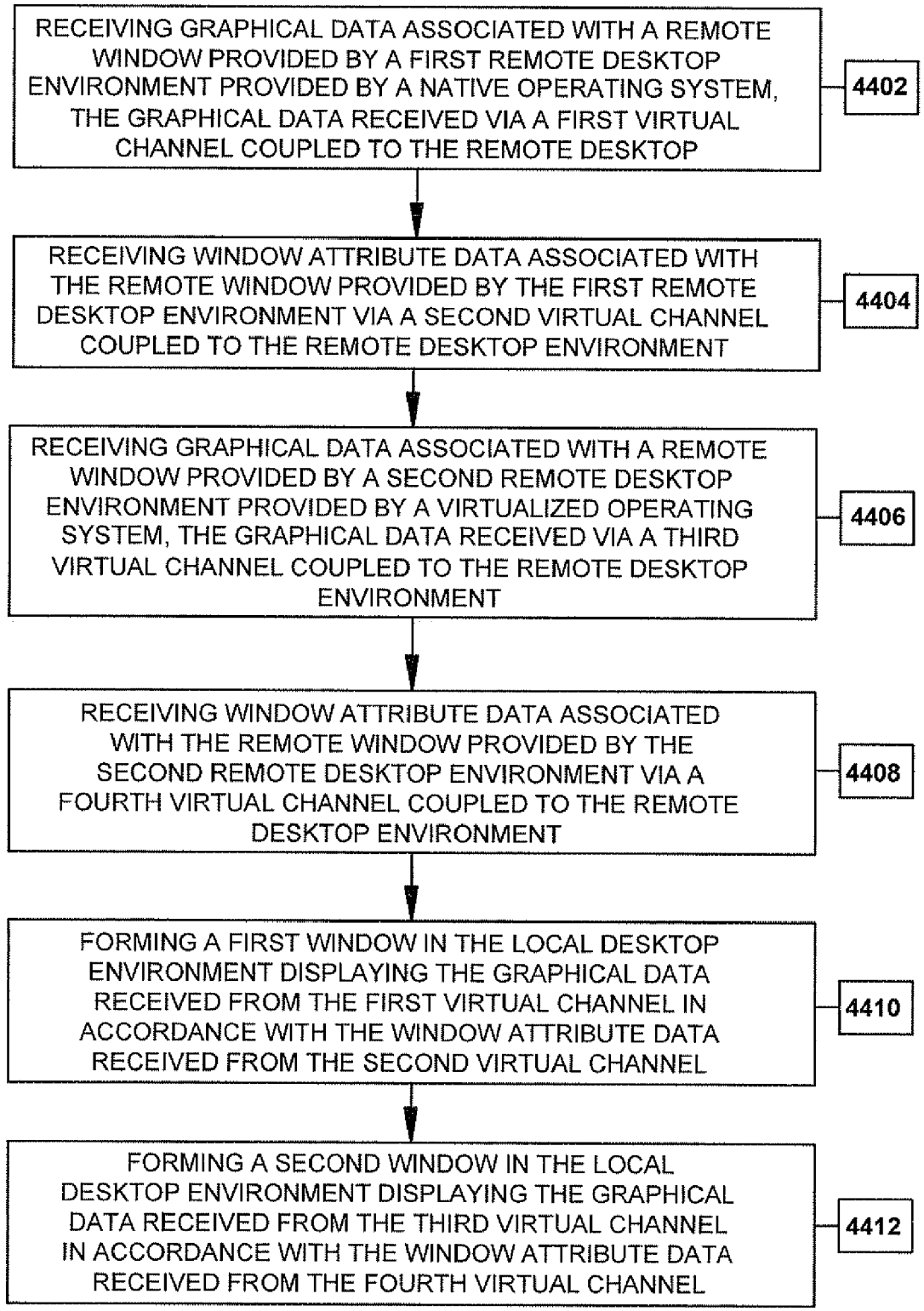
FIG. 44 is a flow diagram depicting one embodiment of the steps taken in a method of receiving window attribute data and graphical data associated with remote windows from virtualized operating systems and from native operating systems.

Referring now to FIG. 44, a flow diagram depicts one embodiment of the steps taken in a method of receiving window attribute data and graphical data associated with remote windows from virtualized operating systems and from native operating systems. In brief overview, graphical data associated with a remote window provided by a first remote desktop environment provided by a native operating system is received via a first virtual channel coupled to the remote desktop (step 4302). Window attribute data associated with the remote window provided by the first remote desktop environment is received via a second virtual channel coupled to the first remote desktop environment (step 4304). Graphical data associated with a remote window provided by a second remote desktop environment provided by a virtualized operating system is received via a third virtual channel coupled to the remote desktop environment (step 4306). Window attribute data associated with the remote window provided by the second remote desktop environment is received via a fourth virtual channel coupled to the second remote desktop environment (step 4308). A first window is formed in the local desktop environment, the first window displaying the graphical data received from the first virtual channel in accordance with the window attribute data received from the second virtual channel (step 4310). A second window is formed in the local desktop environment, the second window displaying the graphical data received from the third virtual channel in accordance with the window attribute data received from the fourth virtual channel (step 4312).

In some embodiments, a combined windows list is formed and stores at least some of the window attribute data. In other embodiments, a local operating system associated with the local desktop environment is polled to detect an attribute change in one of the first local window and the second local window and transmitting a message to one of the first remote desktop environment and the second remote desktop environment indicative of the detected attribute change. In still other embodiments, the local windows exhibit window attribute data substantially similar relative to the local desktop environment as the window attribute data of the remote windows relative to the remote desktop environments.

Figure 45:
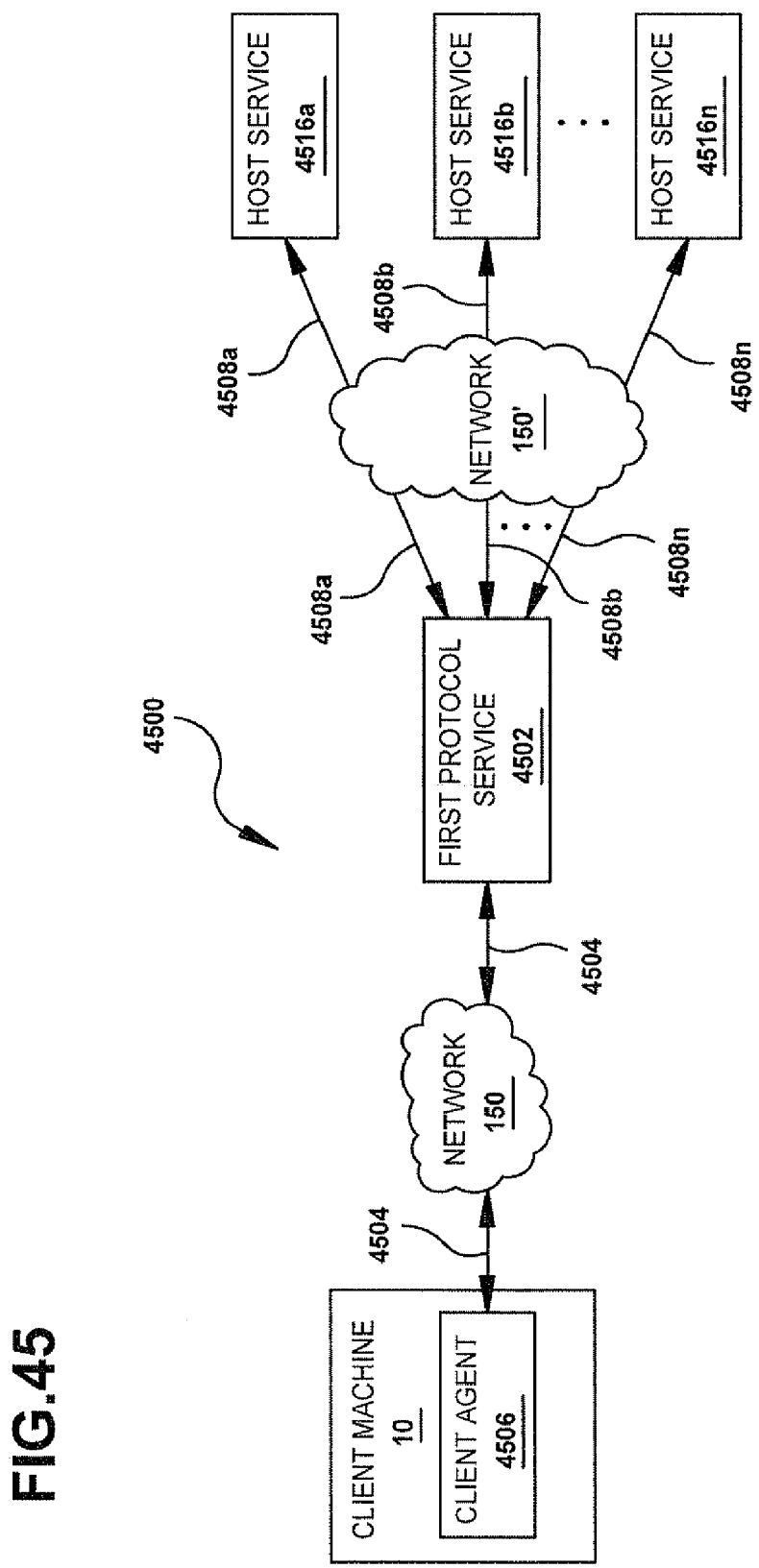
FIG. 45 is a block diagram of a system for providing a client with a reliable connection to a host service according to an embodiment of the invention.

Referring to FIG. 45, one embodiment of a system for providing a client with a reliable connection to a host service is shown. In a broad overview, a system 4500 for network communications includes a client machine 10 (e.g., a first computing device) in communication with a first protocol service 4502 (e.g., a second computing device) over a network 150. Also included in the system 4500 are a plurality of host services 4516a-4516n (e.g., third computing devices) that are in communication, over a network 150', with the first protocol service 4502 and, through the first protocol service 4502 and over the network 150, with the client machine 10. Alternatively, in another embodiment, and with reference now to FIG. 46, the first protocol service 4502 and the host services 4516a-4516n are not implemented as separate computing devices, as shown in FIG. 45, but, rather, they are incorporated into the same computing device, such as, for example, a remote machine 30. The system 4500 can include one, two, or any number of remote machines 30, 30'. The protocol service 4502 may also be provided as a remote machine 30.

In one embodiment, the networks 150 and 150' are separate networks, as in FIG. 45. The networks 150 and 150' can be the same network 150, as shown in FIG. 46.

Figure 46:
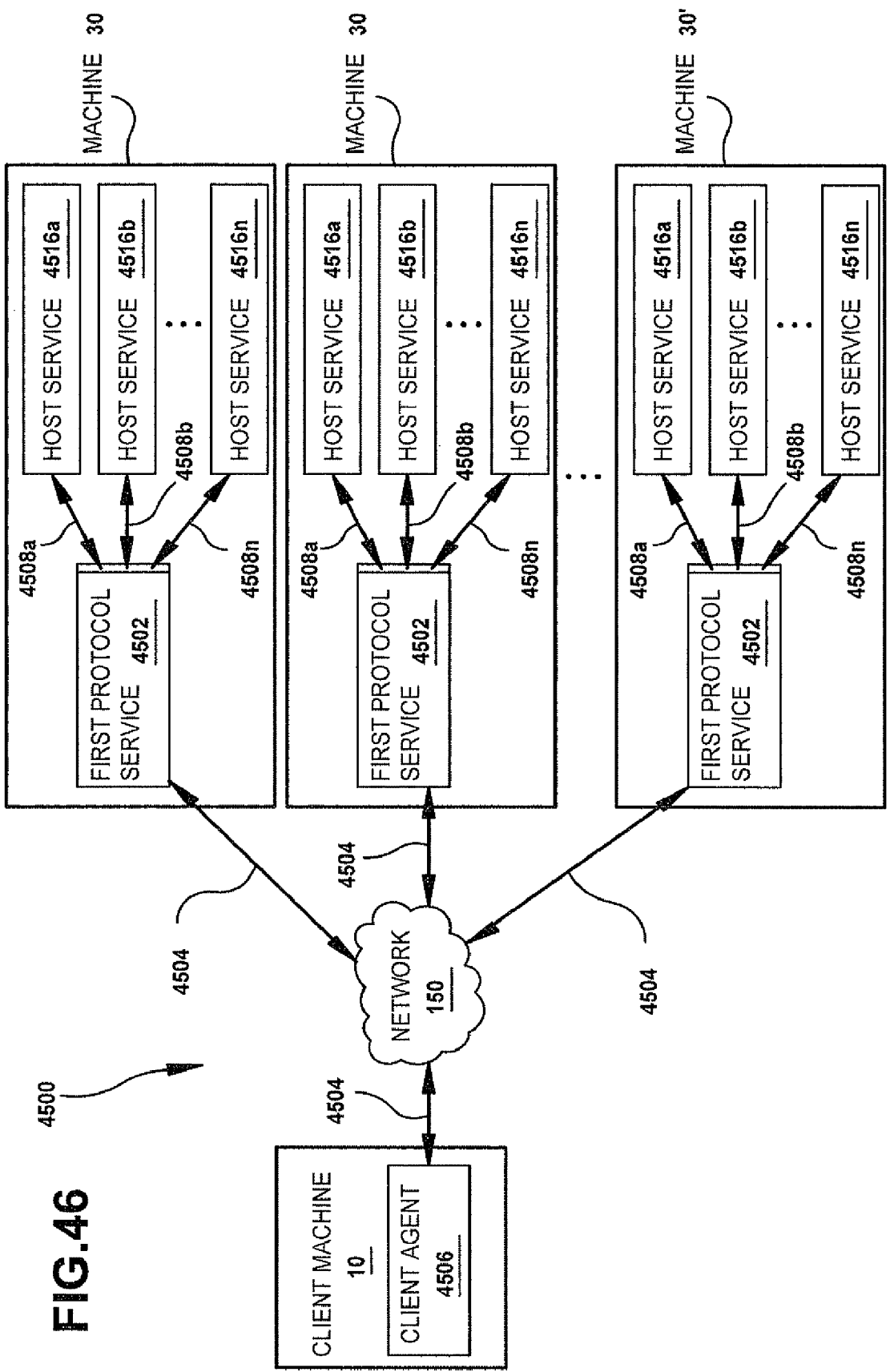
FIG. 46 is a block diagram of a system for providing a client with a reliable connection to a host service according to another embodiment of the invention.

Referring still to the embodiments of FIGS. 45 and 46, the client machine 10 is configured to establish a connection 4504 between the client machine 10 and a first protocol service 4502 over the network 150 using a first protocol. For its part, the first protocol service 4502 is configured to accept the connection 4504. The client machine 10 and the first protocol service 4502 can, therefore, communicate with one another using the first protocol as described below in reference to FIGS. 47-48 and FIG. 49.

In some embodiments, as shown in FIGS. 45 and 46, a client agent 4506 is included within the client machine 10. The client agent 4506 can be, for example, implemented as a software program and/or as a hardware device, such as, for example, an ASIC or an FPGA. The client agent 4506 can use any type of protocol and it can be, for example, an HTTP client agent, an FTP client agent, an Oscar client agent, a Telnet client agent, an Independent Computing Architecture (ICA) client agent from Citrix Systems, Inc. of Fort Lauderdale, Fla., or a Remote Desktop Procedure (RDP) client agent from Microsoft Corporation of Redmond, Wash. In some embodiments, the client agent 4506 is itself configured to communicate using the first protocol. In some embodiments (not shown), the client machine 10 includes a plurality of client agents 4506a-4506n, each of which communicates with a host service 4516a-4516n, respectively.

In another embodiment, a standalone client agent is configured to enable the client machine 10 to communicate using the first protocol. The standalone client agent can be incorporated within the client machine 10 or, alternatively, the standalone client agent can be separate from the client machine 10. The standalone client agent is, for example, a local host proxy. In general, the standalone client agent can implement any of the functions described herein with respect to the client agent 4506.

As also described further below, the first protocol service 4502 is, in one embodiment, itself configured to communicate using the first protocol. The first protocol service 4502 is configured to establish a connection 4508a-4508n between the first protocol service 4502 and the host service 4516a-4516n, respectively. For example, the first protocol service 4502 can establish a connection 4508a between the first protocol service 4502 and one host service 4516a and a connection 4508b between the first protocol service 4502 and another host service 4516b. In one embodiment, the first protocol service 108 separately establishes such connections 4508a-4508n (i.e., the first protocol service 4502 establishes one connection at a time). In another embodiment, the first protocol service 4502 simultaneously establishes two or more of such connections 4508a-4508n.

In yet another embodiment, the first protocol service 4502 can concurrently establish and maintain multiple connections 4508a-4508n. The first protocol service 4502 is configured to provide two or more connections 4508a-4508n without interrupting the connection 4504 with the client machine 10. For example, the first protocol service 4502 can be configured to establish the connection 4508a between the first protocol service 4502 and the host service 4516a when a user of the client machine 10 requests execution of a first application program residing on the host service 4516a. When the user ends execution of the first application program and initiates execution of a second application program residing, for example, on the host service 4516b, the first protocol service 4502 is, in one embodiment, configured to interrupt the connection 4508a and establish the connection 4508b between the first protocol service 4502 and the host service 4516b, without disrupting the connection 4504 between the first protocol service 4502 and the client machine 10.

The first protocol service 4502 and the host services 4516a-4516n can communicate over the connections 4508a-4508n, respectively, using any one of a variety of secondary protocols, including, but not limited to, HTTP, FTP, Oscar, Telnet, the ICA remote display protocol from Citrix Systems, Inc. of Fort Lauderdale, Fla., and/or the RDP remote display protocol from Microsoft Corporation of Redmond, Wash. For example, the first protocol service 4502 and the host service 4516a can communicate over the connection 4508a using the ICA remote display protocol, while the first protocol service 4502 and the host service 4516b can communicate over the connection 4508b using the RDP remote display protocol.

In one embodiment, the secondary protocol used for communicating between the first protocol service 4502 and a host service 4516, such as, for example, the ICA remote display protocol, includes a plurality of virtual channels. A virtual channel is a session-oriented transmission connection that is used by application-layer code to issue commands for exchanging data. For example, each of the plurality of virtual channels can include a plurality of protocol packets that enable functionality at the remote client machine 10. In one embodiment, one of the plurality of virtual channels includes protocol packets for transmitting graphical screen commands from a host service 4516, through the first protocol service 4502, to the client machine 10, for causing the client machine 10 to display a graphical user interface. In another embodiment, one of the plurality of virtual channels includes protocol packets for transmitting printer commands from a host service 4516, through the first protocol service 4502, to the client machine 10, for causing a document to be printed at the client machine 10.

In another embodiment, the first protocol is a tunneling protocol. The first protocol service 4502 encapsulates a plurality of secondary protocols, each used for communication between one of the host services 4516a-4516n and the first protocol service 4502, within the first protocol. As such, the host services 4516a-4516n and the first protocol service 4502 communicate with the client machine 10 via the plurality of secondary protocols. In one embodiment, the first protocol is, for example, an application-level transport protocol, capable of tunneling the multiple secondary protocols over a TCP/IP connection.

Figure 47:
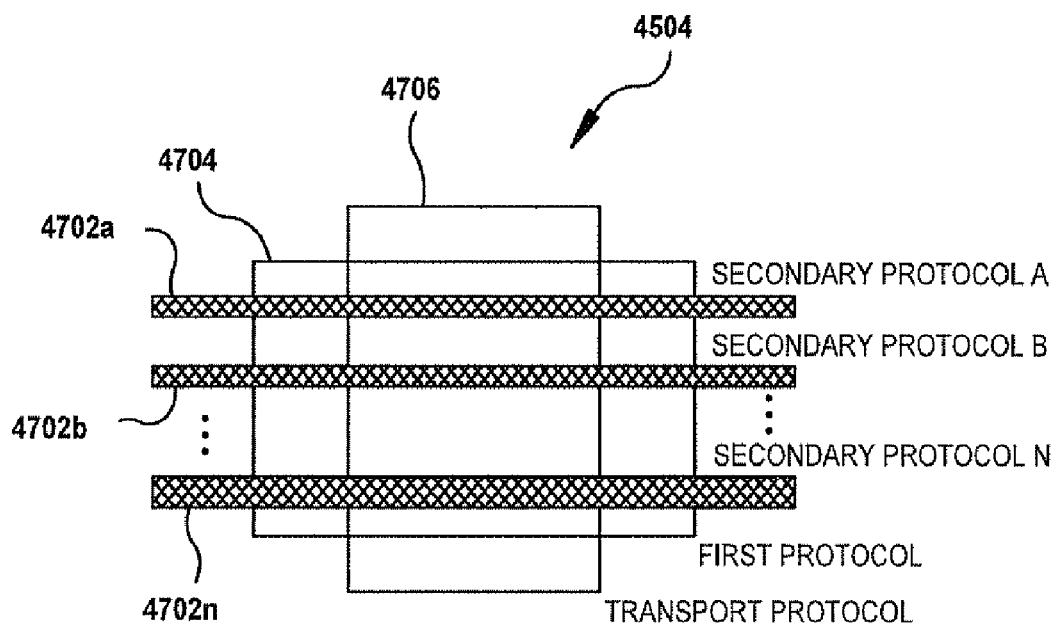
FIG. 47 depicts communications occurring over a network according to an embodiment of the invention.

Referring to FIG. 47, communications between the client machine 10 and the first protocol service 4502 via the connection 4504 take the form of a plurality of secondary protocols 4702a-4702n (e.g., HTTP, FTP, Oscar, Telnet, ICA, and/or RDP) encapsulated within a first protocol 4704. This is indicated by the location of secondary protocols 4702a-4702n inside the first protocol 4704. Where secure communication is not called for, the first protocol 4704 can be, as illustrated in FIG. 47, communicated over an unsecured TCP/IP connection 4706.

Figure 48:
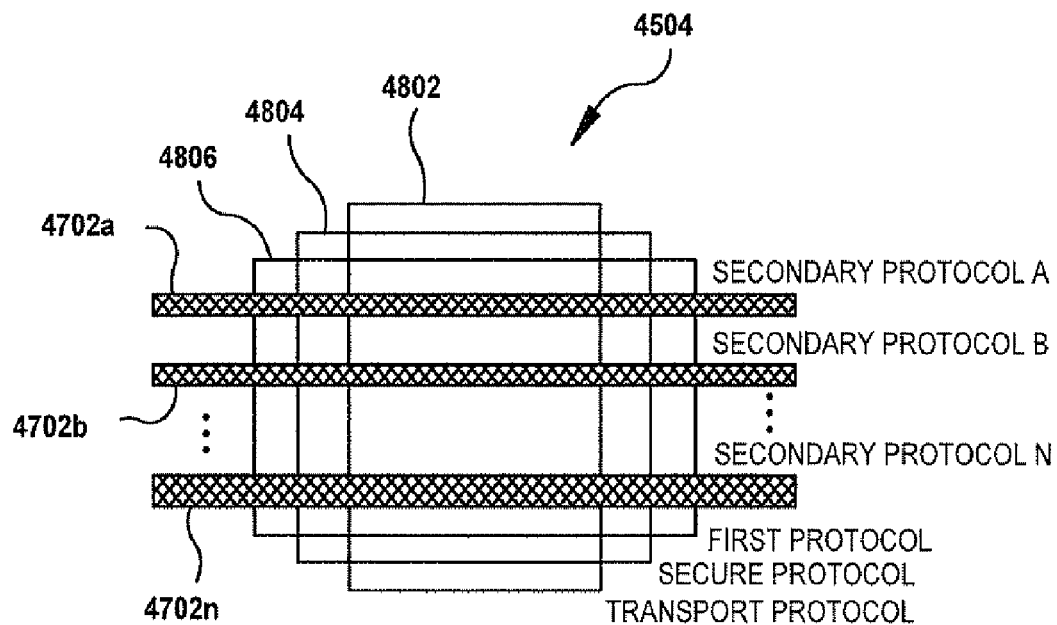
FIG. 48 depicts communications occurring over a network according to another embodiment of the invention.

Referring now to FIG. 48, if secure communication is used, the first protocol 4704 is communicated over an encrypted connection, such as, for example, a TCP/IP connection 4802 secured by using a secure protocol 4804 such as the Secure Socket Layer (SSL). SSL is a secure protocol first developed by Netscape Communication Corporation of Mountain View, Calif., and is now a standard promulgated by the Internet Engineering Task Force (IETF) as the Transport Layer Security (TLS) protocol and described in IETF RFC-2246.

Thus, the plurality of secondary protocols 4702a-4702n are communicated within the first protocol 4704 with (FIG. 48) or without (FIG. 47) a secure protocol 4804 over the connection 4504. The secondary protocols that can be used to communicate over the connections 4508a-4508n include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the remote client machine 10. For example, in one embodiment, one host service 4516a is a web server, communicating with the first protocol service 4502 over the connection 4508a using the HTTP protocol, and another host service 4516b is an application server, communicating with the first protocol service 4502 over the connection 4508b using the ICA protocol. The host service 4516b generates both protocol packets for transmitting graphical screen commands to the client machine 10, for causing the client machine 10 to display a graphical user interface, and protocol packets for transmitting printer commands to the client machine 10, for causing a document to be printed at the client machine 10.

In another embodiment, the method and systems described herein reduce the number of times network connections are opened and closed. In one embodiment, the first protocol 4704 allows the secondary protocol connections 4702a-4702n tunneled therein, such as, for example, an HTTP connection 4702n, to be opened and/or closed, repetitively, without also requiring the transport connection over which the first protocol 4704 is communicated (e.g., TCP connection 4706 and/or 4802), the secure protocol connection 4804, or the first protocol connection 4704 itself to similarly be repetitively opened and/or closed. Without the encapsulation of the first protocol 4704, the secondary protocol 4702a-4702n may frequently open and close network connections, such as TCP connections. This would add significant delays and overhead to the system. These delays and overhead would be further increased by the use of a secure encapsulation protocol 4806, such as SSL, which have significant overhead in establishing network connections. By encapsulating the secondary protocol 4702a-4702n within the first protocol 4704 and maintaining the connection of the transport connection (4706, 4802), the secondary protocols 4702a-4702n, as part of the payload of the first protocol 4704, do not need to perform frequent and costly open and closes of the network connection 4504. Furthermore, since the secondary protocols 4702a-4702n can be communicated within the first protocol 4704 with a secure protocol 4804, the secondary protocols 4702a-4702n also do not need to open and close secured connections such as with SSL. The transport connection (4706, 4802) establishes and maintains the network connection 4504 so that the encapsulated second protocols 4702a-4702n can be communicated without repetitively opening and closing the secured or unsecured network connection 4504. This significantly increases the speed of operation in communicating the secondary protocols 4702a-4702n.

As described above, the secondary protocols 4702a-4702n carry protocol packets related to applications using such protocols as HTTP, FTP, Oscar, Telnet, RDA or ICA. The secondary protocol packets 4902a-4902n transport data related to the application functionality transacted between the client machine 10 and the host service 4516a-4516n. For example, a user on the client machine 10 may interact with a web page provided by a host service 4516a-4516n. In transactions between the client machine 10 and the host service 4516a-4516n, the secondary protocol 4702a-4702n encapsulated in the first protocol 4704 may have http protocol packets related to displaying the web page and receiving any user interaction to communicate to the host service 4516a-4516n. Since the transport connection (4706, 4802) is not maintained by the secondary protocols 4702a-4702n, the secondary protocols 4702a-4702n do not need to handle any network-level connection interruptions. As such, the secondary protocols 4702a-4702n may not provide any network-level connection interruption information in their payloads. In the above example, the http related secondary protocol packets 4902a-4902n of the secondary protocol 4702a-4702n transmitted to the client machine 10 would not provide a notification that a network interruption occurred, e.g., an error message on a web page. Therefore, the user on the client machine 10 will not be notified of any network-level connection interrupts through the secondary protocol 4702a-4702n. This effectively hides the network connection interruptions from the user during the use of the applications related to the secondary protocols 4702a-4702n.

Figure 49:
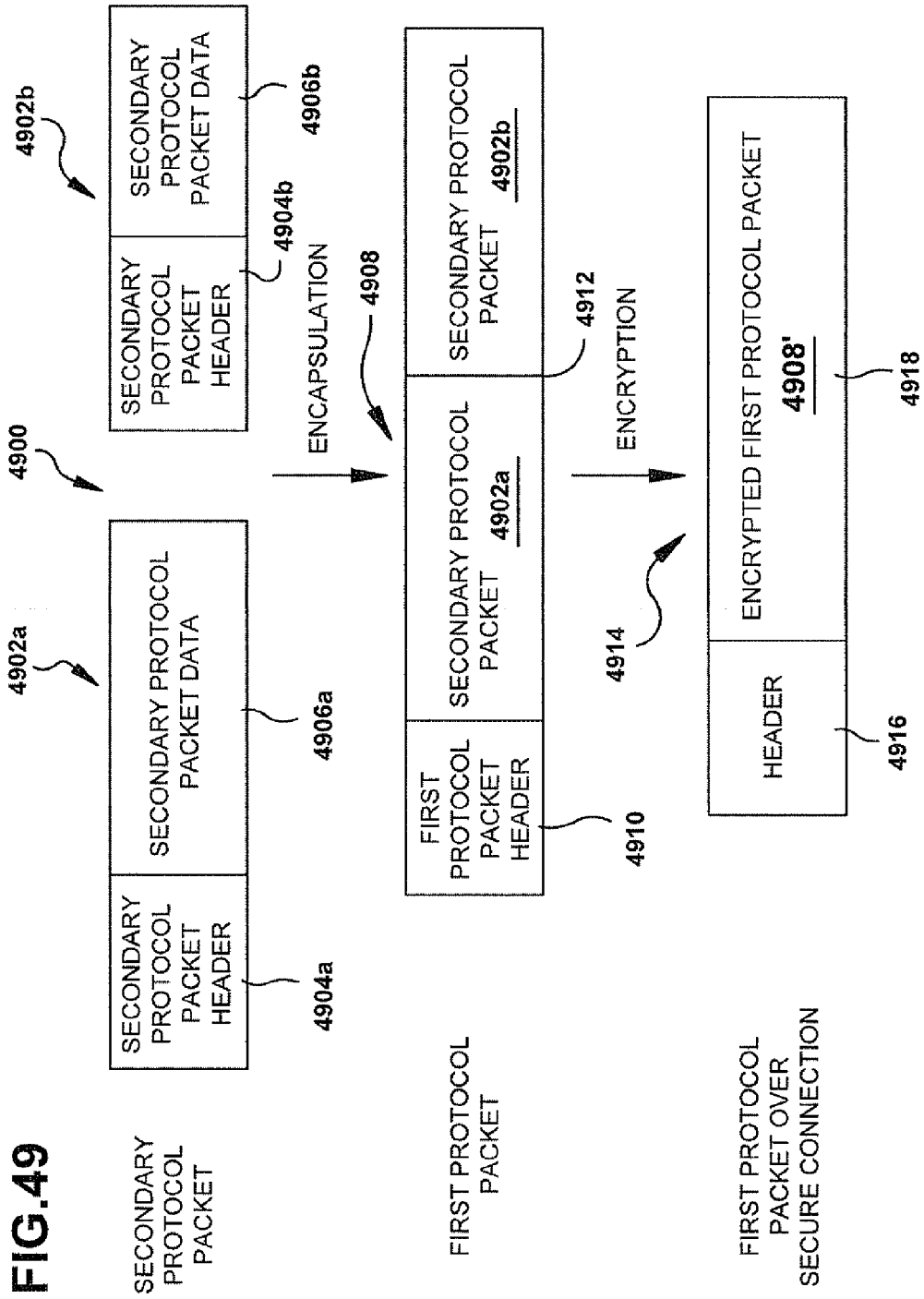
FIG. 49 depicts a process for encapsulating a plurality of secondary protocols within a first protocol for communication over a network according to an embodiment of the invention.

Referring to FIG. 49, an example process 4900 used by the first protocol service 4502 and the client agent 4506 of the client machine 10 encapsulates the plurality of secondary protocols 4702 (e.g., HTTP, FTP, Oscar, Telnet, ICA, and/or RDP) within the first protocol 4704 for communication via the connection 4504. Optionally, as described below, the example process 4900 used by the first protocol service 4502 and the client agent 4506 of the client machine 10 also compresses and/or encrypts the communications at the level of the first protocol prior to communications via the connection 4504. From the point of view of the first protocol service 4502, secondary protocol packets 4902a-4902n are received via the connections 4508a-4508n at the first protocol service 4502. For example, two secondary protocol packets 4902a and 4902b are received by the first protocol service 4502. One, two, or any number of secondary protocol packets 4902a-4902n can be received. In one embodiment, the secondary protocol packets 4902a-4902n are transmitted by the host services 4516 to the first protocol service 4502 over the connection 4508. The secondary protocol packets 4902a-4902n include a header 4904 and a data packet 4906, also referred to as a data payload.

Following receipt of the secondary protocol packets 4902a-4902n, the first protocol service 4502 encapsulates one or more of the secondary protocol packets 4902 within a first protocol packet 4908. In one embodiment, the first protocol service 4502 generates a first protocol packet header 4910 and encapsulates within the data payload 4912 of the first protocol packet 4908 one or more secondary protocol packets 4902a-4902n, such as, for example, two secondary protocol packets 4902a and 4902b. In another embodiment, only one secondary protocol packet 4902a is encapsulated in each first protocol packet 4908.

In one embodiment, the first protocol packets 4908 are then transmitted over the connection 4504, for example over the connection 4706 described with reference to FIG. 47, to the client agent 4506 of the client machine 10. Alternatively, in another embodiment, the first protocol service 4502 is further configured to encrypt, prior to the transmission of any first protocol packets 4908, communications at the level of the first protocol 4704. In one such embodiment, the first protocol packets 4908 are encrypted by using, for example, the SSL protocol described with reference to FIG. 48. As a result, a secure packet 4914, including a header 4916 and an encrypted first protocol packet 4908' as a data payload 4918, is generated. The secure packet 4914 can then be transmitted over the connection 4504, for example over the secure TCP/IP connection 4802 illustrated in FIG. 48, to the client agent 4506 of the client machine 10.

In another embodiment, the first protocol service 4502 is further configured to compress, prior to the transmission of any first protocol packets 4908, communications at the level of the first protocol 4704. In one embodiment, prior to encrypting the first protocol packet 4908, the first protocol service 4502 compresses, using a standard compression technique, the first protocol packet 4908. As such, the efficiency of the system 4502 is improved.

Referring again to FIGS. 45-46, in one embodiment, the system 4500 provides the remote client machine 10 with a persistent connection to a remote machine 30, such as, for example, the remote machine 30'. For example, if the client machine 10 establishes a connection 4504 between the client machine 10 and the first protocol service 4502 and the first protocol service 4502 establishes a connection 4508a between the first protocol service 4502 and the remote machine 30', then either the client agent 4506, the first protocol service 4502, or both are configured to maintain a queue of the first protocol data packets most recently transmitted via the connection 4504. For example, the queued data packets can be maintained by the client agent 4506 and/or the first protocol service 4502 both before and upon a failure of the connection 4504. Moreover, upon a failure of the connection 4504, the first protocol service 4502 and, likewise, the remote machine 30 are configured to maintain the connection 4508a.

Following a failure of the connection 4504, the client machine 10 establishes a new connection 4504 with the first protocol service 4502, without losing any data. More specifically, because the connection 4508a is maintained upon a failure of the connection 4504, a newly established connection 4504 can be linked to the maintained connection 4508a. Further, because the most recently transmitted first protocol data packets are queued, they can again be transmitted by the client machine 10 to the first protocol service 4502 and/or by the first protocol service 4502 to the client machine 10 over the newly established connection 4504. As such, the communication session between the remote machine 30' and the client machine 10, through the first protocol service 4502, is persistent and proceeds without any loss of data.

In one embodiment, the client agent 4506 of the client machine 10 and/or the first protocol service 4502 number the data packets that they transmit over the connection 4504. For example, each of the client agent 4506 and the first protocol service 4502 separately numbers its own transmitted data packets, without regard to how the other is numbering its data packets. Moreover, the numbering of the data packets can be absolute, without any re-numbering of the data packets, i.e., the first data packet transmitted by the client agent 4506 and/or the first protocol service 4502 can be numbered as No. 1, with each data packet transmitted over the connection 4504 by the client agent 4506 and/or the first protocol service 4502, respectively, consecutively numbered thereafter.

In one such embodiment, following a disrupted and re-established connection 4504, the client agent 4506 and/or the first protocol service 4502 informs the other of the next data packet that it requires. For example, where the client agent 4506 had received data packets Nos. 1-10 prior to the disruption of connection 4504, the client agent 4506, upon re-establishment of the connection 4504, informs the first protocol service 4502 that it now requires data packet No. 11. Similarly, the first protocol service 4502 can also operate as such. Alternatively, in another such embodiment, the client agent 4506 and/or the first protocol service 4502 informs the other of the last data packet received. For example, where the client agent 4506 had received data packets Nos. 1-10 prior to the disruption of connection 4504, the client agent 4506, upon re-establishment of the connection 4504, informs the first protocol service 4502 that it last received data packet No. 10. Again, the first protocol service 4502 can also operate as such. In yet another embodiment, the client agent 4506 and/or the first protocol service 4502 informs the other, upon re-establishment of the connection 4504, of both the last data packet received and the next data packet it requires.

In such embodiments, upon re-establishment of the connection 4504, the client agent 4506 and/or the first protocol service 4502 can retransmit the buffered data packets not received by the other, allowing the communication session between a host service 4516 and the client machine 10, through the first protocol service 4502, to proceed without any loss of data. Moreover, upon re-establishment of the connection 4504, the client agent 4506 and/or the first protocol service 4502 can flush from each of their respective buffers the buffered data packets now known to be received by the other.

By providing the client machine 10 with a reliable and persistent connection to a remote machine 30, the process of opening a new user session with the remote machine 30 is avoided by maintaining the user session through network connection interruptions. For each user session with a remote machine 30, the client machine 10 and the remote machine 30 may maintain session specific context and caches, and other application specific mechanisms related to that instance of the user session. For each new user session established, these session-specific context and caches need to be re-populated or re-established to reflect the new user session. For example, a user on the client machine 10 may have an http session with a remote machine 30. The remote machine 30 may keep context-specific information of this instance of the http session with the client machine 10. The context may be stored in the memory of the server, in files of the server, a database or other component related to providing the functionality of the remote machine 30. Also, the client machine 10 may have local context specific to the instance of the http session, such as a mechanism for keeping track of an outstanding request to the remote machine 30. This context may be stored in memory of the client machine 10, in files on the client machine 10, or other software component interfaced with the client machine 10. If the connection between the client machine 10 and the remote machine 30 is not persistent, then a new user session needs to be established with new session specific context on the remote machine 30 and the client machine 10. The session is maintained so that a new session, and therefore new specific session context, does not need to be re-established.

In some embodiments, the user session is maintained through network level connection interruptions and without notification to the user of the client that the session was interrupted. In operation of these embodiments, the first protocol service 4502 establishes and maintains a first connection with a client machine 10 and a second connection with a host service 4516a-4516n. Via the first connection and the second connection, a session between the client machine 10 and the remote machine 30 is established. The first protocol service 4502 can store and maintain any session-related information such as authentication credentials, and client machine 10 and remote machine 30 context for the established session. A user on the client machine 10 will exercise the functionality provided by the remote machine 30 through the established session. As such, related secondary protocol packets 4902a-4902n will contain data related to the transaction of such functionality. These secondary protocol packets 4902a-4902n as part of the secondary protocol 4702a-4702n are encapsulated and communicated in a first protocol 4704. Upon detection of a disruption in either the first connection or the second connection, the first protocol service 4502 can re-establish the disrupted connection while maintaining the other connection that may have not been disrupted. The network connection disruption may cause an interruption to the session between the client machine 10 and the remote machine 30. However, since the transport mechanism is not maintained by the secondary protocols 4702a-4702n, the session can be re-established after the network connection is re-established without the user on the client machine 10 having notification that the session was interrupted. The secondary protocol 4702a-4702n does not need to contain any interruption related information to transmit to the client machine 10. Thus, the interruption of the session caused by the network connection disruption is effectively hidden from the user because of the encapsulation of the first protocol 4704.

The first protocol service 4502 maintaining session related information can re-establish the session between the client machine 10 and the remote machines 30. For example, if the first connection between the client machine 10 and the first protocol service 4516 is disrupted, the first protocol service 4502 can keep the client machine 10's session active or open between the first protocol service 4502 and the remote machine 30. After the first connection is re-established, the first protocol service 4502 can link the session of the client machine 10 to the maintained session between the first protocol service 4502 and the host service 4516. The first protocol service 4502 can send to the client machine 10 any data that was queued prior to the disruption in the first connection. As such, the client machine 10 will be using the same session prior to the disruption, and the remote machine 30 and client machine 10 can continue to use any session specific context that may have in memory or stored elsewhere. Furthermore, because of the intermediary of the first protocol service 4502, the remote machine 30 may not be aware of the network disruption between the first protocol service 4502 and the client machine 10.

In another example, if the second connection between the first protocol service 4502 and the remote machine 30 is disrupted, the first protocol service can maintain the first connection with the client machine 10 while re-establishing the second connection with the remote machine 30. After re-establishing the second connection, the first protocol service 4502 can re-establish the client's session, on behalf of the client, with the remote machine 30. Since the first protocol service 4502 was maintaining any session relation information, the first protocol service may re-establish the same session or a similar session so that the client machine 10 is not aware of the disruption in the second network connection and the resulting disruption to the session between the first protocol service 4502 and the remote machine 30. During re-establishing the second network connection and the session, the first protocol service 4502 can queue any session transactions sent by the client machine 10 during the disruption. Then, after re-establishing the session with the remote machine 30, the first protocol service 4502 can transmit the queued transactions to the remote machine 30 and the session can continue normally. In this manner, the client machine 10 continues to operate as if there was not an interruption to the session.

Additionally, by providing a reliable and persistent connection, some embodiments also avoid interruptions to transactions, commands or operations as part of the functionality exercised between the client machine 10 and a remote machine 30, or a remote machine 30. For example, a file copy operation using Windows Explorer has not been designed to continue working after there is a disruption in a network connection. A user on the client machine 10 may use the file copy feature of Windows Explorer to copy a file from the client machine 10 to a remote machine 30. Because of the size of the file or files, this operation may take a relatively extended period of time to complete. If during the middle of the operation of the copy of the file to the remote machine 30, there is an interruption in the network connection between the client machine 10 and the remote machine 30, the file copy will fail. Once the network connection is re-established, the user will need to start another file copy operation from Windows Explorer to copy the file from the client machine 10 to the remote machine 30. Under some embodiments of the methods described above, the user would not need to start another file copy operation. The network connection would be re-established as part of the first protocol 4704 connection. The file copy operations would be encapsulated in the payload of the secondary protocols 4702a-4702n. As such, the file copy of Windows Explorer would not get notified of the interruption in the network connection and therefore, would not fail. The first protocol service 4502 would re-establish any connections and transmits any queued data so that operation can continue without failure. The first protocol service 4502 would maintain a queue of the data related to the file copy operations that has not been transferred to the remote machine 30 because of the interruption in the network connection. Once the network connection is re-established, the first protocol service 4502 can transmit the queued data and then continue on with transferring the data related to the file copy operation in due course.

Although these embodiments are described in terms of a file copy operation example, one ordinarily skilled in the art will recognize that any operation, transaction, command, function call, etc. transacted between the client machine 10 and the remote machine 30, or remote machines 30, can be maintained and continued without failure from the network connection disruption, and, furthermore, without the client machine 10 recognizing there was a disruption or having notice of the disruption.

Furthermore, by providing a reliable and persistent connection, a client machine 10 is able to traverse through different network topologies without re-starting a session or an application on the client machine 10. For example, the client machine 10 may be a computer notebook with a wireless network connection. As the client machine 10 moves from a first wireless network to a second wireless network, the client's network connection 4504 may be temporarily disrupted from the first wireless network as a network connection is established with the second wireless network. The second wireless network may assign a new network identifier, such as a host name or internet protocol address, to the client machine 10. This new network identifier may be different than the network identifier assigned to the client machine 10 by the first wireless network. In another example, the client machine 10 may be physically connected through an Ethernet cable to a port on the network. The physical connection may be unplugged and the client machine 10 moved to another location to plug into a different port on the network. This would cause a disruption into the network connection 102 and possible a change in the assigned network identifier. By the method and systems described herein, the network connection is maintained for the client and automatically re-established the network connection of the client machine 10, including handling changes in the network topology and network identifier. The client machine 10, and any applications or sessions on the client machine 10, can continue to operate as if there was not a network connection disruption or a change in the network identifier. Furthermore, the user on the client machine 10 may not recognize there were any interruptions or changes, and the client machine 10 may not receive any notice of such interruptions.

Even with a reliable and persistent communication session as described above, network connections are still disrupted. When re-establishing the client's connection to the host service, the client machine 10 also needs to be re-authenticated to the remote machine 30. In one embodiment, systems and methods authenticate a client machine 10 to a host service 4516 and re-authenticate the client machine 10 to the remote machine 30 without re-entering authentication credentials.

In another embodiment, securely establishing a communication session between the client machine 10 and the host service 4516 is enabled via multiple connections or "hops" that traverse multiple network components, such as a proxy, security gateway, firewall or router. The establishment of the multiple hop secure communication session may further be initiated via a secure client-web server communication channel, for example, between the web browser 6302 and a first remote machine 30 using SSL. The ticket authority 6102 can provide tickets for each of the hops such as the client-first protocol service connection 4504 and the first protocol service to host service connections 4508a-4508n. In this manner, the client machine 10 is authenticated through all the connections between the client machine 10 and the host service 4516a-45116n.

In some embodiments, a first remote machine 30, functioning as a web server, receives a request from the client machine 10 for an application and the first remote machine 30 validates the request with the ticket authority 6102. The ticket authority 6102 then generates an N part ticket (e.g., $T_1$ to $T_N$). In one embodiment, the ticket authority 6102 then transmits a portion $T_i$ of the N part ticket (e.g., the first part of the ticket, or first ticket $T_1$) to the first remote machine 30. The first remote machine 30 then transmits the ticket $T_1$ to the client machine 10. In one embodiment, the ticket authority 6102 also transmits the address of the next "hop" (e.g., the first protocol service 4502 to the first remote machine 30, which then transmits the address to the client machine 10. This address is the address of the next hop (e.g., first protocol service 4502) that this hop (e.g., client machine 10) needs to communicate with for the client machine 10 to eventually be authenticated to the remote machine 30.

The client machine 10 uses the address to then contact the next "hop" (e.g., first protocol service 4502) and initiates a communication session with the first protocol service 4502a by transmitting a proxy connection request over the client-first protocol service communication channel 4504. The first protocol service 4502a then extracts the first ticket $T_1$ from the proxy connection request and forwards this ticket to the ticket authority 6102 for validation. The ticket authority 6102 then validates the first ticket $T_1$.

Upon proper verification of the first ticket $T_1$, the ticket authority 6102 transmits the next ticket $T_i$ from the N part ticket (e.g., $T_2$) to the next first protocol service 4502 (e.g., first protocol service 4502a). In some embodiments, the ticket authority 6102 also transmits the address of the next hop (e.g., the second first protocol service 4502b) to this hop (e.g., the first protocol service 4502a). The first protocol service 4502a transmits this ticket to the next hop (e.g., the second first protocol service 4502b). In one embodiment, the second first protocol service 4502b verifies $T_2$ by transmitting the ticket to the ticket authority 6102. The ticket authority 6102 validates the second ticket $T_2$ and the process continues. Once the last part of the N part ticket has been validated the application is launched on the client machine 10.

In one embodiment, each first protocol service 4502 (i.e., each hop) validates $T_i$ (e.g., $T_2$) with a ticket authority 6102 associated with the first protocol service 4502 (i.e., hop). In this embodiment, after each first protocol service 4502 validates the ticket $T_i$ (e.g., $T_2$) with a ticket authority 6102, the ticket authority 6102 at which the validation took place transmits the next ticket $T_{i+1}$ (e.g., $T_3$) and the address of the next first protocol service 4502 (i.e., the next "hop" destination) to the first protocol service 4502 that had validated the ticket $T_i$. Thus, each first protocol service 4502 is associated with a ticket authority 6102 that has been configured with the current and next hop tickets (i.e., validating $T_i$ and transmitting $T_{i+1}$ for the next hop). Consequently, the next first protocol service 4502 acts as the client for that hop. This process is repeated until reaching the remote machine 30. Thus, each hop has been validated individually without revealing all of the ticket to any one hop.

In other embodiments, the ticket authority 6102 may issue more than one ticket rather than issuing one ticket having many parts. For example, the ticket authority 6102 generates a first hop ticket and a second hop ticket, where the first hop ticket has no association with the second hop ticket. The ticket authority 6102 subsequently transmits the first hop ticket to the first remote machine 30 and the first remote machine 30 transmits the first hop ticket to the client machine 10. The client machine 10 transmits this first hop ticket to the first protocol service 4502 (e.g., first protocol service 4502a) for validation by the ticket authority 6102. Upon validation, the ticket authority 6102 transmits the second hop ticket to the next first protocol service 4502 (e.g., second first protocol service 4502b) while the first hop ticket is independent from the second hop ticket.

In a further embodiment, one or more of the ticket authorities 6102 provides proxies, either as part of the first protocol service 4502 or separated from the first protocol service 4502, with any necessary information needed to connect to the next hop, such as, but without limitation, encryption keys, SSL method configuration information, and authentication information to connect to a SOCKS server (e.g., SOCKS5 server, developed by NEC Corporation of Tokyo, Japan).

In yet another embodiment, a ticket authority 6102 only generates a single ticket. The ticket authority 6102 transmits the single ticket to the first remote machine 30. The first remote machine 30 forwards the single ticket to the client machine 10. The first protocol service 4502 subsequently receives the ticket from the client machine 10 and "consumes" the single ticket upon validation. As a result, a single ticket can provide the ability to use arbitrary communication protocols over the client-proxy communication channel 4504 and the client-web server communication channel. Additionally, because the remote machine 30 does not receive or verify the single ticket, the ticket is transparent to the remote machine 30 and, consequently, the remote machine 30 is not "aware" of the use of the ticket.

By exploiting the security of the secure communications between the client machine 10 and the first remote machine 30 over the secure client-web server communication channel, the system establishes a secure communication link over the non-secure client-proxy communication channel 4504 to remotely display desktop applications securely on the client machine 10.

In yet another embodiment, the ticket authority 6102 transmits a disabled version of the first protocol service ticket with the client ticket to the first remote machine 30 for transmission to the client machine 10. The client machine 10 subsequently transmits the first protocol service ticket along with the client ticket to the first protocol service 4502 as part of the proxy connection request. The first protocol service 4502 then forwards both tickets to the ticket authority 6102. Upon receiving a disabled first protocol service ticket, the ticket authority 6102 enables the first protocol service ticket after validating the client ticket. The ticket authority 6102 then transmits the enabled first protocol service ticket to the first protocol service 4502 for authentication to the host node 118.

Alternatively, in another embodiment the first remote machine 30 receives a disabled first protocol service ticket and an enabled client ticket from the ticket authority 6102 and only transmits the client ticket to the client machine 10. The client machine 10 transmits the client ticket to the first protocol service 4502 as part of the proxy connection request. The first protocol service 4502 then forwards the client ticket to the ticket authority 6102. The ticket authority 6102 validates the client ticket and, upon validation, enables the first protocol service ticket previously transmitted to the first remote machine 30. In yet another embodiment, the ticket authority 6102 transmits an enabled first protocol service ticket to the first remote machine 30 upon validation of the client ticket for authentication to the remote machine 30.

Thus, at any given time, the ticket authority 6102 provides only one ticket that is enabled to the client machine 10 or first protocol service 4502 that the ticket authority 6102 can validate. The ticket authority 6102 may provide another ticket that can't be validated (i.e., a disabled ticket) until the enabled ticket is validated. Alternatively, the ticket authority 6102 may not transmit the first protocol service ticket to the first protocol service 4502 until the ticket authority 6102 validates the enabled ticket. As discussed in further detail below, this enforces network routing of communications using embodiments of this system because the client machine 10 cannot traverse the first remote machine 30 or the first protocol service 4502 without having the ticket authority 6102 validate the enabled ticket and transmit the ticket needed to communicate with the remote machine 30.

In another embodiment, instead of transmitting the first protocol service ticket to the first protocol service 4502, the ticket authority 6102 transmits the first protocol service ticket to the first remote machine 30 directly over a web server-authority communication channel. The first remote machine 30 then automatically transmits the first protocol service ticket to the remote machine 30. In other words, the first remote machine 30 "pushes" the first protocol service ticket to the remote machine 30. The ticket authority 6102 can also push the first protocol service ticket to the remote machine 30 without transmission of the first protocol service ticket to the first protocol service 4502 or the first remote machine 30.

In yet another embodiment, the remote machine 30 retrieves the first protocol service ticket from the ticket authority 6102 over the ticket-content server communication channel 157. In other words, the remote machine 30 "pulls" the first protocol service ticket from the ticket authority 6102.

Moreover, the system enforces the routing of the client machine 10 through the first protocol service 4502. As stated above, the client machine 10 has to possess the first protocol service ticket to establish a communication session with the remote machine 30. More specifically, to establish a connection with the remote machine 30, the first remote machine 30 first has to validate the request of the client machine 10 with the ticket authority 6102. Once validated, the client machine 10 obtains the first ticket and transmits this first ticket to the ticket authority 6102 for validation. However, upon validation, the ticket authority 6102 transmits the first protocol service ticket back to the first protocol service 4502 rather than the client machine 10. The communication session between the client machine 10 and the host service 4516 is established when the host service 4516 receives the first protocol service ticket. Thus, the client machine 10 has to communicate with the first protocol service 4502 in order to have the first protocol service ticket transmitted to the host service 4516, thereby enforcing the routing of the client machine 10 through the first protocol service 4502. Thus, the invention can ensure the proper traversal of a security device (e.g., the first protocol service 4502) before granting access to the remote machine 30.

For example, a remote machine 30 executes several applications, such as MICROSOFT WORD and MICROSOFT EXCEL, both developed by Microsoft Corporation of Redmond, Wash. In one embodiment, the client machine 10 uses NFUSE, developed by Citrix Systems, Inc. of Fort Lauderdale, Fla., to obtain information from the machine farm 38 in which applications can be accessed by the client machine 10. If a client user wants to access and use MICROSOFT WORD, the client machine 10 requests the application from the first remote machine 30. However, only users who pay an application fee for MICROSOFT WORD can become authorized to access the application.

To ensure the payment of the application fee, the system includes the first protocol service 4502 and the ticket authority 6102 to enforce the routing of the client machine 10 through the first protocol service 4502. The routing of the client machine 10 through the first protocol service 4502 is valuable to the application provider if the first protocol service 4502 is used to collect the application fee and authorize the user for access to the application.

The ticket authority 6102 subsequently generates a ticket associated with the request for the application. An enabled first ticket is then transmitted to the client machine 10. Because the client machine 10 does not have the address of the host node 118, the client machine 10 cannot access the application. Further, the client machine 10 has not been authorized by the first protocol service 4502 yet (i.e., has not yet paid). Thus, the client machine 10 has to communicate with the first protocol service 4502 to become authorized. The first protocol service 4502 can then transmit the enabled first ticket to the ticket authority 6102 upon payment of the application fee.

The ticket authority then validates the client ticket and subsequently transmits (or enables) a first protocol service ticket to the proxy. The first protocol service 4502 then transmits the first protocol service ticket to the remote machine 30 (e.g., assuming the client user has paid the application fee), which enables the remote machine 30 to transmit the application to the client machine 10.

Figure 50:
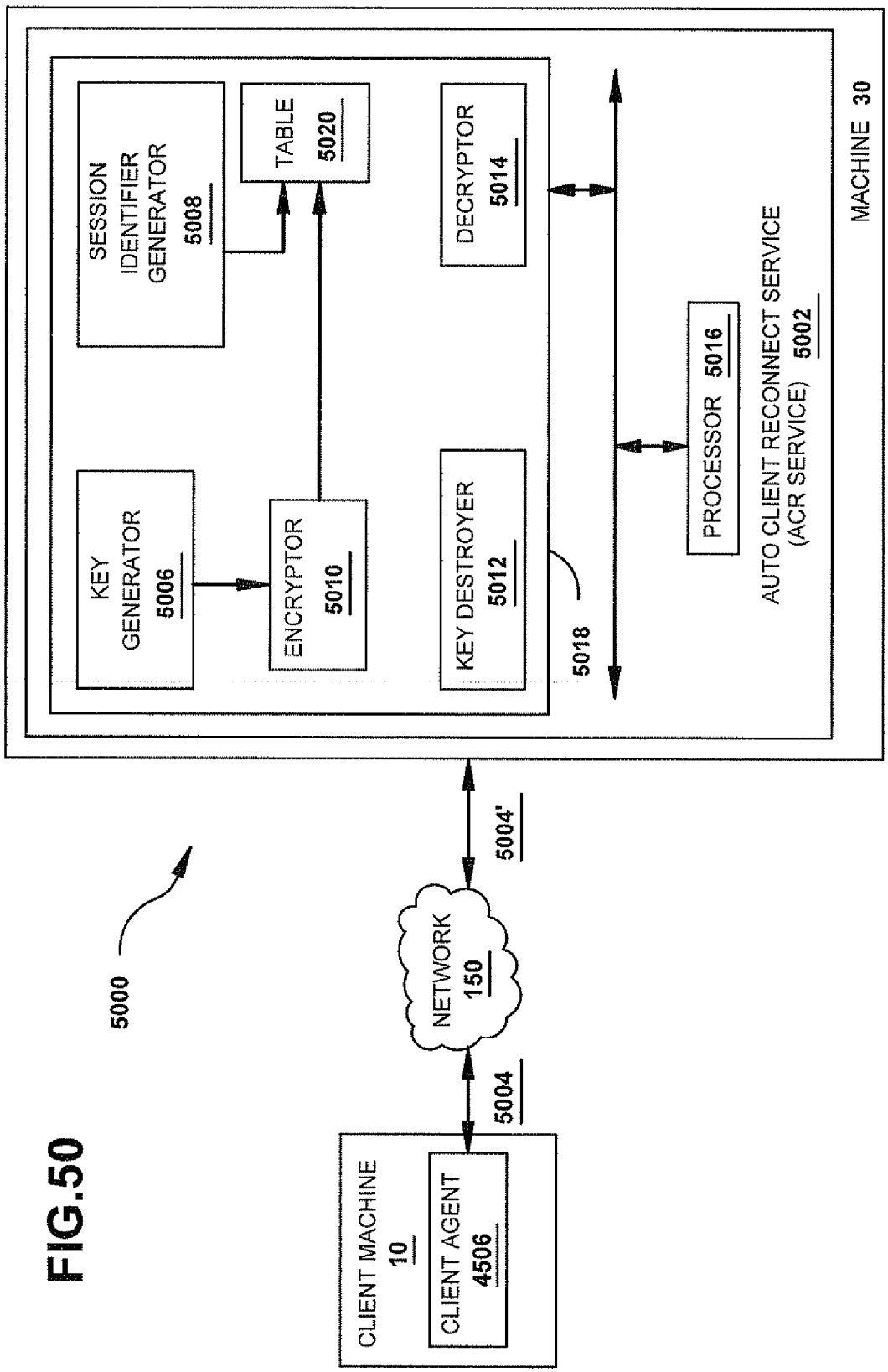
FIG. 50 is a block diagram of an embodiment of a computer system to maintain authentication credentials in accordance with the invention.

FIG. 50 depicts one embodiment of a system 5000 that is capable of reconnecting the client machine 10 to a host service 4516 using an automatic client reconnect service referred to as auto client reconnect service or ACR Service 5002. In brief overview, a client machine 10 communicates with a remote machine 30, also referred to as a server, over a communication channel 5004. The communication channel 5004 may include a network 150. For example, the communication channel 5004 can be over a local-area network (LAN), such as a company Intranet, or a wide area network (WAN) such as the Internet or the World Wide Web. The remote machine 30 provides auto client reconnect services through an ACR Service 5002. The client machine 10 accesses the remote machine 30 through the communication channel 5004. The ACR Service 5002 of the remote machine 30 provides authentication services to authenticate the client machine 10 to the remote machine 30. When there is a disruption in a network connection, the ACR Service 5002 further provides re-authentication services to re-authenticate the client machine 10 to the remote machine 30. Although described with a single client machine 10 and one communication channel 5004, any number of clients (e.g. 10, 10') and number of communication channels (e.g. 5004, 5004') can be part of the system 4500.

The ACR Service 5002 running on the remote machine 30 includes a key generator 5006, a session identifier (SID) generator 5008, an encryptor 5010, a key destroyer 5012, and a decryptor 5014. The key generator 5006 generates a key when the remote machine 30 or the ACR Service 5002 receives authentication credentials from the client machine 10. In one embodiment, the key generator 5006 derives the key from a characteristic of the remote machine 30. Particular examples include the key generator 5006 deriving the key from the temperature of the processor 5016, the time that remote machine 30 received the authentication credentials, and the number of keys stored in memory 5018. In a further embodiment, the key and the authentication credentials are the same size (e.g. eight bits). In one embodiment, the key generator is a software module. In another embodiment, the key generator 5006 is a random number generator.

The SID generator 5008 generates the unique SID to enable the remote machine 30 to identify a particular communication session. In one embodiment, the SID generator 5008 is a software module. In another embodiment, the SID generator 5008 is a random number generator. In another embodiment, the SID generator transmits the SID to the host service 4516. In one embodiment, the SID generator 5008 obtains the SID from a host service 4516 running on the server. In yet another embodiment, the SID generator generates the SID by receiving a session identifier from the host service 116 establishing a user session.

The encryptor 5010 encrypts the key with the authentication credentials to create encrypted authentication credentials. In one embodiment, the encryptor 5010 encrypts the key with the authentication credentials by performing an exclusive OR operation (i.e. XOR) on the key and the authentication credentials. In another embodiment, the encryptor 5010 adds the authentication credentials to the key to encrypt the authentication credentials; that is, the encryptor 5010 performs a "Caesar Cipher" on the authentication credentials using the key as the shift value. In another embodiment, the encryptor 5010 performs a hash function, such as MD4, MD5, or SHA-1, on the authentication credentials. It should be clear that the encryptor 5010 can perform any type of manipulation on the authentication credentials as long as the ACR Service 5002 can decrypt the encrypted authentication credentials with the key.

In one embodiment, the encryptor 5010 is a software module that executes mathematical algorithms on the key and the authentication credentials to create the encrypted authentication credentials. In another embodiment, the encryptor 5010 is a logic gate of the remote machine 30, such as an exclusive OR (XOR) gate.

In one embodiment, the encryptor 5010 stores the encrypted authentication credentials with the SID in a table 5020 in memory 5018. In another embodiment, the encryptor 5010 stores the encrypted authentication credentials in the table 5020 and the SID generator 5008 stores the SID in the table 5020. In one embodiment, the table 5020 is an area in memory 5018 allocated by the processor 5016 for us by the encryptor 5010. In another embodiment, the encryptor 5010 stores the encrypted authentication credentials with the SID in a database (not shown in FIG. 50) separate from memory 5018.

In one embodiment, the ACR Service 5002 uses the SID as a vector to the location of the encrypted authentication credentials in the table 5020. In another embodiment, the ACR Service 5002 uses the SID as a database key to locate and retrieve the encrypted authentication credentials in a database (not shown in FIG. 50). Each encrypted authentication credential created by the encryptor 5010 is associated with only one unique SID. Thus, the ACR Service 5002 can locate and retrieve the encrypted authentication credentials by using a particular SID.

The key destroyer 5012 deletes the key once the ACR Service 5002 determines that the key is no longer needed. In one embodiment, the key destroyer 5012 is a delete function of a software program such as the operating system of the remote machine 30.

The decryptor 5014 decrypts the encrypted authentication credentials once the ACR Service 5002 receives the key and the SID from the client machine 10. In one embodiment, the decryptor 5014 is a software module that performs the inverse function or algorithm that the encryptor 5010 performed to create the encrypted credentials. In another embodiment, the decryptor 5014 is a hardware component (e.g. a logic gate) to perform the inverse operation of the encryptor 5010.

In one embodiment, one or more of the key generator 5006, the SID generator 5008, the encryptor 5010, the key destroyer 5012 and the decryptor 5014 are joined into one software module representing the ACR Service 5002. In another embodiment, these components can be hardware components such as logic gates. In a further embodiment, these components are included in a single integrated circuit. In yet another embodiment, some of the components, for example the key generator 5006 and the SID generator 5008, can be hardware components, and other components, for example the encryptor 5010, the key destroyer 5012 and the decryptor 5014, can be software components.

In another embodiment, methods for reconnecting a client machine 10 to a remote machine 30 when there is a disruption in the client's connection to the network are provided. The methods include re-establishing the client's connection to the remote machine 30 and using the ACR Service 5002 to re-authenticate the client to the host service.

Figure 51:
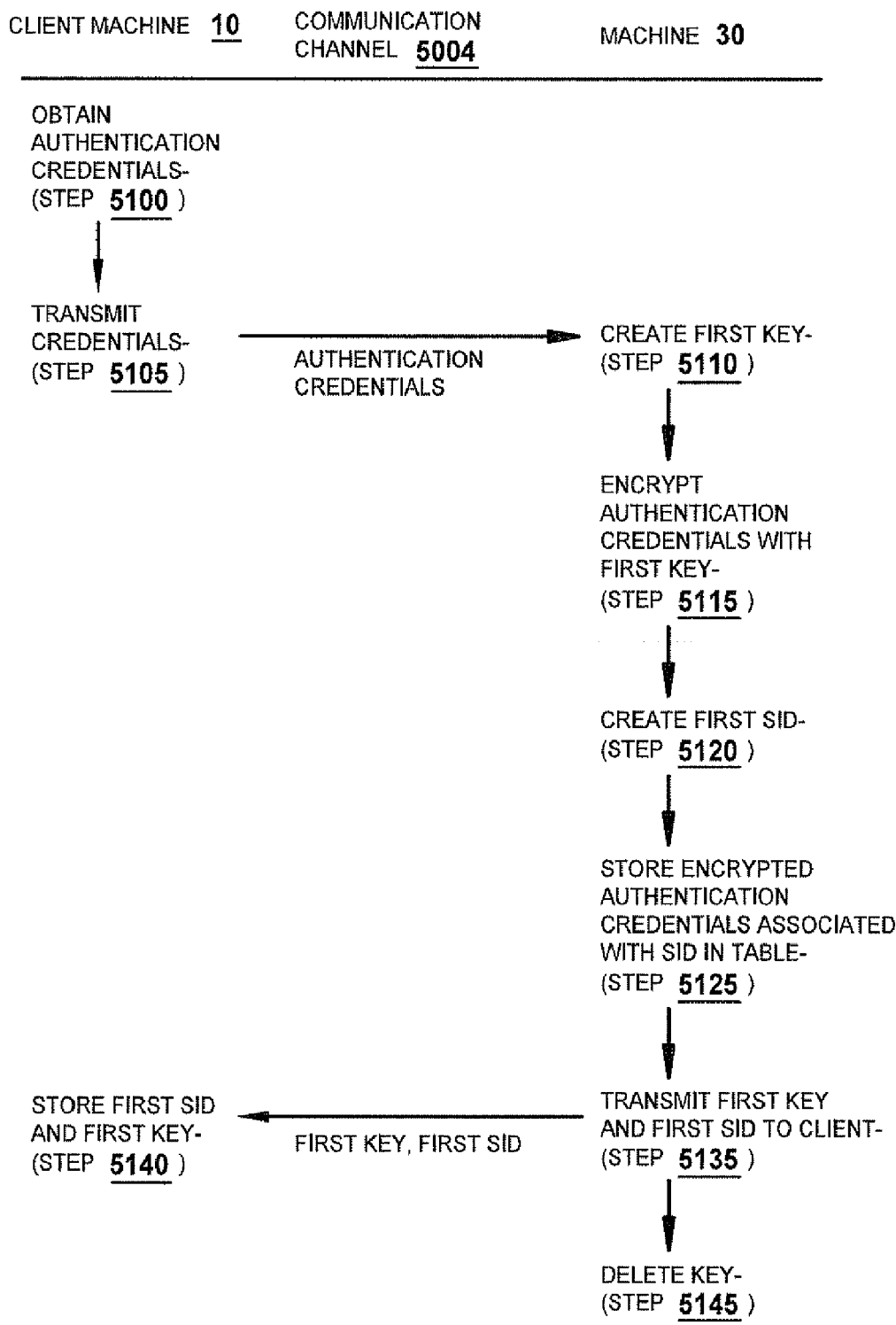
FIG. 51 is a flow diagram of the steps followed in an embodiment of the computer system of FIG. 5 to maintain authentication credentials during a first communication session in accordance with the invention.

Referring to FIG. 51, the client machine 10 establishes a first communication session with the remote machine 30 over the communication channel 5004. The client machine 10 obtains (step 54100) authentication credentials from a user of the client machine 10. In a system 4500 not using an Open System Interconnection (OSI) protocol as the transmission protocol for communications between the client machine 10 and the remote machine 30, the authentication credentials may be a login password that is needed to establish the first communication session. In this embodiment, the obtaining of the authentication credentials from the user precedes the establishment of the communication session. In another embodiment, the authentication credential is personal information of the user that the client machine 10 obtains after the first communication session has been established. Examples of authentication credentials include a login password, a social security number, a telephone number, an address, biometric information, a time-varying pass code and a digital certification. The client machine 10 then transmits (step 5405) the authentication credentials to the remote machine 30 over the communication channel 5004 so that the remote machine 30 can authenticate the client machine 10 or the user of the client machine 10.

After the remote machine 30 receives the authentication credentials, the ACR Service 5002 provides its auto client reconnect services. The key generator 5006 creates (step 5410) a first encryption key for use with the authentication credentials. In one embodiment, the encryption key is a random number. In another embodiment, the encryption key is any standard cryptographic key. The encryptor 5010 then encrypts (step 5415) the authentication credentials with the first key to generate encrypted authentication credentials. This prevents an attacker who gains access to the remote machine 30 from accessing the authentication credentials without the key. The SID generator 5008 then creates (step 5120) a first SID to identify the first communication session between a client machine 10 and the remote machine 30. In one embodiment, the first communication session is with a host service 4516 hosted by the remote machine 30. The encryptor 5010 then stores (step 5425) the encrypted authentication credentials with the first SID in the table 5020 described above.

In one embodiment, the encryptor 5010 stores the encrypted authentication credentials with the first SID in a certain location for more efficient retrieval at a later time. For instance, the encryptor 5010 stores all encrypted authentication credentials and SIDs that have been created within a predetermined amount of time in RAM. The ACR service 5002 transfers all encrypted authentication credentials and SIDS created before a predetermined time to a second, external memory (not shown). In another embodiment, the encryptor 5010 stores the encrypted authentication credentials with the SID in a database (not shown).

The SID and the encrypted authentication credentials stored in the memory 5018 can be arranged in any particular order and/or format. For example, the SID and encrypted authentication credentials can be stored in chronological order with respect to the creation time of the encrypted authentication credentials.

The remote machine 30 then transmits (step 5430) the first key and associated first SID to the client machine 10 over the network 150. The client machine 10 stores (step 5435) the first key and the first SID in memory (not shown). Then the key destroyer 5012 of the ACR Service 5002 deletes (step 5440) the key stored in memory 5018.

In another embodiment, the ACR Service 5002 does not delete the first key from memory 5018 until the ACR Service 5002 has notification that the client machine 10 has received the key. For example, the client machine 10 transmits an acknowledgment message to the remote machine 30 after the client machine 10 successfully received the key. Once the ACR Service 5002 receives notification, the key destroyer 5012 then deletes (step 5440) the key from the memory 5018. This prevents the ACR Service 5002 from deleting the key before the client machine 10 successfully received the key. By not deleting the key until the acknowledgment message, the ACR Service 5002 can retransmit the key and the SID to the client machine 10 upon a failure in the transmission.

By deleting the key in step 5440, the ACR Service 5002 does not have the mechanism needed to decrypt the encrypted authentication credentials stored in the table 5020. Thus, if an attacker accesses the memory 5018 of the remote machine 30, the attacker can retrieve the encrypted authentication credentials but cannot decrypt the encrypted authentication credentials. Therefore, the attacker cannot read the authentication credentials. In short, the encrypted authentication credentials stored on the remote machine 30 do not provide any information that the attacker can interpret or understand. As such, the remote machine 30 does not possess any information to decrypt the encrypted authentication credentials.

In addition, the client machine 10 is the only device that can provide the key to the encrypted authentication credentials. With the possibility of many client machines 10 as part of the network 150, an attacker may have to attempt to gain access to each client (e.g. 10, 10') individually to find the client machine 10 that possesses the correct key. This can be time consuming and tedious and, as a result, may deter an attacker from an attempt to decrypt the encrypted authentication credentials.

In another embodiment, the remote machine 30 has a timeout feature with respect to accessing the encrypted authentication credentials. For instance, the remote machine 30 starts a timer after the first communication is abnormally terminated. If the timer reached a predetermined value before the client machine 10 re-establishes the second communication session and transmits the key to the remote machine 30 for decryption, the ACR Service 5002 deletes the encrypted authentication credentials from the table 5020. If no timer is used, the key acts as a de facto password for future sessions.

Once the client machine 10 receives the first key and the first SID from the remote machine 30 as described above in reference to FIG. 51, the session can be re-established, as shown in FIG. 52, without requiring the user to reenter his or her authentication credentials. When a disruption or break occurs in the first communication session (step 54100) between the client machine 10 and the remote machine 30, the first communication session 5004 needs to be re-established and the client machine 10 re-authenticated to the remote machine 30. The ACR Service 5002 provides a system and method for re-establishing and re-authenticating the client machine 10 to the remote machine 30.

When the client machine 10 and the remote machine 30 re-establish a second communication session, the client machine 10 transmits the first key and the first SID (step 5405) to the remote machine 30. The ACR Service 5002 uses the SID (step 5210) to locate and retrieve the encrypted authentication credentials in the server's memory 5018 and uses the key (step 5215) to decrypt the retrieved authentication credentials. The remote machine 30 then re-authenticates the client machine 10 to the remote machine 30 (step 5220) by validating the authentication credentials from the client machine 10. In one embodiment, the authentication and re-authentication is facilitated through the security services provided by the operating system of the computing device of the remote machine 30. For example, the authentication credentials are a login and password to the remote machine 30. In another embodiment, the authentication and re-authentication is facilitated through application level security services of an application or software program on the remote machine 30. For example, the authentication credentials are an application login and password to a specific host service 4516.

To illustrate, upon an abnormal termination of a first communication session (step 54100) in which the user's login password was the authentication credential, the client machine 10 attempts to establish a second communication session with the remote machine 30. As part of the request to the remote machine 30 to establish a second communication session with the remote machine 30, the client machine 10 transmits the key and the SID (step 5405) of the first terminated communication session to the remote machine 30. Instead of prompting the user to enter the user's login password again, the remote machine 30, through the ACR Service 5002, uses the SID (step 5210) to locate and retrieve the encrypted authentication credentials associated with the user, uses the key (step 5215) to decrypt the retrieved authentication credentials, and reauthenticates the client using the decrypted authentication information (step 5220).

In one embodiment, during the second communication session, the ACR Service 5002 creates (step 5225) a second key for the authentication credentials and then encrypts (step 5230) the authentication credentials using the second key. A second SID is created (step 5235) to identify the second communication session and associate the session with the client machine 10. The second encrypted authentication credentials are stored (step 5425) with the second SID in the table 5020.

In this embodiment, the server then transmits (step 5240) the second key and the second SID to the client machine 10. The client machine 10 then stores (step 5245) the second key and the second SID in memory (not shown) for future retrieval. The ACR Service 5002 then deletes (Step 54150) the second key from the memory 5018. Thus, the ACR Service 5002 can only decrypt the second encrypted authentication upon obtaining the second key and the second SID from the client machine 10. The ACR Service 5002 has created a new key and a new SID for the second communication session that is used with the same authentication credentials that the user had transmitted during the first communication session. Therefore, a user's authentication credentials do not have to be retransmitted upon a second communication channel after an abnormal termination of the first communication session.

Although the invention is discussed in terms of authentication credentials, any confidential information which can be maintained across sessions if there is a communication failure can be used. Thus if credit card information is required by an application and the credit card information is sent to the server, the subsequent disconnect between the client and the server does not require the credit card information to be reentered if this invention is issued. Further, although a session identifier, or SID, is discussed as providing a pointer to the stored authentication credentials, any number or value which is suitable as a pointer may be used.

Figure 53:
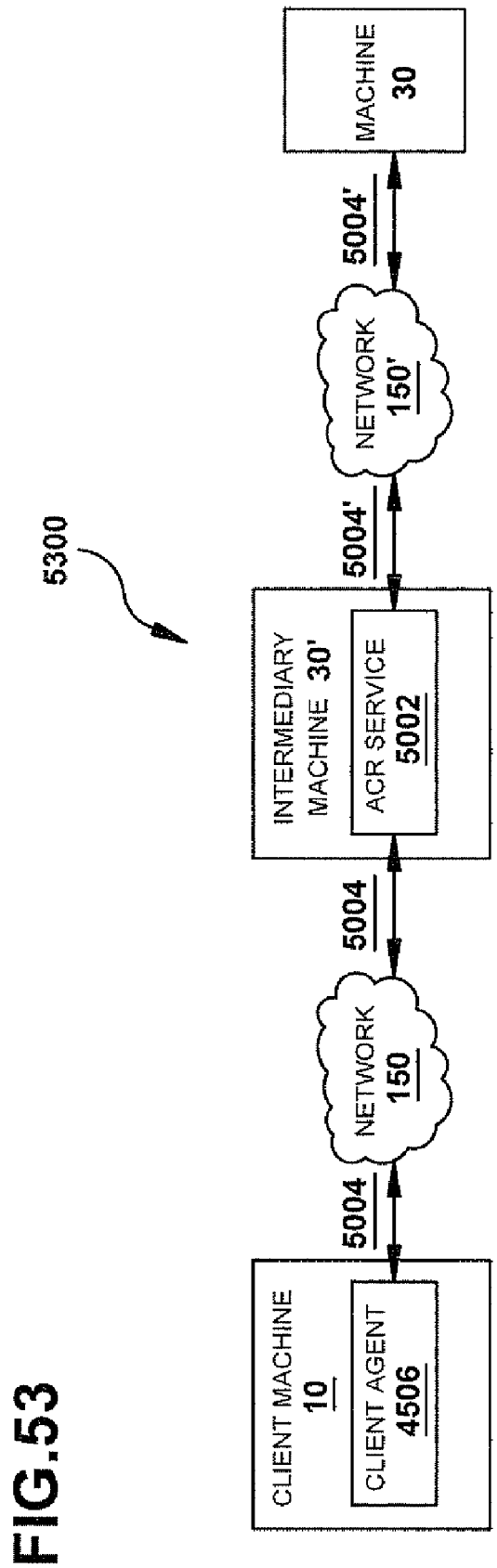
FIG. 53 is a block diagram of an embodiment of a computer system to maintain authentication credentials in accordance with another embodiment of the invention.

FIG. 53 depicts another embodiment of a system 5300 that is capable of reconnecting a client machine 10 to a remote machine 30 using an ACR Service 5002 executing on an intermediary machine 30'. The intermediary machine 30' is a computing device different from the remote machine 30 and can be any remote machine 30 that is capable of communication and that has sufficient processor power and memory capacity to perform the operations described herein. In brief overview, the client machine 10 is in communication with an intermediary machine 30' over a communication channel 5004. The communication channel 5004 may include a network 150. The intermediary machine 30' provides auto client reconnect services, via an ACR Service 5002, to the client machine 10 for the connection of the client machine 10 to the remote machine 30. The intermediary machine 30' is in communications with the remote machine 30 over a communication channel 5004'. The communication channel 5004' may include a network 150'. The client machine 10 accesses the services of the remote machine 30 through the intermediary machine 30'. The ACR Service 5002 on the intermediary machine 30' provides auto client reconnect services for the connection of the client machine 10 to the remote machine 30. Although illustrated with a single client machine 10 over a communication channel 5004, any number of clients and number of communication channels can be part of the system 5300.

In a further embodiment (not shown), the system 5300 includes multiple intermediary machines 30' that are in communication with one or more client machines 10 through a network 150 over additional communication channels 5004, 5004'. Although illustrated in FIG. 53 with a single intermediary machine 30' over a communication channel 5004, any number of intermediary nodes and number of communication channels can part of the system 5300.

Figure 54:
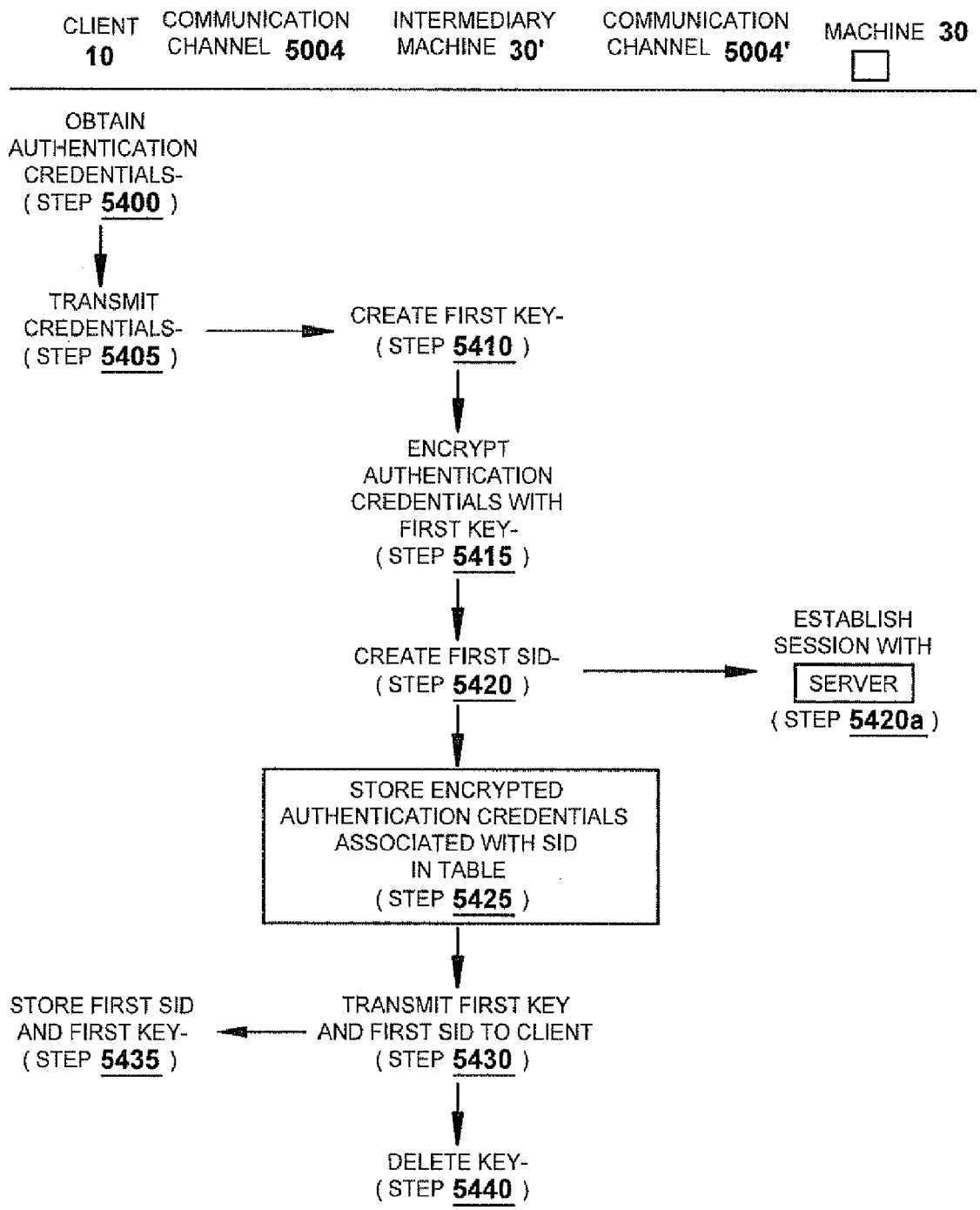
FIG. 54 is a flow diagram of the steps followed in an embodiment of the computer system of FIG. 53 to maintain authentication credentials during a first communication session in accordance with the invention.

In another embodiment, the invention relates to methods to facilitate establishing and authenticating a client machine's 10 connection to a remote machine 30 using one or more intermediary machines 30'. As shown in FIG. 54, an intermediary machine 30' establishes a session with the remote machine 30.

The client machine 10 establishes a first communication session with the intermediary machine 30' over the communication channel 5004. The client machine 10 obtains (step 5400) authentication credentials from a user of the client machine 10. The client machine 10 then transmits (step 5405) the authentication credentials to the intermediary machine 30' over the communication channel 5004 so that the intermediary machine 30' can authenticate the user with the remote machine 30.

After the intermediary machine 30' receives the authentication credentials, the ACR Service 5002 provides its auto client reconnect services. The ACR Service 5002 creates (step 5410) a first encryption key for use with the authentication credentials and then encrypts (step 5415) the authentication credentials with the first key to generate encrypted authentication credentials. This prevents an attacker who gains access to the remote machine 30 from accessing the authentication credentials without the key. Then a session is established with the remote machine 30 (step 5420A) and the client machine 10 is authenticated to the remote machine 30 using the authentication credentials. Thereby, the ACR Service 5002 creates a first SID to identify the first communication session. The encrypted authentication credentials are stored (step 5425) with the first SID in the table 5020 described above. The intermediary machine 30' then transmits (step 5430) the first key and the first SID to the client machine 10 over the network 150. The client machine 10 stores (step 5435) the first key and the first SID in the client machine's memory (not shown). The ACR Service 5002 then deletes (step 5440) the key stored in memory 5018.

Figure 55:
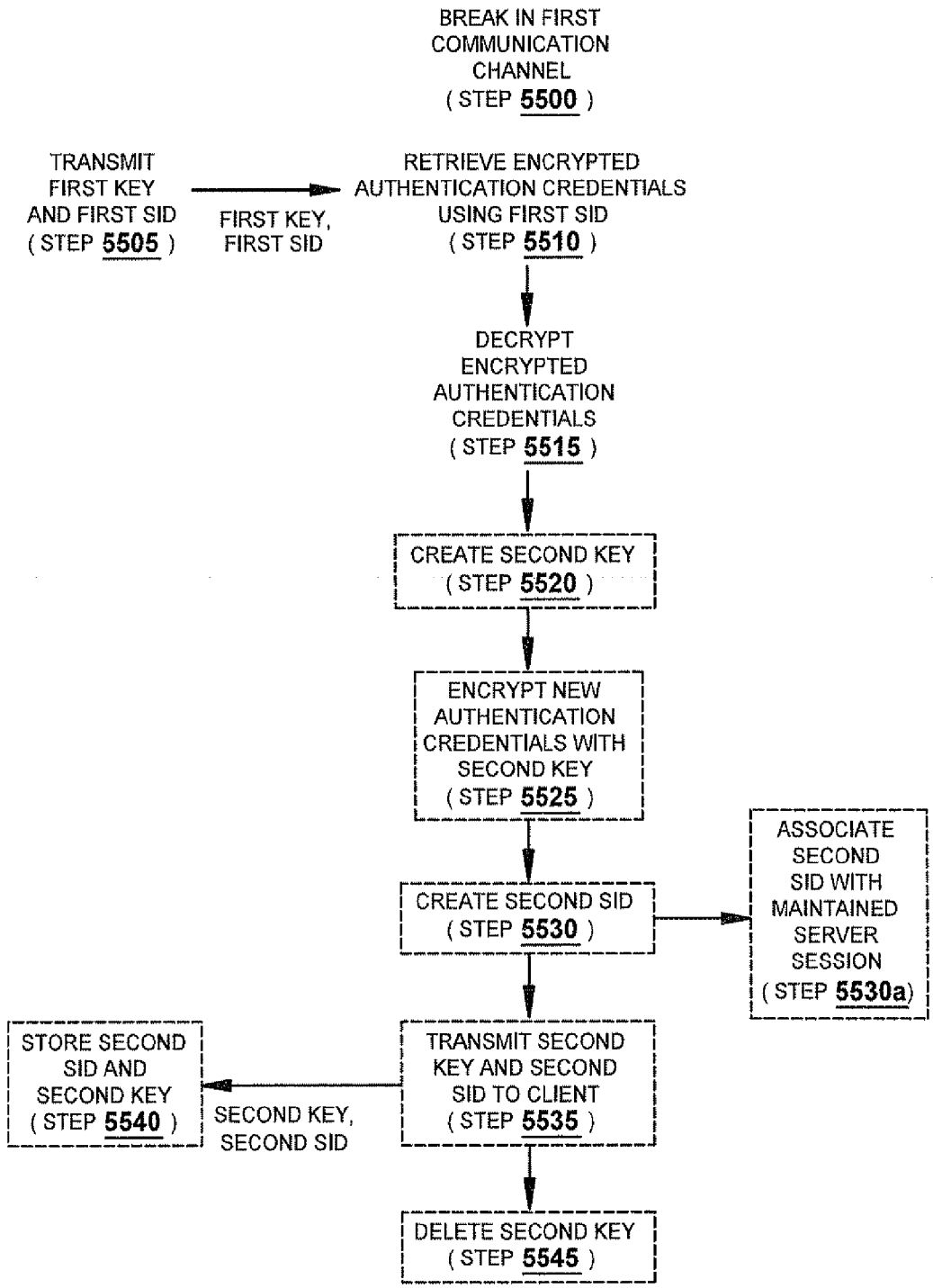
FIG. 55 is a flow diagram of the steps followed in an embodiment of the computer system of FIG. 53 to maintain authentication credentials during a second communication session following the termination of the first communication session of FIG. 53 in accordance with the invention.

Once the client machine 10 receives the first key and the first SID from the intermediary machine 30' as described above in reference to FIG. 54, the communication session can be re-established and re-authenticated, as shown in FIG. 55, without requiring the user to reenter his or her authentication credentials. For example, there may be a disruption in the first communication session (step 5505) between the client machine 10 and the intermediary machine 30' from an abnormal termination.

When the client machine 10 and the intermediary machine 30' re-establish a second communication session, the client machine 10 transmits the first key and the first SID (step 5505) to the intermediary machine 30'. The ACR Service 5002 of the intermediary machine 30' uses the SID (step 5510) to locate and retrieve the encrypted authentication credentials in the server's memory 5018 and uses the key (step 5515) to decrypt the retrieved authentication credentials. The key generator creates (step 5520) a second key for the authentication credentials and the key encryptor 5010 then encrypts (step 5525) the authentication credentials using the second key. The SID generator 5008 also creates (step 5530) a second SID to identify the second communication session and associates it with the maintained session between the intermediary machine 30' and the remote machine 30. The encryptor 5010 stores the second encrypted authentication credentials with the second SID in the table 5020.

In this embodiment, the remote machine 30 then transmits (step 5535) the second key and the second SID to the client machine 10. The client machine 10 then stores (step 5540) the second key and the second SID for future retrieval. The key destroyer 5012 then deletes (Step 5545) the second key from the memory 5018. Thus, the ACR Service 5002 can only decrypt the second encrypted authentication upon obtaining the second key and the second SID from the client machine 10. The ACR Service 5002 has created a new key and a new SID for the second communication session that is used with the same authentication credentials that the user had transmitted during the first communication session. Therefore, a user's authentication credentials do not have to be retransmitted upon a second communication channel after an abnormal termination of the first communication session.

Figure 56:
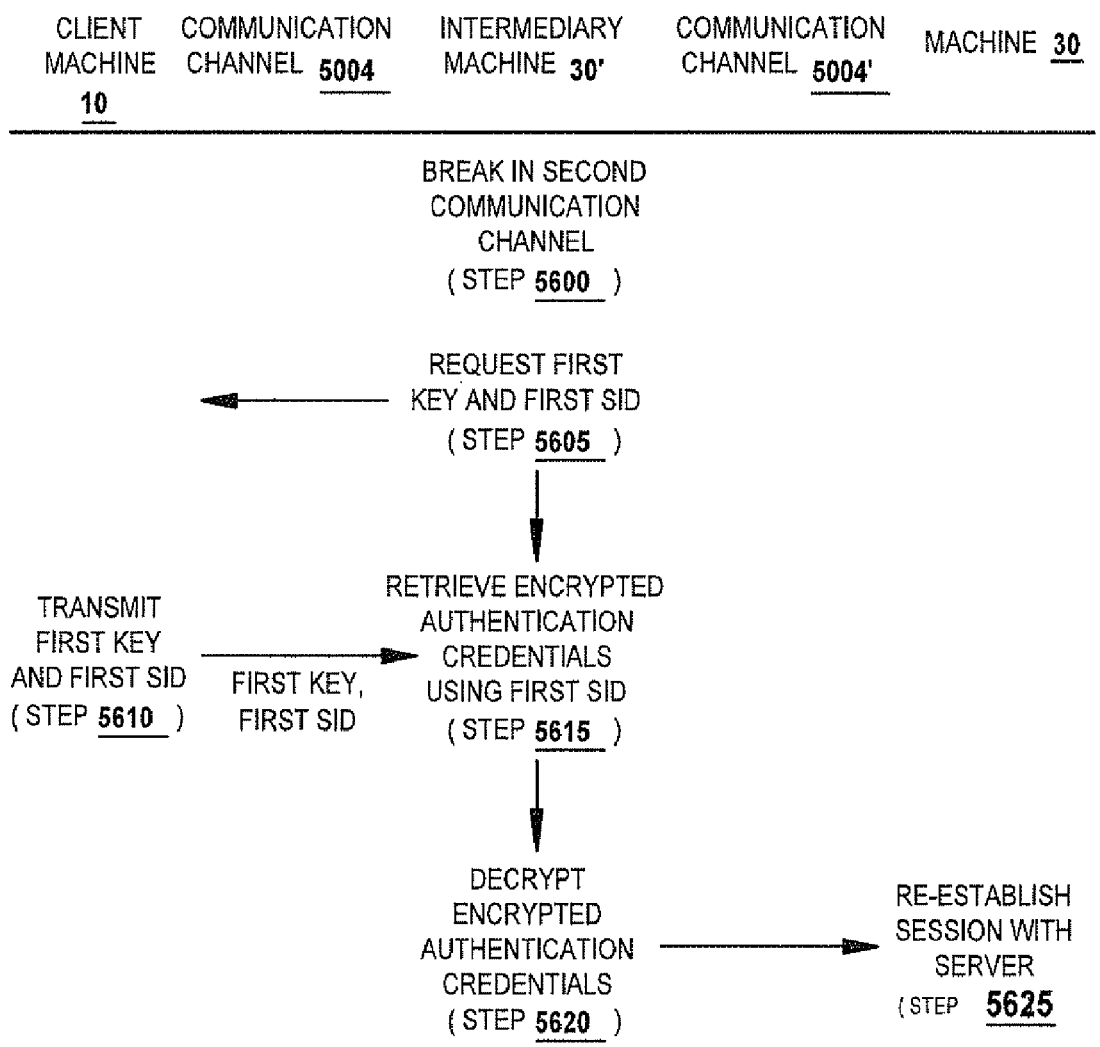
FIG. 56 is a flow diagram of the steps followed in an embodiment of the computer system of FIG. 53 to maintain authentication credentials during a second communication session following the termination of a second communication channel of the first communication session of FIG. 53 in accordance with the invention.

In another embodiment, there may be a disruption or abnormal termination in the second communication session (step 5600) between the intermediary machine 30' and the remote machine 30. As described in FIG. 56, the second communication session can be re-established and re-authenticated without requiring the user to reenter his or her authentication credentials.

When the intermediary machine 30' and the remote machine 30 re-establish a second communication session, the intermediary machine 30' requests (step 5605) the first key and first SID from the client machine 10 to re-establish a session with the remote machine 30 on the client's behalf. In response, the client machine 10 transmits the first key and the first SID (step 5610) to the intermediary machine 30'. The ACR Service 5002 of the intermediary machine 30' uses the SID (step 5615) to locate and retrieve the encrypted authentication credentials in the server's memory 5018 and uses the key (step 5620) to decrypt the retrieved authentication credentials. The ACR Service 500 then re-establishes the client's session with the server (step 5625) using the decrypted authentication credentials to re-authenticate the client machine 10 to the remote machine 30.

In another embodiment, after re-establishing and re-authenticating the client over the second communication session, the ACR Service 5002 of the intermediary machine 30' creates a replacement second SID and second key as previously described in FIG. 55. In reference to the embodiment of the ACR Service illustrated in FIG. 50, the key generator creates (step 5520) a second key for the authentication credentials and the key encryptor 5010 then encrypts (step 5525) the authentication credentials using the second key. The SID generator 5008 also creates (step 5530) a second SID to identify the second communication session and associates it with the re-established session between the intermediary machine 30' and the remote machine 30. The encryptor 5010 stores the second encrypted authentication credentials with the second SID in the table 5020. In this embodiment, the server then transmits (step 5535) the second key and the second SID to the client machine 10. The client machine 10 then stores (step 5540) the second key and the second SID for future retrieval. The key destroyer 5012 then deletes (Step 5545) the second key from the memory 5018.

In other embodiments, one or more of the first protocol service 4502 and ACR Service 5002 can be distributed across any of the host service nodes. As such, the functionality of re-establishing and re-authenticating, or automatically reconnecting, a client machine 10 connect to a host service 4516 can be flexibly distributed in different system and deployment architectures across host services 4516 and/or remote machines 30.

Figure 57:
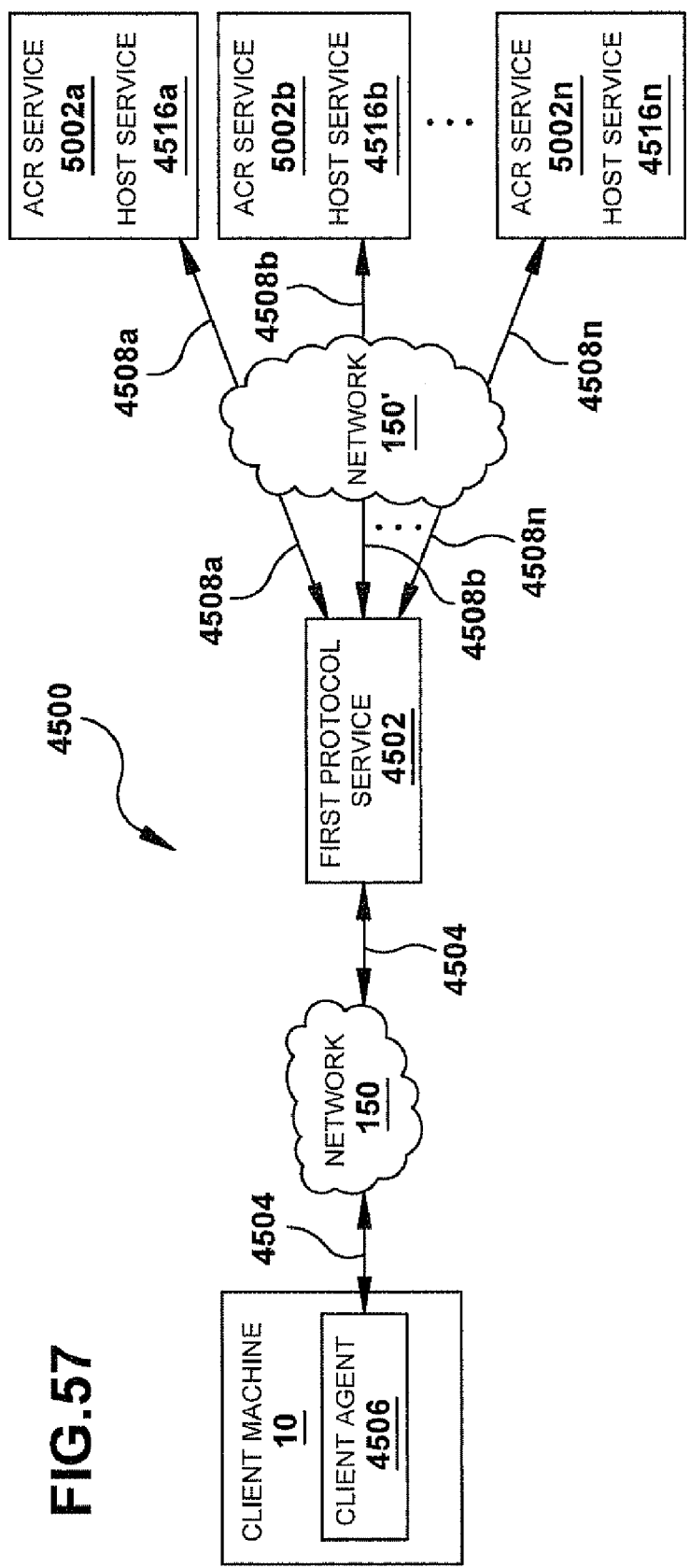
FIG. 57 is a block diagram of a system to maintain authentication credentials and provide a client with a reliable connection to a host service according to an embodiment of the invention.
Figure 58:
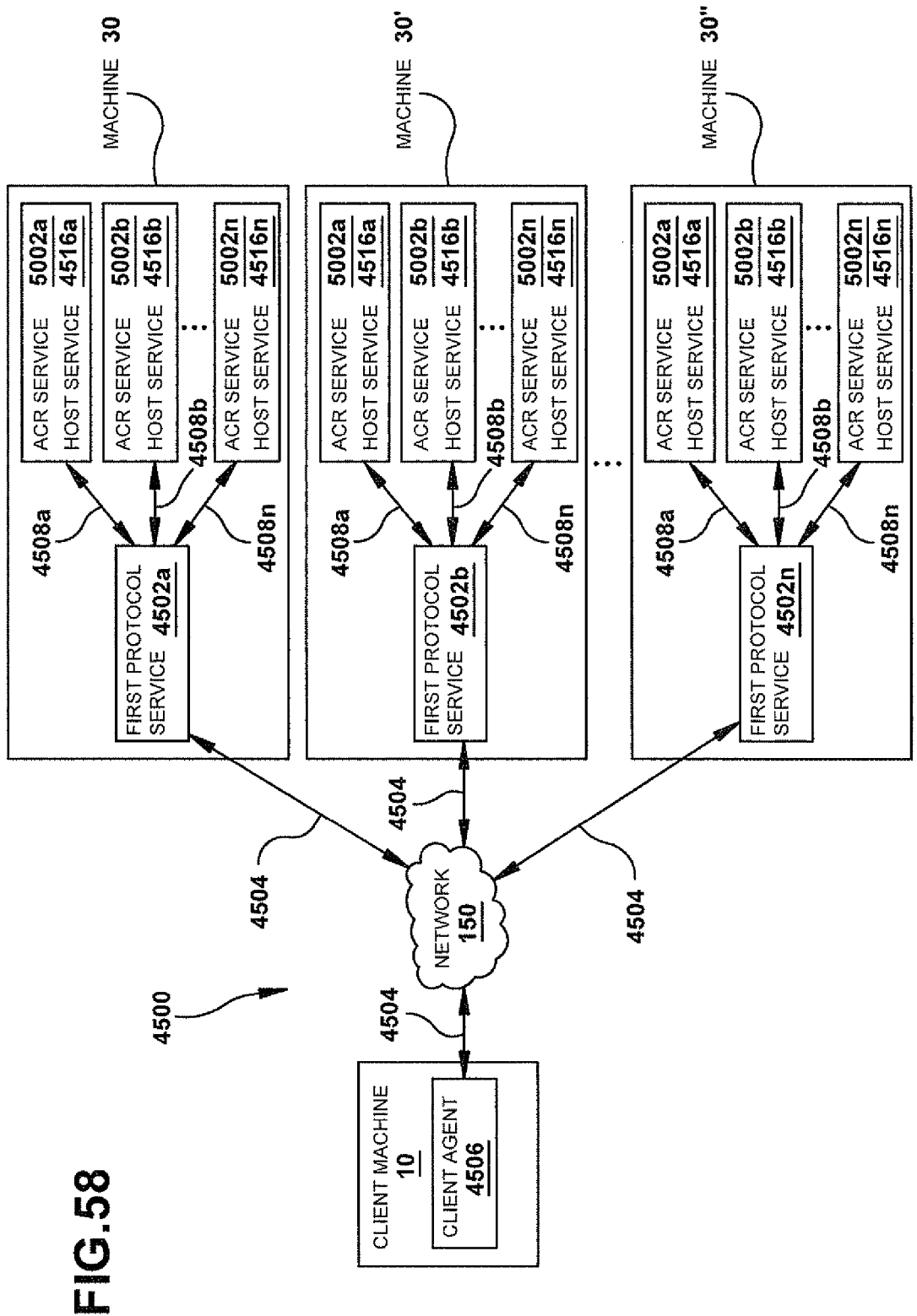
FIG. 58 is a block diagram of a system to maintain authentication credentials and provide a client with a reliable connection to a host service according to another embodiment of the invention.

In one embodiment, an ACR Service 5002 can be associated with each of the host services 4516a-4516n in system 4500 to provide auto client reconnect services dedicated to each host service 4516, respectively. A single first protocol service 4502 can be deployed to handle all of the host services 4516a-4516n. As shown in FIG. 57, each of the multiple ACR Services 5002a-5002n is associated with each of the host services 4516a-4516n, respectively. By way of example, a client machine 10 establishes a communication session with the host service 4516a using the first protocol service 4502. The ACR Service 5002a associated with host service 4516a provides auto client reconnect services for the connection of the client machine 10 to the host service 4516a. If there is a disruption in a network connection, the first protocol service 4502 will re-establish the connection with the client machine 10 and the ACR Service 5002a will re-authenticate the client machine 10 to the host service 4516a. A second client machine 10' may concurrently, with the first client machine 10, establish a communication session with the host service 4516b using the first protocol service 4502. The ACR Service 5002b provides auto client reconnect services for the client's connection to the host service 4516b. If there is a network disruption, the first protocol service 4502 in conjunction with the ACR Service 5002b will reconnect the client machine 10' to the host service 4516b.

In another embodiment of these methods, an ACR service can be associated with each of the multiple host services 4516a-4516n running on each of the remote machines 30 of the system 4500. A first protocol service 4502 can be deployed on each remote machine 30 to service each of the multiple remote machines 30 running on that host node 118. As shown in FIG. 57, each ACR service 5002a-5002n is associated with each host service 4516a-4516n, respectively. Each remote machine 30 has a dedicated first protocol service 4502 servicing each of its host services 4516 and each ACR Service 5002. For example, a client machine 10 establishes a communication session with host service 4516a on remote machine 30 by using the first protocol service 4502. The ACR Service 5002a on remote machine 30 provides auto client reconnect services for the connection of the client machine 10 to the host service 4516a on remote machine 30.

If a network disruption is detected, the first protocol service 4502 re-establishes the client's connection to the host service 4516a on remote machine 30 and the ACR service 5002a on remote machine 30 re-authenticates the client machine 10 to the host service 4516a on remote machine 30. Concurrently with the first client machine 10, a second client machine 10' establishes a communication session with host service 4516b on remote machine 30 using the first protocol service 4502 and ACR Service 5002a. If there is a network disruption, the first protocol service 4502 in conjunction with the ACR Service 5002a reconnect the client machine 10' with host service 4516b on remote machine 30. Concurrently with the first client machine 10 and the second client machine 10', a third client machine 10" establishes a communication session with host service 4516n on remote machine 30' using the first protocol service 4502 and ACR Service 5002n on remote machine 30'. In a similar manner, the first protocol service 4502 and ACR Service 5002n can reconnect the client machine 10" to the host service 4516n of remote machine 30'.

In other embodiments, one or more of the ACR Services 5002 can be distributed with the first protocol services 4502 across any of the intermediary or first protocol services nodes. As such, the functionality of reconnecting a client machine 10 to a host service 4516 can be flexibly distributed in different system and deployment architectures associated with the first protocol service 4502.

Figure 59:
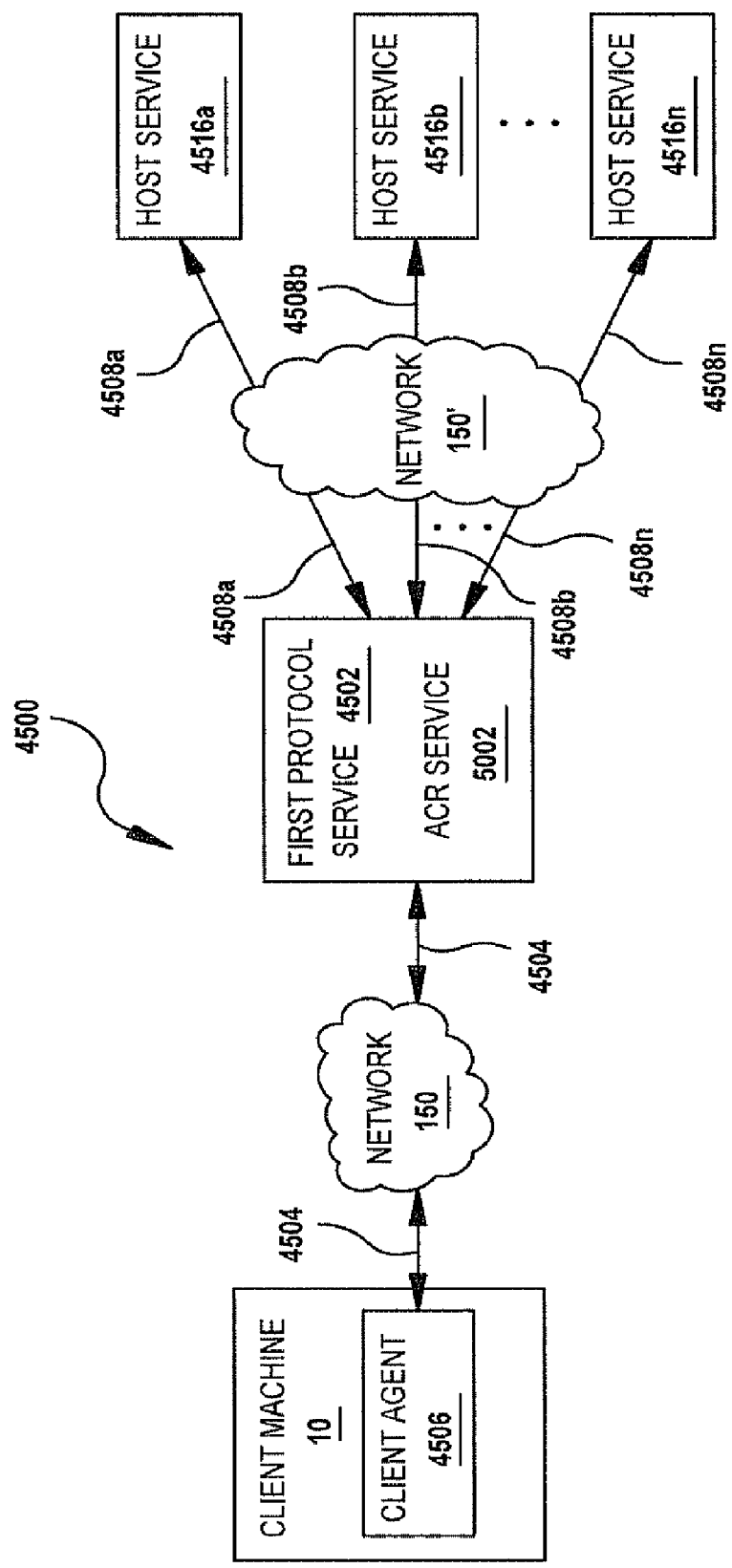
FIG. 59 is a block diagram of a system to maintain authentication credentials and provide a client with a reliable connection to a host service according to another embodiment of the invention.

In one embodiment of this aspect of the invention, the ACR Service 5002 can be associated with each first protocol service 4502 to provide auto client reconnect services dedicated to the first protocol service 4502. A single first protocol service 4502 and ACR Service 5002 can be deployed to handle all of the host services 4516a-4516n. As shown in FIG. 59, the ACR Service 5002 resides with the first protocol service 4502 on the same computing device to provide auto client reconnect services to host services 4516a-4516n. For example, a client machine 10 establishes a communication session with any of the host services 4516a-4516n by using the first protocol service 4502 and ACR Service 5002. The first protocol service 4502 and ACR Service 5002 provide reconnecting functionality from a client machine 10 to any of the host services 4516a-4516n.

Figure 60:
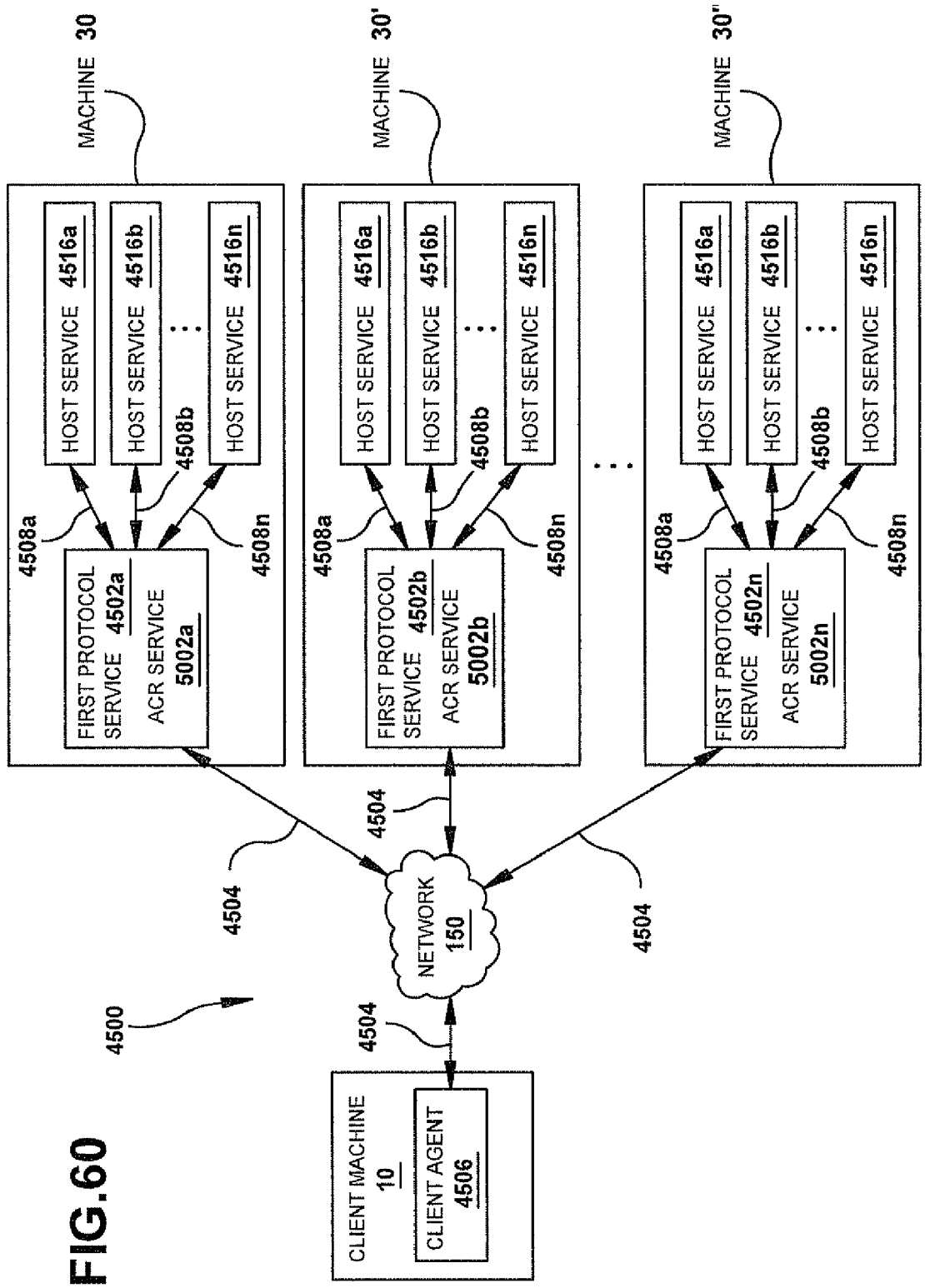
FIG. 60 is a block diagram of a system to maintain authentication credentials and provide a client with a reliable connection to a host service according to another embodiment of the invention.

In another embodiment of this aspect of the invention, each of the ACR Services 5002a-5002n can be associated with each of the multiple of first protocol services 4516a-4516n. For example as shown in FIG. 60, a first protocol service 4502 and an ACR Service 5002a can be deployed on a remote machine 30 to service each of the multiple host services 4516a-4516n running on that remote machine 30. As further shown in FIG. 60, each ACR service 5002a-405n is associated with each first protocol service 4502-112n to provide dedicated auto client reconnect services to the multiple host services 4516a-4516n of each remote machine 30-118n. By way of example, client machine 10 establishes a communication session with host service 4516a on remote machine 30 by using the first protocol service 4502 and ACR Service 5002a on the same remote machine 30. If there is a network disruption, the first protocol service 4502 in conjunction with the ACR Service 5002a reconnects the client machine 10 to the host service 4516a on the remote machine 30.

Although the invention is discussed above in terms of various system and deployment architectures in FIGS. 57-60, any other system and/or deployment architecture that combines and/or distributes one or more of the first protocol service(s) 4502, ACR Service(s) 5002, and host service(s) 4516 across any of the remote machines 30, intermediary machines 30' or other computing devices can be used.

Furthermore, instead of using an ACR Service 5002 to provide authentication and re-authentication services, a ticket authority 6102 service can be used. A ticket authority 6102 generates and validates tickets for connection and authentication purposes. A ticket can comprise a session identifier and key. It can also comprise a random number, an application server certificate, a nonce, a constant or null value or any other type of identification, confidential or security based information that may be used for such purposes.

Figure 61:
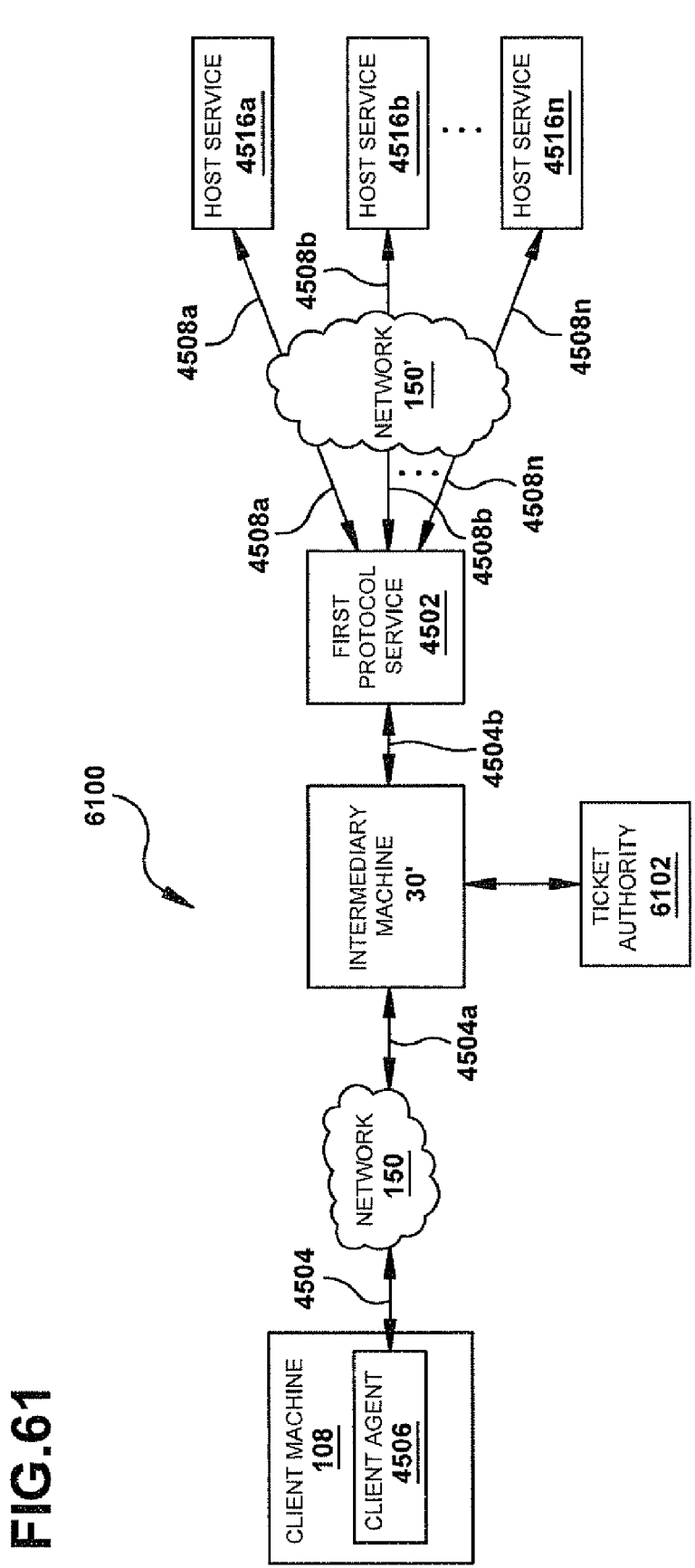
FIG. 61 is a block diagram of a system for providing a client with a reliable connection to a host service and further including components for reconnecting the client to a host service according to an embodiment of the invention.

In an embodiment of a network communication system for reconnecting a client machine 10 to a host service 4516 as shown in FIG. 61, a ticket authority 6102 can run on a node separate from the intermediary machine 30, first protocol service 4502 or any of the host services 4516a-4516n. FIG. 61 depicts an intermediary machine 30 and ticket authority 6102, which could be a single computing device, as part of the system 4500. In addition to the networks 150 and 150', the system 4500 includes a client machine 10, first protocol service 4502, and the host services 4516a-4516n, all of which are described above. In one embodiment, the intermediary machine 30 is a security gateway, such as, for example, a firewall and/or a router, through which messages between the client machine 10 and the first protocol service 4502 must pass due to the configuration of the network 150. The ticket authority 6102 can be, for example, a stand-alone network component that is capable of communication and that has sufficient processor power and memory capacity to perform the operations described herein. The ticket authority 6102 also can be a specific host service 4516 dedicated to providing ticket related services on a remote machine 30.

As shown in an embodiment of FIG. 61, the intermediary machine 30 is configured to accept a connection 4504a initiated by the client machine 10 and to establish a second connection 4504b with the first protocol service 4502. Together, the connection 4504a and the second connection 4504b constitute the connection 4504, described above, over which the client machine 10 and the first protocol service 4502 communicate using the first protocol.

The intermediary machine 30, as shown, is also configured to communicate with the ticket authority 6102. In one embodiment, the ticket authority 6102 is configured to receive a request for a first reconnection ticket from the intermediate node 30' and to thereafter generate the first reconnection ticket. The first reconnection ticket can include, for example, a large random number. The first reconnection ticket allows the client machine 10 to automatically re-establish a connection with the host service after an abnormal disruption of service without requiring the client machine 10 to provide authentication credentials again.

In another embodiment, the ticket authority 6102 is configured to receive a request for a first re-connection ticket for each of the "hops" between the client machine 10 and host service 4516. For example, the intermediary machine 30 may request re-connection tickets for the connection between the client machine 10 and the intermediary machine 30, between the intermediary machine 30 and the first protocol service 4502, and between the first protocol service 4502 and the host service 4516. These re-connection tickets may only be valid for each of the "hops". For example, a first re-connection ticket for the first protocol service 4502 to host service 4516 connection is valid only for authenticating the first protocol service 4502 to the host service 4516 on behalf of the client machine 10.

After generation of the first reconnection ticket, the ticket authority 6102 encrypts the authentication credentials supplied by the client machine 10 using the first reconnection ticket so that an attacker who gains access to the intermediary machine 30 or the ticket authority 6102 cannot access the authentication credentials without the first reconnection ticket. The ticket authority 6102 may also generate a SID to identify the communication session that is established between the client machine 10 and the intermediary machine 30. The ticket authority 6102 then stores the encrypted authentication credentials with the SID in memory and transmits the SID and the first reconnection ticket to the client machine 10 over the network 150. Upon the client's receipt of the SID and the first reconnection ticket, the ticket authority 6102 destroys (i.e., deletes) the ticket from its memory (not shown).

In another embodiment, the ticket authority 6102 is configured to generate a handle. The handle can be, for example, a random number that is associated with (e.g., mapped to) the first reconnection ticket. In one embodiment, the handle is a smaller random number than the random number forming the first reconnection ticket. For example, the handle may be a 32-bit random number. In a further embodiment, the handle associated with a ticket or a re-connection ticket is an address of or pointer to the next "hop" in the multiple-hop connection between the client machine 10 and the host service 4516. In this case, a ticket or re-connection ticket is validated for a single "hop" with a pointer to the next "hop". The next "hop" will need to obtain and validate a different ticket or re-connection ticket and so forth until the last "hop" is validated and connected to the host service 4516 on behalf of the client machine 10.

The ticket authority 6102 transmits the first reconnection ticket and the handle to the intermediary machine 30, while keeping a copy of the first reconnection ticket and a copy of the handle. The copy of the first reconnection ticket can later be used by the ticket authority 6102 to validate the first reconnection ticket originally transmitted to the client machine 10 when it is later presented to the ticket authority 6102 during the process of reconnecting the client machine 10. In one embodiment, the ticket authority 6102 also keeps an address for the first protocol service 4502, which, as explained below, is associated with the first reconnection ticket and, upon validation of the first reconnection ticket, is transmitted to the intermediary machine 30.

In one embodiment, the intermediary machine 30 is further configured to use the handle transmitted to it by the ticket authority 6102 to delete the copy of the first reconnection ticket kept at the ticket authority 6102. In another embodiment, as described below, the ticket authority 6102 is further configured to delete, during the process of reconnecting the client machine 10 to a host service 4516, the first reconnection ticket and thereafter generate a replacement first reconnection ticket. Additionally, in another embodiment, the first reconnection ticket is configured for automatic deletion after a pre-determined period of time. In the embodiment of re-connection tickets for each of the "hops" between the client and the host service 4516, one, some or all of the re-connection tickets may be configured for automatic deletion after a pre-determined period of time. In other embodiments, the ticket authority 6102 or the intermediary machine 30 is configured to delete each of the multiple-hop tickets and generate replacement tickets In another embodiment, the first protocol service 4502 is configured to generate a second reconnection ticket, which, as in the case of the first reconnection ticket, can include, for example, a large random number. In one embodiment, the first protocol service 4502 generates second re-connection tickets for each of the "hops" between the client machine 10 and the host service 4516. The first protocol service 4502 can also be configured to transmit the second reconnection ticket to the client machine 10, while keeping a copy of the second reconnection ticket and a session number. The copy of the second reconnection ticket can later be used by the first protocol service 4502 to validate the second reconnection ticket originally transmitted to the client machine 10 when it is later presented to the first protocol service 4502 during the process of reconnecting the client machine 10. In one embodiment, the first protocol service 4502 transmits the second reconnection ticket to the client machine 10 via the intermediary machine 30. In another embodiment, the first protocol service 4502 transmits the second reconnection ticket to the client machine 10 directly. In a further embodiment, the first protocol service 4502 may transmit second re-connection tickets to other first protocol services 4502 or intermediary machines 30 that may comprise the multiple-hop connection between the client machine 10 and the host service 4516.

Moreover, as described in greater detail below, the first protocol service 4502 can be further configured to delete, during the process of reconnecting the client machine 10 to a host service 4516, the second reconnection ticket, and thereafter generate a replacement second reconnection ticket. Additionally, in another embodiment, the second reconnection ticket is configured for automatic deletion after a pre-determined period of time. In further embodiments, a first protocol service 4502 of one or more first protocol services 4502 in a multiple-hop connection is configured to delete the second re-connection tickets for each of the "hops", and thereafter generate replacement second re-connection tickets for one, some or all of the "hops."

In one embodiment, the intermediary machine 30 serves as an intermediary for the first and second reconnection tickets. The intermediary machine 30 receives, for example, the first reconnection ticket generated by the ticket authority 6102 and the second reconnection ticket generated by the first protocol service 4502. The intermediary machine 30 can then transmit the first reconnection ticket and the second reconnection ticket to the client machine 10. Moreover, during the process of reconnecting the client machine 10 to a host service 4516, the intermediary machine 30 can accept the first reconnection ticket and the second reconnection ticket from the client machine 10 and thereafter transmit the first reconnection ticket to the ticket authority 6102 and, if appropriate, the second reconnection ticket to the first protocol service 4502.

In another embodiment, the intermediary node 632 serves as an intermediary for the re-connection tickets for the multiple-hops between the client machine 10 and the host service 4516. The intermediary machine 30 receives, for example, the first re-connection ticket for the client machine 10 to first protocol service 4502 connection and the first re-connection ticket for the first protocol service 4502 to the host service 4516. In a further embodiment, the intermediary machine 30 receives a first re-connection ticket for the connection between the intermediary machine 30 and the first protocol service 4502. The intermediary machine 30 can then transmit the first re-connection ticket for the client to the client machine 10 and the first re-connection ticket for the first protocol service 4502 to the first protocol service 4502. Moreover, during the process of re-connecting the client machine 10 to a host service 4516, the intermediary machine 30 can accept the first re-connection ticket from the client machine 10 to validate the ticket to re-establish the client's connection to the intermediary machine 30 or the first protocol service 4502.

If the first communication session between the client machine 10 and the host service 4516 terminates, for example abnormally, the new session can be re-established without requiring the user to reenter his or her authentication credentials. When the client machine 10 and the host service 4516 re-establish a second communication session, the client machine 10 retransmits the first and second reconnection tickets and the SID to the intermediary machine 30. The intermediary machine 30 transmits the first and second reconnection tickets and the SID to the ticket authority 6102, which uses the SID to locate and retrieve the encrypted authentication credentials for the first connection and uses the first reconnection ticket to decrypt the retrieved authentication credentials. The ticket authority 6102 then authenticates the client by validating the decrypted authentication credentials. After re-authentication, the second reconnection ticket is forwarded to the first protocol service 4502 to re-establish the second connection 4508 with the host service 4516.

Figure 62:
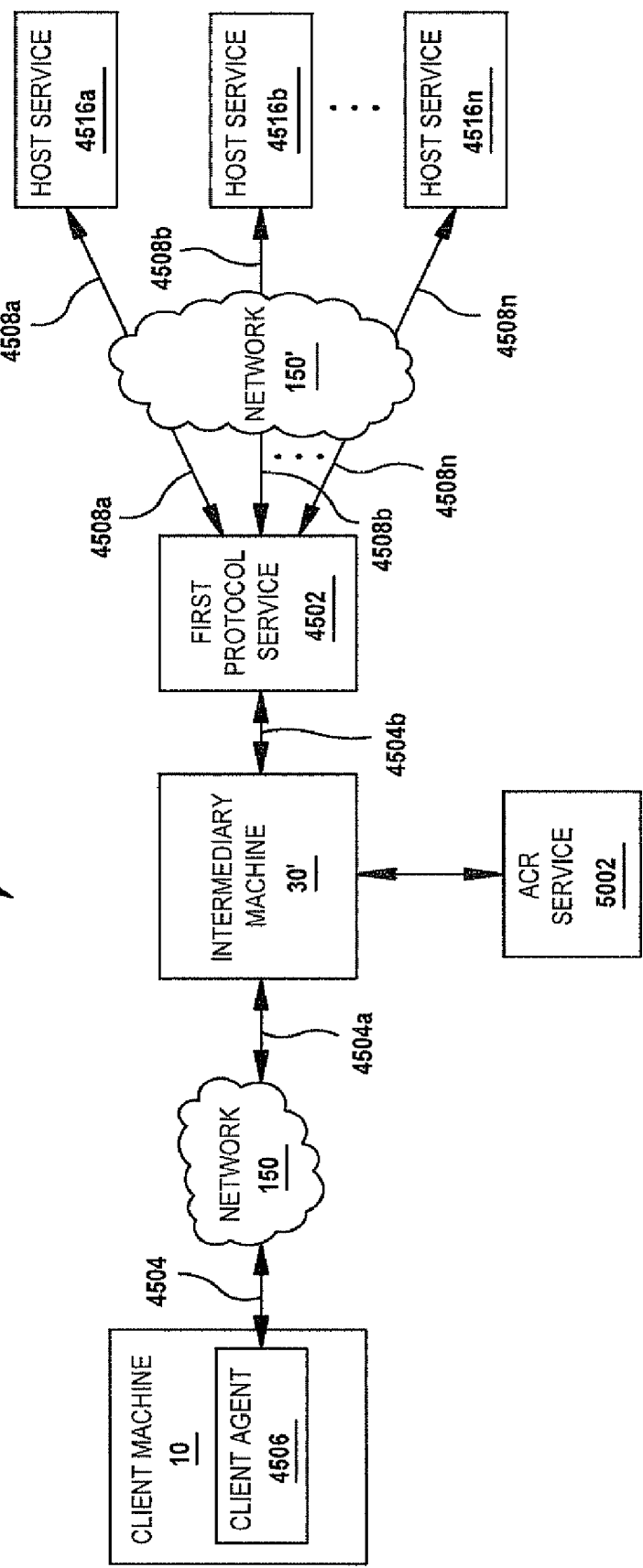
FIG. 62 is a block diagram of an embodiment of a system for providing a client with a reliable connection to a host service and further including components for reconnecting the client to a host service.
Figure 63:
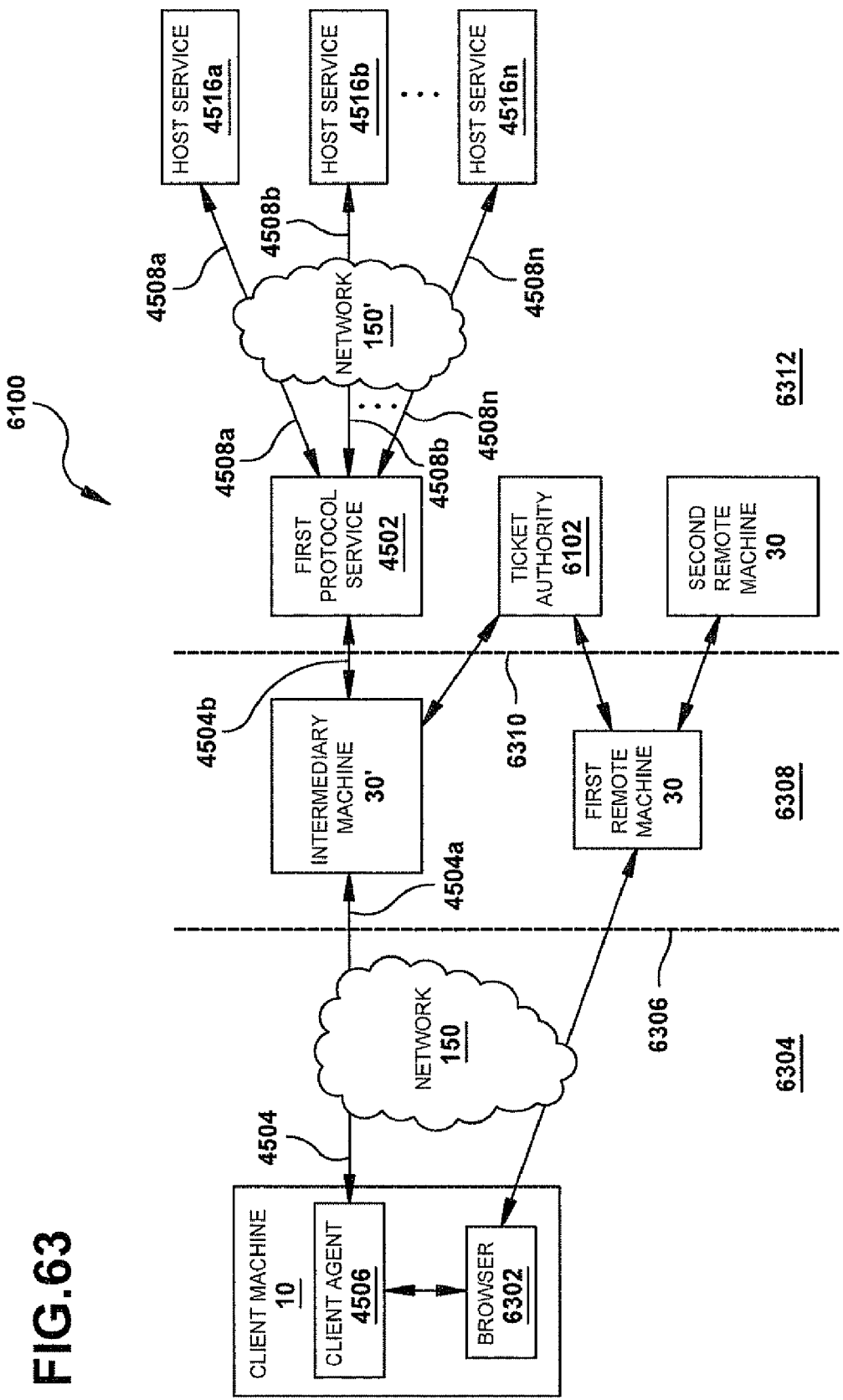
FIG. 63 is a block diagram of an embodiment of FIG. 61 further including components for initially connecting the client to a host service.

In another embodiment of a network communications system 6100 as shown in FIGS. 62 and 63, the client machine 10 uses the web browser 6302 to request access to a resource and a first remote machine 30 authenticates the user. After receiving the request, the first remote machine 30 validates the request with the ticket authority 136. The ticket authority 6102 then generates a ticket, which includes a first ticket, or client ticket, and a second ticket, or first protocol service ticket. The first and second tickets are "one-time use" tickets having no further value after their first use. In still another embodiment, the first and second tickets must be used within a predetermined time period.

In one embodiment, the ticket authority 6102 stores the first and second tickets in memory (e.g., RAM) until the ticket is used. Alternatively, the ticket authority 6102 stores the first and second tickets in a storage device (not shown) until the ticket is used. The storage device may include, for example, a database or a persistent memory (e.g., on a floppy disk or hard disk drive). The ticket authority 6102 subsequently transmits the client ticket to the first remote machine 30 and the first remote machine 30 then forwards the client ticket to the client machine 10.

The client machine 10 then initiates a communication session with the first protocol service 4502 by transmitting a proxy connection request over the client-first protocol service communication channel 4504. The proxy connection request includes the client ticket. In one embodiment, the proxy connection request also includes a dummy password that can be replaced by the first protocol service 4502 when establishing a communication session with a remote machine 30. In another embodiment, the first remote machine 30 transmits the dummy password to the client machine 10 for future generation of a proxy connection request having a format acceptable to the first protocol service 4502. The first protocol service 4502 then extricates the client ticket from the proxy connection request and forwards the client ticket to the ticket authority 6102 for validation. The ticket authority 6102 then validates the first ticket. In one embodiment, the ticket authority 6102 verifies the first ticket by searching its storage device (e.g., database) for the first expected ticket.

If the ticket authority 6102 does not find the first ticket in the storage device (such as if the first ticket has been used already), the ticket authority 6102 ends the communication session. If the received ticket matches the client ticket that the ticket authority 6102 expects, the client ticket is validated. The ticket authority 6102 then transmits the second or first protocol service ticket to the first protocol service 4502. Additionally, the ticket authority 6102 deletes the client ticket from the storage device, as the client ticket has now been used once. In another embodiment, the ticket authority 6102 also transmits the Internet protocol (IP) address of the remote machine 30 to the first protocol service 4502. In yet another embodiment, the ticket authority 6102 transmits the domain name of the remote machine 30 to the first protocol service 4502 for future conversion into the IP address.

The first protocol service 4502 receives the second ticket, or the first protocol service ticket, and subsequently opens communications across the proxy-server communication channel 145 by transmitting the second ticket to the remote machine 30. The remote machine 30 receives the first protocol service ticket and then transmits the ticket over a ticket-server communication channel to the ticket authority 6102 for validation. In one embodiment, if the ticket authority 6102 determines that the first protocol service ticket received from the remote machine 30 has been used previously or does not have the correct value (i.e., the same value as the value stored in the associated storage device), the ticket authority 6102 transmits an error message to the first protocol service 4502 (or the first remote machine 30) to terminate the established communication session with the client machine 10. If the ticket authority 6102 validates the first protocol service ticket, the remote machine 30 then launches the ICA published application. The remote machine 30 then transmits application information to the first protocol service 4502 for remote displaying of the application on the client machine 10 using the client agent 4506.

In one embodiment, the client machine 10 launches the client agent 4506 when initiating communications with the first protocol service 4502. In other embodiments, the client machine 10 launches the client agent 4506 when the client machine 10 receives the application information from the first protocol service 4502.

Thus, the client machine 10 is not aware of the first protocol service ticket but only the client ticket. Moreover, the client agent 4506 cannot access the remote machine 30 without communicating with the first protocol service 4502 and presenting the client ticket.

The ticket authority 6102 could also transmit the first protocol service ticket to the first protocol service 4502 as the user password for the user of the client machine 10. This allows the first protocol service 4502 to use the first protocol service ticket as the login password to gain access to the remote machine 30 without exposing the user's login password over the untrusted part of the web (i.e., the non-secure client-first protocol service communication channel 4504). Thus, in one embodiment, the communications system 6100 could include a centralized password mapping database managed by the ticket authority 6102 and co-located with the remote machine 30 to map the first protocol service ticket with a user's password.

Therefore, the password can accompany both tickets (i.e., the first protocol service ticket and the client ticket) or the password can accompany one of the two tickets. As described above, if the password accompanies one of the two tickets, such as the client ticket, then the first protocol service ticket is the password. In one embodiment, the password can be a system password that does not change in value or may be a one-time use password, such as those generated by SecurID tokens developed by RSA Security Inc. of Bedford, Mass.

Additionally, the methods described above can be expanded to a communications system having any number of first protocol services 4502, or "hops" with which the client machine 10 has to communicate before establishing a communication session with the remote machine 30. Although described in relation to a first protocol service 4502, a hop can comprise any network component, such as a proxy, firewall, router, and relay.

For instance, a four-hop example is a communication system having a first protocol service 4502a, a first protocol service 4502b, and a first protocol service 4502n, each protocol service including a proxy and located within the demilitarized zone 6308. The protocol services 4502a-n may communicate with each other over a proxy-proxy communication channel. The client machine 10 communicates with the first protocol service 4502a which communicates with the second first protocol service 4502b. In turn, the second first protocol service 4502b communicates with the third first protocol service 4502n and then the third first protocol service 4502n communicates with the remote machine over a proxy-server communication channel 4508 to establish the communication session with the remote machine. Furthermore, although the embodiment described above includes a ticket having a client ticket and a first protocol service ticket, another embodiment includes the ticket comprising numerous tickets.

In still another embodiment of a network communications system 6100 as shown in FIG. 62, an ACR Service 5002 can be used instead of the ticket authority 6102 for reconnecting the client machine 10 to any of the host services 4516a-4516n. In this embodiment, the ACR Service 5002 can provide similar services as described above with regards to the ticket authority 6102. As previously described, the ACR Service 5002 generates, validates and manages a SID and a key for connecting and reconnecting a client communication session. A SID and a key can form a ticket as in the type of ticket generated, validated and managed by the ticket authority 6102 as described above. As such, in another embodiment, a ticket may be used interchangeably for the combination of a session identifier and a key.

The intermediary machine 30, as shown in FIG. 62, is configured to communicate with the ACR Service 5002. In one embodiment, the ACR Service 5002 is configured to receive a request for a first SID and a first key from the intermediary machine 30 and to thereafter generate the first SID and first key. The ACR Service 5002 uses the first SID to identify the communication session that is established between the client machine 10 and a host service 4516. The first SID and the first key allow the client machine 10 to automatically reconnect with the host service 4516 after an abnormal disruption of service without requiring the client machine 10 to provide authentication credentials again.

After generation of the first SID and the first key, the ACR Service 5002 encrypts the authentication credentials supplied by the client machine 10 using the first key so that an attacker who gains access to the intermediary machine 30 or the ACR Service 5002 cannot access the authentication credentials without the first key. The ACR Service 5002 then stores the encrypted authentication credentials with the SID in memory 5018 and transmits the first SID and the first key to the client machine 10 over the network 150. Upon the client's receipt of the SID and the key, the ACR Service 5002 destroys (i.e., deletes) the key from its memory 5018.

In another embodiment, the first protocol service 4502 is configured to generate a second SID and second key. The first protocol service 4502 can also be configured to transmit the second SID and second key to the client machine 10, while keeping a copy of the second SID and second key. The copy of the second SID and second key can later be used by the first protocol service 4502 to validate the second SID and second key originally transmitted to the client machine 10 when it is later presented to the first protocol service 4502 during the process of reconnecting the client machine 10. In one embodiment, the first protocol service 4502 transmits the second SID and second key to the client machine 10 via the intermediary machine 30. In another embodiment, the first protocol service 4502 transmits the second SID and second key to the client machine 10 directly. Moreover, as described in greater detail below, the first protocol service 4502 can be further configured to delete, during the process of reconnecting the client machine 10 to a host service 4516, the second SID and second key, and thereafter generate a replacement second SID and second key. Additionally, in another embodiment, the second SID and second key is configured for automatic deletion after a pre-determined period of time.

In one embodiment, the intermediary machine 30 serves as an intermediary for the first and second SIDs and keys. The intermediary machine 30 receives, for example, the first SID and first key generated by the ACR Service 5002 and the second SID and second key generated by the first protocol service 4502. The intermediary machine 30 can then transmit the first SID and first key and the SID and second key to the client machine 10. Moreover, during the process of reconnecting the client machine 10 to a host service 4516, the intermediary machine 30 can accept the first SID and first key and the second SID and second key from the client machine 10 and thereafter transmit the first SID and first key to the ACR Service 5002 and, if appropriate, the second SID and second key t to the first protocol service 4502.

If the first communication session between the client machine 10 and the host service 4516 terminates, for example abnormally, the new session can be re-established without requiring the user to reenter his or her authentication credentials. When the client machine 10 and the host service 4516 re-establish a second communication session, the client machine 10 transmits the first and second SIDs and keys to the intermediary machine 30. The intermediary machine 30 transmits the first SID and first key to the ACR Service 5002, which uses the SID to locate and retrieve the encrypted authentication credentials for the first connection and uses the first key to decrypt the retrieved authentication credentials. The ACR Service 5002 then authenticates the client by validating the decrypted authentication credentials. After re-authentication, the second SID and second key is forwarded to the first protocol service 4502 to re-establish the second connection 4508 with the host service 4516.

Referring to FIG. 63, another embodiment of a system 4500 for network communications includes the networks 150 and 150', the client machine 10, the first protocol service 4502, the host services 4516, the intermediary machine 30, and the ticket authority 6102, as described above, and further depicts a first remote machine 30 and a second remote machine 30, both of which are used, in one embodiment, for initially connecting the client machine 10 to a host service 4516. Moreover, in the embodiment of FIG. 63, the client machine 10 further includes a web browser 6302, such as, for example, the INTERNET EXPLORER program from Microsoft Corporation of Redmond, Wash., to connect to the World Wide Web.

In one embodiment (not shown), the system 4500 includes two or more intermediary machines 30 and/or two or more first protocol services 4502. The intermediary machine 30, through which messages between the client machine 10 and the first protocol service 4502 must pass, and/or the first protocol service 4502 can, as explained below, each be chosen based on, for example, a load balancing equation.

Each of the first remote machine 30 and the second remote machine 30 can be any computing device that is capable of communication and that has sufficient processor power and memory capacity to perform the operations described herein.

For example, in one embodiment, the first remote machine 30 is a web server, providing one or more websites or web based applications. In another embodiment, the second remote machine 30 provides an XML service or web service.

In one embodiment, the client machine 10 and the network 150 form an external network 6304, separated from the rest of the system 6100 by a first firewall 6306, depicted as a dashed line. The intermediary machine 30 and the first remote machine 30 can be located in a "demilitarized zone" 6308 (i.e., a network region placed between a company's private network and the public network), separated from the rest of the system 4500 by the first firewall 6306 and a second firewall 6310, also depicted by a dashed line. In some embodiments, the first firewall 6306 and the second firewall 6310 prohibit unauthorized communications to or from the remote machines 30. Then, as shown, the network 150', the first protocol service 4502, the host services 4516a-4516n, the ticket authority 6102, and the second remote machine 30, form an internal network 6312, separated from the rest of the system 4500 by the second firewall 6310.

In some embodiments, the demilitarized zone 6308 includes a ticket protocol service 6314 (shown in shadow in FIG. 63), comprising a proxy (not shown), and the first remote machine 30, which may be a web server. The proxy may comprise a security gateway through which messages over the client-first protocol service communication channel 4504 pass. In one embodiment, the network firewall 6306 repudiates any incoming message from the client-first protocol service communication channel 4504 that does not have the first protocol service 4502 as its destination. Likewise, the network firewall 6306 repudiates any outgoing message for the client-first protocol service communication channel 4504 unless its source is the first protocol service 4502. The security gateway can alternatively be a router, firewall, relay, or any network component that can provide the necessary security. The proxy may also be a network component separate from the first protocol service 4502 that may run on the same computing device of the first protocol service 4502 or on a different computing device. In some embodiments, the proxy is an intermediary for securely passing communications between the client machine 10 and the first protocol service 4502.

Alternatively, in another embodiment not shown in FIG. 63, the system 4500 further includes a third remote machine 30 positioned, in the demilitarized zone 6308, between the network 150 and the intermediary machine 30. The third remote machine 30 can be any computing device that is capable of networked communication and that has sufficient processor power and memory capacity to perform the operations described herein. As described below, the third remote machine 30 is used, in some embodiments, during the process of initially connecting the client machine 10 to a host service 4516 and/or during the process of reconnecting the client machine 10 to a host service 4516. More specifically, as described below, where the system 4500 includes two or more intermediary machines 30, the third remote machine 30 can, based on a load balancing equation for example, choose the intermediary machine 30 through with communications between the client agent 4506 of the client machine 10 and the first protocol service 4502 must pass.

Moreover, referring to FIG. 63, the intermediary machine 30, in an alternative embodiment, can be replaced by two or more levels "a"-"n" of intermediary machines 30. As illustrated, each level "a"-"n" can include two or more intermediary machines 30'. As described below, the client agent 4506 of the client machine 10 can be routed through any combination of the intermediary machines 30 based on, for example, load balancing equations. For example, as illustrated, the client agent 4506 can be routed through the intermediary machines 30 via connection 4504. For additional security, each of the "hops" via connection 4504 may require a ticket or re-connection ticket for validating and authenticating the multiple-hop connection between the client machine 10 and the host service 4516. Other configurations of the system 4500, as would be readily apparent to one skilled in the art, are also possible.

Referring again to FIG. 63, in one embodiment, the web browser 6302 communicates over the network 150 with the first remote machine 30, which itself interfaces with the second remote machine 30 and the ticket authority 6102. More specifically, the first remote machine 30 is configured with the address of the second remote machine 30 and the ticket authority 6102. In one embodiment, as explained further below, the first remote machine 30 is configured to relay information between, and thereby prevent direct communication between, the web browser 6302 of the client machine 10, the second remote machine 30, and the ticket authority 6102. By preventing such direct communication, the first remote machine 30 adds an additional level of security to the system 4500. The first remote machine 30 can also be configured with the address of the intermediary machine 30, or, alternatively, with the address of two or more intermediary machines 30.

For its part, the second remote machine 30 is configured to determine which of the application programs running on the host services 4516 are available to a user of the client machine 10. In other words, the second remote machine 30 is configured to determine which of the application programs the user is authorized to access. In one embodiment, after the user selects his desired application program, as described further below, the second remote machine 30 is further configured to determine which of the host services 4516 will be used to run the user's desired application for purposes of load balancing. The second remote machine 30 returns the address of that host service 4516 to the first remote machine 30. The second remote machine 30 also returns the address of the first protocol service 4502, which can also be selected from amongst a plurality of first protocol services 4502 through the use of a load balancing equation, to the first remote machine 30. In turn, the first remote machine 30 transmits the address of the chosen first protocol service 4502 and the chosen host service 4516 to the ticket authority 6102.

For its part, the ticket authority 6102 generates connection tickets. In one embodiment, the ticket authority 6102 transmits an initial connection ticket to the first remote machine 30 for transmission to the client machine 10. In another embodiment, the ticket authority transmits a first reconnection ticket to the intermediary machine 30.

In one embodiment, the ticket authority 6102 issues one or more tickets to authenticate the client machine 10. In particular, the ticket authority 6102 enables authentication of the client machine 10 over one communication channel (i.e., a client-web server communication channel) based on authentication credentials. The ticket authority 6102 further enables the client machine 10 to be authenticated to another communication channel (i.e., the client-first protocol service communication channel 4504) without having the client machine 10 repeatedly provide authentication credentials on the other communication channel.

In one embodiment, the ticket authority 6102 is a stand-alone network component. In other embodiments, a modular ticket authority 136 is a software module residing on one or more remote machines 30. For example, there may be a ticket authority 6102 for each of the remote machines 30. In some embodiments, a first remote machine 30, such as a web server in the demilitarized zone 6308, may communicate with the ticket authority 6102 and/or the remote machine 30 over an agent-server communication channel. In another embodiment, the ticket authority 6102 may reside on an intermediary remote machine 30 separate from other remote machines 30.

In one embodiment, the ticket authority 6102 generates a first ticket and a second ticket. In some embodiments, the tickets are both nonces. In further embodiments, the tickets are generated using a cryptographic random number generator that has been suitably seeded with randomness. The first ticket is transmitted to the client machine 10 and is used to establish a first communication session between the client machine 10 and the first protocol service 4502. The second ticket is transmitted to the first protocol service 4502 and is used to establish a second communication session between the first protocol service 4502 and a remote machine 30.

In some embodiments, the first remote machine 30 is a web server. In one of these embodiments, the first remote machine 30 delivers web pages to the client machine 10. In another of these embodiments, the first remote machine 30 is capable of establishing a secure client-web server communication channel with the client machine 10.

In other embodiments, the first remote machine 30 is a web server providing a corporate portal, also referred to as an enterprise information portal, to the client machine 10. In one of these embodiments, enterprise portals are company web sites that aggregate, personalize and serve applications, data and content to users, while offering management tools for organizing and using information more efficiently. In other embodiments, the first remote machine 30 provides a web portal, or Internet portal, to the client machine 10. A web portal is similar to a corporate portal but typically does not include business-specific information.

In one embodiment, a user of the client machine 10 employs the web browser 6302 to authenticate the user to the first remote machine 30. In one embodiment, the client machine 10 transmits user credentials, such as log in and password information, to the first remote machine 30. The first remote machine 30 verifies that the user has access to the machine farm 38.

In a further embodiment, the web browser 6302 uses SSL to establish a secure client-web server communication channel. The web browser 6302 can alternatively connect to the first remote machine 30 over a client-web server communication channel using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the Internet Engineering Task Force (IETF). In one embodiment, the first remote machine 30 transmits a web portal or enterprise portal, as described above, to the client machine 10 upon validation of the user to enable the client machine 10 to request a resource, such as, for example, an application or a server desktop to be remotely displayed on the client machine 10.

The client-web server communication channel may be any secure communication channel. In some embodiments, communications over the channel are encrypted. In certain of these embodiments, the client machine 10 and the first remote machine 30 may communicate using the Secure Socket Layer (SSL) of the HyperText Transfer Protocol (HTTPS). Alternatively, the client machine 10 and the first remote machine 30 may use other encryption techniques, such as symmetric encryption techniques, to protect communications.

Further, in one embodiment the client-first protocol service communication channel 4502 can be established by using, for example, a presentation services protocol such as ICA, X11 protocol, VNC, or RDP. Although described as establishing a first communication session between the client machine 10 and the first protocol service 4502 and a second communication session between the first protocol service 4502 and the remote machine 30, the communication session can be viewed as a single, logical communication session between the client machine 10 and the host service 4516.

Figure 64:
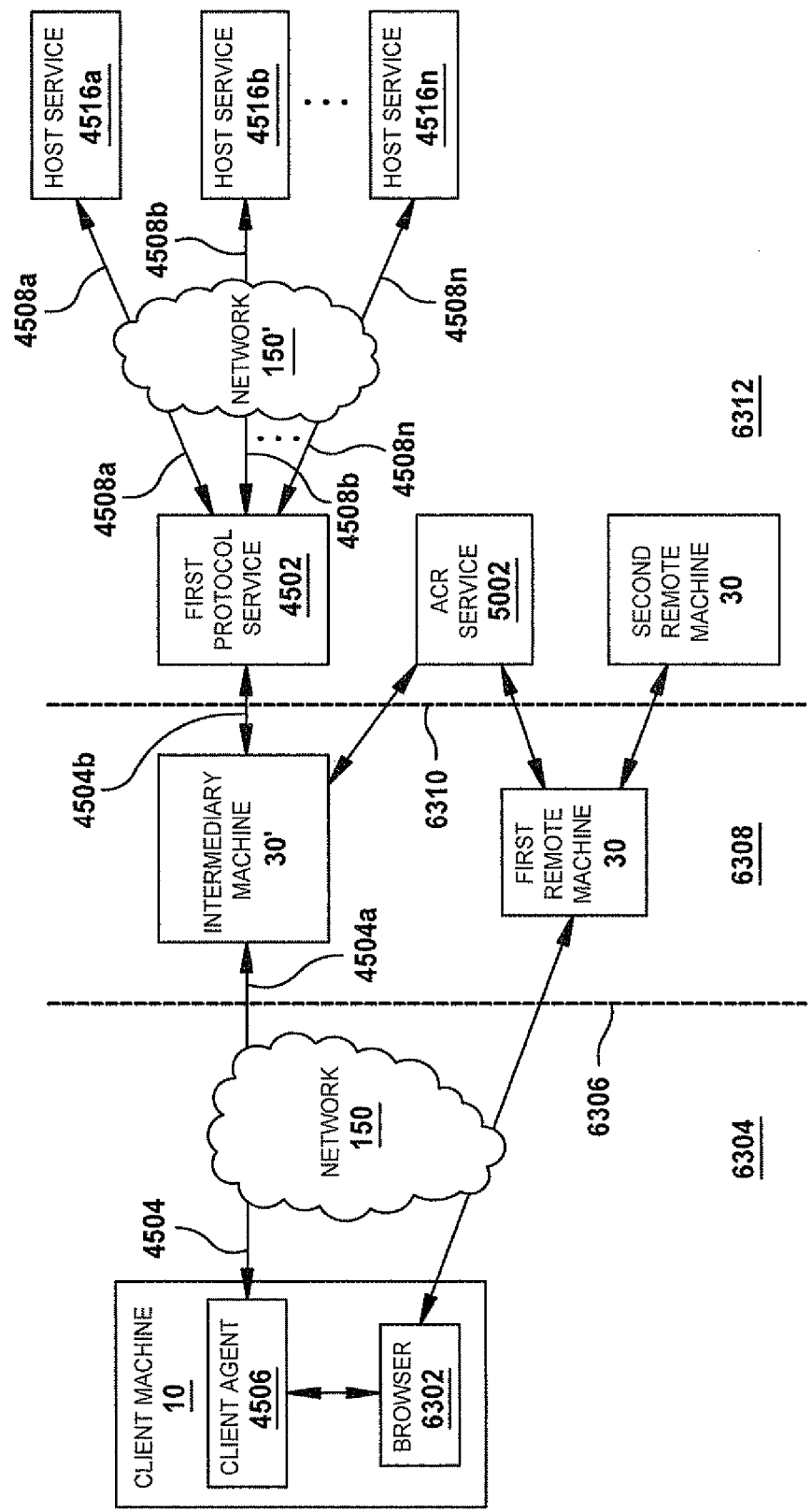
FIG. 64 is a block diagram of the system of FIG. 62 further including components for initially connecting the client to a host service and to maintain authentication credential according to an embodiment of the invention.

In another embodiment of a network communication system 4500 as shown in FIG. 64, the ACR Service 5002 can be used instead of the ticket authority 6102 to reconnect a client machine 10 to a host service 4516. Instead of using tickets as with the ticket authority 6102, the ACR Service 5002 generates, validates and manages SIDs and keys for connecting and reconnecting client communication sessions. The ACR Service 5002 authenticates and re-authenticates the client to a host service 4516 or remote machine 30 using a SID and key, or a ticket, associated with the client machine 10. As previously mentioned, a ticket can be used to refer to the combination of a SID and key or a ticket can comprise a SID and a key.

The system 4500 of FIG. 64 includes the networks 150 and 150', the client machine 10, the first protocol service 4502, the host services 4516, the intermediary machine 30, and the ACR Service 5002, as described above, and further depicts a first remote machine 30 and a second remote machine 30, both of which are used, in one embodiment, for initially connecting the client machine 10 to a host service 4516. Moreover, the client machine 10 further includes a web browser 6302 to connect to the World Wide Web.

In one embodiment (not shown), the system 4500 includes two or more intermediary machines 30 and/or two or more first protocol services 4502 or two or more ACR Services 5002. The intermediary machine 30, through which messages between the client machine 10 and the first protocol service 4502 must pass, and/or the first protocol service 4502 can and/or the ACR Service 5002, as explained below, each be chosen based on, for example, a load balancing equation.

In another embodiment, the system 4500 of FIG. 64 can include an external network 6304, separated from a "demilitarized zone" 6308 by a first firewall 6306 which in turn is separated from an internal network 6312 by a second firewall 6310. Although the invention is discussed above in terms of various network topologies in FIGS. 63 and 64, any other network topologies can be used, such as for example, a topology including combinations of internal networks, external networks, sub-networks, intranets, firewalls, security zones, single servers, a server network or server farms.

Alternatively, in another embodiment not shown in FIG. 64, the system 4500 further includes a third remote machine 30 positioned, in the demilitarized zone 6308, between the network 150 and the intermediary machine 30. The third remote machine 30 is used, in some embodiments, during the process of initially connecting the client machine 10 to a host service 4516 and/or during the process of reconnecting the client machine 10 to a host service 4516.

In another embodiment of the system 4500 in FIG. 64, the intermediary machine 30, can be replaced by two or more levels "a"-"n" of intermediary machines 30'. The client agent 4506 of the client machine 10 can be routed through any combination of the intermediary machines 30 based on, for example, load balancing equations.

In one embodiment, the web browser 6302 communicates over the network 150 with the first remote machine 30, which itself interfaces with the second remote machine 30 and the ACR Service 5002. The first remote machine 30 is configured with the address of the second remote machine 30 and the ACR Service 5002. In another embodiment to provide an additional level of security in the system 4500, the first remote machine 30 is configured to relay information between, and thereby prevent direct communication between, the web browser 6302 of the client machine 10, the second remote machine 30, and the ACR Service 5002. The first remote machine 30 can also be configured with the address of any of the intermediary machines 30'.

For its part, the second remote machine 30 is configured to determine which of the application programs running on the host services 4516 are available to a user of the client machine 10 and to provide the address of the host service 4516 selected by the user to the first remote machine 30. The second remote machine 30 also provides the address of one of the multiple first protocol service 4502, through the use of a load balancing equation, to the first remote machine 30. In turn, the first remote machine 30 transmits the address of the chosen first protocol service 4502 and the chosen host service 4516 to the ACR Service 5002.

For its part, the ACR Service 5002 generates, validates and manages connection SIDs and key to provide authentication and re-authentications services to re-establish a client's communication session with a host service 4516 or remote machine 30, as described herein. In one embodiment, the ACR Service 5002 transmits a first SID and first key to the first remote machine 30 for transmission to the client machine 10. In another embodiment, the ACR Service 5002 transmits a first SID and first key to one of the intermediary machines 30.

In other embodiments, methods for network communications enable reconnecting a client machine 10 to a host service 4516 using a plurality of secondary protocols encapsulated within a first protocol. The method includes establishing a first connection between a client machine 10 and a first protocol service 4502 using a first protocol and communicating between the client machine 10 and the first protocol service 4502 via a plurality of second protocols encapsulated within the first protocol. Moreover, at least one of the second protocols includes a plurality of virtual channels.

In one embodiment of this aspect of the invention, a second connection is established between the first protocol service 4502 and a host service 4516 using one of the secondary protocols. Communication between the first protocol service 4502 and the host service 4516 occurs via one of the secondary protocols. Specifically, each of the plurality of second connections is established between the first protocol service 4502 and a different host service 4516 and each of the plurality of second connections is established using one of the plurality of secondary protocols. In yet another embodiment, the first connection between the client machine 10 and the first protocol service 4516 is established through one or more intermediary machines 30.

Figure 65:
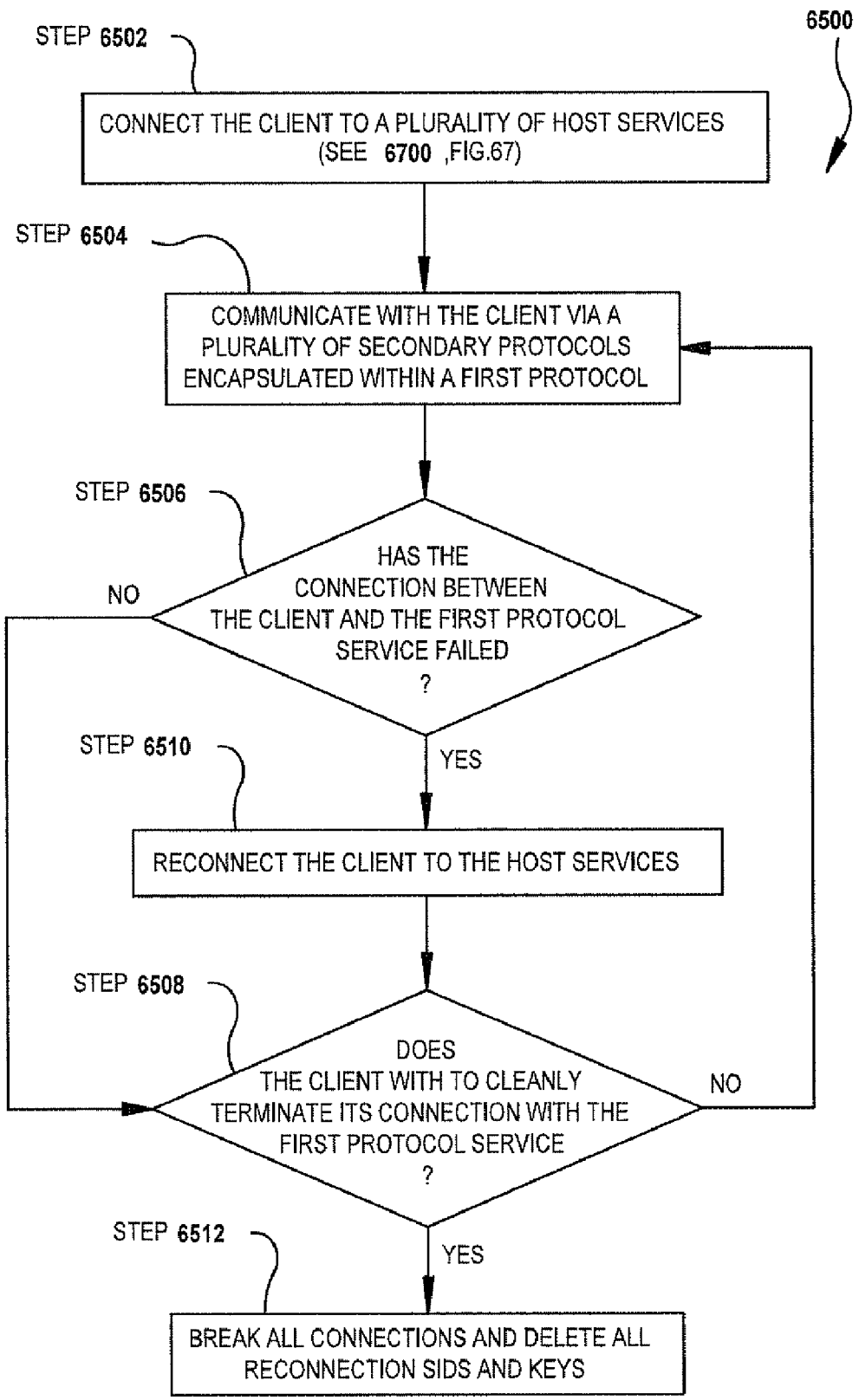
FIG. 65 is a flow diagram of a method for network communications according to an embodiment of the invention.

Referring now to FIG. 65, one embodiment of a method 6500 for reconnecting a client to a host service after a network failure is illustrated. At step 6502, the client machine 10 initially connects to one of a plurality of host services 4516. Generally, the client machine 10 is required to transmit authentication credentials to the host service 4516 to initiate the communication session. After the client machine 10 is connected to the host service 4516, the client machine 10 and the host service 4516 communicate, through the first protocol service 4502, and at step 6504, via a plurality of secondary protocols encapsulated within the first protocol as discussed above in reference to FIGS. 47-48 and FIG. 49. In one embodiment, the first protocol service 4502 encrypts, prior to the transmission of any first protocol packets, communications at the level of the first protocol 4704, thereby securing the communications. In another embodiment, the first protocol service 4502 compresses, prior to the transmission of any first protocol packets, the communications at the level of the first protocol, thereby improving communication efficiency.

At step 6506, the client agent 4506 determines whether the connection 4504 between the client agent 4506 and the first protocol service 4502 has failed. For example, the connection 4504*a* between the client agent 4506 and the intermediary machine 30 may have failed, the connection 4504*b* between the intermediary machine 30 and the first protocol service 4502 may have failed, or both the connection 4504*a* and the connection 4504*b* may have failed. If the client agent 4506 determines that the connection 4504 has not failed, the method 6500 proceeds to step 6508. If, on the other hand, the client agent 4506 determines that the connection 4504 has failed, the client machine 10 is, at step 6510, reconnected to the host service 4516.

The step of reconnecting in step 6510 after a first communication session ends abnormally, can comprise in a system 4500 deploying a ticket authority 6102 and the client machine 10 transmitting the SID and the first and second reconnection tickets to the intermediary machine 30. The intermediary machine 30 uses the first reconnection ticket to authenticate the client machine 10 and re-establish the connection 4504 between the client machine 10 and the intermediate node 30'. The intermediary machine 30 then transmits the second reconnection ticket to the first protocol service 4502, which uses the second reconnection ticket to authenticate re-establish the connection 4508 to the host service 4516. The reconnection tickets thus allow the client machine 10 to automatically establish a second communication session to the host service 4516 without retransmitting the authentication credentials a second time.

In another embodiment, the step of reconnecting, in step 6510, can also comprise a system 4500 deploying an ACR Service 5002. In such an embodiment, the client machine 10 transmits a first SID and first key to the intermediary machine 30 to authenticate the client machine 10 and reestablish the connection of the client machine 10 to the host service 4516.

It is determined, at step 6508, whether the client machine 10 wishes to cleanly terminate its connection 4504 with the first protocol service 4502 and, consequently, its connections 4508*a*-4508*n* with the host services 4516*a*-4516*n*. If not, communication between the client machine 10 and the first protocol service 4502, via the plurality of secondary protocols encapsulated within the first protocol, continues at step 6504. If so, then, at step 6512, all connections 4504*a*, 4504*b*, and 4508*a*-4508*n* are broken and all reconnection tickets are deleted. In another embodiment using an ACR Service 5002, at step 6512, all connections 4504*a*, 4504*b*, and 4508*a*-4508*n* are broken and all SIDS and keys are deleted. In one embodiment, the intermediary machine 30 uses a handle it receives from the ticket authority 6102 to delete a copy of a first reconnection ticket kept at the ticket authority 6102. In another embodiment deploying a ticket authority 6102, the first protocol service 4502 deletes a copy of a second reconnection ticket kept at the first protocol service 4502. In yet another embodiment deploying the ACR Service 5002, the first protocol service 4502 deletes a copy of a second SID and second key kept at the first protocol service 4502.

In a further embodiment using a ticket authority 6102, if for some reason a secondary protocol connection 4508 fails, a copy of the second reconnection ticket associated therewith and kept at the first protocol service 4502 is deleted by the first protocol service 4502. In yet another embodiment, a first reconnection ticket and/or a second reconnection ticket is automatically deleted after a pre-determined period of time following a failure in the connection 4504, as at step 6506, and/or following a clean termination of the connection 4504, as at step 6508.

Figure 66:
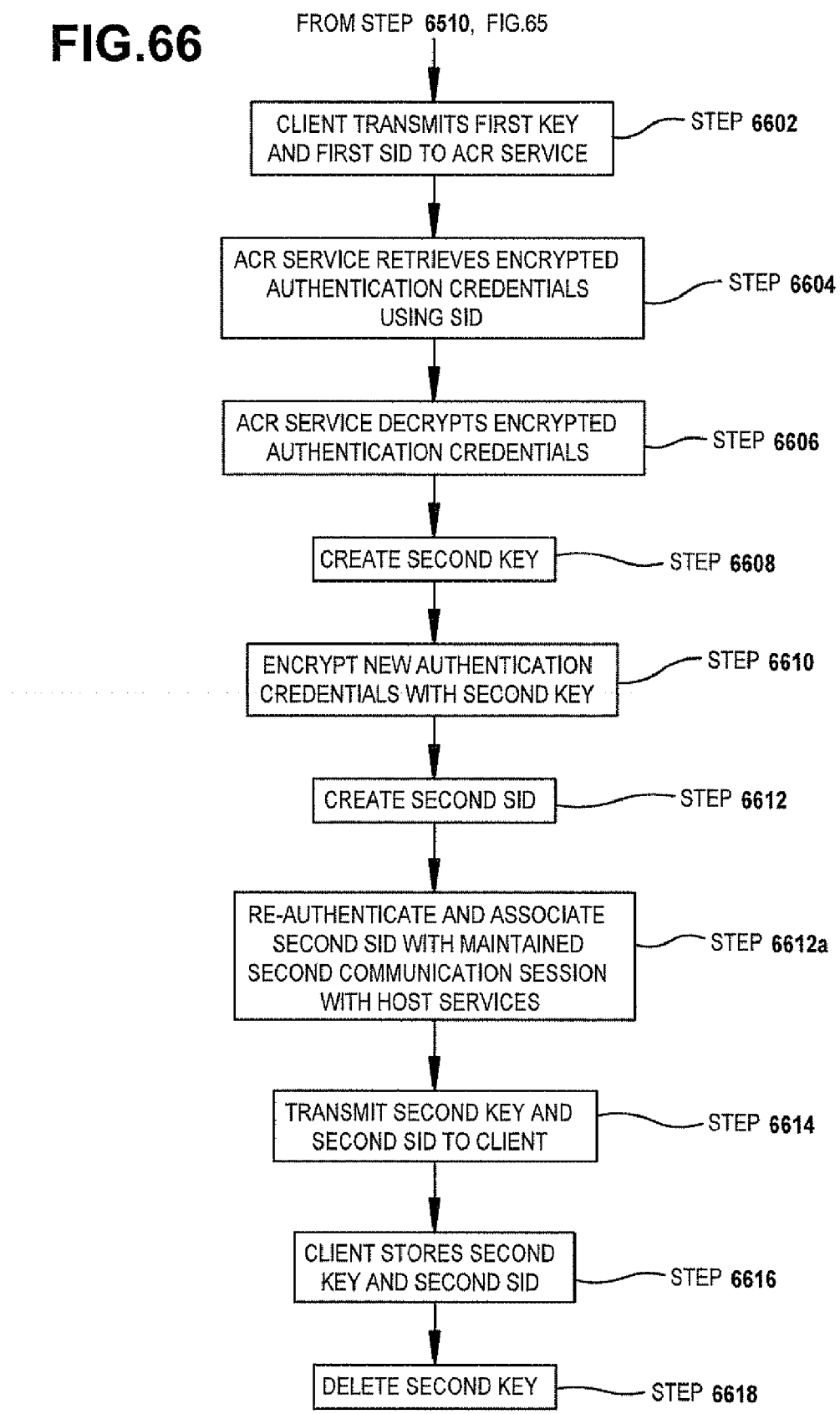
FIG. 66 is a flow diagram of a method for reconnecting the client to the host services.

In another aspect, this invention relates to methods for reconnecting the client machine 10 to the host service 4516 using the ACR Service 5002. Referring now to FIG. 66, one embodiment of step 6510 in FIG. 65 is illustrated. The client machine 10 transmits the first SID and the first key to the ACR Service 5002 to reconnect to the host service (step 6602). The ACR Service 5002 uses the SID (step 6604) to locate and retrieve the encrypted authentication credentials and uses the key (step 6606) to decrypt the retrieved authentication credentials. In one embodiment (not shown), the ACR Service 5002 uses the decrypted authentication credentials to re-authenticate the client machine 10 to the maintained session between the first protocol service 4502 and the host service 4516. After re-authenticating, the reestablished connection of the client machine 10 to the first protocol service 4516 is re-linked to the maintained session between the first protocol service 4502 and the host service 4516.

In another embodiment, during the second communication session, the ACR Service 5002 generates (step 6608) a second key for the authentication credentials and then encrypts (step 6610) the authentication credentials using the second key. The ACR Service 5002 creates a second SID (step 6612). Then the decrypted authentication credentials are re-authenticated with the host service 4516 and the second SID is associated with the maintained communication session with the host service 4516 (step 6612*a*). The ACR Service 5002 then transmits the second SID and second key to the client machine 10 (step 6614). In one embodiment, the ACR Service 5002 may transmit the second SID and second key through an intermediary machine 30. The client machine 10 stores the second SID and second key (step 6616). The ACR Service 5002 then deletes the second key (step 6618).

Figure 67:
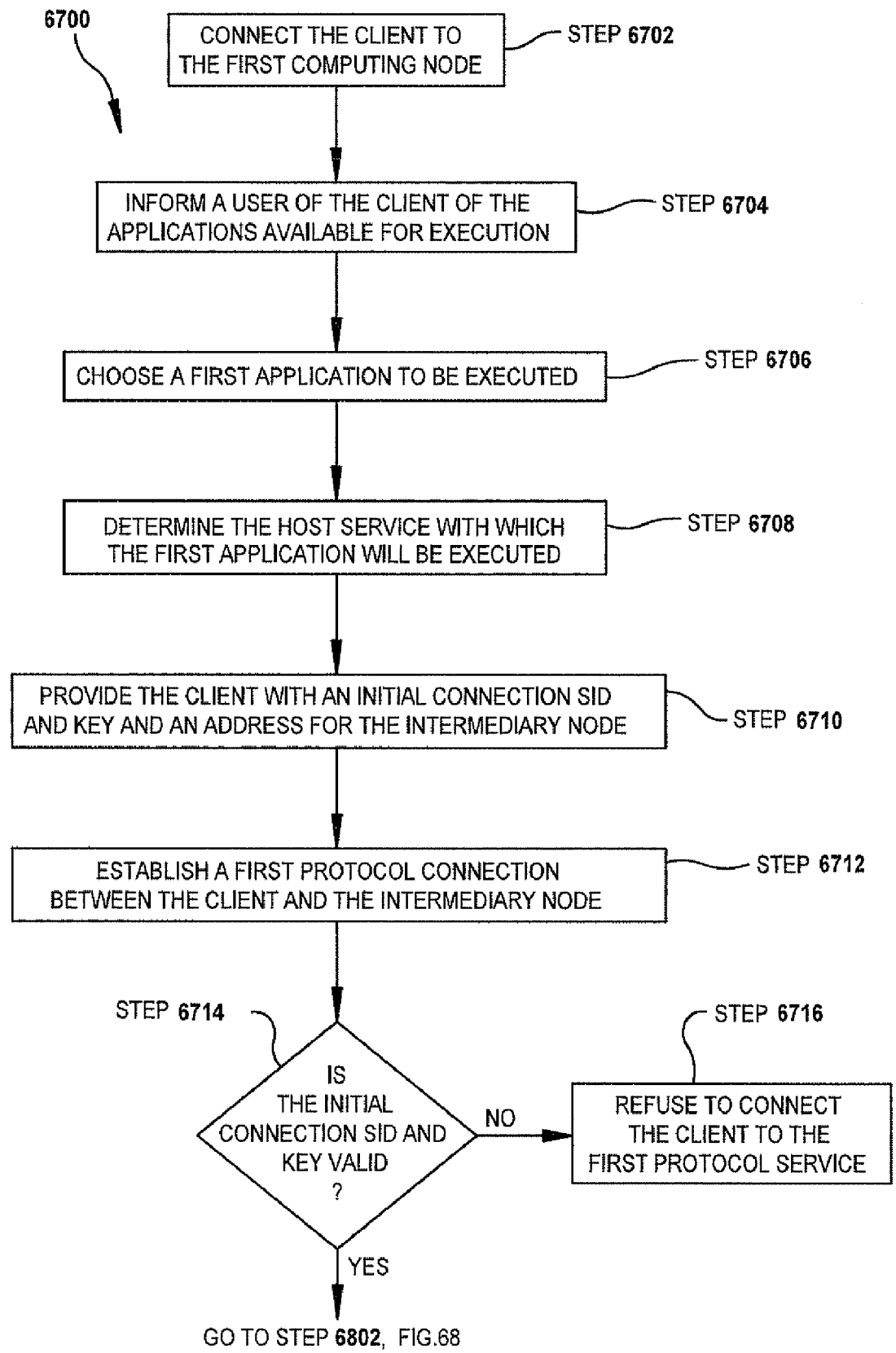

Referring to FIGS. 67-68, one embodiment of a method 6700 for initially connecting the client machine 10 to the host service 4516 using an ACR Service 5002 is illustrated. At step 6702, the client machine 10, using the browser 6302, sends a request, such as, for example, an HTTP request, to the first remote machine 30. The first remote machine 30 returns a web page, such as, for example, an HTML form requesting authentication information (e.g., a username and a password). A user of the client machine 10 enters his authentication credentials and transmits the completed form to the first remote machine 30.

The first remote machine 30, at step 6704, then informs the user of the client machine 10 of applications available for execution. In one embodiment, the first remote machine 30 extracts the user's credentials from the login page and transmits them to the second remote machine 30, together with a request for the second remote machine 30 to enumerate the applications available to the user. Based on the user's credentials, the second remote machine 30 returns a list of specific applications available to the first remote machine 30, which then forwards the list, in the form of a web page for example, to the user of the client machine 10.

At step 6706, the user selects the desired application and a request for that application is sent to the first remote machine 30. For example, in one embodiment, the user clicks on a desired application listed in the web page presented to him by the first remote machine 30 and an HTTP request for that application is forwarded to the first remote machine 30. The request is processed by the first computing node 140 and forwarded to the second remote machine 30.

At step 6708, the second remote machine 30 determines the host service 4516 on which the desired application will be executed. The second remote machine 30 can make that determination based, for example, on a load balancing equation. In one embodiment, the second remote machine 30 also determines a first protocol service 4502 from amongst a plurality of first protocol services 4502 that will be used to communicate with the host service 4516 via a connection 4508. Again, the second remote machine 30 can make that determination based, for example, on a load balancing equation. The second remote machine 30 returns the address of the chosen host service 4516 and the chosen first protocol service 4502 to the first remote machine 30.

The client machine 10, at step 6710, is then provided with an initial connection session id and key, a first SID and first key, and an address for the intermediary machine 30 (which is either its actual address or its virtual address, as described below). In one embodiment, the first remote machine 30 provides the address for the chosen host service 4516 and the chosen first protocol service 4502 to the ACR Service 5002, together with a request for the initial connection session id and key. The ACR Service 5002 generates the initial session id and key, and transmits the session id and key to the first remote machine 30, while keeping a copy for itself.

In some embodiments, the ticket authority 6102 generates an initial connection ticket. In one of these embodiments, the ticket authority 6102 keeps the address of the chosen host service 4516 and the chosen first protocol service 4502, generates the initial connection ticket, and transmits the initial connection ticket to the first remote machine 30, while keeping a copy for itself. In one embodiment, the ticket authority 6102, in response to the request for the initial connection ticket by the first remote machine 30, generates connection tickets for each of the "hops" between the client machine 10 and the host service 4516. In another embodiment, the first remote machine 30 requests initial connection tickets for each of the "hops" either in a single request or in multiple requests.

The first remote machine 30, configured, in one embodiment, with the actual address of the intermediary machine 30, then transmits the actual address of the intermediary machine 30 and the initial connection session id and key to the browser 6302 of the client machine 10. In some embodiments, an initial connection ticket is transmitted. The first remote machine 30 can, for example, first create a file containing both the actual address of the intermediary machine 30 and the initial connection ticket and then transmitting the file to the browser 6302 of the client machine 10. Optionally, in another embodiment, the first remote machine 30 is configured with the actual address of two or more intermediary machines 30. In such an embodiment, the first remote machine 30 first determines the intermediary machine 30 through which messages between the client machine 10 and the first protocol service 4502 will have to pass. The first remote machine 30 then transmits the actual address of that chosen intermediary machine 30 and the initial connection ticket to the browser 6302 of the client machine 10 using, for example, the file described above. In one embodiment, the first remote machine 30 chooses the intermediary machine 30 using a load balancing equation. The client agent 4506 of the client machine 10 is then launched and uses the address of the intermediary machine 30, to establish, at step 6712, a first protocol connection 4504*a* between the client agent 4506 of the client machine 10 and the intermediary machine 30.

Alternatively, in another embodiment, the first remote machine 30 is configured with an actual address of the third remote machine 30, which serves as a virtual address of an intermediary machine 30. In such an embodiment, the first remote machine 30 transmits, at step 6710, the actual address of the third remote machine 30 and the initial connection session id and key to the browser 6302 of the client machine 10 using, for example, the file described above. The client agent 4506 of the client machine 10 is then launched and uses the actual address of the third remote machine 30 to establish, at step 6712, a first protocol connection between the client agent 4506 of the client machine 10 and the third remote machine 30. The third remote machine 30 then determines the intermediary machine 30 through which messages between the client machine 10 and the first protocol service 4502 will have to pass. In one embodiment, the third remote machine 30 chooses the intermediary machine 30 using a load balancing equation. Having chosen the intermediary machine 30, the third remote machine 30 establishes a first protocol connection to the intermediary machine 30. A first protocol connection 4504a therefore exists, through the third remote machine 30, between the client agent 4506 of the client machine 10 and the intermediary machine 30. The actual address of the third remote machine 30 is therefore mapped to the actual address of the intermediary machine 30. To the client agent 4506 of the client machine 10, the actual address of the third remote machine 30 therefore serves as a virtual address of the intermediary machine 30.

In one embodiment, where more than one level of intermediary machines 30' exist, as described above, the first remote machine 30 or the third remote machine 30, respectively, only choose the intermediary machine 30 to which the client agent 4506 will connect at level "a." In such an embodiment, at each of the levels "a"-"n−1", the intermediary machine 30 through which the client agent 4506 is routed at that level thereafter determines, based on a load balancing equation for example, the intermediary machine 30 to which it will connect at the next level. Alternatively, in other embodiments, the first remote machine 30 or the third remote machine 30, respectively, determine, for more than one or all of the levels "a"-"n", the intermediary machines 30 through which the client agent 4506 will be routed.

Having established the first protocol connection 4504a between the client agent 4506 of the client machine 10 and the intermediary machine 30, for example the intermediate node 30' at level "n" (hereinafter referred to in method 6700 as the intermediary machine 30), the client agent 4506 then transmits the initial connection ticket to the intermediary machine 30.

It is then determined, at step 6714, whether the initial connection SID and key is valid. In one embodiment, the intermediary machine 30 transmits the initial connection SID and key to the ACR Service 5002 for validation. In one embodiment, the ACR Service 5002 validates the SID and key by comparing it to the copy of the SID and encrypted authentication credentials it kept at step 6710. If the ACR Service 5002 determines the SID and key to be valid, the ACR Service 5002 transmits, at step 6802 (FIG. 68), the address of the first protocol service 4502 and the address of the chosen host service 4516 to the intermediary machine 30. The first protocol service 4502 can also delete the SID and key and any copy thereof. If, on the other hand, the ACR Service 5002 determines the SID and key to be invalid, the client machine 10 is, at step 6716, refused connection to the first protocol service 4502 and, consequently, connection to the host service 4516. In some embodiments, the ticket authority 6102 receives an initial connection ticket from the intermediary machine 30 for validation and validates the ticket as described above.

Following step 6802, the intermediary machine 30 uses the address of the chosen first protocol service 4502 to establish, at step 6804, a first protocol connection 4504b between the intermediary machine 30 and the first protocol service 4502. In one embodiment, the intermediary machine 30 uses an initial connection ticket to establish the first protocol connection 4504b between the intermediary machine 30 and the first protocol service 4502. In one case, the intermediary machine 30 uses the same initial connection ticket received from the client machine 10 to validate the connection 4504b. In another case, the intermediary machine 30 uses an initial connection ticket generated for and valid for the first protocol connection 4504b. A first protocol connection 4504 therefore now exists, through the intermediary machine 30, between the client agent 4506 of the client machine 10 and the first protocol service 4502. The intermediary machine 30 can also pass the address of the chosen host service 4516 to the first protocol service 4502.

In one embodiment, at step 6806, the first protocol service 4502 uses the address of the chosen host service 4516 to establish a secondary protocol connection 4508 between the first protocol service 4502 and the chosen host service 4516. For example, the chosen host service 4516 is in fact the host service 4516a and a secondary protocol connection 4508a is established between the first protocol service 4502 and the host service 4516a.

In one embodiment, following step 6806, the user chooses, at step 6808, a second application to be executed and the second remote machine 30 determines, at step 6810, the host service 4516 on which the second application is to be executed. For example, by calculating a load balancing equation, the second remote machine 30 may choose the host service 4516b to execute the second application program. The second remote machine 30 then transmits the address of the chosen host service 4516b to the first protocol service 4502. In one embodiment, the second remote machine 30 is in direct communication with the first protocol service 4502 and directly transmits the address thereto. In another embodiment, the address of the chosen host service 4516b is indirectly transmitted to the first protocol service 4502. For example, the address can be transmitted to the first protocol service 4502 through any combination of the first remote machine 30, the ACR Service 5002, the intermediary machine 30, and the first protocol service 4502. Having received the address of the chosen host service 4516b, the first protocol service 4502 establishes, at step 6812, a secondary protocol connection 4508b between the first protocol service 4502 and the chosen host service 4516b.

The secondary protocols that can be used to communicate over the connections 4508a and 4508b include, but are not limited to, HTTP, FTP, Oscar, Telnet, ICA, and RDP. Moreover, in one embodiment, at least one of the secondary protocols, as described above, includes a plurality of virtual channels, each of which can include a plurality of protocol packets enabling functionality at the client machine 10. For example, in one embodiment, one host service 4516a is a web server, communicating with the first protocol service 4502 over the connection 4508a using the HTTP protocol, and another host service 4516b is an application server, communicating with the first protocol service 4502 over the connection 4508b using the ICA protocol. The host service 4516b generates both protocol packets for transmitting graphical screen commands to the client machine 10, for causing the client machine 10 to display a graphical user interface, and protocol packets for transmitting printer commands to the client machine 10, for causing a document to be printed at the client machine 10.

Steps 6808, 6810, and 6812 can be repeated any number of times. As such, any number of application programs can be executed on any number of host services 4516a-4516n, the outputs of which can be communicated to the first protocol service 4502 over the connections 4508a-4508n using any number of secondary protocols.

Turning now to step 6814, the first protocol service 4502 can, as described above, encapsulate the plurality of secondary protocols within the first protocol. As such, the client machine 10 is connected to, and simultaneously communicates with, a plurality of host services 4516.

In another embodiment, prior to performing steps 6808, 6810, and 6812 to execute a new application program on a host service 4516, such as, for example, the host service 4516b, a user of the client machine 10 ends execution of another application program, such as, for example, an application program executing on host service 4516a. In such a case, the first protocol service 4502 disrupts the connection 4508a between the first protocol service 4502 and the host service 4516a. The first protocol service 4502 then establishes, by implementing steps 6808, 6810, and 6812, the connection 4508b between the first protocol service 4502 and the host service 4516b, without interrupting the connection 4504 between the client machine 10 and the first protocol service 4502.

In one embodiment, a first SID and key is generated at step 6816. In some embodiments, a first re-connection ticket is generated. For example, the intermediary machine 30 requests a first SID and key from the ACR Service 5002. Upon receiving the request, the ACR Service 5002 generates the first SID and key, and can also generate a handle, which is, for example, a random number. The ACR Service 5002 can then transmit, at step 6902, the first SID and key and the handle to the intermediary machine 30, while keeping a copy of the first SID and key and a copy of the handle. The ACR Service 5002 continues to maintain the address of the first protocol service 4502 that was transmitted to it by the first remote machine 30 at step 6710. The intermediary machine 30 then transmits, at step 6904, the first reconnection ticket to the client machine 10.

In some embodiments, the intermediary machine 30 requests a first re-connection ticket from the ticket authority 6102 or requests a first re-connection ticket for each of the "hops" between the client machine 10 and the host service 4516. Upon receiving the request, the ticket authority 6102 generates the one or more first re-connection tickets. A re-connection ticket is, for example, a large random number, and can also generate a handle, which is, for example, a smaller random number. The ticket authority 6102 can then transmit, at step 6902, the first re-connection tickets and the handles to the intermediary node 632, while keeping a copy of the first re-connection tickets and a copy of the handles. The ticket authority 6102 continues to maintain the address of the first protocol service 4502 that was transmitted to it by the first remote machine 30 at step 6710. The intermediary node 632 then transmits, at step 6904, the client's first re-connection ticket to the client machine 10.

At step 6906, a second SID and key is then generated. In one embodiment, the first protocol service 4502 generates the second SID and key. The first protocol service 4502, at step 6908, then transmits the second SID and key, through the intermediary machine 30, to the client machine 10. In doing so, the first protocol service 4502 keeps a copy of the key and a session number associated therewith for identifying the session to be reconnected following a disruption of the connection 4504. In one embodiment, for example, the first protocol service 4502 maintains, for a particular session number, a table listing the secondary protocol connections 4508a-4508n associated with that session number.

At step 6906, one or more second re-connection tickets are then generated. In one embodiment, the first protocol service 4502 generates the second re-connection ticket for the client machine 10, which can be, for example, a large random number. In another embodiment, the first protocol service 4502 generates second re-connection tickets for one or more of the "hops" between the client machine 10 and the host service 4516. The first protocol service 4502, at step 6908, then transmits the client's second re-connection ticket, through the intermediary machine 30, to the client machine 10. In doing so, the first protocol service 4502 keeps a copy of the second re-connection ticket and a session number associated therewith for identifying the session to be re-connected following a disruption of the connection 4504. In one embodiment, for example, the first protocol service 4502 maintains, for a particular session number, a table listing the secondary protocol connections 4508a-4508n associated with that session number. In a like manner, the first protocol service 4502 may maintain the first and/or second re-connection tickets for each of the "hops" being validated to reconnect the client machine 10 to the host service 4516.

Accordingly, following re-establishment of the first protocol connection 4504 and validation of the second SID and key at the first protocol service 4502, or second re-connection ticket, as described below, the first protocol service 4502 can identify the secondary protocol connections 4508 to be encapsulated within the re-established first protocol connection 4504 for communication to the client machine 10.

In an embodiment not shown in FIGS. 67-69, a ticket authority 6102 can be used instead of the ACR Service 5002 to provide for reconnecting a client machine 10 to a host service 4516. In the method 6700, the ticket authority 6102 would generate and transmit reconnection tickets instead of SIDs and keys as with the ACR Service 5002. For example, at step 6710, a ticket authority 6102 would provide the client machine 10 with an initial connection ticket and an address for the intermediary machine 30. Also, in step 6714, the ticket authority 6102 would determine if the initial connection ticket is valid and at step 6816, would generate a first reconnection ticket. Additionally, at steps 6902, 6904, 6906 and 6908 the ticket authority would generate and transmit the first and second reconnection tickets in accordance with method 6700. As such, the ticket authority 6102 facilitated the reconnecting of the client machine 10 to the host service 4516.

Referring now to FIG. 70, one embodiment of a method 7000 for providing a client machine 10 with a persistent and reliable connection to one or more host services 4516 and for reconnecting the client machine 10 to the host services 4516 (for example at step 6510 of FIG. 65) is illustrated. In particular, at step 7002, the secondary protocol connection 4508 between the first protocol service 4502 and each of the one or more host services 4516 is maintained. Moreover, at step 7004, a queue of data packets most recently transmitted between the client agent 4506 of the client machine 10 and the first protocol service 4502, via the connection 4504 that was determined to have broken, for example, at step 6510 of FIG. 65, is maintained. In one embodiment, the data packets are queued and maintained both before and upon failure of the connection 4504. The queued data packets can be maintained, for example, in a buffer by the client agent 4506. Alternatively, the first protocol service 4502 can maintain in a buffer the queued data packets. In yet another embodiment, both the client agent 4506 and the first protocol service 4502 maintain the queued data packets in a buffer.

At step 7006, a new first protocol connection 4504 is established between the client agent 4506 of the client machine 10 and the first protocol service 4502 and linked to the maintained secondary protocol connection 4508 between the first protocol service 4502 and each of the one or more host services 4516, thereby reconnecting the client machine 10 to the host services 4516. After the client machine 10 is reconnected, the queued data packets maintained at step 7004 can be transmitted, at step 7008, via the newly established first protocol connection 4504. As such, the communication session between the host services 4516 and the client machine 10, through the first protocol service 4502, is persistent and proceeds without any loss of data. In one embodiment, the ACR Service 5002 authenticates the client machine 10 to the host service 4516 before reconnecting the client machine 10 to a host service 4516. In another embodiment, the first protocol service 4502 validates a reconnection ticket with the ticket authority 6102 before reconnecting the client machine 10 to a host service 4516.

In an embodiment with multiple "hops" traversing multiple first protocol services 4502, a portion or all of the data packets may be maintained at one or more of the first protocol services 4502 so that each "hop" may be re-established. After the client machine 10 is re-connected and re-linked to the first of the one or more first protocol services 4502 as described above, each of the remaining connections may be re-established and re-linked to the previously re-linked "hop" until the final "hop" to the host service 4516 is re-established. Either after the final "hop" is re-established and re-linked, or as each "hop" is re-established and re-linked, the queued data packets maintained can be transmitted.

Figure 72:
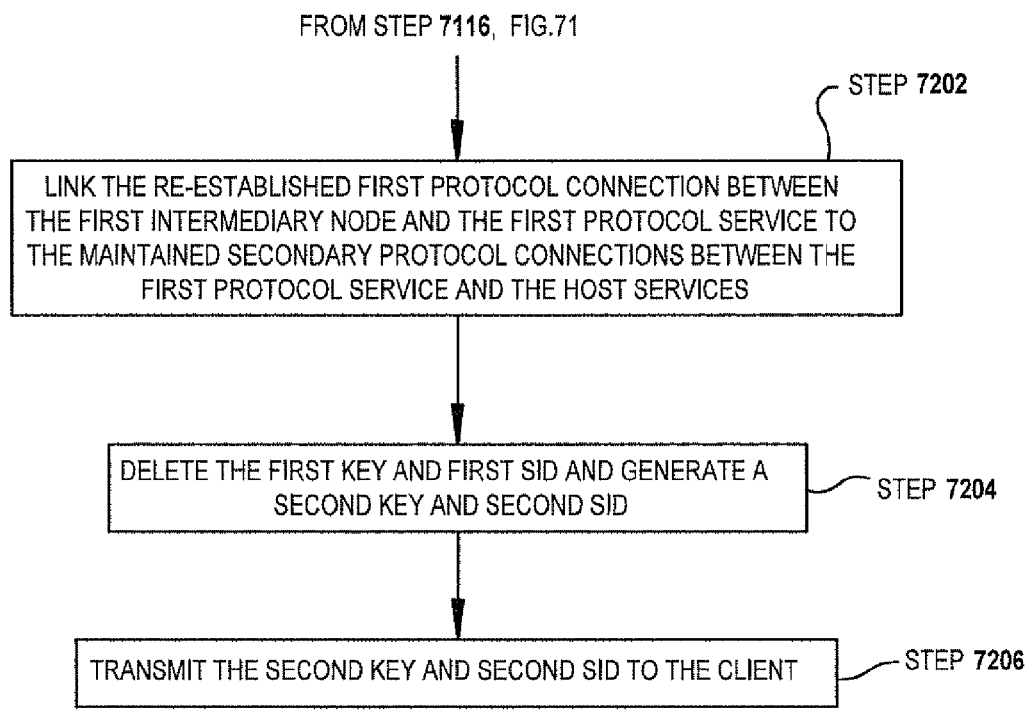

FIGS. 71-72, illustrate one embodiment of a method 7100 for reconnecting the client machine 10 to the one or more host services 4516 using an ACR Service 5002 as in the embodiment of the system 4500 depicted in FIG. 64.

At step 7102, any remaining connections between the client machine 10 and the first protocol service 4502 are broken. For example, where the connection 4504a has failed, but the connection 4504b has not, the connection 4504b is broken. Alternatively, where the connection 4504b has failed, but the connection 4504a has not, the connection 4504a is broken.

In one embodiment, using the actual address of the intermediary machine 30 provided to the client machine 10, the client agent 4506 of the client machine 10 then re-establishes, at step 7104, the first protocol connection 4504a between the client agent 4506 and the intermediary machine 30. Alternatively, in another embodiment, using the actual address of the third remote machine 30 provided to the client machine 10, the client agent 4506 of the client machine 10 then re-establishes, at step 7104, a first protocol connection between the client agent 4506 and the third remote machine 30. The third remote machine 30 then determines the intermediary machine 30 through which messages between the client machine 10 and the first protocol service 4502 will have to pass. In one embodiment, the third remote machine 30 chooses the intermediary machine 30 using a load balancing equation. The intermediary machine 30 chosen by the third remote machine 30 in reconnecting the client machine 10 to the one or more host services 4516 can be different from that chosen to initially connect the client machine 10 to the one or more host services 4516. In one embodiment, an initial connection ticket for the chosen intermediary machine 30 is generated when re-connecting the client machine 10 to a host service 4516.

Having chosen the intermediary machine 30, the third remote machine 30 re-establishes a first protocol connection to the intermediary machine 30. A first protocol connection 4504a is therefore re-established, through the third remote machine 30, between the client agent 4506 of the client machine 10 and the intermediary machine 30. In one embodiment, when the first protocol connection 4504 to the intermediary machine 30 is re-established, the first protocol connection 4504 is validated by validating a first or second re-connection ticket for this "hop" with the ticket authority 6102.

In one embodiment, where more than one level of intermediary machines 30 exist, the intermediary machine 30 through which the client agent 4506 is routed at each of the levels "a"-"n−1" thereafter determines, based on a load balancing equation for example, the intermediary machine 30 to which it will connect at the next level. Alternatively, in another embodiment, the third remote machine 30 determines, for more than one or all of the levels "a"-"n", the intermediary machines 30 through which the client agent 4506 will be routed. In other embodiments, either the intermediary machine 30 or one of the remote machines 30 (e.g., the third remote machine 30) generates first or second re-connection tickets for one or more of the connections or "hops" through which the client agent 4506 is routed.

Having re-established the first protocol connection 4504a between the client agent 4506 of the client machine 10 and the intermediary machine 30, for example the intermediate node 30' at level "n" (hereinafter referred to in method 7100 as the intermediary machine 30), the client agent 4506 then transmits, at step 7106, the first SID and key and the second SID and key to the intermediary machine 30. In one embodiment, the client agent 4506 transmits, at step 7106, the first re-connection ticket and the second re-connection ticket for the client machine 10 to the intermediary machine 30.

It is then determined, at step 7108, whether the first SID and key is valid. In one embodiment, the validity of the first SID and key is determined by using the ACR Service 5002. For example, the intermediary machine 30 transmits the first SID and key to the ACR Service 5002. In one embodiment, the ACR Service 5002 determines the validity of the first SID and key by comparing it to a copy of the first SID stored in memory 5018. If the ACR Service 5002 determines the first SID and key to be valid, the ACR Service 5002 re-authenticates the client machine 10 to the host service 4516 and transmits, at step 7110, the address of the first protocol service 4502 to the intermediary machine 30. Otherwise, if the ACR Service 5002 determines the first SID and key to be invalid, the client machine 10 is, at step 7112, refused reconnection to the first protocol service 4502 and, consequently, reconnection to the host services 4516.

In one embodiment, the validity of a first re-connection ticket is determined by using the ticket authority 6102. For example, the intermediary machine 30 transmits the first re-connection ticket to the ticket authority 6102. In one embodiment, the ticket authority 6102 determines the validity of the first re-connection ticket by comparing it to a previously kept copy of the first re-connection ticket. If the ticket authority 6102 determines the first re-connection ticket to be valid, the ticket authority 6102 transmits, at step 7110, the address of the first protocol service 4502 to the intermediary machine 30. Otherwise, if the ticket authority 6102 determines the first re-connection ticket to be invalid, the client machine 10 is, at step 7112, refused re-connection to the first protocol service 4502 and, consequently, re-connection to the host services 4516.

At step 7114, the first SID and key is deleted by, for example, the ACR Service 5002 and a replacement second SID and key is generated by the ACR Service 5002. In some such embodiments, the ACR Service 5002 transmits the second SID and key to the intermediary machine 30. In some embodiments, the ACR Service 5002 waits for the client machine 10 to acknowledge that it has received the second SID and key before it proceeds to delete the first SID and key.

In other embodiments, at step 7114, a first re-connection ticket is deleted by, for example, the ticket authority 6102 and a replacement first re-connection ticket is generated by, for example, the ticket authority 6102. Moreover, a replacement handle can be generated by, for example, the ticket authority 6102. In some such embodiments, the ticket authority 6102 transmits the replacement first re-connection ticket and the replacement handle to the intermediary machine 30. Moreover, in some such embodiments, the ticket authority 6102 keeps a copy of the replacement first re-connection ticket. In some embodiments, the ticket authority 6102 waits for the client machine 10 to acknowledge that it has received the replacement first re-connection ticket before it proceeds to delete the first re-connection ticket.

After the first SID and key (or, in some embodiments, the first re-connection ticket) is validated, the intermediary machine 30, using the address of the first protocol service 4502, re-establishes, at step 7116, the first protocol connection 4504b between the intermediary machine 30 and the first protocol service 4502. Having re-established the first protocol connection 4504b between the intermediary machine 30 and the first protocol service 4502, it is then determined whether the second SID and key, or re-connection ticket, is valid.

In one embodiment, the validity of the second SID and key is determined by using the first protocol service 4502. For example, the intermediary machine 30 transmits the second SID and key to the first protocol service 4502. In one embodiment, the first protocol service 4502 determines the validity of the second SID and key by comparing it to a previously kept copy of the second SID and encrypted authentication credentials. If the first protocol service 4502 determines the second SID and key to be valid, the re-established first protocol connection 4504b between the first intermediary machine 30 and the first protocol service 4502 is linked, at step 7202, to the maintained secondary protocol connection 4508 between the first protocol service 4502 and each of the one or more host services 4516. Otherwise, if the first protocol service 4502 determines the second SID and key to be invalid, the re-established first protocol connection 4504b is not linked to the one or more maintained secondary protocol connections 4508 and the client machine 10 is refused reconnection to the one or more host services 4516.

In embodiments using re-connection tickets, the validity of the second re-connection ticket is determined by using the first protocol service 4502. For example, the intermediary machine 30 transmits the second re-connection ticket to the first protocol service 4502. In one embodiment, the first protocol service 4502 determines the validity of the second re-connection ticket by comparing it to a previously kept copy of the second re-connection ticket. In another embodiment, the first protocol service 112 validates a first re-connection ticket for the connection between the first protocol service 4502 and the host service 4516, or in another embodiment, between the first protocol service 4502 and another first protocol service 4502 or an intermediary machine 30. In a similar manner, each "hop" thereafter between the first protocol service 4502 and the host service 4516 may be validated with one or more tickets, either initial or re-connection tickets, to validate the continued use of the "hop" on behalf of the client machine 10.

If the first protocol service 4502 determines the second re-connection ticket to be valid, the re-established first protocol connection 4504b between the first intermediary machine 30 and the first protocol service 4502 is linked to the maintained secondary protocol connection 4508 between the first protocol service 4502 and each of the one or more host services 4516. Otherwise, if the first protocol service 4502 determines the second re-connection ticket to be invalid, the re-established first protocol connection 4504b is not linked to the one or more maintained secondary protocol connections 4508 and the client machine 10 is refused re-connection to the one or more host services 4516. In the case of a multiple-hop connection between the first protocol service 4502 and the host service 4516, each "hop" may be validated for re-connection and be linked to the previous "hop" until the final "hop" to the host service 4516 is validated, or until one of the "hops" is refused re-connection.

At step 7204, the second SID and key is deleted by, for example, the first protocol service 4502 and a replacement second SID and key is generated by, for example, the first protocol service 4502 for transmission to the client machine 10. In such an embodiment, the first protocol service 4502 keeps a copy of the replacement second SID and key. In some embodiments, the first protocol service 4502 waits for the client machine 10 to acknowledge that it has received the replacement second SID and key before it proceeds to delete the second session id and key In some embodiments, the second re-connection ticket is deleted by, for example, the first protocol service 4502 and a replacement second re-connection ticket is generated by, for example, the first protocol service 4502 for transmission to the client machine 10. In such an embodiment, the first protocol service 4502 keeps a copy of the replacement second re-connection ticket. In some embodiments, the first protocol service 4502 waits for the client machine 10 to acknowledge that it has received the replacement second re-connection ticket before it proceeds to delete the second re-connection ticket. In the case of validating one or more of the "hops" for re-connecting a client 108, one or more replacement re-connection tickets, at step 948, may be generated and/or a copy saved by the ticket authority 136, intermediary nodes 632, any of the computing nodes, or one or more of the first protocol services 112.

At step 7206, the replacement second SID and key are transmitted to the client machine 10. For example, the ACR Service 5002 can transmit, through the intermediary machine 30, the replacement second SID and key to the client machine 10. Moreover, in one embodiment, the first protocol service 4502 transmits, through the intermediary machine 30, the replacement second SID and key to the client machine 10.

In some embodiments, the replacement first re-connection ticket and the replacement second re-connection ticket are transmitted to the client machine 10. For example, the ticket authority 6102 can transmit, through the intermediary machine 30, the replacement first re-connection ticket to the client machine 10. Moreover, in one embodiment, the first protocol service 4502 transmits, through the intermediary machine 30, the replacement second re-connection ticket to the client machine 10. In other embodiments, the replacement re-connection tickets for one or more "hops" may be transmitted to one or more of the intermediary machine 30, any of the computing nodes, or one or more of the first protocol services 4502.

Alternatively, in other embodiments, the methods described above provide for only a single re-connection ticket for the client machine 10 and/or a single re-connection for each of the "hops" between the client machine 10 and a host service 4516. As such, rather than using both first and second re-connection tickets, in these embodiments, only the aforementioned single re-connection ticket is used. In one such embodiment, the client agent 4506 of the client machine 10 is also provided with the address of the first protocol service 4502. To re-connect to the host services 4516, the client agent 4506 transmits the single re-connection ticket directly to the first protocol service 4502. The first protocol service 4502 then determines whether the single re-connection ticket is valid. In one embodiment, the first protocol service 4502 determines the validity of the single re-connection ticket by comparing it to a previously kept copy of the single re-connection ticket. If the first protocol service 4502 determines the single re-connection ticket to be valid, the re-established first protocol connection 4504 between the client machine 10 and the first protocol service 4502 is linked to the maintained secondary protocol connection 4508 between the first protocol service 4502 and each of the one or more host services 4516. Otherwise, if the first protocol service 4502 determines the single re-connection ticket to be invalid, the re-established first protocol connection 4504 is not linked to the one or more maintained secondary protocol connections 4508 and the client machine 10 is refused re-connection to the one or more host services 4516.

After the single re-connection ticket is validated, the single re-connection ticket is deleted by, for example, the first protocol service 4502 and a replacement single re-connection ticket is generated by, for example, the first protocol service 4502 for transmission to the client machine 10. In transmitting the replacement single re-connection ticket to the client machine 10, the first protocol service 4502 keeps a copy of the replacement single re-connection ticket. In some embodiments, the first protocol service 4502 waits for the client machine 10 to acknowledge that it has received the replacement single re-connection ticket before it proceeds to delete the single re-connection ticket.

In yet another embodiment, like the first and second re-connection tickets, the single re-connection ticket is configured for automatic deletion after a pre-determined period of time following a failure in the connection 4504, and/or following a clean termination of the connection 4504.

In an embodiment not shown in FIGS. 71-72, a ticket authority 6102 could also be used instead of the ACR Service 5002 for reconnecting a client machine 10 to a host service 4516. In the method 7100, the ticket authority 6102 would generate and transmit reconnection tickets instead of SIDs and keys as with the ACR Service 5002. For example, at step 7106, a ticket authority 6102 would determine in step 7108 if a first reconnect ticket received from the intermediary machine 30 in step 7106 is valid. At step 7114 the ticket authority 6102 would delete the first reconnection ticket and generates a second reconnection ticket with a handle. As such, the ticket authority 6102 facilitates re-establishing and re-authenticating the communication session of the client machine 10 to the host service 4516.

Performance of the network 150 can be monitored to increase performance perceived by the user of a client machine 10. The bandwidth and latency of the network 150 is a factor that affects the interaction experience of the end-user of the client machine 10. Other factors include the number of virtual machines executing on a remote machine 30 or the number of applications executing within a virtual machine on the remote machine 30, the amount of data being executed (or load) of the applications, the amount of processing (or load) being done by the client machine 10. During operation, each of these factors fluctuates. As data is transmitted through the network 150 the amount of available bandwidth of the network is reduced. The number of requests to a remote machine 30 increases and decrease thereby varying the load of the remote machine 30. One aspect of the invention features systems and method for determining whether and how these independent changes affect the interaction experience of the end-user.

Figure 73:
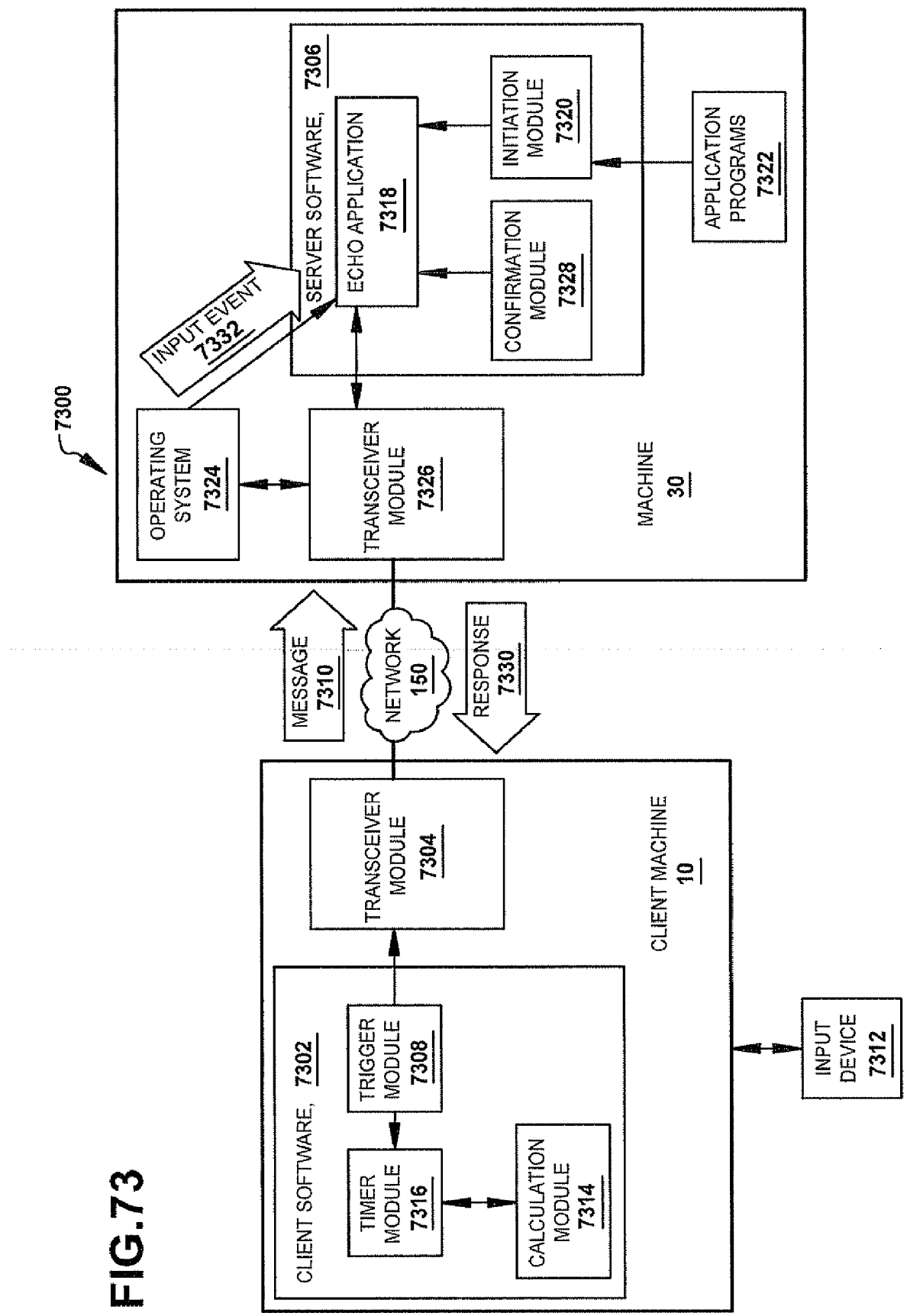
FIG. 73 is a conceptual block diagram of an embodiment of client software and server software.

FIG. 73 is a conceptual block diagram of an embodiment of a system that includes client software 7302 and remote machine software 7306 which monitor the status of the connection between the client machine 10 and the remote machine 30. It should be understood the various modules are not necessarily individual applications. Instead, the modules can be provided as a single software application or grouped as any combination of individual applications. Additionally, certain modules may be physical hardware.

The client software 7302 is in communication with a transceiver module 7304 of the client machine 10. The client software 7302 includes a trigger module 7308 in communication with the transceiver module 7304. The trigger module 7308 generates a message 7310 that is transmitted to the remote machine software 7306. The message 7310 is configured to generate a response from the remote machine software 7306 when the message is processed by the remote machine 30. For example, the message can include a user input event that results in a graphical response from the remote machine. In one embodiment, the trigger module 7308 generates the message 7310 on a periodic basis. The length of the period can be configurable by the user of the client machine 10 or another user such as a system administrator. In another embodiment, the trigger module generates the message 7310 in response to a specific end-user input using input device 7312.

The transceiver module 7304 is in communication with network 150 and is configured to transmit the message 7310 from the client machine 10 to the remote machine 30 via the network 150 and receive a response from the remote machine 30. If necessary, the transceiver module 7304 formats the message 7310 for transmission via the network 150 and formats the response for execution by the client software 7302.

Optionally, the client software 7302 can include a timer module 7316 and a calculation module 7314. The timer module 7316 is in communication with the trigger module 7308 and the calculation module 7314. The timer module 7316 is configured to measure the elapsed time from the generation of the message 7310 until the client machine 10 completes the instructions included in the response from the remote machine. In one embodiment, the timer module 7316 generates a start timestamp and a completion timestamp and determines the elapsed time therebetween. In another embodiment, the timer module acts as a stopwatch and generates the elapsed time without performing calculations. In one embodiment, the elapsed time is sent to another remote machine 30' for further processing, such a calculation of an expected elapsed time, trending analysis, and storage. In another embodiment, the elapsed time is forwarded to the calculation module from comparison against an expected value to determine if the environment 7300 is operating within specification. In still another embodiment, the elapsed time is forwarded to the remote machine 30 that the client is communicating with.

The remote machine software 7306 is in communication with a transceiver module 7326 of the remote machine 30. The remote machine software 7306 includes an echo application 7318, an optional initiation module 7320, and an optional confirmation module 7328. In one embodiment, the remote machine software 7306 is in communication with the application programs 7322 and the operating system 7324 that are executing on the remote machine 30. In another embodiment, the remote machine software 7306 is in communication with a computing environment and a hypervisor executing on the remote machine 30. In still other embodiments, the remote machine software 7306 executes in a virtual machine provided by a hypervisor and, in these embodiments, communicates with application programs provided by the computing environment and the virtualized operating system of the virtual machine. The echo application 7318 is in communication with the transceiver module 7326 and if present each of the initiation module 7320 and the confirmation module 7328. In one embodiment, the echo application 7318 is invisible to the end-user of the client machine 10. For example, the echo application 7318 can be a windowless (e.g., stealth application). The end-user does not interact directly with the echo application 7318.

The echo application generates a graphical response 7330 to the message 7310 from the client software 7302. The graphical response message 7330 includes instructions to manipulate, modify, update, alter, or change the display of the client machine 10 in a manner that is not perceivable by the end-user of the client machine 10, but is perceivable by client software 7302 of the client machine 10. In one embodiment, the echo application 7318 executes invisibly alongside the application programs 7322. In such an embodiment, the echo application 7318 is subject to the same environmental effects and changes as the application programs 7322.

The transceiver module 7326 is in communication with network 150 and is configured to transmit the response 7330 from the remote machine 30 to the client machine 10 via the network 150 and receive the message 7310 from the client machine 10. If necessary, the transceiver module 7304 formats the response 7330 for transmission via the network 150 and formats the message 7310 for execution by the remote machine 30. The transceiver module forwards the received message 7310 to the operating system 7324 of the remote machine 30.

The operating system 7324 is configured to read and process the message 7310 to generate an input event 7332 for the echo application 7318. The input event 7332 can be a known WINDOWS input event or a custom input event. Conceptually, the input event 7332 is configured to cause the echo application 7318 generate the graphic response 7330.

The initiation module 7320 is in communication with the application programs 7322 and the operating system 7324. In one embodiment, the initiation module 7320 monitors the application programs 7322 and automatically initiates the echo application 7318 when a specific one of the application of the application programs 7322 begins executing on the remote machine 30. In another embodiment, the initiation module 7320 initiates the echo application when the remote machine 30 receives the message 7310. In another embodiment, the echo application 7318 is initiated when a client/remote machine session begins and remains quiescent until the message 7310 is received. It should be understood that the initiation module can initiate one or more instances of the echo application 7318. For example, the initiation module 7320 may start a respective echo application 7318 for each client machine 10 that connects to the remote machine 30 or that connects to a virtual machine provided by the remote machine 30.

The confirmation module 7328 is in communication with the echo application 7318. In one embodiment, a function performed by the confirmation module 7328 includes monitoring the echo application 7318 to ensure an instance of the echo application 7318 is executing for each connection between a client machine 10 and a remote machine 30 that is of interest. The confirmation module 7328 may report whether the echo application 7318 is running and functioning properly to another remote machine 30', such as a management server described above, or the confirmation module 7328 may report whether the echo application 7318 is running and functioning properly to the operating system 7324 of the remote machine 30 or to a virtual machine provided by a hypervisor.

Figure 74:
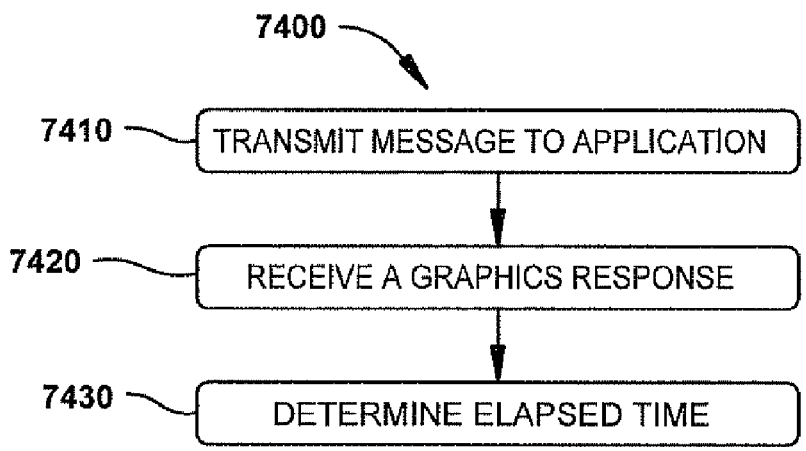
FIG. 74 is a flow chart of an embodiment of a method for monitoring network performance.

With reference to FIG. 74, an embodiment of a method 7400 of operation and interaction between the client machine 10 and remote machine 30 is described. As a general overview, the method can be conceptualized as a generating a measurement for use in calculating an end-user experience metric in the remote machine based computing environment 7300. The operation of the client software 7302 and the remote machine software 7306 includes transmitting the message 7310 to the application 7318 (step 77410), receiving a graphic response (step 77420) from the application 7318, and determining an elapsed time (step 77430) that represents the end-user's interaction experience.

In one embodiment, the trigger module 7308 on the client software 7302 transmits the message 7310 via the transceiver 7304 on a periodic basis. In another embodiment, the trigger module 7308 generates the message 7310 in response to end-user input. The message 7310 can include instructions to generate a WINDOWS message that is forwarded to the application 7318. Alternatively, the message 7310 can be the WINDOWS message and represent an input event to the application 7318. In one embodiment, the message 7310 is transferred over a separate virtual channel within the ICA protocol stream, and a WINDOWS message generated by the remote machine software 7306 when the message 7310 is received.

When the remote machine software 7306 receives the message 7310, the echo application 7318 processes the instructions of the message 7310 and generates the graphic response 7330. In one embodiment, the graphic response 7330 generates a change on the display of the client that is undetectable by the end-user. In various embodiments, the graphic response 7330 can include instructions to change a small number of pixels on the client display, instructions to change single pixel at the origin (i.e., top left corner) of the client display, instructions to cycle a pixel of the display through a range of values, or instructions to cycle a change through a range of pixel locations of the display.

When the client software 7302 processes the graphic response 7330, the elapsed time between the transmission of the transmission of the message 7310 and the completion of the processing of the graphic response 7330 is determined. In one embodiment, the client software 7302 determines the elapsed time and forwards the elapsed time to a management remote machine 30' for storage and trending analysis. In another embodiment, a start timestamp and an end timestamp are forwarded from the timer module 7316 the management remote machine 30'. In such an embodiment the management remote machine 30' determines the elapsed time. It should be understood that the elapsed time measurement is equivalent to the interaction experience as used herein.

The management remote machine 30' can store multiple interaction experience measurements. The stored measurements can be used to isolate which portion of a client machine 10 connection is not performing as expected. For example, network timing measurement for the same time period can be compared to the interaction experience to isolate application, virtual machine, and execution machine load trends. Also, the stored interaction experience measurements can be analyzed using known methods to determine an expected interaction experience value. The expected value can be compared to the measured value, either by the calculation module 7314 of the client software 7302 or the management remote machine 30'.

Figure 75:
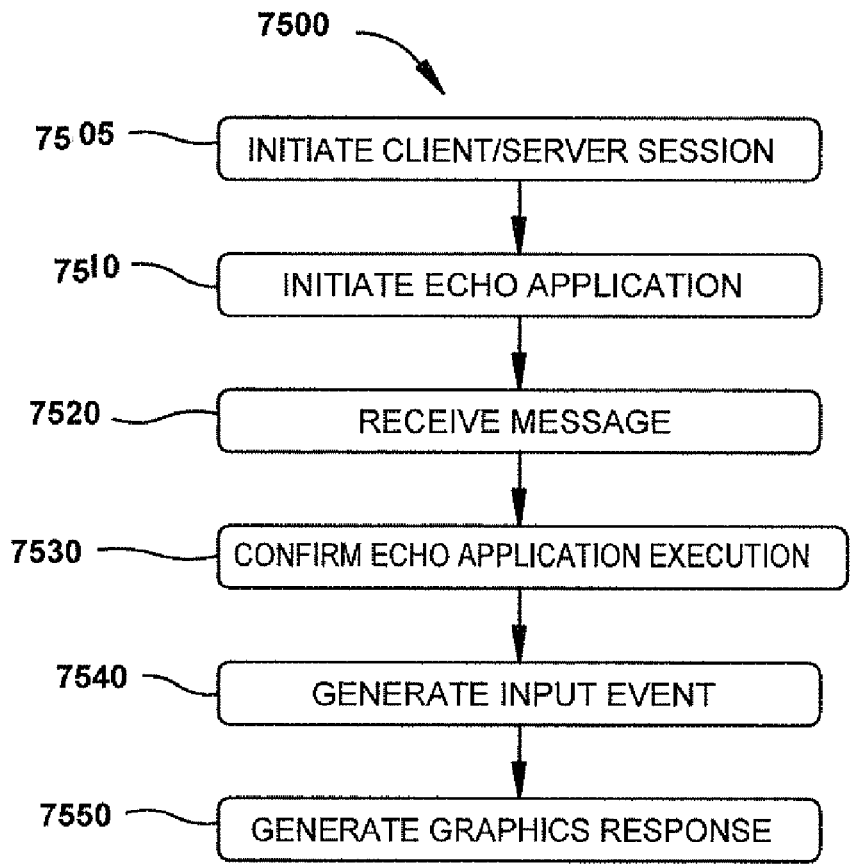
FIG. 75 is a flow chart of an embodiment of a method of operation of the server software.

With reference to FIG. 75, an embodiment of the operational method 7500 of the remote machine 30 and remote machine software 7306 is described. After the client machine 10 initiates (step 77505) established a session with a remote machine 30, the remote machine software initiates (step 77510) the echo application 7318. The remote machine 30 receives (step 77520) the message 7310 from the client machine 10. Once the message 7310 is received, the confirmation module 7328 confirms (step 77530) that the echo application 7318 is executing. From the message 7310, the operating system 7324, or the hypervisor, generates (step 77540) the input event 7332 that is processed by the echo application to generate (step 77550) the graphic response 7330.

The remote machine software 7306 initiation module 7320 initiates (step 77510) the echo application 7318 when the client machine 10 starts the session. In one embodiment, a single echo application 7318 is initiated. In other embodiments, an echo application 7318 is started for each of the applications programs 7322 executing on the remote machine 30. In such embodiments, the interaction experience can be measured on an application by application basis. In other embodiments, an echo application 7318 is started for each of the virtual machines executing on the remote machine 30. In these embodiments, the interaction experience can be measured on a virtual machine basis. In another embodiment, a single echo application 7318 is started for an execution machine executing multiple program application programs 7322. For example, a remote machine may communicate with multiple client machines 10. Each of the client machines 10 connects to the remote machine 30 through a different network path and thus has a different interaction experience. The echo application 7318 is not visible to the user. That is, the user does not interact directly with the echo application 7318 and the echo application 7318 is not show on the display of the client. In one embodiment, the echo application 7318 is a windowless application.

The transceiver module 7326 receives (step 77520) the message 7310 from the client machine 10. In one embodiment, the transceiver module 7326 includes a network interface card that communicates with the network 150. The transceiver module can format the received message 7310 so that the message 7310 is readable by the operating system 7324.

Prior to generating the graphic response 7330, the confirmation module 7328 confirms (step 77530) that the echo application 7318 is executing in user space assigned by the operating system. In some embodiments, the user space is assigned by the native operating system, that is, the operating system of the execution machine. In other embodiments, the user space is assigned by a virtualized operating system, that is, an operating system of a virtual machine provided by a hypervisor. In one embodiment, the confirmation module 7328 communicates an indication that the echo application 7318 is executing to the operating system. In one embodiment, the remote machine 30 creates a log even on the remote machine 30 to indicate that echo application 7318 was not running when the message 7310 was received or when the session was initiated.

Once confirmation of the execution of the echo application 7318 is received, the operating system processes the message 7310 thereby generating (step 77540) the input event 7332. In one embodiment, the input event is a WINDOWS message that is forwarded to the echo application 7318 to model a normal input event WINDOWS message. The input event is designed to cause the echo application 7318 to generate a graphic response 7330. Exemplary input events can include, but are not limited to, mouse movements, keyboard strokes, window generation, window destruction, or any other event that generates a graphic response from the echo application 7318. In another embodiment, the input event is a custom "user-defined" application specific WINDOWS message.

The echo application 7318 processes the input event 7332 and generates (step 77550) the graphic response 7330, which is in turn forwarded to the client machine 10. In various embodiments, the graphic response 7330 is generated once the echo application 7318 has performed a set of tasks such as: calculations, memory usage, disk access, and network resource access. The echo application 7318 can be configured by an administrator to perform specified tasks. In another embodiment, the echo application 7318 can perform execution tasks that mirror an application program 158 executing on the remote machine 30 and generate the graphic response 7330. I In one embodiment, the graphic response 7330 includes instructions that cause a change on the display of the client machine 10 that is not detectable by the end-user. For example, the graphic response 7330 includes instructions to change a single pixel at the origin of the display. More complex graphic responses can be used to differentiate from graphic generated by the application programs 7322 or to detect any response indicators lost from graphic protocol optimizations. For example, the pixel value can cycle through an expected range of values. In another embodiment, the graphic response causes a pixel location to cycle through an expected range of pixel locations. Another example of a graphic response is a BitBlt with an unexpected Raster-Operation, either to the display or an off-screen surface (e.g., an off-screen buffer).

In addition to measuring the overall end-user interaction experience, in various embodiments, sub-metrics that comprise the overall end-user interaction experience metric can be measured and recorded. Generally, these sub-metrics include the time required by the client machine 10 to generate and send the trigger message 7310, the network 150 latency, the time required by the remote machine 30 to process the message 7310 and generate and transmit the graphic response 7330, and the time required by the client machine 10 to process the graphic response 7330.

Figure 76:
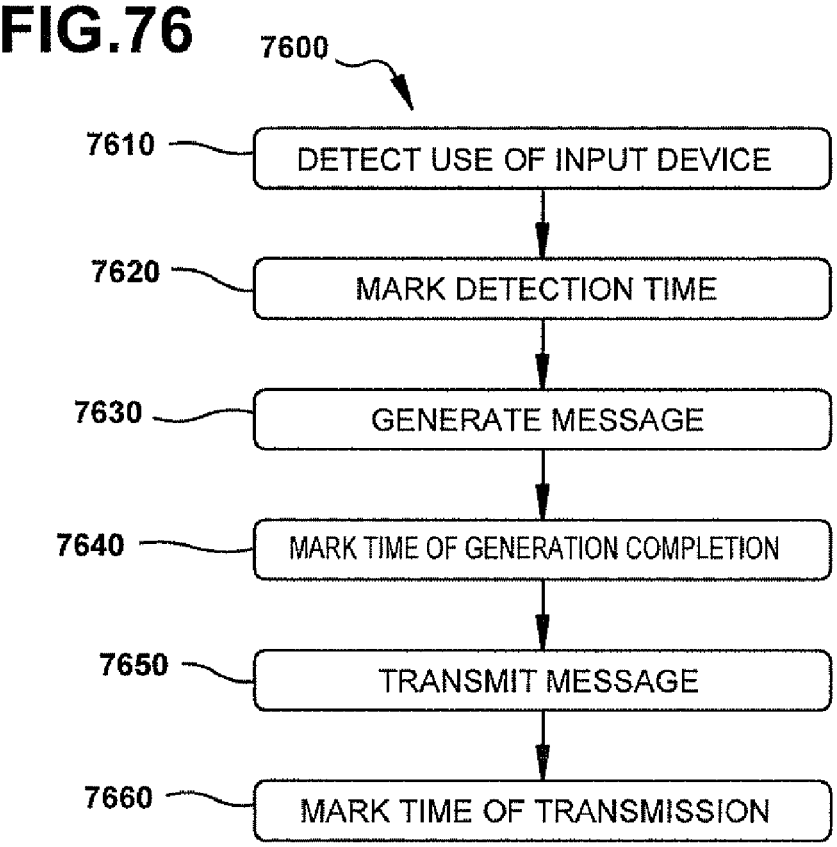
FIG. 76 is a flow chart of an embodiment of a method of generating sub-metrics by the client.
Figure 77:
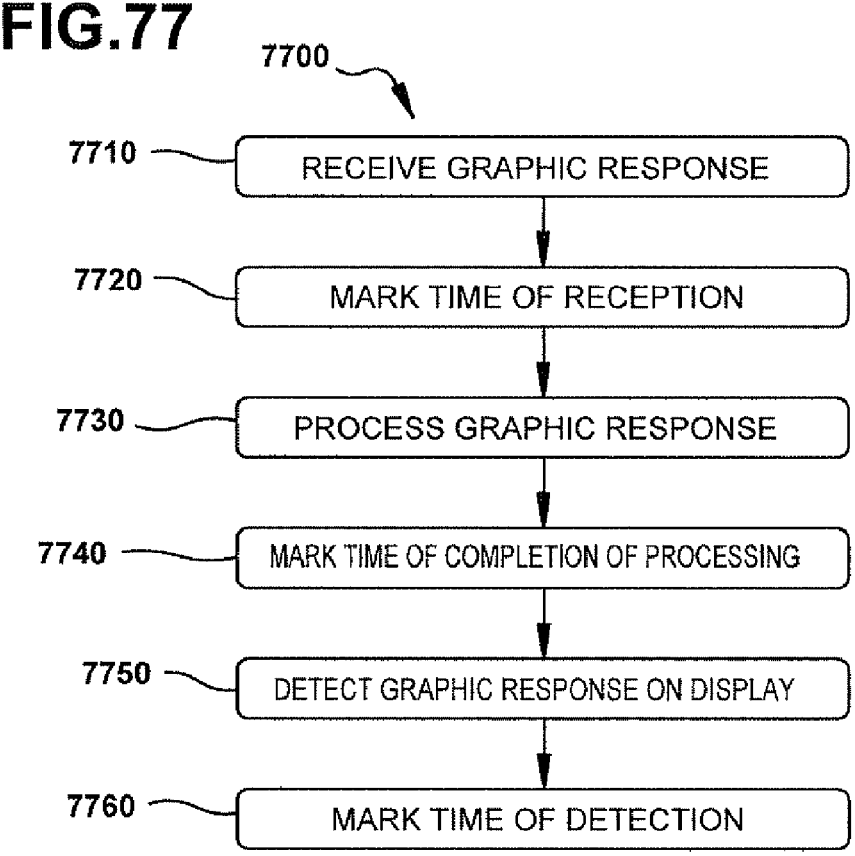
FIG. 77 is a flow chart of an embodiment of a method of generating sub-metrics by the client.

With reference to FIG. 76 and FIG. 77, embodiments of a method of generating client machine 10 sub-metrics are described. From the perspective of the client machine 10, there are two types of sub-metrics that are generated a) those related to generating and transmitting the trigger message 7310 as shown in FIG. 76 and b) those related to detecting and processing the graphic response 7330 as shown in FIG. 77.

With reference to FIG. 76, one embodiment of a method 7600 for capturing sub-metrics related to generating the trigger message 7310 is described. Assuming that the trigger message 7310 is generated in response to use of the input device 7312, the trigger module 7304 detects (step 77610) use of the input event and marks (step 77620) the time of detection. The trigger module generates (step 77630) the message 7310 and marks (step 77640) the time the message generating is completed. The trigger module 7308 forwards the message 7310 to the transceiver 304, which then transmits (step 77650) the message 7310 to the remote machine 30. The trigger module 7308 or the transceiver module 7304 marks (step 77660) the time the message 7310 is transmitted to the remote machine 30.

With reference to FIG. 77, one embodiment of a method 7700 for capturing sub-metrics related to processing the response 7330 is described. The transceiver 304 receives (step 7710) the graphic response 7330 from the remote machine 30 and marks (step 7720) the time of receipt. The client software 7302 process (step 7730) the graphic response 7330. Upon completion of processing the graphic response 7330, the client software 7302 marks (step 7740) the time of completion. Once complete, the client software 7302 displays the graphic response and detects (step 7750) that the graphic response 7330 is displayed. The client software 7302 also marks (step 7760) the time of detection on the display.

The above-described actions of marking certain times that indicate the occurrence of certain events can occur in different ways. In one embodiment, multiple timers are started and stopped by the timer module 7316 upon the occurrence of each of the above-described events. In another embodiment, a single timer is used and the split times (i.e., the time elapsed between the occurrence of the events) are saved in a table that is accessible by the calculation module 7314. In still another embodiment, a time stamp is added to the message 7310 and the graphic response 7330 for each of the marking actions. In such an embodiment, prior to transmitting the message 7310 the time stamps are reported to the calculation module 7314, where the elapsed time between each time stamp is determined. These elapsed times represent the above-described different sub-metrics. It should be understood that various combinations of the elapsed times can also be used. For example, the time stamp related to the detection of the use of the input device and the time stamp that indicates the transmission of the message 7310 can be processed to determine the total elapsed used by the client machine 10 to generate and send the message 7310 to the remote machine 30. The principles described above with respect to the generation of the message 7310 are equally applicable to the processing of the graphic response 7330 by the client machine 10.

Figure 78:
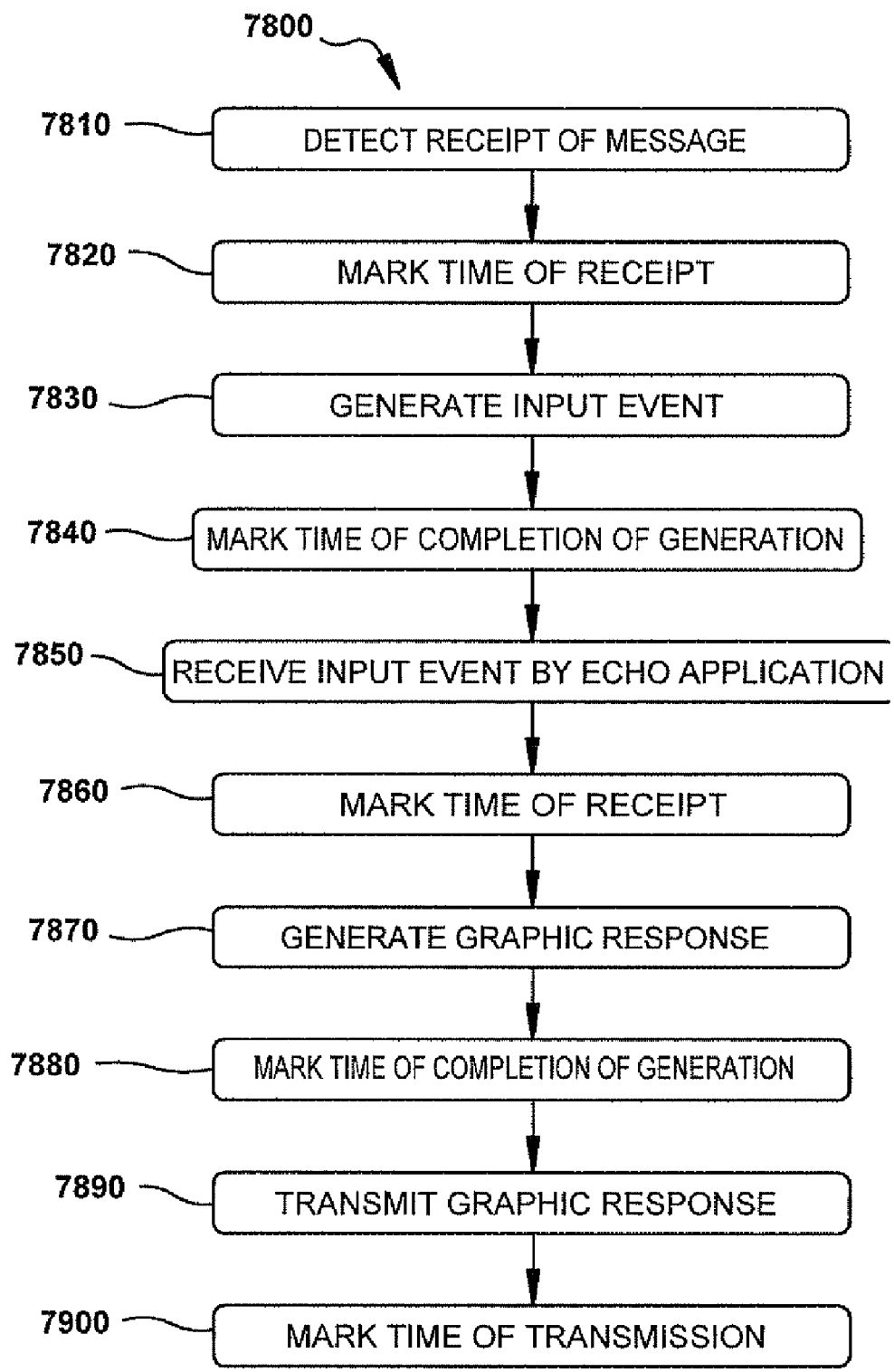
FIG. 78 is a flow chart of an embodiment of a method of generating sub-metrics by the server.

With reference to FIG. 78, one embodiment of a method 7800 for capturing sub-metrics related to generating the graphic response 7330 is described. The transceiver 320 receives (step 7810) the message 7310 from the client machine 10 and marks (step 7820) the time of receipt. The operating system 7324 then generates (step 7830) the input event 7332. The remote machine software 7306 marks (step 7840) the time of completion of the generation of the input event 7332. The echo application 7318 receives (step 7850) the input event 7332 and the remote machine software 7306 marks (step 7860) the time of receipt of the input event 7332. Once the echo application 7318 receives the input event, the echo application 7318 generates (step 7870) the graphic response 7330. The remote machine software 7306 marks (step 7880) the time the echo application 7318 completes generating the graphic response 7330. In one embodiment, the time required to generate the graphic response 7330 by the echo application 7318 includes the echo application performing additional executions tasks that similar to those performed by the application programs 7322. The transceiver module 7326 receives the graphic response 7330 and transmits (step 7890) the graphic response 7330 to the client machine 10. The remote machine software also marks (steps 900) the time the graphic response 7330 is sent.

Similar to the marking of events described with reference to the client machine 10, the same methods can be employed with regard to the remote machine 30. In one embodiment, multiple timers are started and stopped by the timer module 7316 upon the occurrence of each of the above-described events. In another embodiment, a single timer is used and the split times (i.e., the time elapsed between the occurrence of the events) are saved in a table that is accessible by the calculation module 7314. In still another embodiment, a time stamp is added to the graphic response 7330 for each of the marking actions. In such an embodiment, upon receipt of the graphic response 7330 the time stamps are reported to the calculation module 7314, where the elapsed time between each time stamp is determined. These elapsed times represent the above-described different sub-metrics. It should be understood that various combinations of the elapsed times can also be used. For example, the time stamp related to detecting receipt of the message 7310 and the time stamp that indicates the transmission of the graphic response 7330 can be processed to determine the total elapsed used by the remote machine 30 to generate and send the graphic response to the client machine 10.

Figure 79:
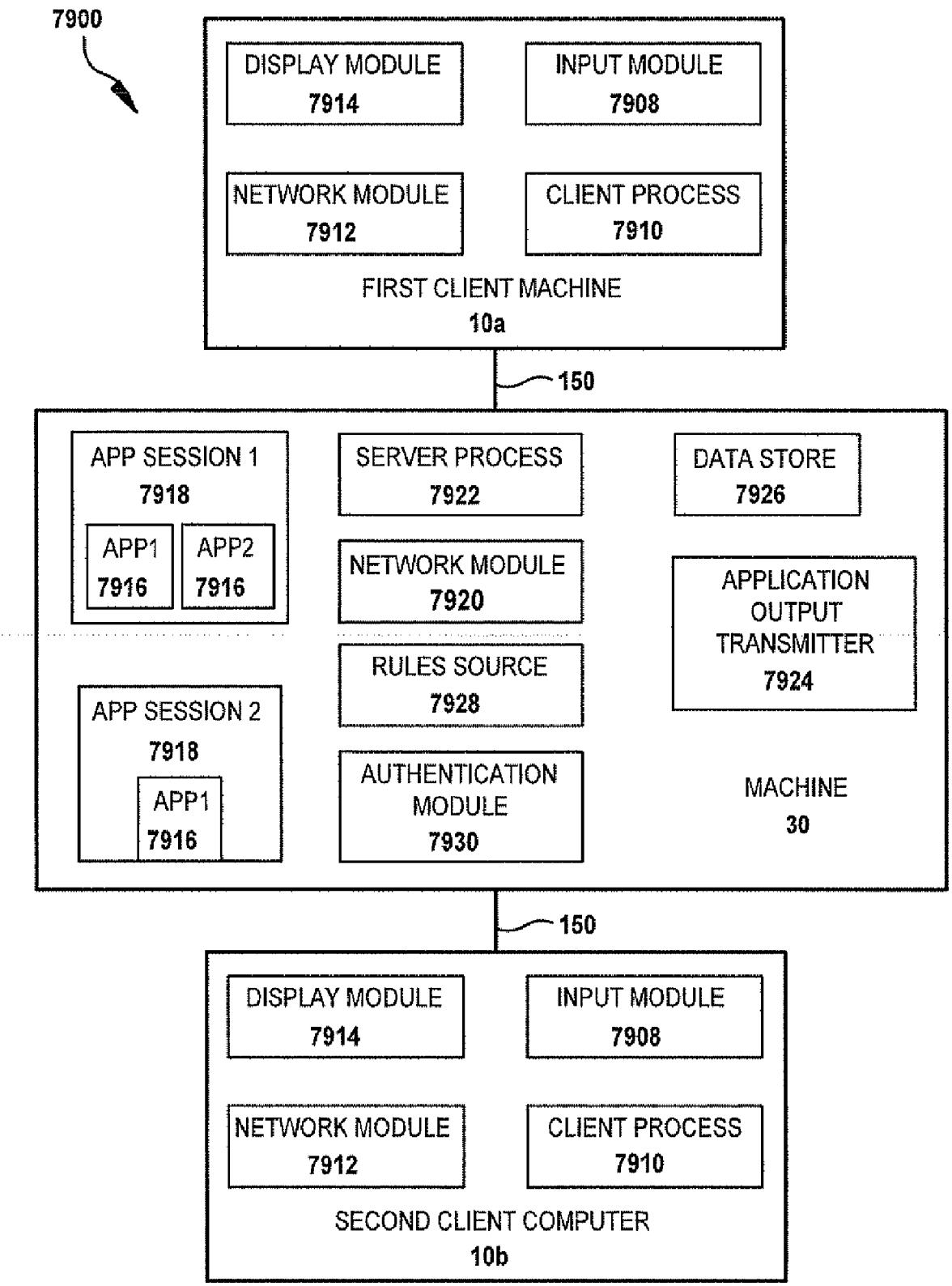
FIG. 79 is a schematic diagram depicting a networked client-server computing system.

Referring now to FIG. 79, another system for increasing the convenience and usability of the systems described above is shown. A client-server computer system 7900 includes a first client machine 10, a second client machine 10, and a remote machine 30. The depiction of two client machines is for illustrative purposes only. The client-server computer system can include any number of client machines.

In one embodiment, the first client machine 10 includes an input module 7908, a client process 7910, a network module 7912, and a display module 7914. The input module 7908 provides an interface for a user of the first client machine 10 to interact with the first client machine 10, for example to request the remote execution of an application 7916 in an application session 7918 from the remote machine 30.

An application session 7918 is a process, operating on the remote machine 30 that provides access to or supports the execution of one or more resources, such as application 7916. An application 7916 can be a software program, for example, or any organized set of software code capable of being executed by a computer, or hardwired into circuitry in the form of an Application Specific Integrated Circuit (ASIC), read only memory (ROM) microchip, and the like. Example applications include, but are not limited to Microsoft Word (available from Microsoft Corporation Redmond, Wash.), Internet Explorer (Microsoft), Acrobat (available from Adobe Systems, Inc. San Jose, Calif.), etc. In one embodiment, an application session 7918 includes a desktop application 7916 from which the execution of other application 7916 can be initiated. Application sessions 7918 can be nested within other application sessions 7918. In another embodiment, the application session 7918 includes an instance of the execution of a single application 7916.

In one embodiment, the input module 7908 is, for example, a graphical user interface that provides one or more icons or menu selections for a user to select. Each icon or menu selection represents a specific application 7916 available for remote execution. Selecting an icon or menu selection initiates the transmittal of a log-on request to the remote machine 30 for access to that application 7916. In another embodiment, an icon or menu selection does not represent any specific application 7916, but instead represents a general remote machine 30 log-on procedure. In another embodiment, the input module 7908 is non-graphical user interface. In this embodiment, the user can enter a command to send a log-on request to remote machine 30. Entering a command can include typing a predefined set of characters or depressing a specified key sequence on an input device (e.g., a keyboard or keypad). The log-on request at least includes user-provided authentication information. The input module 7908 accepts the input of the user-provided authentication information, which can include any type of authentication information, including without limitation any of user name-password/PIN combinations, voice samples, one-time passcodes, biometric data, digital certificates, smart card data, etc. In some embodiments, the input module 7908 is in communication with additional hardware peripherals (not shown) to facilitate acceptance of user authentication information. In other embodiments, the input module 7908 can accept authentication information outside of the log-on process.

The input module 7908 accepts authentication information and provides it to the client process 7910. The client process 7910 then manages the client side functionality of the remotely executing application session. The client process 7910 forwards user input including the authentication information and requests for termination or disconnection of application sessions 7918 to the remote machine 30. The client process 7910 also handles data incoming from the remote machine 30, for example, by forwarding the graphical output of an application session 7918 to the display module 7914.

The network module 7912 provides for communication between the first client machine 10 and the remote machine 30. The network module sends user input, such as authentication information and requests for access to, disconnection from, or termination of application sessions 7918 executing on the remote machine 30. The network module also receives output from the application sessions 7918 and forwards the output to the client process 7910. In one embodiment, the network module 7912 encapsulates user input into, and reconstitutes application session output from, a predetermined protocol for transmission to the remote machine 30. In another embodiment, the network module encrypts outgoing transmissions and decrypts incoming transmissions.

The display module 7914 displays the output of an application 7916 from a remotely-executing application session 7918. The network module 7920 provides communication functionality for the remote machine 30. For example, the network module 7920 receives communications from first and second client machines 10 over one or more data networks or links 150. The network module 7920 also transmits resource output data to the first and second client machines 10. In one embodiment, the network module 7920 encrypts outgoing communications and decrypts incoming communications. Likewise, in one embodiment, the network module 7920 encapsulates outgoing communications in a protocol for transmission and retrieves incoming data from transmissions received according to a protocol. Protocols can include, for example and without limitation, HTTP, Independent Computing Architecture (ICA) protocol (used by Citrix, Systems, Inc. Ft. Lauderdale, Fla.), Remote Desktop Protocol (RDP) (Microsoft Corporation), or Common Gateway Protocol (CGP) (Citrix). The network module 7920 of the remote machine 30 communicates with the network module 7912 of the first client machine 10 over a network 150. The network 150 can be implemented with any of a variety of suitable technologies. Incoming communications, once decrypted or retrieved from a protocol (if necessary), are forwarded to an application session 7918 or to the server process 7922, as appropriate.

The server process 7922 manages the execution, suspension to disk, resumption of execution, suspension without writing state to disk, and termination of application sessions 7918 and the connections and disconnections of those application sessions 7918 to the first and second client machines 10. The server process 7922 can initiate new application sessions 7918, disconnect a client machine 10 from an application session 7918, detect a client machine 10 disconnection from an application session 7918, locate an application session 7918 from which a user has disconnected, locate an application to which a user of the first client machine 10 is connected to from the second client machine 10, and connect a user to a disconnected application session 7918. In some embodiments, the application sessions 7918 are provided so as to be configured with the user's personal preferences and access allowances.

The server process 7922 may execute in the hypervisor, a virtual machine provided by the hypervisor, a guest operating system executing in a virtual machine, an operating system provided by the physical machine or in combinations of those entities.

The application output transmitter 7924 transmits output from an application session 7918 to a client machine 10 through the network module 7920. The application output transmitter 7924 intercepts the output of an application session 7918 and determines which client machine 10 is connected to the application session 7918. In other embodiments, the identity of the client machine 10 that is connected to the application session 7918 is stored at the time the connection is made. If the application session 7918 is connected to a client station, the application output transmitter 7924 transmits the application output data to the connected client machine 10 via the network module 7920. In one embodiment, if the application session is not connected to a client machine 10, the application output transmitter 7924 discards the application output data and waits to receive future application output data. In another embodiment, if the application session 7918 is not connected to a client machine 10, the application output transmitter 7924 disregards all further application output data until the application output transmitter 7924 receives notification that the application session 7918 has connected to a client machine 10. In another embodiment, the application output transmitter 7924 stores the data until the application output transmitter 7924 receives notification that the application session 7918 has connected to a client machine 10. In another embodiment, the application output transmitter 7924 attempts to send application output data to a client machine 10 until the server process 7922 notifies the application output transmitter 7924 that the client machine 10 is disconnected from the remote machine 30. In one embodiment, the application output transmitter 7924 determines which client machine 10, if any, the application session 7918 is connected to by consulting the data store 7926.

The data store 7926 includes information related to application sessions initiated by users. The data store can be stored in volatile or non-volatile memory or, for example, distributed through multiple servers. In some embodiments, the functionality of a data store 7926 is provided by a session server 8620 as described in connection with FIG. 86.

In one embodiment, remote machine 30 also includes a rules source 7928. The rules source 7928 stores rules governing the reaction of the server process 7922 to a user transmitting authentication information to the remote machine 30. In one embodiment, the rules stored in the rules source 7928 are specified at least in part by the system administrator. In another embodiment, a user specifies at least some of the rules stored in the rules source 7928. The user-specified rule(s) are stored as preferences. The rules source 7928 can be stored in volatile or non-volatile memory or, for example, distributed through multiple servers.

One rule stored in the rule source 7928, for example, might require or forbid automatic connection to disconnected application sessions 7918. Another rule might require or forbid automatic connection to active application sessions 7918 currently connected to a different client machine 10. Yet another rule might make connection and/or connection contingent on the client machine 10 that requests access being within a secure network. A further rule might only allow connection to application sessions 7918 after receiving user approval.

Another rule might only allow connection for a predetermined time after disconnection. Still another rule only allows connection to application sessions 7918 that include specific application 7916.

The authentication module 7930 is responsible for authenticating a user that attempts to log on to the remote machine 30. The authentication module 7930 receives user-provided authentication information transmitted from the first client machine 10. The authentication module 7930 then authenticates the user based on the user-provided authentication information. In response to a successful authentication, the authentication module 7930 transmits the results of the authentication process (e.g., allow or deny access, the user's system ID, client computer ID, user access permissions, etc.) to the server process 7922.

In one embodiment, the above-described modules and processes of the remote machine 30 (i.e., the network module 7920, the server process 7922, the application output transmitter 7924, and the authentication module 7930) and a client machine 10 (i.e. the input module 7908, the client process 7910, the network module 7912 and the display module 7914) are all implemented in software executable on one of several computer operating systems, including without limitation the Windows family of operating systems (Microsoft Corporation), the MacOS family of operating systems (Apple Computer, Inc., Cupertino, Calif.), and Unix based operating systems (e.g., Solaris, Sun Microsystems, Sunnyvale, Calif.). In other embodiments, one or more modules or processes are implemented in hardware as application specific integrated circuits (ASICs), Read Only Memory (ROM) devices, or other digital hardware circuitry.

Unintentional termination of application sessions 7918 resulting from imperfect network connections and users' failure to terminate their application sessions 7918 themselves can lead to user difficulties. One embodiment of the invention limits these difficulties by differentiating disconnection (which is treated as if the user is not done working with an application session 7918) from termination (which is assumed to be an intentional end to the application session) and by correlating application sessions 7918 with users as opposed to client machines. When a user is finished using an application 7916 operating in an application session 7918, the user can terminate an application session 7918. Termination generally involves the affirmative input of the user indicating that the server should no longer maintain the application session 7918. Such affirmative user input can include selecting an "Exit" option from a menu, clicking on an icon, etc. In response to the server process 7922 receiving a termination request, the execution of the application session 7918 and any application 7916 within that application session 7918 is halted. In one embodiment, data related to the application session 7918 is also removed from the data store 7926.

Disconnection, either intentional or unintentional, on the other hand, does not result in termination of application sessions 7918. Since the application or applications operating in an application session 7918 are executing on the remote machine 30, a connection to the first client machine 10 is not usually necessary to continue execution of the application 7916, and in one embodiment the application 7916 can continue to execute while waiting for the user to connect. In an alternative embodiment, upon disconnection of a user, the server process 7922 stalls the execution of the application 7916 operating in the application session 7918. That is, the server process 7922 halts further execution of the application 7916, and the server process 7922 stores the operational state of the application 7916 and any data the application 7916 is processing. In a further embodiment, the server process 7922 can selectively stall execution of specific application 7916 after a user disconnects. For example, in one embodiment, the server continues execution of an application 7916 for a fixed time period, and if a user fails to connect within that time period, the server process 7922 stalls the application 7916. In another embodiment, the server stalls specified application sessions 7918 that cannot continue executing without user input. In each of the above-described embodiments, if the user of the first client machine 10 disconnects from the remote machine 30 and then connects to the remote machine 30 while operating the first client machine 10, the second client machine 10, or a third client computer, the server process 7922 can connect the client computer operated by the user to one or more previously initiated, non-terminated application session(s) 118 associated with the user, and reinitiate execution of any stalled application 7916.

In one embodiment, the server process 7922 detects a disconnection. A user can intentionally and manually instruct the server to disconnect an application session 7918 from the client machine 10 that the user is communicating from. For example, in one embodiment, application sessions 7918 provide a menu option for disconnection (as distinguished from termination above) that a user can select. The server process 7922 can also detect an unintentional disconnection. For example, in one embodiment, the network module 7920 of the remote machine 30 informs the server process 7922 when a predetermined number of data packets transmitted by the network module 7920 to a client machine 10 have not been acknowledged by the client machine 10. In another embodiment, the client machine 10 periodically transmits a signal to the remote machine 30 to confirm that a connection is still intact. If the server process 7922 detects that a predetermined number of expected confirmation signals from a client machine 10 have not arrived, the server process 7922 determines that the client machine 10 has disconnected. If the server process 7922 detects that a user has disconnected from an application session 7918, either intentionally, or unintentionally, the entry in the data store 7926 related to the disconnected application session 7918 is modified to reflect the disconnection.

Figure 80:
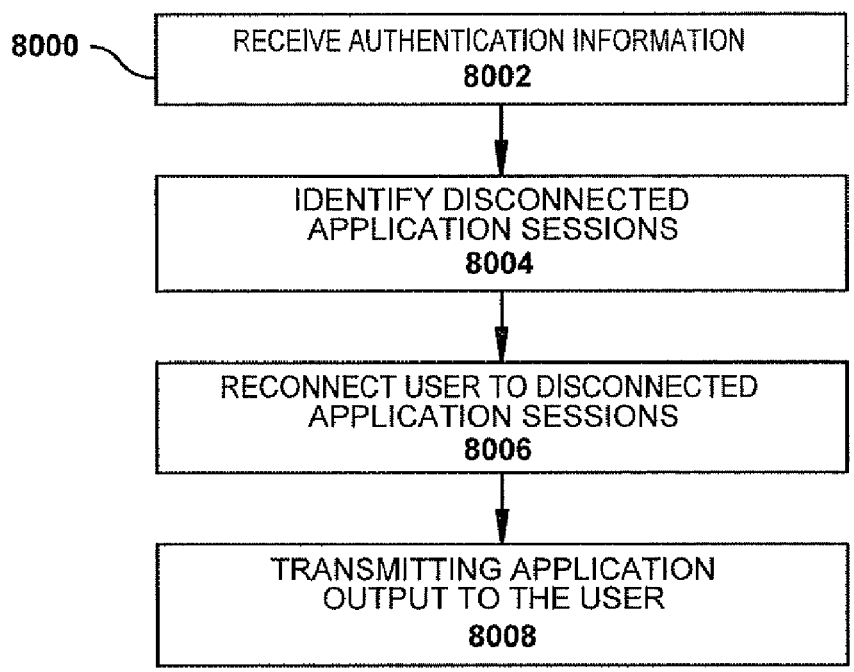
FIG. 80 is a flow chart depicting a method for connecting a client machine to disconnected application sessions.

Referring also to FIG. 80, a method 8000 of providing remote access to an application session, in one embodiment, begins with the network module 7920 of the remote machine 30 receiving authentication information associated with a user (step 8002). Authentication information can include a number of types of authentication information, including without limitation user names, client names, client addresses, passwords, PINs, voice samples, one-time passcodes, biometric data, digital certificates, tickets, etc. and combinations thereof. The authentication information could be in the form of a log-on request from a user. As described above, a log-on request can be initiated by a user through the input module 7908 of a client machine 10. The client's network module forwards the request to the server process 7922.

In one embodiment, upon receiving the request, the server process 7922 forwards the user-provided authentication information to the authentication module 7930, which authenticates the identity of the user. The server's authentication module 7930 can perform the authentication itself and/or in cooperation with one or other modules or computers, such as a domain server, an authentication service, etc. Successful authentication results in the authentication module transmitting identification information for the user (e.g., a username or ID) to the server process 7922.

In response to receiving authentication information associated with the user the server process 7922 identifies any disconnected application sessions 7918 associated with the user that are executing, stalled on the remote machine 30, or suspended to disk (step 8004). In one embodiment, the server process 7922 identifies the application sessions 7918 upon receiving the authentication information. In another embodiment, the server process identifies the applications in response to receiving the authentication information after the authentication module 7930 verifies of the user's identity. In one embodiment, server process 7922 determines whether any such disconnected application sessions 7918 exist by consulting the data store 7926 for sessions, which is some embodiments is a persistent data store, related to the user. For example, the disconnected application session 7918 could have been disconnected by direction of the user of the application session 7918, resulting in the server process 7922 disconnecting the application session 7918, for example, by modifying the status of application session 7918 in the data store 7926 to "disconnected," and deleting the identification of the connected client machine 10 in the data store 7926 entry for the application session 7918. In another embodiment, the disconnection was unintentional. Unintentional disconnection results in the server process 7922 making the same modifications to the data store 7926 as would be made as a result of an intentional disconnection.

Upon identifying any disconnected application sessions 7918 (step 8004), in one embodiment, the server process 7922 prompts the user to indicate whether connection is desired. If connection is not desired, the server process 7922 prompts the user to indicate whether the disconnected applications sessions 7918 should remain disconnected, or whether the application sessions 7918 should be suspended to disk, paused, or terminated. In an alternative embodiment, the server process 7922 consults a rule stored in the rules source 7928 to determine whether connection and/or connection is permitted and/or required.

In an alternative embodiment, the user connects to the remote machine 30, the server process 7922, and any disconnected application sessions by utilizing a single user interface element, for example clicking an icon labeled "Log-on." In this embodiment, activating the single user interface will automatically connect the user to any disconnected applications sessions 7918.

In one embodiment, the client can be configured to automatically send authentication information upon such user connection. If connection is permitted, and is either assented to by user or is automatic, the server process 7922 connects the user to the disconnected application sessions (step 8006). In one embodiment, connection includes modifying the entry in the data store 7926 to indicate that the user is connected to the application session 7918 and to indicate from which client machine 10 the user is connected to the server. Upon connection, the remote machine 30 resumes transmitting application output data from the application output transmitter 7924 to the client 10 (step 8008). In another embodiment, the application output transmitter consults the rules source 7928 before beginning transmitting application output to ensure such transmission is permitted.

Application sessions are associated primarily with users instead of the client machine 10 which the user was operating when the user previously had connected to, (and then been disconnected from) the server. As a result, rules permitting, the user can reconnect to an application session 7918 from the first client machine 10, the second client machine 10, or any other client computer. In other embodiments, the user of the client machine 10 may be given further options, such as "reconnect to all sessions not executing on a virtual machine," "suspend all sessions executing on a virtual machine," "reconnect all sessions currently hosted," or "reconnect to all session not suspended," for example.

Figure 81:
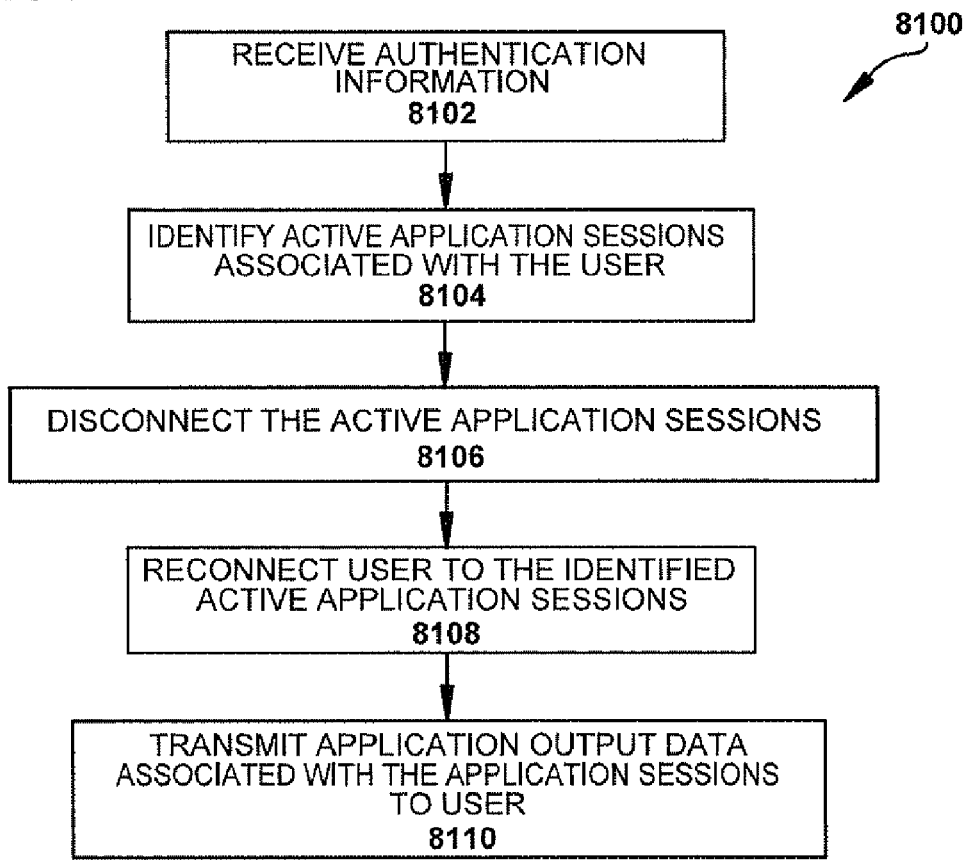
FIG. 81 is a flow chart depicting on embodiment a method for connecting the client machine to active application sessions.

Referring to FIG. 81, even if a session is not disconnected (i.e., is active) it can be useful to transfer the session from one client to another. For example, it may be that an application session was disconnected, but the server did not yet detect the disconnection. It may be that the user deliberately left a session running, but would now like to access the session from another location.

A method 8100 for transferring active application sessions 7918 from a first client machine 10 to a second client machine 10 typically begins with the network module 7920 receiving authentication information from a user, for example in the form of a log-on request. In one embodiment, the user submits the authentication information via the input module 7908. The authentication information can be transmitted by the network module 7912 of second client machine 10 to the remote machine 30. The network module 7920 of the remote machine 30 can forward the request to the server process 7922.

The server process 7922 receives the user-provided authentication information (step 8102). In one embodiment, the server process 7922 forwards the user-provided authentication information to an authentication module 7930, which authenticates the identity of the user using, for example, any of the variety of authentication techniques described above. Successful authentication results in the authentication module transmitting for example, identification information for the user to the server process 7922.

After receiving authentication information (step 8102), the server process consults the data store 7926 to identify any active application sessions 7918 that are associated with the user, but that are connected to a different client computer, such as the first client machine 10 as an illustrative example (step 8104). In one embodiment, if the server process 7922 identifies any such active application sessions 7918, the server process automatically disconnects the application session(s) 118 from the first client machine 10 (step 8106) and connects the application session(s) 118 to the current client machine 10 (step 8108). In one embodiment, the user can trigger the automatic consultation of the data store and subsequent connection with the selection of a single user interface element.

In an alternative embodiment, the server process 7922 prompts the user as to whether the user wants to have the active application session(s) 118 connected to the current client machine 10. If the user declines to transfer one or more of the active application session(s), the server process 7922 prompts the user to either keep the application session(s) 118 active, suspend the application session to disk, pause the application session, or to terminate the application session(s) 118. In an alternative embodiment, the server process 7922 consults a rule stored in the rules source 7928 to determine whether transfer of the active application session(s) 118 are permitted before transferring the active application session(s) 118.

If transfer of the application session(s) 118 are permitted and transfer is automatic or requested by the user, in one embodiment the server process 7922 carries out the disconnection (step 8106) and connection (step 8108) by modifying the entry maintained in the data store 7926 for the application session 7918 to substitute the identity of the stored client machine 10 with the identity of the current client computer, i.e. the client machine 10. Upon connection with the current client machine 10, the application output transmitter 7924 begins transmitting application output to the current computer (step 8110). In another embodiment, the application output transmitter consults the rules source 7928 before beginning transmitting application output to ensure such transmission is permitted.

It should be understood that the methods of FIG. 80 and FIG. 81 can be combined to allow a client to be connected to disconnected, suspended, paused, and active sessions associated with a user. In addition, prior to transfer or reconnection, the active and/or disconnected sessions could have been connected to the same or several different client machines.

Referring to FIG. 82, as mentioned above, the remote machine 30 can be implemented as a machine farm 38. In one embodiment, the machine farm 38 includes several remote machines 30, 30', and 30", which are linked together and which are jointly administered. Several client machines 10, 10', and 10" (typically many computers) can connect to the machine farm 38 over a network 150. The servers 30, 30', and 30" share the computational load put on the machine farm 38. For example, if a user is accessing three application sessions 8218*a*, 8218*b*, and 8218*c*, each application session can be executing on a different server 30, 30', or 30". Similarly, if the user is accessing two or more application 7916 through a single application session 8218*a*, 8218*b* or 8218*c*, the server process 7922 of the machine farm 38 can assign one application to execute on one server 30 and another application to execute on server 30'. In a machine farm configuration, the modules of the server 120, 122, and 124, the data store 7926, and the rules source 7928 (FIG. 1), can be stored on a single server 30, 30' or 30", or can be distributed among the servers 30, 30', and 30".

With respect to connecting to the machine farm 38 after a disconnection or after changing client machines 10, 10' and 10" without disconnecting, the server process 7922 treats the servers 30, 30', and 30" as a single server. That is, if a machine farm is executing a user's application sessions 8218*a*, 8218*b*, and 8218*c* on separate servers 30, 30', and 30", and the user disconnects from the machine farm 38 or changes the client computer 10, 10', or 10" at which the user is working, upon subsequently connecting to the machine farm 38, the server process 7922 of the machine farm 38 can automatically connect the user's client computer 10, 10', or 10" with all three application sessions 8218*a*, 8218*b*, and 8218*c* executing on all three severs 30, 30', and 30".

In one embodiment of the system, a user of a first client computer 10, which in this example is a mobile handheld computer, logs on to the machine farm 38 via a wireless modem and requests two application sessions 8218*a* and 8218*b*. The server process 7922 of the machine farm 38 launches a first application session 8218*a* on a first server 30 and a second application session on a second server 30'. The wireless modem loses its connection with the machine farm when the user of the first computer 10 enters an elevator. The server process 7922 of the machine farm 38 determines that the user is disconnected, and the server process 7922 updates the data store 7926 accordingly.

The user then logs on to the machine farm 38 from a second client computer 10', which in this example is a desktop computer in his office. The server process 7922 consults the data store 7926 and determines that two disconnected application sessions 8218*a* and 8218*b* are associated with the user. The server process 7922 (assuming no rules to the contrary) automatically connects the second client computer 10' to both application sessions 8218*a* and 8218*b* executing on servers 30 and 30', respectively.

The user then leaves the second client computer 10' without disconnecting from the machine farm 38 and logs on to the machine farm 38 from a third client computer 10", for example a colleague's laptop. Upon logging on from the third client computer 10", the server process consults the data store 7926 and determines that the user is associated with the two active application sessions 8218*a* and 8218*b* connected to the second client computer 10'. The server process 7922 (assuming no rules to the contrary) then automatically disconnects both of the application sessions 8218*a* and 8218*b* from the second client computer 10', and connects both of the application sessions 8218*a* and 8218*b* to the third client computer 10".

The user next selects a disconnect option for each application session 8218*a* and 8218*b*. The server process 7922 updates the data store 7926 to indicate that the application sessions 8218*a* and 8218*b* have been disconnected. The user then logs on to the machine farm 38 from the second client computer 10'. The server process 7922 consults the data store 7926 and determines that two disconnected application sessions 8218*a* and 8218*b* are associated with the user. The server process 7922 (assuming no rules to the contrary) automatically connects the disconnected application sessions 8218*a* and 8218*b* to the second client computer 10'.

Referring now to FIG. 83, a flow diagram depicts one embodiment of the steps taken in a method for providing remote access to a computing environment provided by a virtualized operating system. In brief overview, authentication information associated with a user of a client machine 10 is received (step 8302). Based on the received authentication information, a computing environment provided by a virtualized operating system and already associated with the user is identified (step 8304). A connection is established between the client machine 10 and the identified computing environment (step 8306).

In some embodiments the methods and systems described above in connection with FIGS. 79-82 may be implemented in systems including virtual machines. In some embodiments, the client machine 10 has established a connection to a physical machine providing access to a resource requested by the client machine 10. In this embodiment, the client machine 10 may be connected to a disconnected application session and receive application output as described above in connection with FIGS. 79-82.

In other embodiments, the client machine 10 has established a connection to a virtual machine providing access to a resource. In one of these embodiments, the client machine 10 may be reconnected to an application session executing on the virtual machine. In another of these embodiments, the client machine 10 may be reconnected to a plurality of application sessions executing within a computing environment provided by a virtual machine. In still another of these embodiments, the client machine 10 may be reconnected to an application session comprising a plurality of application programs executing within a computing environment provided by a virtual machine. In yet another of these embodiments, the client machine 10 may be reconnected to an application session comprising a plurality of computing environments provided by a virtual machine.

Referring still to FIG. 83, and in greater detail, authentication information associated with a user of a client machine 10 is received (step 8302). In one embodiment, responsive to the received authentication information, a collection agent gathers information about the client machine 10. In some embodiments, the user of the client machine 10 is authenticated responsive to the received authentication information.

Based on the received authentication information, a computing environment provided by a virtualized operating system and already associated with the user is identified (step 8304). In some embodiments, the authentication information includes an access control decision, generated as described above in connection with FIGS. 7A and 7B. As described above, a client machine 10 requests access to a resource, a collection agent gathers information about the client machine 10, and a policy engine makes an access control decision. In one of these embodiments, the identification of the computing environment already associated with the user is made in response to the received authentication information. In another of these embodiments, a connection is established between the client machine 10 and the identified computing environment. In still another of these embodiments, a remote machine 30, acting as an intermediary server, receives the authentication information including the access control decision, and establishes a connection between the client machine 10 and a remote machine 30', acting as an execution machine providing the user of the client machine 10 with access to the requested resource.

In one embodiment, based on the received authentication information and gathered client machine information, a computing environment provided by a virtualized operating system and already associated with the user is identified. In another embodiment, stored data associated with at least one computing environment is consulted to identify, based on the received authentication information, a computing environment provided by a virtualized operating system and already associated with the user. In still another embodiment, based on the received authentication information, an identification is made of a first computing environment provided by a first virtualized operating system and a second computing environment provided by a second virtualized operating system, the first and second computing environments already associated with the user. In yet another embodiment, based on the received authentication information, an identification is made of a first computing environment provided by a first virtualized operating system executing on a first server and a second computing environment provided by a second virtualized operating system executing on a second server, the first and second computing environments already associated with the user A connection is established between the client machine 10 and the identified computing environment (step 8306). In one embodiment, the connection is established between the client machine 10 and the identified computing environment subject to a rule. In another embodiment, a connection is established between the client machine 10 and the identified computing environment subject to a policy applied to the received authentication information and gathered client machine information.

In some embodiments, a request is received to disconnect the client machine from the identified computing environment. In one of these embodiments, the connection between the client machine and the identified computing environment is terminated. In another of these embodiments, a data record associated with the identified computing environment is updated to indicate that the client machine is disconnected. In still another of these embodiments, an execution of the identified computing environment is continued. The execution may continue although the client is disconnected from the identified computing environment.

In some embodiments, authentication information associated with the user is received. In one of these embodiments, the user uses a second client machine 10'. In another of these embodiments, an identification is made, based on the received authentication information of a computing environment provided by a virtualized operating system and already associated with the user. In still another of these embodiments, a connection is established between the second client machine 10' and the identified computing environment. In yet another of these embodiments, the connection between the first client machine 10 and the identified computing environment is terminated.

Figure 84:
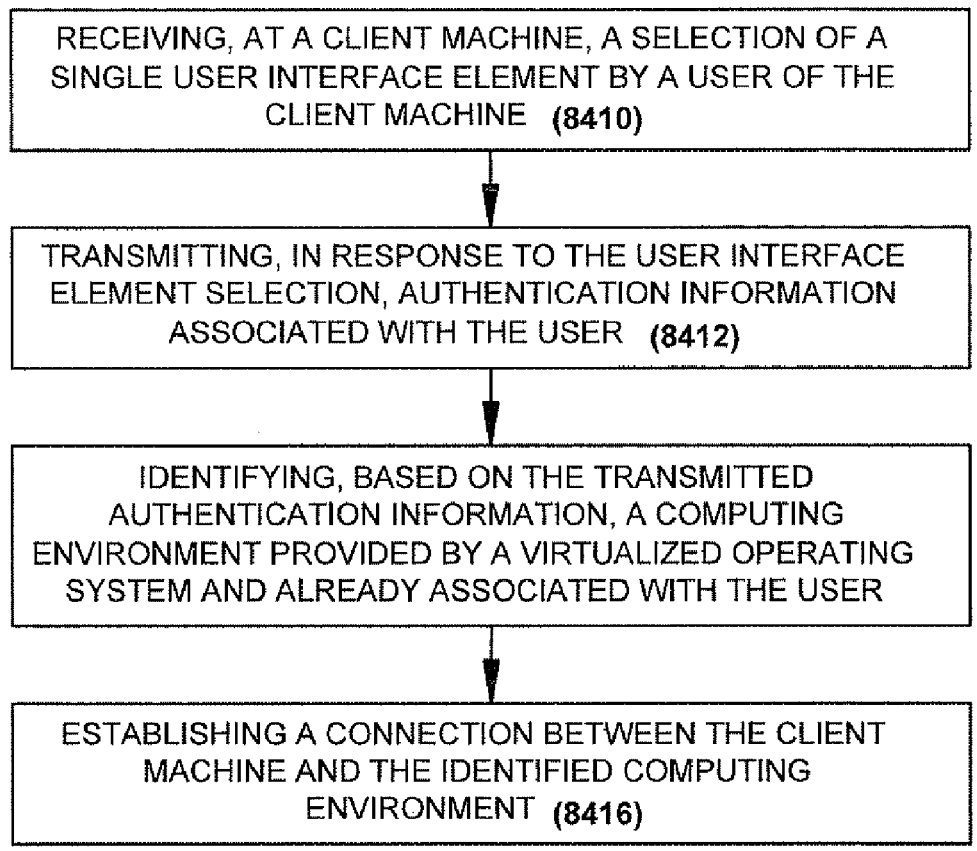
FIG. 84 is a flow diagram depicting an embodiment of steps taken in a method to connect a user of a client machine to a computing environment in response to selection of a graphical user interface element.

Referring now to FIG. 84, a flow diagram depicts an embodiment of the steps taken in a method for providing remote access to a plurality of application sessions. In brief overview, a selection of a single user interface element by a user of a client machine 10 is received at the client machine 10 (step 8410). In response to the user interface element selection, authentication information associated with the user is transmitted (step 8412). Based on the transmitted authentication information, a computing environment provided by a virtualized operating system and already associated with the user is identified (step 8414). A connection is established between the client machine and the identified computing environment (step 8416).

A selection of a single user interface element by a user of a client machine 10 is received at the client machine 10 (step 8410). In response to the user interface element selection, authentication information associated with the user is transmitted (step 8412). In one embodiment, a collection agent gathers information about the client machine in response to the received information. In another embodiment, a policy engine makes an access control decision responsive to the gathered information, as described above in connection with FIG. 7A and FIG. 7B. In some embodiments, based on the received authentication information and on gathered client machine information, an identification is made of a computing environment provided by a virtualized operating system and already associated with the user. In other embodiments, the user is authenticated responsive to the received authentication information.

Based on the transmitted authentication information, a computing environment provided by a virtualized operating system and already associated with the user is identified (step 8414). In one embodiment, a connection is established between the client machine and the identified computing environment subject to a rule applied to the received authentication information and to gathered client machine information. In another embodiment, based on the received identification, an identification is made of a first computing environment provided by a first virtualized operating system and a second computing environment provided by a second virtualized operating system, the first and second computing environments already associated with the user. In still another embodiment, based on the received authentication information, an identification is made of a first computing environment provided by a first virtualized operating system executing on a first server and a second computing environment provided by a second virtualized operating system executing on a second server, the first and second computing environments already associated with the user. In some embodiments, stored data associated with at least one computing environment is consulted to identify, based on the received authentication information, a computing environment provided by a virtualized operating system and already associated with the user.

A connection is established between the client machine and the identified computing environment (step 8416). In one embodiment, the connection between the client machine and the identified computing environment is made subject to a rule. In some embodiments, authentication information associated with the client machine 10 is received including an access control decision, generated as described above in connection with FIGS. 7A and 7B. In one of these embodiments, the identification of the computing environment already associated with the user is made in response to the received authentication information. In another of these embodiments, a remote machine 30, acting as an intermediary broker server, receives the authentication information including the access control decision, and establishes a connection between the client machine 10 and a remote machine 30', acting as an execution machine providing the user of the client machine 10 with access to the requested resource.

In some embodiments, a request is received to disconnect the client machine from the identified computing environment. In one of these embodiments, the connection between the client machine and the identified computing environment is terminated. In another of these embodiments, a data record associated with the identified computing environment is updated to indicate that the client machine is disconnected. In still another of these embodiments, execution of the identified computing environment is continued. The execution may continue although the user has terminated the connection between the client machine and the identified computing environment.

In some embodiments, authentication information associated with the user is received, the user using a second client machine 10'. In one of these embodiments, based on the received authentication information, an identification is made of a computing environment provided by a virtualized operating system and already associated with the user. In another of these embodiments, a connection is established between the second client machine 10' and the identified computing environment. In yet another of these embodiments, a connection between the first client machine 10 and the identified computing environment is terminated.

Figure 85:
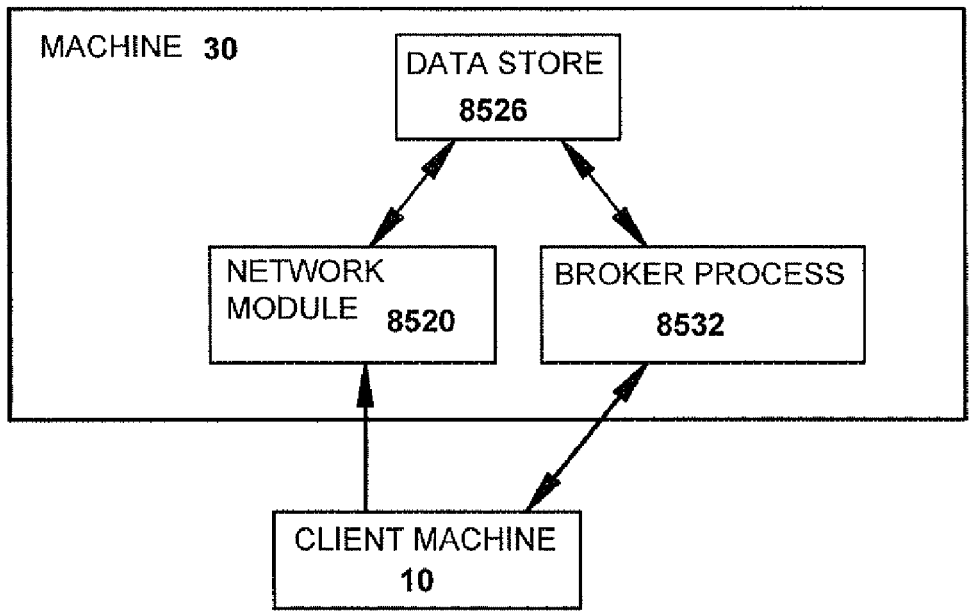
FIG. 85 is a block diagram depicting one embodiment of a remote machine able to connect the client machine to an application session.

Referring now to FIG. 85, a block diagram depicts one embodiment of a server for providing remote access to a computing environment. In brief overview, a remote machine 30 is a server and includes a network module 7920, a data store 7926, and a broker process 8532. In some embodiments, the remote machine 30 the components, modules and subsystems described above in connection with FIG. 79.

The network module 7920 receives authentication information associated with a user operating a client machine, such as client machine 10. In some embodiments, the network module 7920 is in communication with an authentication module for authenticating the user in response to the received authentication information. In other embodiments, the network module 7920 includes the authentication module.

The data store 7926 contains an identifier of a computing environment associated with the user. In one embodiment, the data store 7926 contains a first identifier of a first computing environment associated with the user and a second identifier of a second computing environment associated with the user. In another embodiment the first computing environment executes on a first remote machine 30 and the second computing environment executes on a second remote machine 30'. In some of these embodiments, the broker process 8532 transmits the enumeration from the data store to the client machine 10.

The broker process 8532 connects the client machine 10 to the identified computing environment enumerated in the data store 7926, in response to the received information. In one embodiment, the broker process 8532 connects the client machine 10 to the identified computing environment subject to a rule. In another embodiment, the broker process 8532 disconnects the client machine 10 from the identified computing environment in response to a received disconnect signal. In still another embodiment, the broker process 8532 updates a data record associated with the identified computing environment to indicate the client machine 10 is disconnected from the identified computing environment.

In some embodiments, the remote machine 30 includes a collection agent and a policy engine. In one of these embodiments, the collection agent gathers information about the client machine 10. In another of these embodiments, the collection agent comprises at least one script. In still another of these embodiments, the collection agent comprises bytecode. In yet another of these embodiments, the collection agent gathers the information by running at least one script on the client machine 10. In some of these embodiments, the collection agent executes on the client machine 10. In others of these embodiments, the collection agent is transmitted to the client machine 10. In one of these embodiments, the policy engine transmits the collection agent to the client machine 10.

In some of these embodiments, the remote machine 30 includes a policy engine receiving the gathered information and assigning one of a plurality of levels of access responsive to application of a policy to the received information, the broker process 8532 connecting the client machine to the identified computing environment enumerated in the data store responsive to the assigned access level. In one embodiment, the policy engine further comprises a database storing configurable policies. In another embodiment, the policy engine transmits instructions to the collection agent determining the type of information the collection agent gathers.

In others of these embodiments, the policy engine further comprises a logon agent. In one of these embodiments, the logon agent receives the gathered information from the collection agent. In another of these embodiments, the logon agent identifies for the policy engine authentication information received from the collection agent. In still another of these embodiments, the policy engine further comprises a plurality of logon agents. In yet another of these embodiments, at least one of the plurality of logon agents resides on each network domain from which a client machine 10 may transmit a resource request. In some embodiments, the client machine 10 transmits the resource request to a particular logon agent. In other embodiments, the logon agent identifies for the policy engine the network domain from which the client machine transmits the resource request.

In some embodiments, a virtual machine farm provides functionality for relocating a session from one requesting machine to a second requesting machine. In one of these embodiments, the virtual machine farm provides access to information required for relocating a session. In another of these embodiments, a hypervisor provides functionality for relocating a virtual machine session. In some embodiments, the hypervisor implements well-known techniques, including pre-copying, post-copying, and lazy-copying for moving session information associated with a virtual machine session from one execution machine to a second execution machine.

Figure 86:
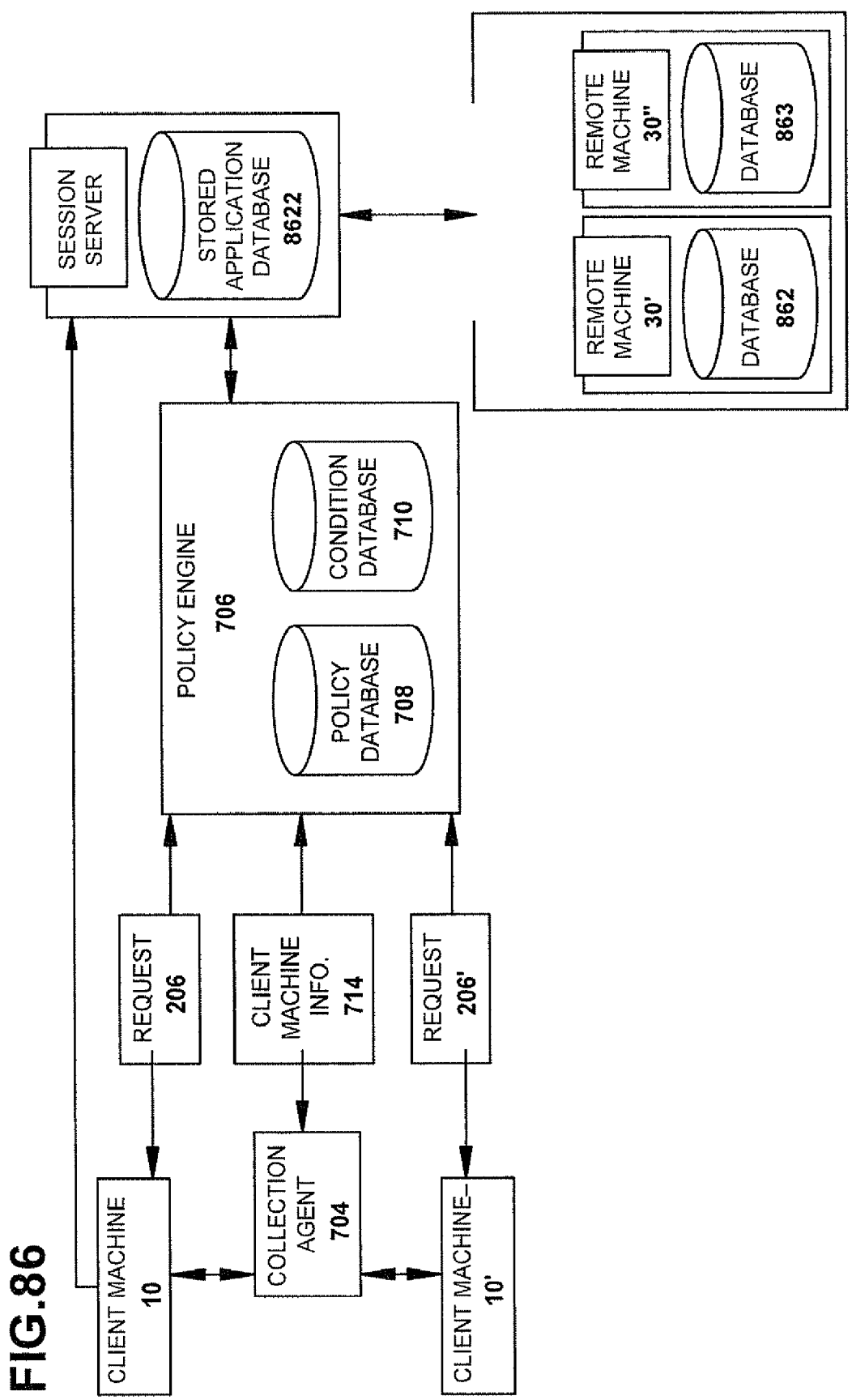
FIG. 86 is a block diagram of an embodiment of a system for connecting a client machine to an application session responsive to application of a policy.
Figure 87:
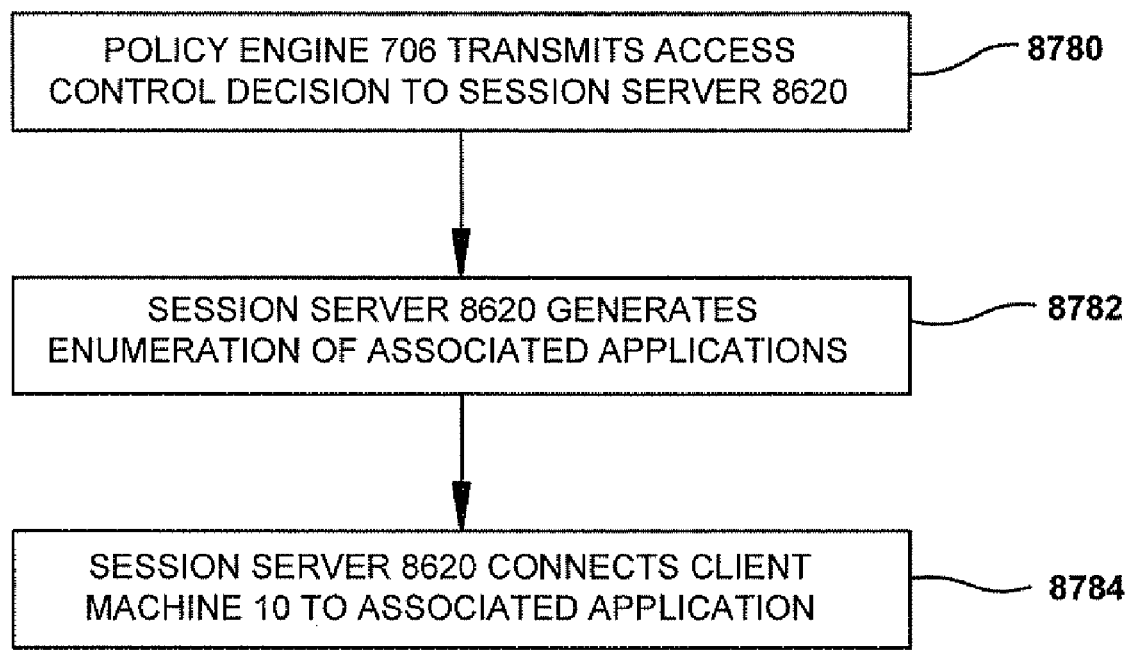
FIG. 87 is a flow diagram depicting the steps taken in one method to connect a client machine to an application session responsive to application of a policy.

In some embodiments, the virtual machine farm is in communication with a system as described in FIG. 86 and FIG. 87, and provides functionality for relocation of an application session within a virtual machine session.

Referring to FIG. 86, one embodiment of a network constructed in accordance with the invention is depicted, which includes a client machine 10, a collection agent 704, a policy engine 706, a policy database 708, a condition database 710, a client machine 10', a session server 8620, a stored application database 8622, a remote machine 30', a first database 8628, a remote machine 30", and a second database 8632. In brief overview, when the client machine 10 transmits to the policy engine 706 a request 206 for access to an application program, the collection agent 704 communicates with client machine 10, retrieves information about client machine 10, and transmits client machine information 714 to the policy engine 706. The policy engine 706 makes an access control decision, as discussed above in FIG. 7A and FIG. 7B. The client machine 10 receives an enumeration of available applications associated with the client machine 10.

In some embodiments, the session server 8620 establishes a connection between the client machine 10 and a plurality of application sessions associated with the client machine 10. In one of these embodiments, the connection is established to a virtual machine providing access to a computing environment in which the application sessions execute. In other embodiments, the policy engine 706 determines that the client machine 10 has authorization to retrieve a plurality of application files comprising the application and to execute the application program locally. In one of these embodiments, the remote machine 30' stores application session data and a plurality of application files comprising the application program. In another of these embodiments, the client machine 10 establishes an application streaming session with a remote machine 30' storing the application session data and the plurality of application files comprising the application program.

Referring now to FIG. 87, a flow diagram depicts one embodiment of the steps taken by the session server 8620 to provide access for the client machine 10 to its associated application sessions. The session server 8620 receives information about the client machine 10 from the policy engine 706 containing the access control decision the policy engine 706 made (step 8780). In one embodiment, the information also includes the client machine information 714. In another embodiment, the information includes authorization to execute the application program locally. In still another embodiment, the information includes authorization to provide access to computing environment in which the application program executes.

In some embodiments, the policy engine 706 identifies a plurality of application sessions already associated with the client machine 10. In other embodiments, the session server 8620 identifies stored application sessions associated with the client machine 10 (step 8782). In some of these embodiments, the session server 8620 automatically identifies the stored application sessions upon receiving the information from the policy engine 706. In one embodiment, the stored application database 8622 resides on the session server 8620. In another embodiment, the stored application database 8622 resides on the policy engine 706.

The stored application database 8622 contains data associated with a plurality of machines 30 in the machine farm 38 executing application sessions or providing access to application session data and application files comprising application programs, or providing access to computing environments in which application sessions may execute, including virtual machines which may be active, suspended, paused or disconnected. In some embodiments, identifying the application sessions associated with the client machine 10 requires consulting stored data associated with one or more machines 30. In some of these embodiments, the session server 8620 consults the stored data associated with one or more machines 30. In others of these embodiments, the policy engine 706 consults the stored data associated with one or more machines 30. In some embodiments, a first application session runs on a remote machine 30' and a second application session runs on a remote machine 30". In other embodiments, all application sessions run on a single remote machine 30 within the machine farm 38. In still other embodiments one or more application sessions run on a remote machine 30 executing a virtual machine providing access to a computing environment in which the application sessions execute.

The session server 8620 includes information related to application sessions initiated by users. The session server can be stored in volatile or non-volatile memory or, for example, distributed through multiple servers. Table 4 shows the data included in a portion of an illustrative session server 8620:

TABLE 4

| | Application Session | | |
|---|---|---|---|
| | App Session 1 | App Session 2 | App Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |
| Executing in a Virtual Machine? | Yes (Instance ID #) | No | no |

The session server 8620 in Table 4 includes data associating each application session with the user that initiated the application session, an identification of the client machine 10, if any, from which the user is currently connected to the remote machine 30', and the IP address of that client computer 10. The session server 8620 also includes the status of each application session. The data may include an identification of a virtual machine providing a computing environment in which the application session executes. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 8620 further stores information indicating the application 7916 that are executing within each application session and data indicating each application's process on the server. For embodiments in which the session is hypervisor-based, the session server 8620 may store an identification of a hypervisor domain or a virtual machine instance identifier. In embodiments in which the remote machine 30' is part of the machine farm 38, the session server 8620 is at least a part of the dynamic store in addition to the data in the last three rows of Table 4 that identify a remote machine 30 in the machine farm 38 on which each application is/was executing, and the IP address of that remote machine 30. In alternative embodiments, the session server 8620 includes a status indicator for each application in each application session.

For example, in the example of Table 4, three application sessions exist, App Session 1, App Session 2, and App Session 3. App Session 1 is associated with User 1, who is currently using terminal 1. Terminal one's IP address is 172.16.2.50. The status of App Session 1 is active, and in App Session 1, a word processing program, is being executed. The word processing program is executing on Server A as process number 1. Server A's IP address is 172.16.2.55. App Session 2 in Table 1 is an example of a disconnected application session 7918. App Session 2 is associated with User 2, but App Session 2 is not connected to a client machine 10 or 20. App Session 2 includes a database program that is executing on Server A, at IP address 152.16.2.55 as process number 3. App Session 3 is an example of how a user can interact with application sessions operating on different remote machines 30. App Session 3 is associated with User 1, as is App Session 1. App Session 3 includes a spreadsheet program that is executing on Server B at IP address 152.16.2.56 as process number 2, whereas the application session included in App Session 1 is executing on Server A. Although only one App Session 1 is described in the application session, the application session may comprise a plurality of executing resources, including application sessions executing in computing environments and computing environments executing in a virtual machine.

In another example, a user may access a first application program through an application session executing on a remote machine 30', such as Server A, while communicating across an application streaming session with a second remote machine 30", such as Server B, to retrieve a second application program from the second remote machine 30" for local execution. The user of the client machine 10 may have acquired authorization to execute the second application program locally while failing to satisfy the local execution prerequisites of the first application program.

In one embodiment, the session server 8620 is configured to receive a disconnect request to disconnect the application sessions associated with the client machine 10 and disconnects the application sessions in response to the request. The session server 8620 continues to execute an application session after disconnecting the client machine 10 from the application session. In this embodiment, the session server 8620 accesses the stored application database 8622 and updates a data record associated with each disconnected application session so that the record indicates that the application session associated with the client machine 10 is disconnected.

After receiving authentication information associated with a client machine 10 connecting to the network, the session server 8620 consults the stored applications database 8622 to identify any active application sessions that are associated with a user of the client machine 10, but that are connected to a different client machine 10, such as the client machine 10 if the authentication information is associated with client machine 10', for example. In one embodiment, if the session server 8620 identifies any such active application sessions, the session server 8620 automatically disconnects the application session(s) from the client machine 10 and connects the application session(s) to the current client machine 10' (step 8784). In some embodiments, the received authentication information will restrict the application sessions to which the client machine 10 may reconnect. In other embodiments, the received authentication information authorizes execution of an application program on the client machine 10', where the authorization may have been denied to client machine 10. In one of these embodiments, the session server 8620 may provide the client machine 10 access information for retrieving the application program for second execution. In still other embodiments, the received authentication information authorizes execution of an application program in a computing environment provided by a virtual machine.

Figure 88:
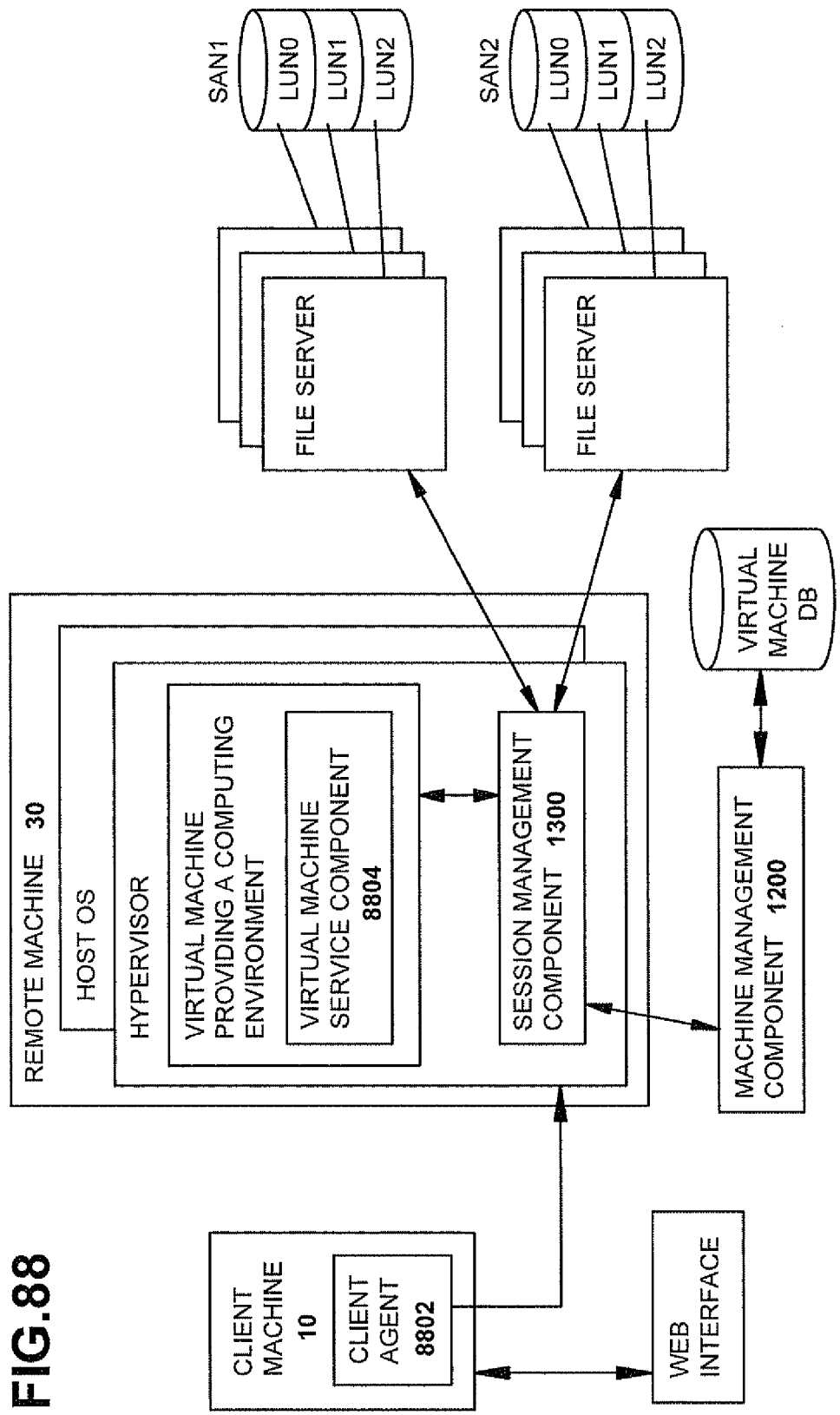
FIG. 88 is a block diagram depicting one embodiment of a system for providing, by a virtual machine, access to a computing environment.

Referring now to FIG. 88, a block diagram depicts one particular embodiment of a system for providing, by a virtual machine access to a computing environment. A client agent 8802 on a client machine 10 connects to a remote machine 30. In some embodiments, the client agent 8802 establishes a connection with a session management component 1300. In other embodiments, the session management component 1300 is executed by the remote machine 30 to which the client machine 10 connects. In one embodiment, the session management component 1300 queries a virtual machine management component 1200, for the location of the configuration and virtual disk files of a virtual machine to run for the current user and a hypervisor in which the virtual machine may execute. In some embodiments, the identified hypervisor and virtual machine execute on remote machine 30. In other embodiments, the identified hypervisor and virtual machine execute on a remote machine 30'. In one embodiment, the session management component launches the virtual machine within the specified hypervisor in full screen mode. In another embodiment, a previously-executing virtual machine is allocated to the client machine 10.

In some embodiments, a virtual machine service component 8804 executes within a computing environment provided by a virtual machine on a remote machine 30. In one of these embodiments, the virtual machine service component 8804 receives an IP address and a port with which to establish a communication channel between the session management component 1300 and the virtual machine service component 8804. In one embodiment, this communication channel is used to pass session related configuration information from the client agent session into the virtual machine session. In some embodiments, the configuration information includes display settings and changes, client drive information and authentication data with which to enable single sign-on for a user of the client machine 10.

In some embodiments, once the communications channel is established and the initial session related information is passed to the virtual machine service component 8804, the virtual machine service component 8804 automatically connects the user to a computing environment, such as a guest operating system, using the same credentials as were provided to the client agent 8802 by the user (if any). In one of these embodiments, the virtual machine service component 8804 automatically reconfigures the display settings of the guest operating system to match those of the client 8802. The virtual machine produces graphics and sound output to virtual devices that redirect that output, directly or indirectly, to the client agent 8802 on the client machine 10. The virtual machine receives audio input, mouse and keyboard device data redirected from the client machine 10. When the virtual machine is shutdown or suspended the session management component 1300 terminates the client agent session.

Figure 95:
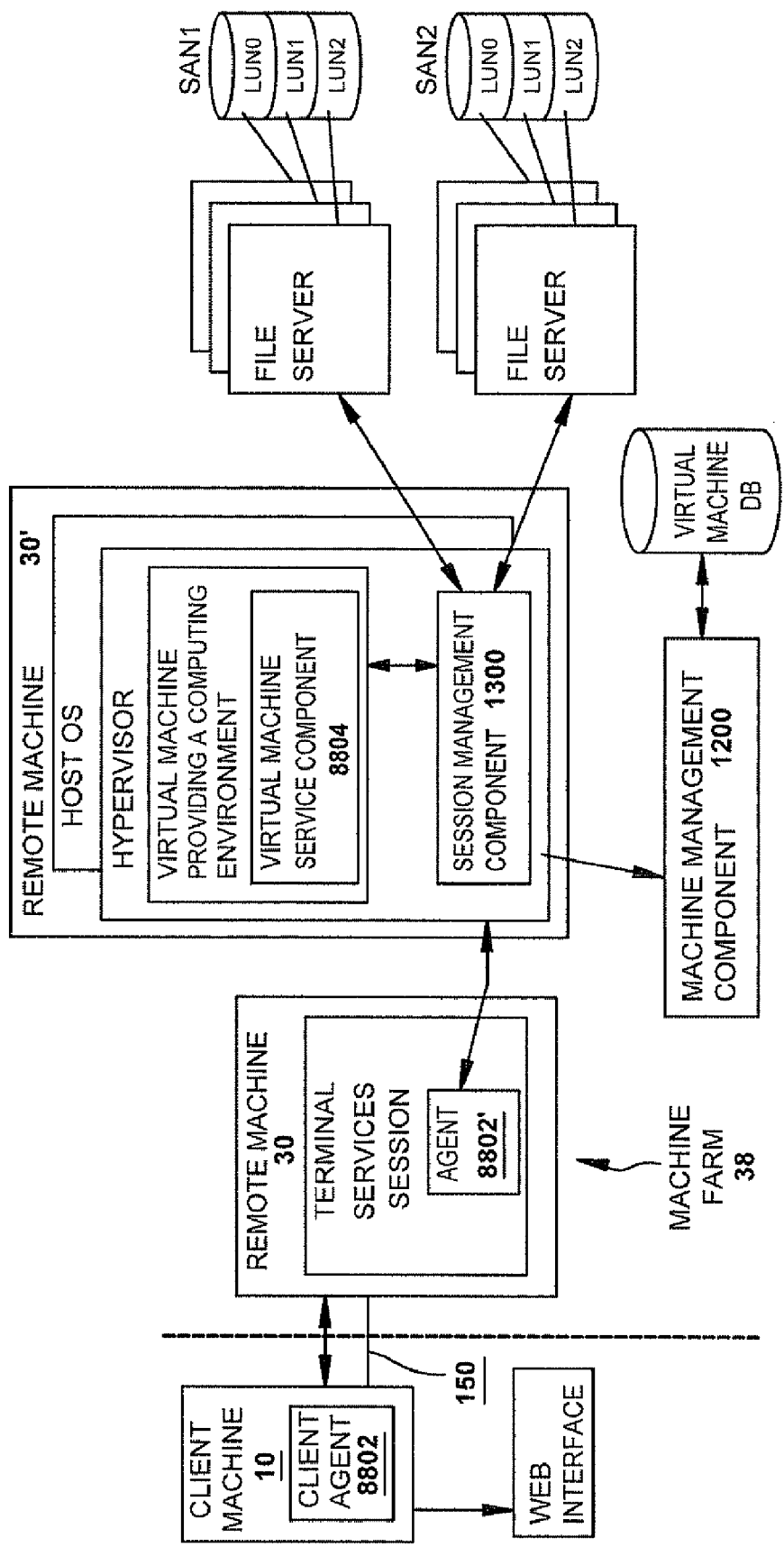
FIG. 95 is a block diagram depicting one embodiment of a system for providing to a first client agent, via a second client agent on a first remote machine, output data generated by a resource executing in a virtual machine provided by a second remote machine.

Referring now to FIG. 95, a block diagram depicts one embodiment of a system for providing to a first client agent, via a second client agent on a first remote machine, output data generated by a resource executing in a virtual machine provided by a second remote machine. A client agent 8802 on a client machine 10 connects to a remote machine 30 and requests access to a resource. In one embodiment, the remote machine 30 is an intermediate machine. In another embodiment, the remote machine 30 determines to provide access to the requested resource via a virtual machine. In still another embodiment, the remote machine 30 identifies a remote machine 30' to provide access to the requested resource via a virtual machine executing on the remote machine 30'. The remote machine 30' may be referred to as an execution machine 30'.

In one embodiment, the client machine 10 communicates with the remote machine 30 using a presentation layer protocol, such as ICA, RDP, VNC, or X11. In some embodiments, protocol stacks are implemented to enable communications between the client machine 10 and remote machines 30, as described above in connection with FIG. 8, step 816 and with FIG. 24.

In one embodiment, an agent 8802' on the remote machine 30 establishes a connection to the remote machine 30'. In another embodiment, the remote machine 30 communicates with the remote machine 30' using a presentation layer protocol, such as ICA, RDP, VNC, or X11. In still another embodiment, the remote machine 30 establishes a connection with the remote machine 30' and communicates with the remote machine 30' using a presentation layer protocol, such as RDP, from within a terminal services session executing on the remote machine 30. In some embodiments, protocol stacks are implemented to enable communications between the agent 8802' on the remote machine 30 and the remote machine 30', as described above in connection with FIG. 8, step 816 and with FIG. 24.

In one embodiment, as depicted by FIG. 95, the remote machine 30' provides access to the requested resource by providing access to a virtualized environment or by providing access to an application streaming service, as described above in connection with FIG. 8. In another embodiment, the remote machine 30' executes the resource in a virtual machine executing on the remote machine 30'. In still another embodiment, the remote machine 30' transmits output data generated by the execution of the resource to the remote machine 30 using a presentation layer protocol. In another embodiment, the remote machine 30 forwards the output data received from the remote machine 30' to the client machine 10 using a presentation layer protocol. In some embodiments, the virtual machine executes on the remote machine 30'. In other embodiments, the virtual machines execute on a remote machine 30".

In one embodiment, the remote machine 30' provides access to a published desktop computing environment. In another embodiment, the remote machine 30' provides access to a published desktop computing environment selected from an enumeration of a plurality of published desktop computing environments available to the client machine 10. In some embodiments, as described above in connection with the description of the virtual machine management component 1200, virtual machines may provide access to standard operating environments.

Figure 96:
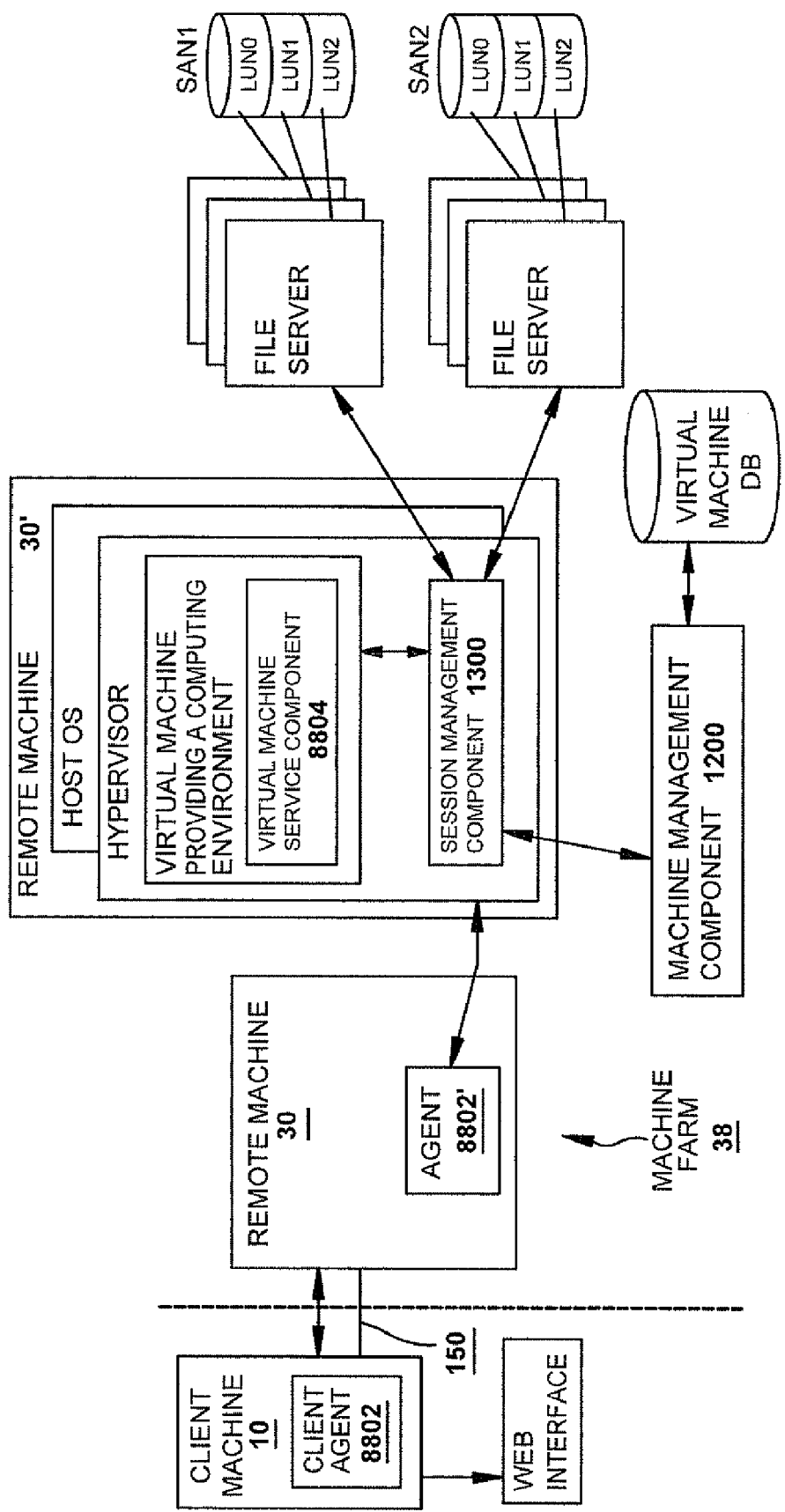
FIG. 96 is a block diagram depicting an embodiment of a system for providing to a first client agent, via a second client agent on a first remote machine, output data generated by a resource executing in a virtual machine provided by a second remote machine.

Referring now to FIG. 96, a block diagram depicts an embodiment of a system for providing to a first client agent, via a second client agent on a first remote machine, output data generated by a resource executing in a virtual machine provided by a second remote machine. A client agent 8802 on a client machine 10 connects to a remote machine 30 and requests access to a resource. In one embodiment, the remote machine 30 is an intermediate machine. In another embodiment, the remote machine 30 determines to provide access to the requested resource via a virtual machine. In still another embodiment, the remote machine 30 identifies a remote machine 30' to provide access to the requested resource via a virtual machine executing on the remote machine 30'. The remote machine 30' may be referred to as an execution machine 30'.

In one embodiment, the client machine 10 communicates with the remote machine 30 using a presentation layer protocol, such as ICA, RDP, VNC, or X11. In some embodiments, protocol stacks are implemented to enable communications between the client machine 10 and remote machines 30, as described above in connection with FIG. 8, step 816 and with FIG. 24.

In one embodiment, an agent 8802' on the remote machine 30 establishes a connection to the remote machine 30'. In another embodiment, the remote machine 30 communicates with the remote machine 30' using a presentation layer protocol, such as ICA, RDP, VNC, or X11. In still another embodiment, the remote machine 30 establishes a connection with the remote machine 30' and communicates with the remote machine 30' using a presentation layer protocol, such as ICA. In some embodiments, protocol stacks are implemented to enable communications between the agent 8802' on the remote machine 30 and the remote machine 30', as described above in connection with FIG. 8, step 816 and with FIG. 24.

In one embodiment, as depicted by FIG. 96, the remote machine 30' provides access to the requested resource by providing access to a virtualized environment or by providing access to an application streaming service, as described above in connection with FIG. 8. In another embodiment, the remote machine 30' executes the resource in a virtual machine executing on the remote machine 30'. In still another embodiment, the remote machine 30' transmits output data generated by the execution of the resource to the remote machine 30 using a presentation layer protocol. In another embodiment, the remote machine 30 forwards the output data received from the remote machine 30' to the client machine 10 using a presentation layer protocol. In some embodiments, the virtual machine executes on the remote machine 30'. In other embodiments, the virtual machines execute on a remote machine 30".

Figure 97:
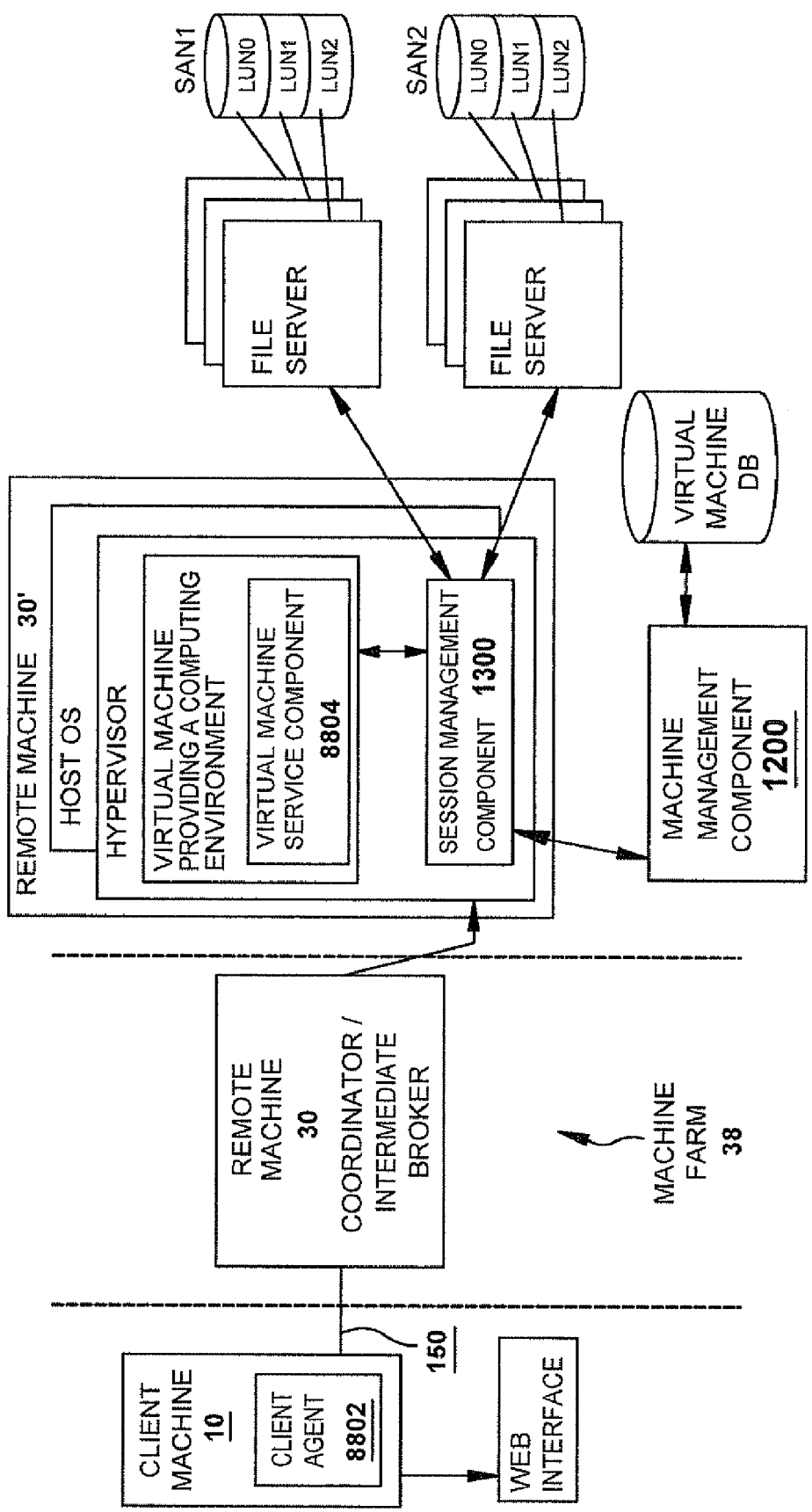
FIG. 97 is a block diagram depicting one embodiment of a system for identifying, by a coordinator machine, a worker machine providing, via a virtual machine, access to a computing environment.

Referring now to FIG. 97, a block diagram depicts one embodiment of a system for identifying, by a coordinator machine, a worker machine providing, via a virtual machine, access to a computing environment. A client agent 8802 on a client machine 10 connects to a remote machine 30 and requests access to a resource. In one embodiment, the remote machine 30 is a coordinator machine, providing the functionality of an intermediate broker machine. In another embodiment, the remote machine 30 identifies a remote machine 30' to provide access to the requested resource.

In some embodiments, the remote machine 30 is a remote machine in a plurality of remote machines functioning as intermediate broker machines. In one of these embodiments, the coordinator machines receive requests and identify other remote machines 30' from a second plurality of remote machines, the identified machines responding to the requests. In another of these embodiments, the identified remote machines 30' are referred to as worker machines. In still another of these embodiments, the client machine 10 communicates with the coordinator machine 30 using a presentation layer protocol, such as ICA, RDP, VNC, or X11.

In one embodiment, the coordinator machine 30 identifies a pool of worker machines 30' each capable of providing access to the requested resource. In some embodiments, the coordinator machine 30 identifies a worker machine 30' from the pool of worker machines 30' capable of providing access to the requested resource. In other embodiments, the coordinator machine 30 identifies a worker machine 30' and transmits information for accessing the worker machine 30' to the client machine 10. In still other embodiments, the coordinator machine 30 transmits information for accessing the client machine 10 to the worker machine 30'. In one of these embodiments, the coordinator machine 30 provides no additional information or communication to the client machine 10 after transmitting the access information associated with the worker machine 30'. In yet other embodiments, the coordinator machine 30 establishes a connection between the client machine 10 and a worker machine 30'.

In one embodiment, the client agent 8802 of the client machine 10 establishes a connection to the worker machine 30'. In another embodiment, the client machine 10 communicates with the worker machine 30' using a presentation layer protocol, such as ICA, RDP, VNC, or X11.

In some embodiments, the worker machine 30' provides access to the requested resource by executing an application on the worker machine 30' and transmitting application-output data generated by the execution of the application to the client 10. In other embodiments, as depicted by FIG. 97, the worker machine 30' provides access to the requested resource by providing access to a virtualized environment or by providing access to an application streaming service, as described above in connection with FIG. 8.

In some embodiments, upon identification of a worker machine 30', the client agent 8802 of the client machine 10 establishes a connection with a session management component 1300 associated with or residing on the worker machine 30'. In other embodiments, the worker machine 30' executes the session management component 1300 to which the client machine 10 connects. In one embodiment, the session management component 1300 queries a virtual machine management component 1200, for the location of the configuration and virtual disk files of a virtual machine to run for the current user and a hypervisor in which the virtual machine may execute. In still other embodiments, the client machine 10 connects directly to the worker machine 30'.

In some embodiments, the identified hypervisor and virtual machine execute on the worker machine 30'. In other embodiments, the identified hypervisor and virtual machine execute on a remote machine 30". In one of these embodiments, the worker machine 30' communicates with the remote machine 30" using a presentation layer protocol to receive output data generated by a resource executed by the virtual machine.

In one embodiment, the session management component launches the virtual machine within the specified hypervisor in full screen mode. In another embodiment, a previously-executing virtual machine is allocated to the client machine 10.

In some embodiments, a virtual machine service component 8804 executes within a computing environment provided by a virtual machine on a worker machine 30'. In one of these embodiments, the virtual machine service component 8804 receives an IP address and a port with which to establish a communication channel between the session management component 1300 and the virtual machine service component 8804. In one embodiment, this communication channel is used to pass session related configuration information from the client agent session into the virtual machine session. In some embodiments, the configuration information includes display settings and changes, client drive information and authentication data with which to enable single sign-on for a user of the client machine 10.

In some embodiments, once the communications channel is established and the initial session related information is passed to the virtual machine service component 8804, the virtual machine service component 8804 automatically connects the user to a computing environment, such as a guest operating system, using the same credentials as were provided to the client agent 8802 by the user (if any). In one of these embodiments, the virtual machine service component 8804 automatically reconfigures the display settings of the guest operating system to match those of the client 10. The virtual machine produces graphics and sound output to virtual devices that redirect that output, directly or indirectly, to the client agent 8802 on the client machine 10. The virtual machine receives audio input, mouse and keyboard device data redirected from the client machine 10. When the virtual machine is shutdown or suspended the session management component 1300 terminates the client agent session.

In some embodiments, the coordinator machine 30 provides functionality for managing a pool of worker machines 30'. In one of these embodiments, for example, the coordinator machine 30 receives information identifying the worker machines 30' as physical machines providing access to particular resources, or as virtual machines providing access to particular resources. In another of these embodiments, the coordinator machine 30 receives information identifying a plurality of types of resources provided by the pool of worker machines 30'. For example, the coordinator machine 30 may receive information identifying a pool of worker machines 30' as providing access to a type of computing environment, such as a desktop or application. In still another of these embodiments, the coordinator machine 30 communicates with a virtual machine management component 1200 to receive information about virtual machines in the pool of worker machines 30'.

In other embodiments, the coordinator machine 30 monitors one or more worker machines 30' in the pool of worker machines 30'. In one of these embodiments, the coordinator machine 30 identifies a worker machine 30' to provide access to a resource for a client machine 10 and identifies a worker machine 30" to provide access to the resource upon a failure of the worker machine 30'. In another of these embodiments, the coordinator machine 30 identifies a worker machine 30" to provide access to the resource responsive to a load balancing technique. In still another of these embodiments, the coordinator machine 30 identifies a worker machine 30" to provide access to the resource responsive to a change associated with the client machine 10. For example, the coordinator machine 30 may identify a first worker machine 30' to provide access to the resource for the client machine 10 and the receive a second request for access by the client machine 10, after the client machine 10 has established a connected via a different network, or has lost a first network connection and re-established a second network connection.

In some embodiments, the coordinator machine 30 identifies a worker machine 30 that provides access to a resource for a client machine 10 according to a method chosen responsive to an evaluation of the client machine 10, an application of a policy to the client machine 10 and to the worker machine 30', and an evaluation of the capabilities and requirements of the resource, the client machine 10 and the worker machine 30'.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Having described certain embodiments of methods and systems for providing access to a computing environment, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method of providing access to a desktop computing environment, the method comprising the steps of:
    (a) receiving, by a broker machine, a request from a client machine for access to the desktop computing environment, the request including an identification of a user of the client machine;
    (b) selecting, by a session management component, a virtual machine responsive to the identification of the user of the client machine that can provide the desktop computing environment and an operating system in which to execute the desktop computing environment;
    (c) selecting, by the broker machine, an execution machine providing a terminal services session in which a hypervisor executes to provide access to hardware resources required by the virtual machine;
    (d) launching, by the broker machine, the virtual machine by into the execution machine, the virtual machine executing the operating system;
    (e) launching, by the broker machine, the desktop computing environment into the executing operating system on the execution machine; and
    (f) establishing, by the broker machine, a connection between the client machine and the desktop computing environment via the terminal services session.

2. The method of claim 1, wherein step (b) further comprises launching, by the broker machine, the session management component.

3. The method of claim 1, wherein step (b) further comprises launching, by the broker machine, the session management component in a terminal services session executing on the broker machine.

4. The method of claim 1, wherein
    step (a) further comprises receiving, by the broker machine, the request including a type of virtual machine; and
    step (b) further comprises selecting, by the session management component, the virtual machine responsive to the request for the type of virtual machine.

5. The method of claim 1, wherein
    step (a) further comprises receiving, by the broker machine, the request including a type of desktop computing environment; and
    step (b) further comprises selecting, by the session management component, the virtual machine responsive to the request for the type of desktop computing environment.

6. The method of claim 1, wherein step (c) further comprises provisioning, by the hypervisor, the hardware resources on the-execution machine for use by the-virtual machine.

7. The method of claim 1, wherein step (c) further comprises partitioning, by the hypervisor, the hardware resources on the execution machine for use by the virtual machine.

8. The method of claim 1, wherein step (c) further comprises selecting, by the broker machine, the execution machine responsive to an identification of hardware resources required by the-virtual machine.

9. The method of claim 1, wherein step (f) further comprises providing a proxy for communication between the client machine and the desktop computing environment.

10. The method of claim 1, wherein step (d) further comprises launching, by the broker machine, the virtual machine into the hypervisor on the execution machine.

11. The method of claim 1, wherein step (f) further comprises establishing, by the broker machine, the connection between the client machine and the desktop computing environment via the terminal services session using a presentation layer protocol.

12. An apparatus for providing access to a desktop computing environment, the apparatus comprising:
    a server including a virtual machine management component and a session management component, the session management component having an identification component, an execution component, and a management component, wherein the virtual machine management component selects a virtual machine that can provide:
        the desktop computing environment requested by a user at a client machine;
        an operating system in which to execute the desktop computing environment; and
        transmitting an identification of the virtual machine to the identification component, wherein the identification component receives from the virtual machine management component the identification of the virtual machine and selects an execution machine providing a terminal services session in which a hypervisor executes to provide access to hardware resources required by the virtual machine;
    the execution component, providing:
        provisioning the virtual machine;
        launching the virtual machine into the execution machine, the virtual machine executing the operating system; and
        launching the desktop computing environment into the executing operating system on the execution machine; and
    the management component establishes a connection between the client machine and the desktop computing environment via the terminal services session.

13. The apparatus of claim 12, wherein the identification component receives from the virtual machine management component the identification of the virtual machine.

14. The apparatus of claim 12, wherein the identification identified execution component launches the virtual machine into the hypervisor executing on the identified execution machine.

15. The apparatus of claim 12, wherein the identification component further comprises a transceiver receiving that receives an identification of the user of the client machine and transmitting transmits the identification of the user to the virtual machine management component.

16. The apparatus of claim 12, wherein the identification component further comprises a transceiver receiving that receives an identification by the user of the client machine of a type of desktop computing environment requested and transmitting transmits the identification of the type of desktol2 computing environment requested to the virtual machine management component.

17. The apparatus of claim 12, wherein the identification component further comprises a transceiver receiving that receives an identification by the user of the client machine of a type of virtual machine requested and transmits the identification of the type of virtual machine requested to the virtual machine management component.

18. The apparatus of claim 12, wherein the identification component further comprises a transceiver receiving that receives an identification of a type of desktop computing environment requested and transmitting transmits the identification of the type of desktop computing environment requested to the virtual machine management component.

19. The apparatus of claim 12, wherein the identification component further comprises a transceiver receiving that receives an identification of a type of virtual machine requested and transmits the identification of the type of virtual machine requested to the virtual machine management component.

20. The apparatus of claim 12, wherein the virtual machine management component selects the virtual machine responsive to an identification of the user of the client machine.

21. The apparatus of claim 12, wherein the virtual machine management component selects the virtual machine responsive to an identification of a type of desktop computing environment requested.

22. The apparatus of claim 12, wherein the virtual machine management component selects the virtual machine responsive to an identification of a type of virtual machine requested.

23. The apparatus of claim 12, wherein the management component establishes the connection between the client machine and the desktop computing environment via a terminal services session using a presentation layer protocol.

* * * * *